US010404395B2

United States Patent
(12) United States Patent
Murakami et al.

(10) Patent No.: US 10,404,395 B2
(45) Date of Patent: Sep. 3, 2019

(54) TRANSMISSION DEVICE AND TRANSMISSION METHOD

(71) Applicant: Panasonic Intellectual Property Corporation of America, Torrance, CA (US)

(72) Inventors: Yutaka Murakami, Kanagawa (JP); Tomohiro Kimura, Osaka (JP); Mikihiro Ouchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/579,685

(22) PCT Filed: Jun. 1, 2016

(86) PCT No.: PCT/JP2016/066116
§ 371 (c)(1),
(2) Date: Dec. 5, 2017

(87) PCT Pub. No.: WO2016/199627
PCT Pub. Date: Dec. 15, 2016

(65) Prior Publication Data

US 2018/0167154 A1 Jun. 14, 2018

Related U.S. Application Data

(60) Provisional application No. 62/184,412, filed on Jun. 25, 2015, provisional application No. 62/173,096, filed on Jun. 9, 2015.

(30) Foreign Application Priority Data

Jul. 16, 2015 (JP) ................................ 2015-141955
May 6, 2016 (JP) ................................ 2016-092928

(51) Int. Cl.
*H04B 1/02* (2006.01)
*H04B 1/06* (2006.01)
(Continued)

(52) U.S. Cl.
CPC ........ *H04J 11/0023* (2013.01); *H04B 7/0456* (2013.01); *H04B 7/063* (2013.01);
(Continued)

(58) Field of Classification Search
CPC ................................................... H04J 11/0023
See application file for complete search history.

(56) References Cited

U.S. PATENT DOCUMENTS

2013/0114763 A1* 5/2013 Park .................... H04B 7/0413 375/296
2015/0010103 A1 1/2015 Murakami et al.
2018/0316399 A1* 11/2018 Murakami ................ H04L 5/00

FOREIGN PATENT DOCUMENTS

EP 2 525 538 11/2012
JP 2009-33268 2/2009
(Continued)

OTHER PUBLICATIONS

Extended European Search Report dated May 11, 2018 in European Application No. 16807334.4.
(Continued)

*Primary Examiner* — Edan Orgad
*Assistant Examiner* — Golam Rabbane
(74) *Attorney, Agent, or Firm* — Wenderoth, Lind & Ponack, L.L.P.

(57) ABSTRACT

A first transmission signal and a second transmission signal are generated from a first modulated signal and a second modulated signal by using a precoding matrix, and parameters of the precoding matrix are calculated from feedback information.

2 Claims, 27 Drawing Sheets

(51) Int. Cl.
*H04B 7/06* (2006.01)
*H04B 7/10* (2017.01)
*H04J 11/00* (2006.01)
*H04L 25/02* (2006.01)
*H04B 7/0456* (2017.01)

(52) U.S. Cl.
CPC ................ *H04B 7/10* (2013.01); *H04J 11/00* (2013.01); *H04L 25/02* (2013.01); *H04B 1/02* (2013.01); *H04B 1/06* (2013.01)

(56) References Cited

FOREIGN PATENT DOCUMENTS

| | | |
|---|---|---|
| JP | 2013-534110 | 8/2013 |
| JP | 2013-207374 | 10/2013 |
| WO | 2012/005476 | 1/2012 |

OTHER PUBLICATIONS

International Search Report (ISR) dated Aug. 16, 2016 in International (PCT) Application No. PCT/JP2016/066116.

* cited by examiner

FRAME CONFIGURATION OF MODULATED SIGNAL TRANSMITTED BY TERMINAL

CONFIGURATION OF COMMUNICATIONS STATION

CONFIGURATION OF COMMUNICATIONS STATION

TRANSMISSION DEVICE AND TRANSMISSION METHOD

TECHNICAL FIELD

The present disclosure relates to transmission techniques using multiple antennas.

BACKGROUND ART

One conventional communications method that uses multiple antennas is, for example, the communications method known as Multiple-Input Multiple-Out (MIMO).

In multi-antenna communications, which is typically MIMO, data reception quality and/or a data communication rate (per unit time) can be improved by modulating transmission data of one or more sequences and simultaneously transmitting the respective modulated signals from different antennas by using the same frequency (common frequency).

One type of MIMO is polarized MIMO. For example, Patent Literature (PTL) 1 (Japanese Unexamined Patent Application Publication No. 2009-33268) discloses the following.

The rank of the channel matrix is improved and the stream count ensured by switching polarization surfaces of some antennas on the transmitting side and receiving side, and approximating a transfer function between an antenna using a polarization surface that is orthogonal to these polarization surfaces to 0. When the antenna configuration is 3×3 or larger, typically all antennas use vertical polarization, and it is determined to which antennas horizontal polarization should be applied to effectively improve channel matrix quality, and the polarization surfaces are switched for only specified antennas in the transceiver.

CITATION LIST

Patent Literature

PTL 1: Japanese Unexamined Patent Application Publication No. 2009-33268

SUMMARY OF THE INVENTION

In MIMO, processing may be performed in which weighting calculation is performed on mapped signal $s_1(t)$ and mapped signal $s_2(t)$ using a precoding matrix to generate weighted signal $r_1(t)$ and weighted signal $r_2(t)$.

However, PTL 1 does not disclose changing the precolling matrix while taking polarization into account.

In view of this, one aspect of the present disclosure is to provide a transmission device and transmission method that change the precolling matrix, taking into account polarization.

A transmission method according to one aspect of the present disclosure is a method including: generating and transmitting a first transmission signal $z_1(t)$ and a second transmission signal $z_2(t)$ by calculating MATH. 4 (to be described later) from a first modulated signal $s_1(t)$ and a second modulated signal $s_2(t)$; and calculating θ, a, and b based on feedback information so as to satisfy MATH. 7.

General or specific aspects of these may be realized as a system, method, integrated circuit, computer program, storage medium, or any given combination thereof.

With this, it is possible to improve reception performance on the receiving side since the precoding matrix is changed taking into account polarization.

DESCRIPTION OF EXEMPLARY EMBODIMENTS

Embodiments

Hereinafter, embodiments according to the present disclosure will be described with reference to the drawings.

(MIMO Polarization)

Figure 1:
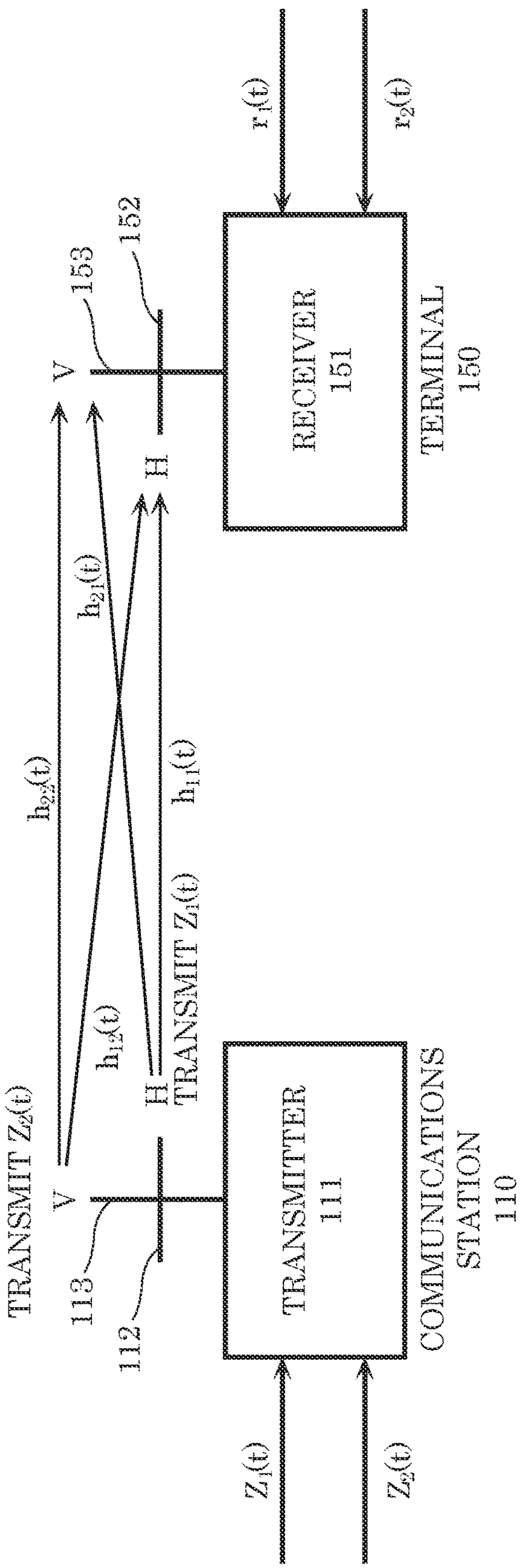
FIG. 1 is a system configuration diagram of a polarized MIMO system.

FIG. 1 is a system configuration diagram of a polarized MIMO system.

Transmitter 111 of communications station 110 receives an input of signal $z_1(t)$ and signal $z_2(t)$. Transmitter 111 transmits signal $z_1(t)$ from horizontal polarizing antenna 112 and transmits signal $z_2(t)$ from vertical polarizing antenna 113.

Receiver 151 of terminal 150 receives an input of a signal received by horizontal polarizing antenna 152 and a signal received by vertical polarizing antenna 153, and outputs signal $r_1(t)$ and signal $r_2(t)$.

Here, the channel characteristics between horizontal polarizing antenna 112 of communications station 110 and horizontal polarizing antenna 152 of terminal 150 is $h_{11}(t)$, the channel characteristics between vertical polarizing antenna 113 of communications station 110 and horizontal polarizing antenna 152 of terminal 150 is $h_{12}(t)$, the channel characteristics between horizontal polarizing antenna 112 of communications station 110 and vertical polarizing antenna 152 of terminal 150 is $h_{21}(t)$, and the channel characteristics between vertical polarizing antenna 113 of communications station 110 and vertical polarizing antenna 153 of terminal 150 is $h_{22}(t)$.

In this case

[MATH. 1]

$$\begin{pmatrix} r_1(t) \\ r_2(t) \end{pmatrix} = \begin{pmatrix} h_{11}(t) & h_{12}(t) \\ h_{21}(t) & h_{22}(t) \end{pmatrix} \begin{pmatrix} z_1(t) \\ z_2(t) \end{pmatrix} + \begin{pmatrix} n_1(t) \\ n_2(t) \end{pmatrix} \tag{1}$$

holds true.

Then, in a polarized Multiple-Input Multiple Output (MIMO) system, when the cross polarization discrimination (XPD) is a large value, $h_{12}(t)$ and $h_{21}(t)$ can be treated as $h_{12}(t)\approx 0$ and $h_{21}(t)\approx 0$. Then, when the millimeter waveband is used, since the radio waves have strong straight travelling properties, there is a high probability of the following circumstance.

[MATH. 2]

$$\begin{pmatrix} r_1(t) \\ r_2(t) \end{pmatrix} = \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \tag{2}$$

Here, if $z_1(t)=s_1(t)$ and $z_2(t)=s_2(t)$ ($s_1(t)$ and $s_2(t)$ are mapped baseband signals), mapped baseband signal $s_1(t)$ is not affected (interference) by mapped baseband signal $s_2(t)$, and thus achieving favorable data reception quality is likely. Similarly, since mapped baseband signal $s_2(t)$ is not affected (interference) by mapped baseband signal $s_1(t)$, achieving favorable data reception quality is likely.

However, $h_{11}(t)$, $h_{12}(t)$, $h_{21}(t)$, and $h_{22}(t)$ are complex numbers (may be actual numbers). $r_1(t)$, $r_2(t)$, $z_1(t)$, and $z_2(t)$ are complex numbers (may be actual numbers). $n_1(t)$ and $n_2(t)$ are noise, and are complex numbers.

Figure 2:
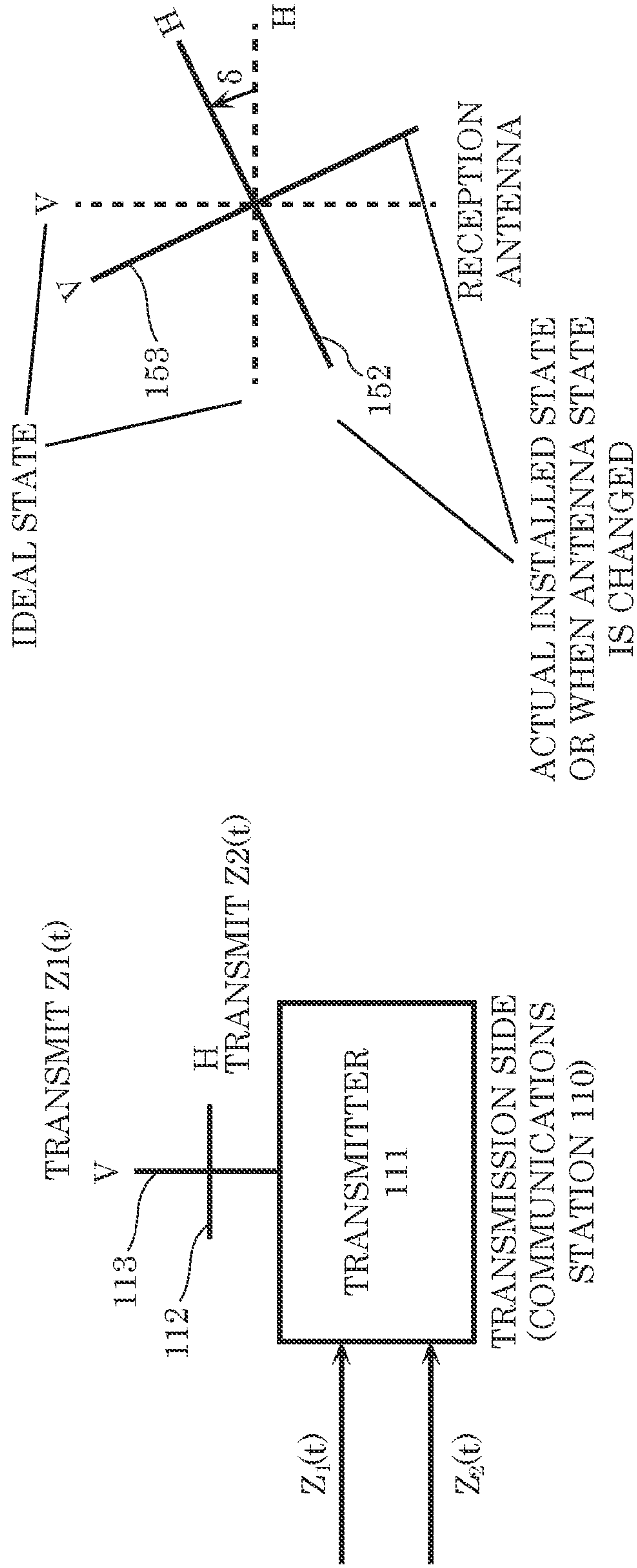
FIG. 2 illustrates one example of an arrangement state of antennas.

FIG. 2 illustrates one example of an arrangement state of antennas.

In FIG. 2, an ideal state of an arrangement of horizontal polarizing antenna 152 and vertical polarizing antenna 153 on the receiving side relative to horizontal polarizing antenna 112 and vertical polarizing antenna 113 on the transmitting side is shown by dotted lines.

As illustrated in FIG. 2, the angle between horizontal polarizing antenna 152 and vertical polarizing antenna 153 in the ideal state and horizontal polarizing antenna 152 and vertical polarizing antenna 153 when in a state in which they are actually installed or when the antenna state is changed, is 6 (radians).

(Precoding Method (1A))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 3]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \end{aligned} \tag{3}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 4]

$$\begin{pmatrix} z_1(t) \\ z_2(t) \end{pmatrix} = \begin{pmatrix} a & 0 \\ 0 & b \end{pmatrix} \begin{pmatrix} \cos\theta & \sin\theta \\ \sin\theta & -\cos\theta \end{pmatrix} \begin{pmatrix} s_1(t) \\ s_2(t) \end{pmatrix} \tag{4}$$

($a$, $b$ are complex numbers (may be actual numbers))

(a, b are complex numbers (may be actual numbers))

In this case, the following equation holds true.

[MATH. 5]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \cos\theta & \sin\theta \\ \sin\theta & -\cos\theta \end{pmatrix} \\ &\quad \begin{pmatrix} s_1(t) \\ s_2(t) \end{pmatrix} + \begin{pmatrix} n_1(t) \\ n_2(t) \end{pmatrix} \\ &= \begin{pmatrix} \begin{matrix} h_{11}(t)\times a\times\cos\delta\times\cos\theta - \\ h_{22}(t)\times b\times\sin\delta\times\sin\theta \end{matrix} & \begin{matrix} h_{11}(t)\times a\times\cos\delta\times\sin\theta + \\ h_{22}(t)\times b\times\sin\delta\times\cos\theta \end{matrix} \\ \begin{matrix} h_{11}(t)\times a\times\sin\delta\times\cos\theta + \\ h_{22}(t)\times b\times\cos\delta\times\sin\theta \end{matrix} & \begin{matrix} h_{11}(t)\times a\times\sin\delta\times\sin\theta - \\ h_{22}(t)\times b\times\cos\delta\times\cos\theta \end{matrix} \end{pmatrix} \\ &\quad \begin{pmatrix} s_1(t) \\ s_2(t) \end{pmatrix} + \begin{pmatrix} n_1(t) \\ n_2(t) \end{pmatrix} \end{aligned} \tag{5}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 6]

$$h_{11}(t)\times a\times\cos\delta\times\sin\theta + h_{22}(t)\times b\times\sin\delta\times\cos\theta = 0 \tag{6-1}$$

$$h_{11}(t)\times a\times\sin\delta\times\cos\theta + h_{22}(t)\times b\times\cos\delta\times\sin\theta = 0 \tag{6-2}$$

Accordingly, it is sufficient if the following holds true.

[MATH. 7]

$$b = \frac{h_{11}(t)}{h_{22}(t)} \times a \quad (7\text{-}1)$$

and $$\theta = -\delta + n\pi \text{ radians} \quad (7\text{-}2)$$

($n$ is an integer)

Accordingly, the communications station calculates θ, a, and b from the feedback information from the terminal so that the following is true.

[MATH. 8]

$$b = \frac{h_{11}(t)}{h_{22}(t)} \times a \quad (8\text{-}1)$$

and $$\theta = -\delta + n\pi \text{ radians} \quad (8\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 9]

$$|a|^2+|b|^2=|u|^2 \quad (9)$$

($|u|^2$ is a parameter based on average transmitted power)

(Communications Station Configuration (1))

Figure 3:
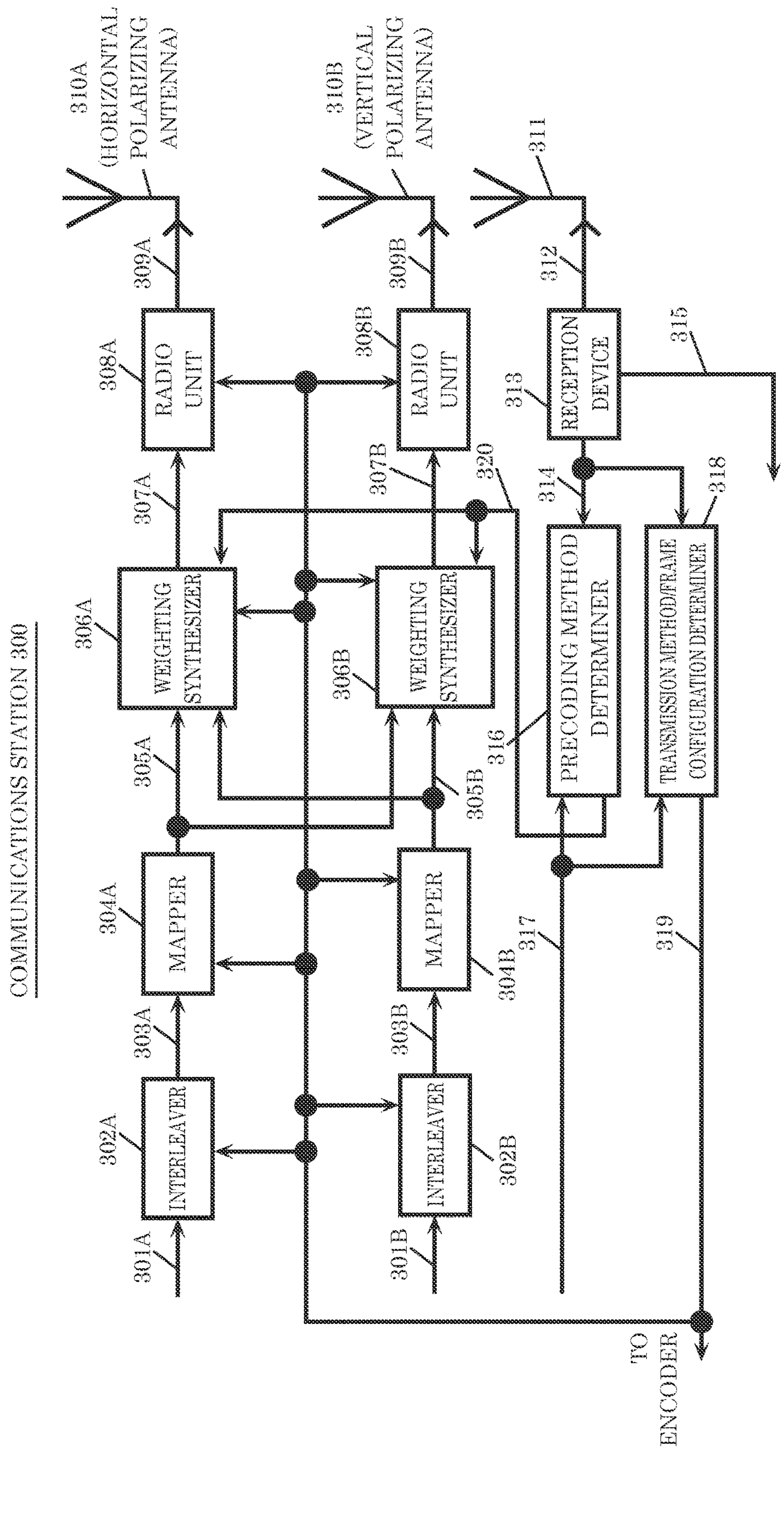
FIG. 3 illustrates one example of a configuration of a communications station.

Hereinafter, one example of a configuration of a communications station according to the present disclosure will be described. FIG. 3 is a block diagram illustrating one example of a configuration of a communications station according to the present disclosure.

Communications station 300 includes: interleavers 302A, 302B; mappers 304A, 304B; weighting synthesizers 306A, 306B; radio units 308A, 308B; horizontal polarizing antenna 310A; vertical polarizing antenna 310B; antenna 311; reception device 313; precoding method determiner 316; and transmission method/frame configuration determiner 318.

Interleaver 302A receives inputs of encoded data 301A and transmission method/frame configuration signal 319, interleaves encoded data 301A, and outputs interleaved data 303A. Note that the interleaving method may be switched based on transmission method/frame configuration signal 319.

Interleaver 302B receives inputs of encoded data 301B and transmission method/frame configuration signal 319, interleaves encoded data 301B, and outputs interleaved data 303B. Note that the interleaving method may be switched based on transmission method/frame configuration signal 319.

Mapper 304A receives inputs of interleaved data 303A and transmission method/frame configuration signal 319, applies a modulation such as Quadrature Phase Shift Keying (QPSK), 16 Quadrature Amplitude Modulation (16QAM), or 64 Quadrature Amplitude Modulation (64QAM) to interleaved data 303A, and outputs modulated signal (mapped signal) 305A. Note that the modulation method may be switched based on transmission method/frame configuration signal 319.

Mapper 304B receives inputs of interleaved data 303B and transmission method/frame configuration signal 319, applies a modulation such as Quadrature Phase Shift Keying (QPSK), 16 Quadrature Amplitude Modulation (16 QAM), or 64 Quadrature Amplitude Modulation (64QAM) to interleaved data 303B, and outputs modulated signal (mapped signal) 305B. Note that the modulation method may be switched based on transmission method/frame configuration signal 319.

Weighting synthesizer 306A receives inputs of mapped signal 305A, mapped signal 305B, transmission method/frame configuration signal 319, and precoding method signal 320, weighting synthesizes mapped signal 305A and mapped signal 305B based on precoding method signal 320, and outputs weighted signal 307A based on the frame configuration of transmission method/frame configuration signal 319. Note that the weighting synthesis method used by weighting synthesizer 306A will be described later.

Weighting synthesizer 306B receives inputs of mapped signal 305A, mapped signal 305B, transmission method/frame configuration signal 319, and precoding method signal 320, weighting synthesizes mapped signal 305A and mapped signal 305B based on precoding method signal 320, and outputs weighted signal 307B based on the frame configuration of transmission method/frame configuration signal 319. Note that the weighting synthesis method used by weighting synthesizer 306B will be described later.

Radio unit 308A receives inputs of weighted signal 307A and transmission method/frame configuration signal 319, applies processing such as orthogonal modulation, bandlimiting, frequency conversion, and/or amplification to weighted signal 307A, and outputs transmission signal 309A. Transmission signal 309A is output from horizontal polarizing antenna 310A as radio waves. Note that the processing to be applied may be switched based on transmission method/frame configuration signal 319.

Radio unit 308B receives inputs of weighted signal 307B and transmission method/frame configuration signal 319, applies processing such as orthogonal modulation, bandlimiting, frequency conversion, and/or amplification to weighted signal 307B, and outputs transmission signal 309B. Transmission signal 309B is output from vertical polarizing antenna 310B as radio waves. Note that the processing to be applied may be switched based on transmission method/frame configuration signal 319.

Reception device 313 receives an input of reception signal 312 received by antenna 311, demodulates/decodes reception signal 312, and outputs the resulting data signals 314, 315.

Precoding method determiner 316 receives inputs of data signal 314 and signal 317, obtains, from data signal 314, feedback information transmitted by a communication partner, determines a precoding method based on feedback information, and outputs precoding method signal 320. Note that the determination of a precoding method by precoding method determiner 316 will be described later.

Transmission method/frame configuration determiner 318 receives inputs of data signal 314 and signal 317, and obtains, from data signal 314, feedback information transmitted by a communication partner. Signal 317 includes information on the transmission method requested by the communications station. Transmission method/frame configuration determiner 318 determines a transmission method/frame configuration based on this information, and outputs transmission method/frame configuration signal 319.

(Communications Station Configuration (2))

Hereinafter, another example of a configuration of the communications station according to the present disclosure will be described.

Figure 4:
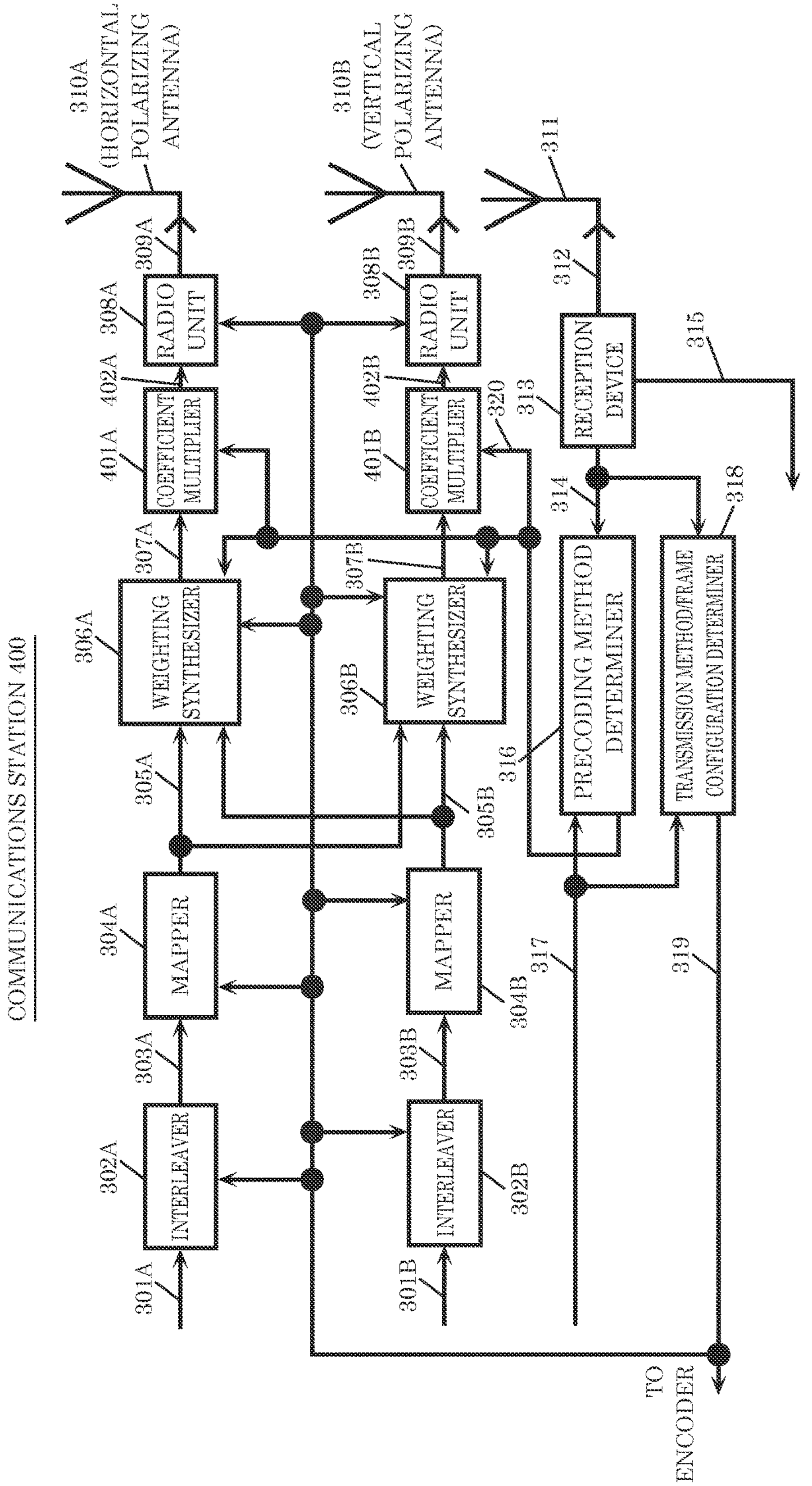
FIG. 4 illustrates another example of a configuration of a communications station.

FIG. 4 is a block diagram illustrating another example of a configuration of a communications station according to the present disclosure.

In contrast to communications station 300 illustrated in FIG. 3, communications station 400 illustrated in FIG. 4 includes coefficient multiplier 401A between weighting synthesizer 306A and radio unit 308A, and coefficient multiplier 401B between weighting synthesizer 306B and radio unit 308B.

Coefficient multiplier 401A receives inputs of weighted signal 307A and precoding method signal 320, multiplies a coefficient with weighted signal 307A based on precoding method signal 320, and outputs coefficient multiplied signal 402A. Note that the coefficient multiplication by coefficient multiplier 401A will be described later.

Coefficient multiplier 401B receives inputs of weighted signal 307B and precoding method signal 320, multiplies a coefficient with weighted signal 307B based on precoding method signal 320, and outputs coefficient multiplied signal 402B. Note that the coefficient multiplication by coefficient multiplier 401B will be described later.

Note that radio unit 308A illustrated in FIG. 4 performs processing on coefficient multiplied signal 402A as an input instead of weighted signal 307A, and radio unit 308B performs processing on coefficient multiplied signal 402B as an input instead of weighted signal 307B.

(Precoding Method (1A-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 10]

$$\begin{pmatrix} q_{11} & q_{12} \\ q_{21} & q_{22} \end{pmatrix} \quad (10)$$

Accordingly, weighting synthesizer 306A calculates the following and outputs weighted signal 307A ($z_1(t)$).

[MATH. 11]

$$z_1(t)=q_{11}\times s_1(t)+q_{12}\times s_2(t) \quad (11)$$

Weighting synthesizer 306B calculates the following and outputs weighted signal 307B ($z_2(t)$).

[MATH. 12]

$$z_2(t)=q_{21}\times s_1(t)+q_{22}\times s_2(t) \quad (12)$$

Precoding method determiner 316 performs the calculations described in "(precoding method (1A))" based on feedback information from a terminal, and determines the precoding matrix.

[MATH. 13]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \cos\theta & \sin\theta \\ \sin\theta & -\cos\theta \end{pmatrix} = \begin{pmatrix} a\times\cos\theta & a\times\sin\theta \\ b\times\sin\theta & -b\times\cos\theta \end{pmatrix} \quad (13)$$

In other words, the precoding matrix of the above equation is calculated. Here, based on feedback information from a terminal, precoding method determiner 316 uses

[MATH. 14]

$$b = \frac{h_{11}(t)}{h_{22}(t)}\times a \quad (14\text{-}1)$$

and $$\theta = -\delta + n\pi \text{ radians} \quad (14\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (1A-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 15]

$$\begin{pmatrix} q_{11} & q_{12} \\ q_{21} & q_{22} \end{pmatrix} \quad (15)$$

Accordingly, weighting synthesizer 306A calculates the following and outputs weighted signal 307A ($y_1(t)$).

[MATH. 16]

$$y_1(t)=q_{11}\times s_1(t)+q_{12}\times s_2(t) \tag{16}$$

Weighting synthesizer 306B calculates the following and outputs weighted signal 307B ($y_2(t)$).

[MATH. 17]

$$y_2(t)=q_{21}\times s_1(t)+q_{12}\times s_2(t) \tag{17}$$

Precoding method determiner 316 performs the calculations described in "(precoding method (1A))" based on feedback information from a terminal, and determines the precoding matrix.

[MATH. 18]

$$\begin{pmatrix} q_{11} & q_{12} \\ q_{21} & q_{22} \end{pmatrix} = \begin{pmatrix} \cos\theta & \sin\theta \\ \sin\theta & -\cos\theta \end{pmatrix} \tag{18}$$

In other words, the precoding matrix of the above equation and values for a and b are calculated. Here, based on feedback information from a terminal, precoding method determiner 316 uses

[MATH. 19]

$$b = \frac{h_{11}(t)}{h_{22}(t)} \times a \tag{19-1}$$

and $$\theta = -\delta + n\pi \text{ radians} \tag{19-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (1B))

As described in "(precoding method (1A))", the following relation equation holds true.

[MATH. 20]

$$\begin{aligned}
\begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\
&= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\
&= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \cos\theta & \sin\theta \\ \sin\theta & -\cos\theta \end{pmatrix} \\
&\quad \begin{pmatrix} s_1(t) \\ s_2(t) \end{pmatrix} + \begin{pmatrix} n_1(t) \\ n_2(t) \end{pmatrix} \\
&= \begin{pmatrix} h_{11}(t)\times a\times\cos\delta\times\cos\theta - & h_{11}(t)\times a\times\cos\delta\times\sin\theta + \\ h_{22}(t)\times b\times\sin\delta\times\sin\theta & h_{22}(t)\times b\times\sin\delta\times\cos\theta \\ h_{11}(t)\times a\times\sin\delta\times\cos\theta + & h_{11}(t)\times a\times\sin\delta\times\sin\theta - \\ h_{22}(t)\times b\times\cos\delta\times\sin\theta & h_{22}(t)\times b\times\cos\delta\times\cos\theta \end{pmatrix} \\
&\quad \begin{pmatrix} s_1(t) \\ s_2(t) \end{pmatrix} + \begin{pmatrix} n_1(t) \\ n_2(t) \end{pmatrix}
\end{aligned} \tag{20}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 21]

$$h_{11}(t)\times a\times\cos\delta\times\cos\theta - h_{22}(t)\times b\times\sin\delta\times\sin\theta=0 \tag{21-1}$$

$$h_{11}(t)\times a\times\sin\delta\times\sin\theta - h_{22}(t)\times b\times\cos\delta\times\cos\theta=0 \tag{21-2}$$

Accordingly, it is sufficient if the following holds true.

[MATH. 22]

$$b = \frac{h_{11}(t)}{h_{22}(t)} \times a \tag{22-1}$$

and $$\theta = -\theta + \frac{\pi}{2} + n\pi \text{ radians} \tag{22-2}$$

($n$ is an integer)

Accordingly, the communications station calculates θ, a, and b from the feedback information from the terminal so that the following is true.

[MATH. 23]

$$b = \frac{h_{11}(t)}{h_{22}(t)} \times a \tag{23-1}$$

and $$\theta = -\delta + \frac{\pi}{2} + n\pi \text{ radians} \tag{23-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 24]

$$|a|^2+|b|^2=|u|^2 \quad (24)$$

($|u|^2$ is a parameter based on average transmitted power)

(Precoding Method (1B-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 25]

$$\begin{pmatrix} q_{11} & q_{12} \\ q_{21} & q_{22} \end{pmatrix} \quad (25)$$

Accordingly, weighting synthesizer 306A calculates the following and outputs weighted signal 307A ($z_1(t)$).

[MATH. 26]

$$z_1(t)=q_{11}\times s_1(t)+q_{12}\times s_2(t) \quad (26)$$

Weighting synthesizer 306B calculates the following and outputs weighted signal 307B ($z_2(t)$).

[MATH. 27]

$$z_2(t)=q_{21}\times s_1(t)+q_{22}\times s_2(t) \quad (27)$$

Precoding method determiner 316 performs the calculations described in "(precoding method (1B))" based on feedback information from a terminal, and determines the precoding matrix.

[MATH. 28]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \cos\theta & \sin\theta \\ \sin\theta & -\cos\theta \end{pmatrix} = \begin{pmatrix} a\times\cos\theta & a\times\sin\theta \\ b\times\sin\theta & -b\times\cos\theta \end{pmatrix} \quad (28)$$

In other words, the precoding matrix of the above equation is calculated. Here, based on feedback information from a terminal, precoding method determiner 316 uses

[MATH. 29]

$$b = \frac{h_{11}(t)}{h_{22}(t)} \times a \quad (29\text{-}1)$$

and $$\theta = -\delta + \frac{\pi}{2} + n\pi \text{ radians} \quad (29\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (1B-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 30]

$$\begin{pmatrix} q_{11} & q_{12} \\ q_{21} & q_{22} \end{pmatrix} \quad (30)$$

Accordingly, weighting synthesizer 306A calculates the following and outputs weighted signal 307A ($y_1(t)$).

[MATH. 31]

$$y_1(t)=q_{11}\times s_1(t)+q_{12}\times s_2(t) \quad (31)$$

Weighting synthesizer 306B calculates the following and outputs weighted signal 307B ($y_2(t)$).

[MATH. 32]

$$y_2(t)=q_{21}\times s_1(t)+q_{22}\times s_2(t) \quad (32)$$

Precoding method determiner 316 performs the calculations described in "(precoding method (1B))" based on feedback information from a terminal, and determines the precoding matrix.

[MATH. 33]

$$\begin{pmatrix} q_{11} & q_{12} \\ q_{21} & q_{22} \end{pmatrix} = \begin{pmatrix} \cos\theta & \sin\theta \\ \sin\theta & -\cos\theta \end{pmatrix} \quad (33)$$

In other words, the precoding matrix of the above equation and values for a and b are calculated. Here, based on feedback information from a terminal, precoding method determiner 316 uses

[MATH. 34]

$$b = \frac{h_{11}(t)}{h_{22}(t)} \times a \quad (34\text{-}1)$$

and $$\theta = -\delta + \frac{\pi}{2} + n\pi \text{ radians} \quad (34\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Transmission Frame Configuration of Communications Station (1))

Figure 5:
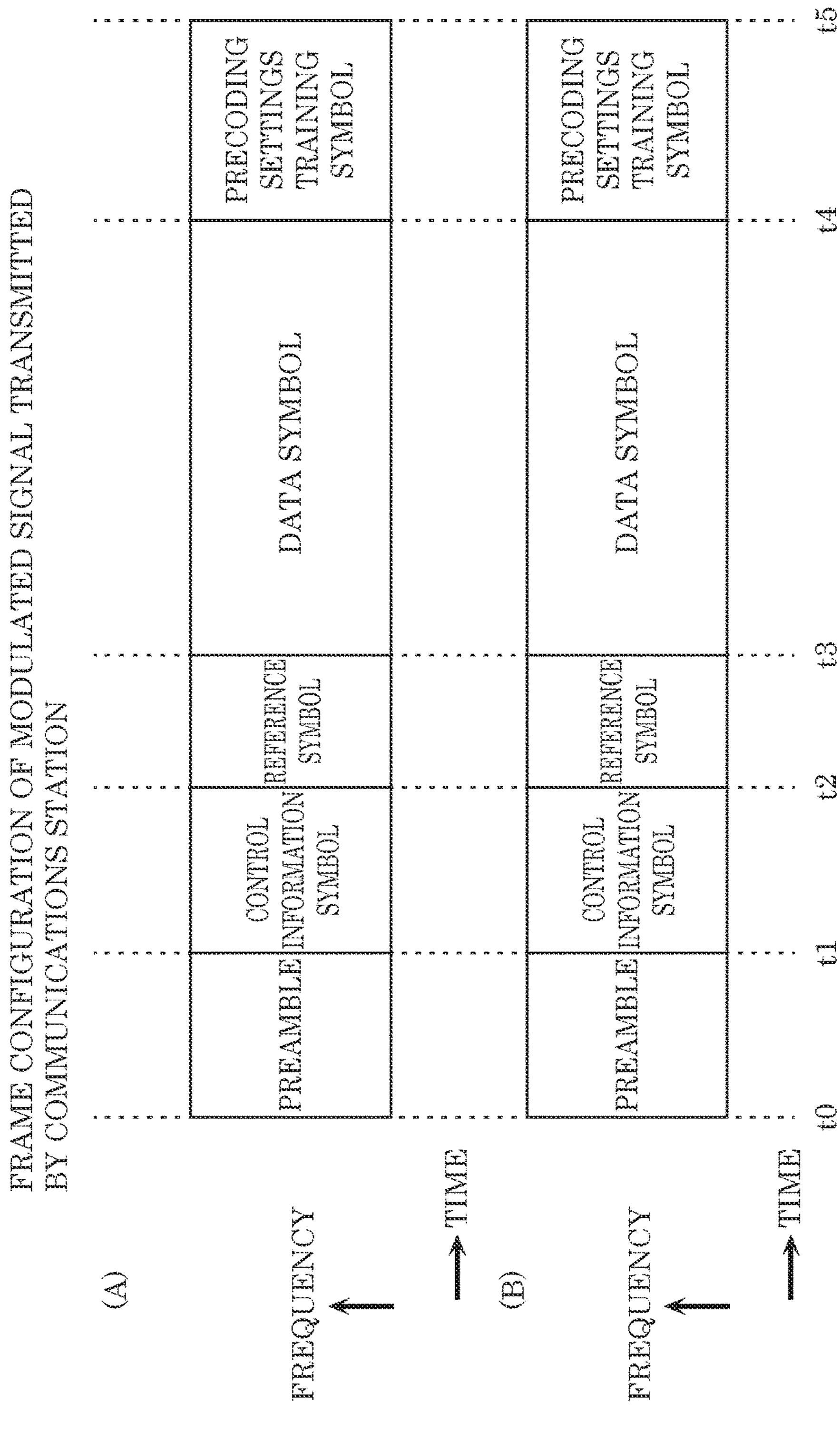
FIG. 5 illustrates one example of a frame configuration of a modulated signal of a communications station.

FIG. 5 illustrates one example of a frame configuration of a modulated signal transmitted by a communications station. In FIG. 5, time is represented on the horizontal axis and frequency is represented on the vertical axis. Note that in the frequency on vertical axis, one or more carriers (subcarriers) is sufficient. In FIG. 5, (A) illustrates one example of a frame configuration of modulated signal ($z_1(t)$) transmitted from horizontal polarizing antenna 310A illustrated in FIG. 3, FIG. 4, and (B) illustrates one example of a frame configuration of modulated signal ($z_2(t)$) transmitted from vertical polarizing antenna 310B illustrated in FIG. 3, FIG. 4.

Moreover, the preamble, control information symbol, and precoding settings training symbol may be single-carrier (one carrier), the data symbol may be multi-carrier, such as orthogonal frequency-division multiplexing (OFDM). (Here, the frequency band used to transmit a preamble, the frequency band used to transmit a control information symbol, the frequency band used to transmit a precoding settings training symbol, and the frequency band used to transmit a data symbol may be the same or may be different.) Moreover, the preamble, control information symbol, precoding settings training symbol, and data symbol may be multi-carrier such as OFDM (here, the frequency band used to transmit a preamble, the frequency band used to transmit a control information symbol, the frequency band used to transmit a precoding settings training symbol, and the frequency band used to transmit a data symbol may be the same or may be different).

Each preamble illustrated in FIG. 5 is a symbol including, for example, a signal for a terminal to detect a modulated signal transmitted by a communications station, and a signal for the terminal to perform time-synchronization or frequency-synchronization with respect to a modulated signal transmitted by a communications station. Note that in FIG. 5, the preambles may be transmitted from both horizontal polarizing antenna 310A and vertical polarizing antenna 310B, and may be transmitted from one or the other of horizontal polarizing antenna 310A and vertical polarizing antenna 310B.

Each control information symbol illustrated in FIG. 5 is a symbol for transmitting control information to a terminal. The control information symbol includes, for example, information on the modulation method (of a data symbol) (information on the modulation method of $s_1(t)$, and infromation on the modulation method of $s_2(t)$ (data symbol)), information on an error correction code used by a communications station (encode rate, block length (code length), etc.). A terminal obtains the control information symbol and obtains information on the modulation method and information on the error correction code, thereby making demodulation/decoding of the data symbol possible. Note that in FIG. 5, the control information symbols may be transmitted from both horizontal polarizing antenna 310A and vertical polarizing antenna 310B, and may be transmitted from one or the other of horizontal polarizing antenna 310A and vertical polarizing antenna 310B.

Note that at least the data symbol is presumed to be MIMO transmitted, and the data symbols are transmitted from horizontal polarizing antenna 310A and vertical polarizing antenna 310B at the same time and at the same frequency.

Each reference symbol illustrated in FIG. 5 is a symbol for performing estimation (channel estimation) of a propagation environment, in order for a terminal to demodulate (perform wave detection on) a data symbol. The reference symbol is transmitted from horizontal polarizing antenna 310A. The reference symbol may also be transmitted from vertical polarizing antenna 310B. Note that "a reference symbol is not to be transmitted from vertical polarizing antenna 310B during the time and at the frequency that a reference symbol is transmitted from horizontal polarizing antenna 310A" may be a rule, and "a reference symbol is to be transmitted from vertical polarizing antenna 310B during the time and at the frequency that a reference symbol is transmitted from horizontal polarizing antenna 310A" may be a rule.

Each data symbol illustrated in FIG. 5 is a symbol for transmitting data. The data symbol illustrated in (A) in FIG. 5 is signal $z_1(t)$ configured from $s_1(t)$ and/or $s_2(t)$. The data symbol illustrated in (B) in FIG. 5 is signal $z_2(t)$ configured from $s_1(t)$ and/or $s_2(t)$. Moreover, the data symbol illustrated in (A) in FIG. 5 and the data symbol illustrated in (B) in FIG. 5 are transmitted from the communications station at the same time and using the same frequency.

Each precoding settings training symbol illustrated in FIG. 5 is a training symbol for estimating parameters (a, b, θ) for performing the precoding described in "(precoding method (1A))", "(precoding method (1A-1))", "(precoding method (1A-2))", "(precoding method (1B))", "(precoding method (1B-1))", "(precoding method (1B-2))". For example, a terminal receives a precoding settings training symbol, performs estimation (channel estimation) of a propagation environment, and transmits a channel estimation value (channel state information (CSI)) to the communications station. The precoding settings training symbol is transmitted from horizontal polarizing antenna 310A. The precoding settings training symbol may also be transmitted from vertical polarizing antenna 310B. Note that "a precoding settings training symbol is not to be transmitted from vertical polarizing antenna 310B during the time and at the frequency that a precoding settings training symbol is transmitted from horizontal polarizing antenna 310A" may be a rule, and "a precoding settings training symbol is to be transmitted from vertical polarizing antenna 310B during the time and at the frequency that a precoding settings training symbol is transmitted from horizontal polarizing antenna 310A" may be a rule.

Note that the frame configuration illustrated in FIG. 5 of a modulated signal transmitted by the communications station is merely one example; symbols other than those illustrated in FIG. 5 may be transmitted by the communications station, and symbols other than those illustrated in FIG. 5 may be present in the frame. Moreover, a pilot symbol for performing estimation (channel estimation) of a propagation environment may be inserted in, for example, the control information symbol or data symbol.

(Terminal Configuration)

Figure 6:
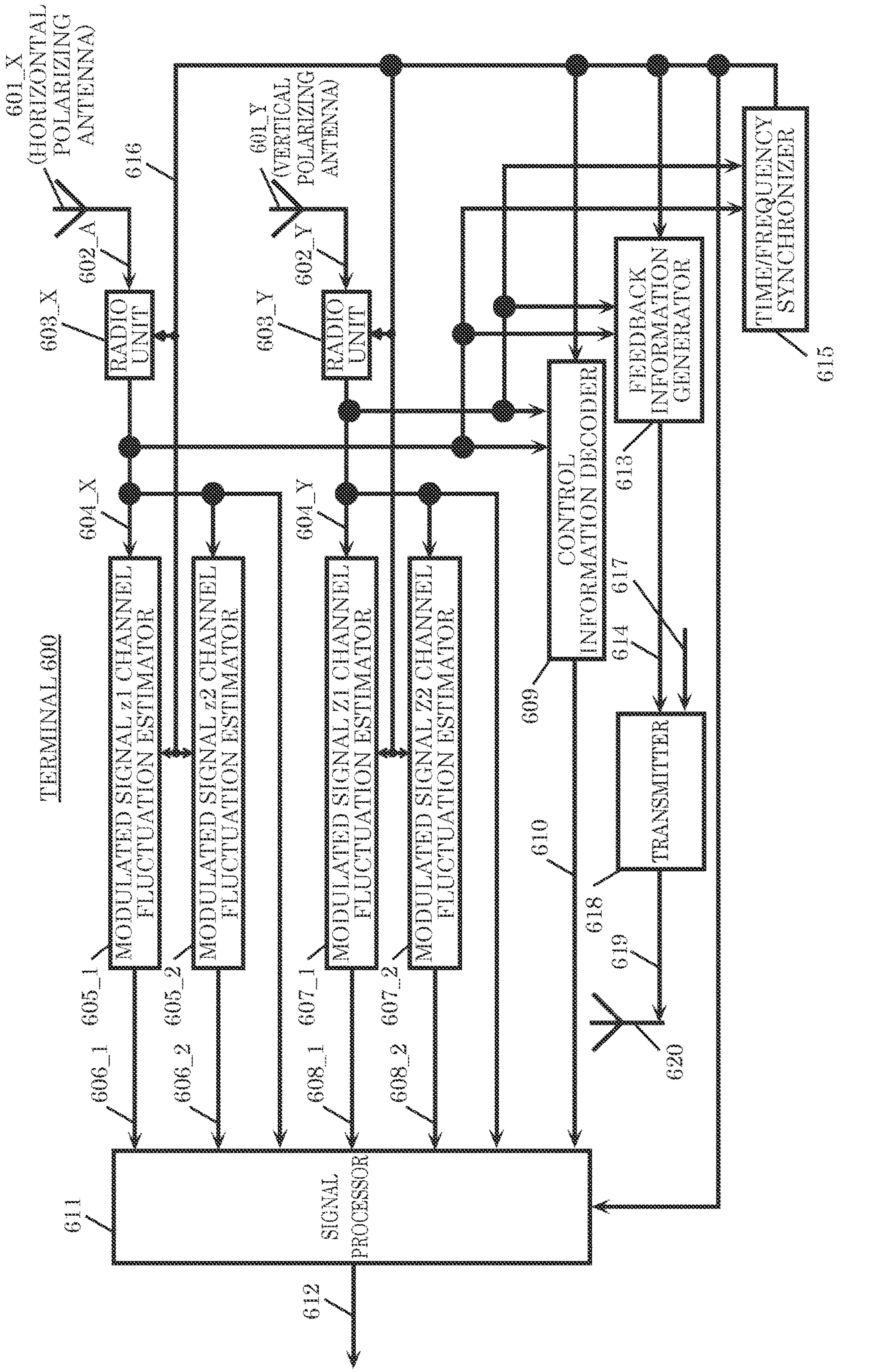
FIG. 6 illustrates one example of a configuration of a terminal.

FIG. 6 is a block diagram illustrating one example of a configuration of a terminal according to the present disclosure.

Terminal 600 includes horizontal polarizing antenna 601_X, radio unit 603_X, modulated signal z1 channel fluctuation estimator 605_1, modulated signal z2 channel fluctuation estimator 605_2, radio unit 603_Y, modulated signal z1 channel fluctuation estimator 607_1, modulated signal z2 channel fluctuation estimator 607_2, control information decoder 609, signal processor 611, feedback information generator 613, time/frequency synchronizer 615, transmitter 618, and antenna 620.

Radio unit 603_X receives inputs of reception signal 602_X received by horizontal polarizing antenna 601_X and time/frequency synchronization signal 616, applies processing such as frequency conversion and/or orthogonal demodulation to reception signal 602_X, and outputs baseband signal 604_X.

Modulated signal z1 channel fluctuation estimator 605_1 receives inputs of baseband signal 604_X and time/frequency synchronization signal 616, performs channel estimation (calculates channel characteristics $h_{11}(t)$) by using the reference symbol illustrated in (A) in FIG. 5, and outputs channel estimation signal 606_1.

Modulated signal z2 channel fluctuation estimator 605_2 receives inputs of baseband signal 604_X and time/frequency synchronization signal 616, performs channel estimation (calculates channel characteristics $h_{12}(t)$) by using the reference symbol illustrated in (B) in FIG. 5, and outputs channel estimation signal 606_2.

Radio unit 603_Y receives inputs of reception signal 602_Y received by vertical polarizing antenna 601_Y and time/frequency synchronization signal 616, applies processing such as frequency conversion and/or orthogonal demodulation to reception signal 602_Y, and outputs baseband signal 604_Y.

Modulated signal z1 channel fluctuation estimator 607_1 receives inputs of baseband signal 604_Y and time/frequency synchronization signal 616, performs channel estimation (calculates channel characteristics $h_{21}(t)$) by using the reference symbol illustrated in (A) in FIG. 5, and outputs channel estimation signal 608_1.

Modulated signal z2 channel fluctuation estimator 607_2 receives inputs of baseband signal 604_Y and time/frequency synchronization signal 616, performs channel estimation (calculates channel characteristics $h_{22}(t)$) by using the reference symbol illustrated in (B) in FIG. 5, and outputs channel estimation signal 608_2.

Time/frequency synchronizer 615 receives inputs of baseband signal 604_X and baseband signal 604_Y, performs time synchronization (frame synchronization) and frequency synchronization by using the preambles illustrated in (A) and (B) in FIG. 5, and outputs time/frequency synchronization signal 616.

Control information decoder 609 receives inputs of baseband signal 604_X, baseband signal 604_Y, and time/frequency synchronization signal 616, performs demodulation/decoding on the control information symbols illustrated in (A) and (B) in FIG. 5, obtains control information, and outputs control signal 610.

Signal processor 611 receives inputs of baseband signals 604_X, 604_Y; channel estimation signals 606_1, 606_2, 608_1, 608_2; control signal 610; and time/frequency synchronization signal 616, performs demodulation/decoding on the data symbols illustrated in (A) and (B) in FIG. 5, obtains data, and outputs data 612.

Feedback information generator 613 receives inputs of baseband signal 604_X, baseband signal 604_Y, and time/frequency synchronization signal 616, for example, performs estimation (channel estimation) of a propagation environment by using the precoding settings training symbols illustrated in (A) and (B) in FIG. 5, obtains a channel estimation value (channel state information (CSI)), generates feedback information based on this, and outputs feedback signal 614 (feedback information is mediated by transmitter 618; a terminal transmits a notification information symbol to the communications station as feedback information).

Transmitter 618 receives as inputs feedback signal 614 and data 617, and transmission signal 619 is output from antenna 620 as radio waves.

(Transmission Frame Configuration of Terminal)

Figure 7:
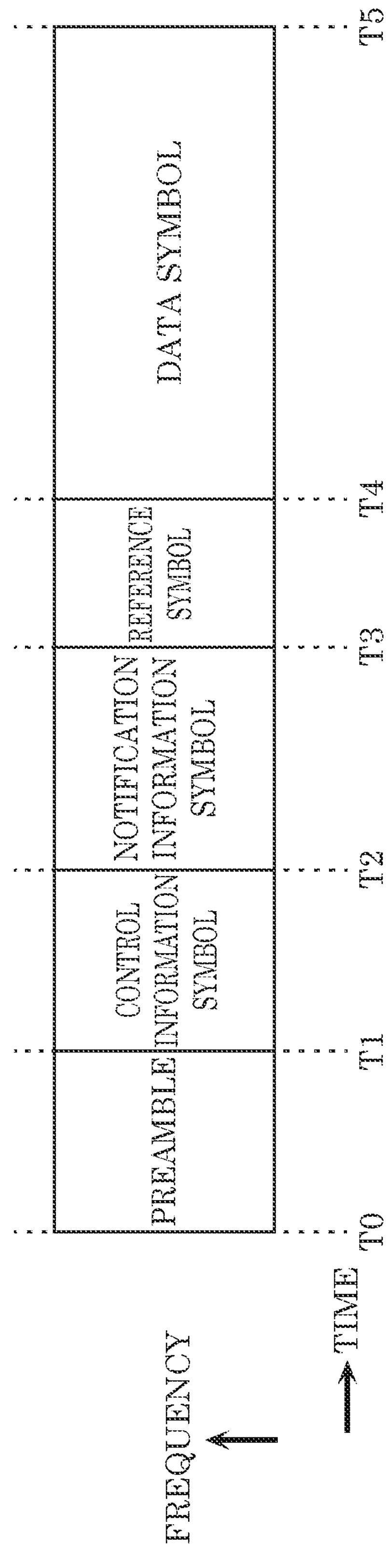
FIG. 7 illustrates one example of a frame configuration of a modulated signal of a terminal.

FIG. 7 illustrates one example of a frame configuration of a modulated signal transmitted by a terminal. In FIG. 7, time is represented on the horizontal axis and frequency is represented on the vertical axis. Note that in the frequency on vertical axis, one or more carriers (subcarriers) is sufficient. Moreover, the preamble, control information symbol, and notification information symbol may be single-carrier (one carrier), the data symbol may be multi-carrier, such as orthogonal frequency-division multiplexing (OFDM). (Here, the frequency band used to transmit a preamble, the frequency band used to transmit a control information symbol, the frequency band used to transmit a notification information symbol, and the frequency band used to transmit a data symbol may be the same or may be different.) Moreover, the preamble, control information symbol, notification information symbol, and data symbol may be multi-carrier such as OFDM. (Here, the frequency band used to transmit a preamble, the frequency band used to transmit a control information symbol, the frequency band used to transmit a notification information symbol, and the frequency band used to transmit a data symbol may be the same or may be different.) Moreover, the modulated signal transmitted by the terminal is not limited to a single signal (for example, a Multiple-Input Multiple-Output (MIMO) method in which a plurality of modulated signals are transmitted from a plurality of antennas may be used, or a Multiple-Input Single-Output (MISO) method may be used).

The preamble illustrated in FIG. 7 is a symbol including, for example, a signal for a terminal to detect a modulated signal transmitted by a communications station, and a signal for the terminal to perform time-synchronization or frequency-synchronization with respect to a modulated signal transmitted by a communications station.

The control information symbol illustrated in FIG. 7 is a symbol for transmitting control information to the communications station. The control information symbol includes, for example, information on a modulation method (of a data symbol), and information on an error correction code used by the terminal (encode rate, block length (code length), etc.). The communications station obtains the control information symbol and obtains information on the modulation method and information on the error correction code, thereby making demodulation/decoding of the data symbol possible.

The notification information symbol illustrated in FIG. 7 is a symbol for "the terminal to transmit, to the communications station, a channel estimation value (CSI) obtained by, for example, the terminal performing estimation (channel estimation) of a propagation environment, which is estimated using the precoding settings training symbol transmitted by the communications station" (accordingly, by obtaining the notification information symbol, the communications station can calculate the precoding matrix (and power change value) used to generate the data symbol).

The reference symbol illustrated in FIG. 7 is a symbol for performing estimation (channel estimation) of a propagation environment, in order for the communications station to demodulate (perform wave detection on) the data symbol.

The data symbol illustrated in FIG. 7 is a symbol for transmitting data.

Note that the frame configuration illustrated in FIG. 7 of a modulated signal transmitted by the terminal is merely one example; symbols other than those illustrated in FIG. 7 may be transmitted by the terminal, and symbols other than those illustrated in FIG. 7 may be present in the frame. Moreover, a pilot symbol for performing estimation (channel estimation) of a propagation environment may be inserted in, for example, the control information symbol or data symbol.

(Communication State Between Communications Station and Terminal)

Figure 8:
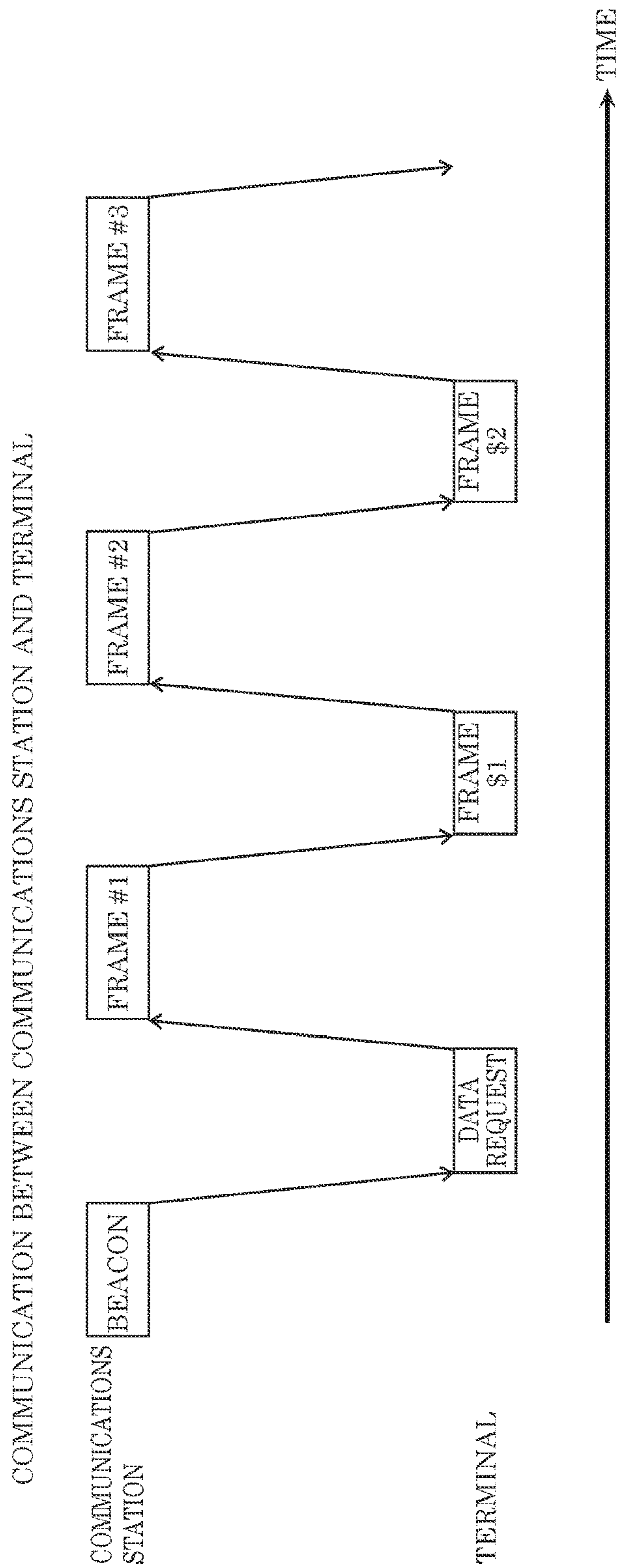
FIG. 8 illustrates one example of a communication state between a communications station and a terminal.

FIG. 8 illustrates one example of a communication state between a communications station and a terminal. Frame #1, frame #2, and frame #3 are frames transmitted by the communications station, and each frame is, for example, configured as illustrated in FIG. 5. Additionally, the communications station transmits the frame "beacon", and the terminal detects the network configured by communications station by detecting "beacon".

Frame $1 and frame $2 are frames transmitted by the terminal, and each frame is, for example, configured as illustrated in FIG. 7. Additionally, the terminal transmits the frame "data request".

As illustrated in FIG. 8, for example, when the communications station communicates with a specific terminal, the communications station regularly transmits the frame "beacon".

The terminal detects the frame "beacon" transmitted by the communications station, and transmits the frame "data request" to the communications station.

The communications station receives the frame "data request" transmitted by terminal, and transmits "frame #1" including a data symbol. Note that, as described above, "frame #1" is, for example, configured as a symbol such as the one illustrated in FIG. 5.

The terminal receives "frame #1" transmitted by the communications station. Then, the terminal extracts "precoding settings training symbol" included in "frame #1", for example, performs estimation (channel estimation) of a propagation environment, and transmits the channel estimation value (CSI) by using "notification information symbol" in "frame $1".

The communications station receives "frame $1" transmitted by the terminal. Then, using "notification information symbol" included in "frame $1", the terminal calculates parameters (a, b, θ) for performing the precoding described in "(precoding method (1A))", "(precoding method (1A-1))", "(precoding method (1A-2))", "(precoding method (1B))", "(precoding method (1B-1))", "(precoding method (1B-2))". Then, upon transmission of "frame #2", the communications station applies precoding based on the calculated parameters to the data symbol, and transmits a modulated signal. Moreover, in "frame #2", the communications station transmits "precoding settings training symbol".

The terminal receives "frame #2" transmitted by the communications station. Then, the terminal extracts "precoding settings training symbol" included in "frame #2", for example, performs estimation (channel estimation) of a propagation environment, and transmits the channel estimation value (CSI) by using "notification information symbol" in "frame $2".

The terminal receives "frame #2" transmitted by the communications station. Then, the terminal extracts "precoding settings training symbol" included in "frame #2", for example, performs estimation (channel estimation) of a propagation environment, and transmits the channel estimation value (CSI) by using "notification information symbol" in "frame $2".

The communications station receives "frame $2" transmitted by the terminal. Then, using "notification information symbol" included in "frame $2", the terminal calculates parameters (a, b, θ) for performing the precoding described in "(precoding method (1A))", "(precoding method (1A-1))", "(precoding method (1A-2))", "(precoding method (1B))", "(precoding method (1B-1))", "(precoding method (1B-2))". Then, upon transmission of "frame #3", the communications station applies precoding based on the calculated parameters to the data symbol, and transmits a modulated signal. Moreover, in "frame #3", the communications station transmits "precoding settings training symbol".

In a communication state such as the one illustrated in FIG. 8 and described above, the terminal receives "precoding settings training symbol" included in "frame #(N−1)" transmitted by the communications station, and the terminal generates and transmits feedback information from this "precoding settings training symbol", and the communications station performs precoding of "data symbol" of "frame #N" based on this feedback information. Note that in the example illustrated in FIG. 8, N is an integer greater than or equal to 2.

When the precoding method is set up as described above, the communications station does not hold feedback information from the terminal for setting up a preferred precoding method in "frame #1" transmitted by the communications station. In light of this, next, a transmission method such as the one illustrated in FIG. 9 will be considered.

(Transmission Frame Configuration of Communications Station (2))

Figure 9:
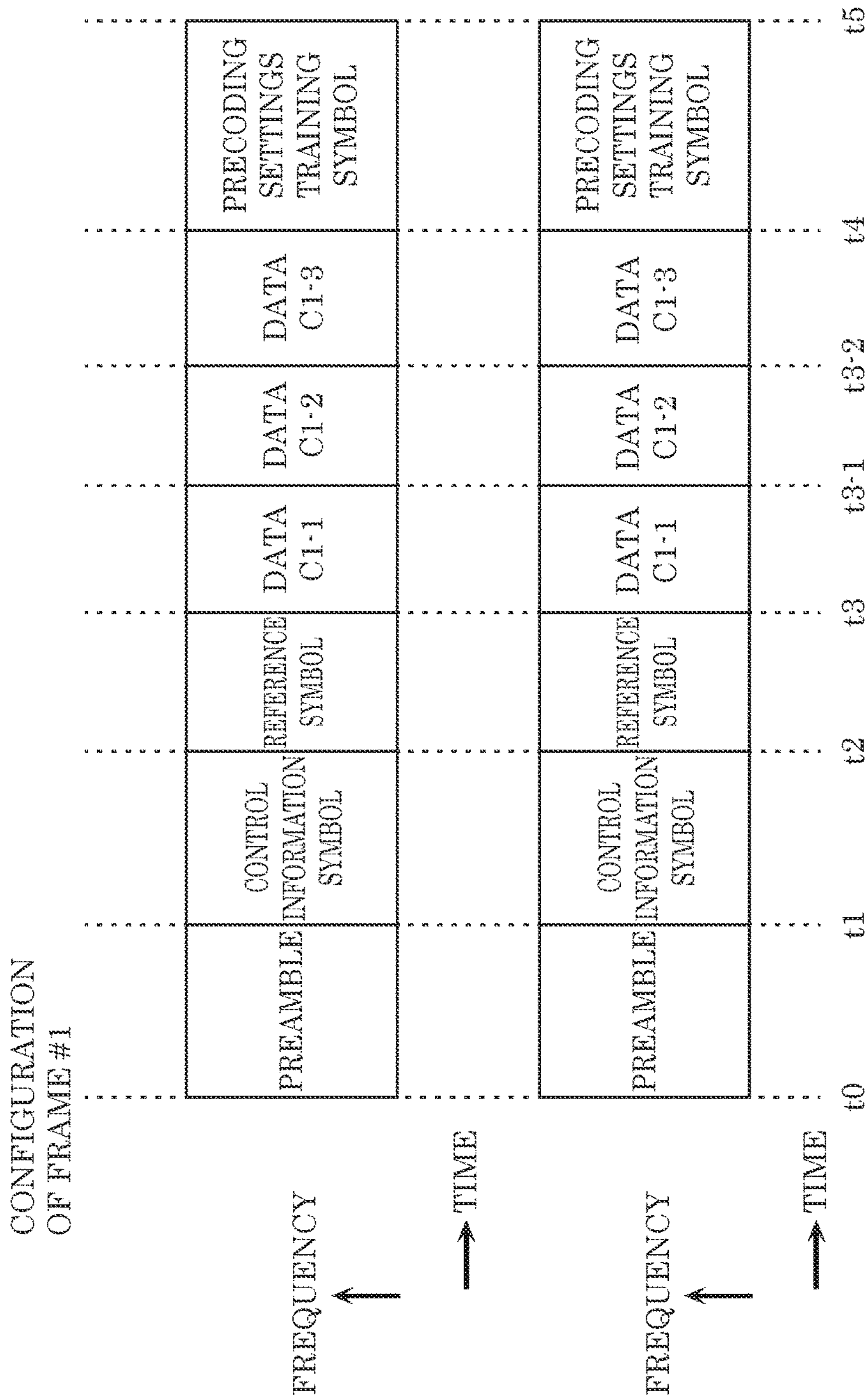
FIG. 9 illustrates another example of a frame configuration of a modulated signal of a communications station.

FIG. 9 illustrates one example of a configuration of "frame #1" transmitted by the communications station illustrated in FIG. 8. Note that description of operations in FIG. 9 that overlap with FIG. 5 will be omitted.

FIG. 9 differs from FIG. 5 in regard to the configuration of the data symbol (from time t3 to t4). In FIG. 9, when "data C1" is present, a data group that is identical to "data C1", "data C1-1", "data C1-2", and "data C1-3" are generated (note that, in FIG. 9, three identical data groups are illustrated, but this example is not limiting).

The precoding method (precoding method and power change value) used to transmit "data C1-1" is precoding method #1, the precoding method used to transmit "data C1-2" is precoding method #2, and the precoding method used to transmit "data C1-3" is precoding method #3.

Here, precoding method #1 and precoding method #2 are different from one another, precoding method #1 and precoding method #3 are different from one another, and precoding method #2 and precoding method #3 are different from one another.

In other words, the precoding method used to transmit "data C1-*j*" is precoding method #i, and the precoding method used to transmit "data C1-*j*" is precoding method #j.

Here, when i≠ j holds true, precoding method #i and precoding method #j are different from one another.

This makes it possible to, for example, in the example illustrated in FIG. 8, achieve an advantageous effect of an increase in the possibility of the terminal being able to achieve a correct result with any one of "data C1-1", "data C1-2", or "data C1-3".

In "(precoding method (1A))", "(precoding method (1A-1))", "(precoding method (1A-2))", "(precoding method (1B))", "(precoding method (1B-1))", "(precoding method (1B-2))" described above, the precoding matrix was described as.

[MATH. 35]

$$\begin{pmatrix} q_{11} & q_{12} \\ q_{21} & q_{22} \end{pmatrix} = \begin{pmatrix} \cos\theta & \sin\theta \\ \sin\theta & -\cos\theta \end{pmatrix} \tag{35}$$

or

[MATH. 36]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \cos\theta & \sin\theta \\ \sin\theta & -\cos\theta \end{pmatrix} = \begin{pmatrix} a\times\cos\theta & a\times\sin\theta \\ b\times\sin\theta & -b\times\cos\theta \end{pmatrix}, \tag{36}$$

but next a different case will be described.

(Precoding Method (2A))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 37]

$$\begin{pmatrix} r_1(t) \\ r_2(t) \end{pmatrix} = \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix} \tag{37}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 38]

$$\begin{pmatrix} z_1(t) \\ z_2(t) \end{pmatrix} = \begin{pmatrix} a & 0 \\ 0 & b \end{pmatrix}\begin{pmatrix} \beta\times\cos\theta & \beta\times\sin\theta \\ \beta\times\sin\theta & -\beta\times\cos\theta \end{pmatrix}\begin{pmatrix} s_1(t) \\ s_2(t) \end{pmatrix} \tag{38}$$

(*a*, *b*, *β are complex* numbers (may be actual numbers))

In this case, the following equation holds true.

[MATH. 39]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} a & 0 \\ 0 & b \end{pmatrix} \begin{pmatrix} \beta\times\cos\theta & \beta\times\sin\theta \\ \beta\times\sin\theta & -\beta\times\cos\theta \end{pmatrix}\begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\beta\times\cos\delta\times\cos\theta - h_{22}(t)\times b\times\beta\times\sin\delta\times\sin\theta & h_{11}(t)\times a\times\beta\times\cos\delta\times\sin\theta + h_{22}(t)\times b\times\beta\times\sin\delta\times\cos\theta \\ h_{11}(t)\times a\times\beta\times\sin\delta\times\cos\theta + h_{22}(t)\times b\times\beta\times\cos\delta\times\sin\theta & h_{11}(t)\times a\times\beta\times\sin\delta\times\sin\theta - h_{22}(t)\times b\times\beta\times\cos\delta\times\cos\theta \end{pmatrix} \begin{pmatrix} s_1(t) \\ s_2(t) \end{pmatrix} + \begin{pmatrix} n_1(t) \\ n_2(t) \end{pmatrix} \end{aligned} \tag{39}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 40]

$$h_{11}(t)\times a\times\beta\times\cos\delta\times\sin\theta+h_{22}(t)\times b\times\beta\times\sin\delta\times\cos\theta=0 \tag{40-1}$$

$$h_{11}(t)\times a\times\beta\times\sin\delta\times\cos\theta+h_{22}(t)\times b\times\beta\times\cos\delta\times\sin\theta=0 \tag{40-2}$$

Accordingly, it is sufficient if the following holds true.

[MATH. 41]

$$b = \frac{h_{11}(t)}{h_{22}(t)}\times a \tag{41-1}$$

and $$\theta = -\delta + n\pi \text{ radians} \tag{41-2}$$

(*n* is an integer)

Accordingly, the communications station calculates θ, a, and b from the feedback information from the terminal so that the following is true.

[MATH. 42]

$$b = \frac{h_{11}(t)}{h_{22}(t)}\times a \tag{42-1}$$

and $$\theta = -\delta + n\pi \text{ radians} \tag{42-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 43]

$$|a|^2+|b|^2=|u|^2 \tag{43}$$

($|u|^2$ is a parameter based on average transmitted power)

(Precoding Method (2A-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 44]

$$\begin{pmatrix} q_{11} & q_{12} \\ q_{21} & q_{22} \end{pmatrix} \tag{44}$$

Accordingly, weighting synthesizer 306A calculates the following and outputs weighted signal 307A ($z_1(t)$).

[MATH. 45]

$$z_1(t)=q_{11}\times s_1(t)+q_{12}\times s_2(t) \tag{45}$$

Weighting synthesizer 306B calculates the following and outputs weighted signal 307B ($z_2(t)$).

[MATH. 46]

$$z_2(t)=q_{21}\times s_1(t)+q_{22}\times s_2(t) \tag{46}$$

Precoding method determiner 316 performs the calculations described in "(precoding method (2A))" based on feedback information from a terminal, and determines the precoding matrix.

[MATH. 47]

$$\begin{aligned}\begin{pmatrix} q_{11} & q_{12} \\ q_{21} & q_{22} \end{pmatrix} &= \begin{pmatrix} a & 0 \\ 0 & b \end{pmatrix}\begin{pmatrix} \beta\times\cos\theta & \beta\times\sin\theta \\ \beta\times\sin\theta & -\beta\times\cos\theta \end{pmatrix} \\ &= \begin{pmatrix} a\times\beta\times\cos\theta & a\times\beta\times\sin\theta \\ b\times\beta\times\sin\theta & -b\times\beta\times\cos\theta \end{pmatrix}\end{aligned} \tag{47}$$

In other words, the precoding matrix of the above equation is calculated. Here, based on feedback information from a terminal, precoding method determiner 316 uses

[MATH. 48]

$$b=\frac{h_{11}(t)}{h_{22}(t)}\times a \tag{48-1}$$

and $$\theta=-\delta+n\pi \text{ radians} \tag{48-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (2A-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 49]

$$\begin{pmatrix} q_{11} & q_{12} \\ q_{21} & q_{22} \end{pmatrix} \tag{49}$$

Accordingly, weighting synthesizer 306A calculates the following and outputs weighted signal 307A ($y_1(t)$).

[MATH. 50]

$$y_1(t)=q_{11}\times s_1(t)+q_{12}\times s_2(t) \tag{50}$$

Weighting synthesizer 306B calculates the following and outputs weighted signal 307B ($y_2(t)$).

[MATH. 51]

$$y_2(t)=q_{21}\times s_1(t)+q_{22}\times s_2(t) \tag{51}$$

Precoding method determiner 316 performs the calculations described in "(precoding method (2A))" based on feedback information from a terminal, and determines the precoding matrix.

[MATH. 52]

$$\begin{pmatrix} q_{11} & q_{12} \\ q_{21} & q_{22} \end{pmatrix} = \begin{pmatrix} \beta\times\cos\theta & \beta\times\sin\theta \\ \beta\times\sin\theta & -\beta\times\cos\theta \end{pmatrix} \tag{52}$$

In other words, the precoding matrix of the above equation and values for a and b are calculated. Here, based on feedback information from a terminal, precoding method determiner 316 uses

[MATH. 53]

$$b = \frac{h_{11}(t)}{h_{22}(t)}\times a \tag{53-1}$$

and $$\theta = -\delta + n\pi \text{ radians} \tag{53-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (2B))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 54]

$$\begin{pmatrix} r_1(t) \\ r_2(t) \end{pmatrix} = \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix} \tag{54}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 55]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \beta\times\cos\theta & \beta\times\sin\theta \\ \beta\times\sin\theta & -\beta\times\cos\theta \end{pmatrix}\begin{pmatrix} s_1(t) \\ s_2(t) \end{pmatrix} \tag{55}$$

($a$, $b$, $\beta$ are complex numbers (may be actual numbers))

In this case, the following equation holds true.

[MATH. 56]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} a & 0 \\ 0 & b \end{pmatrix} \\ &\quad \begin{pmatrix} \beta\times\cos\theta & \beta\times\sin\theta \\ \beta\times\sin\theta & -\beta\times\cos\theta \end{pmatrix}\begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\beta\times\cos\delta\times\cos\theta - & h_{11}(t)\times a\times\beta\times\cos\delta\times\sin\theta + \\ h_{22}(t)\times b\times\beta\times\sin\delta\times\sin\theta & h_{22}(t)\times b\times\beta\times\sin\delta\times\cos\theta \\ h_{11}(t)\times a\times\beta\times\sin\delta\times\cos\theta + & h_{11}(t)\times a\times\beta\times\sin\delta\times\sin\theta - \\ h_{22}(t)\times b\times\beta\times\cos\delta\times\sin\theta & h_{22}(t)\times b\times\beta\times\cos\delta\times\cos\theta \end{pmatrix} \\ &\quad \begin{pmatrix} s_1(t) \\ s_2(t) \end{pmatrix} + \begin{pmatrix} n_1(t) \\ n_2(t) \end{pmatrix} \end{aligned} \tag{56}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 57]

$$h_{11}(t)\times a\times\beta\times\cos\delta\times\cos\theta - h_{22}(t)\times b\times\beta\times\sin\delta\times\sin\theta = 0 \tag{57-1}$$

$$h_{11}(t)\times a\times\beta\times\sin\delta\times\sin\theta - h_{22}(t)\times b\times\beta\times\cos\delta\times\cos\theta = 0 \tag{57-2}$$

Accordingly, it is sufficient if the following holds true.

[MATH. 58]

$$b = \frac{h_{11}(t)}{h_{22}(t)}\times a \tag{58-1}$$

and $$\theta = -\delta + \frac{\pi}{2} + n\pi \text{ radians} \tag{58-2}$$

($n$ is an integer)

Accordingly, the communications station calculates θ, a, and b from the feedback information from the terminal so that the following is true.

[MATH. 59]

$$b = \frac{h_{11}(t)}{h_{22}(t)} \times a \tag{59-1}$$

and $$\theta = -\delta + \frac{\pi}{2} + n\pi \text{ radians} \tag{59-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 60]

$$|a|^2+|b|^2=|u|^2 \tag{60}$$

(|u..$^2$ is a parameter based on average transmitted power)

(Precoding Method (2B-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 61]

$$\begin{pmatrix} q_{11} & q_{12} \\ q_{21} & q_{22} \end{pmatrix} \tag{61}$$

Accordingly, weighting synthesizer 306A calculates the following and outputs weighted signal 307A ($z_1(t)$).

[MATH. 62]

$$z_1(t)=q_{11}\times s_1(t)+q_{12}\times s_2(t) \tag{62}$$

Weighting synthesizer 306B calculates the following and outputs weighted signal 307B ($z_2(t)$).

[MATH. 63]

$$z_2(t)=q_{21}\times s_1(t)+q_{22}\times s_2(t) \tag{63}$$

Precoding method determiner 316 performs the calculations described in "(precoding method (2B))" based on feedback information from a terminal, and determines the precoding matrix.

[MATH. 64]

$$\begin{aligned}\begin{pmatrix} q_{11} & q_{12} \\ q_{21} & q_{22} \end{pmatrix} &= \begin{pmatrix} a & 0 \\ 0 & b \end{pmatrix}\begin{pmatrix} \beta\times\cos\theta & \beta\times\sin\theta \\ \beta\times\sin\theta & -\beta\times\cos\theta \end{pmatrix} \\ &= \begin{pmatrix} a\times\beta\times\cos\theta & a\times\beta\times\sin\theta \\ b\times\beta\times\sin\theta & -b\times\beta\times\cos\theta \end{pmatrix}\end{aligned} \tag{64}$$

In other words, the precoding matrix of the above equation is calculated. Here, based on feedback information from a terminal, precoding method determiner 316 uses

[MATH. 65]

$$b = \frac{h_{11}(t)}{h_{22}(t)} \times a \tag{65-1}$$

and $$\theta = -\delta + \frac{\pi}{2} + n\pi \text{ radians} \tag{65-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (2B-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 66]

$$\begin{pmatrix} q_{11} & q_{12} \\ q_{21} & q_{22} \end{pmatrix} \tag{66}$$

Accordingly, weighting synthesizer 306A calculates the following and outputs weighted signal 307A ($y_1(t)$).

[MATH. 67]

$$y_1(t)=q_{11}\times s_1(t)+q_{12}\times s_2(t) \tag{67}$$

Weighting synthesizer 306B calculates the following and outputs weighted signal 307B ($y_2(t)$).

[MATH. 68]

$$y_2(t)=q_{21}\times s_1(t)+q_{22}\times s_2(t) \tag{68}$$

Precoding method determiner 316 performs the calculations described in "(precoding method (2B))" based on feedback information from a terminal, and determines the precoding matrix.

[MATH. 69]

$$\begin{pmatrix} q_{11} & q_{12} \\ q_{21} & q_{22} \end{pmatrix} = \begin{pmatrix} \beta\times\cos\theta & \beta\times\sin\theta \\ \beta\times\sin\theta & -\beta\times\cos\theta \end{pmatrix} \tag{69}$$

In other words, the precoding matrix of the above equation and values for a and b are calculated. Here, based on feedback information from a terminal, precoding method determiner 316 uses

[MATH. 70]

$$b = \frac{h_{11}(t)}{h_{22}(t)}\times a \tag{70-1}$$

and $$\theta = -\delta + \frac{\pi}{2} + n\pi \text{ radians} \tag{70-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (3A))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 71]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix}\end{aligned} \tag{71}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 72]

$$\begin{pmatrix} z_1(t) \\ z_2(t) \end{pmatrix} = \begin{pmatrix} a & 0 \\ 0 & b \end{pmatrix}\begin{pmatrix} \cos\theta & -\sin\theta \\ \sin\theta & \cos\theta \end{pmatrix}\begin{pmatrix} s_1(t) \\ s_2(t) \end{pmatrix} \tag{72}$$

($a$, $b$ are complex numbers (may be actual numbers))

In this case, the following equation holds true.

[MATH. 73]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} a & 0 \\ 0 & b \end{pmatrix} \\ &\quad \begin{pmatrix} \cos\theta & -\sin\theta \\ \sin\theta & \cos\theta \end{pmatrix}\begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\cos\delta\times\cos\theta - h_{22}(t)\times b\times\sin\delta\times\sin\theta & -h_{11}(t)\times a\times\cos\delta\times\sin\theta - h_{22}(t)\times b\times\sin\delta\times\cos\theta \\ h_{11}(t)\times a\times\sin\delta\times\cos\theta + h_{22}(t)\times b\times\cos\delta\times\sin\theta & -h_{11}(t)\times a\times\sin\delta\times\sin\theta + h_{22}(t)\times b\times\cos\delta\times\cos\theta \end{pmatrix} \\ &\quad \begin{pmatrix} s_1(t) \\ s_2(t) \end{pmatrix} + \begin{pmatrix} n_1(t) \\ n_2(t) \end{pmatrix}\end{aligned} \tag{73}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 74]

$$-h_{11}(t)\times a\times\cos\delta\times\sin\theta - h_{22}(t)\times h\times\sin\delta\times\cos\theta = 0 \tag{74-1}$$

$$h_{11}(t)\times a\times\sin\delta\times\cos\theta + h_{22}(t)\times b\times\cos\delta\times\sin\theta = 0 \tag{74-2}$$

Accordingly, it is sufficient if the following holds true.

[MATH. 75]

$$b = \frac{h_{11}(t)}{h_{22}(t)}\times a \tag{75-1}$$

and $$\theta = -\delta + n\pi \text{ radians} \tag{75-2}$$

($n$ is an integer)

Accordingly, the communications station calculates θ, a, and b from the feedback information from the terminal so that the following is true.

[MATH. 76]

$$b = \frac{h_{11}(t)}{h_{22}(t)}\times a \tag{76-1}$$

and $$\theta = -\delta + n\pi \text{ radians} \tag{76-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 77]

$$|a|^2+|b|^2=|u|^2 \tag{77}$$

($|u|^2$ a parameter based on average transmitted power)

(Precoding Method (3A-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 78]

$$\begin{pmatrix} q_{11} & q_{12} \\ q_{21} & q_{22} \end{pmatrix} \tag{78}$$

Accordingly, weighting synthesizer 306A calculates the following and outputs weighted signal 307A ($z_1(t)$).

[MATH. 79]

$$z_1(t)=q_{11}\times s_1(t)+q_{12}\times s_2(t) \tag{79}$$

Weighting synthesizer 306B calculates the following and outputs weighted signal 307B ($z_2(t)$.

[MATH. 80]

$$z_2(t)=q_{21}\times s_1(t)+q_{22}\times s_2(t) \tag{80}$$

Precoding method determiner 316 performs the calculations described in "(precoding method (3A))" based on feedback information from a terminal, and determines the precoding matrix.

[MATH. 81]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \cos\theta & -\sin\theta \\ \sin\theta & \cos\theta \end{pmatrix} = \begin{pmatrix} a\times\cos\theta & -a\times\sin\theta \\ b\times\sin\theta & b\times\cos\theta \end{pmatrix} \tag{81}$$

In other words, the precoding matrix of the above equation is calculated. Here, based on feedback information from a terminal, precoding method determiner 316 uses

[MATH. 82]

$$b=\frac{h_{11}(t)}{h_{22}(t)}\times a \tag{82-1}$$

and $$\theta=-\delta+n\pi \text{ radians} \tag{82-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (3A-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 83]

$$\begin{pmatrix} q_{11} & q_{12} \\ q_{21} & q_{22} \end{pmatrix} \tag{83}$$

Accordingly, weighting synthesizer 306A calculates the following and outputs weighted signal 307A ($y_1(t)$).

[MATH. 84]

$$y_1(t)=q_{11}\times s_1(t)+q_{12}\times s_2(t) \tag{84}$$

Weighting synthesizer 306B calculates the following and outputs weighted signal 307B ($y_2(t)$).

[MATH. 85]

$$y_2(t)=q_{21}\times s_1(t)+q_{22}\times s_2(t) \tag{85}$$

Precoding method determiner 316 performs the calculations described in "(precoding method (3A))" based on feedback information from a terminal, and determines the precoding matrix.

[MATH. 86]

$$\begin{pmatrix} q_{11} & q_{12} \\ q_{21} & q_{22} \end{pmatrix} = \begin{pmatrix} \cos\theta & -\sin\theta \\ \sin\theta & \cos\theta \end{pmatrix} \quad (86)$$

In other words, the precoding matrix of the above equation and values for a and b are calculated. Here, based on feedback information from a terminal, precoding method determiner 316 uses

[MATH. 87]

$$b = \frac{h_{11}(t)}{h_{22}(t)} \times a \quad (87\text{-}1)$$

and $$\theta = -\delta + n\pi \text{ radians} \quad (87\text{-}2)$$

($n$ is an integer)

to determine a, b, and θ, to determine the precolling matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (3B))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 88]

$$\begin{pmatrix} r_1(t) \\ r_2(t) \end{pmatrix} = \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix} \quad (88)$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 89]

$$\begin{pmatrix} z_1(t) \\ z_2(t) \end{pmatrix} = \begin{pmatrix} a & 0 \\ 0 & b \end{pmatrix}\begin{pmatrix} \cos\theta & -\sin\theta \\ \sin\theta & \cos\theta \end{pmatrix}\begin{pmatrix} s_1(t) \\ s_2(t) \end{pmatrix} \quad (89)$$

($a$, $b$ are complex numbers (may be actual numbers))

In this case, the following equation holds true.

[MATH. 90]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} a & 0 \\ 0 & b \end{pmatrix} \begin{pmatrix} \cos\theta & -\sin\theta \\ \sin\theta & \cos\theta \end{pmatrix}\begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\cos\delta\times\cos\theta - h_{22}(t)\times b\times\sin\delta\times\sin\theta & -h_{11}(t)\times a\times\cos\delta\times\sin\theta - h_{22}(t)\times b\times\sin\delta\times\cos\theta \\ h_{11}(t)\times a\times\sin\delta\times\cos\theta + h_{22}(t)\times b\times\cos\delta\times\sin\theta & -h_{11}(t)\times a\times\sin\delta\times\sin\theta + h_{22}(t)\times b\times\cos\delta\times\cos\theta \end{pmatrix} \begin{pmatrix} s_1(t) \\ s_2(t) \end{pmatrix} + \begin{pmatrix} n_1(t) \\ n_2(t) \end{pmatrix} \end{aligned} \quad (90)$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 91]

$$h_{11}(t)\times a\times\cos\delta\times\cos\theta - h_{22}(t)\times b\times\sin\delta\times\sin\theta = 0 \quad (91\text{-}1)$$

$$-h_{11}(t)\times a\times\sin\delta\times\sin\theta + h_{22}(t)\times b\times\cos\delta\times\cos\theta = 0 \quad (91\text{-}2)$$

Accordingly, it is sufficient if the following holds true.

[MATH. 92]

$$b = \frac{h_{11}(t)}{h_{22}(t)} \times a \text{ and} \quad (92\text{-}1)$$

$$\theta = -\delta + \frac{\pi}{2} + n\pi \text{ radians} \quad (92\text{-}2)$$

($n$ is an integer)

Accordingly, the communications station calculates θ, a, and b from the feedback information from the terminal so that the following is true.

[MATH. 93]

$$b = \frac{h_{11}(t)}{h_{22}(t)} \times a \text{ and} \quad (93\text{-}1)$$

-continued $$\theta = -\delta + \frac{\pi}{2} + n\pi \text{ radians} \tag{93-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 94]

$$|a|^2|b|^2=|u|^2 \tag{94}$$

($|u|^2$ is a parameter based on average transmitted power)

(Precoding Method (3B-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 95]

$$\begin{pmatrix} q_{11} & q_{12} \\ q_{21} & q_{22} \end{pmatrix} \tag{95}$$

Accordingly, weighting synthesizer 306A calculates the following and outputs weighted signal 307A ($z_1(t)$).

[MATH. 96]

$$z_1(t)=q_{11}\times s_1(t)+q_{12}\times s_2(t) \tag{96}$$

Weighting synthesizer 306B calculates the following and outputs weighted signal 307B ($z_2(t)$).

[MATH. 97]

$$z_2(t)=q_{21}\times s_1(t)+q_{22}\times s_2(t) \tag{97}$$

Precoding method determiner 316 performs the calculations described in "(precoding method (3B))" based on feedback information from a terminal, and determines the precoding matrix.

[MATH. 98]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \cos\theta & -\sin\theta \\ \sin\theta & \cos\theta \end{pmatrix} = \begin{pmatrix} a\times\cos\theta & -a\times\sin\theta \\ b\times\sin\theta & b\times\cos\theta \end{pmatrix} \tag{98}$$

In other words, the precoding matrix of the above equation is calculated. Here, based on feedback information from a terminal, precoding method determiner 316 uses

[MATH. 99]

$$b = \frac{h_{11}(t)}{h_{22}(t)}\times a \text{ and} \tag{99-1}$$

$$\theta = -\delta + \frac{\pi}{2} + n\pi \text{ radians} \tag{99-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (3B-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 100]

$$\begin{pmatrix} q_{11} & q_{12} \\ q_{21} & q_{22} \end{pmatrix} \tag{100}$$

Accordingly, weighting synthesizer 306A calculates the following and outputs weighted signal 307A ($y_1(t)$).

[MATH. 101]

$$y_1(t)=q_{11}\times s_1(t)+q_{12}\times s_2(t) \tag{101}$$

Weighting synthesizer 306B calculates the following and outputs weighted signal 307B ($y_2(t)$).

[MATH. 102]

$$y_2(t)=q_{21}\times s_1(t)+q_{22}\times s_2(t) \tag{102}$$

Precoding method determiner 316 performs the calculations described in "(precoding method (3B))" based on feedback information from a terminal, and determines the precoding matrix.

[MATH. 103]

$$\begin{pmatrix} q_{11} & q_{12} \\ q_{21} & q_{22} \end{pmatrix} = \begin{pmatrix} \cos\theta & -\sin\theta \\ \sin\theta & \cos\theta \end{pmatrix} \tag{103}$$

In other words, the precoding matrix of the above equation and values for a and b are calculated. Here, based on feedback information from a terminal, precoding method determiner 316 uses

[MATH. 104]

$$b = \frac{h_{11}(t)}{h_{22}(t)} \times a \text{ and} \tag{104-1}$$

$$\theta = -\delta + \frac{\pi}{2} + n\pi \text{ radians} \tag{104-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (4A))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 105]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \end{aligned} \tag{105}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 106]

$$\begin{pmatrix} z_1(t) \\ z_2(t) \end{pmatrix} = \begin{pmatrix} a & 0 \\ 0 & b \end{pmatrix} \begin{pmatrix} \beta\times\cos\theta & -\beta\times\sin\theta \\ \beta\times\sin\theta & \beta\times\cos\theta \end{pmatrix} \begin{pmatrix} S_1(t) \\ S_2(t) \end{pmatrix} \tag{106}$$

($a$, $b$, $\beta$ are complex numbers(may be actual numbers))

In this case, the following equation holds true.

[MATH. 107]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \\ &\quad \begin{pmatrix} \beta\times\cos\theta & -\beta\times\sin\theta \\ \beta\times\sin\theta & \beta\times\cos\theta \end{pmatrix} \begin{pmatrix} S_1(t) \\ S_2(t) \end{pmatrix} + \begin{pmatrix} n_1(t) \\ n_2(t) \end{pmatrix} \\ &= \begin{pmatrix} \begin{matrix} h_{11}(t)\times a\times\beta\times\cos\delta\times\cos\theta - \\ h_{22}(t)\times b\times\beta\times\sin\delta\times\sin\theta \end{matrix} & \begin{matrix} -h_{11}(t)\times a\times\beta\times\cos\delta\times \\ \sin\theta - h_{22}(t)\times b\times\beta\times \\ \sin\delta\times\cos\theta \end{matrix} \\ \begin{matrix} h_{11}(t)\times a\times\beta\times\sin\delta\times\cos\theta + \\ h_{22}(t)\times b\times\beta\times\cos\delta\times\sin\theta \end{matrix} & \begin{matrix} -h_{11}(t)\times a\times\beta\times\sin\delta\times \\ \sin\theta + h_{22}(t)\times b\times \\ \beta\times\cos\delta\times\cos\theta \end{matrix} \end{pmatrix} \\ &\quad \begin{pmatrix} S_1(t) \\ S_2(t) \end{pmatrix} + \begin{pmatrix} n_1(t) \\ n_2(t) \end{pmatrix} \end{aligned} \tag{107}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 108]

$$-h_{11}(t)\times a\times\beta\times\cos\delta\times\sin\theta - h_{22}(t)\times b\times\beta\times\sin\delta\times\cos\theta = 0 \tag{108-1}$$

$$h_{11}(t)\times a\times\beta\times\sin\delta\times\cos\theta + h_{22}(t)\times b\times\beta\times\cos\delta\times\sin\theta = 0 \tag{108-2}$$

Accordingly, it is sufficient if the following holds true.

[MATH. 109]

$$b = \frac{h_{11}(t)}{h_{22}(t)} \times a \text{ and} \tag{109-1}$$

$$\theta = -\delta + n\pi \text{ radians} \tag{109-2}$$

($n$ is an integer)

Accordingly, the communications station calculates θ, a, and b from the feedback information from the terminal so that the following is true.

[MATH. 110]

$$b = \frac{h_{11}(t)}{h_{22}(t)} \times a \text{ and} \tag{110-1}$$

$$\theta = -\delta + n\pi \text{ radians} \tag{110-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 111]

$$|a|^2+|b|^2=|u|^2 \tag{111}$$

($|u|^2$ is a parameter based on average transmitted power)

(Precoding Method (4A-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 112]

$$\begin{pmatrix} q_{11} & q_{12} \\ q_{21} & q_{22} \end{pmatrix} \tag{112}$$

Accordingly, weighting synthesizer 306A calculates the following and outputs weighted signal 307A ($z_1(t)$).

[MATH. 113]

$$z_1(t)=q_{11}\times s_1(t)+q_{12}\times s_2(t) \tag{113}$$

Weighting synthesizer 306B calculates the following and outputs weighted signal 307B ($z_2(t)$).

[MATH. 114]

$$z_2(t)=q_{21}\times s_1(t)+q_{22}\times s_2(t) \tag{114}$$

Precoding method determiner 316 performs the calculations described in "(precoding method (4A))" based on feedback information from a terminal, and determines the precoding matrix.

[MATH. 115]

$$\begin{aligned}\begin{pmatrix} q_{11} & q_{12} \\ q_{21} & q_{22} \end{pmatrix} &= \begin{pmatrix} a & 0 \\ 0 & b \end{pmatrix}\begin{pmatrix} \beta\times\cos\theta & -\beta\times\sin\theta \\ \beta\times\sin\theta & \beta\times\cos\theta \end{pmatrix} \\ &= \begin{pmatrix} a\times\beta\times\cos\theta & -a\times\beta\times\sin\theta \\ b\times\beta\times\sin\theta & b\times\beta\times\cos\theta \end{pmatrix}\end{aligned} \tag{115}$$

In other words, the precoding matrix of the above equation is calculated. Here, based on feedback information from a terminal, precoding method determiner 316 uses

[MATH. 116]

$$b=\frac{h_{11}(t)}{h_{22}(t)}\times a \text{ and} \tag{116-1}$$

$$\theta=-\delta+n\pi \text{ radians} \tag{116-2}$$
($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (4A-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 117]

$$\begin{pmatrix} q_{11} & q_{12} \\ q_{21} & q_{22} \end{pmatrix} \tag{117}$$

Accordingly, weighting synthesizer 306A calculates the following and outputs weighted signal 307A ($y_1(t)$).

[MATH. 118]

$$y_1(t)=q_{11}\times s_1(t)+q_{12}\times s_2(t) \tag{118}$$

Weighting synthesizer 306B calculates the following and outputs weighted signal 307B ($y_2(t)$).

[MATH. 119]

$$y_2(t)=q_{21}\times s_1(t)+q_{22}\times s_2(t) \tag{119}$$

Precoding method determiner 316 performs the calculations described in "(precoding method (4A))" based on feedback information from a terminal, and determines the precoding matrix.

[MATH. 120]

$$\begin{pmatrix} q_{11} & q_{12} \\ q_{21} & q_{22} \end{pmatrix} = \begin{pmatrix} \beta\times\cos\theta & -\beta\times\sin\theta \\ \beta\times\sin\theta & \beta\times\cos\theta \end{pmatrix} \tag{120}$$

In other words, the precoding matrix of the above equation and values for a and b are calculated. Here, based on feedback information from a terminal, precoding method determiner 316 uses

[MATH. 121]

$$b = \frac{h_{11}(t)}{h_{22}(t)} \times a \text{ and} \tag{121-1}$$

$$\theta = -\delta + n\pi \text{ radians} \tag{121-2}$$

$$(n \text{ is an integer})$$

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (4B))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 122]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \tag{122}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 123]

$$\begin{pmatrix} z_1(t) \\ z_2(t) \end{pmatrix} = \begin{pmatrix} a & 0 \\ 0 & b \end{pmatrix} \begin{pmatrix} \beta\times\cos\theta & -\beta\times\sin\theta \\ \beta\times\sin\theta & \beta\times\cos\theta \end{pmatrix} \begin{pmatrix} S_1(t) \\ S_2(t) \end{pmatrix} \tag{123}$$

$$(a, b, \beta \text{ are complex numbers(may be actual numbers))}$$

In this case, the following equation holds true.

[MATH. 124]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \\ &\quad \begin{pmatrix} \beta\times\sin\theta & -\beta\times\cos\theta \\ \beta\times\cos\theta & \beta\times\sin\theta \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\beta\times\cos\delta\times\sin\theta - h_{22}(t)\times b\times\beta\times\sin\delta\times\cos\theta & h_{11}(t)\times a\times\beta\times\cos\delta\times\sin\theta - h_{22}(t)\times b\times\beta\times\sin\delta\times\cos\theta \\ h_{11}(t)\times a\times\beta\times\sin\delta\times\cos\theta + h_{22}(t)\times b\times\beta\times\cos\delta\times\sin\theta & h_{11}(t)\times a\times\beta\times\sin\delta\times\sin\theta + h_{22}(t)\times b\times\beta\times\cos\delta\times\cos\theta \end{pmatrix} \\ &\quad \begin{pmatrix} s_1(t) \\ s_2(t) \end{pmatrix} + \begin{pmatrix} n_1(t) \\ n_2(t) \end{pmatrix} \end{aligned} \tag{124}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 125]

$$h_{11}(t)\times a\times\beta\times\cos\delta\times\cos\theta - h_{22}(t)\times b\times\beta\times\sin\delta\times\sin\theta = 0 \tag{125-1}$$

$$-h_{11}(t)\times a\times\beta\times\sin\delta\times\sin\theta + h_{22}(t)\times b\times\beta\times\cos\delta\times\cos\theta = 0 \tag{125-2}$$

Accordingly, it is sufficient if the following holds true.

[MATH. 126]

$$b = \frac{h_{11}(t)}{h_{22}(t)} \times a \text{ and} \tag{126-1}$$

$$\theta = -\delta + \frac{\pi}{2} + n\pi \text{ radians} \tag{126-2}$$

$$(n \text{ is an integer})$$

Accordingly, the communications station calculates θ, a, and b from the feedback information from the terminal so that the following is true.

[MATH. 127]

$$b = \frac{h_{11}(t)}{h_{22}(t)} \times a \text{ and} \tag{127-1}$$

$$\theta = -\delta + \frac{\pi}{2} + n\pi \text{ radians} \tag{127-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 128]

$$|a|^2+|b|^2=|u|^2 \tag{128}$$

($|u|^2$ is a parameter based on average transmitted power)

(Precoding Method (4B-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 129]

$$\begin{pmatrix} q_{11} & q_{12} \\ q_{21} & q_{22} \end{pmatrix} \tag{129}$$

Accordingly, weighting synthesizer 306A calculates the following and outputs weighted signal 307A ($z_1(t)$).

[MATH. 130]

$$z_1(t)=q_{11}\times s_1(t)+q_{12}\times s_2(t) \tag{130}$$

Weighting synthesizer 306B calculates the following and outputs weighted signal 307B ($z_2(t)$).

[MATH. 131]

$$z_2(t)=q_{21}\times s_1(t)+q_{22}\times s_2(t) \tag{131}$$

Precoding method determiner 316 performs the calculations described in "(precoding method (4B))" based on feedback information from a terminal, and determines the precoding matrix.

[MATH. 132]

$$\begin{aligned}\begin{pmatrix} q_{11} & q_{12} \\ q_{21} & q_{22} \end{pmatrix} &= \begin{pmatrix} a & 0 \\ 0 & b \end{pmatrix}\begin{pmatrix} \beta\times\cos\theta & -\beta\times\sin\theta \\ \beta\times\sin\theta & \beta\times\cos\theta \end{pmatrix} \\ &= \begin{pmatrix} a\times\beta\times\cos\theta & -a\times\beta\times\sin\theta \\ b\times\beta\times\sin\theta & b\times\beta\times\cos\theta \end{pmatrix}\end{aligned} \tag{132}$$

In other words, the precoding matrix of the above equation is calculated. Here, based on feedback information from a terminal, precoding method determiner 316 uses

[MATH. 133]

$$b=\frac{h_{11}(t)}{h_{22}(t)}\times a \text{ and} \tag{133-1}$$

$$\theta=-\delta+\frac{\pi}{2}+n\pi \text{ radians} \tag{133-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (4B-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 134]

$$\begin{pmatrix} q_{11} & q_{12} \\ q_{21} & q_{22} \end{pmatrix} \tag{134}$$

Accordingly, weighting synthesizer 306A calculates the following and outputs weighted signal 307A ($y_1(t)$).

[MATH. 135]

$$y_1(t)=q_{11}\times s_1(t)+q_{12}\times s_2(t) \tag{135}$$

Weighting synthesizer 306B calculates the following and outputs weighted signal 307B ($y_2(t)$).

[MATH. 136]

$$y_2(t)=q_{21}\times s_1(t)+q_{22}\times s_2(t) \tag{136}$$

Precoding method determiner 316 performs the calculations described in "(precoding method (4B))" based on feedback information from a terminal, and determines the precoding matrix.

[MATH. 137]

$$\begin{pmatrix} q_{11} & q_{12} \\ q_{21} & q_{22} \end{pmatrix} = \begin{pmatrix} \beta\times\cos\theta & -\beta\times\sin\theta \\ \beta\times\sin\theta & \beta\times\cos\theta \end{pmatrix} \quad (137)$$

In other words, the precoding matrix of the above equation and values for a and b are calculated. Here, based on feedback information from a terminal, precoding method determiner 316 uses

[MATH. 138]

$$b = \frac{h_{11}(t)}{h_{22}(t)}\times a \text{ and} \quad (138\text{-}1)$$

$$\theta = -\delta + \frac{\pi}{2} + n\pi \text{ radians} \quad (138\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (5A))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 139]

$$\begin{pmatrix} r_1(t) \\ r_2(t) \end{pmatrix} = \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix} \quad (139)$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 140]

$$\begin{pmatrix} z_1(t) \\ z_2(t) \end{pmatrix} = \begin{pmatrix} a & 0 \\ 0 & b \end{pmatrix}\begin{pmatrix} \sin\theta & -\cos\theta \\ \cos\theta & \sin\theta \end{pmatrix}\begin{pmatrix} s_1(t) \\ s_2(t) \end{pmatrix} \quad (140)$$

($a$, $b$ are complex numbers (may be actual numbers))

In this case, the following equation holds true.

[MATH. 141]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} a & 0 \\ 0 & b \end{pmatrix} \\ &\quad \begin{pmatrix} \sin\theta & -\cos\theta \\ \cos\theta & \sin\theta \end{pmatrix}\begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\cos\delta\times\sin\theta - h_{22}(t)\times b\times\sin\delta\times\cos\theta & -h_{11}(t)\times a\times\cos\delta\times\cos\theta - h_{22}(t)\times b\times\sin\delta\times\sin\theta \\ h_{11}(t)\times a\times\sin\delta\times\sin\theta + h_{22}(t)\times b\times\cos\delta\times\cos\theta & -h_{11}(t)\times a\times\sin\delta\times\cos\theta + h_{22}(t)\times b\times\cos\delta\times\sin\theta \end{pmatrix} \\ &\quad \begin{pmatrix} s_1(t) \\ s_2(t) \end{pmatrix} + \begin{pmatrix} n_1(t) \\ n_2(t) \end{pmatrix} \end{aligned} \quad (141)$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 142]

$$-h_{11}(t)\times a\times\cos\delta\times\cos\theta - h_{22}(t)\times b\times\sin\delta\times\sin\theta = 0 \quad (142\text{-}1)$$

$$h_{11}(t)\times a\times\sin\delta\times\sin\theta + h_{22}(t)\times b\times\cos\delta\times\cos\theta = 0 \quad (142\text{-}2)$$

Accordingly, it is sufficient if the following holds true.

[MATH. 143]

$$b = \frac{h_{11}(t)}{h_{22}(t)}\times a \quad (143\text{-}1)$$

and $$\theta = \delta + \frac{\pi}{2} + n\pi \text{ radians} \quad (143\text{-}2)$$

($n$ is an integer)

Accordingly, the communications station calculates θ, a, and b from the feedback information from the terminal so that the following is true.

[MATH. 144]

$$b = \frac{h_{11}(t)}{h_{22}(t)}\times a \quad (144\text{-}1)$$

and

-continued $$\theta = \delta + \frac{\pi}{2} + n\pi \text{ radians} \tag{144-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 145]

$$|a|^2+|b|^2=|u|^2 \tag{145}$$

($|u|^2$ is a parameter based on average transmitted power)

(Precoding Method (5A-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 146]

$$\begin{pmatrix} q_{11} & q_{12} \\ q_{21} & q_{22} \end{pmatrix} \tag{146}$$

Accordingly, weighting synthesizer 306A calculates the following and outputs weighted signal 307A ($z_1(t)$).

[MATH. 147]

$$z_1(t)=q_{11}\times s_1(t)+q_{12}\times s_2(t) \tag{147}$$

Weighting synthesizer 306B calculates the following and outputs weighted signal 307B ($z_2(t)$).

[MATH. 148]

$$z_2(t)=q_{21}\times s_1(t)+q_{22}\times s_2(t) \tag{148}$$

Precoding method determiner 316 performs the calculations described in "(precoding method (5A))" based on feedback information from a terminal, and determines the precoding matrix.

[MATH. 149]

$$\begin{aligned} \begin{pmatrix} q_{11} & q_{12} \\ q_{21} & q_{22} \end{pmatrix} &= \begin{pmatrix} a & 0 \\ 0 & b \end{pmatrix}\begin{pmatrix} \sin\theta & -\cos\theta \\ \cos\theta & \sin\theta \end{pmatrix} \\ &= \begin{pmatrix} a\times\sin\theta & -a\times\cos\theta \\ b\times\cos\theta & b\times\sin\theta \end{pmatrix} \end{aligned} \tag{149}$$

In other words, the precoding matrix of the above equation is calculated. Here, based on feedback information from a terminal, precoding method determiner 316 uses

[MATH. 150]

$$b = \frac{h_{11}(t)}{h_{22}(t)} \times a \tag{150-1}$$

and $$\theta = \delta + \frac{\pi}{2} + n\pi \text{ radians} \tag{150-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (5A-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 151]

$$\begin{pmatrix} q_{11} & q_{12} \\ q_{21} & q_{22} \end{pmatrix} \tag{151}$$

Accordingly, weighting synthesizer 306A calculates the following and outputs weighted signal 307A ($y_1(t)$).

[MATH. 152]

$$y_1(t)=q_{11}\times s_1(t)+q_{12}\times s_2(t) \tag{152}$$

Weighting synthesizer 306B calculates the following and outputs weighted signal 307B ($y_2(t)$).

[MATH. 153]

$$y_2(t)=q_{21}\times s_1(t)+q_{22}\times s_2(t) \tag{153}$$

Precoding method determiner 316 performs the calculations described in "(precoding method (5A))" based on feedback information from a terminal, and determines the precoding matrix.

[MATH. 154]

$$\begin{pmatrix} q_{11} & q_{12} \\ q_{21} & q_{22} \end{pmatrix} = \begin{pmatrix} \sin\theta & -\cos\theta \\ \cos\theta & \sin\theta \end{pmatrix} \quad (154)$$

In other words, the precoding matrix of the above equation and values for a and b are calculated. Here, based on feedback information from a terminal, precoding method determiner 316 uses

[MATH. 155]

$$b = \frac{h_{11}(t)}{h_{22}(t)} \times a \quad (155\text{-}1)$$

and $$\theta = \delta + \frac{\pi}{2} + n\pi \text{ radians} \quad (155\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (5B))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 156]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \quad (156)$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 157]

$$\begin{pmatrix} z_1(t) \\ z_2(t) \end{pmatrix} = \begin{pmatrix} a & 0 \\ 0 & b \end{pmatrix} \begin{pmatrix} \sin\theta & -\cos\theta \\ \cos\theta & \sin\theta \end{pmatrix} \begin{pmatrix} s_1(t) \\ s_2(t) \end{pmatrix} \quad (157)$$

($a$, $b$ are complex numbers (may be actual numbers))

In this case, the following equation holds true.

[MATH. 158]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \sin\theta & -\cos\theta \\ \cos\theta & \sin\theta \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\cos\delta\times\sin\theta - h_{22}(t)\times b\times\sin\delta\times\cos\theta & -h_{11}(t)\times a\times\cos\delta\times\cos\theta - h_{22}(t)\times b\times\sin\delta\times\sin\theta \\ h_{11}(t)\times a\times\sin\delta\times\sin\theta + h_{22}(t)\times b\times\cos\delta\times\cos\theta & -h_{11}(t)\times a\times\sin\delta\times\cos\theta + h_{22}(t)\times b\times\cos\delta\times\sin\theta \end{pmatrix} \begin{pmatrix} s_1(t) \\ s_2(t) \end{pmatrix} + \begin{pmatrix} n_1(t) \\ n_2(t) \end{pmatrix} \end{aligned} \quad (158)$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 159]

$$h_{11}(t)\times a\times\cos\delta\times\sin\theta - h_{22}(t)\times b\times\sin\delta\times\cos\theta = 0 \quad (159\text{-}1)$$

$$-h_{11}(t)\times a\times\sin\delta\times\cos\theta + h_{22}(t)\times b\times\cos\delta\times\sin\theta = 0 \quad (159\text{-}2)$$

Accordingly, it is sufficient if the following holds true.

[MATH. 160]

$$b = \frac{h_{11}(t)}{h_{22}(t)} \times a \quad (160\text{-}1)$$

and $$\theta = \delta + n\pi \text{ radians} \quad (160\text{-}2)$$

($n$ is an integer)

Accordingly, the communications station calculates θ, a, and b from the feedback information from the terminal so that the following is true.

[MATH. 161]

$$b = \frac{h_{11}(t)}{h_{22}(t)} \times a \tag{161-1}$$

and $$\theta = \delta + n\pi \text{ radians} \tag{161-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 162]

$$|a|^2+|b|^2=|u|^2 \tag{162}$$

($|u|^2$ is a parameter based on average transmitted power)

(Precoding Method (5B-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 163]

$$\begin{pmatrix} q_{11} & q_{12} \\ q_{21} & q_{22} \end{pmatrix} \tag{163}$$

Accordingly, weighting synthesizer 306A calculates the following and outputs weighted signal 307A ($z_1(t)$).

[MATH. 164]

$$z_1(t)=q_{11}\times s_1(t)+q_{12}\times s_2(t) \tag{164}$$

Weighting synthesizer 306B calculates the following and outputs weighted signal 307B ($z_2(t)$).

[MATH. 165]

$$z_2(t)=q_{21}\times s_1(t)+q_{22}\times s_2(t) \tag{165}$$

Precoding method determiner 316 performs the calculations described in "(precoding method (5B))" based on feedback information from a terminal, and determines the precoding matrix.

[MATH. 166]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \sin\theta & -\cos\theta \\ \cos\theta & \sin\theta \end{pmatrix} = \begin{pmatrix} a\times\sin\theta & -a\times\cos\theta \\ b\times\cos\theta & b\times\sin\theta \end{pmatrix} \tag{166}$$

In other words, the precoding matrix of the above equation is calculated. Here, based on feedback information from a terminal, precoding method determiner 316 uses

[MATH. 167]

$$b = \frac{h_{11}(t)}{h_{22}(t)} \times a \tag{167-1}$$

and $$\theta = \delta + n\pi \text{ radians} \tag{167-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (5B-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 168]

$$\begin{pmatrix} q_{11} & q_{12} \\ q_{21} & q_{22} \end{pmatrix} \tag{168}$$

Accordingly, weighting synthesizer 306A calculates the following and outputs weighted signal 307A ($y_1(t)$).

[MATH. 169]

$$y_1(t)=q_{11}\times s_1(t)+q_{12}\times s_2(t) \tag{169}$$

Weighting synthesizer 306B calculates the following and outputs weighted signal 307B ($y_2(t)$).

[MATH. 170]

$$y_2(t)=q_{21}\times s_1(t)+q_{22}\times s_2(t) \tag{170}$$

Precoding method determiner 316 performs the calculations described in "(precoding method (5B))" based on feedback information from a terminal, and determines the precoding matrix.

[MATH. 171]

$$\begin{pmatrix} q_{11} & q_{12} \\ q_{21} & q_{22} \end{pmatrix} = \begin{pmatrix} \sin\theta & -\cos\theta \\ \cos\theta & \sin\theta \end{pmatrix} \quad (171)$$

In other words, the precoding matrix of the above equation and values for a and b are calculated. Here, based on feedback information from a terminal, precoding method determiner 316 uses

[MATH. 172]

$$b = \frac{h_{11}(t)}{h_{22}(t)} \times a \quad (172\text{-}1)$$

and $$\theta = \delta + n\pi \text{ radians} \quad (172\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (6A))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 173]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \quad (173)$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 174]

$$\begin{pmatrix} z_1(t) \\ z_2(t) \end{pmatrix} = \begin{pmatrix} a & 0 \\ 0 & b \end{pmatrix} \begin{pmatrix} \beta\times\sin\theta & -\beta\times\cos\theta \\ \beta\times\cos\theta & \beta\times\sin\theta \end{pmatrix} \begin{pmatrix} s_1(t) \\ s_2(t) \end{pmatrix} \quad (174)$$

($a$, $b$, $\beta$ are complex numbers (may be actual numbers))

In this case, the following equation holds true.

[MATH. 175]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \\ &\quad \begin{pmatrix} \beta\times\sin\theta & -\beta\times\cos\theta \\ \beta\times\cos\theta & \beta\times\sin\theta \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\beta\times\cos\delta\times\sin\theta - & -h_{11}(t)\times a\times\beta\times\cos\delta\times\cos\theta - \\ h_{22}(t)\times b\times\beta\times\sin\delta\times\cos\theta & h_{22}(t)\times b\times\beta\times\sin\delta\times\sin\theta \\ h_{11}(t)\times a\times\beta\times\sin\delta\times\sin\theta + & -h_{11}(t)\times a\times\beta\times\sin\delta\times\cos\theta + \\ h_{22}(t)\times b\times\beta\times\cos\delta\times\cos\theta & h_{22}(t)\times b\times\beta\times\cos\delta\times\sin\theta \end{pmatrix} \\ &\quad \begin{pmatrix} s_1(t) \\ s_2(t) \end{pmatrix} + \begin{pmatrix} n_1(t) \\ n_2(t) \end{pmatrix} \end{aligned} \quad (175)$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 176]

$$-h_{11}(t)\times a\times\beta\times\cos\delta\times\cos\theta - h_{22}(t)\times b\times\beta\times\sin\delta\times\sin\theta = 0 \quad (176\text{-}1)$$

$$h_{11}(t)\times a\times\beta\times\sin\delta\times\sin\theta + h_{22}(t)\times b\times\beta\times\cos\delta\times\cos\theta = 0 \quad (176\text{-}2)$$

Accordingly, it is sufficient if the following holds true.

[MATH. 177]

$$b = \frac{h_{11}(t)}{h_{22}(t)} \times a \quad (177\text{-}1)$$

and $$\theta = \delta + \frac{\pi}{2} + n\pi \text{ radians} \quad (177\text{-}2)$$

($n$ is an integer)

Accordingly, the communications station calculates θ, a, and b from the feedback information from the terminal so that the following is true.

[MATH. 178]

$$b = \frac{h_{11}(t)}{h_{22}(t)} \times a \tag{178-1}$$

and $$\theta = \delta + \frac{\pi}{2} + n\pi \text{ radians} \tag{178-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 179]

$$|a|^2+|b|^2=|u|^2 \tag{179}$$

($|u|^2$ is a parameter based on average transmitted power)

(Precoding Method (6A-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 180]

$$\begin{pmatrix} q_{11} & q_{12} \\ q_{21} & q_{22} \end{pmatrix} \tag{180}$$

Accordingly, weighting synthesizer 306A calculates the following and outputs weighted signal 307A ($z_1(t)$).

[MATH. 181]

$$z_1(t)=q_{11}\times s_1(t)+q_{12}\times s_2(t) \tag{181}$$

Weighting synthesizer 306B calculates the following and outputs weighted signal 307B ($z_2(t)$).

[MATH. 182]

$$z_2(t)=q_{21}\times s_1(t)+q_{22}\times s_2(t) \tag{182}$$

Precoding method determiner 316 performs the calculations described in "(precoding method (6A))" based on feedback information from a terminal, and determines the precoding matrix.

[MATH. 183]

$$\begin{aligned} \begin{pmatrix} q_{11} & q_{12} \\ q_{21} & q_{22} \end{pmatrix} &= \begin{pmatrix} a & 0 \\ 0 & b \end{pmatrix}\begin{pmatrix} \beta\times\sin\theta & -\beta\times\cos\theta \\ \beta\times\cos\theta & \beta\times\sin\theta \end{pmatrix} \\ &= \begin{pmatrix} a\times\beta\times\sin\theta & -a\times\beta\times\cos\theta \\ b\times\beta\times\cos\theta & b\times\beta\times\sin\theta \end{pmatrix} \end{aligned} \tag{183}$$

In other words, the precoding matrix of the above equation is calculated. Here, based on feedback information from a terminal, precoding method determiner 316 uses

[MATH. 184]

$$b = \frac{h_{11}(t)}{h_{22}(t)} \times a \tag{184-1}$$

and $$\theta = \delta + \frac{\pi}{2} + n\pi \text{ radians} \tag{184-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (6A-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 185]

$$\begin{pmatrix} q_{11} & q_{12} \\ q_{21} & q_{22} \end{pmatrix} \tag{185}$$

Accordingly, weighting synthesizer 306A calculates the following and outputs weighted signal 307A ($y_1(t)$).

[MATH. 186]

$$y_1(t)=q_{11}\times s_1(t)+q_{12}\times s_2(t) \tag{186}$$

Weighting synthesizer 306B calculates the following and outputs weighted signal 307B ($y_2(t)$).

[MATH. 187]

$$y_2(t)=q_{21}\times s_1(t)+q_{22}\times s_2(t) \tag{187}$$

Precoding method determiner 316 performs the calculations described in "(precoding method (6A))" based on feedback information from a terminal, and determines the precoding matrix.

[MATH. 188]

$$\begin{pmatrix} q_{11} & q_{12} \\ q_{21} & q_{22} \end{pmatrix} = \begin{pmatrix} \beta\times\sin\theta & -\beta\times\cos\theta \\ \beta\times\cos\theta & \beta\times\sin\theta \end{pmatrix} \quad (188)$$

In other words, the precoding matrix of the above equation and values for a and b are calculated. Here, based on feedback information from a terminal, precoding method determiner 316 uses

[MATH. 189]

$$b = \frac{h_{11}(t)}{h_{22}(t)}\times a \quad (189\text{-}1)$$

and $$\theta = \delta + \frac{\pi}{2} + n\pi \text{ radians} \quad (189\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (6B))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 190]

$$\begin{pmatrix} r_1(t) \\ r_2(t) \end{pmatrix} = \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix} \quad (190)$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 191]

$$\begin{pmatrix} z_1(t) \\ z_2(t) \end{pmatrix} = \begin{pmatrix} a & 0 \\ 0 & b \end{pmatrix}\begin{pmatrix} \beta\times\sin\theta & -\beta\times\cos\theta \\ \beta\times\cos\theta & \beta\times\sin\theta \end{pmatrix}\begin{pmatrix} s_1(t) \\ s_2(t) \end{pmatrix} \quad (191)$$

($a$, $b$, $\beta$ *are complex* numbers(may be actual numbers))

In this case, the following equation holds true.

[MATH. 192]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} a & 0 \\ 0 & b \end{pmatrix} \\ &\quad \begin{pmatrix} \beta\times\sin\theta & -\beta\times\cos\theta \\ \beta\times\cos\theta & \beta\times\sin\theta \end{pmatrix}\begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\beta\times & -h_{11}(t)\times a\times\beta\times \\ \cos\delta\times\sin\theta - & \cos\delta\times\cos\theta - \\ h_{22}(t)\times b\times\beta\times & h_{22}(t)\times b\times\beta\times \\ \sin\delta\times\cos\theta & \sin\delta\times\sin\theta \\ h_{11}(t)\times a\times\beta\times & -h_{11}(t)\times a\times\beta\times \\ \sin\delta\times\sin\theta + & \sin\delta\times\cos\theta + \\ h_{22}(t)\times b\times\beta\times & h_{22}(t)\times b\times\beta\times \\ \cos\delta\times\cos\theta & \cos\delta\times\sin\theta \end{pmatrix} \\ &\quad \begin{pmatrix} s_1(t) \\ s_2(t) \end{pmatrix} + \begin{pmatrix} n_1(t) \\ n_2(t) \end{pmatrix} \end{aligned} \quad (192)$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 193]

$$h_{11}(t)\times a\times\beta\times\cos\delta\times\sin\theta - h_{22}(t)\times b\times\beta\times\sin\delta\times\cos\theta = 0 \quad (193\text{-}1)$$

$$-h_{11}(t)\times a\times\beta\times\sin\delta\times\cos\theta + h_{22}(t)\times b\times\beta\times\cos\delta\times\sin\theta = 0 \quad (193\text{-}2)$$

Accordingly, it is sufficient if the following holds true.

[MATH. 194]

$$b = \frac{h_{11}(t)}{h_{22}(t)}\times a \quad (194\text{-}1)$$

and $$\theta = \delta + n\pi \text{ radians} \quad (194\text{-}2)$$

($n$ is an integer)

Accordingly, the communications station calculates θ, a, and b from the feedback information from the terminal so that the following is true.

[MATH. 195]

$$b=\frac{h_{11}(t)}{h_{22}(t)}\times a \quad (195\text{-}1)$$

and $$\theta=\delta+n\pi \text{ radians} \quad (195\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 196]

$$|a|^2+|b|^2=|u|^2 \quad (196)$$

($|u|^2$ is a parameter based on average transmitted power)

(Precoding Method (6B-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 197]

$$\begin{pmatrix} q_{11} & q_{12} \\ q_{21} & q_{22} \end{pmatrix} \quad (197)$$

Accordingly, weighting synthesizer 306A calculates the following and outputs weighted signal 307A ($z_1(t)$).

[MATH. 198]

$$z_1(t)=q_{11}\times s_1(t)+q_{12}\times s_2(t) \quad (198)$$

Weighting synthesizer 306B calculates the following and outputs weighted signal 307B ($z_2(t)$).

[MATH. 199]

$$z_2(t)=q_{21}\times s_1(t)+q_{22}\times s_2(t) \quad (199)$$

Precoding method determiner 316 performs the calculations described in "(precoding method (6B))" based on feedback information from a terminal, and determines the precoding matrix.

[MATH. 200]

$$\begin{aligned}\begin{pmatrix} q_{11} & q_{12} \\ q_{21} & q_{22} \end{pmatrix} &= \begin{pmatrix} a & 0 \\ 0 & b \end{pmatrix}\begin{pmatrix} \beta\times\sin\theta & -\beta\times\cos\theta \\ \beta\times\cos\theta & \beta\times\sin\theta \end{pmatrix} \\ &= \begin{pmatrix} a\times\beta\times\sin\theta & -a\times\beta\times\cos\theta \\ b\times\beta\times\cos\theta & b\times\beta\times\sin\theta \end{pmatrix}\end{aligned} \quad (200)$$

In other words, the precoding matrix of the above equation is calculated. Here, based on feedback information from a terminal, precoding method determiner 316 uses

[MATH. 201]

$$b=\frac{h_{11}(t)}{h_{22}(t)}\times a \quad (201\text{-}1)$$

and $$\theta=\delta+n\pi \text{ radians} \quad (201\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (6B-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 202]

$$\begin{pmatrix} q_{11} & q_{12} \\ q_{21} & q_{22} \end{pmatrix} \quad (202)$$

Accordingly, weighting synthesizer 306A calculates the following and outputs weighted signal 307A ($y_1(t)$).

[MATH. 203]

$$y_1(t)=q_{11}\times s_1(t)+q_{12}\times s_2(t) \quad (203)$$

Weighting synthesizer 306B calculates the following and outputs weighted signal 307B ($y_2(t)$).

[MATH. 204]

$$y_2(t)=q_{21}\times s_1(t)+q_{22}\times s_2(t) \quad (204)$$

Precoding method determiner 316 performs the calculations described in "(precoding method (6B))" based on feedback information from a terminal, and determines the precoding matrix.

[MATH. 205]

$$\begin{pmatrix} q_{11} & q_{12} \\ q_{21} & q_{22} \end{pmatrix} = \begin{pmatrix} \beta\times\sin\theta & -\beta\times\cos\theta \\ \beta\times\cos\theta & \beta\times\sin\theta \end{pmatrix} \quad (205)$$

In other words, the precoding matrix of the above equation and values for a and b are calculated. Here, based on feedback information from a terminal, precoding method determiner 316 uses

[MATH. 206]

$$b = \frac{h_{11}(t)}{h_{22}(t)} \times a \quad (206\text{-}1)$$

and $$\theta = \delta + n\pi \text{ radians} \quad (206\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (7A))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 207]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \quad (207)$$
$$= \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 208]

$$\begin{pmatrix} z_1(t) \\ z_2(t) \end{pmatrix} = \begin{pmatrix} a & 0 \\ 0 & b \end{pmatrix} \begin{pmatrix} \sin\theta & \cos\theta \\ \cos\theta & -\sin\theta \end{pmatrix} \begin{pmatrix} s_1(t) \\ s_2(t) \end{pmatrix} \quad (208)$$

($a$, $b$ are complex numbers (may be actual numbers))

In this case, the following equation holds true.

[MATH. 209]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \quad (209)$$
$$= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix}$$
$$= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \sin\theta & -\cos\theta \\ \cos\theta & \sin\theta \end{pmatrix} \begin{pmatrix} s_1(t) \\ s_2(t) \end{pmatrix} + \begin{pmatrix} n_1(t) \\ n_2(t) \end{pmatrix}$$
$$= \begin{pmatrix} h_{11}(t)\times a\times\cos\delta\times\sin\theta - h_{22}(t)\times b\times\sin\delta\times\cos\theta & h_{11}(t)\times a\times\cos\delta\times\cos\theta + h_{22}(t)\times b\times\sin\delta\times\sin\theta \\ h_{11}(t)\times a\times\sin\delta\times\sin\theta + h_{22}(t)\times b\times\cos\delta\times\cos\theta & h_{11}(t)\times a\times\sin\delta\times\cos\theta - h_{22}(t)\times b\times\cos\delta\times\sin\theta \end{pmatrix} \begin{pmatrix} s_1(t) \\ s_2(t) \end{pmatrix} + \begin{pmatrix} n_1(t) \\ n_2(t) \end{pmatrix}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 210]

$$h_{11}(t)\times a\times\cos\delta\times\cos\theta + h_{22}(t)\times b\times\sin\delta\times\sin\theta = 0 \quad (210\text{-}1)$$

$$h_{11}(t)\times a\times\sin\delta\times\sin\theta + h_{22}(t)\times b\times\cos\delta\times\cos\theta = 0 \quad (210\text{-}2)$$

Accordingly, it is sufficient if the following holds true.

[MATH. 211]

$$b = \frac{h_{12}(t)}{h_{22}(t)} \times a \quad (211\text{-}1)$$

and $$\theta = \delta + \frac{\pi}{2} + n\pi \text{ radians} \quad (211\text{-}2)$$

($n$ is an integer)

Accordingly, the communications station calculates θ, a, and b from the feedback information from the terminal so that the following is true.

[MATH. 212]

$$b = \frac{h_{11}(t)}{h_{22}(t)} \times a \quad (212\text{-}1)$$

and $$\theta = \delta + \frac{\pi}{2} + n\pi \text{ radians} \quad (212\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 213]

$$|a|^2+|b|^2=|u|^2 \quad (213)$$

($|u|^2$ is a parameter based on average transmitted power)

(Precoding Method (7A-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 214]

$$\begin{pmatrix} q_{11} & q_{12} \\ q_{21} & q_{22} \end{pmatrix} \quad (214)$$

Accordingly, weighting synthesizer 306A calculates the following and outputs weighted signal 307A ($z_1(t)$).

[MATH. 215]

$$z_1(t)=q_{11}\times s_1(t)+q_{12}\times s_2(t) \quad (215)$$

Weighting synthesizer 306B calculates the following and outputs weighted signal 307B ($z_2(t)$).

[MATH. 216]

$$z_2(t)=q_{21}\times s_1(t)+q_{22}\times s_2(t) \quad (216)$$

Precoding method determiner 316 performs the calculations described in "(precoding method (7A))" based on feedback information from a terminal, and determines the precoding matrix.

[MATH. 217]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \sin\theta & \cos\theta \\ \cos\theta & -\sin\theta \end{pmatrix} = \begin{pmatrix} a\times\sin\theta & a\times\cos\theta \\ b\times\cos\theta & -b\times\sin\theta \end{pmatrix} \quad (217)$$

In other words, the precoding matrix of the above equation is calculated. Here, based on feedback information from a terminal, precoding method determiner 316 uses

[MATH. 218]

$$b = \frac{h_{11}(t)}{h_{21}(t)} \times a \quad (218\text{-}1)$$

and $$\theta = \delta + \frac{\pi}{2} + n\pi \text{ radians} \quad (218\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (7A-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 219]

$$\begin{pmatrix} q_{11} & q_{12} \\ q_{21} & q_{22} \end{pmatrix} \quad (219)$$

Accordingly, weighting synthesizer 306A calculates the following and outputs weighted signal 307A ($y_1(t)$).

[MATH. 220]

$$y_1(t)=q_{11}\times s_1(t)+q_{12}\times s_2(t) \quad (220)$$

Weighting synthesizer 306B calculates the following and outputs weighted signal 307B ($y_2(t)$).

[MATH. 221]

$$y_2(t)=q_{21}\times s_1(t)+q_{22}\times s_2(t) \quad (221)$$

Precoding method determiner 316 performs the calculations described in "(precoding method (7A))" based on feedback information from a terminal, and determines the precoding matrix.

[MATH. 222]

$$\begin{pmatrix} q_{11} & q_{12} \\ q_{21} & q_{22} \end{pmatrix} = \begin{pmatrix} \sin\theta & \cos\theta \\ \cos\theta & -\sin\theta \end{pmatrix} \quad (222)$$

In other words, the precoding matrix of the above equation and values for a and b are calculated. Here, based on feedback information from a terminal, precoding method determiner 316 uses

[MATH. 223]

$$b = \frac{h_{11}(t)}{h_{22}(t)} \times a \quad (223\text{-}1)$$

and $$\theta = \delta + \frac{\pi}{2} + n\pi \text{ radians} \quad (223\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (7B))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 224]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \quad (224)$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 225]

$$\begin{pmatrix} z_1(t) \\ z_2(t) \end{pmatrix} = \begin{pmatrix} a & 0 \\ 0 & b \end{pmatrix} \begin{pmatrix} \sin\theta & \cos\theta \\ \cos\theta & -\sin\theta \end{pmatrix} \begin{pmatrix} s_1(t) \\ s_2(t) \end{pmatrix} \quad (225)$$

($a$, $b$ are complex numbers (may be actual numbers))

In this case, the following equation holds true.

[MATH. 226]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \\ &\quad \begin{pmatrix} \sin\theta & -\cos\theta \\ \cos\theta & \sin\theta \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} \begin{matrix} h_{11}(t)\times a\times\cos\delta\times\sin\theta - \\ h_{22}(t)\times b\times\sin\delta\times\cos\theta \end{matrix} & \begin{matrix} h_{11}(t)\times a\times\cos\delta\times\cos\theta + \\ h_{22}(t)\times b\times\sin\delta\times\sin\theta \end{matrix} \\ \begin{matrix} h_{11}(t)\times a\times\sin\delta\times\sin\theta + \\ h_{22}(t)\times b\times\cos\delta\times\cos\theta \end{matrix} & \begin{matrix} h_{11}(t)\times a\times\sin\delta\times\cos\theta - \\ h_{22}(t)\times b\times\cos\delta\times\sin\theta \end{matrix} \end{pmatrix} \\ &\quad \begin{pmatrix} s_1(t) \\ s_2(t) \end{pmatrix} + \begin{pmatrix} n_1(t) \\ n_2(t) \end{pmatrix} \end{aligned} \quad (226)$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 227]

$$h_{11}(t)\times a\times\cos\delta\times\sin\theta - h_{22}(t)\times b\times\sin\delta\times\cos\theta = 0 \quad (227\text{-}1)$$

$$h_{11}(t)\times a\times\sin\delta\times\sin\theta - h_{22}(t)\times b\times\cos\delta\times\cos\theta = 0 \quad (227\text{-}2)$$

Accordingly, it is sufficient if the following holds true.

[MATH. 228]

$$b = \frac{h_{11}(t)}{h_{22}(t)} \times a \quad (228\text{-}1)$$

and $$\theta = \delta + n\pi \text{ radians} \quad (228\text{-}2)$$

($n$ is an integer)

Accordingly, the communications station calculates θ, a, and b from the feedback information from the terminal so that the following is true.

[MATH. 229]

$$b = \frac{h_{11}(t)}{h_{22}(t)} \times a \quad (229\text{-}1)$$

and

-continued $$\theta = \delta + n\pi \text{ radians} \tag{229-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 230]

$$|a|^2+|b|^2=|u|^2 \tag{230}$$

($|u|^2$ is a parameter based on average transmitted power)

(Precoding Method (7B-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 231]

$$\begin{pmatrix} q_{11} & q_{12} \\ q_{21} & q_{22} \end{pmatrix} \tag{231}$$

Accordingly, weighting synthesizer 306A calculates the following and outputs weighted signal 307A ($z_1(t)$).

[MATH. 232]

$$z_1(t)=q_{11}\times s_1(t)+q_{12}\times s_2(t) \tag{232}$$

Weighting synthesizer 306B calculates the following and outputs weighted signal 307B ($z_2(t)$).

[MATH. 233]

$$z_2(t)=q_{21}\times s_1(t)+q_{22}\times s_2(t) \tag{233}$$

Precoding method determiner 316 performs the calculations described in "(precoding method (7B))" based on feedback information from a terminal, and determines the precoding matrix.

[MATH. 234]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \sin\theta & \cos\theta \\ \cos\theta & -\sin\theta \end{pmatrix} = \begin{pmatrix} a\times\sin\theta & a\times\cos\theta \\ b\times\cos\theta & -b\times\sin\theta \end{pmatrix} \tag{234}$$

In other words, the precoding matrix of the above equation is calculated. Here, based on feedback information from a terminal, precoding method determiner 316 uses

[MATH. 235]

$$b = \frac{h_{11}(t)}{h_{22}(t)}\times a \tag{235-1}$$

and $$\theta = \delta + n\pi \text{ radians} \tag{235-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precolling Method (7B-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 236]

$$\begin{pmatrix} q_{11} & q_{12} \\ q_{21} & q_{22} \end{pmatrix} \tag{236}$$

Accordingly, weighting synthesizer 306A calculates the following and outputs weighted signal 307A ($y_1(t)$).

[MATH. 237]

$$y_1(t)=q_{11}\times s_1(t)+q_{12}\times s_2(t) \tag{237}$$

Weighting synthesizer 306B calculates the following and outputs weighted signal 307B ($y_2(t)$).

[MATH. 238]

$$y_2(t)=q_{21}\times s_1(t)+q_{22}\times s_2(t) \tag{238}$$

Precoding method determiner 316 performs the calculations described in "(precoding method (7B))" based on feedback information from a terminal, and determines the precoding matrix.

[MATH. 239]

$$\begin{pmatrix} q_{11} & q_{12} \\ q_{21} & q_{22} \end{pmatrix} = \begin{pmatrix} \sin\theta & \cos\theta \\ \cos\theta & -\sin\theta \end{pmatrix} \tag{239}$$

In other words, the precoding matrix of the above equation and values for a and b are calculated. Here, based on feedback information from a terminal, precoding method determiner 316 uses

[MATH. 240]

$$b = \frac{h_{11}(t)}{h_{22}(t)} \times a \tag{240-1}$$

and $$\theta = \delta + n\pi \text{ radians} \tag{240-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (8A))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 241]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \end{aligned} \tag{241}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 242]

$$\begin{pmatrix} z_1(t) \\ z_2(t) \end{pmatrix} = \begin{pmatrix} a & 0 \\ 0 & b \end{pmatrix} \begin{pmatrix} \beta\times\sin\theta & \beta\times\cos\theta \\ \beta\times\cos\theta & -\beta\times\sin\theta \end{pmatrix} \begin{pmatrix} s_1(t) \\ s_2(t) \end{pmatrix} \tag{242}$$

($a$, $b$, $\beta$ *are complex* numbers (may be actual numbers))

In this case, the following equation holds true.

[MATH. 243]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \\ &\quad \begin{pmatrix} a & 0 \\ 0 & b \end{pmatrix} \begin{pmatrix} \sin\theta & -\cos\theta \\ \cos\theta & \sin\theta \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\beta\times\cos\delta\times\sin\theta - & h_{11}(t)\times a\times\beta\times\cos\delta\times\cos\theta + \\ h_{22}(t)\times b\times\beta\times\sin\delta\times\cos\theta & h_{22}(t)\times b\times\beta\times\sin\delta\times\sin\theta \\ h_{11}(t)\times a\times\beta\times\sin\delta\times\sin\theta + & h_{11}(t)\times a\times\beta\times\sin\delta\times\cos\theta - \\ h_{22}(t)\times b\times\beta\times\cos\delta\times\cos\theta & h_{22}(t)\times b\times\beta\times\cos\delta\times\sin\theta \end{pmatrix} \\ &\quad \begin{pmatrix} s_1(t) \\ s_2(t) \end{pmatrix} + \begin{pmatrix} n_1(t) \\ n_2(t) \end{pmatrix} \end{aligned} \tag{243}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 244]

$$h_{11}(t)\times a\times\beta\times\cos\delta\times\cos\theta + h_{22}(t)\times b\times\beta\times\sin\delta\times\sin\theta = 0 \tag{244-1}$$

$$h_{11}(t)\times a\times\beta\times\sin\delta\times\sin\theta + h_{22}(t)\times b\times\beta\times\cos\delta\times\cos\theta = 0 \tag{244-2}$$

Accordingly, it is sufficient if the following holds true.

[MATH. 245]

$$b = \frac{h_{11}(t)}{h_{22}(t)} \times a \tag{245-1}$$

and $$\theta = \delta + \frac{\pi}{2} + n\pi \text{ radians} \tag{245-2}$$

($n$ is an integer)

Accordingly, the communications station calculates θ, a, and b from the feedback information from the terminal so that the following is true.

[MATH. 246]

$$b = \frac{h_{11}(t)}{h_{22}(t)} \times a \tag{246-1}$$

and $$\theta = \delta + \frac{\pi}{2} + n\pi \text{ radians} \tag{246-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 247]

$$|a|^2+|b|^2=|u|^2 \tag{247}$$

($|u|^2$ is a parameter based on average transmitted power)

(Precoding Method (8A-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 248]

$$\begin{pmatrix} q_{11} & q_{12} \\ q_{21} & q_{22} \end{pmatrix} \tag{248}$$

Accordingly, weighting synthesizer 306A calculates the following and outputs weighted signal 307A ($z_1(t)$).

[MATH. 249]

$$z_1(t)=q_{11}\times s_1(t)+q_{12}\times s_2(t) \tag{249}$$

Weighting synthesizer 306B calculates the following and outputs weighted signal 307B ($z_2(t)$).

[MATH. 250]

$$z_2(t)=q_{21}\times s_1(t)+q_{22}\times s_2(t) \tag{250}$$

Precoding method determiner 316 performs the calculations described in "(precoding method (8A))" based on feedback information from a terminal, and determines the precoding matrix.

[MATH. 251]

$$\begin{aligned} \begin{pmatrix} q_{11} & q_{12} \\ q_{21} & q_{22} \end{pmatrix} &= \begin{pmatrix} a & 0 \\ 0 & b \end{pmatrix} \begin{pmatrix} \beta\times\sin\theta & \beta\times\cos\theta \\ \beta\times\cos\theta & -\beta\times\sin\theta \end{pmatrix} \\ &= \begin{pmatrix} a\times\beta\times\sin\theta & a\times\beta\times\cos\theta \\ b\times\beta\times\cos\theta & -b\times\beta\times\sin\theta \end{pmatrix} \end{aligned} \tag{251}$$

In other words, the precoding matrix of the above equation is calculated. Here, based on feedback information from a terminal, precoding method determiner 316 uses

[MATH. 252]

$$b = \frac{h_{11}(t)}{h_{22}(t)} \times a \tag{252-1}$$

and $$\theta = \delta + \frac{\pi}{2} + n\pi \text{ radians} \tag{252-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (8A-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 253]

$$\begin{pmatrix} q_{11} & q_{12} \\ q_{21} & q_{22} \end{pmatrix} \tag{253}$$

Accordingly, weighting synthesizer 306A calculates the following and outputs weighted signal 307A ($y_1(t)$).

[MATH. 254]

$$y_1(t)=q_{11}\times s_1(t)+q_{12}\times s_2(t) \tag{254}$$

Weighting synthesizer 306B calculates the following and outputs weighted signal 307B ($y_2(t)$).

[MATH. 255]

$$y_2(t)=q_{21}\times s_1(t)+q_{22}\times s_2(t) \tag{255}$$

Precoding method determiner 316 performs the calculations described in "(precoding method (8A))" based on feedback information from a terminal, and determines the precoding matrix.

[MATH. 256]

$$\begin{pmatrix} q_{11} & q_{12} \\ q_{21} & q_{22} \end{pmatrix} = \begin{pmatrix} \beta\times\sin\theta & \beta\times\cos\theta \\ \beta\times\cos\theta & -\beta\times\sin\theta \end{pmatrix} \tag{256}$$

In other words, the precoding matrix of the above equation and values for a and b are calculated. Here, based on feedback information from a terminal, precoding method determiner 316 uses

[MATH. 257]

$$b = \frac{h_{11}(t)}{h_{22}(t)} \times a \text{ and} \tag{257-1}$$

$$\theta = \delta + \frac{\pi}{2} + n\pi \text{ radians} \tag{257-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (8B))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 258]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \end{aligned} \tag{258}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 259]

$$\begin{pmatrix} z_1(t) \\ z_2(t) \end{pmatrix} = \begin{pmatrix} a & 0 \\ 0 & b \end{pmatrix} \begin{pmatrix} \beta\times\sin\theta & \beta\times\cos\theta \\ \beta\times\cos\theta & -\beta\times\sin\theta \end{pmatrix} \begin{pmatrix} s_1(t) \\ s_2(t) \end{pmatrix} \tag{259}$$

($a$, $b$, $\beta$ are complex numbers (may be actual numbers))

In this case, the following equation holds true.

[MATH. 260]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \\ &\quad \begin{pmatrix} \beta\times\sin\theta & -\beta\times\cos\theta \\ \beta\times\cos\theta & \beta\times\sin\theta \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\beta\times\cos\delta\times\sin\theta - h_{22}(t)\times b\times\beta\times\sin\delta\times\cos\theta \\ h_{11}(t)\times a\times\beta\times\cos\delta\times\cos\theta + h_{22}(t)\times b\times\beta\times\sin\delta\times\sin\theta \\ h_{11}(t)\times a\times\beta\times\sin\delta\times\sin\theta + h_{22}(t)\times b\times\beta\times\cos\delta\times\cos\theta \\ h_{11}(t)\times a\times\beta\times\sin\delta\times\cos\theta - h_{22}(t)\times b\times\beta\times\cos\delta\times\sin\theta \end{pmatrix} \\ &\quad \begin{pmatrix} s_1(t) \\ s_2(t) \end{pmatrix} + \begin{pmatrix} n_1(t) \\ n_2(t) \end{pmatrix} \end{aligned} \tag{260}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 261]

$$h_{11}(t)\times a\times\beta\times\cos\delta\times\sin\theta - h_{22}(t)\times b\times\beta\times\sin\delta\times\cos\theta = 0 \tag{261-1}$$

$$h_{11}(t)\times a\times\beta\times\sin\delta\times\cos\theta - h_{22}(t)\times b\times\beta\times\cos\delta\times\sin\theta = 0 \tag{261-2}$$

Accordingly, it is sufficient if the following holds true.

[MATH. 262]

$$b = \frac{h_{11}(t)}{h_{22}(t)} \times a \tag{262-1}$$

and $$\theta = \delta + n\pi \text{ radians} \tag{262-2}$$

($n$ is an integer)

Accordingly, the communications station calculates θ, a, and b from the feedback information from the terminal so that the following is true.

[MATH. 263]

$$b = \frac{h_{11}(t)}{h_{22}(t)} \times a \tag{263-1}$$

and $$\theta = \delta + n\pi \text{ radians} \tag{263-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 264]

$$|a|^2+|b|^2=|u|^2 \tag{264}$$

($|u|^2$ is a parameter based on average transmitted power)

(Precoding Method (8B-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 265]

$$\begin{pmatrix} q_{11} & q_{12} \\ q_{21} & q_{22} \end{pmatrix} \tag{265}$$

Accordingly, weighting synthesizer 306A calculates the following and outputs weighted signal 307A ($z_1(t)$).

[MATH. 266]

$$z_1(t)=q_{11}\times s_1(t)+q_{12}\times s_2(t) \tag{266}$$

Weighting synthesizer 306B calculates the following and outputs weighted signal 307B ($z_2(t)$).

[MATH. 267]

$$z_2(t)=q_{21}\times s_1(t)+q_{22}\times s_2(t) \tag{267}$$

Precoding method determiner 316 performs the calculations described in "(precoding method (8B))" based on feedback information from a terminal, and determines the precoding matrix.

[MATH. 268]

$$\begin{aligned}\begin{pmatrix} q_{11} & q_{12} \\ q_{21} & q_{22} \end{pmatrix} &= \begin{pmatrix} a & 0 \\ 0 & b \end{pmatrix}\begin{pmatrix} \beta\times\sin\theta & \beta\times\cos\theta \\ \beta\times\cos\theta & -\beta\times\sin\theta \end{pmatrix} \\ &= \begin{pmatrix} a\times\beta\times\sin\theta & a\times\beta\times\cos\theta \\ b\times\beta\times\cos\theta & -b\times\beta\times\sin\theta \end{pmatrix}\end{aligned} \tag{268}$$

In other words, the precoding matrix of the above equation is calculated. Here, based on feedback information from a terminal, precoding method determiner 316 uses

[MATH. 269]

$$b=\frac{h_{11}(t)}{h_{22}(t)}\times a \tag{269-1}$$

and $$\theta=\delta+n\pi \text{ radians} \tag{269-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (8B-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 270]

$$\begin{pmatrix} q_{11} & q_{12} \\ q_{21} & q_{22} \end{pmatrix} \tag{270}$$

Accordingly, weighting synthesizer 306A calculates the following and outputs weighted signal 307A ($y_1(t)$).

[MATH. 271]

$$y_1(t)=q_{11}\times s_1(t)+q_{12}\times s_2(t) \tag{271}$$

Weighting synthesizer 306B calculates the following and outputs weighted signal 307B ($y_2(t)$).

[MATH. 272]

$$y_2(t)=q_{21}\times s_1(t)+q_{22}\times s_2(t) \tag{272}$$

Precoding method determiner 316 performs the calculations described in "(precoding method (8B))" based on feedback information from a terminal, and determines the precoding matrix.

[MATH. 273]

$$\begin{pmatrix} q_{11} & q_{12} \\ q_{21} & q_{22} \end{pmatrix} = \begin{pmatrix} \beta\times\sin\theta & \beta\times\cos\theta \\ \beta\times\cos\theta & -\beta\times\sin\theta \end{pmatrix} \quad (273)$$

In other words, the precoding matrix of the above equation and values for a and b are calculated. Here, based on feedback information from a terminal, precoding method determiner 316 uses

[MATH. 274]

$$b = \frac{h_{11}(t)}{h_{22}(t)}\times a \quad (274\text{-}1)$$

and $$\theta = \delta + n\pi \text{ radians} \quad (274\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (9A))

In a state such as in FIG. 2, signals $r_1(t)$, $r_2(t)$ that are received by a reception device (for example, a terminal) can be applied as follows (note that δ is greater than or equal to 0 radians and less than 2π radians).

[Math. 275]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \quad (275) \\ &= \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \end{aligned}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 276]

$$\begin{pmatrix} z_1(t) \\ z_2(t) \end{pmatrix} = \begin{pmatrix} a & 0 \\ 0 & b \end{pmatrix} \begin{pmatrix} e^{j\mu}\times\cos\theta & e^{j(\mu+\lambda)}\times\sin\theta \\ e^{j\omega}\times\sin\theta & -e^{j(\omega+\lambda)}\times\cos\theta \end{pmatrix} \begin{pmatrix} s_1(t) \\ s_2(t) \end{pmatrix} \quad (276)$$

($a$, $b$, are complex numbers (may be actual numbers))

In this case, the following equation holds true.

[MATH. 277]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \quad (277) \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \\ &\quad \begin{pmatrix} e^{j\mu}\times\cos\theta & e^{j(\mu+\lambda)}\times\sin\theta \\ e^{j\omega}\times\sin\theta & -e^{j(\omega+\lambda)}\times\cos\theta \end{pmatrix} \\ &\quad \begin{pmatrix} s_1(t) \\ s_2(t) \end{pmatrix} + \begin{pmatrix} n_1(t) \\ n_2(t) \end{pmatrix} \\ &= \begin{pmatrix} \begin{matrix} h_{11}(t)\times a\times e^{j\mu}\times \\ \cos\delta\times\cos\theta - \\ h_{22}(t)\times b\times e^{j\omega}\times \\ \sin\delta\times\sin\theta \end{matrix} & \begin{matrix} h_{11}(t)\times a\times e^{j(\mu+\lambda)}\times \\ \cos\delta\times\sin\theta + \\ h_{22}(t)\times b\times e^{j(\omega+\lambda)}\times \\ \sin\delta\times\cos\theta \end{matrix} \\ \begin{matrix} h_{11}(t)\times a\times e^{j\mu}\times \\ \sin\delta\times\cos\theta + \\ h_{22}(t)\times b\times e^{j\omega}\times \\ \cos\delta\times\sin\theta \end{matrix} & \begin{matrix} h_{11}(t)\times a\times e^{j(\mu+\lambda)}\times \\ \sin\delta\times\sin\theta - \\ h_{22}(t)\times b\times e^{j(\omega+\lambda)}\times \\ \cos\delta\times\cos\theta \end{matrix} \end{pmatrix} \\ &\quad \begin{pmatrix} s_1(t) \\ s_2(t) \end{pmatrix} + \begin{pmatrix} n_1(t) \\ n_2(t) \end{pmatrix} \end{aligned}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 278]

$$h_{11}(t)\times a\times e^{j(\mu+\lambda)}\times\cos\delta\times\sin\theta + h_{22}(t)\times b\times e^{j(\omega+\lambda)}\times\sin\delta\times\cos\theta = 0 \quad (278\text{-}1)$$

$$h_{11}(t)\times a\times e^{j\mu}\times\sin\delta\times\cos\theta + h_{22}(t)\times b\times e^{j\omega}\times\cos\delta\times\sin\theta = 0 \quad (278\text{-}2)$$

Accordingly, it is sufficient if the following holds true.

[MATH. 279]

$$b = \frac{h_{11}(t)}{h_{22}(t)}\times a\times e^{j(\mu-\omega)} \quad (279\text{-}1)$$

and $$\theta = -\delta + n\pi \text{ radians} \quad (279\text{-}2)$$

($n$ is an integer)

Accordingly, the communications station calculates θ, a, and b from the feedback information from the terminal so that the following is true.

[MATH. 280]

$$b = \frac{h_{11}(t)}{h_{22}(t)} \times a \times e^{j(\mu-\omega)} \tag{280-1}$$

and $$\theta = -\delta + n\pi \text{ radians} \tag{280-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 281]

$$|a|^2+|b|^2=|u|^2 \tag{281}$$

($|u|^2$ is a parameter based on average transmitted power)

(Precoding Method (9A-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 282]

$$\begin{pmatrix} q_{11} & q_{12} \\ q_{21} & q_{22} \end{pmatrix} \tag{282}$$

Accordingly, weighting synthesizer 306A calculates the following and outputs weighted signal 307A ($z_1(t)$).

[MATH. 283]

$$z_1(t)=q_{11}\times s_1(t)+q_{12}\times s_2(t) \tag{283}$$

Weighting synthesizer 306B calculates the following and outputs weighted signal 307B ($z_2(t)$.

[MATH. 284]

$$z_2(t)=q_{21}\times s_1(t)+q_{22}\times s_2(t) \tag{284}$$

Precoding method determiner 316 performs the calculations described in "(precoding method (9A))" based on feedback information from a terminal, and determines the precoding matrix.

[MATH. 285]

$$\begin{aligned}\begin{pmatrix} q_{11} & q_{12} \\ q_{21} & q_{22} \end{pmatrix} &= \begin{pmatrix} a & 0 \\ 0 & b \end{pmatrix}\begin{pmatrix} e^{j\mu}\times\cos\theta & e^{j(\mu+\lambda)}\times\sin\theta \\ e^{j\omega}\times\sin\theta & -e^{j(\omega+\lambda)}\times\cos\theta \end{pmatrix} \\ &= \begin{pmatrix} a\times e^{j\mu}\times\cos\theta & a\times e^{j(\mu+\lambda)}\times\sin\theta \\ b\times e^{j\omega}\times\sin\theta & -b\times e^{j(\omega+\lambda)}\times\cos\theta \end{pmatrix}\end{aligned} \tag{285}$$

In other words, the precoding matrix of the above equation is calculated. Here, based on feedback information from a terminal, precoding method determiner 316 uses

[MATH. 286]

$$b = \frac{h_{11}(t)}{h_{22}(t)} \times a \times e^{j(\mu-\omega)} \tag{286-1}$$

and $$\theta = -\delta + n\pi \text{ radians} \tag{286-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (9A-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 287]

$$\begin{pmatrix} q_{11} & q_{12} \\ q_{21} & q_{22} \end{pmatrix} \tag{287}$$

Accordingly, weighting synthesizer 306A calculates the following and outputs weighted signal 307A ($y_1(t)$).

[MATH. 288]

$$y_1(t)=q_{11}\times s_1(t)+q_{12}\times s_2(t) \tag{288}$$

Weighting synthesizer 306B calculates the following and outputs weighted signal 307B ($y_2(t)$).

[MATH. 289]

$$y_2(t)=q_{21}\times s_1(t)+q_{22}\times s_2(t) \tag{289}$$

Precoding method determiner 316 performs the calculations described in "(precoding method (9A))" based on feedback information from a terminal, and determines the precoding matrix.

[MATH. 290]

$$\begin{pmatrix} q_{11} & q_{12} \\ q_{21} & q_{22} \end{pmatrix} = \begin{pmatrix} e^{j\mu}\times\cos\theta & e^{j(\mu+\lambda)}\times\sin\theta \\ e^{j\omega}\times\sin\theta & -e^{j(\omega+\lambda)}\times\cos\theta \end{pmatrix} \tag{290}$$

In other words, the precoding matrix of the above equation and values for a and b are calculated. Here, based on feedback information from a terminal, precoding method determiner 316 uses

[MATH. 291]

$$b = \frac{h_{11}(t)}{h_{22}(t)}\times a\times e^{j(\mu-\omega)} \tag{291-1}$$

and $$\theta = -\delta + n\pi \text{ radians} \tag{291-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (9B))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 292]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix}\end{aligned} \tag{292}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 293]

$$\begin{pmatrix} z_1(t) \\ z_2(t) \end{pmatrix} = \begin{pmatrix} a & 0 \\ 0 & b \end{pmatrix}\begin{pmatrix} e^{j\mu}\times\cos\theta & e^{j(\mu+\lambda)}\times\sin\theta \\ e^{j\omega}\times\sin\theta & -e^{j(\omega+\lambda)}\times\cos\theta \end{pmatrix}\begin{pmatrix} s_1(t) \\ s_2(t) \end{pmatrix} \tag{293}$$

($a$, $b$ are complex numbers (may be actual numbers))

In this case, the following equation holds true.

[MATH. 294]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} a & 0 \\ 0 & b \end{pmatrix} \\ &\quad \begin{pmatrix} e^{j\mu}\times\cos\theta & e^{j(\mu+\lambda)}\times\sin\theta \\ e^{j\omega}\times\sin\theta & -e^{j(\omega+\lambda)}\times\cos\theta \end{pmatrix} \\ &\quad \begin{pmatrix} s_1(t) \\ s_2(t) \end{pmatrix} + \begin{pmatrix} n_1(t) \\ n_2(t) \end{pmatrix} \\ &= \begin{pmatrix} \begin{matrix} h_{11}(t)\times a\times e^{j\mu}\times \\ \cos\delta\times\cos\theta - \\ h_{22}(t)\times b\times e^{j\omega}\times \\ \sin\delta\times\sin\theta \end{matrix} & \begin{matrix} h_{11}(t)\times a\times e^{j(\mu+\lambda)}\times \\ \cos\delta\times\sin\theta + \\ h_{22}(t)\times b\times e^{j(\omega+\lambda)}\times \\ \sin\delta\times\cos\theta \end{matrix} \\ \begin{matrix} h_{11}(t)\times a\times e^{j\mu}\times \\ \sin\delta\times\cos\theta + \\ h_{22}(t)\times b\times e^{j\omega}\times \\ \cos\delta\times\sin\theta \end{matrix} & \begin{matrix} h_{11}(t)\times a\times e^{j(\mu+\lambda)}\times \\ \sin\delta\times\sin\theta - \\ h_{22}(t)\times b\times e^{j(\omega+\lambda)}\times \\ \cos\delta\times\cos\theta \end{matrix} \end{pmatrix} \\ &\quad \begin{pmatrix} s_1(t) \\ s_2(t) \end{pmatrix} + \begin{pmatrix} n_1(t) \\ n_2(t) \end{pmatrix}\end{aligned} \tag{294}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 295]

$$h_{11}(t)\times a\times e^{j\mu}\times\cos\delta\times\cos\theta - h_{22}(t)\times b\times e^{j\omega}\times\sin\delta\times\sin\theta=0 \tag{295-1}$$

$$h_{11}(t)\times a\times e^{j(\mu+\lambda)}\times\sin\delta\times\sin\theta - h_{22}(t)\times b\times e^{j(\omega-\lambda)}\times\cos\delta\times\cos\theta=0 \tag{295-2}$$

Accordingly, it is sufficient if the following holds true.

[MATH. 296]

$$b = \frac{h_{11}(t)}{h_{22}(t)} \times a \times e^{j(\mu-\omega)} \quad (296\text{-}1)$$

and $$\theta = -\delta + \frac{\pi}{2} + n\pi \text{ radians} \quad (296\text{-}2)$$

($n$ is an integer)

Accordingly, the communications station calculates θ, a, and b from the feedback information from the terminal so that the following is true.

[MATH. 297]

$$b = \frac{h_{11}(t)}{h_{22}(t)} \times a \times e^{j(\mu-\omega)} \quad (297\text{-}1)$$

and $$\theta = -\delta + \frac{\pi}{2} + n\pi \text{ radians} \quad (297\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 298]

$$|a|^2+|b|^2=|u|^2 \quad (298)$$

($|u|^2$ is a parameter based on average transmitted power)

(Precoding Method (9B-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 299]

$$\begin{pmatrix} q_{11} & q_{12} \\ q_{21} & q_{22} \end{pmatrix} \quad (299)$$

Accordingly, weighting synthesizer 306A calculates the following and outputs weighted signal 307A ($z_1(t)$).

[MATH. 300]

$$z_1(t)=q_{11}\times s_1(t)+q_{12}\times s_2(t) \quad (300)$$

Weighting synthesizer 306B calculates the following and outputs weighted signal 307B ($z_2(t)$).

[MATH. 301]

$$z_2(t)=q_{21}\times s_1(t)+q_{22}\times s_2(t) \quad (301)$$

Precoding method determiner 316 performs the calculations described in "(precoding method (9B))" based on feedback information from a terminal, and determines the precoding matrix.

[MATH. 302]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} e^{j\mu}\times\cos\theta & e^{j(\mu+\lambda)}\times\sin\theta \\ e^{j\omega}\times\sin\theta & -e^{j(\omega+\lambda)}\times\cos\theta \end{pmatrix} = \begin{pmatrix} a\times e^{j\mu}\times\cos\theta & a\times e^{j(\mu+\lambda)}\times\sin\theta \\ b\times e^{j\omega}\times\sin\theta & -b\times e^{j(\omega+\lambda)}\times\cos\theta \end{pmatrix} \quad (302)$$

In other words, the precoding matrix of the above equation is calculated. Here, based on feedback information from a terminal, precoding method determiner 316 uses

[MATH. 303]

$$b = \frac{h_{11}(t)}{h_{22}(t)} \times a \times e^{j(\mu-\omega)} \quad (303\text{-}1)$$

and $$\theta = -\delta + \frac{\pi}{2} + n\pi \text{ radians} \quad (303\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (9B-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 304]

$$\begin{pmatrix} q_{11} & q_{12} \\ q_{21} & q_{22} \end{pmatrix} \tag{304}$$

Accordingly, weighting synthesizer 306A calculates the following and outputs weighted signal 307A ($y_1(t)$).

[MATH. 305]

$$y_1(t)=q_{11}\times s_1(t)+q_{12}\times s_2(t) \tag{305}$$

Weighting synthesizer 306B calculates the following and outputs weighted signal 307B ($y_2(t)$).

[MATH. 306]

$$y_2(t)=q_{21}\times s_1(t)+q_{22}\times s_2(t) \tag{306}$$

Precoding method determiner 316 performs the calculations described in "(precoding method (9B))" based on feedback information from a terminal, and determines the precoding matrix.

[MATH. 307]

$$\begin{pmatrix} q_{11} & q_{12} \\ q_{21} & q_{22} \end{pmatrix} = \begin{pmatrix} e^{j\mu}\times\cos\theta & e^{j(\mu+\lambda)}\times\sin\theta \\ e^{j\omega}\times\sin\theta & -e^{j(\omega+\lambda)}\times\cos\theta \end{pmatrix} \tag{307}$$

In other words, the precoding matrix of the above equation and values for a and b are calculated. Here, based on feedback information from a terminal, precoding method determiner 316 uses

[MATH. 308]

$$b = \frac{h_{11}(t)}{h_{22}(t)}\times a\times e^{j(\mu-\omega)} \tag{308-1}$$

and $$\theta = -\delta + \frac{\pi}{2} + n\pi \text{ radians} \tag{308-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (10A))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 309]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix}\end{aligned} \tag{309}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 310]

$$\begin{pmatrix} z_1(t) \\ z_2(t) \end{pmatrix} = \begin{pmatrix} a & 0 \\ 0 & b \end{pmatrix}\begin{pmatrix} \beta\times e^{j\mu}\times\cos\theta & \beta\times e^{j(\mu+\lambda)}\times\sin\theta \\ \beta\times e^{j\omega}\times\sin\theta & -\beta\times e^{j(\omega+\lambda)}\times\cos\theta \end{pmatrix}\begin{pmatrix} s_1(t) \\ s_2(t) \end{pmatrix} \tag{310}$$

($a$, $b$, $\beta$ are complex numbers (may be actual numbers))

In this case, the following equation holds true.

[MATH. 311]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \beta\times e^{j\mu}\times\cos\theta & \beta\times e^{j(\mu+\lambda)}\times\sin\theta \\ \beta\times e^{j\omega}\times\sin\theta & -\beta\times e^{j(\omega+\lambda)}\times\cos\theta \end{pmatrix} \\ &\quad \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\beta\times e^{j\mu}\times\cos\delta\times\cos\theta - & h_{11}(t)\times a\times\beta\times e^{j(\mu+\lambda)}\times\cos\delta\times\sin\theta + \\ h_{22}(t)\times b\times\beta\times e^{j\omega}\times\sin\delta\times\sin\theta & h_{22}(t)\times b\times\beta\times e^{j(\omega+\lambda)}\times\sin\delta\times\cos\theta \\ h_{11}(t)\times a\times\beta\times e^{j\mu}\times\sin\delta\times\cos\theta + & h_{11}(t)\times a\times\beta\times e^{j(\mu+\lambda)}\times\sin\delta\times\sin\theta - \\ h_{22}(t)\times b\times\beta\times e^{j\omega}\times\cos\delta\times\sin\theta & h_{22}(t)\times b\times\beta\times e^{j(\omega+\lambda)}\times\cos\delta\times\cos\theta \end{pmatrix} \\ &\quad \begin{pmatrix} s_1(t) \\ s_2(t) \end{pmatrix} + \begin{pmatrix} n_1(t) \\ n_2(t) \end{pmatrix}\end{aligned} \tag{311}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 312]

$$h_{11}(t)\times a\times\beta\times e^{j(\mu+\lambda)}\times\cos\delta\times\sin\theta h_{22}(t)\times b\times\beta\times e^{j(\omega+\lambda)}\times\sin\delta\times\cos\theta=0 \tag{312-1}$$

$$h_{11}(t)\times a\times\beta\times e^{j\mu}\times\sin\delta\times\cos\theta+h_{22}(t)\times b\times\beta\times e^{j\omega}\times\cos\delta\times\sin\theta=0 \tag{312-2}$$

Accordingly, it is sufficient if the following holds true.

[MATH. 313]

$$b = \frac{h_{11}(t)}{h_{22}(t)}\times a\times e^{j(\mu-\omega)} \tag{313-1}$$

and $$\theta = -\delta + n\pi \text{ radians} \tag{313-2}$$

($n$ is an integer)

Accordingly, the communications station calculates θ, a, and b from the feedback information from the terminal so that the following is true.

[MATH. 314]

$$b = \frac{h_{11}(t)}{h_{22}(t)}\times a\times e^{j(\mu-\omega)} \tag{314-1}$$

and $$\theta = -\delta + n\pi \text{ radian} \tag{314-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 315]

$$|a|^2+|b|^2=|u|^2 \tag{315}$$

($|u|^2$ is a parameter based on average transmitted power)

(Precoding Method (10A-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 316]

$$\begin{pmatrix} q_{11} & q_{12} \\ q_{21} & q_{22} \end{pmatrix} \tag{316}$$

Accordingly, weighting synthesizer 306A calculates the following and outputs weighted signal 307A ($z_1(t)$).

[MATH. 317]

$$z_1(t)=q_{11}\times s_1(t)+q_{12}\times s_2(t) \tag{317}$$

Weighting synthesizer 306B calculates the following and outputs weighted signal 307B ($z_2(t)$).

[MATH. 318]

$$z_2(t)=q_{21}\times s_1(t)+q_{22}\times s_2(t) \tag{318}$$

Precoding method determiner 316 performs the calculations described in "(precoding method (10A))" based on feedback information from a terminal, and determines the precoding matrix.

[MATH. 319]

$$\begin{pmatrix} q_{11} & q_{12} \\ q_{21} & q_{22} \end{pmatrix} = \begin{pmatrix} a & 0 \\ 0 & b \end{pmatrix} \begin{pmatrix} \beta \times e^{j\mu} \times \cos\theta & \beta \times e^{j(\mu+\lambda)} \times \sin\theta \\ \beta \times e^{j\omega} \times \sin\theta & -\beta \times e^{j(\omega+\lambda)} \times \cos\theta \end{pmatrix} = \begin{pmatrix} a \times \beta \times e^{j\mu} \times \cos\theta & a \times \beta \times e^{j(\mu+\lambda)} \times \sin\theta \\ b \times \beta \times e^{j\omega} \times \sin\theta & -b \times \beta \times e^{j(\omega+\lambda)} \times \cos\theta \end{pmatrix} \quad (319)$$

In other words, the precoding matrix of the above equation is calculated. Here, based on feedback information from a terminal, precoding method determiner 316 uses

[MATH. 320]

$$b = \frac{h_{11}(t)}{h_{22}(t)} \times a \times e^{j(\mu-\omega)} \quad (320\text{-}1)$$

and $$\theta = -\delta + n\pi \text{ radians} \quad (320\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (10A-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 321]

$$\begin{pmatrix} q_{11} & q_{12} \\ q_{21} & q_{22} \end{pmatrix} \quad (321)$$

Accordingly, weighting synthesizer 306A calculates the following and outputs weighted signal 307A ($y_1(t)$).

[MATH. 322]

$$y_1(t) = q_{11} \times s_1(t) + q_{12} \times s_2(t) \quad (322)$$

Weighting synthesizer 306B calculates the following and outputs weighted signal 307B ($y_2(t)$).

[MATH. 323]

$$y_2(t) = q_{21} \times s_1(t) + q_{22} \times s_2(t) \quad (323)$$

Precoding method determiner 316 performs the calculations described in "(precoding method (10A))" based on feedback information from a terminal, and determines the precoding matrix.

[MATH. 324]

$$\begin{pmatrix} q_{11} & q_{12} \\ q_{21} & q_{22} \end{pmatrix} = \begin{pmatrix} \beta \times e^{j\mu} \times \cos\theta & \beta \times e^{j(\mu+\lambda)} \times \sin\theta \\ \beta \times e^{j\omega} \times \sin\theta & -\beta \times e^{j(\omega+\lambda)} \times \cos\theta \end{pmatrix} \quad (324)$$

In other words, the precoding matrix of the above equation and values for a and b are calculated. Here, based on feedback information from a terminal, precoding method determiner 316 uses

[MATH. 325]

$$b = \frac{h_{11}(t)}{h_{22}(t)} \times a \times e^{j(\mu-\omega)} \quad (325\text{-}1)$$

and $$\theta = -\delta + n\pi \text{ radians} \quad (325\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t) = a \times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t) = b \times y_2(t)$, and outputs coefficient multiplied signal 402B ($z_2(t)$).

(Precoding Method (10B))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 326]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \tag{326}$$

Here, when $z_1(t)=s_1(t)$ and $z_2(t)=s_2(t)$ ($s_1(t)$ and $s_2(t)$ are mapped baseband signals), excluding when $\delta=0$, $\pi/2$, $\pi$, or $3\pi/2$ radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 327]

$$\begin{pmatrix} z_1(t) \\ z_2(t) \end{pmatrix} = \begin{pmatrix} a & 0 \\ 0 & b \end{pmatrix} \begin{pmatrix} \beta \times e^{j\mu} \times \cos\theta & \beta \times e^{j(\mu+\lambda)} \times \sin\theta \\ \beta \times e^{j\omega} \times \sin\theta & -\beta \times e^{j(\omega+\lambda)} \times \cos\theta \end{pmatrix} \begin{pmatrix} s_1(t) \\ s_2(t) \end{pmatrix} \tag{327}$$

($a$, $b$, $\beta$ are complex numbers (may be actual numbers))

In this case, the following equation holds true.

[MATH. 328]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \\ &\quad \begin{pmatrix} \beta \times e^{j\mu} \times \cos\theta & \beta \times e^{j(\mu+\lambda)} \times \sin\theta \\ \beta \times e^{j\omega} \times \sin\theta & -\beta \times e^{j(\omega+\lambda)} \times \cos\theta \end{pmatrix} \\ &\quad \begin{pmatrix} s_1(t) \\ s_2(t) \end{pmatrix} + \begin{pmatrix} n_1(t) \\ n_2(t) \end{pmatrix} \\ &= \begin{pmatrix} \begin{matrix} h_{11}(t)\times a\times\beta\times e^{j\mu}\times \\ \cos\delta\times\cos\theta - \\ h_{22}(t)\times b\times\beta\times e^{j\omega}\times \\ \sin\delta\times\sin\theta \end{matrix} & \begin{matrix} h_{11}(t)\times a\times\beta\times e^{j(\mu+\lambda)}\times \\ \cos\delta\times\sin\theta + \\ h_{22}(t)\times b\times\beta\times e^{j(\omega+\lambda)}\times \\ \sin\delta\times\cos\theta \end{matrix} \\ \begin{matrix} h_{11}(t)\times a\times\beta\times e^{j\mu}\times \\ \sin\delta\times\cos\theta + \\ h_{22}(t)\times b\times\beta\times e^{j\omega}\times \\ \cos\delta\times\sin\theta \end{matrix} & \begin{matrix} h_{11}(t)\times a\times\beta\times e^{j(\mu+\lambda)}\times \\ \sin\delta\times\sin\theta - \\ h_{22}(t)\times b\times\beta\times e^{j(\omega+\lambda)}\times \\ \cos\delta\times\cos\theta \end{matrix} \end{pmatrix} \\ &\quad \begin{pmatrix} s_1(t) \\ s_2(t) \end{pmatrix} + \begin{pmatrix} n_1(t) \\ n_2(t) \end{pmatrix} \end{aligned} \tag{328}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 329]

$$h_{11}(t)\times a\times\beta\times e^{j\mu}\times\cos\delta\times\cos\theta - h_{22}(t)\times b\times\beta\times e^{j\omega}\times\sin\delta\times\sin\theta=0 \tag{329-1}$$

$$h_{11}(t)\times a\times\beta\times e^{j(\mu+\lambda)}\times\sin\delta\times\sin\theta - h_{22}(t)\times b\times\beta\times e^{j(\omega+\lambda)}\times\cos\delta\times\cos\theta=0 \tag{329-2}$$

Accordingly, it is sufficient if the following holds true.

[MATH. 330]

$$b = \frac{h_{11}(t)}{h_{22}(t)} \times a \times e^{j(\mu-\omega)} \tag{330-1}$$

and $$\theta = -\delta + \frac{\pi}{2} + n\pi \text{ radians} \tag{330-2}$$

($n$ is an integer)

Accordingly, the communications station calculates θ, a, and b from the feedback information from the terminal so that the following is true.

[MATH. 331]

$$b = \frac{h_{11}(t)}{h_{22}(t)} \times a \times e^{j(\mu-\omega)} \tag{331-1}$$

and $$\theta = -\delta + \frac{\pi}{2} + n\pi \text{ radians} \tag{331-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 332]

$$|a|^2+|b|^2=|u|^2 \tag{332}$$

($|u|^2$ is a parameter based on average transmited power)

(Precoding Method (10B-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 333]

$$\begin{pmatrix} q_{11} & q_{12} \\ q_{21} & q_{22} \end{pmatrix} \tag{333}$$

Accordingly, weighting synthesizer 306A calculates the following and outputs weighted signal 307A ($z_1(t)$).

[MATH. 334]

$$z_1(t)=q_{11}\times s_1(t)+q_{12}\times s_2(t) \quad (324)$$

Weighting synthesizer 306B calculates the following and outputs weighted signal 307B ($z_2(t)$).

[MATH. 335]

$$z_2(t)=q_{21}\times s_1(t)+q_{22}\times s_2(t) \quad (335)$$

Precoding method determiner 316 performs the calculations described in "(precoding method (10B))" based on feedback information from a terminal, and determines the precoding matrix.

[MATH. 336]

$$\begin{aligned}\begin{pmatrix} q_{11} & q_{12} \\ q_{21} & q_{22} \end{pmatrix} &= \begin{pmatrix} a & 0 \\ 0 & b \end{pmatrix}\begin{pmatrix} \beta\times e^{j\mu}\times\cos\theta & \beta\times e^{j(\mu+\lambda)}\times\sin\theta \\ \beta\times e^{j\omega}\times\sin\theta & -\beta\times e^{j(\omega+\lambda)}\times\cos\theta \end{pmatrix} \\ &= \begin{pmatrix} a\times\beta\times e^{j\mu}\times\cos\theta & a\times\beta\times e^{j(\mu+\lambda)}\times\sin\theta \\ b\times\beta\times e^{j\omega}\times\sin\theta & -b\times\beta\times e^{j(\omega+\lambda)}\times\cos\theta \end{pmatrix}\end{aligned} \quad (336)$$

In other words, the precoding matrix of the above equation is calculated. Here, based on feedback information from a terminal, precoding method determiner 316 uses

[MATH. 337]

$$b = \frac{h_{11}(t)}{h_{22}(t)}\times a\times e^{j(\mu-\omega)} \quad (337\text{-}1)$$

and $$\theta = -\delta + \frac{\pi}{2} + n\pi \text{ radians} \quad (337\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (10B-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 338]

$$\begin{pmatrix} q_{11} & q_{12} \\ q_{21} & q_{22} \end{pmatrix} \quad (338)$$

Accordingly, weighting synthesizer 306A calculates the following and outputs weighted signal 307A ($y_1(t)$).

[MATH. 339]

$$y_1(t)=q_{11}\times s_1(t)+q_{12}\times s_2(t) \quad (329)$$

Weighting synthesizer 306B calculates the following and outputs weighted signal 307B ($y_2(t)$).

[MATH. 340]

$$y_2(t)=q_{21}\times s_1(t)+q_{22}\times s_2(t) \quad (340)$$

Precoding method determiner 316 performs the calculations described in "(precoding method (10B))" based on feedback information from a terminal, and determines the precoding matrix.

[MATH. 341]

$$\begin{pmatrix} q_{11} & q_{12} \\ q_{21} & q_{22} \end{pmatrix} = \begin{pmatrix} \beta\times e^{j\mu}\times\cos\theta & \beta\times e^{j(\mu+\lambda)}\times\sin\theta \\ \beta\times e^{j\omega}\times\sin\theta & -\beta\times e^{j(\omega+\lambda)}\times\cos\theta \end{pmatrix} \quad (341)$$

In other words, the precoding matrix of the above equation and values for a and b are calculated. Here, based on feedback information from a terminal, precoding method determiner 316 uses

[MATH. 342]

$$b = \frac{h_{11}(t)}{h_{22}(t)}\times a\times e^{j(\mu-\omega)} \quad (342\text{-}1)$$

and $$\theta = -\delta + \frac{\pi}{2} + n\pi \text{ radians} \quad (342\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (11A))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 343]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \tag{343}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 344]

$$\begin{pmatrix} z_1(t) \\ z_2(t) \end{pmatrix} = \begin{pmatrix} a & 0 \\ 0 & b \end{pmatrix} \begin{pmatrix} e^{j\mu}\times\cos\theta & -e^{j(\mu+\lambda)}\times\sin\theta \\ e^{j\omega}\times\sin\theta & e^{j(\omega+\lambda)}\times\cos\theta \end{pmatrix} \begin{pmatrix} s_1(t) \\ s_2(t) \end{pmatrix} \tag{344}$$

($a$, $b$ are complex numbers (may be actual numbers))

In this case, the following equation holds true.

[MATH. 345]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \\ &\quad \begin{pmatrix} e^{j\mu}\times\cos\theta & -e^{j(\mu+\lambda)}\times\sin\theta \\ e^{j\omega}\times\sin\theta & e^{j(\omega+\lambda)}\times\cos\theta \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} \begin{matrix} h_{11}(t)\times a\times e^{j\mu}\times \\ \cos\delta\times\cos\theta - \\ h_{22}(t)\times b\times e^{j\omega}\times \\ \sin\delta\times\sin\theta \end{matrix} & \begin{matrix} -h_{11}(t)\times a\times e^{j(\mu+\lambda)}\times \\ \cos\delta\times\sin\theta - \\ h_{22}(t)\times b\times e^{j(\omega+\lambda)}\times \\ \sin\delta\times\cos\theta \end{matrix} \\ \begin{matrix} h_{11}(t)\times a\times e^{j\mu}\times \\ \sin\delta\times\cos\theta + \\ h_{22}(t)\times b\times e^{j\omega}\times \\ \cos\delta\times\sin\theta \end{matrix} & \begin{matrix} -h_{11}(t)\times a\times e^{j(\mu+\lambda)}\times \\ \sin\delta\times\sin\theta + \\ h_{22}(t)\times b\times e^{j(\omega+\lambda)}\times \\ \cos\delta\times\cos\theta \end{matrix} \end{pmatrix} \\ &\quad \begin{pmatrix} s_1(t) \\ s_2(t) \end{pmatrix} + \begin{pmatrix} n_1(t) \\ n_2(t) \end{pmatrix} \end{aligned} \tag{345}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 346]

$$-h_{11}(t)\times a\times e^{h(\mu+\lambda)}\times\cos\delta\times\sin\theta-h_{22}(t)\times b\times e^{j(\omega+\lambda)}\times\sin\delta\times\cos\theta=0 \tag{346-1}$$

$$h_{11}(t)\times a\times e^{j\mu}\times\sin\delta\times\cos\theta+h_{22}(t)\times b\times e^{j\omega}\times\cos\delta\times\sin\theta=0 \tag{346-2}$$

Accordingly, it is sufficient if the following holds true.

[MATH. 347]

$$b = \frac{h_{11}(t)}{h_{22}(t)}\times a\times e^{j(\mu-\omega)} \tag{347-1}$$

and $$\theta = -\delta + n\pi \text{ radians} \tag{347-2}$$

($n$ is an integer)

Accordingly, the communications station calculates θ, a, and b from the feedback information from the terminal so that the following is true.

[MATH. 348]

$$b = \frac{h_{11}(t)}{h_{22}(t)}\times a\times e^{j(\mu-\omega)} \tag{348-1}$$

and $$\theta = -\delta + n\pi \text{ radians} \tag{348-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 349]

$$|a|^2+|b|^2=|u|^2 \tag{349}$$

($|u|^2$ is a parameter based on average transmitted power)

(Precoding Method (11A-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 350]

$$\begin{pmatrix} q_{11} & q_{12} \\ q_{21} & q_{22} \end{pmatrix} \quad (350)$$

Accordingly, weighting synthesizer 306A calculates the following and outputs weighted signal 307A ($z_1(t)$).

[MATH. 351]

$$z_1(t)=q_{11}\times s_1(t)+q_{12}\times s_2(t) \quad (351)$$

Weighting synthesizer 306B calculates the following and outputs weighted signal 307B ($z_2(t)$).

[MATH. 352]

$$z_2(t)=q_{21}\times s_1(t)+q_{22}\times s_2(t) \quad (352)$$

Precoding method determiner 316 performs the calculations described in "(precoding method (11A))" based on feedback information from a terminal, and determines the precoding matrix.

[MATH. 353]

$$\begin{pmatrix} q_{11} & q_{12} \\ q_{21} & q_{22} \end{pmatrix} = \begin{pmatrix} a & 0 \\ 0 & b \end{pmatrix} \begin{pmatrix} e^{j\mu}\times\cos\theta & -e^{j(\mu+\lambda)}\times\sin\theta \\ e^{j\omega}\times\sin\theta & e^{j(\omega+\lambda)}\times\cos\theta \end{pmatrix} = \begin{pmatrix} a\times e^{j\mu}\times\cos\theta & -a\times e^{j(\mu+\lambda)}\times\sin\theta \\ b\times e^{j\omega}\times\sin\theta & b\times e^{j(\omega+\lambda)}\times\cos\theta \end{pmatrix} \quad (353)$$

In other words, the precoding matrix of the above equation is calculated. Here, based on feedback information from a terminal, precoding method determiner 316 uses

[MATH. 354]

$$b = \frac{h_{11}(t)}{h_{22}(t)} \times a \times e^{j(\mu-\omega)} \quad (354\text{-}1)$$

and $$\theta = -\delta + n\pi \text{ radians} \quad (354\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (11A-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 355]

$$\begin{pmatrix} q_{11} & q_{12} \\ q_{21} & q_{22} \end{pmatrix} \quad (355)$$

Accordingly, weighting synthesizer 306A calculates the following and outputs weighted signal 307A ($y_1(t)$).

[MATH. 356]

$$y_1(t)=q_{11}\times s_1(t)+q_{12}\times s_2(t) \quad (356)$$

Weighting synthesizer 306B calculates the following and outputs weighted signal 307B ($y_2(t)$).

[MATH. 357]

$$y_2(t)=q_{21}\times s_1(t)+q_{22}\times s_2(t) \quad (357)$$

Precoding method determiner 316 performs the calculations described in "(precoding method (11A))" based on feedback information from a terminal, and determines the precoding matrix.

[MATH. 358]

$$\begin{pmatrix} q_{11} & q_{12} \\ q_{21} & q_{22} \end{pmatrix} = \begin{pmatrix} e^{j\mu}\times\cos\theta & -e^{j(\mu+\lambda)}\times\sin\theta \\ e^{j\omega}\times\sin\theta & e^{j(\omega+\lambda)}\times\cos\theta \end{pmatrix} \quad (358)$$

In other words, the precoding matrix of the above equation and values for a and b are calculated. Here, based on feedback information from a terminal, precoding method determiner 316 uses

[MATH. 359]

$$b = \frac{h_{11}(t)}{h_{22}(t)} \times a \times e^{j(\mu-\omega)} \quad (359\text{-}1)$$

and

-continued $$\theta = -\delta + n\pi \text{ radians} \quad (359\text{-}2)$$
($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (11B))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 360]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \quad (360)$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 361]

$$\begin{pmatrix} Z_1(t) \\ Z_2(t) \end{pmatrix} = \begin{pmatrix} a & 0 \\ 0 & b \end{pmatrix} \begin{pmatrix} e^{j\mu}\times\cos\theta & -e^{j(\mu+\lambda)}\times\sin\theta \\ e^{j\omega}\times\sin\theta & e^{j(\omega+\lambda)}\times\cos\theta \end{pmatrix} \begin{pmatrix} s_1(t) \\ s_2(t) \end{pmatrix} \quad (361)$$

($a$, $b$ are complex numbers (may be actual numbers))

In this case, the following equation holds true.

[MATH. 362]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \\ &\quad \begin{pmatrix} e^{j\mu}\times\cos\theta & -e^{j(\mu+\lambda)}\times\sin\theta \\ e^{j\omega}\times\sin\theta & e^{j(\omega+\lambda)}\times\cos\theta \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times e^{j\mu}\times\cos\delta\times\cos\theta - h_{22}(t)\times b\times e^{j\omega}\times\sin\delta\times\sin\theta & -h_{11}(t)\times a\times e^{j(\mu+\lambda)}\times\cos\delta\times\sin\theta - h_{22}(t)\times b\times e^{j(\omega+\lambda)}\times\sin\delta\times\cos\theta \\ h_{11}(t)\times a\times e^{j\mu}\times\sin\delta\times\cos\theta + h_{22}(t)\times b\times e^{j\omega}\times\cos\delta\times\sin\theta & -h_{11}(t)\times a\times e^{j(\mu+\lambda)}\times\sin\delta\times\sin\theta + h_{22}(t)\times b\times e^{j(\omega+\lambda)}\times\cos\delta\times\cos\theta \end{pmatrix} \\ &\quad \begin{pmatrix} s_1(t) \\ s_2(t) \end{pmatrix} + \begin{pmatrix} n_1(t) \\ n_2(t) \end{pmatrix} \end{aligned} \quad (362)$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 363]

$$h_{11}(t)\times a\times e^{j\mu}\times\cos\delta\times\cos\theta - h_{22}(t)\times b\times e^{j\omega}\times\sin\delta\times\sin\theta = 0 \quad (363\text{-}1)$$

$$-h_{11}(t)\times a\times e^{j(\mu+\lambda)}\times\sin\delta\times\sin\theta + h_{22}(t)\times b\times e^{j(\omega+\lambda)}\times\cos\delta\times\cos\theta = 0 \quad (363\text{-}2)$$

Accordingly, it is sufficient if the following holds true.

[MATH. 364]

$$b = \frac{h_{11}(t)}{h_{22}(t)}\times a\times e^{j(\mu-\omega)} \quad (364\text{-}1)$$

and $$\theta = -\delta + \frac{\pi}{2} + n\pi \text{ radians} \quad (364\text{-}2)$$

($n$ is an integer)

Accordingly, the communications station calculates θ, a, and b from the feedback information from the terminal so that the following is true.

[MATH. 365]

$$b = \frac{h_{11}(t)}{h_{22}(t)}\times a\times e^{j(\mu-\omega)} \quad (365\text{-}1)$$

and $$\theta = -\delta + \frac{\pi}{2} + n\pi \text{ radians} \quad (365\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 366]

$$|a|^2+|b|^2=|u|^2 \quad (366)$$

($|u|^2$ is a parameter based on average transmitted power)

(Precoding Method (11B-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 367]

$$\begin{pmatrix} q_{11} & q_{12} \\ q_{21} & q_{22} \end{pmatrix} \quad (367)$$

Accordingly, weighting synthesizer 306A calculates the following and outputs weighted signal 307A ($z_1(t)$).

[MATH. 368]

$$z_1(t)=q_{11}\times s_1(t)+q_{12}\times s_2(t) \quad (368)$$

Weighting synthesizer 306B calculates the following and outputs weighted signal 307B ($z_2(t)$).

[MATH. 369]

$$z_2(t)=q_{21}\times s_1(t)+q_{22}\times s_2(t) \quad (369)$$

Precoding method determiner 316 performs the calculations described in "(precoding method (11B))" based on feedback information from a terminal, and determines the precoding matrix.

[MATH. 370]

$$\begin{aligned} \begin{pmatrix} q_{11} & q_{12} \\ q_{21} & q_{22} \end{pmatrix} &= \begin{pmatrix} a & 0 \\ 0 & b \end{pmatrix} \begin{pmatrix} e^{j\mu}\times\cos\theta & -e^{j(\mu+\lambda)}\times\sin\theta \\ e^{j\omega}\times\sin\theta & e^{j(\omega+\lambda)}\times\cos\theta \end{pmatrix} \\ &= \begin{pmatrix} a\times e^{j\mu}\times\cos\theta & -a\times e^{j(\mu+\lambda)}\times\sin\theta \\ b\times e^{j\omega}\times\sin\theta & b\times e^{j(\omega+\lambda)}\times\cos\theta \end{pmatrix} \end{aligned} \quad (370)$$

In other words, the precoding matrix of the above equation is calculated. Here, based on feedback information from a terminal, precoding method determiner 316 uses

[MATH. 371]

$$b=\frac{h_{11}(t)}{h_{22}(t)}\times a\times e^{j(\mu-\omega)} \quad (371\text{-}1)$$

and $$\theta=-\delta+\frac{\pi}{2}+n\pi \text{ radians} \quad (371\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (11B-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 372]

$$\begin{pmatrix} q_{11} & q_{12} \\ q_{21} & q_{22} \end{pmatrix} \quad (372)$$

Accordingly, weighting synthesizer 306A calculates the following and outputs weighted signal 307A ($y_1(t)$).

[MATH. 373]

$$y_1(t)=q_{11}\times s_1(t)+q_{12}\times s_2(t) \quad (373)$$

Weighting synthesizer 306B calculates the following and outputs weighted signal 307B ($y_2(t)$).

[MATH. 374]

$$y_2(t)=q_{21}\times s_1(t)+q_{22}\times s_2(t) \quad (374)$$

Precoding method determiner 316 performs the calculations described in "(precoding method (11B))" based on feedback information from a terminal, and determines the precoding matrix.

[MATH. 375]

$$\begin{pmatrix} q_{11} & q_{12} \\ q_{21} & q_{22} \end{pmatrix} = \begin{pmatrix} e^{j\mu} \times \cos\theta & -e^{j(\mu+\lambda)} \times \sin\theta \\ e^{j\omega} \times \sin\theta & e^{j(\omega+\lambda)} \times \cos\theta \end{pmatrix} \tag{375}$$

In other words, the precoding matrix of the above equation and values for a and b are calculated. Here, based on feedback information from a terminal, precoding method determiner 316 uses

[MATH. 376]

$$b = \frac{h_{11}(t)}{h_{22}(t)} \times a \times e^{j(\mu-\omega)} \tag{376-1}$$

and $$\theta = -\delta + \frac{\pi}{2} + n\pi \text{ radians } (n \text{ is an integer}) \tag{376-2}$$

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (12A))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 377]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \end{aligned} \tag{377}$$

Here, when $z_1(t)=s_1(t)$ and $z_2(t)=s_2(t)$ ($s_1(t)$ and $s_2(t)$ are mapped baseband signals), excluding when δ=0, π/2, π, or 3/π2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 378]

$$\begin{pmatrix} z_1(t) \\ z_2(t) \end{pmatrix} = \begin{pmatrix} a & 0 \\ 0 & b \end{pmatrix} \begin{pmatrix} \beta \times e^{j\mu} \times \cos\theta & -\beta \times e^{j(\mu+\lambda)} \times \sin\theta \\ \beta \times e^{j\omega} \times \sin\theta & \beta \times e^{j(\omega+\lambda)} \times \cos\theta \end{pmatrix} \begin{pmatrix} s_1(t) \\ s_2(t) \end{pmatrix} \tag{378}$$

($a$, $b$, $\beta$ are complex numbers (may be actual numbers))

In this case, the following equation holds true.

[MATH. 379]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \beta \times e^{j\mu} \times \cos\theta & -\beta \times e^{j(\mu+\lambda)} \times \sin\theta \\ \beta \times e^{j\omega} \times \sin\theta & \beta \times e^{j(\omega+\lambda)} \times \cos\theta \end{pmatrix} \\ &\quad \begin{pmatrix} s_1(t) \\ s_2(t) \end{pmatrix} + \begin{pmatrix} n_1(t) \\ n_2(t) \end{pmatrix} \\ &= \begin{pmatrix} \begin{matrix} h_{11}(t)\times a\times\beta\times e^{j\mu}\times\cos\delta\times\cos\theta - \\ h_{22}(t)\times b\times\beta\times e^{j\omega}\times\sin\delta\times\sin\theta \end{matrix} & \begin{matrix} -h_{11}(t)\times a\times\beta\times e^{j(\mu+\lambda)}\times\cos\delta\times\sin\theta - \\ h_{22}(t)\times b\times\beta\times e^{j(\omega+\lambda)}\times\sin\delta\times\cos\theta \end{matrix} \\ \begin{matrix} h_{11}(t)\times a\times\beta\times e^{j\mu}\times\sin\delta\times\cos\theta + \\ h_{22}(t)\times b\times\beta\times e^{j\omega}\times\cos\delta\times\sin\theta \end{matrix} & \begin{matrix} -h_{11}(t)\times a\times\beta\times e^{j(\mu+\lambda)}\times\sin\delta\times\sin\theta + \\ h_{22}(t)\times b\times\beta\times e^{j(\omega+\lambda)}\times\cos\delta\times\cos\theta \end{matrix} \end{pmatrix} \\ &\quad \begin{pmatrix} s_1(t) \\ s_2(t) \end{pmatrix} + \begin{pmatrix} n_1(t) \\ n_2(t) \end{pmatrix} \end{aligned} \tag{379}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 380]

$$-h_{11}(t)\times a\times\beta\times e^{j(\mu+\lambda)}\times\cos\delta\times\sin\theta-h_{22}(t)\times b\times\beta\times e^{j(\omega+\lambda)}\times\sin\delta\times\cos\theta=0 \quad (380\text{-}1)$$

$$h_{11}(t)\times a\times\beta\times e^{j\mu}\times\sin\delta\times\cos\theta+h_{22}(t)\times b\times\beta\times e^{j\omega}\times\cos\delta\times\sin\theta=0 \quad (380\text{-}2)$$

Accordingly, it is sufficient if the following holds true.

[MATH. 381]

$$b=\frac{h_{11}(t)}{h_{22}(t)}\times a\times e^{j(\mu-\omega)} \quad (381\text{-}1)$$

and $$\theta=-\delta+n\pi\text{ radians} \quad (381\text{-}2)$$

($n$ is an integer)

Accordingly, the communications station calculates θ, a, and b from the feedback information from the terminal so that the following is true.

[MATH. 382]

$$b=\frac{h_{11}(t)}{h_{22}(t)}\times a\times e^{j(\mu-\omega)} \quad (382\text{-}1)$$

and $$\theta=-\delta+n\pi\text{ radians} \quad (382\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 383]

$$|a|^2+|b|^2=|u|^2 \quad (383)$$

($|\mu|^2$ is a parameter based on average transmitted power)

(Precoding Method (12A-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 384]

$$\begin{pmatrix} q_{11} & q_{12} \\ q_{21} & q_{22} \end{pmatrix} \quad (384)$$

Accordingly, weighting synthesizer 306A calculates the following and outputs weighted signal 307A ($z_1(t)$).

[MATH. 385]

$$z_1(t)=q_{11}\times s_1(t)+q_{12}+s_2(t) \quad (385)$$

Weighting synthesizer 306B calculates the following and outputs weighted signal 307B ($z_2(t)$).

[MATH. 386]

$$z_2(t)=q_{21}\times s_1(t)+q_{22}\times s_2(t) \quad (386)$$

Precoding method determiner 316 performs the calculations described in "(precoding method (12A))" based on feedback information from a terminal, and determines the precoding matrix.

[MATH. 387]

$$\begin{pmatrix} q_{11} & q_{12} \\ q_{21} & q_{22} \end{pmatrix}=\begin{pmatrix} a & 0 \\ 0 & b \end{pmatrix}\begin{pmatrix} \beta\times e^{j\mu}\times\cos\theta & -\beta\times e^{j(\mu+\lambda)}\times\sin\theta \\ \beta\times e^{j\omega}\times\sin\theta & \beta\times e^{j(\omega+\lambda)}\times\cos\theta \end{pmatrix}=\begin{pmatrix} a\times\beta\times e^{j\mu}\times\cos\theta & -a\times\beta\times e^{j(\mu+\lambda)}\times\sin\theta \\ b\times\beta\times e^{j\omega}\times\sin\theta & b\times\beta\times e^{j(\omega+\lambda)}\times\cos\theta \end{pmatrix} \quad (387)$$

In other words, the precoding matrix of the above equation is calculated. Here, based on feedback information from a terminal, precoding method determiner 316 uses

[MATH. 388]

$$b=\frac{h_{11}(t)}{h_{22}(t)}\times a\times e^{j(\mu-\omega)} \quad (388\text{-}1)$$

and $$\theta=-\delta+n\pi\text{ radians} \quad (388\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (12A-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 389]

$$\begin{pmatrix} q_{11} & q_{12} \\ q_{21} & q_{22} \end{pmatrix} \tag{389}$$

Accordingly, weighting synthesizer 306A calculates the following and outputs weighted signal 307A ($y_1(t)$).

[MATH. 390]

$$y_1(t)=q_{11}\times s_1(t)+q_{12}\times s_2(t) \tag{390}$$

Weighting synthesizer 306B calculates the following and outputs weighted signal 307B ($y_2(t)$).

[MATH. 391]

$$y_2(t)=q_{21}\times s_1(t)+q_{22}+s_2(t) \tag{391}$$

Precoding method determiner 316 performs the calculations described in "(precoding method (12A))" based on feedback information from a terminal, and determines the precoding matrix.

[MATH. 392]

$$\begin{pmatrix} q_{11} & q_{12} \\ q_{21} & q_{22} \end{pmatrix} = \begin{pmatrix} \beta\times e^{j\mu}\times\cos\theta & -\beta\times e^{j(\mu+\lambda)}\times\sin\theta \\ \beta\times e^{j\omega}\times\sin\theta & \beta\times e^{j(\omega+\lambda)}\times\cos\theta \end{pmatrix} \tag{392}$$

In other words, the precoding matrix of the above equation and values for a and b are calculated. Here, based on feedback information from a terminal, precoding method determiner 316 uses

[MATH. 393]

$$b=\frac{h_{11}(t)}{h_{22}(t)}\times a\times e^{j(\mu-\omega)} \tag{393-1}$$

and $$\theta=-\delta+n\pi \text{ radians} \tag{393-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (12B))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 394]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix}+\begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix}+\begin{pmatrix} n_1(t) \\ n_2(t) \end{pmatrix}\end{aligned} \tag{394}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 395]

$$\begin{pmatrix} z_1(t) \\ z_2(t) \end{pmatrix} = \begin{pmatrix} a & 0 \\ 0 & b \end{pmatrix}\begin{pmatrix} \beta\times e^{j\mu}\times\cos\theta & -\beta\times e^{j(\mu+\lambda)}\times\sin\theta \\ \beta\times e^{j\omega}\times\sin\theta & \beta\times e^{j(\omega+\lambda)}\times\cos\theta \end{pmatrix}\begin{pmatrix} s_1(t) \\ s_2(t) \end{pmatrix} \tag{395}$$

($a$, $b$, $\beta$ are complex numbers (may be actual numbers))

In this case, the following equation holds true.

[MATH. 396]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix}+\begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} z_1(t) \\ z_2(t) \end{pmatrix}+\begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} a & 0 \\ 0 & b \end{pmatrix} \\ &\quad \begin{pmatrix} \beta\times e^{j\mu}\times\cos\theta & -\beta\times e^{j(\mu+\lambda)}\times\sin\theta \\ \beta\times e^{j\omega}\times\sin\theta & \beta\times e^{j(\omega+\lambda)}\times\cos\theta \end{pmatrix} \\ &\quad \begin{pmatrix} s_1(t) \\ s_2(t) \end{pmatrix}+\begin{pmatrix} n_1(t) \\ n_2(t) \end{pmatrix} \\ &= \begin{pmatrix} \begin{array}{c} h_{11}(t)\times a\times\beta\times e^{j\mu}\times \\ \cos\delta\times\cos\theta- \\ h_{22}(t)\times b\times\beta\times e^{j\omega}\times \\ \sin\delta\times\sin\theta \end{array} & \begin{array}{c} -h_{11}(t)\times a\times\beta\times e^{j(\mu+\lambda)}\times \\ \cos\delta\times\sin\theta- \\ h_{22}(t)\times b\times\beta\times e^{j(\omega+\lambda)}\times \\ \sin\delta\times\cos\theta \end{array} \\ \begin{array}{c} h_{11}(t)\times a\times\beta\times e^{j\mu}\times \\ \sin\delta\times\cos\theta+ \\ h_{22}(t)\times b\times\beta\times e^{j\omega}\times \\ \cos\delta\times\sin\theta \end{array} & \begin{array}{c} -h_{11}(t)\times a\times\beta\times e^{j(\mu+\lambda)}\times \\ \sin\delta\times\sin\theta+ \\ h_{22}(t)\times b\times\beta\times e^{j(\omega+\lambda)}\times \\ \cos\delta\times\cos\theta \end{array} \end{pmatrix} \\ &\quad \begin{pmatrix} s_1(t) \\ s_2(t) \end{pmatrix}+\begin{pmatrix} n_1(t) \\ n_2(t) \end{pmatrix}\end{aligned} \tag{396}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 397]

$$h_{11}(t)\times a\times\beta\times e^{j\mu}\times\cos\delta\times\cos\theta-h_{22}(t)\times b\times\beta\times e^{j\omega}\times\sin\delta\times\sin\theta=0 \quad (397\text{-}1)$$

$$-h_{11}(t)\times a\times\beta\times e^{j(\mu+\lambda)}\times\sin\delta\times\sin\theta+h_{22}(t)\times b\times\beta\times e^{j(\omega+\lambda)}\times\cos\delta\times\cos\theta=0 \quad (397\text{-}2)$$

Accordingly, it is sufficient if the following holds true.

[MATH. 398]

$$b=\frac{h_{11}(t)}{h_{22}(t)}\times a\times e^{j(\mu-\omega)} \quad (398\text{-}1)$$

and $$\theta=-\delta+\frac{\pi}{2}+n\pi\text{ radians} \quad (398\text{-}2)$$

($n$ is an integer)

Accordingly, the communications station calculates θ, a, and b from the feedback information from the terminal so that the following is true.

[MATH. 399]

$$b=\frac{h_{11}(t)}{h_{22}(t)}\times a\times e^{j(\mu-\omega)} \quad (399\text{-}1)$$

and $$\theta=-\delta+\frac{\pi}{2}+n\pi\text{ radians} \quad (399\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 400]

$$|a|^2+|b|^2+|u|^2 \quad (400)$$

($|u|^2$ is a parameter based on average transmitted power)

(Precoding Method (12B-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 401]

$$\begin{pmatrix} q_{11} & q_{12} \\ q_{21} & q_{22} \end{pmatrix} \quad (401)$$

Accordingly, weighting synthesizer 306A calculates the following and outputs weighted signal 307A ($z_1(t)$).

[MATH. 402]

$$z_1(t)=q_{11}\times s_1(t)+q_{12}\times s_2(t) \quad (402)$$

Weighting synthesizer 306B calculates the following and outputs weighted signal 307B ($z_2(t)$).

[MATH. 403]

$$z_2(t)=q_{21}\times s_1(t)+q_{22}\times s_2(t) \quad (403)$$

Precoding method determiner 316 performs the calculations described in "(precoding method (12B))" based on feedback information from a terminal, and determines the precoding matrix.

[MATH. 404]

$$\begin{pmatrix} q_{11} & q_{12} \\ q_{21} & q_{22} \end{pmatrix}=\begin{pmatrix} a & 0 \\ 0 & b \end{pmatrix}\begin{pmatrix} \beta\times e^{j\mu}\times\cos\theta & -\beta\times e^{j(\mu+\lambda)}\times\sin\theta \\ \beta\times e^{j\omega}\times\sin\theta & \beta\times e^{j(\omega+\lambda)}\times\cos\theta \end{pmatrix}=\begin{pmatrix} a\times\beta\times e^{j\mu}\times\cos\theta & -a\times\beta\times e^{j(\mu+\lambda)}\times\sin\theta \\ b\times\beta\times e^{j\omega}\times\sin\theta & b\times\beta\times e^{j(\omega+\lambda)}\times\cos\theta \end{pmatrix} \quad (404)$$

In other words, the precoding matrix of the above equation is calculated. Here, based on feedback information from a terminal, precoding method determiner 316 uses

[MATH. 405]

$$b=\frac{h_{11}(t)}{h_{22}(t)}\times a\times e^{j(\mu-\omega)} \quad (405\text{-}1)$$

and $$\theta=-\delta+\frac{\pi}{2}+n\pi\text{ radians} \quad (405\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (12B-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 406]

$$\begin{pmatrix} q_{11} & q_{12} \\ q_{21} & q_{22} \end{pmatrix} \tag{406}$$

Accordingly, weighting synthesizer 306A calculates the following and outputs weighted signal 307A ($y_1(t)$).

[MATH. 407]

$$y_1(t)=q_{11}\times s_1(t)+q_{12}\times s_2(t) \tag{407}$$

Weighting synthesizer 306B calculates the following and outputs weighted signal 307B ($y_2(t)$).

[MATH. 408]

$$y_2(t)=q_{21}\times s_1(t)+q_{22}+s_2(t) \tag{408}$$

Precoding method determiner 316 performs the calculations described in "(precoding method (12B))" based on feedback information from a terminal, and determines the precoding matrix.

[MATH. 409]

$$\begin{pmatrix} q_{11} & q_{12} \\ q_{21} & q_{22} \end{pmatrix} = \begin{pmatrix} \beta\times e^{j\mu}\times\cos\theta & -\beta\times e^{j(\mu+\lambda)}\times\sin\theta \\ \beta\times e^{j\omega}\times\sin\theta & \beta\times e^{j(\omega+\lambda)}\times\cos\theta \end{pmatrix} \tag{409}$$

In other words, the precoding matrix of the above equation and values for a and b are calculated. Here, based on feedback information from a terminal, precoding method determiner 316 uses

[MATH. 410]

$$b=\frac{h_{11}(t)}{h_{22}(t)}\times a\times e^{j(\mu-\omega)} \tag{410-1}$$

-continued and $$\theta=-\delta+\frac{\pi}{2}+n\pi \text{ radians} \tag{410-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (13A))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 411]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix}+\begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix}+\begin{pmatrix} n_1(t) \\ n_2(t) \end{pmatrix}\end{aligned} \tag{411}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 412]

$$\begin{pmatrix} z_1(t) \\ z_2(t) \end{pmatrix} = \begin{pmatrix} a & 0 \\ 0 & b \end{pmatrix}\begin{pmatrix} e^{j\mu}\times\sin\theta & -e^{j(\mu+\lambda)}\times\cos\theta \\ e^{j\omega}\times\cos\theta & e^{j(\omega+\lambda)}\times\sin\theta \end{pmatrix}\begin{pmatrix} s_1(t) \\ s_2(t) \end{pmatrix} \tag{412}$$

($a$, $b$ are complex numbers (may be actual numbers))

In this case, the following equation holds true.

[MATH. 413]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \tag{413}$$

$$= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix}$$

$$= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} e^{j\mu}\times\sin\theta & -e^{j(\mu+\lambda)}\times\cos\theta \\ e^{j\omega}\times\cos\theta & e^{j(\omega+\lambda)}\times\sin\theta \end{pmatrix} \begin{pmatrix} s_1(t) \\ s_2(t) \end{pmatrix} + \begin{pmatrix} n_1(t) \\ n_2(t) \end{pmatrix}$$

$$= \begin{pmatrix} h_{11}(t)\times a\times e^{j\mu}\times\cos\delta\times\sin\theta - h_{22}(t)\times b\times e^{j\omega}\times\sin\delta\times\cos\theta & -h_{11}(t)\times a\times e^{j(\mu+\lambda)}\times\cos\delta\times\cos\theta - h_{22}(t)\times b\times e^{j(\omega+\lambda)}\times\sin\delta\times\sin\theta \\ h_{11}(t)\times a\times e^{j\mu}\times\sin\delta\times\sin\theta + h_{22}(t)\times b\times e^{j\omega}\times\cos\delta\times\cos\theta & -h_{11}(t)\times a\times e^{j(\mu+\lambda)}\times\sin\delta\times\cos\theta + h_{22}(t)\times b\times e^{j(\omega+\lambda)}\times\cos\delta\times\sin\theta \end{pmatrix} \begin{pmatrix} s_1(t) \\ s_2(t) \end{pmatrix} + \begin{pmatrix} n_1(t) \\ n_2(t) \end{pmatrix}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 414]

$$-h_{11}(t)\times a\times e^{j(\mu+\lambda)}\times\cos\delta\times\cos\theta - h_{22}(t)\times b\times e^{j(\omega+\lambda)}\times\sin\delta\times\sin\theta = 0 \tag{414-1}$$

$$h_{11}(t)\times a\times e^{j\mu}\sin\delta\times\sin\theta + h_{22}(t) + b\times e^{j\omega}\times\cos\delta\times\cos\theta = 0 \tag{414-2}$$

Accordingly, it is sufficient if the following holds true.

[MATH. 415]

$$b = \frac{h_{11}(t)}{h_{22}(t)}\times a\times e^{j(\mu-\omega)} \tag{415-1}$$

and $$\theta = \delta + \frac{\pi}{2} + n\pi \text{ radians} \tag{415-2}$$

($n$ is an integer)

Accordingly, the communications station calculates θ, a, and b from the feedback information from the terminal so that the following is true.

[MATH. 416]

$$b = \frac{h_{11}(t)}{h_{22}(t)}\times a\times e^{j(\mu-\omega)} \tag{416-1}$$

and

-continued $$\theta = \delta + \frac{\pi}{2} + n\pi \text{ radians} \tag{416-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 417]

$$|a|^2|b|^2+|u|^2 \tag{417}$$

($|u|^2$ is a parameter basad on average transmittad power)

(Precoding Method (13A-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 418]

$$\begin{pmatrix} q_{11} & q_{12} \\ q_{21} & q_{22} \end{pmatrix} \tag{418}$$

Accordingly, weighting synthesizer 306A calculates the following and outputs weighted signal 307A ($z_1(t)$).

[MATH. 419]

$$z_1(t)=q_{11}\times s_1(t)+q_{12}\times s_2(t) \tag{419}$$

Weighting synthesizer 306B calculates the following and outputs weighted signal 307B ($z_2(t)$).

[MATH. 420]

$$z_2(t)=q_{21}\times s_1(t)+q_{22}\times s_2(t) \tag{420}$$

Precoding method determiner 316 performs the calculations described in "(precoding method (13A))" based on feedback information from a terminal, and determines the precoding matrix.

[MATH. 421]

$$\begin{pmatrix} q_{11} & q_{12} \\ q_{21} & q_{22} \end{pmatrix} = \begin{pmatrix} a & 0 \\ 0 & b \end{pmatrix} \begin{pmatrix} e^{j\mu}\times\sin\theta & -e^{j(\mu+\lambda)}\times\cos\theta \\ e^{j\omega}\times\cos\theta & e^{j(\omega+\lambda)}\times\sin\theta \end{pmatrix} = \begin{pmatrix} a\times e^{j\mu}\times\sin\theta & -a\times e^{j(\mu+\lambda)}\times\cos\theta \\ b\times e^{j\omega}\times\cos\theta & b\times e^{j(\omega+\lambda)}\times\sin\theta \end{pmatrix} \tag{421}$$

In other words, the precoding matrix of the above equation is calculated. Here, based on feedback information from a terminal, precoding method determiner 316 uses

[MATH. 422]

$$b = \frac{h_{11}(t)}{h_{22}(t)} \times a \times e^{j(\mu-\omega)} \quad (422\text{-}1)$$

and $$\theta = \delta + \frac{\pi}{2} + n\pi \text{ radians} \quad (422\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (13A-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 423]

$$\begin{pmatrix} q_{11} & q_{12} \\ q_{21} & q_{22} \end{pmatrix} \quad (423)$$

Accordingly, weighting synthesizer 306A calculates the following and outputs weighted signal 307A ($y_1(t)$).

[MATH. 424]

$$y_1(t) = q_{11} \times s_1(t) + q_{12} \times s_2(t) \quad (424)$$

Weighting synthesizer 306B calculates the following and outputs weighted signal 307B ($y_2(t)$).

[MATH. 425]

$$y_2(t) = q_{21} \times s_1(t) + q_{22} \times s_2(t) \quad (425)$$

Precoding method determiner 316 performs the calculations described in "(precoding method (13A))" based on feedback information from a terminal, and determines the precoding matrix.

[MATH. 426]

$$\begin{pmatrix} q_{11} & q_{12} \\ q_{21} & q_{22} \end{pmatrix} = \begin{pmatrix} e^{j\mu} \times \sin\theta & -e^{j(\mu+\lambda)} \times \cos\theta \\ e^{j\omega} \times \cos\theta & e^{j(\omega+\lambda)} \times \sin\theta \end{pmatrix} \quad (426)$$

In other words, the precoding matrix of the above equation and values for a and b are calculated. Here, based on feedback information from a terminal, precoding method determiner 316 uses

[MATH. 427]

$$b = \frac{h_{11}(t)}{h_{22}(t)} \times a \times e^{j(\mu-\omega)} \quad (427\text{-}1)$$

and $$\theta = \delta + \frac{\pi}{2} + n\pi \text{ radians} \quad (427\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (13B))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 428]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \quad (428)$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 429]

$$\begin{pmatrix} z_1(t) \\ z_2(t) \end{pmatrix} = \begin{pmatrix} a & 0 \\ 0 & b \end{pmatrix} \begin{pmatrix} e^{j\mu} \times \sin\theta & -e^{j(\mu+\lambda)} \times \cos\theta \\ e^{j\omega} \times \cos\theta & e^{j(\omega+\lambda)} \times \sin\theta \end{pmatrix} \begin{pmatrix} s_1(t) \\ s_2(t) \end{pmatrix} \tag{429}$$

($a$, $b$ are complex numbers (may be actual numbers)

In this case, the following equation holds true.

[MATH. 430]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t) \times \cos\delta & -h_{22}(t) \times \sin\delta \\ h_{11}(t) \times \sin\delta & h_{22}(t) \times \cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t) \times \cos\delta & -h_{22}(t) \times \sin\delta \\ h_{11}(t) \times \sin\delta & h_{22}(t) \times \cos\delta \end{pmatrix} \begin{pmatrix} a & 0 \\ 0 & b \end{pmatrix} \\ &\quad \begin{pmatrix} e^{j\mu} \times \sin\theta & -e^{j(\mu+\lambda)} \times \cos\theta \\ e^{j\omega} \times \cos\theta & e^{j(\omega+\lambda)} \times \sin\theta \end{pmatrix} \\ &\quad \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t) \times a \times e^{j\mu} \times \cos\delta \times \sin\theta - h_{22}(t) \times b \times e^{j\omega} \times \sin\delta \times \cos\theta & -h_{11}(t) \times a \times e^{j(\mu+\lambda)} \times \cos\delta \times \cos\theta - h_{22}(t) \times b \times e^{j(\omega+\lambda)} \times \sin\delta \times \sin\theta \\ h_{11}(t) \times a \times e^{j\mu} \times \sin\delta \times \sin\theta + h_{22}(t) \times b \times e^{j\omega} \times \cos\delta \times \cos\theta & -h_{11}(t) \times a \times e^{j(\mu+\lambda)} \times \sin\delta \times \cos\theta + h_{22}(t) \times b \times e^{j(\omega+\lambda)} \times \cos\delta \times \sin\theta \end{pmatrix} \\ &\quad \begin{pmatrix} s_1(t) \\ s_2(t) \end{pmatrix} + \begin{pmatrix} n_1(t) \\ n_2(t) \end{pmatrix} \end{aligned} \tag{430}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 431]

$$h_{11}(t) \times a \times e^{j\mu} \cos\delta \times \sin\theta - h_{22}(t) \times b \times e^{j\omega} \times \sin\delta \times \cos\theta = 0 \tag{431-1}$$

$$-h_{11}(t) \times a \times e^{j(\mu+\lambda)} \times \sin\delta \times \cos\theta + h_{22}(t) \times b \times e^{j(\omega+\lambda)} \times \cos\delta \times \sin\theta = 0 \tag{431-2}$$

Accordingly, it is sufficient if the following holds true.

[MATH. 432]

$$b = \frac{h_{11}(t)}{h_{22}(t)} \times a \times e^{j(\mu-\omega)} \tag{432-1}$$

and

-continued $$\theta = \delta + n\pi \text{ radians} \tag{432-2}$$

($n$ is an integer)

Accordingly, the communications station calculates θ, a, and b from the feedback information from the terminal so that the following is true.

[MATH. 433]

$$b = \frac{h_{11}(t)}{h_{22}(t)} \times a \times e^{j(\mu-\omega)} \tag{433-1}$$

and $$\theta = \delta + n\pi \text{ radians} \tag{433-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 434]

$$|a|^2 + |b|^2 + |u|^2 \tag{434}$$

($|\mu|^2$ is a parameter based on average transmitted power)

(Precoding Method (13B-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 435]

$$\begin{pmatrix} q_{11} & q_{12} \\ q_{21} & q_{22} \end{pmatrix} \tag{435}$$

Accordingly, weighting synthesizer 306A calculates the following and outputs weighted signal 307A ($z_1(t)$).

[MATH. 436]

$$z_1(t) = q_{11} \times s_1(t) + q_{12} \times s_2(t) \tag{436}$$

Weighting synthesizer 306B calculates the following and outputs weighted signal 307B ($z_2(t)$).

[MATH. 437]

$$z_2(t) = q_{21} \times s_1(t) + q_{22} \times s_2(t) \tag{437}$$

Precoding method determiner 316 performs the calculations described in "(precoding method (13B))" based on feedback information from a terminal, and determines the precoding matrix.

[MATH. 438]

$$\begin{pmatrix} q_{11} & q_{12} \\ q_{21} & q_{22} \end{pmatrix} = \begin{pmatrix} a & 0 \\ 0 & b \end{pmatrix} \begin{pmatrix} e^{j\mu} \times \sin\theta & -e^{j(\mu+\lambda)} \times \cos\theta \\ e^{j\omega} \times \cos\theta & e^{j(\omega+\lambda)} \times \sin\theta \end{pmatrix} = \begin{pmatrix} a \times e^{j\mu} \times \sin\theta & -a \times e^{j(\mu+\lambda)} \times \cos\theta \\ b \times e^{j\omega} \times \cos\theta & b \times e^{j(\omega+\lambda)} \times \sin\theta \end{pmatrix} \tag{438}$$

In other words, the precoding matrix of the above equation is calculated. Here, based on feedback information from a terminal, precoding method determiner 316 uses

[MATH. 439]

$$b = \frac{h_{11}(t)}{h_{22}(t)} \times a \times e^{j(\mu-\omega)} \tag{439-1}$$

and $$\theta = \delta + n\pi \text{ radians} \tag{439-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (13B-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 440]

$$\begin{pmatrix} q_{11} & q_{12} \\ q_{21} & q_{22} \end{pmatrix} \tag{440}$$

Accordingly, weighting synthesizer 306A calculates the following and outputs weighted signal 307A ($y_1(t)$).

[MATH. 441]

$$y_1(t) = q_{11} \times s_1(t) + q_{12} \times s_2(t) \tag{441}$$

Weighting synthesizer 306B calculates the following and outputs weighted signal 307B ($y_2(t)$).

[MATH. 442]

$$y_2(t) = q_{21} \times s_1(t) + q_{22} \times s_2(t) \tag{442}$$

Precoding method determiner 316 performs the calculations described in "(precoding method (13B))" based on feedback information from a terminal, and determines the precoding matrix.

[MATH. 443]

$$\begin{pmatrix} q_{11} & q_{12} \\ q_{21} & q_{22} \end{pmatrix} = \begin{pmatrix} e^{j\mu} \times \sin\theta & -e^{j(\mu+\lambda)} \times \cos\theta \\ e^{j\omega} \times \cos\theta & e^{j(\omega+\lambda)} \times \sin\theta \end{pmatrix} \tag{443}$$

In other words, the precoding matrix of the above equation and values for a and b are calculated. Here, based on feedback information from a terminal, precoding method determiner 316 uses

[MATH. 444]

$$b = \frac{h_{11}(t)}{h_{22}(t)} \times a \times e^{j(\mu-\omega)} \tag{444-1}$$

and $$\theta = \delta + n\pi \text{ radians} \tag{444-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (14A))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 445]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \tag{445}$$

Here, when $z_1(t)=s_1(t)$ and $z_2(t)=s_2(t)$ ($s_1(t)$ and $s_2(t)$ are mapped baseband signals), excluding when $\delta=0$, $\pi/2$, $\pi$, or $3\pi/2$ radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 446]

$$\begin{pmatrix} z_1(t) \\ z_2(t) \end{pmatrix} = \begin{pmatrix} a & 0 \\ 0 & b \end{pmatrix} \begin{pmatrix} \beta \times e^{j\mu} \times \sin\theta & -\beta \times e^{j(\mu+\lambda)} \times \cos\theta \\ \beta \times e^{j\omega} \times \cos\theta & \beta \times e^{j(\omega+\lambda)} \times \sin\theta \end{pmatrix} \begin{pmatrix} s_1(t) \\ s_2(t) \end{pmatrix} \tag{446}$$

($a$, $b$, $\beta$ are complex numbers (may be actual numbers))

In this case, the following equation holds true.

[MATH. 447]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t) \times \cos\delta & -h_{22}(t) \times \sin\delta \\ h_{11}(t) \times \sin\delta & h_{22}(t) \times \cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t) \times \cos\delta & -h_{22}(t) \times \sin\delta \\ h_{11}(t) \times \sin\delta & h_{22}(t) \times \cos\delta \end{pmatrix} \begin{pmatrix} a & 0 \\ 0 & b \end{pmatrix} \begin{pmatrix} \beta \times e^{j\mu} \times \sin\theta & -\beta \times e^{j(\mu+\lambda)} \times \cos\theta \\ \beta \times e^{j\omega} \times \cos\theta & \beta \times e^{j(\omega+\lambda)} \times \sin\theta \end{pmatrix} \\ &\quad \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t) \times a \times \beta \times e^{j\mu}\cos\delta \times \sin\theta - & -h_{11}(t) \times a \times \beta \times e^{j(\mu+\lambda)} \times \cos\delta \times \cos\theta - \\ h_{22}(t) \times b \times \beta \times e^{j\omega} \times \sin\delta \times \cos\theta & h_{22}(t) \times b \times \beta \times e^{j(\omega+\lambda)} \times \sin\delta \times \sin\theta \\ h_{11}(t) \times a \times \beta \times e^{j\mu}\sin\delta \times \sin\theta + & -h_{11}(t) \times a \times \beta \times e^{j(\mu+\lambda)} \times \sin\delta \times \cos\theta + \\ h_{22}(t) \times b \times \beta \times e^{j\omega} \times \cos\delta \times \cos\theta & h_{22}(t) \times b \times \beta \times e^{j(\omega+\lambda)} \times \cos\delta \times \sin\theta \end{pmatrix} \\ &\quad \begin{pmatrix} s_1(t) \\ s_2(t) \end{pmatrix} + \begin{pmatrix} n_1(t) \\ n_2(t) \end{pmatrix} \end{aligned} \tag{447}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 448]

$$-h_{11}(t) \times a \times \beta \times e^{j(\mu+\lambda)} \times \cos\delta \times \cos\theta - h_{22}(t) \times b \times \beta \times e^{j(\omega+\lambda)} \times \sin\delta \times \sin\theta = 0 \tag{448-1}$$

$$h_{11}(t) \times a \times \beta \times e^{j\mu}\sin\delta \times \sin\theta + h_{22}(t) \times b \times \beta \times e^{j\omega} + \times \cos\delta \times \cos\theta = 0 \tag{448-2}$$

Accordingly, it is sufficient if the following holds true.

[MATH. 449]

$$b = \frac{h_{11}(t)}{h_{22}(t)} \times a \times e^{j(\mu-\omega)} \tag{449-1}$$

and $$\theta = \delta + \frac{\pi}{2} + n\pi \text{ radians} \tag{449-2}$$

($n$ is an integer)

Accordingly, the communications station calculates $\theta$, a, and b from the feedback information from the terminal so that the following is true.

[MATH. 450]

$$b = \frac{h_{11}(t)}{h_{22}(t)} \times a \times e^{j(\mu-\omega)} \tag{450-1}$$

and $$\theta = \delta + \frac{\pi}{2} + n\pi \text{ radians} \tag{450-2}$$

The communications station performs the precoding using these values.

For example, the communications station transmits a training symbol, and the terminal performs channel estimation from the training symbol and provides the channel estimation value to the communications station as feedback. The communications station then calculates the values for $\theta$, a, and b by using the information provided as feedback.

Note that because of the average transmitted power, the following relation equation holds true.

[MATH. 451]

$$|a|^2+|b|^2=|u|^2 \tag{451}$$

($|\mu|^2$ is a parameter based on average transmitted power)

(Precoding Method (14A-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 452]

$$\begin{pmatrix} q_{11} & q_{12} \\ q_{21} & q_{22} \end{pmatrix} \tag{452}$$

Accordingly, weighting synthesizer 306A calculates the following and outputs weighted signal 307A ($z_1(t)$).

[MATH. 453]

$$z_1(t)=q_{11}\times s_1(t)+q_{12}\times s_2(t) \tag{453}$$

Weighting synthesizer 306B calculates the following and outputs weighted signal 307B ($z_2(t)$).

[MATH. 454]

$$z_2(t)=q_{21}\times s_1(t)+q_{22}\times s_2(t) \tag{454}$$

Precoding method determiner 316 performs the calculations described in "(precoding method (14A))" based on feedback information from a terminal, and determines the precoding matrix.

[MATH. 455]

$$\begin{aligned}\begin{pmatrix} q_{11} & q_{12} \\ q_{21} & q_{22} \end{pmatrix} &= \begin{pmatrix} a & 0 \\ 0 & b \end{pmatrix}\begin{pmatrix} \beta\times e^{j\mu}\times\sin\theta & -\beta\times e^{j(\mu+\lambda)}\times\cos\theta \\ \beta\times e^{j\omega}\times\cos\theta & \beta\times e^{j(\omega+\lambda)}\times\sin\theta \end{pmatrix} \\ &= \begin{pmatrix} a\times\beta\times e^{j\mu}\times\sin\theta & -a\times\beta\times e^{j(\mu+\lambda)}\times\cos\theta \\ b\times\beta\times e^{j\omega}\times\cos\theta & b\times\beta\times e^{j(\omega+\lambda)}\times\sin\theta \end{pmatrix}\end{aligned} \tag{455}$$

In other words, the precoding matrix of the above equation is calculated. Here, based on feedback information from a terminal, precoding method determiner 316 uses

[MATH. 456]

$$b=\frac{h_{11}(t)}{h_{22}(t)}\times a\times e^{j(\mu-\omega)} \tag{456-1}$$

and $$\theta=\delta+\frac{\pi}{2}+n\pi \text{ radians} \tag{456-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (14A-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 457]

$$\begin{pmatrix} q_{11} & q_{12} \\ q_{21} & q_{22} \end{pmatrix} \tag{457}$$

Accordingly, weighting synthesizer 306A calculates the following and outputs weighted signal 307A ($y_1(t)$).

[MATH. 458]

$$y_1(t)=q_{11}\times s_1(t)+q_{12}\times s_2(t) \tag{458}$$

Weighting synthesizer 306B calculates the following and outputs weighted signal 307B ($y_2(t)$).

[MATH. 459]

$$y_2(t)=q_{21}\times s_1(t)+q_{22}\times s_2(t) \tag{459}$$

Precoding method determiner 316 performs the calculations described in "(precoding method (14A))" based on feedback information from a terminal, and determines the precoding matrix.

[MATH. 460]

$$\begin{pmatrix} q_{11} & q_{12} \\ q_{21} & q_{22} \end{pmatrix} = \begin{pmatrix} \beta\times e^{j\mu}\times\sin\theta & -\beta\times e^{j(\mu+\lambda)}\times\cos\theta \\ \beta\times e^{j\omega}\times\cos\theta & \beta\times e^{j(\omega+\lambda)}\times\sin\theta \end{pmatrix} \tag{460}$$

In other words, the precoding matrix of the above equation and values for a and b are calculated. Here, based on feedback information from a terminal, precoding method determiner 316 uses

[MATH. 461]

$$b=\frac{h_{11}(t)}{h_{22}(t)}\times a\times e^{j(\mu-\omega)} \tag{461-1}$$

-continued and $$\theta = \delta + \frac{\pi}{2} + n\pi \text{ radians} \tag{461-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (14B))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 462]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix}\end{aligned} \tag{462}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 463]

$$\begin{pmatrix} z_1(t) \\ z_2(t) \end{pmatrix} = \begin{pmatrix} a & 0 \\ 0 & b \end{pmatrix} \begin{pmatrix} \beta\times e^{j\mu}\times\sin\theta & -\beta\times e^{j(\mu+\lambda)}\times\cos\theta \\ \beta\times e^{j\omega}\times\cos\theta & \beta\times e^{j(\omega+\lambda)}\times\sin\theta \end{pmatrix} \begin{pmatrix} s_1(t) \\ s_2(t) \end{pmatrix} \tag{463}$$

($a$, $b$, $\beta$ are complex numbers(may be actual numbers))

In this case, the following equation holds true.

[MATH. 464]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \\ &\quad \begin{pmatrix} \beta\times e^{j\mu}\times\sin\theta & -\beta\times e^{j(\mu+\lambda)}\times\cos\theta \\ \beta\times e^{j\omega}\times\cos\theta & \beta\times e^{j(\omega+\lambda)}\times\sin\theta \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} \begin{matrix} h_{11}(t)\times a\times\beta\times e^{j\mu}\times \\ \cos\delta\times\sin\theta - \\ h_{22}(t)\times b\times\beta\times e^{j\omega}\times \\ \sin\delta\times\cos\theta \end{matrix} & \begin{matrix} -h_{11}(t)\times a\times\beta\times e^{j(\mu+\lambda)}\times \\ \cos\delta\times\cos\theta - \\ h_{22}(t)\times b\times\beta\times e^{j(\omega+\lambda)}\times \\ \sin\delta\times\sin\theta \end{matrix} \\ \begin{matrix} h_{11}(t)\times a\times\beta\times e^{j\mu}\times \\ \sin\delta\times\sin\theta + \\ h_{22}(t)\times b\times\beta\times e^{j\omega}\times \\ \cos\delta\times\cos\theta \end{matrix} & \begin{matrix} -h_{11}(t)\times a\times\beta\times e^{j(\mu+\lambda)}\times \\ \sin\delta\times\cos\theta + \\ h_{22}(t)\times b\times\beta\times e^{j(\omega+\lambda)}\times \\ \cos\delta\times\sin\theta \end{matrix} \end{pmatrix} \\ &\quad \begin{pmatrix} s_1(t) \\ s_2(t) \end{pmatrix} + \begin{pmatrix} n_1(t) \\ n_2(t) \end{pmatrix}\end{aligned} \tag{464}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 465]

$$h_{11}(t)\times a\times\beta\times e^{j\mu}\cos\delta\times\sin\theta - h_{22}(t)\times b\times\beta\times e^{j\omega}\times\sin\delta\times\cos\theta = 0 \tag{465-1}$$

$$-h_{11}(t)\times a\times\beta\times e^{j(\mu+\lambda)}\times\sin\delta\times\cos\theta + h_{22}(t)\times b\times\beta\times e^{j(\omega+\lambda)}\times\cos\delta\times\sin\theta = 0 \tag{465-2}$$

Accordingly, it is sufficient if the following holds true.

[MATH. 466]

$$b = \frac{h_{11}(t)}{h_{22}(t)} \times a \times e^{j(\mu-\omega)} \tag{466-1}$$

and $$\theta = \delta + n\pi \text{ radians} \tag{466-2}$$

($n$ is an integer)

Accordingly, the communications station calculates θ, a, and b from the feedback information from the terminal so that the following is true.

[MATH. 467]

$$b = \frac{h_{11}(t)}{h_{22}(t)} \times a \times e^{j(\mu-\omega)} \tag{467-1}$$

and $$\theta = \delta + n\pi \text{ radians} \tag{467-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 468]

$$|a|^2+|b|^2=|u|^2 \tag{468}$$

($|u|^2$ is a parameter based an average transmitted power)

(Precoding Method (14B-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 469]

$$\begin{pmatrix} q_{11} & q_{12} \\ q_{21} & q_{22} \end{pmatrix} \tag{469}$$

Accordingly, weighting synthesizer 306A calculates the following and outputs weighted signal 307A ($z_1(t)$).

[MATH. 470]

$$z_1(t)=q_{11}\times s_1(t)+q_{12}\times s_1(t) \tag{470}$$

Weighting synthesizer 306B calculates the following and outputs weighted signal 307B ($z_2(t)$).

[MATH. 471]

$$z_2(t)=q_{21}\times s_1(t)+q_{22}\times s_2(t) \tag{471}$$

Precoding method determiner 316 performs the calculations described in "(precoding method (14B))" based on feedback information from a terminal, and determines the precoding matrix.

[MATH. 472]

$$\begin{aligned}\begin{pmatrix} q_{11} & q_{12} \\ q_{21} & q_{22} \end{pmatrix} &= \begin{pmatrix} a & 0 \\ 0 & b \end{pmatrix}\begin{pmatrix} \beta\times e^{j\mu}\times\sin\theta & -\beta\times e^{j(\mu+\lambda)}\times\cos\theta \\ \beta\times e^{j\omega}\times\cos\theta & \beta\times e^{j(\omega+\lambda)}\times\sin\theta \end{pmatrix} \\ &= \begin{pmatrix} a\times\beta\times e^{j\mu}\times\sin\theta & -a\times\beta\times e^{j(\mu+\lambda)}\times\cos\theta \\ b\times\beta\times e^{j\omega}\times\cos\theta & b\times\beta\times e^{j(\omega+\lambda)}\times\sin\theta \end{pmatrix}\end{aligned} \tag{472}$$

In other words, the precoding matrix of the above equation is calculated. Here, based on feedback information from a terminal, precoding method determiner 316 uses

[MATH. 473]

$$b=\frac{h_{11}(t)}{h_{22}(t)}\times a\times e^{j(\mu-\omega)} \tag{473-1}$$

-continued and $$\theta=\delta+n\pi \text{ radians} \tag{473-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (14B-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 474]

$$\begin{pmatrix} q_{11} & q_{12} \\ q_{21} & q_{22} \end{pmatrix} \tag{474}$$

Accordingly, weighting synthesizer 306A calculates the following and outputs weighted signal 307A ($y_1(t)$).

[MATH. 475]

$$y_1(t)=q_{11}\times s_1(t)+q_{12}\times s_2(t) \tag{475}$$

Weighting synthesizer 306B calculates the following and outputs weighted signal 307B ($y_2(t)$).

[MATH. 476]

$$y_2(t)=q_{21}\times s_1(t)+q_{22}\times s_2(t) \tag{476}$$

Precoding method determiner 316 performs the calculations described in "(precoding method (14B))" based on feedback information from a terminal, and determines the precoding matrix.

[MATH. 477]

$$\begin{pmatrix} q_{11} & q_{12} \\ q_{21} & q_{22} \end{pmatrix}\begin{pmatrix} \beta\times e^{j\mu}\times\sin\theta & -\beta\times e^{j(\mu+\lambda)}\times\cos\theta \\ \beta\times e^{j\omega}\times\cos\theta & \beta\times e^{j(\omega+\lambda)}\times\sin\theta \end{pmatrix} \quad (477)$$

In other words, the precoding matrix of the above equation and values for a and b are calculated. Here, based on feedback information from a terminal, precoding method determiner 316 uses

[MATH. 478]

$$b=\frac{h_{11}(t)}{h_{22}(t)}\times a\times e^{j(\mu-\omega)} \quad (478\text{-}1)$$

and $$\theta=\delta+n\pi \text{ radians} \quad (478\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (15A))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 479]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix}+\begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix}+\begin{pmatrix} n_1(t) \\ n_2(t) \end{pmatrix}\end{aligned} \quad (479)$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 480]

$$\begin{pmatrix} z_1(t) \\ z_2(t) \end{pmatrix}=\begin{pmatrix} a & 0 \\ 0 & b \end{pmatrix}\begin{pmatrix} e^{j\mu}\times\sin\theta & e^{j(\mu+\lambda)}\times\cos\theta \\ e^{j\omega}\times\cos\theta & -e^{j(\omega+\lambda)}\times\sin\theta \end{pmatrix}\begin{pmatrix} s_1(t) \\ s_2(t) \end{pmatrix} \quad (480)$$

($a$, $b$, are complex numbers (may be actual numbers))

In this case, the following equation holds true.

[MATH. 481]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix}+\begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} z_1(t) \\ z_2(t) \end{pmatrix}+\begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} a & 0 \\ 0 & b \end{pmatrix} \\ &\quad \begin{pmatrix} e^{j\mu}\times\sin\theta & e^{j(\mu+\lambda)}\times\cos\theta \\ e^{j\omega}\times\cos\theta & -e^{j(\omega+\lambda)}\times\sin\theta \end{pmatrix}\begin{pmatrix} s_1(t) \\ s_2(t) \end{pmatrix}+\begin{pmatrix} n_1(t) \\ n_2(t) \end{pmatrix} \\ &= \begin{pmatrix} \begin{matrix} h_{11}(t)\times a\times e^{j\mu}\times \\ \cos\delta\times\sin\theta- \\ h_{22}(t)\times b\times e^{j\omega}\times \\ \sin\delta\times\cos\theta \end{matrix} & \begin{matrix} h_{11}(t)\times a\times e^{j(\mu+\lambda)}\times \\ \cos\delta\times\cos\theta+ \\ h_{22}(t)\times b\times e^{j(\omega+\lambda)}\times \\ \sin\delta\times\sin\theta \end{matrix} \\ \begin{matrix} h_{11}(t)\times a\times e^{j\mu}\times \\ \sin\delta\times\sin\theta+ \\ h_{22}(t)\times b\times e^{j\omega}\times \\ \cos\delta\times\cos\theta \end{matrix} & \begin{matrix} h_{11}(t)\times a\times e^{j(\mu+\lambda)}\times \\ \sin\delta\times\cos\theta- \\ h_{22}(t)\times b\times e^{j(\omega+\lambda)}\times \\ \cos\delta\times\sin\theta \end{matrix} \end{pmatrix} \\ &\quad \begin{pmatrix} s_1(t) \\ s_2(t) \end{pmatrix}+\begin{pmatrix} n_1(t) \\ n_2(t) \end{pmatrix}\end{aligned} \quad (481)$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 482]

$$h_{11}(t)\times a\times e^{j(\mu+\lambda)}\times\cos\delta\times\cos\theta+h_{22}(t)\times b\times e^{j(\omega+\lambda)}\times\sin\delta\times\sin\theta=0 \quad (482\text{-}1)$$

$$h_{11}(t)\times a\times e^{j\mu}\times\sin\delta\times\sin\theta+h_{22}(t)\times b\times e^{j\omega}\times\cos\delta\times\cos\theta=0 \quad (482\text{-}2)$$

Accordingly, it is sufficient if the following holds true.

[MATH. 483]

$$b=\frac{h_{11}(t)}{h_{22}(t)}\times a\times e^{j(\mu-\omega)} \quad (483\text{-}1)$$

-continued and $$\theta = \delta + \frac{\pi}{2} + n\pi \text{ radians} \quad (483\text{-}2)$$

($n$ is an integer)

Accordingly, the communications station calculates θ, a, and b from the feedback information from the terminal so that the following is true.

[MATH. 484]

$$b = \frac{h_{11}(t)}{h_{22}(t)} \times a \times e^{j(\mu-\omega)} \quad (484\text{-}1)$$

and $$\theta = \delta + \frac{\pi}{2} + n\pi \text{ radians} \quad (484\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 485]

$$|a|^2+|b|^2=|u|^2 \quad (485)$$

($|u|^2$ is a parameter based on average transmitted power)

(Precoding Method (15A-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 486]

$$\begin{pmatrix} q_{11} & q_{12} \\ q_{21} & q_{22} \end{pmatrix} \quad (486)$$

Accordingly, weighting synthesizer 306A calculates the following and outputs weighted signal 307A ($z_1(t)$).

[MATH. 487]

$$z_1(t)=q_{11}\times s_1(t)+q_{12}\times s_2(t) \quad (487)$$

Weighting synthesizer 306B calculates the following and outputs weighted signal 307B ($z_2(t)$).

[MATH. 488]

$$z_2(t)=q_{21}\times s_1(t)+q_{22}\times s_2(t) \quad (488)$$

Precoding method determiner 316 performs the calculations described in "(precoding method (15A))" based on feedback information from a terminal, and determines the precoding matrix.

[MATH. 489]

$$\begin{pmatrix} q_{11} & q_{12} \\ q_{21} & q_{22} \end{pmatrix} = \begin{pmatrix} a & 0 \\ 0 & b \end{pmatrix} \begin{pmatrix} e^{j\mu}\times\sin\theta & e^{j(\mu+\lambda)}\times\cos\theta \\ e^{j\omega}\times\cos\theta & -e^{j(\omega+\lambda)}\times\sin\theta \end{pmatrix} = \begin{pmatrix} a\times e^{j\mu}\times\sin\theta & a\times e^{j(\mu+\lambda)}\times\cos\theta \\ b\times e^{j\omega}\times\cos\theta & -b\times e^{j(\omega+\lambda)}\times\sin\theta \end{pmatrix} \quad (489)$$

In other words, the precoding matrix of the above equation is calculated. Here, based on feedback information from a terminal, precoding method determiner 316 uses

[MATH. 490]

$$b = \frac{h_{11}(t)}{h_{22}(t)} \times a \times e^{j(\mu-\omega)} \text{ and} \quad (490\text{-}1)$$

$$\theta = \delta + \frac{\pi}{2} + n\pi \text{ radians} \quad (490\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (15A-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 491]

$$\begin{pmatrix} q_{11} & q_{12} \\ q_{21} & q_{22} \end{pmatrix} \quad (491)$$

Accordingly, weighting synthesizer 306A calculates the following and outputs weighted signal 307A ($y_1(t)$).

[MATH. 492]

$$y_1(t)=q_{11}\times s_1(t)+q_{12}\times s_2(t) \tag{492}$$

Weighting synthesizer 306B calculates the following and outputs weighted signal 307B ($y_2(t)$).

[MATH. 493]

$$y_2(t)=q_{21}\times s_1(t)+q_{22}\times s_2(t) \tag{493}$$

Precoding method determiner 316 performs the calculations described in "(precoding method (15A))" based on feedback information from a terminal, and determines the precoding matrix.

[MATH. 494]

$$\begin{pmatrix} q_{11} & q_{12} \\ q_{21} & q_{22} \end{pmatrix} = \begin{pmatrix} e^{j\mu}\times\sin\theta & e^{j(\mu+\lambda)}\times\cos\theta \\ e^{j\omega}\times\cos\theta & -e^{j(\omega+\lambda)}\times\sin\theta \end{pmatrix} \tag{494}$$

In other words, the precoding matrix of the above equation and values for a and b are calculated. Here, based on feedback information from a terminal, precoding method determiner 316 uses

[MATH. 495]

$$b=\frac{h_{11}(t)}{h_{22}(t)}\times a\times e^{j(\mu-\omega)} \text{ and} \tag{495-1}$$

$$\theta=\delta+\frac{\pi}{2}+n\pi \text{ radians} \tag{495-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (15B))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 496]

$$\begin{pmatrix} r_1(t) \\ r_2(t) \end{pmatrix} = \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix} \tag{496}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 497]

$$\begin{pmatrix} z_1(t) \\ z_2(t) \end{pmatrix} = \begin{pmatrix} a & 0 \\ 0 & b \end{pmatrix}\begin{pmatrix} e^{j\mu}\times\sin\theta & e^{j(\mu+\lambda)}\times\cos\theta \\ e^{j\omega}\times\cos\theta & -e^{j(\omega+\lambda)}\times\sin\theta \end{pmatrix}\begin{pmatrix} s_1(t) \\ s_2(t) \end{pmatrix} \tag{497}$$

($a$, $b$ are complex numbers (may be actual numbers))

In this case, the following equation holds true.

[MATH. 498]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} a & 0 \\ 0 & b \end{pmatrix} \\ &\quad \begin{pmatrix} e^{j\mu}\times\sin\theta & e^{j(\mu+\lambda)}\times\cos\theta \\ e^{j\omega}\times\cos\theta & -e^{j(\omega+\lambda)}\times\sin\theta \end{pmatrix}\begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times e^{j\mu}\times\cos\delta\times\sin\theta - h_{22}(t)\times b\times e^{j\omega}\times\sin\delta\times\cos\theta & h_{11}(t)\times a\times e^{j(\mu+\lambda)}\times\cos\delta\times\cos\theta + h_{22}(t)\times b\times e^{j(\omega+\lambda)}\times\sin\delta\times\sin\theta \\ h_{11}(t)\times a\times e^{j\mu}\times\sin\delta\times\sin\theta + h_{22}(t)\times b\times e^{j\omega}\times\cos\delta\times\cos\theta & h_{11}(t)\times a\times e^{j(\mu+\lambda)}\times\sin\delta\times\cos\theta - h_{22}(t)\times b\times e^{j(\omega+\lambda)}\times\cos\delta\times\sin\theta \end{pmatrix} \\ &\quad \begin{pmatrix} s_1(t) \\ s_2(t) \end{pmatrix} + \begin{pmatrix} n_1(t) \\ n_2(t) \end{pmatrix} \end{aligned} \tag{498}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 499]

$$h_{11}(t)\times a\times e^{j\mu}\cos\delta\times\sin\theta-h_{22}(t)\times b\times e^{j\omega}\times\sin\delta\times\cos\theta=0 \tag{499-1}$$

$$h_{11}(t)\times a\times e^{j(\mu+\lambda)}\times\sin\delta\times\cos\theta-h_{22}(t)\times b\times e^{j(\omega+\lambda)}\times\cos\delta\times\sin\theta=0 \quad (499\text{-}2)$$

Accordingly, it is sufficient if the following holds true.

[MATH. 500]

$$b=\frac{h_{11}(t)}{h_{22}(t)}\times a\times e^{j(\mu-\omega)} \text{ and} \quad (500\text{-}1)$$

$$\theta=\delta+n\pi \text{ radians} \quad (500\text{-}2)$$

($n$ is an integer)

Accordingly, the communications station calculates θ, a, and b from the feedback information from the terminal so that the following is true.

[MATH. 501]

$$b=\frac{h_{11}(t)}{h_{22}(t)}\times a\times e^{j(\mu-\omega)} \text{ and} \quad (501\text{-}1)$$

$$\theta=\delta+n\pi \text{ radians} \quad (501\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 502]

$$|a|^2+|b|^2=|u|^2 \quad (502)$$

($|u|^2$ is a parameter based on average trmsmitted power)

(Precoding Method (15B-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 503]

$$\begin{pmatrix} q_{11} & q_{12} \\ q_{21} & q_{22} \end{pmatrix} \quad (503)$$

Accordingly, weighting synthesizer 306A calculates the following and outputs weighted signal 307A ($z_1(t)$).

[MATH. 504]

$$z_1(t)=q_{11}\times s_1(t)+q_{12}\times s_2(t) \quad (504)$$

Weighting synthesizer 306B calculates the following and outputs weighted signal 307B ($z_2(t)$).

[MATH. 505]

$$z_2(t)=q_{21}\times s_1(t)+q_{22}\times s_2(t) \quad (505)$$

Precoding method determiner 316 performs the calculations described in "(precoding method (15B))" based on feedback information from a terminal, and determines the precoding matrix.

[MATH. 506]

$$\begin{pmatrix} q_{11} & q_{12} \\ q_{21} & q_{22} \end{pmatrix}=\begin{pmatrix} a & 0 \\ 0 & b \end{pmatrix}\begin{pmatrix} e^{j\mu}\times\sin\theta & e^{j(\mu+\lambda)}\times\cos\theta \\ e^{j\omega}\times\cos\theta & -e^{j(\omega+\lambda)}\times\sin\theta \end{pmatrix}=\begin{pmatrix} a\times e^{j\mu}\times\sin\theta & a\times e^{j(\mu+\lambda)}\times\cos\theta \\ b\times e^{j\omega}\times\cos\theta & -b\times e^{j(\omega+\lambda)}\times\sin\theta \end{pmatrix} \quad (506)$$

In other words, the precoding matrix of the above equation is calculated. Here, based on feedback information from a terminal, precoding method determiner 316 uses

[MATH. 507]

$$b=\frac{h_{11}(t)}{h_{22}(t)}\times a\times e^{j(\mu-\omega)} \text{ and} \quad (507\text{-}1)$$

$$\theta=\delta+n\pi \text{ radians} \quad (507\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (15B-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 508]

$$\begin{pmatrix} q_{11} & q_{12} \\ q_{21} & q_{22} \end{pmatrix} \tag{508}$$

Accordingly, weighting synthesizer 306A calculates the following and outputs weighted signal 307A ($y_1(t)$).

[MATH. 509]

$$y_1(t)=q_{11}\times s_1(t)+q_{12}\times s_2(t) \tag{509}$$

Weighting synthesizer 306B calculates the following and outputs weighted signal 307B ($y_2(t)$).

[MATH. 510]

$$y_2(t)=q_{21}\times s_1(t)+q_{22}\times s_2(t) \tag{510}$$

Precoding method determiner 316 performs the calculations described in "(precoding method (15B))" based on feedback information from a terminal, and determines the precoding matrix.

[MATH. 511]

$$\begin{pmatrix} q_{11} & q_{12} \\ q_{21} & q_{22} \end{pmatrix} = \begin{pmatrix} e^{j\mu}\times\sin\theta & e^{j(\mu+\lambda)}\times\cos\theta \\ e^{j\omega}\times\cos\theta & -e^{j(\omega+\lambda)}\times\sin\theta \end{pmatrix} \tag{511}$$

In other words, the precoding matrix of the above equation and values for a and b are calculated. Here, based on feedback information from a terminal, precoding method determiner 316 uses

[MATH. 512]

$$b = \frac{h_{11}(t)}{h_{22}(t)}\times a\times e^{j(\mu-\omega)} \tag{512-1}$$

and $$\theta = \delta + n\pi \text{ radians} \tag{512-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (16A))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 513]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix} \end{aligned} \tag{513}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 514]

$$\begin{pmatrix} z_1(t) \\ z_2(t) \end{pmatrix} = \begin{pmatrix} a & 0 \\ 0 & b \end{pmatrix}\begin{pmatrix} \beta\times e^{j\mu}\times\sin\theta & \beta\times e^{j(\mu+\lambda)}\times\cos\theta \\ \beta\times e^{j\omega}\times\cos\theta & -\beta\times e^{j(\omega+\lambda)}\times\sin\theta \end{pmatrix}\begin{pmatrix} s_1(t) \\ s_2(t) \end{pmatrix} \tag{514}$$

($a$, $b$, $\beta$ *are complex* numbers (may be actual numbers))

In this case, the following equation holds true.

[MATH. 515]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} a & 0 \\ 0 & b \end{pmatrix}\begin{pmatrix} \beta\times e^{j\mu}\times\sin\theta & \beta\times e^{j(\mu+\lambda)}\times\cos\theta \\ \beta\times e^{j\omega}\times\cos\theta & -\beta\times e^{j(\omega+\lambda)}\times\sin\theta \end{pmatrix} \\ &\quad \begin{pmatrix} s_1(t) \\ s_2(t) \end{pmatrix} + \begin{pmatrix} n_1(t) \\ n_2(t) \end{pmatrix} \\ &= \begin{pmatrix} \begin{matrix} h_{11}(t)\times a\times\beta\times e^{j\mu}\times\cos\delta\times\sin\theta - \\ h_{22}(t)\times b\times\beta\times e^{j\omega}\times\sin\delta\times\cos\theta \end{matrix} & \begin{matrix} h_{11}(t)\times a\times\beta\times e^{j(\mu+\lambda)}\times\cos\delta\times\cos\theta + \\ h_{22}(t)\times b\times\beta\times e^{j(\omega+\lambda)}\times\sin\delta\times\sin\theta \end{matrix} \\ \begin{matrix} h_{11}(t)\times a\times\beta\times e^{j\mu}\times\sin\delta\times\sin\theta + \\ h_{22}(t)\times b\times\beta\times e^{j\omega}\times\cos\delta\times\cos\theta \end{matrix} & \begin{matrix} h_{11}(t)\times a\times\beta\times e^{j(\mu+\lambda)}\times\sin\delta\times\cos\theta - \\ h_{22}(t)\times b\times\beta\times e^{j(\omega+\lambda)}\times\cos\delta\times\sin\theta \end{matrix} \end{pmatrix}\begin{pmatrix} s_1(t) \\ s_2(t) \end{pmatrix} + \\ &\quad \begin{pmatrix} n_1(t) \\ n_2(t) \end{pmatrix}\end{aligned} \tag{515}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 516]

$$h_{11}(t)\times a\times\beta\times e^{j(\mu+\lambda)}\times\cos\delta\times\cos\theta + h_{22}(t)\times b\times\beta\times e^{j(\omega+\lambda)}\times\sin\delta\times\sin\theta = 0 \tag{516-1}$$

$$h_{11}(t)\times a\times\beta\times e^{j\mu}\times\sin\delta\times\sin\theta + h_{22}(t)\times b\times\beta\times e^{j\omega}\times\cos\delta\times\cos\theta = 0 \tag{516-2}$$

Accordingly, it is sufficient if the following holds true.

[MATH. 517]

$$b = \frac{h_{11}(t)}{h_{22}(t)}\times a\times e^{j(\mu-\omega)} \tag{517-1}$$

and $$\theta = \delta + \frac{\pi}{2}\times n\pi \text{ radians} \tag{517-2}$$

($n$ is an integer)

Accordingly, the communications station calculates θ, a, and b from the feedback information from the terminal so that the following is true.

[MATH. 518]

$$b = \frac{h_{11}(t)}{h_{22}(t)}\times a\times e^{j(\mu-\omega)} \tag{518-1}$$

and $$\theta = \delta + \frac{\pi}{2}\times n\pi \text{ radians} \tag{518-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 519]

$$|a|^2+|b|^2=|u|^2 \tag{519}$$

($\uparrow$u$|^2$ is a parameter based on avarage tramsmitted power)

(Precoding Method (16A-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 520]

$$\begin{pmatrix} q_{11} & q_{12} \\ q_{21} & q_{22} \end{pmatrix} \tag{520}$$

Accordingly, weighting synthesizer 306A calculates the following and outputs weighted signal 307A ($z_1(t)$).

[MATH. 521]

$$z_1(t)=q_{11}\times s_1(t)+q_{12}\times s_2(t) \tag{521}$$

Weighting synthesizer 306B calculates the following and outputs weighted signal 307B ($z_2(t)$).

[MATH. 522]

$$z_2(t)=q_{21}\times s_1(t)+q_{22}\times s_2(t) \tag{522}$$

Precoding method determiner 316 performs the calculations described in "(precoding method (16A))" based on feedback information from a terminal, and determines the precoding matrix.

[MATH. 523]

$$\begin{pmatrix} q_{11} & q_{12} \\ q_{21} & q_{22} \end{pmatrix} = \begin{pmatrix} a & 0 \\ 0 & b \end{pmatrix} \begin{pmatrix} \beta \times e^{j\mu} \times \sin\theta & \beta \times e^{j(\mu+\lambda)} \times \cos\theta \\ \beta \times e^{j\omega} \times \cos\theta & -\beta \times e^{j(\omega+\lambda)} \times \sin\theta \end{pmatrix} = \begin{pmatrix} a \times \beta \times e^{j\mu} \times \sin\theta & a \times \beta \times e^{j(\mu+\lambda)} \times \cos\theta \\ b \times \beta \times e^{j\omega} \times \cos\theta & -b \times \beta \times e^{j(\omega+\lambda)} \times \sin\theta \end{pmatrix} \quad (523)$$

In other words, the precoding matrix of the above equation is calculated. Here, based on feedback information from a terminal, precoding method determiner 316 uses

[MATH. 524]

$$b = \frac{h_{11}(t)}{h_{22}(t)} \times a \times e^{j(\mu-\omega)} \quad (524\text{-}1)$$

and $$\theta = \delta + \frac{\pi}{2} \times n\pi \text{ radians} \quad (524\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (16A-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 525]

$$\begin{pmatrix} q_{11} & q_{12} \\ q_{21} & q_{22} \end{pmatrix} \quad (525)$$

Accordingly, weighting synthesizer 306A calculates the following and outputs weighted signal 307A ($y_1(t)$).

[MATH. 526]

$$y_1(t) = q_{11} \times s_1(t) + q_{12} \times s_2(t) \quad (526)$$

Weighting synthesizer 306B calculates the following and outputs weighted signal 307B ($y_2(t)$).

[MATH. 527]

$$y_2(t) = q_{21} \times s_1(t) + q_{22} \times s_2(t) \quad (527)$$

Precoding method determiner 316 performs the calculations described in "(precoding method (16A))" based on feedback information from a terminal, and determines the precoding matrix.

[MATH. 528]

$$\begin{pmatrix} q_{11} & q_{12} \\ q_{21} & q_{22} \end{pmatrix} = \begin{pmatrix} \beta \times e^{j\mu} \times \sin\theta & \beta \times e^{j(\mu+\lambda)} \times \cos\theta \\ \beta \times e^{j\omega} \times \cos\theta & -\beta \times e^{j(\omega+\lambda)} \times \sin\theta \end{pmatrix} \quad (528)$$

In other words, the precoding matrix of the above equation and values for a and b are calculated. Here, based on feedback information from a terminal, precoding method determiner 316 uses

[MATH. 529]

$$b = \frac{h_{11}(t)}{h_{22}(t)} \times a \times e^{j(\mu-\omega)} \quad (529\text{-}1)$$

and $$\theta = \delta + \frac{\pi}{2} \times n\pi \text{ radians} \quad (529\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b\times y_2(t)$, and outputs coefficient multiplied signal 402B ($z_2(t)$).

(Precoding Method (16B))

In a state such as in FIG. 2, signals $r_1(t)$, $r_2(t)$ that are received by a reception device (for example, a terminal) can be applied as follows (note that δ is greater than or equal to 0 radians and less than 2π radians).

[MATH. 530]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \quad (530)$$

Here, when $z_1(t)=s_1(t)$ and $z_2(t)=s_2(t)$ ($s_1(t)$ and $s_2(t)$ are mapped baseband signals), excluding when $\delta=0$, $\pi/2$, $\pi$, or $3\pi/2$ radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 531]

$$\begin{pmatrix} z_1(t) \\ z_2(t) \end{pmatrix} = \begin{pmatrix} a & 0 \\ 0 & b \end{pmatrix} \begin{pmatrix} \beta\times e^{j\mu}\times\sin\theta & \beta\times e^{j(\mu+\lambda)}\times\cos\theta \\ \beta\times e^{j\omega}\times\cos\theta & -\beta\times e^{j(\omega+\lambda)}\times\sin\theta \end{pmatrix} \begin{pmatrix} s_1(t) \\ s_2(t) \end{pmatrix} \quad (531)$$

($a$, $b$, $\beta$ *are complex* numbers (may be actual numbers))

In this case, the following equation holds true.

[MATH. 532]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \beta\times e^{j\mu}\times\sin\theta & \beta\times e^{j(\mu+\lambda)}\times\cos\theta \\ \beta\times e^{j\omega}\times\cos\theta & \beta\times e^{j(\mu+\lambda)}\times\sin\theta \end{pmatrix} \\ &\quad \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\beta\times e^{j\mu}\times\cos\delta\times\sin\theta - & h_{11}(t)\times a\times\beta\times e^{j(\mu+\lambda)}\times\cos\delta\times\cos\theta + \\ h_{22}(t)\times b\times\beta\times e^{j\omega}\times\sin\delta\times\cos\theta & h_{22}(t)\times b\times\beta\times e^{j\omega}\times\sin\delta\times\sin\theta \\ h_{11}(t)\times a\times\beta\times e^{j\mu}\times\sin\delta\times\sin\theta + & h_{11}(t)\times a\times\beta\times e^{j(\mu+\lambda)}\times\sin\delta\times\cos\theta - \\ h_{22}(t)\times b\times\beta\times e^{j\omega}\times\cos\delta\times\cos\theta & h_{22}(t)\times b\times\beta\times e^{j(\omega+\lambda)}\times\cos\delta\times\sin\theta \end{pmatrix} \\ &\quad \begin{pmatrix} s_1(t) \\ s_2(t) \end{pmatrix} + \begin{pmatrix} n_1(t) \\ n_2(t) \end{pmatrix} \end{aligned} \quad (532)$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 533]

$$h_{11}(t)\times a\times\beta\times e^{j\mu}\cos\delta\times\sin\theta - h_{22}(t)\times b\times\beta\times e^{j\omega}\times\sin\delta\times\cos\theta=0 \quad (532\text{-}1)$$

$$h_{11}(t)\times a\times\beta\times e^{j(\mu+\lambda)}\times\sin\delta\times\cos\theta - h_{22}(t)\times b\times\beta\times e^{j(\omega+\lambda)}\times\cos\delta\times\sin\theta=0 \quad (532\text{-}2)$$

Accordingly, it is sufficient if the following holds true.

[MATH. 534]

$$b = \frac{h_{11}(t)}{h_{22}(t)}\times a\times e^{j(\mu-\omega)} \quad (534\text{-}1)$$

and $$\theta = \delta + n\pi \text{ radians} \quad (534\text{-}2)$$

($n$ is an integer)

Accordingly, the communications station calculates θ, a, and b from the feedback information from the terminal so that the following is true.

[MATH. 535]

$$b = \frac{h_{11}(t)}{h_{22}(t)}\times a\times e^{j(\mu-\omega)} \quad (535\text{-}1)$$

and $$\theta = \delta + n\pi \text{ radians} \quad (535\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 536]

$$|a|^2+|b|^2=|u|^2 \quad (536)$$

($|u|^2$ is a parameter based on average transmitted power)

(Precoding Method (16B-1))

FIG. 3 illustrates a configuration of a communications station. One example of processes performed by weighting synthesizers 306A, 306B and precoding method determiner 316 illustrated in FIG. 3 will be described.

Mapped signal 305A output by mapper 304A is $s_1(t)$, and mapped signal 305B output by mapper 304B is $s_2(t)$.

Moreover, weighted signal 307A output by weighting synthesizer 306A is $z_1(t)$, and weighted signal 307B output by weighting synthesizer 306B is $z_2(t)$.

The precoding matrix is expressed as follows.

[MATH. 537]

$$\begin{pmatrix} q_{11} & q_{12} \\ q_{21} & q_{22} \end{pmatrix} \tag{537}$$

Accordingly, weighting synthesizer 306A calculates the following and outputs weighted signal 307A ($z_1(t)$).

[MATH. 538]

$$z_1(t)=q_{11}\times s_1(t)+q_{12}\times s_2(t) \tag{538}$$

Weighting synthesizer 306B calculates the following and outputs weighted signal 307B ($z_2(t)$).

[MATH. 539]

$$z_2(t)=q_{21}\times s_1(t)+q_{22}\times s_2(t) \tag{539}$$

Precoding method determiner 316 performs the calculations described in "(precoding method (16B))" based on feedback information from a terminal, and determines the precoding matrix.

[MATH. 540]

$$\begin{aligned}\begin{pmatrix} q_{11} & q_{12} \\ q_{21} & q_{22} \end{pmatrix} &= \begin{pmatrix} a & 0 \\ 0 & b \end{pmatrix}\begin{pmatrix} \beta\times e^{j\mu}\times\sin\theta & \beta\times e^{j(\mu+\lambda)}\times\cos\theta \\ \beta\times e^{j\omega}\times\cos\theta & -\beta\times e^{j(\omega+\lambda)}\times\sin\theta \end{pmatrix} \\ &= \begin{pmatrix} a\times\beta\times e^{j\mu}\times\sin\theta & a\times\beta\times e^{j(\mu+\lambda)}\times\cos\theta \\ b\times\beta\times e^{j\omega}\times\cos\theta & -b\times\beta\times e^{j(\omega+\lambda)}\times\sin\theta \end{pmatrix}\end{aligned} \tag{540}$$

In other words, the precoding matrix of the above equation is calculated. Here, based on feedback information from a terminal, precoding method determiner 316 uses

[MATH. 541]

$$b = \frac{h_{11}(t)}{h_{22}(t)}\times a\times e^{j(\mu-\omega)} \tag{541-1}$$

and $$\theta = \delta + n\pi \text{ radians} \tag{541-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (16B-2))

FIG. 4 illustrates a configuration of a communications station different from the communications station illustrated in FIG. 3. One example of processes performed by weighting synthesizers 306A, 306B, coefficient multipliers 401A, 401B, and precoding method determiner 316 illustrated in FIG. 4 will be described.

Mapped signal 305A output by mapper 304A is $s_1(t)$, and mapped signal 305B output by mapper 304B is $s_2(t)$.

Moreover, weighted signal 307A output by weighting synthesizer 306A is $y_1(t)$, and weighted signal 307B output by weighting synthesizer 306B is $y_2(t)$.

Furthermore, coefficient multiplied signal 402A output by coefficient multiplier 401A is $z_1(t)$, and coefficient multiplied signal 402B output by coefficient multiplier 401B is $z_2(t)$.

The precoding matrix is expressed as follows.

[MATH. 542]

$$\begin{pmatrix} q_{11} & q_{12} \\ q_{21} & q_{22} \end{pmatrix} \tag{542}$$

Accordingly, weighting synthesizer 306A calculates the following and outputs weighted signal 307A ($y_1(t)$).

[MATH. 543]

$$y_1(t)=q_{11}\times s_1(t)+q_{12}\times s_2(t) \tag{543}$$

Weighting synthesizer 306B calculates the following and outputs weighted signal 307B ($y_2(t)$).

[MATH. 544]

$$y_2(t)=q_{21}\times s_1(t)+q_{22}\times s_2(t) \tag{544}$$

Precoding method determiner 316 performs the calculations described in "(precoding method (16B))" based on feedback information from a terminal, and determines the precoding matrix.

[MATH. 545]

$$\begin{pmatrix} q_{11} & q_{12} \\ q_{21} & q_{22} \end{pmatrix} = \begin{pmatrix} \beta\times e^{j\mu}\times\sin\theta & \beta\times e^{j(\mu+\lambda)}\times\cos\theta \\ \beta\times e^{j\omega}\times\cos\theta & -\beta\times e^{j(\omega+\lambda)}\times\sin\theta \end{pmatrix} \tag{545}$$

In other words, the precoding matrix of the above equation and values for a and b are calculated. Here, based on feedback information from a terminal, precoding method determiner 316 uses

[MATH. 546]

$$b = \frac{h_{11}(t)}{h_{22}(t)}\times a\times e^{j(\mu-\omega)} \tag{546-1}$$

and $$\theta = \delta + n\pi \text{ radians} \tag{546-2}$$

($n$ is an integer)

to determine a, b, and θ, to determine the precolling matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 4 receives an input of weighted signal 307A ($y_1(t)$), calculates $z_1(t)=a \times y_1(t)$, and outputs coefficient multiplied signal 402A ($z_1(t)$). Similarly, coefficient multiplier 401B illustrated in FIG. 4 receives an input of weighted signal 307B ($y_2(t)$), calculates $z_2(t)=b \times y_2(t)$, and outputs coefficient multiplied signal 402B ($z_2(t)$).

(Communications Station Configuration (3))

Figure 10:
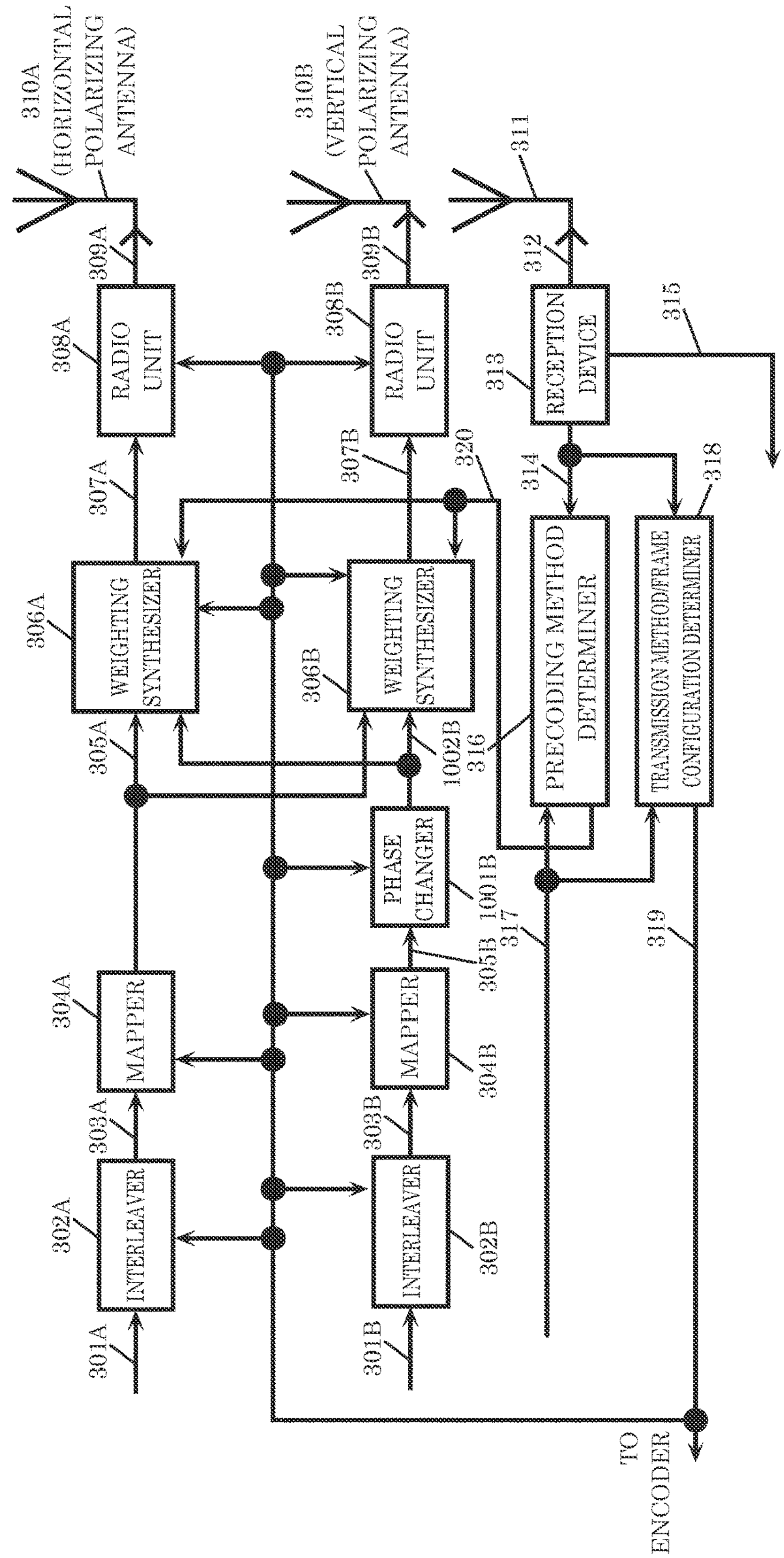
FIG. 10 illustrates an example of a configuration of a communications station.
Figure 11:
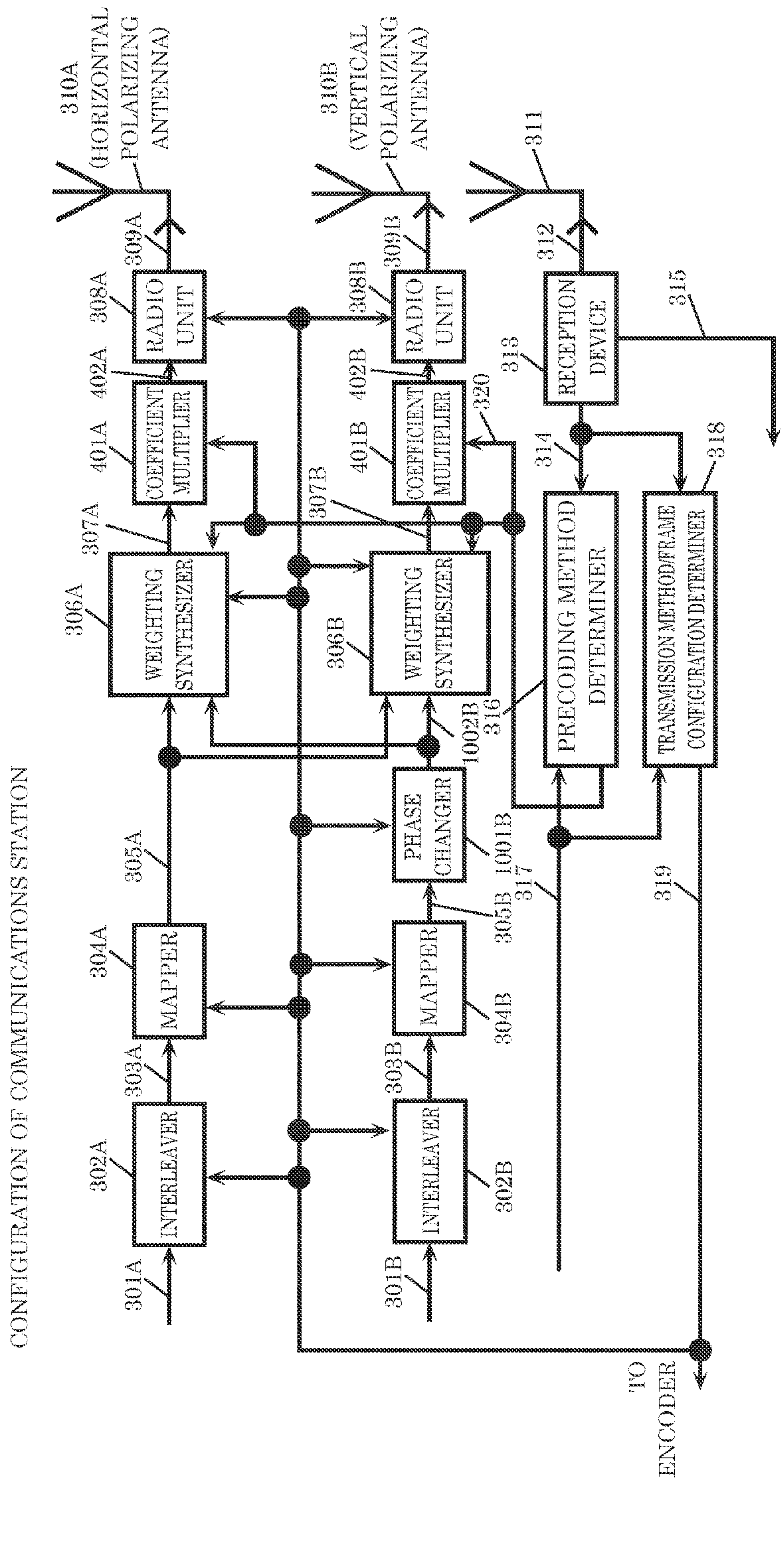
FIG. 11 illustrates an example of a configuration of a communications station.

Communications station configurations different from the configurations illustrated in FIG. 2 and FIG. 3 are illustrated in FIG. 10 and FIG. 11. Operations that are the same as in FIG. 2 and FIG. 3 share like reference marks. The configurations illustrated in FIG. 10 and FIG. 11 differ from the configurations illustrated in FIG. 2 and FIG. 3 in that phase changer 1001B is added between mapper 304B and weighting synthesizer 306B.

Phase changer 1001B receives inputs of mapped signal 305B and transmission method/frame configuration signal 319, changes the phase of mapped signal 305B based on transmission method/frame configuration signal 319, and outputs phase-changed signal 1002B.

Note that in FIG. 10 and FIG. 11, weighting synthesizer 306B performs processing on phase-changed signal 1002B as an input instead of mapped signal 305B.

(Polarized MIMO System)

In the example illustrated in FIG. 1, the following relation holds true.

[MATH. 547]

$$\begin{pmatrix} r_1(t) \\ r_2(t) \end{pmatrix} = \begin{pmatrix} h_{11}(t) & h_{12}(t) \\ h_{21}(t) & h_{22}(t) \end{pmatrix} \begin{pmatrix} z_1(t) \\ z_2(t) \end{pmatrix} + \begin{pmatrix} n_1(t) \\ n_2(t) \end{pmatrix} \quad (547)$$

Then, in a polarized Multiple-Input Multiple Output (MIMO) system, when the cross polarization discrimination (XPD) is a large value, $h_{12}(t)$ and $h_{21}(t)$ can be treated as $h_{12}(t) \approx 0$ and $h_{21}(t) \approx 0$. Then, when the millimeter waveband is used, since the radio waves have strong straight travelling properties, there is a high probability of the following circumstance.

[MATH. 548]

$$\begin{pmatrix} r_1(t) \\ r_2(t) \end{pmatrix} = \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \quad (548)$$

Here, if $z_1(t)=s_1(t)$ and $z_2(t)=s_2(t)$ ($s_1(t)$ and $s_2(t)$ are mapped baseband signals), mapped baseband signal $s_1(t)$ is not affected (interference) by mapped baseband signal $s_2(t)$, and thus achieving favorable data reception quality is likely. Similarly, since mapped baseband signal $s_2(t)$ is not affected (interference) by mapped baseband signal $s_1(t)$, achieving favorable data reception quality is likely.

However, $h_{11}(t)$, $h_{12}(t)$, $h_{21}(t)$, and $h_{22}(t)$ are complex numbers (may be actual numbers). $r_1(t)$, $r_2(t)$, $z_1(t)$, and $z_2(t)$ are complex numbers (may be actual numbers). $n_1(t)$ and $n_2(t)$ are noise, and are complex numbers.

In a state such as in FIG. 2, signals $r_1(t)$, $r_2(t)$ that are received by a reception device can be applied as follows (note that δ is greater than or equal to 0 radians and less than 2π radians).

[MATH. 549]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \end{aligned} \quad (549)$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

The previous descriptions were in regard to a method of switching the precoding method by the communications station based on feedback information from a terminal.

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, in such a state, application of a precoding method that can ensure data reception quality even when fluctuation in the antenna state is moderate—just like the precoding methods described hereinbeforeis desirable. Hereinafter, a precoding method that satisfies these will be described.

(Precoding Method (17A))

In a state such as in FIG. 2, signals $r_1(t)$, $r_2(t)$ that are received by a reception device can be applied as follows (note that δ is greater than or equal to 0 radians and less than 2π radians).

[MATH. 550]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \end{aligned} \quad (550)$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 551]

$$\begin{pmatrix} z_1(t) \\ z_2(t) \end{pmatrix} = \begin{pmatrix} a & 0 \\ 0 & b \end{pmatrix} \begin{pmatrix} \cos\delta & \sin\delta \\ \sin\delta & -\cos\delta \end{pmatrix} \begin{pmatrix} 1 & 0 \\ 0 & e^{j\gamma(t)} \end{pmatrix} \begin{pmatrix} s_1(t) \\ s_2(t) \end{pmatrix} \quad (551)$$

However, a and b are complex numbers (may be actual numbers). j is an imaginary unit, and y(t) is an argument and a time function.

In this case, the following equation holds true.

[MATH. 552]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \cos\theta & \sin\theta \\ \sin\theta & -\cos\theta \end{pmatrix} \\ &\quad \begin{pmatrix} 1 & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\cos\delta\times\cos\theta - & h_{11}(t)\times a\times\cos\delta\times\sin\theta + \\ h_{22}(t)\times b\times\sin\delta\times\sin\theta & h_{22}(t)\times b\times\sin\delta\times\cos\theta \\ h_{11}(t)\times a\times\sin\delta\times\cos\theta + & h_{11}(t)\times a\times\sin\delta\times\sin\theta - \\ h_{22}(t)\times b\times\cos\delta\times\sin\theta & h_{22}(t)\times b\times\cos\delta\times\cos\theta \end{pmatrix} \\ &\quad \begin{pmatrix} s_1(t) \\ e^{j\gamma(t)} s_2(t) \end{pmatrix} + \begin{pmatrix} n_1(t) \\ n_2(t) \end{pmatrix} \end{aligned} \quad (552)$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 553]

$$h_{11}(t)\times a\times\cos\delta\times\sin\theta + h_{22}(t)\times b\times\sin\delta\times\cos\theta = 0 \quad (553\text{-}1)$$

$$h_{11}(t)\times a\times\sin\delta\times\cos\theta + h_{22}(t)\times b\times\cos\delta\times\sin\theta = 0 \quad (553\text{-}2)$$

Accordingly, it is sufficient if the following holds true.

[MATH. 554]

$$b = \frac{h_{11}(t)}{h_{22}(t)} \times a \text{ and} \quad (554\text{-}1)$$

$$\theta = -\delta + n\pi \text{ radians} \quad (554\text{-}2)$$

($n$ is an integer)

Accordingly, the communications station calculates θ, a, and b from the feedback information from the terminal so that the following is true.

[MATH. 555]

$$b = \frac{h_{11}(t)}{h_{22}(t)} \times a \text{ and} \quad (555)$$

$$\theta = -\delta + n\pi \text{ radians} \quad (555\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 556]

$$|a|^2+|b|^2=|u|^2 \quad (556)$$

($|u|^2$ is a parameter based on average transmitted power)

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (17A-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 557]

$$\begin{pmatrix} q_{11} & q_{12} \\ q_{21} & q_{22} \end{pmatrix} \quad (557)$$

Accordingly, weighting synthesizer 306A calculates the following and outputs weighted signal 307A ($z_1(t)$).

[MATH. 558]

$$z_1(t)=q_{11}\times s_1(t)+q_{12}\times e^{j\gamma(t)}\times s_2(t) \quad (558)$$

Weighting synthesizer 306B calculates the following and outputs weighted signal 307B ($z_2(t)$).

[MATH. 559]

$$z_2(t)=q_{21}\times s_1(t)+q_{22}\times e^{j\gamma(t)}\times s_2(t) \quad (559)$$

Precoding method determiner 316 performs the calculations described in "(precoding method (17A)" based on feedback information from a terminal, and determines the precoding matrix.

[MATH. 560]

$$\begin{aligned} \begin{pmatrix} q_{11} & q_{12} \\ q_{21} & q_{22} \end{pmatrix} &= \begin{pmatrix} a & 0 \\ 0 & b \end{pmatrix} \begin{pmatrix} \cos\theta & \sin\theta \\ \sin\theta & -\cos\theta \end{pmatrix} \\ &= \begin{pmatrix} a\times\cos\theta & a\times\sin\theta \\ b\times\sin\theta & -b\times\cos\theta \end{pmatrix} \end{aligned} \quad (560)$$

In other words, the precoding matrix of the above equation is calculated.

Here, based on feedback information from a terminal, precoding method determiner 316 uses

[MATH. 561]

$$b = \frac{h_{11}(t)}{h_{22}(t)} \times a \text{ and} \tag{561-1}$$

$$\theta = -\delta + n\pi \text{ radians} \tag{561-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (17A-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 562]

$$\begin{pmatrix} q_{11} & q_{12} \\ q_{21} & q_{22} \end{pmatrix} \tag{562}$$

Accordingly, weighting synthesizer 306A calculates the following and outputs weighted signal 307A ($y_1(t)$).

[MATH. 563]

$$y_1(t)=q_{11}\times s_1(t)+q_{12}\times e^{j\gamma(t)}\times s_2(t) \tag{563}$$

Weighting synthesizer 306B calculates the following and outputs weighted signal 307B ($y_2(t)$).

[MATH. 564]

$$y_2(t)=q_{21}\times s_1(t)+q_{22}\times e^{j\gamma(t)}\times s_2(t) \tag{564}$$

Precoding method determiner 316 performs the calculations described in "(precoding method (17A)" based on feedback information from a terminal, and determines the precoding matrix.

[MATH. 565]

$$\begin{pmatrix} q_{11} & q_{12} \\ q_{21} & q_{22} \end{pmatrix} = \begin{pmatrix} \cos\theta & \sin\theta \\ \sin\theta & -\cos\theta \end{pmatrix} \tag{565}$$

In other words, the precoding matrix of the above equation and values for a and b are calculated. Here, based on feedback information from a terminal, precoding method determiner 316 uses

[MATH. 566]

$$b = \frac{h_{11}(t)}{h_{22}(t)} \times a \text{ and} \tag{566-1}$$

$$\theta = -\delta + n\pi \text{ radians} \tag{566-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (17A))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 567]

$$\begin{aligned} \begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \right. \\ &\quad \left.\sqrt{\frac{1}{K+1}}\begin{pmatrix} h_{11,s}(t) & h_{12,s}(t) \\ h_{21,s}(t) & h_{22,s}(t) \end{pmatrix}\right)\begin{pmatrix} z_1(t) \\ z_2(t) \end{pmatrix} + \\ &\quad \begin{pmatrix} n_1(t) \\ n_2(t) \end{pmatrix} \end{aligned} \tag{567}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (17A)" is not satisfied.

(Precoding Method (17B))

In a state such as in FIG. 2, signals $r_1(t)$, $r_2(t)$ that are received by a reception device can be applied as follows (note that δ is greater than or equal to 0 radians and less than 2π radians).

[MATH. 568]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \tag{568}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 569]

$$\begin{pmatrix} z_1(t) \\ z_2(t) \end{pmatrix} = \begin{pmatrix} a & 0 \\ 0 & b \end{pmatrix} \begin{pmatrix} \cos\theta & \sin\theta \\ \sin\theta & -\cos\theta \end{pmatrix} \begin{pmatrix} 1 & 0 \\ 0 & e^{jy(t)} \end{pmatrix} \begin{pmatrix} s_1(t) \\ s_2(t) \end{pmatrix} \tag{569}$$

However, a and b are complex numbers (may be actual numbers). j is an imaginary unit, and y(t) is an argument and a time function.

In this case, the following relation equation holds true.

[MATH. 570]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \cos\theta & \sin\theta \\ \sin\theta & -\cos\theta \end{pmatrix} \begin{pmatrix} 1 & 0 \\ 0 & e^{jy(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\cos\delta\times\cos\theta - h_{22}(t)\times b\times\sin\delta\times\sin\theta & h_{11}(t)\times a\times\cos\delta\times\sin\theta + h_{22}(t)\times b\times\sin\delta\times\cos\theta \\ h_{11}(t)\times a\times\sin\delta\times\cos\theta + h_{22}(t)\times b\times\cos\delta\times\sin\theta & h_{11}(t)\times a\times\sin\delta\times\sin\theta - h_{22}(t)\times b\times\cos\delta\times\cos\theta \end{pmatrix} \begin{pmatrix} s_1(t) \\ e^{jy(t)}\, s_2(t) \end{pmatrix} + \begin{pmatrix} n_1(t) \\ n_2(t) \end{pmatrix} \end{aligned} \tag{570}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 571]

$$h_{11}(t)\times a\times\cos\delta\times\cos\theta - h_{22}(t)\times b\times\sin\delta\times\sin\theta = 0 \tag{571-1}$$

$$h_{11}(t)\times a\times\sin\delta\times\sin\theta - h_{22}(t)\times b\times\cos\delta\times\cos\theta = 0 \tag{571-2}$$

Accordingly, it is sufficient if the following holds true.

[MATH. 572]

$$b = \frac{h_{11}(t)}{h_{22}(t)}\times a \tag{572-1}$$

and $$\theta = -\delta + \frac{\pi}{2} + n\pi \text{ radians} \tag{572-2}$$

(n is an integer)

Accordingly, the communications station calculates θ, a, and b from the feedback information from the terminal so that the following is true.

[MATH. 573]

$$b = \frac{h_{11}(t)}{h_{22}(t)}\times a \tag{573-1}$$

and $$\theta = -\delta + \frac{\pi}{2} + n\pi \text{ radians} \tag{573-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 574]

$$|a|^2+|b|^2=|u|^2 \tag{574}$$

($|u|^2$ is a parameter based on average transmitted power)

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (17B-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$.

Mapped signal 305B output by mapper 304B is $s_2(t)$.

Weighted signal 307A output by weighting synthesizer 306A is $z_1(t)$.

Weighted signal 307B output by weighting synthesizer 306B is $z_2(t)$.

The precoding matrix is expressed as follows.

[MATH. 575]

$$\begin{pmatrix} q_{11} & q_{12} \\ q_{21} & q_{22} \end{pmatrix} \tag{575}$$

Accordingly, weighting synthesizer 306A calculates the following and outputs weighted signal 307A ($z_1(t)$).

[MATH. 576]

$$z_1(t)=q_{11}\times s_1(t)+q_{12}\times e^{j\gamma(t)}\times s_2(t) \tag{576}$$

Weighting synthesizer 306B calculates the following and outputs weighted signal 307B ($z_2(t)$).

[MATH. 577]

$$z_2(t)=q_{21}\times s_1(t)+q_{22}\times e^{j\gamma(t)}\times s_2(t) \tag{577}$$

Precoding method determiner 316 performs the calculations described in "(precoding method (17B)" based on feedback information from a terminal, and determines the precoding matrix.

[MATH. 578]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \cos\theta & \sin\theta \\ \sin\theta & -\cos\theta \end{pmatrix} = \begin{pmatrix} a\times\cos\theta & a\times\sin\theta \\ b\times\sin\theta & -b\times\cos\theta \end{pmatrix} \tag{578}$$

In other words, the precoding matrix of the above equation is calculated. Here, based on feedback information from a terminal, precoding method determiner 316 uses

[MATH. 579]

$$b=\frac{h_{11}(t)}{h_{22}(t)}\times a \tag{579-1}$$

and $$\theta=-\delta+\frac{\pi}{2}+n\pi \text{ radians} \tag{579-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (17B-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 580]

$$\begin{pmatrix} q_{11} & q_{12} \\ q_{21} & q_{22} \end{pmatrix} \tag{580}$$

Accordingly, weighting synthesizer 306A calculates the following and outputs weighted signal 307A ($y_1(t)$).

[MATH. 581]

$$y_1(t)=q_{11}\times s_1(t)+q_{12}\times e^{j\gamma(t)}\times s_2(t) \tag{581}$$

Weighting synthesizer 306B calculates the following and outputs weighted signal 307B ($y_2(t)$).

[MATH. 582]

$$y_2(t)=q_{21}\times s_1(t)+q_{22}\times e^{j\gamma(t)}\times s_2(t) \tag{582}$$

Precoding method determiner 316 performs the calculations described in "(precoding method (17B)" based on feedback information from a terminal, and determines the precoding matrix.

[MATH. 583]

$$\begin{pmatrix} q_{11} & q_{12} \\ q_{21} & q_{22} \end{pmatrix} = \begin{pmatrix} \cos\theta & \sin\theta \\ \sin\theta & -\cos\theta \end{pmatrix} \tag{583}$$

In other words, the precoding matrix of the above equation and values for a and b are calculated. Here, based on feedback information from a terminal, precoding method determiner 316 uses

[MATH. 584]

$$b = \frac{h_{11}(t)}{h_{22}(t)} \times a \tag{584-1}$$

and $$\theta = -\delta + \frac{\pi}{2} + n\pi \text{ radians} \tag{584-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (17B))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 585]

$$\begin{aligned}\begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right)\begin{pmatrix} z_1(t) \\ z_2(t) \end{pmatrix} + \begin{pmatrix} n_1(t) \\ n_2(t) \end{pmatrix}\end{aligned} \tag{585}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (17B)" is not satisfied.

(Precoding Method (18A))

In a state such as in FIG. 2, signals $r_1(t)$, $r_2(t)$ that are received by a reception device can be applied as follows (note that δ is greater than or equal to 0 radians and less than 2π radians).

[MATH. 586]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix}\end{aligned} \tag{586}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 587]

$$\begin{pmatrix} z_1(t) \\ z_2(t) \end{pmatrix} = \begin{pmatrix} a & 0 \\ 0 & b \end{pmatrix}\begin{pmatrix} \beta\times\cos\theta & \beta\times\sin\theta \\ \beta\times\sin\theta & -\beta\times\cos\theta \end{pmatrix}\begin{pmatrix} 1 & 0 \\ 0 & e^{j\gamma(t)} \end{pmatrix}\begin{pmatrix} s_1(t) \\ s_2(t) \end{pmatrix} \tag{587}$$

However, a and b are complex numbers (may be actual numbers). j is an imaginary unit, and γ(t) is an argument and a time function.

In this case, the following equation holds true.

[MATH. 588]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix}$$
$$= \begin{pmatrix} h_{11}(t)\times\cos\delta & -h_{12}(t)\times\sin\delta \\ h_{21}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix}$$
$$= \begin{pmatrix} h_{11}(t)\times\cos\delta & -h_{12}(t)\times\sin\delta \\ h_{21}(t)\times\sin\delta & h_{22}(t)\times\cos\delta \end{pmatrix} \begin{pmatrix} a & 0 \\ 0 & b \end{pmatrix} \begin{pmatrix} \beta\times\cos\theta & \Delta\times\sin\theta \\ \beta\times\sin\theta & -\beta\times\cos\theta \end{pmatrix} \begin{pmatrix} 1 & 0 \\ 0 & e^{j\gamma(i)} \end{pmatrix} \begin{pmatrix} s_1(t) \\ s_2(t) \end{pmatrix} + \begin{pmatrix} n_1(t) \\ n_2(t) \end{pmatrix}$$
$$= \begin{pmatrix} h_{11}(t)\times a\times\beta\times\cos\delta\times\cos\theta - & h_{11}(t)\times a\times\beta\times\cos\delta\times\sin\theta + \\ h_{22}(t)\times b\times\beta\sin\delta\times\sin\theta & h_{22}(t)\times b\times\beta\times\sin\delta\times\cos\theta \\ h_{11}(t)\times a\times\beta\times\sin\delta\times\cos\theta + & h_{11}(t)\times a\times\beta\times\sin\delta\times\sin\theta - \\ h_{22}(t)\times b\times\beta\times\cos\delta\times\sin\theta & h_{22}(t)\times b\times\beta\times\cos\delta\times\cos\theta \end{pmatrix} \begin{pmatrix} s_1(t) \\ e^{j\gamma(t)}s_1(t) \end{pmatrix} + \begin{pmatrix} n_1(t) \\ n_2(t) \end{pmatrix} \quad (588)$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 589]

$$h_{11}(t)\times a\times\beta\times\cos\delta\times\sin\theta + h_{22}(t)\times b\times\beta\times\sin\delta\times\cos\theta = 0 \quad (589\text{-}1)$$

$$h_{11}(t)\times a\times\beta\times\sin\delta\times\cos\theta + h_{22}(t)\times b\times\beta\times\cos\delta\times\sin\theta = 0 \quad (589\text{-}2)$$

Accordingly, it is sufficient if the following holds true.

[MATH. 590]

$$b = \frac{h_{11}(t)}{h_{22}(t)} \times a \quad (590\text{-}1)$$

and $$\theta = -\delta + n\pi \text{ radians} \quad (590\text{-}2)$$

($n$ is an integer)

Accordingly, the communications station calculates θ, a, and b from the feedback information from the terminal so that the following is true.

[MATH. 591]

$$b = \frac{h_{11}(t)}{h_{22}(t)} \times a \quad (591\text{-}1)$$

and $$\theta = -\delta + n\pi \text{ radians} \quad (591\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 592]

$$|a|^2+|b|^2=|u|^2 \quad (592)$$

($|u|^2$ is a parameter based on average transmitted power)

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (18A-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$.

Mapped signal 305B output by mapper 304B is $s_2(t)$.

Weighted signal 307A output by weighting synthesizer 306A is $z_1(t)$.

Weighted signal 307B output by weighting synthesizer 306B is $z_2(t)$.

The precoding matrix is expressed as follows.

[MATH. 593]

$$\begin{pmatrix} q_{11} & q_{12} \\ q_{21} & q_{22} \end{pmatrix} \quad (593)$$

Accordingly, weighting synthesizer 306A calculates the following and outputs weighted signal 307A ($z_1(t)$).

[MATH. 594]

$$z_1(t)=q_{11}\times s_1(t)+q_{12}\times e^{j\gamma(t)}\times s_2(t) \quad (594)$$

Weighting synthesizer 306B calculates the following and outputs weighted signal 307B ($z_2(t)$).

[MATH. 595]

$$z_2(t)=q_{21}\times s_1(t)+q_{22}+e^{j\gamma(t)}\times s_2(t) \quad (595)$$

Precoding method determiner 316 performs the calculations described in "(precoding method (18A)" based on feedback information from a terminal, and determines the precoding matrix.

[MATH. 596]

$$\begin{pmatrix} q_{11} & q_{12} \\ q_{21} & q_{22} \end{pmatrix} = \begin{pmatrix} a & 0 \\ 0 & b \end{pmatrix} \begin{pmatrix} \beta\times\cos\theta & \beta\times\sin\theta \\ \beta\times\sin\theta & -\beta\times\cos\theta \end{pmatrix} = \begin{pmatrix} a\times\beta\times\cos\theta & a\times\beta\times\sin\theta \\ b\times\beta\times\sin\theta & -b\times\beta\times\cos\theta \end{pmatrix} \tag{596}$$

In other words, the precoding matrix of the above equation is calculated. Here, based on feedback information from a terminal, precoding method determiner 316 uses

[MATH. 597]

$$b = \frac{h_{11}(t)}{h_{22}(t)} \times a \tag{597-1}$$

and $$\theta = -\delta + n\pi \text{ radians} \tag{597-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (18A-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$.

Mapped signal 305B output by mapper 304B is $s_2(t)$.

Weighted signal 307A output by weighting synthesizer 306A is $y_1(t)$.

Weighted signal 307B output by weighting synthesizer 306B is $y_2(t)$.

Coefficient multiplied signal 402A output by coefficient multiplier 401A is $z_1(t)$.

Coefficient multiplied signal 402B output by coefficient multiplier 401B is $z_2(t)$.

The precoding matrix is expressed as follows.

[MATH. 598]

$$\begin{pmatrix} q_{11} & q_{12} \\ q_{21} & q_{22} \end{pmatrix} \tag{598}$$

Accordingly, weighting synthesizer 306A calculates the following and outputs weighted signal 307A ($y_1(t)$).

[MATH. 599]

$$y_1(t)=q_{11}\times s_1(t)+q_{12}\times e^{j\gamma(t)}\times s_2(t) \tag{599}$$

Weighting synthesizer 306B calculates the following and outputs weighted signal 307B ($y_2(t)$).

[MATH. 600]

$$y_2(t)=q_{21}+s_1(t)+q_{22}\times e^{j\gamma(t)}\times s_2(t) \tag{600}$$

Precoding method determiner 316 performs the calculations described in "(precoding method (18A)" based on feedback information from a terminal, and determines the precoding matrix.

[MATH. 601]

$$\begin{pmatrix} q_{11} & q_{12} \\ q_{21} & q_{22} \end{pmatrix} = \begin{pmatrix} \beta\times\cos\theta & \beta\times\sin\theta \\ \beta\times\sin\theta & -\beta\times\cos\theta \end{pmatrix} \tag{601}$$

In other words, the precoding matrix of the above equation and values for a and b are calculated. Here, based on feedback information from a terminal, precoding method determiner 316 uses

[MATH. 602]

$$b = \frac{h_{11}(t)}{h_{22}(t)} \times a \tag{602-1}$$

and $$\theta = -\delta + n\pi \text{ radians} \tag{602-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (18A))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 603]

$$\begin{pmatrix} r_1(t) \\ r_2(t) \end{pmatrix} = \begin{pmatrix} h_{11}(t) & h_{12}(t) \\ h_{21}(t) & h_{22}(t) \end{pmatrix} \begin{pmatrix} z_1(t) \\ z_2(t) \end{pmatrix} + \begin{pmatrix} n_1(t) \\ n_2(t) \end{pmatrix} = \left( \sqrt{\frac{K}{K+1}} \begin{pmatrix} h_{11,d}(t) & h_{12,d}(t) \\ h_{21,d}(t) & h_{22,d}(t) \end{pmatrix} + \sqrt{\frac{1}{K+1}} \begin{pmatrix} h_{11,s}(t) & h_{12,s}(t) \\ h_{21,s}(t) & h_{22,s}(t) \end{pmatrix} \right) \begin{pmatrix} z_1(t) \\ z_2(t) \end{pmatrix} + \begin{pmatrix} n_1(t) \\ n_2(t) \end{pmatrix} \tag{603}$$

Here, $h_{xy,d}(t)$ is a direct wave component of $h_{xy}(t)$, and $h_{xy,s}(t)$ is a scattered wave component of $hx_y(t)$. ($x=1, 2$; $y=1, 2$) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (18A)" is not satisfied.

(Precoding Method (18B))

In a state such as in FIG. 2, signals $r_1(t)$, $r_2(t)$ that are received by a reception device can be applied as follows (note that δ is greater than or equal to 0 radians and less than 2π radians).

[MATH. 604]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \tag{604}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 605]

$$\begin{pmatrix} z_1(t) \\ z_2(t) \end{pmatrix} = \begin{pmatrix} a & 0 \\ 0 & b \end{pmatrix} \begin{pmatrix} \beta\times\cos\theta & \beta\times\sin\theta \\ \beta\times\sin\theta & -\beta\times\cos\theta \end{pmatrix} \begin{pmatrix} 1 & 0 \\ 0 & e^{jy(t)} \end{pmatrix} \begin{pmatrix} s_1(t) \\ s_2(t) \end{pmatrix} \tag{605}$$

However, a and b are complex numbers (may be actual numbers). j is an imaginary unit, and y(t) is an argument and a time function.

In this case, the following relation equation holds true.

[MATH. 606]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \beta\times\cos\theta & \beta\times\sin\theta \\ \beta\times\sin\theta & -\beta\times\cos\theta \end{pmatrix} \begin{pmatrix} 1 & 0 \\ 0 & e^{jy(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\beta\times\cos\delta\times\cos\theta - h_{22}(t)\times b\times\beta\times\sin\delta\times\sin\theta & h_{11}(t)\times a\times\beta\times\cos\delta\times\sin\theta + h_{22}(t)\times b\times\beta\times\sin\delta\times\cos\theta \\ h_{11}(t)\times a\times\beta\times\sin\delta\times\cos\theta + h_{22}(t)\times b\times\beta\times\cos\delta\times\sin\theta & h_{11}(t)\times a\times\beta\times\sin\delta\times\sin\theta - h_{22}(t)\times b\times\beta\times\cos\delta\times\cos\theta \end{pmatrix} \begin{pmatrix} s_1(t) \\ e^{jy(t)}S_2(t) \end{pmatrix} + \begin{pmatrix} n_1(t) \\ n_2(t) \end{pmatrix} \end{aligned} \tag{606}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 607]

$$h_{11}(t)\times a\times\beta\times\cos\delta\times\cos\theta - h_{22}(t)\times b\times\beta\times\sin\delta\times\sin\theta = 0 \tag{607-1}$$

$$h_{11}(t)\times a\times\beta\times\sin\delta\times\sin\theta - h_{22}(t)\times b\times\beta\times\cos\delta\times\cos\theta = 0 \tag{607-2}$$

Accordingly, it is sufficient if the following holds true.

[MATH. 608]

$$b = \frac{h_{11}(t)}{h_{22}(t)} \times a \tag{608-1}$$

and $$\theta = -\delta + \frac{\pi}{2} + n\pi \text{ radians} \tag{608-2}$$

($n$ is an integer)

Accordingly, the communications station calculates θ, a, and b from the feedback information from the terminal so that the following is true.

[MATH. 609]

$$b = \frac{h_{11}(t)}{h_{22}(t)} \times a \tag{609-1}$$

and $$\theta = -\delta + \frac{\pi}{2} + n\pi \text{ radians} \tag{609-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 610]

$$|a|^2+|b|^b=|u|^2 \tag{610}$$

($|u|^2$ is a parameter based on average transmitted power)

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (18B-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$.

Mapped signal 305B output by mapper 304B is $s_2(t)$.

Weighted signal 307A output by weighting synthesizer 306A is $z_1(t)$.

Weighted signal 307B output by weighting synthesizer 306B is $z_2(t)$.

The precoding matrix is expressed as follows.

[MATH. 611]

$$\begin{pmatrix} q_{11} & q_{12} \\ q_{21} & q_{22} \end{pmatrix} \tag{611}$$

Accordingly, weighting synthesizer 306A calculates the following and outputs weighted signal 307A ($z_1(t)$).

[MATH. 612]

$$z_1(t)=q_{11}\times s_1(t)+q_{12}\times e^{j\gamma(t)}\times s_2(t) \tag{612}$$

Weighting synthesizer 306B calculates the following and outputs weighted signal 307B ($z_2(t)$).

[MATH. 613]

$$z_2(t)=q_{21}\times s_1(t)+q_{22}\times e^{j\gamma(t)}\times s_2(t) \tag{613}$$

Precoding method determiner 316 performs the calculations described in "(precoding method (18B)" based on feedback information from a terminal, and determines the precoding matrix.

[MATH. 614]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \beta\times\cos\theta & \beta\times\sin\theta \\ \beta\times\sin\theta & -\beta\times\cos\theta \end{pmatrix} = \begin{pmatrix} a\times\beta\times\cos\theta & a\times\beta\times\sin\theta \\ b\times\beta\times\sin\theta & -b\times\beta\times\cos\theta \end{pmatrix} \tag{614}$$

In other words, the precoding matrix of the above equation is calculated. Here, based on feedback information from a terminal, precoding method determiner 316 uses

[MATH. 615]

$$b = \frac{h_{11}(t)}{h_{22}(t)} \times a \tag{615-1}$$

and $$\theta = -\delta + \frac{\pi}{2} + n\pi \text{ radians} \tag{615-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (18B-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 616]

$$\begin{pmatrix} q_{11} & q_{12} \\ q_{21} & q_{22} \end{pmatrix} \tag{616}$$

Accordingly, weighting synthesizer 306A calculates the following and outputs weighted signal 307A ($y_1(t)$).

[MATH. 617]

$$y_1(t)=q_{11}\times s_1(t)+q_{12}\times e^{j\gamma(t)}\times s_2(t) \tag{617}$$

Weighting synthesizer 306B calculates the following and outputs weighted signal 307B ($y_2(t)$).

[MATH. 618]

$$y_2(t)=q_{21}\times s_1(t)+q_{22}\times e^{j\gamma(t)}\times s_2(t) \quad (618)$$

Precoding method determiner 316 performs the calculations described in "(precoding method (18B)" based on feedback information from a terminal, and determines the precoding matrix.

[MATH. 619]

$$\begin{pmatrix} q_{11} & q_{12} \\ q_{21} & q_{22} \end{pmatrix} = \begin{pmatrix} \beta\times\cos\theta & \beta\times\sin\theta \\ \beta\times\sin\theta & -\beta\times\cos\theta \end{pmatrix} \quad (619)$$

In other words, the precoding matrix of the above equation and values for a and b are calculated. Here, based on feedback information from a terminal, precoding method determiner 316 uses

[MATH. 620]

$$b = \frac{h_{11}(t)}{h_{22}(t)}\times a \quad (620\text{-}1)$$

and $$\theta = -\delta + \frac{\pi}{2} + n\pi \text{ radians} \quad (620\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (18B))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 621]

$$\begin{aligned} \begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right)\begin{pmatrix} z_1(t) \\ z_2(t) \end{pmatrix} + \begin{pmatrix} n_1(t) \\ n_2(t) \end{pmatrix} \end{aligned} \quad (621)$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (18B)" is not satisfied.

(Precoding Method (19A))

In a state such as in FIG. 2, signals $r_1(t)$, $r_2(t)$ that are received by a reception device can be applied as follows (note that δ is greater than or equal to 0 radians and less than 2π radians).

[MATH. 622]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix} \end{aligned} \quad (622)$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 623]

$$\begin{pmatrix} z_1(t) \\ z_2(t) \end{pmatrix} = \begin{pmatrix} a & 0 \\ 0 & b \end{pmatrix} \begin{pmatrix} \cos\theta & -\sin\theta \\ \sin\theta & \cos\theta \end{pmatrix} \begin{pmatrix} 1 & 0 \\ 0 & e^{j\gamma(t)} \end{pmatrix} \begin{pmatrix} s_1(t) \\ s_2(t) \end{pmatrix} \quad (623)$$

However, a and b are complex numbers (may be actual numbers). j is an imaginary unit, and y(t) is an argument and a time function.

In this case, the following equation holds true.

[MATH. 624]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \\ &\quad \begin{pmatrix} \cos\theta & -\sin\theta \\ \sin\theta & \cos\theta \end{pmatrix} \begin{pmatrix} 1 & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\cos\delta\times\cos\theta - & -h_{11}(t)\times a\times\cos\delta\times\sin\theta - \\ h_{22}(t)\times b\times\sin\delta\times\sin\theta & h_{22}(t)\times b\times\sin\delta\times\cos\theta \\ h_{11}(t)\times a\times\sin\delta\times\cos\theta + & -h_{11}(t)\times a\times\sin\delta\times\sin\theta + \\ h_{22}(t)\times b\times\cos\delta\times\sin\theta & h_{22}(t)\times b\times\cos\delta\times\cos\theta \end{pmatrix} \\ &\quad \begin{pmatrix} s_1(t) \\ e^{j\gamma(t)}s_2(t) \end{pmatrix} + \begin{pmatrix} n_1(t) \\ n_2(t) \end{pmatrix} \end{aligned} \quad (624)$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 625]

$$-h_{11}(t)\times a\times\cos\delta\times\sin\theta - h_{22}(t)\times b\times\sin\delta\times\cos\theta = 0 \quad (625\text{-}1)$$

$$h_{11}(t)\times a\times\sin\delta\times\cos\theta + h_{22}(t)\times b\times\cos\delta\times\sin\theta = 0 \quad (625\text{-}2)$$

Accordingly, it is sufficient if the following holds true.

[MATH. 626]

$$b = \frac{h_{11}(t)}{h_{22}(t)} \times a \quad (626\text{-}1)$$

and $$\theta = -\delta + n\pi \text{ radians} \quad (626\text{-}2)$$

($n$ is an integer)

Accordingly, the communications station calculates θ, a, and b from the feedback information from the terminal so that the following is true.

[MATH. 627]

$$b = \frac{h_{11}(t)}{h_{22}(t)} \times a \quad (627\text{-}1)$$

and

-continued $$\theta = -\delta + n\pi \text{ radians} \quad (627\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 628]

$$|a|^2+|b|^2=|u|^2 \quad (628)$$

($|u|^2$ is a parameter based on average transmitted power)

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (19A-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$.

Mapped signal 305B output by mapper 304B is $s_2(t)$.

Weighted signal 307A output by weighting synthesizer 306A is $z_1(t)$.

Weighted signal 307B output by weighting synthesizer 306B is $z_2(t)$.

The precoding matrix is expressed as follows.

[MATH. 629]

$$\begin{pmatrix} q_{11} & q_{12} \\ q_{21} & q_{22} \end{pmatrix} \quad (629)$$

Accordingly, weighting synthesizer 306A calculates the following and outputs weighted signal 307A ($z_1(t)$).

[MATH. 630]

$$z_1(t)=q_{11}\times s_1(t)+q_{12}\times e^{j\gamma(t)}\times s_2(t) \quad (630)$$

Weighting synthesizer 306B calculates the following and outputs weighted signal 307B ($z_2(t)$).

[MATH. 631]

$$z_2(t)=q_{21}\times s_1(t)+q_{22}\times e^{j\gamma(t)}\times s_2(t) \quad (631)$$

Precoding method determiner 316 performs the calculations described in "(precoding method (19A)" based on feedback information from a terminal, and determines the precoding matrix.

[MATH. 632]

$$\begin{pmatrix} q_{11} & q_{12} \\ q_{21} & q_{22} \end{pmatrix} = \begin{pmatrix} a & 0 \\ 0 & b \end{pmatrix} \begin{pmatrix} \cos\theta & -\sin\theta \\ \sin\theta & \cos\theta \end{pmatrix} = \begin{pmatrix} a\times\cos\theta & -a\times\sin\theta \\ b\times\sin\theta & b\times\cos\theta \end{pmatrix} \quad (632)$$

In other words, the precoding matrix of the above equation is calculated. Here, based on feedback information from a terminal, precoding method determiner 316 uses

[MATH. 633]

$$b = \frac{h_{11}(t)}{h_{22}(t)} \times a \quad (633\text{-}1)$$

and $$\theta = -\delta + n\pi \text{ radians} \quad (633\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (19A-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 634]

$$\begin{pmatrix} q_{11} & q_{12} \\ q_{21} & q_{22} \end{pmatrix} \quad (634)$$

Accordingly, weighting synthesizer 306A calculates the following and outputs weighted signal 307A ($y_1(t)$).

[MATH. 635]

$$y_1(t)=q_{11}\times s_1(t)+q_{12}\times e^{j\gamma(t)}\times s_2(t) \quad (635)$$

Weighting synthesizer 306B calculates the following and outputs weighted signal 307B ($y_2(t)$).

[MATH. 636]

$$y_2(t)=q_{21}\times s_1(t)+q_{22}\times e^{j\gamma(t)}\times s_2(t) \quad (636)$$

Precoding method determiner 316 performs the calculations described in "(precoding method (19A)" based on feedback information from a terminal, and determines the precoding matrix.

[MATH. 637]

$$\begin{pmatrix} q_{11} & q_{12} \\ q_{21} & q_{22} \end{pmatrix} = \begin{pmatrix} \cos\theta & -\sin\theta \\ \sin\theta & \cos\theta \end{pmatrix} \quad (637)$$

In other words, the precoding matrix of the above equation and values for a and b are calculated. Here, based on feedback information from a terminal, precoding method determiner 316 uses

[MATH. 638]

$$b = \frac{h_{11}(t)}{h_{22}(t)} \times a \quad (638\text{-}1)$$

and $$\theta = -\delta + n\pi \text{ radians} \quad (638\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (19A))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 639]

$$\begin{pmatrix} r_1(t) \\ r_2(t) \end{pmatrix} = \begin{pmatrix} h_{11}(t) & h_{12}(t) \\ h_{21}(t) & h_{22}(t) \end{pmatrix} \begin{pmatrix} z_1(t) \\ z_2(t) \end{pmatrix} + \begin{pmatrix} n_1(t) \\ n_2(t) \end{pmatrix} = \left( \sqrt{\frac{K}{K+1}} \begin{pmatrix} h_{11,d}(t) & h_{12,d}(t) \\ h_{21,d}(t) & h_{22,d}(t) \end{pmatrix} + \sqrt{\frac{1}{K+1}} \begin{pmatrix} h_{11,s}(t) & h_{12,s}(t) \\ h_{21,s}(t) & h_{22,s}(t) \end{pmatrix} \right) \begin{pmatrix} z_1(t) \\ z_2(t) \end{pmatrix} + \begin{pmatrix} n_1(t) \\ n_2(t) \end{pmatrix} \tag{639}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (19A)" is not satisfied.

(Precoding Method (19B))

In a state such as in FIG. 2, signals $r_1(t)$, $r_2(t)$ that are received by a reception device can be applied as follows (note that δ is greater than or equal to 0 radians and less than 2π radians).

[MATH. 640]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \tag{640}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 641]

$$\begin{pmatrix} z_1(t) \\ z_2(t) \end{pmatrix} = \begin{pmatrix} a & 0 \\ 0 & b \end{pmatrix} \begin{pmatrix} \cos\theta & -\sin\theta \\ \sin\theta & \cos\theta \end{pmatrix} \begin{pmatrix} 1 & 0 \\ 0 & e^{j\gamma(t)} \end{pmatrix} \begin{pmatrix} s_1(t) \\ s_2(t) \end{pmatrix} \tag{641}$$

However, a and b are complex numbers (may be actual numbers). j is an imaginary unit, and y(t) is an argument and a time function.

In this case, the following relation equation holds true.

[MATH. 642]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \cos\theta & -\sin\theta \\ \sin\theta & \cos\theta \end{pmatrix} \begin{pmatrix} 1 & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\cos\delta\times\cos\theta - h_{22}(t)\times b\times\sin\delta\times\sin\theta & -h_{11}(t)\times a\times\cos\delta\times\sin\theta - h_{22}(t)\times b\times\sin\delta\times\cos\theta \\ h_{11}(t)\times a\times\sin\delta\times\cos\theta + h_{22}(t)\times b\times\cos\delta\times\sin\theta & -h_{11}(t)\times a\times\sin\delta\times\sin\theta + h_{22}(t)\times b\times\cos\delta\times\cos\theta \end{pmatrix} \begin{pmatrix} s_1(t) \\ e^{j\gamma(t)}s_2(t) \end{pmatrix} + \begin{pmatrix} n_1(t) \\ n_2(t) \end{pmatrix} \end{aligned} \tag{642}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 643]

$$h_{11}(t)\times a\times\cos\delta\times\sin\theta - h_{22}(t)\times b\times\sin\delta\times\sin\theta = 0 \tag{643-1}$$

$$-h_{11}(t)\times a\times\sin\delta\times\sin\theta + h_{22}(t)\times b\times\cos\delta\times\cos\theta = 0 \tag{643-2}$$

Accordingly, it is sufficient if the following holds true.

[MATH. 644]

$$b = \frac{h_{11}(t)}{h_{22}(t)} \times a \tag{644-1}$$

and $$\theta = -\delta + \frac{\pi}{2} + n\pi \text{ radians} \tag{644-2}$$

($n$ is an integer)

Accordingly, the communications station calculates θ, a, and b from the feedback information from the terminal so that the following is true.

[MATH. 645]

$$b = \frac{h_{11}(t)}{h_{22}(t)} \times a \tag{645-1}$$

and

-continued $$\theta = -\delta + \frac{\pi}{2} + n\pi \text{ radians} \quad (645\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 646]

$$|a|^2+|b|^2=|u|^2 \quad (646)$$

($|u|^2$ is a parameter based on average transmiitted power)

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (19B-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$. The precoding matrix is expressed as follows.

[MATH. 647]

$$\begin{pmatrix} q_{11} & q_{12} \\ q_{21} & q_{22} \end{pmatrix} \quad (647)$$

Accordingly, weighting synthesizer 306A calculates the following and outputs weighted signal 307A ($z_1(t)$).

[MATH. 648]

$$z_1(t)=q_{11}\times s_1(t)+q_{12}\times e^{j\gamma(t)}\times s_2(t) \quad (648)$$

Weighting synthesizer 306B calculates the following and outputs weighted signal 307B ($z_2(t)$).

[MATH. 649]

$$z_2(t)=q_{21}\times s_1(t)+q_{22}\times e^{j\gamma(t)}\times s_2(t) \quad (649)$$

Precoding method determiner 316 performs the calculations described in "(precoding method (19B)" based on feedback information from a terminal, and determines the precoding matrix.

[MATH. 650]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \cos\theta & -\sin\theta \\ \sin\theta & \cos\theta \end{pmatrix} = \begin{pmatrix} a\times\cos\theta & -a\times\sin\theta \\ b\times\sin\theta & b\times\cos\theta \end{pmatrix} \quad (650)$$

In other words, the precoding matrix of the above equation is calculated. Here, based on feedback information from a terminal, precoding method determiner 316 uses

[MATH. 651]

$$b = \frac{h_{11}(t)}{h_{22}(t)} \times a \quad (651\text{-}1)$$

and $$\theta = -\delta + \frac{\pi}{2} + n\pi \text{ radians} \quad (651\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (19B-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$.

Mapped signal 305B output by mapper 304B is $s_2(t)$.

Weighted signal 307A output by weighting synthesizer 306A is $y_1(t)$.

Weighted signal 307B output by weighting synthesizer 306B is $y_2(t)$.

Coefficient multiplied signal 402A output by coefficient multiplier 401A is $z_1(t)$.

Coefficient multiplied signal 402B output by coefficient multiplier 401B is $z_2(t)$.

The precoding matrix is expressed as follows.

[MATH. 652]

$$\begin{pmatrix} q_{11} & q_{12} \\ q_{21} & q_{22} \end{pmatrix} \quad (652)$$

Accordingly, weighting synthesizer 306A calculates the following and outputs weighted signal 307A ($y_1(t)$).

[MATH. 653]

$$y_1(t)=q_{11}\times s_1(t)+q_{12}\times e^{j\gamma(t)}\times s_2(t) \quad (653)$$

Weighting synthesizer 306B calculates the following and outputs weighted signal 307B ($y_2(t)$).

[MATH. 654]

$$y_2(t)=q_{21}\times s_1(t)+q_{22}\times e^{j\gamma(t)}\times s_2(t) \tag{654}$$

Precoding method determiner 316 performs the calculations described in "(precoding method (19B)" based on feedback information from a terminal, and determines the precoding matrix.

[MATH. 655]

$$\begin{pmatrix} q_{11} & q_{12} \\ q_{21} & q_{22} \end{pmatrix} = \begin{pmatrix} \cos\theta & -\sin\theta \\ \sin\theta & \cos\theta \end{pmatrix} \tag{655}$$

In other words, the precoding matrix of the above equation and values for a and b are calculated. Here, based on feedback information from a terminal, precoding method determiner 316 uses

[MATH. 656]

$$b = \frac{h_{11}(t)}{h_{22}(t)} \times a \tag{656-1}$$

and $$\theta = -\delta + \frac{\pi}{2} + n\pi \text{ radians} \tag{656-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (19B))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 657]

$$\begin{aligned} \begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \left( \sqrt{\frac{K}{K+1}} \begin{pmatrix} h_{11,d}(t) & h_{12,d}(t) \\ h_{21,d}(t) & h_{22,d}(t) \end{pmatrix} + \sqrt{\frac{1}{K+1}} \begin{pmatrix} h_{11,s}(t) & h_{12,s}(t) \\ h_{21,s}(t) & h_{22,s}(t) \end{pmatrix} \right) \begin{pmatrix} z_1(t) \\ z_2(t) \end{pmatrix} + \begin{pmatrix} n_1(t) \\ n_2(t) \end{pmatrix} \end{aligned} \tag{657}$$

Here, $h_{xy,\,d}(t)$ is a direct wave component of $h_{xy}(t)$, and $h_{xy,\,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (19B)" is not satisfied.

(Precoding Method (20A))

In a state such as in FIG. 2, signals $r_1(t)$, $r_2(t)$ that are received by a reception device can be applied as follows (note that δ is greater than or equal to 0 radians and less than 2π radians).

[MATH. 658]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \end{aligned} \tag{658}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

$$\begin{pmatrix} z_1(t) \\ z_2(t) \end{pmatrix} = \begin{pmatrix} a & 0 \\ 0 & b \end{pmatrix} \begin{pmatrix} \beta\times\cos\theta & -\beta\times\sin\theta \\ \beta\times\sin\theta & \beta\times\cos\theta \end{pmatrix} \begin{pmatrix} 1 & 0 \\ 0 & e^{jy(t)} \end{pmatrix} \begin{pmatrix} S_1(t) \\ S_2(t) \end{pmatrix} \quad (659)$$

However, a and b are complex numbers (may be actual numbers). j is an imaginary unit, and y(t) is an argument and a time function.

In this case, the following equation holds true.

[MATH. 660]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \\ &= \begin{pmatrix} n_1(t) \\ n_2(t) \end{pmatrix} \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \\ &= \begin{pmatrix} n_1(t) \\ n_2(t) \end{pmatrix} \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \\ &\begin{pmatrix} \beta\times\cos\theta & -\beta\times\sin\theta \\ \beta\times\sin\theta & \beta\times\cos\theta \end{pmatrix} \begin{pmatrix} 1 & 0 \\ 0 & e^{jy(t)} \end{pmatrix} \begin{pmatrix} s_1(t) \\ s_2(t) \end{pmatrix} + \\ &= \begin{pmatrix} n_1(t) \\ n_2(t) \end{pmatrix} \begin{pmatrix} h_{11}(t)\times a\times\beta\times \cos\delta\times\cos\theta - h_{22}(t)\times b\times\beta\times\sin\delta\times\sin\theta & -h_{11}(t)\times a\times\beta\times\cos\delta\times\sin\theta - h_{22}(t)\times b\times\beta\times\sin\delta\times\cos\theta \\ h_{11}(t)\times a\times\beta\times\sin\delta\times\cos\theta + h_{22}(t)\times b\times\beta\times\cos\delta\times\sin\theta & -h_{11}(t)\times a\times\beta\times\sin\delta\times\sin\theta + h_{22}(t)\times b\times\beta\times\cos\delta\times\cos\theta \end{pmatrix} \\ &\begin{pmatrix} s_1(t) \\ e^{jy(t)}s_2(t) \end{pmatrix} + \begin{pmatrix} n_1(t) \\ n_2(t) \end{pmatrix} \end{aligned} \quad (660)$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 661]

$$-h_{11}(t)\times a\times\beta\times\cos\delta\times\sin\theta - h_{22}(t)\times b\times\beta\times\sin\delta\times\cos\theta = 0 \quad (661\text{-}1)$$

$$h_{11}(t)\times a\times\beta\times\sin\delta\times\cos\theta + h_{22}(t)\times b\times\beta\times\cos\delta\times\sin\theta = 0 \quad (661\text{-}2)$$

Accordingly, it is sufficient if the following holds true.

[MATH. 662]

$$b = \frac{h_{11}(t)}{h_{22}(t)}\times a \quad (662\text{-}1)$$

and $$\theta = -\delta + n\pi \text{ radians} \quad (662\text{-}2)$$

($n$ is an integer)

Accordingly, the communications station calculates θ, a, and b from the feedback information from the terminal so that the following is true.

[MATH. 663]

$$b = \frac{h_{11}(t)}{h_{22}(t)}\times a \quad (663\text{-}1)$$

and

-continued $$\theta = -\delta + n\pi \text{ radians} \quad (663\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 664]

$$|a|^2+|b|^2=|u|^2 \quad (664)$$

($|u|^2$ is a parameter based on average transmitted power)

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (20A-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$.

Mapped signal 305B output by mapper 304B is $s_2(t)$.

Weighted signal 307A output by weighting synthesizer 306A is $z_1(t)$.

Weighted signal 307B output by weighting synthesizer 306B is $z_2(t)$.

The precoding matrix is expressed as follows.

[MATH. 665]

$$\begin{pmatrix} q_{11} & q_{12} \\ q_{21} & q_{22} \end{pmatrix} \quad (665)$$

Accordingly, weighting synthesizer 306A calculates the following and outputs weighted signal 307A ($z_1(t)$).

[MATH. 666]

$$z_1(t)=q_{11}\times s_1(t)+q_{12}\times e^{jy(t)}\times s_2(t) \quad (666)$$

Weighting synthesizer 306B calculates the following and outputs weighted signal 307B ($z_2(t)$).

[MATH. 667]

$$z_2(t)=q_{21}\times s_1(t)+q_{22}+e^{jy(t)}\times s_2(t) \quad (667)$$

Precoding method determiner 316 performs the calculations described in "(precoding method (20A)" based on feedback information from a terminal, and determines the precoding matrix.

[MATH. 668]

$$\begin{pmatrix} q_{11} & q_{12} \\ q_{21} & q_{22} \end{pmatrix} = \begin{pmatrix} a & 0 \\ 0 & b \end{pmatrix} \begin{pmatrix} \beta\times\cos\theta & -\beta\times\sin\theta \\ \beta\times\sin\theta & \beta\times\cos\theta \end{pmatrix} = \begin{pmatrix} a\times\beta\times\cos\theta & -a\times\beta\times\sin\theta \\ b\times\beta\times\sin\theta & b\times\beta\times\cos\theta \end{pmatrix} \quad (668)$$

In other words, the precoding matrix of the above equation is calculated. Here, based on feedback information from a terminal, precoding method determiner 316 uses

[MATH. 669]

$$b = \frac{h_{11}(t)}{h_{22}(t)} \times a \quad (669\text{-}1)$$

and $$\theta = -\delta + n\pi \text{ radians} \quad (669\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (20A-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$.

Coefficient multiplied signal 402B output by coefficient multiplier 401B is $z_2(t)$.

The precoding matrix is expressed as follows.

[MATH. 670]

$$\begin{pmatrix} q_{11} & q_{12} \\ q_{21} & q_{22} \end{pmatrix} \quad (670)$$

Accordingly, weighting synthesizer 306A calculates the following and outputs weighted signal 307A ($y_1(t)$).

[MATH. 671]

$$y_1(t) = q_{11}\times s_1(t) + q_{12}\times e^{j\gamma(t)}\times s_2(t) \quad (671)$$

Weighting synthesizer 306B calculates the following and outputs weighted signal 307B ($y_2(t)$).

[MATH. 672]

$$y_2(t) = q_{21}\times s_1(t) + q_{22}\times e^{j\gamma(t)}\times s_2(t) \quad (672)$$

Precoding method determiner 316 performs the calculations described in "(precoding method (20A)" based on feedback information from a terminal, and determines the precoding matrix.

[MATH. 673]

$$\begin{pmatrix} q_{11} & q_{12} \\ q_{21} & q_{22} \end{pmatrix} = \begin{pmatrix} \beta\times\cos\theta & -\beta\times\sin\theta \\ \beta\times\sin\theta & \beta\times\cos\theta \end{pmatrix} \quad (673)$$

In other words, the precoding matrix of the above equation and values for a and b are calculated. Here, based on feedback information from a terminal, precoding method determiner 316 uses

[MATH. 674]

$$b = \frac{h_{11}(t)}{h_{22}(t)} \times a \quad (674\text{-}1)$$

and $$\theta = -\delta + n\pi \text{ radians} \quad (674\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (20A))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 675]

$$\begin{pmatrix} r_1(t) \\ r_2(t) \end{pmatrix} = \begin{pmatrix} h_{11}(t) & h_{12}(t) \\ h_{21}(t) & h_{22}(t) \end{pmatrix} \begin{pmatrix} z_1(t) \\ z_2(t) \end{pmatrix} + \begin{pmatrix} n_1(t) \\ n_2(t) \end{pmatrix} = \left( \sqrt{\frac{K}{K+1}} \begin{pmatrix} h_{11,d}(t) & h_{12,d}(t) \\ h_{21,d}(t) & h_{22,d}(t) \end{pmatrix} + \sqrt{\frac{1}{K+1}} \begin{pmatrix} h_{11,s}(t) & h_{12,s}(t) \\ h_{21,s}(t) & h_{22,s}(t) \end{pmatrix} \right) \begin{pmatrix} z_1(t) \\ z_2(t) \end{pmatrix} + \begin{pmatrix} n_1(t) \\ n_2(t) \end{pmatrix} \tag{675}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (20A)" is not satisfied.

(Precoding Method (20B))

In a state such as in FIG. 2, signals $r_1(t)$, $r_2(t)$ that are received by a reception device can be applied as follows (note that δ is greater than or equal to 0 radians and less than 2π radians).

[MATH. 676]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} + \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \tag{676}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 677]

$$\begin{pmatrix} z_1(t) \\ z_2(t) \end{pmatrix} = \begin{pmatrix} a & 0 \\ 0 & b \end{pmatrix} \begin{pmatrix} \beta\times\cos\theta & -\beta\times\sin\theta \\ \beta\times\sin\theta & \beta\times\cos\theta \end{pmatrix} + \begin{pmatrix} 1 & 0 \\ 0 & e^{jy(t)} \end{pmatrix} + \begin{pmatrix} s_1(t) \\ s_2(t) \end{pmatrix} \tag{677}$$

However, a and b are complex numbers (may be actual numbers). j is an imaginary unit, and y(t) is an argument and a time function.

In this case, the following relation equation holds true.

[MATH. 678]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \beta\times\cos\theta & -\beta\times\sin\theta \\ \beta\times\sin\theta & \beta\times\cos\theta \end{pmatrix} \begin{pmatrix} 1 & 0 \\ 0 & e^{jy(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\beta\times\cos\delta\times\cos\theta - h_{22}(t)\times b\times\beta\times\sin\delta\times\sin\theta & -h_{11}(t)\times a\times\beta\times\cos\delta\times\sin\theta - h_{22}(t)\times b\times\beta\times\sin\delta\times\cos\theta \\ h_{11}(t)\times a\times\beta\times\sin\delta\times\cos\theta + h_{22}(t)\times b\times\beta\times\cos\delta\times\sin\theta & -h_{11}(t)\times a\times\beta\times\sin\delta\times\sin\theta + h_{22}(t)\times b\times\beta\times\cos\delta\times\cos\theta \end{pmatrix} \begin{pmatrix} s_1(t) \\ e^{jy(t)}s_2(t) \end{pmatrix} + \begin{pmatrix} n_1(t) \\ n_2(t) \end{pmatrix} \end{aligned} \tag{678}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 679]

$$h_{11}(t)\times a\times\beta\times\cos\delta\times\cos\theta-h_{22}(t)\times b\times\beta\times\sin\delta\times\sin\theta=0 \quad (679\text{-}1)$$

$$-h_{11}(t)\times a\times\beta\times\sin\delta\times\sin\theta+h_{22}(t)\times b\times\beta\times\cos\delta\times\cos\theta=0 \quad (679\text{-}2)$$

Accordingly, it is sufficient if the following holds true.

[MATH. 680]

$$b=\frac{h_{11}(t)}{h_{22}(t)}\times a \quad (680\text{-}1)$$

and $$\theta=-\delta+n\pi \text{ radians} \quad (680\text{-}2)$$

($n$ is an integer)

Accordingly, the communications station calculates θ, a, and b from the feedback information from the terminal so that the following is true.

[MATH. 681]

$$b=\frac{h_{11}(t)}{h_{22}(t)}\times a \quad (681\text{-}1)$$

and $$\theta=-\delta+n\pi \text{ radians} \quad (681\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 682]

$$|a|^2+|b|^2=|u|^2 \quad (682)$$

($|u|^2$ is a parameter based on average transmitted power)

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (20B-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$.

Mapped signal 305B output by mapper 304B is $s_2(t)$.

Weighted signal 307A output by weighting synthesizer 306A is $z_1(t)$.

Weighted signal 307B output by weighting synthesizer 306B is $z_2(t)$.

The precoding matrix is expressed as follows.

[MATH. 683]

$$\begin{pmatrix} q_{11} & q_{12} \\ q_{21} & q_{22} \end{pmatrix} \quad (683)$$

Accordingly, weighting synthesizer 306A calculates the following and outputs weighted signal 307A ($z_1(t)$).

[MATH. 684]

$$z_1(t)=q_{11}\times s_1(t)+q_{12}\times e^{j\gamma(t)}\times s_2(t) \quad (684)$$

Weighting synthesizer 306B calculates the following and outputs weighted signal 307B ($z_2(t)$).

[MATH. 685]

$$z_2(t)=q_{21}\times s_1(t)+q_{22}\times e^{j\gamma(t)}\times s_2(t) \quad (685)$$

Precoding method determiner 316 performs the calculations described in "(precoding method (20B)" based on feedback information from a terminal, and determines the precoding matrix.

[MATH. 686]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \beta\times\cos\theta & -\beta\times\sin\theta \\ \beta\times\sin\theta & \beta\times\cos\theta \end{pmatrix} = \begin{pmatrix} a\times\beta\times\cos\theta & -a\times\beta\times\sin\theta \\ b\times\beta\times\sin\theta & b\times\beta\times\cos\theta \end{pmatrix} \quad (686)$$

In other words, the precoding matrix of the above equation is calculated. Here, based on feedback information from a terminal, precoding method determiner 316 uses

[MATH. 687]

$$b=\frac{h_{11}(t)}{h_{22}(t)}\times a \quad (687\text{-}1)$$

and $$\theta=-\delta+n\pi \text{ radians} \quad (687\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (20B-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 688]

$$\begin{pmatrix} q_{11} & q_{12} \\ q_{21} & q_{22} \end{pmatrix} \tag{688}$$

Accordingly, weighting synthesizer 306A calculates the following and outputs weighted signal 307A ($y_1(t)$).

[MATH. 689]

$$y_1(t)=q_{11}\times s_1(t)+q_{12}\times e^{j\gamma(t)}\times s_2(t) \tag{689}$$

Weighting synthesizer 306B calculates the following and outputs weighted signal 307B ($y_2(t)$).

[MATH. 690]

$$y_2(t)=q_{21}\times s_1(t)+q_{22}\times e^{j\gamma(t)}\times s_2(t) \tag{690}$$

Precoding method determiner 316 performs the calculations described in "(precoding method (20B)" based on feedback information from a terminal, and determines the precoding matrix.

[MATH. 691]

$$\begin{pmatrix} q_{11} & q_{12} \\ q_{21} & q_{22} \end{pmatrix} = \begin{pmatrix} \beta\times\cos\theta & -\beta\times\sin\theta \\ \beta\times\sin\theta & \beta\times\cos\theta \end{pmatrix} \tag{691}$$

In other words, the precoding matrix of the above equation and values for a and b are calculated. Here, based on feedback information from a terminal, precoding method determiner 316 uses

[MATH. 692]

$$b = \frac{h_{11}(t)}{h_{22}(t)}\times a \tag{692-1}$$

and $$\theta = -\delta + \frac{\pi}{2} + n\pi \text{ radians} \tag{692-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (20B))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 693]

$$\begin{aligned}\begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right) \begin{pmatrix} z_1(t) \\ z_2(t) \end{pmatrix} + \begin{pmatrix} n_1(t) \\ n_2(t) \end{pmatrix}\end{aligned} \tag{693}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (20B)" is not satisfied.

(Precoding Method (21A))

In a state such as in FIG. 2, signals $r_1(t)$, $r_2(t)$ that are received by a reception device can be applied as follows (note that δ is greater than or equal to 0 radians and less than 2π radians).

[MATH. 694]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \tag{694}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 695]

$$\begin{pmatrix} z_1(t) \\ z_2(t) \end{pmatrix} = \begin{pmatrix} a & 0 \\ 0 & b \end{pmatrix} \begin{pmatrix} \sin\theta & -\cos\theta \\ \cos\theta & \sin\theta \end{pmatrix} \begin{pmatrix} 1 & 0 \\ 0 & e^{j\gamma(t)} \end{pmatrix} \begin{pmatrix} s_1(t) \\ s_2(t) \end{pmatrix} \tag{695}$$

However, a and b are complex numbers (may be actual numbers). j is an imaginary unit, and y(t) is an argument and a time function.

In this case, the following equation holds true.

[MATH. 696]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \sin\theta & -\cos\theta \\ \cos\theta & \sin\theta \end{pmatrix} \\ &\quad \begin{pmatrix} 1 & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\cos\delta\times\sin\theta - & -h_{11}(t)\times a\times\cos\delta\times\cos\theta - \\ h_{22}(t)\times b\times\sin\delta\times\cos\theta & h_{22}(t)\times b\times\sin\delta\times\sin\theta \\ h_{11}(t)\times a\times\sin\delta\times\sin\theta + & -h_{11}(t)\times a\times\sin\delta\times\cos\theta + \\ h_{22}(t)\times b\times\cos\delta\times\cos\theta & h_{22}(t)\times b\times\cos\delta\times\sin\theta \end{pmatrix} \\ &\quad \begin{pmatrix} s_1(t) \\ e^{j\gamma}(t)s_2(t) \end{pmatrix} + \begin{pmatrix} n_1(t) \\ n_2(t) \end{pmatrix} \end{aligned} \tag{696}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 697]

$$-h_{11}(t)\times a\times\cos\,\delta\times\cos\,\theta-h_{22}(t)\times b\times\sin\,\delta\times\sin\,\theta=0 \tag{697-1}$$

$$h_{11}(t)\times a\times\sin\,\delta\times\sin\,\theta+h_{22}(t)\times b\times\cos\,\delta\times\cos\,\theta=0 \tag{697-2}$$

Accordingly, it is sufficient if the following holds true.

[MATH. 698]

$$b = \frac{h_{11}(t)}{h_{22}(t)}\times a \tag{698-1}$$

and $$\theta = \delta + \frac{\pi}{2} + n\pi \text{ radians} \tag{698-2}$$

($n$ is an integer)

Accordingly, the communications station calculates θ, a, and b from the feedback information from the terminal so that the following is true.

[MATH. 699]

$$b = \frac{h_{11}(t)}{h_{22}(t)}\times a \tag{699-1}$$

and $$\theta = \delta + \frac{\pi}{2} + n\pi \text{ radians} \tag{699-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 700]

$$|a|^2+|b|^2=|u|^2 \tag{700}$$

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (21A-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$.

Mapped signal 305B output by mapper 304B is $s_2(t)$.

Weighted signal 307A output by weighting synthesizer 306A is $z_1(t)$.

Weighted signal 307B output by weighting synthesizer 306B is $z_2(t)$.

The precoding matrix is expressed as follows.

[MATH. 701]

$$\begin{pmatrix} q_{11} & q_{12} \\ q_{21} & q_{22} \end{pmatrix} \tag{701}$$

Accordingly, weighting synthesizer 306A calculates the following and outputs weighted signal 307A ($z_1(t)$).

[MATH. 702]

$$z_1(t)=q_{11}\times s_1(t)+q_{12}\times e^{j\gamma(t)}\times s_2(t) \tag{702}$$

Weighting synthesizer 306B calculates the following and outputs weighted signal 307B ($z_2(t)$).

[MATH. 703]

$$z_2(t)=q_{21}\times s_1(t)+q_{22}\times e^{j\gamma(t)}\times s_2(t) \tag{703}$$

Precoding method determiner 316 performs the calculations described in "(precoding method (21A)" based on feedback information from a terminal, and determines the precoding matrix.

[MATH. 704]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \sin\theta & -\cos\theta \\ \cos\theta & \sin\theta \end{pmatrix} = \begin{pmatrix} a\times\sin\theta & -a\times\cos\theta \\ b\times\cos\theta & b\times\sin\theta \end{pmatrix} \tag{704}$$

In other words, the precoding matrix of the above equation is calculated. Here, based on feedback information from a terminal, precoding method determiner 316 uses

[MATH. 705]

$$b=\frac{h_{11}(t)}{h_{22}(t)}\times a \tag{705-1}$$

and $$\theta=\delta+\frac{\pi}{2}+n\pi \text{ radians} \tag{705-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (21A-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 706]

$$\begin{pmatrix} q_{11} & q_{12} \\ q_{21} & q_{22} \end{pmatrix} \tag{706}$$

Accordingly, weighting synthesizer 306A calculates the following and outputs weighted signal 307A ($y_1(t)$).

[MATH. 707]

$$y_1(t)=q_{11}\times s_1(t)+q_{12}\times e^{j\gamma(t)}\times s_2(t) \tag{707}$$

Weighting synthesizer 306B calculates the following and outputs weighted signal 307B ($y_2(t)$).

[MATH. 708]

$$y_1(t)=q_{21}\times s_1(t)+q_{22}\times e^{j\gamma(t)}\times s_2(t) \tag{708}$$

Precoding method determiner 316 performs the calculations described in "(precoding method (21A)" based on feedback information from a terminal, and determines the precoding matrix.

[MATH. 709]

$$\begin{pmatrix} q_{11} & q_{12} \\ q_{21} & q_{22} \end{pmatrix} = \begin{pmatrix} \sin\theta & -\cos\theta \\ \cos\theta & \sin\theta \end{pmatrix} \tag{709}$$

In other words, the precoding matrix of the above equation and values for a and b are calculated. Here, based on feedback information from a terminal, precoding method determiner 316 uses

[MATH. 710]

$$b=\frac{h_{11}(t)}{h_{22}(t)}\times a \tag{710-1}$$

and $$\theta=\delta+\frac{\pi}{2}+n\pi \text{ radians} \tag{710-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (21A))

Phase changer 1001B illustrated in FIG. 10 and FIG. 11 receives an input of mapped signal $s_2(t)$ output from mapper 304B, applies a phase-change, and outputs phase-changed signal 1002B ($e^{jy(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 711]

$$\begin{pmatrix} r_1(t) \\ r_2(t) \end{pmatrix} = \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} = \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right)\begin{pmatrix} z_1(t) \\ z_2(t) \end{pmatrix} + \begin{pmatrix} n_1(t) \\ n_2(t) \end{pmatrix} \quad (711)$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (21A)" is not satisfied.

(Precoding Method (21B))

In a state such as in FIG. 2, signals $r_1(t)$, $r_2(t)$ that are received by a reception device can be applied as follows (note that δ is greater than or equal to 0 radians and less than 2π radians).

[MATH. 712]

$$\begin{pmatrix} r_1(t) \\ r_2(t) \end{pmatrix} = \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix} \quad (712)$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 713]

$$\begin{pmatrix} z_1(t) \\ z_2(t) \end{pmatrix} = \begin{pmatrix} a & 0 \\ 0 & b \end{pmatrix}\begin{pmatrix} \sin\theta & -\cos\theta \\ \cos\theta & \sin\theta \end{pmatrix}\begin{pmatrix} 1 & 0 \\ 0 & e^{jy(t)} \end{pmatrix}\begin{pmatrix} s_1(t) \\ s_2(t) \end{pmatrix} \quad (713)$$

However, a and b are complex numbers (may be actual numbers). j is an imaginary unit, and y(t) is an argument and a time function.

In this case, the following relation equation holds true.

[MATH. 714]

$$\begin{pmatrix} r_1(t) \\ r_2(t) \end{pmatrix} = \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} = \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} z_1(t) \\ z_2(t) \end{pmatrix} + \begin{pmatrix} n_1(t) \\ n_2(t) \end{pmatrix} = \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} a & 0 \\ 0 & b \end{pmatrix}\begin{pmatrix} \sin\theta & -\cos\theta \\ \cos\theta & \sin\theta \end{pmatrix}\begin{pmatrix} 1 & 0 \\ 0 & e^{jy(t)} \end{pmatrix}\begin{pmatrix} s_1(t) \\ s_2(t) \end{pmatrix} + \begin{pmatrix} n_1(t) \\ n_2(t) \end{pmatrix} = \begin{pmatrix} h_{11}(t)\times a\times\cos\delta\times\sin\theta - h_{22}(t)\times b\times\sin\delta\times\cos\theta & -h_{11}(t)\times a\times\cos\delta\times\cos\theta - h_{22}(t)\times b\times\sin\delta\times\sin\theta \\ h_{11}(t)\times a\times\sin\delta\times\sin\theta + h_{22}(t)\times b\times\cos\delta\times\cos\theta & -h_{11}(t)\times a\times\sin\delta\times\cos\theta + h_{22}(t)\times b\times\cos\delta\times\sin\theta \end{pmatrix}\begin{pmatrix} s_1(t) \\ e^{jy(t)}s_2(t) \end{pmatrix} + \begin{pmatrix} n_1(t) \\ n_2(t) \end{pmatrix} \quad (714)$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 715]

$$h_{11}(t)\times a\times\cos\delta\times\sin\theta - h_{22}(t)\times b\times\sin\delta\times\cos\theta = 0 \quad (715\text{-}1)$$

$$-h_{11}(t)\times a\times\sin\delta\times\cos\theta + h_{22}(t)\times b\times\cos\delta\times\sin\theta = 0 \quad (715\text{-}2)$$

Accordingly, it is sufficient if the following holds true.

[MATH. 716]

$$b = \frac{h_{11}(t)}{h_{22}(t)} \times a \quad (716\text{-}1)$$

and $$\theta = \delta + n\pi \text{ radians} \quad (716\text{-}2)$$

($n$ is an integer)

Accordingly, the communications station calculates θ, a, and b from the feedback information from the terminal so that the following is true.

[MATH. 717]

$$b = \frac{h_{11}(t)}{h_{22}(t)} \times a \quad (717\text{-}1)$$

and $$\theta = \delta + n\pi \text{ radians} \quad (717\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 718]

$$|a|^2+|b|^2+|u|^2 \quad (718)$$

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (21B-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 719]

$$\begin{pmatrix} q_{11} & q_{12} \\ q_{21} & q_{22} \end{pmatrix} \quad (719)$$

Accordingly, weighting synthesizer 306A calculates the following and outputs weighted signal 307A ($z_1(t)$).

[MATH. 720]

$$z_1(t)=q_{11}\times s_1(t)+q_{12}\times e^{j\gamma(t)}\times s_2(t) \quad (720)$$

Weighting synthesizer 306B calculates the following and outputs weighted signal 307B ($z_2(t)$).

[MATH. 721]

$$z_2(t)=q_{21}\times s_1(t)+q_{22}\times e^{j\gamma(t)}\times s_2(t) \quad (721)$$

Precoding method determiner 316 performs the calculations described in "(precoding method (21B)" based on feedback information from a terminal, and determines the precoding matrix.

[MATH. 722]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \sin\theta & -\cos\theta \\ \cos\theta & \sin\theta \end{pmatrix} = \begin{pmatrix} a\times\sin\theta & -a\times\cos\theta \\ b\times\cos\theta & b\times\sin\theta \end{pmatrix} \quad (722)$$

In other words, the precoding matrix of the above equation is calculated. Here, based on feedback information from a terminal, precoding method determiner 316 uses

[MATH. 723]

$$b = \frac{h_{11}(t)}{h_{22}(t)} \times a \quad (723\text{-}1)$$

and $$\theta = \delta + n\pi \text{ radians} \quad (723\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (21B-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 724]

$$\begin{pmatrix} q_{11} & q_{12} \\ q_{21} & q_{22} \end{pmatrix} \tag{724}$$

Accordingly, weighting synthesizer 306A calculates the following and outputs weighted signal 307A ($y_1(t)$).

[MATH. 725]

$$y_1(t)=q_{11}\times s_1(t)+q_{12}\times e^{j\gamma(t)}\times s_2(t) \tag{725}$$

Weighting synthesizer 306B calculates the following and outputs weighted signal 307B ($y_2(t)$).

[MATH. 726]

$$y_2(t)=q_{21}\times s_1(t)+q_{22}\times e^{j\gamma(t)}\times s_2(t) \tag{726}$$

Precoding method determiner 316 performs the calculations described in "(precoding method (21B)" based on feedback information from a terminal, and determines the precoding matrix.

[MATH. 727]

$$\begin{pmatrix} q_{11} & q_{12} \\ q_{21} & q_{22} \end{pmatrix} = \begin{pmatrix} \sin\theta & -\cos\theta \\ \cos\theta & \sin\theta \end{pmatrix} \tag{727}$$

In other words, the precoding matrix of the above equation and values for a and b are calculated. Here, based on feedback information from a terminal, precoding method determiner 316 uses

[MATH. 728]

$$b = \frac{h_{11}(t)}{h_{22}(t)} \times a \tag{728-1}$$

and $$\theta = \delta + n\pi \text{ radians} \tag{728-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (21B))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 729]

$$\begin{aligned}\begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right)\begin{pmatrix} z_1(t) \\ z_2(t) \end{pmatrix} + \begin{pmatrix} n_1(t) \\ n_2(t) \end{pmatrix}\end{aligned} \tag{729}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (21B)" is not satisfied.

(Precoding Method (22A))

In a state such as in FIG. 2, signals $r_1(t)$, $r_2(t)$ that are received by a reception device can be applied as follows (note that δ is greater than or equal to 0 radians and less than 2π radians).

[MATH. 730]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix}\end{aligned} \tag{730}$$

Here, when $z_1(t)=s_1(t)$ and $z_2(t)=s_2(t)$ ($s_1(t)$ and $s_2(t)$ are mapped baseband signals), excluding when $\delta=0$, $\pi/2$, $\pi$, or $3\pi/2$ radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 731]

$$\begin{pmatrix} z_1(t) \\ z_2(t) \end{pmatrix} = \begin{pmatrix} a & 0 \\ 0 & b \end{pmatrix} \begin{pmatrix} \beta\times\sin\theta & -\beta\times\cos\theta \\ \beta\times\cos\theta & \beta\times\sin\theta \end{pmatrix} \begin{pmatrix} 1 & 0 \\ 0 & e^{jy(t)} \end{pmatrix} \begin{pmatrix} s_1(t) \\ s_2(t) \end{pmatrix} \tag{731}$$

However, a and b are complex numbers (may be actual numbers). j is an imaginary unit, and y(t) is an argument and a time function.

In this case, the following equation holds true.

[MATH. 732]

$$\begin{aligned}
\begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\
&= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\
&= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \\
&\quad \begin{pmatrix} \beta\times\sin\theta & -\beta\times\cos\theta \\ \beta\times\cos\theta & \beta\times\sin\theta \end{pmatrix} \\
&\quad \begin{pmatrix} 1 & 0 \\ 0 & e^{jy(t)} \end{pmatrix} \begin{pmatrix} s_1(t) \\ s_2(t) \end{pmatrix} + \begin{pmatrix} n_1(t) \\ n_2(t) \end{pmatrix} \\
&= \begin{pmatrix} \begin{matrix} h_{11}(t)\times a\times\beta\times \\ \cos\delta\times\sin\theta - \\ h_{22}(t)\times b\times\beta\times \\ \sin\delta\times\cos\theta \end{matrix} & \begin{matrix} -h_{11}(t)\times a\times\beta\times \\ \cos\delta\times\cos\theta - \\ h_{22}(t)\times b\times\beta\times \\ \sin\delta\times\sin\theta \end{matrix} \\ \begin{matrix} h_{11}(t)\times a\times\beta\times \\ \sin\delta\times\sin\theta + \\ h_{22}(t)\times b\times\beta\times \\ \cos\delta\times\cos\theta \end{matrix} & \begin{matrix} -h_{11}(t)\times a\times\beta\times \\ \sin\delta\times\cos\theta + \\ h_{22}(t)\times b\times\beta\times \\ \cos\delta\times\sin\theta \end{matrix} \end{pmatrix} \\
&\quad \begin{pmatrix} s_1(t) \\ e^{jy(t)}s_2(t) \end{pmatrix} + \begin{pmatrix} n_1(t) \\ n_2(t) \end{pmatrix}
\end{aligned} \tag{732}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 733]

$$-h_{11}(t)\times a\times\beta\times\cos\delta\times\cos\theta-h_{22}(t)\times b\times\sin\delta\times\sin\theta=0 \tag{733-1}$$

$$h_{11}(t)\times a\times\beta\times\sin\delta\times\sin\theta+h_{22}(t)\times b\times\beta\times\cos\delta\times\cos\theta=0 \tag{733-2}$$

Accordingly, it is sufficient if the following holds true.

[MATH. 734]

$$b = \frac{h_{11}(t)}{h_{22}(t)}\times a \tag{734-1}$$

and $$\theta = \delta + \frac{\pi}{2} + n\pi \text{ radians} \tag{734-2}$$

($n$ is an integer)

Accordingly, the communications station calculates θ, a, and b from the feedback information from the terminal so that the following is true.

[MATH. 735]

$$b = \frac{h_{11}(t)}{h_{22}(t)}\times a \tag{735-1}$$

and $$\theta = \delta + \frac{\pi}{2} + n\pi \text{ radians} \tag{735-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 736]

$$|a|^2|b|^2=|u|^2 \tag{736}$$

($|u|^2$ is a parameter based on average transmitted power)

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (22A-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 737]

$$\begin{pmatrix} q_{11} & q_{12} \\ q_{21} & q_{22} \end{pmatrix} \tag{737}$$

Accordingly, weighting synthesizer 306A calculates the following and outputs weighted signal 307A ($z_1(t)$).

[MATH. 738]

$$z_1(t)=q_{11}\times s_1(t)+q_{12}\times e^{j\gamma(t)}\times s_2(t) \tag{738}$$

Weighting synthesizer 306B calculates the following and outputs weighted signal 307B ($z_2(t)$).

[MATH. 739]

$$z_2(t)=q_{21}\times s_1(t)+q_{22}\times e^{j\gamma(t)}\times s_2(t) \tag{739}$$

Precoding method determiner 316 performs the calculations described in "(precoding method (22A)" based on feedback information from a terminal, and determines the precoding matrix.

[MATH. 740]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \beta\times\sin\theta & -\beta\times\cos\theta \\ \beta\times\cos\theta & \beta\times\sin\theta \end{pmatrix} = \begin{pmatrix} a\times\beta\times\sin\theta & -a\times\beta\times\cos\theta \\ b\times\beta\times\cos\theta & b\times\beta\times\sin\theta \end{pmatrix} \tag{740}$$

In other words, the precoding matrix of the above equation is calculated. Here, based on feedback information from a terminal, precoding method determiner 316 uses

[MATH. 741]

$$b = \frac{h_{11}(t)}{h_{22}(t)}\times a \tag{741-1}$$

and $$\theta = \delta + \frac{\pi}{2} + n\pi \text{ radians} \tag{741-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (22A-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$.

Coefficient multiplied signal 402B output by coefficient multiplier 401B is $z_2(t)$.

The precoding matrix is expressed as follows.

[MATH. 742]

$$\begin{pmatrix} q_{11} & q_{12} \\ q_{21} & q_{22} \end{pmatrix} \tag{742}$$

Accordingly, weighting synthesizer 306A calculates the following and outputs weighted signal 307A ($y_1(t)$).

[MATH. 743]

$$y_1(t)=q_{11}\times s_1(t)+q_{12}\times e^{j\gamma(t)}\times s_2(t) \tag{743}$$

Weighting synthesizer 306B calculates the following and outputs weighted signal 307B ($y_2(t)$).

[MATH. 744]

$$y_2(t)=q_{21}\times s_1(t)+q_{22}\times e^{j\gamma(t)}\times s_2(t) \tag{744}$$

Precoding method determiner 316 performs the calculations described in "(precoding method (22A)" based on feedback information from a terminal, and determines the precoding matrix.

[MATH. 745]

$$\begin{pmatrix} q_{11} & q_{12} \\ q_{21} & q_{22} \end{pmatrix} = \begin{pmatrix} \beta\times\sin\theta & -\beta\times\cos\theta \\ \beta\times\cos\theta & \beta\times\sin\theta \end{pmatrix} \tag{745}$$

In other words, the precoding matrix of the above equation and values for a and b are calculated. Here, based on feedback information from a terminal, precoding method determiner 316 uses

[MATH. 746]

$$b = \frac{h_{11}(t)}{h_{22}(t)}\times a \tag{746-1}$$

and $$\theta = \delta + \frac{\pi}{2} + n\pi \text{ radians} \tag{746-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A $(z_1(t))$. Similarly, coefficient multiplier 401B illustrated in FIG. 11 receives an input of weighting synthesized signal 307B $(y_2(t))$, calculates $z_2(t)=b\times y_2(t)$, and outputs coefficient multiplied signal 402B $(z_2(t))$.

(Phase Changing in Precoding Method (22A))

Phase changer 1001B illustrated in FIG. 10 and FIG. 11 receives an input of mapped signal $s_2(t)$ output from mapper 304B, applies a phase-change, and outputs phase-changed signal 1002B $(e^{jy(t)}\times s_2(t))$.

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 747]

$$\begin{aligned}\begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right)\begin{pmatrix} z_1(t) \\ z_2(t) \end{pmatrix} + \begin{pmatrix} n_1(t) \\ n_2(t) \end{pmatrix}\end{aligned} \tag{747}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (22A)" is not satisfied.

(Precoding Method (22B))

In a state such as in FIG. 2, signals $r_1(t)$, $r_2(t)$ that are received by a reception device can be applied as follows (note that δ is greater than or equal to 0 radians and less than 2π radians).

[MATH. 748]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix}\end{aligned} \tag{748}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 749]

$$\begin{pmatrix} z_1(t) \\ z_2(t) \end{pmatrix} = \begin{pmatrix} a & 0 \\ 0 & b \end{pmatrix}\begin{pmatrix} \beta\times\sin\theta & -\beta\times\cos\theta \\ \beta\times\cos\theta & \beta\times\sin\theta \end{pmatrix}\begin{pmatrix} 1 & 0 \\ 0 & e^{jy(t)} \end{pmatrix}\begin{pmatrix} s_1(t) \\ s_2(t) \end{pmatrix} \tag{749}$$

However, a and b are complex numbers (may be actual numbers). j is an imaginary unit, and y(t) is an argument and a time function.

In this case, the following relation equation holds true.

[MATH. 750]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} a & 0 \\ 0 & b \end{pmatrix} \begin{pmatrix} \beta\times\sin\theta & -\beta\times\cos\theta \\ \beta\times\cos\theta & \beta\times\sin\theta \end{pmatrix} \begin{pmatrix} 1 & 0 \\ 0 & e^{jy(t)} \end{pmatrix}\begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\beta\times\cos\delta\times\sin\theta - h_{22}(t)\times b\times\beta\times\sin\delta\times\cos\theta & -h_{11}(t)\times a\times\beta\times\cos\delta\times\cos\theta - h_{22}(t)\times b\times\beta\times\sin\delta\times\sin\theta \\ h_{11}(t)\times a\times\beta\times\sin\delta\times\sin\theta + h_{22}(t)\times b\times\beta\times\cos\delta\times\cos\theta & -h_{11}(t)\times a\times\beta\times\sin\delta\times\cos\theta + h_{22}(t)\times b\times\beta\times\cos\delta\times\sin\theta \end{pmatrix} \begin{pmatrix} s_1(t) \\ e^{jy(t)}s_2(t) \end{pmatrix} + \begin{pmatrix} n_1(t) \\ n_2(t) \end{pmatrix}\end{aligned} \tag{750}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 751]

$$h_{11}(t)\times a\times\beta\times\cos\delta\times\sin\theta-h_{22}(t)\times b\times\beta\times\sin\delta\times\cos\theta=0 \quad (751\text{-}1)$$

$$-h_{11}(t)\times a\times\beta\times\sin\delta\times\cos\theta+h_{22}(t)\times b\times\beta\times\cos\delta\times\sin\theta=0 \quad (751\text{-}2)$$

Accordingly, it is sufficient if the following holds true.

[MATH. 752]

$$b=\frac{h_{11}(t)}{h_{22}(t)}\times a \quad (752\text{-}1)$$

and $$\theta=\delta+n\pi \text{ radians} \quad (752\text{-}2)$$

($n$ is an integer)

Accordingly, the communications station calculates θ, a, and b from the feedback information from the terminal so that the following is true.

[MATH. 753]

$$b=\frac{h_{11}(t)}{h_{22}(t)}\times a \quad (753\text{-}1)$$

and $$\theta=\delta+n\pi \text{ radians} \quad (753\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 754]

$$|a|^2+|b|^2=|u|^2 \quad (754)$$

($|u|^2$ is a parameter based on average transmitted power)

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (22B-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 755]

$$\begin{pmatrix} q_{11} & q_{12} \\ q_{21} & q_{22} \end{pmatrix} \quad (755)$$

Accordingly, weighting synthesizer 306A calculates the following and outputs weighted signal 307A ($z_1(t)$).

[MATH. 756]

$$z_1(t)=q_{11}\times s_1(t)+q_{12}\times e^{j\gamma(t)}\times s_2(t) \quad (756)$$

Weighting synthesizer 306B calculates the following and outputs weighted signal 307B ($z_2(t)$).

[MATH. 757]

$$z_2(t)=q_{21}\times s_1(t)+q_{22}\times e^{j\gamma(t)}\times s_2(t) \quad (757)$$

Precoding method determiner 316 performs the calculations described in "(precoding method (22B)" based on feedback information from a terminal, and determines the precoding matrix.

[MATH. 758]

$$\begin{pmatrix} q_{11} & q_{12} \\ q_{21} & q_{22} \end{pmatrix}=\begin{pmatrix} a & 0 \\ 0 & b \end{pmatrix}\begin{pmatrix} \beta\times\sin\theta & -\beta\times\cos\theta \\ \beta\times\cos\theta & \beta\times\sin\theta \end{pmatrix}=\begin{pmatrix} a\times\beta\times\sin\theta & -a\times\beta\times\cos\theta \\ b\times\beta\times\cos\theta & b\times\beta\times\sin\theta \end{pmatrix} \quad (758)$$

In other words, the precoding matrix of the above equation is calculated. Here, based on feedback information from a terminal, precoding method determiner 316 uses

[MATH. 759]

$$b=\frac{h_{11}(t)}{h_{22}(t)}\times a \quad (759\text{-}1)$$

and $$\theta=\delta+n\pi \text{ radians} \quad (759\text{-}2)$$

($n$ is an interger)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (22B-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$.

Mapped signal 305B output by mapper 304B is $s_2(t)$.

Weighted signal 307A output by weighting synthesizer 306A is $y_1(t)$.

Weighted signal 307B output by weighting synthesizer 306B is $y_2(t)$.

Coefficient multiplied signal 402A output by coefficient multiplier 401A is $z_1(t)$.

Coefficient multiplied signal 402B output by coefficient multiplier 401B is $z_2(t)$.

The precoding matrix is expressed as follows.

[MATH. 760]

$$\begin{pmatrix} q_{11} & q_{12} \\ q_{21} & q_{22} \end{pmatrix} \tag{760}$$

Accordingly, weighting synthesizer 306A calculates the following and outputs weighted signal 307A ($y_1(t)$).

[MATH. 761]

$$y_1(t)=q_{11}\times s_1(t)+q_{12}\times e^{j\gamma(t)}\times s_2(t) \tag{761}$$

Weighting synthesizer 306B calculates the following and outputs weighted signal 307B ($y_2(t)$).

[MATH. 762]

$$y_2(t)=q_{21}\times s_1(t)+q_{22}\times e^{j\gamma(t)}\times s_2(t) \tag{762}$$

Precoding method determiner 316 performs the calculations described in "(precoding method (22B)" based on feedback information from a terminal, and determines the precoding matrix.

[MATH. 763]

$$\begin{pmatrix} q_{11} & q_{12} \\ q_{21} & q_{22} \end{pmatrix} = \begin{pmatrix} \beta\times\sin\theta & -\beta\times\cos\theta \\ \beta\times\cos\theta & \beta\times\sin\theta \end{pmatrix} \tag{763}$$

In other words, the precoding matrix of the above equation and values for a and b are calculated. Here, based on feedback information from a terminal, precoding method determiner 316 uses

[MATH. 764]

$$b = \frac{h_{11}(t)}{h_{22}(t)} \times a \tag{764-1}$$

and $$\theta = \delta + n\pi \text{ radians} \tag{764-2}$$

($n$ is an interger)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (22B))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 765]

$$\begin{aligned} \begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \right. \\ &\quad \left. \sqrt{\frac{1}{K+1}}\begin{pmatrix} h_{11,s}(t) & h_{12,s}(t) \\ h_{21,s}(t) & h_{22,s}(t) \end{pmatrix}\right)\begin{pmatrix} z_1(t) \\ z_2(t) \end{pmatrix} + \begin{pmatrix} n_1(t) \\ n_2(t) \end{pmatrix} \end{aligned} \tag{765}$$

Here, $h_{xy,\,d}(t)$ is a direct wave component of $h_{xy}(t)$, and $h_{xy,\,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (22B)" is not satisfied.

(Precoding Method (23A))

In a state such as in FIG. 2, signals $r_1(t)$, $r_2(t)$ that are received by a reception device can be applied as follows (note that δ is greater than or equal to 0 radians and less than 2π radians).

[MATH. 766]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \tag{766}$$

Here, when $z_1(t)=s_1(t)$ and $z_2(t)=s_2(t)$ ($s_1(t)$ and $s_2(t)$ are mapped baseband signals), excluding when $\delta=0$, $\pi/2$, $\pi$, or $3\pi/2$ radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 767]

$$\begin{pmatrix} z_1(t) \\ z_2(t) \end{pmatrix} = \begin{pmatrix} a & 0 \\ 0 & b \end{pmatrix} \begin{pmatrix} \sin\delta & \cos\delta \\ \cos\delta & -\sin\delta \end{pmatrix} \begin{pmatrix} 1 & 0 \\ 0 & e^{jy(t)} \end{pmatrix} \begin{pmatrix} s_1(t) \\ s_2(t) \end{pmatrix} \tag{767}$$

However, a and b are complex numbers (may be actual numbers). j is an imaginary unit, and y(t) is an argument and a time function.

In this case, the following equation holds true.

[MATH. 768]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \sin\delta & \cos\delta \\ \cos\delta & -\sin\delta \end{pmatrix} \\ &\quad \begin{pmatrix} 1 & 0 \\ 0 & e^{jy(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\cos\delta\times\sin\theta - h_{22}(t)\times b\times\sin\delta\times\cos\theta & h_{11}(t)\times a\times\cos\delta\times\cos\theta + h_{22}(t)\times b\times\sin\delta\times\sin\theta \\ h_{11}(t)\times a\times\sin\delta\times\sin\theta + h_{22}(t)\times b\times\cos\delta\times\cos\theta & h_{11}(t)\times a\times\sin\delta\times\cos\theta - h_{22}(t)\times b\times\cos\delta\times\sin\theta \end{pmatrix} \\ &\quad \begin{pmatrix} s_1(t) \\ e^{jy(t)}s_1(t) \end{pmatrix} + \begin{pmatrix} n_1(t) \\ n_2(t) \end{pmatrix} \end{aligned} \tag{768}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 769]

$$h_{11}(t)\times a\times\cos\delta\times\cos\theta - h_{22}(t)\times b\times\sin\delta\times\sin\theta=0 \tag{769-1}$$

$$h_{11}(t)\times a\times\sin\delta\times\sin\theta + h_{22}(t)\times b\times\cos\delta\times\cos\theta=0 \tag{769-2}$$

Accordingly, it is sufficient if the following holds true.

[MATH. 770]

$$b = \frac{h_{11}(t)}{h_{22}(t)}\times a \tag{770-1}$$

and $$\theta = \delta + \frac{\pi}{2} + n\pi \text{ radians} \tag{770-2}$$

(n is an interger)

Accordingly, the communications station calculates θ, a, and b from the feedback information from the terminal so that the following is true.

[MATH. 771]

$$b = \frac{h_{11}(t)}{h_{22}(t)}\times a \tag{771-1}$$

and $$\theta = \delta + \frac{\pi}{2} + n\pi \text{ radians} \tag{771-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 772]

$$|a|^2+|b|^2=|u|^2 \tag{772}$$

($|u|^2$ is a parameter based on average transmitted power)

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (23A-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 773]

$$\begin{pmatrix} q_{11} & q_{12} \\ q_{21} & q_{22} \end{pmatrix} \tag{773}$$

Accordingly, weighting synthesizer 306A calculates the following and outputs weighted signal 307A ($z_1(t)$).

[MATH. 774]

$$z_1(t)=q_{11}\times s_1(t)+q_{12}\times e^{j\gamma(t)}\times s_2(t) \tag{774}$$

Weighting synthesizer 306B calculates the following and outputs weighted signal 307B ($z_2(t)$).

[MATH. 775]

$$z_2(t)=q_{21}\times s_1(t)+q_{22}\times e^{j\gamma(t)}\times s_2(t) \tag{775}$$

Precoding method determiner 316 performs the calculations described in "(precoding method (23A)" based on feedback information from a terminal, and determines the precoding matrix.

[MATH. 776]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \sin\theta & \cos\theta \\ \cos\theta & -\sin\theta \end{pmatrix} = \begin{pmatrix} a\times\sin\theta & a\times\cos\theta \\ b\times\cos\theta & -b\times\sin\theta \end{pmatrix} \tag{776}$$

In other words, the precoding matrix of the above equation is calculated. Here, based on feedback information from a terminal, precoding method determiner 316 uses

[MATH. 777]

$$b=\frac{h_{11}(t)}{h_{22}(t)}\times a \tag{777-1}$$

and $$\theta=\delta+\frac{\pi}{2}+n\pi \text{ radians} \tag{777-2}$$

($n$ is an interger)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (23A-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 778]

$$\begin{pmatrix} q_{11} & q_{12} \\ q_{21} & q_{22} \end{pmatrix} \tag{778}$$

Accordingly, weighting synthesizer 306A calculates the following and outputs weighted signal 307A ($y_1(t)$).

[MATH. 779]

$$y_1(t)=q_{11}\times s_1(t)+q_{12}\times e^{j\gamma(t)}\times s_2(t) \tag{779}$$

Weighting synthesizer 306B calculates the following and outputs weighted signal 307B ($y_2(t)$).

[MATH. 780]

$$y_2(t)=q_{21}\times s_1(t)+q_2\times e^{j\gamma(t)}\times s_2(t) \tag{780}$$

Precoding method determiner 316 performs the calculations described in "(precoding method (23A)" based on feedback information from a terminal, and determines the precoding matrix.

[Math. 781]

$$\begin{pmatrix} q_{11} & q_{12} \\ q_{21} & q_{22} \end{pmatrix} = \begin{pmatrix} \sin\theta & \cos\theta \\ \cos\theta & -\sin\theta \end{pmatrix} \tag{781}$$

In other words, the precoding matrix of the above equation and values for a and b are calculated. Here, based on feedback information from a terminal, precoding method determiner 316 uses

[Math. 782]

$$b=\frac{h_{11}(t)}{h_{22}(t)}\times a \tag{782-1}$$

and $$\theta=\delta+\frac{\pi}{2}+n\pi \text{ radians} \tag{782-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (23A))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)} \times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[Math. 783]

$$\begin{pmatrix} r_1(t) \\ r_2(t) \end{pmatrix} = \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} = \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right)\begin{pmatrix} z_1(t) \\ z_2(t) \end{pmatrix} + \begin{pmatrix} n_1(t) \\ n_2(t) \end{pmatrix} \quad (783)$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (23A)" is not satisfied.

(Precoding Method (23B))

In a state such as in FIG. 2, signals $r_1(t)$, $r_2(t)$ that are received by a reception device can be applied as follows (note that δ is greater than or equal to 0 radians and less than 2π radians).

[Math. 784]

$$\begin{pmatrix} r_1(t) \\ r_2(t) \end{pmatrix} = \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix} \quad (784)$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[Math. 785]

$$\begin{pmatrix} z_1(t) \\ z_2(t) \end{pmatrix} = \begin{pmatrix} a & 0 \\ 0 & b \end{pmatrix}\begin{pmatrix} \sin\theta & \cos\theta \\ \cos\theta & -\sin\theta \end{pmatrix}\begin{pmatrix} 1 & 0 \\ 0 & e^{j\gamma(t)} \end{pmatrix}\begin{pmatrix} s_1(t) \\ s_2(t) \end{pmatrix} \quad (785)$$

However, a and b are complex numbers (may be actual numbers). j is an imaginary unit, and y(t) is an argument and a time function.

In this case, the following relation equation holds true.

[Math. 786]

$$\begin{pmatrix} r_1(t) \\ r_2(t) \end{pmatrix} = \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \quad (786)$$

$$= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} z_1(t) \\ z_2(t) \end{pmatrix} + \begin{pmatrix} n_1(t) \\ n_2(t) \end{pmatrix}$$

$$= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} a & 0 \\ 0 & b \end{pmatrix}\begin{pmatrix} \sin\theta & \cos\theta \\ \cos\theta & -\sin\theta \end{pmatrix}\begin{pmatrix} 1 & 0 \\ 0 & e^{j\gamma(t)} \end{pmatrix}\begin{pmatrix} s_1(t) \\ s_2(t) \end{pmatrix} + \begin{pmatrix} n_1(t) \\ n_2(t) \end{pmatrix}$$

$$= \begin{pmatrix} h_{11}(t)\times a\times\cos\delta\times\sin\theta - h_{22}(t)\times b\times\sin\delta\times\cos\theta & h_{11}(t)\times a\times\cos\delta\times\cos\theta + h_{22}(t)\times b\times\sin\delta\times\sin\theta \\ h_{11}(t)\times a\times\sin\delta\times\sin\theta + h_{22}(t)\times b\times\cos\delta\times\cos\theta & h_{11}(t)\times a\times\sin\delta\times\cos\theta - h_{22}(t)\times b\times\cos\delta\times\sin\theta \end{pmatrix}\begin{pmatrix} s_1(t) \\ e^{j\gamma(t)}s_2(t) \end{pmatrix} + \begin{pmatrix} n_1(t) \\ n_2(t) \end{pmatrix}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 787]

$$h_{11}(t)\times a\times\cos\delta\times\sin\theta - h_{22}(t)\times b\times\sin\delta\times\cos\theta = 0 \quad (787\text{-}1)$$

$$h_{11}(t)\times a\times\sin\delta\times\cos\theta - h_{22}(t)\times b\times\cos\delta\times\sin\theta = 0 \quad (787\text{-}2)$$

Accordingly, it is sufficient if the following holds true.

[Math. 788]

$$b = \frac{h_{11}(t)}{h_{22}(t)}\times a \quad (788\text{-}1)$$

and $$\theta = \delta + n\pi \text{ radians} \quad (788\text{-}2)$$

($n$ is an integer)

Accordingly, the communications station calculates θ, a, and b from the feedback information from the terminal so that the following is true.

[Math. 789]

$$b = \frac{h_{11}(t)}{h_{22}(t)} \times a \quad (789\text{-}1)$$

and $$\theta = \delta + n\pi \text{ radians} \quad (789\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 790]

$$|a|^2+|b|^2=|u|^2 \quad (790)$$

($|u|^2$ is a parameter based on average transmitted power)

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (23B-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$.

Mapped signal 305B output by mapper 304B is $s_2(t)$.

Weighted signal 307A output by weighting synthesizer 306A is $z_1(t)$.

Weighted signal 307B output by weighting synthesizer 306B is $z_2(t)$.

The precoding matrix is expressed as follows.

[Math. 791]

$$\begin{pmatrix} q_{11} & q_{12} \\ q_{21} & q_{22} \end{pmatrix} \quad (791)$$

Accordingly, weighting synthesizer 306A calculates the following and outputs weighted signal 307A ($z_1(t)$).

[MATH. 792]

$$z_1(t)=q_{11}\times s_1(t)+q_{12}\times e^{j\gamma(t)}\times s_2(t) \quad (792)$$

Weighting synthesizer 306B calculates the following and outputs weighted signal 307B ($z_2(t)$).

[MATH. 793]

$$z_2(t)=q_{21}\times s_1(t)+q_{22}\times e^{j\gamma(t)}\times s_2(t) \quad (793)$$

Precoding method determiner 316 performs the calculations described in "(precoding method (23B)" based on feedback information from a terminal, and determines the precoding matrix.

[Math. 794]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \sin\theta & \cos\theta \\ \cos\theta & -\sin\theta \end{pmatrix} = \begin{pmatrix} a\times\sin\theta & a\times\cos\theta \\ b\times\cos\theta & -b\times\sin\theta \end{pmatrix} \quad (794)$$

In other words, the precoding matrix of the above equation is calculated. Here, based on feedback information from a terminal, precoding method determiner 316 uses

[Math. 795]

$$b = \frac{h_{11}(t)}{h_{22}(t)} \times a \quad (795\text{-}1)$$

and $$\theta = \delta + n\pi \text{ radians} \quad (795\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (23B-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$.

Mapped signal 305B output by mapper 304B is $s_2(t)$.

Weighted signal 307A output by weighting synthesizer 306A is $y_1(t)$.

Weighted signal 307B output by weighting synthesizer 306B is $y_2(t)$.

Coefficient multiplied signal 402A output by coefficient multiplier 401A is $z_1(t)$.

Coefficient multiplied signal 402B output by coefficient multiplier 401B is $z_2(t)$.

The precoding matrix is expressed as follows.

[Math. 796]

$$\begin{pmatrix} q_{11} & q_{12} \\ q_{21} & q_{22} \end{pmatrix} \quad (796)$$

Accordingly, weighting synthesizer 306A calculates the following and outputs weighted signal 307A ($y_1(t)$).

[MATH. 797]

$$y_1(t)=q_{11}\times s_1(t)+q_{12}\times e^{j\gamma(t)}\times s_2(t) \quad (797)$$

Weighting synthesizer 306B calculates the following and outputs weighted signal 307B ($y_2(t)$).

[MATH. 798]

$$y_2(t)=q_{21}\times s_1(t)+q_{22}\times e^{j\gamma(t)}\times s_2(t) \quad (798)$$

Precoding method determiner 316 performs the calculations described in "(precoding method (23B)" based on feedback information from a terminal, and determines the precoding matrix.

[Math. 799]

$$\begin{pmatrix} q_{11} & q_{12} \\ q_{21} & q_{22} \end{pmatrix} = \begin{pmatrix} \sin\theta & \cos\theta \\ \cos\theta & -\sin\theta \end{pmatrix} \quad (799)$$

In other words, the precoding matrix of the above equation and values for a and b are calculated. Here, based on feedback information from a terminal, precoding method determiner 316 uses

[Math. 800]

$$b = \frac{h_{11}(t)}{h_{22}(t)} \times a \quad (800\text{-}1)$$

and $$\theta = \delta + n\pi \text{ radians} \quad (800\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (23B))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[Math. 801]

$$\begin{pmatrix} r_1(t) \\ r_2(t) \end{pmatrix} = \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \quad (801)$$

$$= \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right)\begin{pmatrix} z_1(t) \\ z_2(t) \end{pmatrix} + \begin{pmatrix} n_1(t) \\ n_2(t) \end{pmatrix}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (23B)" is not satisfied.

(Precoding Method (24A))

In a state such as in FIG. 2, signals $r_1(t)$, $r_2(t)$ that are received by a reception device can be applied as follows (note that δ is greater than or equal to 0 radians and less than 2π radians).

[MATH. 802]

$$\begin{pmatrix} r_1(t) \\ r_2(t) \end{pmatrix} = \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \quad (802)$$

$$= \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 803]

$$\begin{pmatrix} z_1(t) \\ z_2(t) \end{pmatrix} = \begin{pmatrix} a & 0 \\ 0 & b \end{pmatrix} \begin{pmatrix} \beta\times\sin\theta & \beta\times\cos\theta \\ \beta\times\cos\theta & -\beta\times\sin\theta \end{pmatrix} \begin{pmatrix} 1 & 0 \\ 0 & e^{j\gamma(t)} \end{pmatrix} \begin{pmatrix} s_1(t) \\ s_2(t) \end{pmatrix} \tag{803}$$

However, a and b are complex numbers (may be actual numbers). j is an imaginary unit, and y(t) is an argument and a time function.

In this case, the following equation holds true.

[MATH. 804]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \\ &\quad \begin{pmatrix} \beta\times\sin\theta & \beta\times\cos\theta \\ \beta\times\cos\theta & -\beta\times\sin\theta \end{pmatrix} \begin{pmatrix} 1 & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\beta\times & h_{11}(t)\times a\times\beta\times \\ \cos\delta\times\sin\theta - & \cos\delta\times\cos\theta + \\ h_{22}(t)\times b\times\beta\times & h_{22}(t)\times b\times\beta\times \\ \sin\delta\times\cos\theta & \sin\delta\times\sin\theta \\ h_{11}(t)\times a\times\beta\times & h_{11}(t)\times a\times\beta\times \\ \sin\delta\times\sin\theta + & \sin\delta\times\cos\theta - \\ h_{22}(t)\times b\times\beta\times & h_{22}(t)\times b\times\beta\times \\ \cos\delta\times\cos\theta & \cos\delta\times\sin\theta \end{pmatrix} \\ &\quad \begin{pmatrix} s_1(t) \\ e^{j\gamma(t)}s_2(t) \end{pmatrix} + \begin{pmatrix} n_1(t) \\ n_2(t) \end{pmatrix} \end{aligned} \tag{804}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 805]

$$h_{11}(t)\times a\times\beta\times\cos\delta\times\cos\theta+h_{22}(t)\times b\times\beta\times\sin\delta\times\sin\theta=0 \tag{805-1}$$

$$h_{11}(t)\times a\times\beta\times\sin\delta\times\sin\theta+h_{22}(t)\times b\times\beta\times\cos\delta\times\cos\theta=0 \tag{805-2}$$

Accordingly, it is sufficient if the following holds true.

[MATH. 806]

$$b = \frac{h_{11}(t)}{h_{22}(t)}\times a \tag{806-1}$$

and $$\theta = \delta + \frac{\pi}{2} + n\pi \text{ radians} \tag{806-2}$$

($n$ is an integer)

Accordingly, the communications station calculates θ, a, and b from the feedback information from the terminal so that the following is true.

[MATH. 807]

$$b = \frac{h_{11}(t)}{h_{22}(t)}\times a \tag{807-1}$$

and $$\theta = \delta + \frac{\pi}{2} + n\pi \text{ radians} \tag{807-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 808]

$$|a|^2+|b|^2=|u|^2 \tag{808}$$

($|u|^2$ is a parameter based on average transmitted power)

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (24A-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 809]

$$\begin{pmatrix} q_{11} & q_{12} \\ q_{21} & q_{22} \end{pmatrix} \tag{809}$$

Accordingly, weighting synthesizer 306A calculates the following and outputs weighted signal 307A ($z_1(t)$).

[MATH. 810]

$$z_1(t)=q_{11}\times s_1(t)+q_{12}\times e^{j\gamma(t)}\times s_2(t) \tag{810}$$

Weighting synthesizer 306B calculates the following and outputs weighted signal 307B ($z_2(t)$).

[MATH. 811]

$$z_2(t)=q_{21}\times s_1(t)+q_{22}\times e^{j\gamma(t)}\times s_2(t) \tag{811}$$

Precoding method determiner 316 performs the calculations described in "(precoding method (24A)" based on feedback information from a terminal, and determines the precoding matrix.

[MATH. 812]

$$\begin{pmatrix} q_{11} & q_{12} \\ q_{21} & q_{22} \end{pmatrix} = \begin{pmatrix} a & 0 \\ 0 & b \end{pmatrix} \begin{pmatrix} \beta\times\sin\theta & \beta\times\cos\theta \\ \beta\times\cos\theta & -\beta\times\sin\theta \end{pmatrix} = \begin{pmatrix} a\times\beta\times\sin\theta & a\times\beta\times\cos\theta \\ b\times\beta\times\cos\theta & -b\times\beta\times\sin\theta \end{pmatrix} \quad (812)$$

In other words, the precoding matrix of the above equation is calculated. Here, based on feedback information from a terminal, precoding method determiner 316 uses

[MATH. 813]

$$b = \frac{h_{11}(t)}{h_{22}(t)} \times a \quad (813\text{-}1)$$

and $$\theta = \delta + \frac{\pi}{2} + n\pi \text{ radians} \quad (813\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (24A-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 814]

$$\begin{pmatrix} q_{11} & q_{12} \\ q_{21} & q_{22} \end{pmatrix} \quad (814)$$

Accordingly, weighting synthesizer 306A calculates the following and outputs weighted signal 307A ($y_1(t)$).

[MATH. 815]

$$y_1(t)=q_{11}\times s_1(t)+q_{12}\times e^{j\gamma(t)}\times s_2(t) \quad (815)$$

Weighting synthesizer 306B calculates the following and outputs weighted signal 307B ($y_2(t)$).

[MATH. 816]

$$y_2(t)=q_{21}\times s_1(t)+q_{22}\times e^{j\gamma(t)}\times s_2(t) \quad (816)$$

Precoding method determiner 316 performs the calculations described in "(precoding method (24A)" based on feedback information from a terminal, and determines the precoding matrix.

[MATH. 817]

$$\begin{pmatrix} q_{11} & q_{12} \\ q_{21} & q_{22} \end{pmatrix} = \begin{pmatrix} \beta\times\sin\theta & \beta\times\cos\theta \\ \beta\times\cos\theta & -\beta\times\sin\theta \end{pmatrix} \quad (817)$$

In other words, the precoding matrix of the above equation and values for a and b are calculated. Here, based on feedback information from a terminal, precoding method determiner 316 uses

[MATH. 818]

$$b = \frac{h_{11}(t)}{h_{22}(t)} \times a \quad (818\text{-}1)$$

and $$\theta = \delta + \frac{\pi}{2} + n\pi \text{ radians} \quad (818\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (24A))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 819]

$$\begin{pmatrix} r_1(t) \\ r_2(t) \end{pmatrix} = \begin{pmatrix} h_{11}(t) & h_{12}(t) \\ h_{21}(t) & h_{22}(t) \end{pmatrix} \begin{pmatrix} z_1(t) \\ z_2(t) \end{pmatrix} + \begin{pmatrix} n_1(t) \\ n_2(t) \end{pmatrix} = \left( \sqrt{\frac{K}{K+1}} \begin{pmatrix} h_{11,d}(t) & h_{12,d}(t) \\ h_{21,d}(t) & h_{22,d}(t) \end{pmatrix} + \sqrt{\frac{1}{K+1}} \begin{pmatrix} h_{11,s}(t) & h_{12,s}(t) \\ h_{21,s}(t) & h_{22,s}(t) \end{pmatrix} \right) \begin{pmatrix} z_1(t) \\ z_2(t) \end{pmatrix} + \begin{pmatrix} n_1(t) \\ n_2(t) \end{pmatrix} \quad (819)$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (24A)" is not satisfied.

(Precoding Method (24B))

In a state such as in FIG. 2, signals $r_1(t)$, $r_2(t)$ that are received by a reception device can be applied as follows (note that δ is greater than or equal to 0 radians and less than 2π radians).

[MATH. 820]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \quad (820)$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 821]

$$\begin{pmatrix} z_1(t) \\ z_2(t) \end{pmatrix} = \begin{pmatrix} a & 0 \\ 0 & b \end{pmatrix} \begin{pmatrix} \beta\times\sin\theta & \beta\times\cos\theta \\ \beta\times\cos\theta & -\beta\times\sin\theta \end{pmatrix} \begin{pmatrix} 1 & 0 \\ 0 & e^{j\gamma(t)} \end{pmatrix} \begin{pmatrix} s_1(t) \\ s_2(t) \end{pmatrix} \quad (821)$$

However, a and b are complex numbers (may be actual numbers). j is an imaginary unit, and y(t) is an argument and a time function.

In this case, the following relation equation holds true.

[MATH. 822]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \beta\times\sin\theta & \beta\times\cos\theta \\ \beta\times\cos\theta & -\beta\times\sin\theta \end{pmatrix} \begin{pmatrix} 1 & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\beta\times\cos\delta\times\sin\theta - h_{22}(t)\times b\times\beta\times\sin\delta\times\cos\theta & h_{11}(t)\times a\times\beta\times\cos\delta\times\cos\theta + h_{22}(t)\times b\times\beta\times\sin\delta\times\sin\theta \\ h_{11}(t)\times a\times\beta\times\sin\delta\times\sin\theta + h_{22}(t)\times b\times\beta\times\cos\delta\times\cos\theta & h_{11}(t)\times a\times\beta\times\sin\delta\times\cos\theta - h_{22}(t)\times b\times\beta\times\cos\delta\times\sin\theta \end{pmatrix} \begin{pmatrix} s_1(t) \\ e^{j\gamma(t)}s_2(t) \end{pmatrix} + \begin{pmatrix} n_1(t) \\ n_2(t) \end{pmatrix} \end{aligned} \quad (822)$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 823]

$$h_{11}(t)\times a\times\beta\times\cos\delta\times\sin\theta - h_{22}(t)\times b\times\beta\times\sin\delta\times\cos\theta = 0 \quad (823\text{-}1)$$

$$h_{11}(t)\times a\times\beta\times\sin\delta\times\cos\theta - h_{22}(t)\times b\times\beta\times\cos\delta\times\sin\theta = 0 \quad (823\text{-}2)$$

Accordingly, it is sufficient if the following holds true.

[MATH. 824]

$$b = \frac{h_{11}(t)}{h_{22}(t)}\times a \quad (824\text{-}1)$$

and $$\theta = \delta + n\pi \text{ radians} \quad (824\text{-}2)$$

($n$ is an integer)

Accordingly, the communications station calculates θ, a, and b from the feedback information from the terminal so that the following is true.

[MATH. 825]

$$b = \frac{h_{11}(t)}{h_{22}(t)} \times a \quad (825\text{-}1)$$

and $$\theta = \delta + n\pi \text{ radians} \quad (825\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 826]

$$|a|^2+|b|^2=|u|^2 \quad (826)$$

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (24B-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$.

Mapped signal 305B output by mapper 304B is $s_2(t)$.

Weighted signal 307A output by weighting synthesizer 306A is $z_1(t)$.

Weighted signal 307B output by weighting synthesizer 306B is $z_2(t)$.

The precoding matrix is expressed as follows.

[MATH. 827]

$$\begin{pmatrix} q_{11} & q_{12} \\ q_{21} & q_{22} \end{pmatrix} \quad (827)$$

Accordingly, weighting synthesizer 306A calculates the following and outputs weighted signal 307A ($z_1(t)$).

[MATH. 828]

$$z_1(t)=q_{11}\times s_1(t)+q_{12}\times e^{j\gamma(t)}\times s_2(t) \quad (828)$$

Weighting synthesizer 306B calculates the following and outputs weighted signal 307B ($z_2(t)$).

[MATH. 829]

$$z_2(t)=q_{21}\times s_1(t)+q_{22}\times e^{j\gamma(t)}\times s_2(t) \quad (829)$$

Precoding method determiner 316 performs the calculations described in "(precoding method (24B)" based on feedback information from a terminal, and determines the precoding matrix.

[MATH. 830]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \beta\times\sin\theta & \beta\times\cos\theta \\ \beta\times\cos\theta & -\beta\times\sin\theta \end{pmatrix} = \begin{pmatrix} a\times\beta\times\sin\theta & a\times\beta\times\cos\theta \\ b\times\beta\times\cos\theta & -b\times\beta\times\sin\theta \end{pmatrix} \quad (830)$$

In other words, the precoding matrix of the above equation is calculated. Here, based on feedback information from a terminal, precoding method determiner 316 uses

[MATH. 831]

$$b = \frac{h_{11}(t)}{h_{22}(t)} \times a \quad (831\text{-}1)$$

and $$\theta = \delta + n\pi \text{ radians} \quad (831\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (24B-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 832]

$$\begin{pmatrix} q_{11} & q_{12} \\ q_{21} & q_{22} \end{pmatrix} \quad (832)$$

Accordingly, weighting synthesizer 306A calculates the following and outputs weighted signal 307A ($y_1(t)$).

[MATH. 833]

$$y_1(t)=q_{11}\times s_1(t)+q_{12}\times e^{j\gamma(t)}\times s_2(t) \quad (833)$$

Weighting synthesizer 306B calculates the following and outputs weighted signal 307B ($y_2(t)$).

[MATH. 834]

$$y_2(t)=q_{21}\times s_1(t)+q_{22}\times e^{j\gamma(t)}\times s_2(t) \tag{834}$$

Precoding method determiner 316 performs the calculations described in "(precoding method (24B)" based on feedback information from a terminal, and determines the precoding matrix.

[MATH. 835]

$$\begin{pmatrix} q_{11} & q_{12} \\ q_{21} & q_{22} \end{pmatrix} = \begin{pmatrix} \beta\times\sin\theta & \beta\times\cos\theta \\ \beta\times\cos\theta & -\beta\times\sin\theta \end{pmatrix} \tag{835}$$

In other words, the precoding matrix of the above equation and values for a and b are calculated. Here, based on feedback information from a terminal, precoding method determiner 316 uses

[MATH. 836]

$$b = \frac{h_{11}(t)}{h_{22}(t)}\times a \tag{836-1}$$

and $$\theta = \delta + n\pi \text{ radians} \tag{836-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (24B))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 837]

$$\begin{aligned} \begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right)\begin{pmatrix} z_1(t) \\ z_2(t) \end{pmatrix} + \begin{pmatrix} n_1(t) \\ n_2(t) \end{pmatrix} \end{aligned} \tag{837}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (24B)" is not satisfied.

(Precoding Method (25A))

In a state such as in FIG. 2, signals $r_1(t)$, $r_2(t)$ that are received by a reception device can be applied as follows (note that δ is greater than or equal to 0 radians and less than 2π radians).

[MATH. 838]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix} \end{aligned} \tag{838}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 839]

$$\begin{pmatrix} z_1(t) \\ z_2(t) \end{pmatrix} = \begin{pmatrix} a & 0 \\ 0 & b \end{pmatrix} \begin{pmatrix} e^{j\mu}\times\cos\theta & e^{j(\mu+\lambda)}\times\sin\theta \\ e^{j\omega}\times\sin\theta & -e^{j(\omega+\lambda)}\times\cos\theta \end{pmatrix} \begin{pmatrix} 1 & 0 \\ 0 & e^{j\gamma(t)} \end{pmatrix} \begin{pmatrix} s_1(t) \\ s_2(t) \end{pmatrix} \quad (839)$$

However, a and b are complex numbers (may be actual numbers). j is an imaginary unit, and y(t) is an argument and a time function.

In this case, the following equation holds true.

[MATH. 840]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \\ &\quad \begin{pmatrix} e^{j\mu}\times\cos\theta & e^{j(\mu+\lambda)}\times\sin\theta \\ e^{j\omega}\times\sin\theta & -e^{j(\omega+\lambda)}\times\cos\theta \end{pmatrix} \begin{pmatrix} 1 & 0 \\ 0 & e^{j\gamma(t)} \end{pmatrix} \begin{pmatrix} s_1(t) \\ s_2(t) \end{pmatrix} + \\ &\quad \begin{pmatrix} n_1(t) \\ n_2(t) \end{pmatrix} \\ &= \begin{pmatrix} \begin{matrix} h_{11}(t)\times a\times e^{j\mu}\times \\ \cos\delta\times\cos\theta - \\ h_{22}(t)\times b\times e^{j\omega}\times s \\ \text{in}\delta\times\sin\theta \end{matrix} & \begin{matrix} h_{11}(t)\times a\times e^{j(\mu+\lambda)}\times \\ \cos\delta\times\sin\theta + \\ h_{22}(t)\times b\times e^{j(\omega+\lambda)}\times \\ \sin\delta\times\cos\theta \end{matrix} \\ \begin{matrix} h_{11}(t)\times a\times e^{j\mu}\times \\ \sin\delta\times\cos\theta + \\ h_{22}(t)\times b\times e^{j\omega}\times \\ \cos\delta\times\sin\theta \end{matrix} & \begin{matrix} h_{11}(t)\times a\times e^{j(\mu+\lambda)}\times \\ \sin\delta\times\sin\theta - \\ h_{22}(t)\times b\times e^{j(\omega+\lambda)}\times \\ \cos\delta\times\cos\theta \end{matrix} \end{pmatrix} \\ &\quad \begin{pmatrix} s_1(t) \\ e^{j\gamma(t)}s_2(t) \end{pmatrix} + \begin{pmatrix} n_1(t) \\ n_2(t) \end{pmatrix} \end{aligned} \quad (840)$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 841]

$$h_{11}(t)\times a\times e^{j(\mu+\lambda)}\times\cos\delta\times\sin\theta + h_{22}(t)\times b\times e^{j(\omega+\lambda)}\times\sin\delta\times\cos\theta = 0 \quad (841\text{-}1)$$

$$h_{11}(t)\times a\times e^{j\mu}\times\sin\delta\times\cos\theta + h_{22}(t)\times b\times e^{j\omega}\times\cos\delta\times\sin\theta = 0 \quad (841\text{-}2)$$

Accordingly, it is sufficient if the following holds true.

[MATH. 842]

$$b = \frac{h_{11}(t)}{h_{22}(t)}\times a\times e^{j(\mu-\omega)} \quad (842\text{-}1)$$

and $$\theta = -\delta + n\pi \text{ radians} \quad (842\text{-}2)$$

($n$ is an integer)

Accordingly, the communications station calculates θ, a, and b from the feedback information from the terminal so that the following is true.

[MATH. 843]

$$b = \frac{h_{11}(t)}{h_{22}(t)}\times a\times e^{j(\mu-\omega)} \quad (843\text{-}1)$$

and $$\theta = -\delta + n\pi \text{ radians} \quad (843\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 844]

$$|a|^2+|b|^2=|u|^2 \quad (844)$$

($|u|^2$ is a pararmeter based on average transmitted power)

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precolling Method (25A-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$.

Mapped signal 305B output by mapper 304B is $s_2(t)$.

Weighted signal 307A output by weighting synthesizer 306A is $z_1(t)$.

Weighted signal 307B output by weighting synthesizer 306B is $z_2(t)$.

The precoding matrix is expressed as follows.

[MATH. 845]

$$\begin{pmatrix} q_{11} & q_{12} \\ q_{21} & q_{22} \end{pmatrix} \quad (845)$$

Accordingly, weighting synthesizer 306A calculates the following and outputs weighted signal 307A ($z_1(t)$).

[MATH. 846]

$$z_1(t)=q_{11}\times s_1(t)+q_{12}\times e^{j\gamma(t)}\times s_2(t) \quad (846)$$

Weighting synthesizer 306B calculates the following and outputs weighted signal 307B ($z_2(t)$).

[MATH. 847]

$$z_2(t)=q_{21}\times s_1(t)+q_{22}\times e^{j\gamma(t)}\times s_2(t) \quad (847)$$

Precoding method determiner 316 performs the calculations described in "(precoding method (25A)" based on feedback information from a terminal, and determines the precoding matrix.

[MATH. 848]

$$\begin{pmatrix} q_{11} & q_{12} \\ q_{21} & q_{22} \end{pmatrix} = \begin{pmatrix} a & 0 \\ 0 & b \end{pmatrix} \begin{pmatrix} e^{j\mu} \times \cos\theta & e^{j(\mu+\lambda)} \times \sin\theta \\ e^{j\omega} \times \sin\theta & -e^{j(\omega+\lambda)} \times \cos\theta \end{pmatrix} = \begin{pmatrix} a \times e^{j\mu} \times \cos\theta & a \times e^{j(\mu+\lambda)} \times \sin\theta \\ b \times e^{j\omega} \times \sin\theta & -b \times e^{j(\omega+\lambda)} \times \cos\theta \end{pmatrix} \tag{848}$$

In other words, the precoding matrix of the above equation is calculated. Here, based on feedback information from a terminal, precoding method determiner 316 uses

[MATH. 849]

$$b = \frac{h_{11}(t)}{h_{22}(t)} \times a \times e^{j(\mu-\omega)} \tag{849-1}$$

and $$\theta = -\delta + n\pi \text{ radians} \tag{849-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (25A-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$.

Mapped signal 305B output by mapper 304B is $s_2(t)$.

Weighted signal 307A output by weighting synthesizer 306A is $y_1(t)$.

Weighted signal 307B output by weighting synthesizer 306B is $y_2(t)$.

Coefficient multiplied signal 402A output by coefficient multiplier 401A is $z_1(t)$.

Coefficient multiplied signal 402B output by coefficient multiplier 401B is $z_2(t)$.

The precoding matrix is expressed as follows.

[MATH. 850]

$$\begin{pmatrix} q_{11} & q_{12} \\ q_{21} & q_{22} \end{pmatrix} \tag{850}$$

Accordingly, weighting synthesizer 306A calculates the following and outputs weighted signal 307A ($y_1(t)$).

[MATH. 851]

$$y_1(t) = q_{11} \times s_1(t) + q_{12} \times e^{j\gamma(t)} \times s_2(t) \tag{851}$$

Weighting synthesizer 306B calculates the following and outputs weighted signal 307B ($y_2(t)$).

[MATH. 852]

$$y_2(t) = q_{21} \times s_1(t) + q_{22} \times e^{j\gamma(t)} \times s_2(t) \tag{852}$$

Precoding method determiner 316 performs the calculations described in "(precoding method (25A)" based on feedback information from a terminal, and determines the precoding matrix.

[MATH. 853]

$$\begin{pmatrix} q_{11} & q_{12} \\ q_{21} & q_{22} \end{pmatrix} = \begin{pmatrix} e^{j\mu} \times \cos\theta & e^{j(\mu+\lambda)} \times \sin\theta \\ e^{j\omega} \times \sin\theta & -e^{j(\omega+\lambda)} \times \cos\theta \end{pmatrix} \tag{853}$$

In other words, the precoding matrix of the above equation and values for a and b are calculated. Here, based on feedback information from a terminal, precoding method determiner 316 uses

[MATH. 854]

$$b = \frac{h_{11}(t)}{h_{22}(t)} \times a \times e^{j(\mu-\omega)} \tag{854-1}$$

and $$\theta = -\delta + n\pi \text{ radians} \tag{854-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (25A))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 855]

$$\begin{pmatrix} r_1(t) \\ r_2(t) \end{pmatrix} = \begin{pmatrix} h_{11}(t) & h_{12}(t) \\ h_{21}(t) & h_{22}(t) \end{pmatrix} \begin{pmatrix} z_1(t) \\ z_2(t) \end{pmatrix} + \begin{pmatrix} n_1(t) \\ n_2(t) \end{pmatrix} = \left( \sqrt{\frac{K}{K+1}} \begin{pmatrix} h_{11,d}(t) & h_{12,d}(t) \\ h_{21,d}(t) & h_{22,d}(t) \end{pmatrix} + \sqrt{\frac{1}{K+1}} \begin{pmatrix} h_{11,s}(t) & h_{12,s}(t) \\ h_{21,s}(t) & h_{22,s}(t) \end{pmatrix} \right) \begin{pmatrix} z_1(t) \\ z_2(t) \end{pmatrix} + \begin{pmatrix} n_1(t) \\ n_2(t) \end{pmatrix} \tag{855}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (25A)" is not satisfied.

(Precoding Method (25B))

In a state such as in FIG. 2, signals $r_1(t)$, $r_2(t)$ that are received by a reception device can be applied as follows (note that δ is greater than or equal to 0 radians and less than 2π radians).

[MATH. 856]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \tag{856}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 857]

$$\begin{pmatrix} z_1(t) \\ z_2(t) \end{pmatrix} = \begin{pmatrix} a & 0 \\ 0 & b \end{pmatrix} \begin{pmatrix} e^{j\mu}\times\cos\theta & e^{j(\mu+\lambda)}\times\sin\theta \\ e^{j\omega}\times\sin\theta & -e^{j(\omega+\lambda)}\times\cos\theta \end{pmatrix} \begin{pmatrix} 1 & 0 \\ 0 & e^{j\gamma(t)} \end{pmatrix} \begin{pmatrix} s_1(t) \\ s_2(t) \end{pmatrix} \tag{857}$$

However, a and b are complex numbers (may be actual numbers). j is an imaginary unit, and y(t) is an argument and a time function.

In this case, the following relation equation holds true.

[MATH. 858]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} e^{j\mu}\times\cos\theta & e^{j(\mu+\lambda)}\times\sin\theta \\ e^{j\omega}\times\sin\theta & -e^{j(\omega+\lambda)}\times\cos\theta \end{pmatrix} \begin{pmatrix} 1 & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} \begin{matrix} h_{11}(t)\times a\times e^{j\mu}\times \\ \cos\delta\times\cos\theta - \\ h_{22}(t)\times b\times e^{j\omega}\times \\ \sin\delta\times\sin\theta \end{matrix} & \begin{matrix} h_{11}(t)\times a\times e^{j(\mu+\lambda)}\times \\ \cos\delta\times\sin\theta + \\ h_{22}(t)\times b\times e^{j(\omega+\lambda)}\times \\ \sin\delta\times\cos\theta \end{matrix} \\ \begin{matrix} h_{11}(t)\times a\times e^{j\mu}\times \\ \sin\delta\times\cos\theta + \\ h_{22}(t)\times b\times e^{j\omega}\times \\ \cos\delta\times\sin\theta \end{matrix} & \begin{matrix} h_{11}(t)\times a\times e^{j(\mu+\lambda)}\times \\ \sin\delta\times\sin\theta - \\ h_{22}(t)\times b\times e^{j(\omega+\lambda)}\times \\ \cos\delta\times\cos\theta \end{matrix} \end{pmatrix} \begin{pmatrix} s_1(t) \\ e^{j\gamma(t)}s_2(t) \end{pmatrix} + \begin{pmatrix} n_1(t) \\ n_2(t) \end{pmatrix} \end{aligned} \tag{858}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 859]

$$h_{11}(t)\times a\times e^{j\mu}\times\cos\delta\times\cos\theta - h_{22}(t)\times b\times e^{j\omega}\times\sin\delta\times\sin\theta=0 \tag{859-1}$$

$$h_{11}(t)\times a\times e^{j(\mu+\lambda)}\times\sin\delta\times\sin\theta - h_{22}(t)\times b\times e^{j(\omega+\lambda)}\times\cos\delta\times\cos\theta=0 \tag{859-2}$$

Accordingly, it is sufficient if the following holds true.

[MATH. 860]

$$b = \frac{h_{11}(t)}{h_{22}(t)}\times a\times e^{j(\mu-\omega)} \tag{860-1}$$

and $$\theta = -\delta + \frac{\pi}{2} + n\pi \text{ radians} \tag{860-2}$$

($n$ is an integer)

Accordingly, the communications station calculates θ, a, and b from the feedback information from the terminal so that the following is true.

[MATH. 861]

$$b = \frac{h_{11}(t)}{h_{22}(t)} \times a \times e^{j(\mu-\omega)} \quad (861\text{-}1)$$

and $$\theta = -\delta + \frac{\pi}{2} + n\pi \text{ radians} \quad (861\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 862]

$$|a|^2+|b|^2=|u|^2 \quad (862)$$

($|u|^2$ is a parameter based on average transmitted power)

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (25B-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$.

Mapped signal 305B output by mapper 304B is $s_2(t)$.

Weighted signal 307A output by weighting synthesizer 306A is $z_1(t)$.

Weighted signal 307B output by weighting synthesizer 306B is $z_2(t)$.

The precoding matrix is expressed as follows.

[MATH. 863]

$$\begin{pmatrix} q_{11} & q_{12} \\ q_{21} & q_{22} \end{pmatrix} \quad (863)$$

Accordingly, weighting synthesizer 306A calculates the following and outputs weighted signal 307A ($z_1(t)$).

[MATH. 864]

$$z_1(t)=q_{11}\times s_1(t)+q_{12}\times e^{j\gamma(t)}\times s_2(t) \quad (864)$$

Weighting synthesizer 306B calculates the following and outputs weighted signal 307B ($z_2(t)$).

[MATH. 865]

$$z_2(t)=q_{21}\times s_1(t)+q_{22}\times e^{j\gamma(t)}\times s_2(t) \quad (865)$$

Precoding method determiner 316 performs the calculations described in "(precoding method (25B)" based on feedback information from a terminal, and determines the precoding matrix.

[MATH. 866]

$$\begin{pmatrix} q_{11} & q_{12} \\ q_{21} & q_{22} \end{pmatrix} = \begin{pmatrix} a & 0 \\ 0 & b \end{pmatrix} \begin{pmatrix} e^{j\mu}\times\cos\theta & e^{j(\mu+\lambda)}\times\sin\theta \\ e^{j\omega}\times\sin\theta & -e^{j(\omega+\lambda)}\times\cos\theta \end{pmatrix} = \begin{pmatrix} a\times e^{j\mu}\times\cos\theta & a\times e^{j(\mu+\lambda)}\times\sin\theta \\ b\times e^{j\omega}\times\sin\theta & -b\times e^{j(\omega+\lambda)}\times\cos\theta \end{pmatrix} \quad (866)$$

In other words, the precoding matrix of the above equation is calculated. Here, based on feedback information from a terminal, precoding method determiner 316 uses

[MATH. 867]

$$b = \frac{h_{11}(t)}{h_{22}(t)} \times a \times e^{j(\mu-\omega)} \quad (867\text{-}1)$$

and $$\theta = -\delta + \frac{\pi}{2} + n\pi \text{ radians} \quad (867\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (25B-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$.

Mapped signal 305B output by mapper 304B is $s_2(t)$.

Weighted signal 307A output by weighting synthesizer 306A is $y_1(t)$.

Weighted signal 307B output by weighting synthesizer 306B is $y_2(t)$.

Coefficient multiplied signal 402A output by coefficient multiplier 401A is $z_1(t)$.

Coefficient multiplied signal 402B output by coefficient multiplier 401B is $z_2(t)$.

The precoding matrix is expressed as follows.

[MATH. 868]

$$\begin{pmatrix} q_{11} & q_{12} \\ q_{21} & q_{22} \end{pmatrix} \quad (868)$$

Accordingly, weighting synthesizer 306A calculates the following and outputs weighted signal 307A ($y_1(t)$).

[MATH. 869]

$$y_1(t)=q_{11}\times s_1(t)+q_{12}\times e^{j\gamma(t)}\times s_2(t) \tag{869}$$

Weighting synthesizer 306B calculates the following and outputs weighted signal 307B ($y_2(t)$).

[MATH. 870]

$$y_2(t)=q_{21}\times s_1(t)+q_{22}\times e^{j\gamma(t)}\times s_2(t) \tag{870}$$

Precoding method determiner 316 performs the calculations described in "(precoding method (25B)" based on feedback information from a terminal, and determines the precoding matrix.

[MATH. 871]

$$\begin{pmatrix} q_{11} & q_{12} \\ q_{21} & q_{22} \end{pmatrix} = \begin{pmatrix} e^{j\mu}\times\cos\theta & e^{j(\mu+\lambda)}\times\sin\theta \\ e^{j\omega}\times\sin\theta & -e^{j(\omega+\lambda)}\times\cos\theta \end{pmatrix} \tag{871}$$

In other words, the precoding matrix of the above equation and values for a and b are calculated. Here, based on feedback information from a terminal, precoding method determiner 316 uses

[MATH. 872]

$$b = \frac{h_{11}(t)}{h_{22}(t)}\times a\times e^{j(\mu-\omega)} \tag{872-1}$$

and $$\theta = -\delta + \frac{\pi}{2} + n\pi \text{ radians} \tag{872-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (25B))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 873]

$$\begin{aligned}\begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right) \\ &\quad \begin{pmatrix} z_1(t) \\ z_2(t) \end{pmatrix} + \begin{pmatrix} n_1(t) \\ n_2(t) \end{pmatrix}\end{aligned} \tag{873}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (25B)" is not satisfied.

(Precoding Method (26A))

In a state such as in FIG. 2, signals $r_1(t)$, $r_2(t)$ that are received by a reception device can be applied as follows (note that δ is greater than or equal to 0 radians and less than 2π radians).

[MATH. 874]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix}\end{aligned} \tag{874}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 875]

$$\begin{pmatrix} z_1(t) \\ z_2(t) \end{pmatrix} = \begin{pmatrix} a & 0 \\ 0 & b \end{pmatrix} \begin{pmatrix} \beta \times e^{j\mu} \times \cos\theta & \beta \times e^{j(\mu+\lambda)} \times \sin\theta \\ \beta \times e^{j\omega} \times \sin\theta & -\beta \times e^{j(\omega+\lambda)} \times \cos\theta \end{pmatrix} \begin{pmatrix} 1 & 0 \\ 0 & e^{jy(t)} \end{pmatrix} \begin{pmatrix} s_1(t) \\ s_2(t) \end{pmatrix} \quad (875)$$

However, a and b are complex numbers (may be actual numbers). j is an imaginary unit, and y(t) is an argument and a time function.

In this case, the following equation holds true.

[MATH. 876]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \quad (876) \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \\ &\quad \begin{pmatrix} \beta\times e^{j\mu}\times\cos\theta & \beta\times e^{j(\mu+\lambda)}\times\sin\theta \\ \beta\times e^{j\omega}\times\sin\theta & -\beta\times e^{j(\omega+\lambda)}\times\cos\theta \end{pmatrix} \\ &\quad \begin{pmatrix} 1 & 0 \\ 0 & e^{jy(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\beta\times e^{j\mu}\times\cos\delta\times\cos\theta - h_{22}(t)\times b\times\beta\times e^{j\omega}\times\sin\delta\times\sin\theta & h_{11}(t)\times a\times\beta\times e^{j(\mu+\lambda)}\times\cos\delta\times\sin\theta + h_{22}(t)\times b\times\beta\times e^{j(\omega+\lambda)}\times\sin\delta\times\cos\theta \\ h_{11}(t)\times a\times\beta\times e^{j\mu}\times\sin\delta\times\cos\theta + h_{22}(t)\times b\times\beta\times e^{j\omega}\times\cos\delta\times\sin\theta & h_{11}(t)\times a\times\beta\times e^{j(\mu+\lambda)}\times\sin\delta\times\sin\theta - h_{22}(t)\times b\times\beta\times e^{j(\omega+\lambda)}\times\cos\delta\times\cos\theta \end{pmatrix} \\ &\quad \begin{pmatrix} s_1(t) \\ e^{jy(t)}s_2(t) \end{pmatrix} + \begin{pmatrix} n_1(t) \\ n_2(t) \end{pmatrix} \end{aligned}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 877]

$$h_{11}(t)\times a\times\beta\times e^{j(\mu+\lambda)}\times\cos\delta\times\sin\theta + h_{22}(t)\times b\times\beta\times e^{j(\omega+\lambda)}\times\sin\delta\times\cos\theta = 0 \quad (877\text{-}1)$$

$$h_{11}(t)\times a\times\beta\times e^{j\mu}\times\sin\delta\times\sin\theta + h_{22}(t)\times b\times\beta e^{j\omega}\times\cos\delta\times\sin\theta = 0 \quad (877\text{-}2)$$

Accordingly, it is sufficient if the following holds true.

[MATH. 878]

$$b = \frac{h_{11}(t)}{h_{22}(t)} \times a \times e^{j(\mu-\omega)} \quad (878\text{-}1)$$

and $$\theta = -\delta + n\pi \text{ radians} \quad (878\text{-}2)$$

(n is an integer)

Accordingly, the communications station calculates θ, a, and b from the feedback information from the terminal so that the following is true.

[MATH. 879]

$$b = \frac{h_{11}(t)}{h_{22}(t)} \times a \times e^{j(\mu-\omega)} \quad (879\text{-}1)$$

and $$\theta = -\delta + n\pi \text{ radians} \quad (879\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 880]

$$|a|^2+|b|^2=|u|^2 \quad (880)$$

($|u|^2$ is a parameter based on average transmitted power)

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (26A-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 881]

$$\begin{pmatrix} q_{11} & q_{12} \\ q_{21} & q_{22} \end{pmatrix} \quad (881)$$

Accordingly, weighting synthesizer 306A calculates the following and outputs weighted signal 307A ($z_1(t)$).

[MATH. 882]

$$z_1(t)=q_{11}\times s_1(t)+q_{12}\times e^{jy(t)}\times s_2(t) \quad (882)$$

Weighting synthesizer 306B calculates the following and outputs weighted signal 307B ($z_2(t)$).

[MATH. 883]

$$z_2(t)=q_{21}\times s_1(t)+q_{22}\times e^{j\gamma(t)}\times s_2(t) \tag{883}$$

Precoding method determiner 316 performs the calculations described in "(precoding method (26A)" based on feedback information from a terminal, and determines the precoding matrix.

[MATH. 884]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \beta\times e^{j\mu}\times\cos\theta & \beta\times e^{j(\mu+\lambda)}\times\sin\theta \\ \beta\times e^{j\omega}\times\sin\theta & -\beta\times e^{j(\omega+\lambda)}\times\cos\theta \end{pmatrix} = \begin{pmatrix} a\times\beta\times e^{j\mu}\times\cos\theta & a\times\beta\times e^{j(\mu+\lambda)}\times\sin\theta \\ b\times\beta\times e^{j\omega}\times\sin\theta & -b\times\beta\times e^{j(\omega+\lambda)}\times\cos\theta \end{pmatrix} \tag{884}$$

In other words, the precoding matrix of the above equation is calculated. Here, based on feedback information from a terminal, precoding method determiner 316 uses

[MATH. 885]

$$b = \frac{h_{11}(t)}{h_{22}(t)}\times a\times e^{j(\mu-\omega)} \tag{885-1}$$

and $$\theta = -\delta + n\pi \text{ radians} \tag{885-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (26A-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 886]

$$\begin{pmatrix} q_{11} & q_{12} \\ q_{21} & q_{22} \end{pmatrix} \tag{886}$$

Accordingly, weighting synthesizer 306A calculates the following and outputs weighted signal 307A ($y_1(t)$).

[MATH. 887]

$$y_1(t)=q_{11}\times s_1(t)+q_{12}\times e^{j\gamma(t)}\times s_2(t) \tag{887}$$

Weighting synthesizer 306B calculates the following and outputs weighted signal 307B ($y_2(t)$).

[MATH. 888]

$$y_2(t)=q_{21}\times s_1(t)+q_{22}\times e^{j\gamma(t)}\times s_2(t) \tag{888}$$

Precoding method determiner 316 performs the calculations described in "(precoding method (26A)" based on feedback information from a terminal, and determines the precoding matrix.

[MATH. 889]

$$\begin{pmatrix} q_{11} & q_{12} \\ q_{21} & q_{22} \end{pmatrix} = \begin{pmatrix} \beta\times e^{j\mu}\times\cos\theta & \beta\times e^{j(\mu+\lambda)}\times\sin\theta \\ \beta\times e^{j\omega}\times\sin\theta & -\beta\times e^{j(\omega+\lambda)}\times\cos\theta \end{pmatrix} \tag{889}$$

In other words, the precoding matrix of the above equation and values for a and b are calculated. Here, based on feedback information from a terminal, precoding method determiner 316 uses

[MATH. 890]

$$b = \frac{h_{11}(t)}{h_{22}(t)}\times a\times e^{j(\mu-\omega)} \tag{890-1}$$

and $$\theta = -\delta + n\pi \text{ radians} \tag{890-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (26A))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 891]

$$\begin{pmatrix} r_1(t) \\ r_2(t) \end{pmatrix} = \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} = \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right)\begin{pmatrix} z_1(t) \\ z_2(t) \end{pmatrix} + \begin{pmatrix} n_1(t) \\ n_2(t) \end{pmatrix} \tag{873}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (26A)" is not satisfied.

(Precoding Method (26B))

In a state such as in FIG. 2, signals $r_1(t)$, $r_2(t)$ that are received by a reception device can be applied as follows (note that δ is greater than or equal to 0 radians and less than 2π radians).

[MATH. 892]

$$\begin{pmatrix} r_1(t) \\ r_2(t) \end{pmatrix} = \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix} \tag{892}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 893]

$$\begin{pmatrix} z_1(t) \\ z_2(t) \end{pmatrix} = \begin{pmatrix} a & 0 \\ 0 & b \end{pmatrix}\begin{pmatrix} \beta\times e^{j\mu}\times\cos\theta & \beta\times e^{j(\mu+\lambda)}\times\sin\theta \\ \beta\times e^{j\omega}\times\sin\theta & -\beta\times e^{j(\omega+\lambda)}\times\cos\theta \end{pmatrix}\begin{pmatrix} 1 & 0 \\ 0 & e^{j\gamma(t)} \end{pmatrix}\begin{pmatrix} s_1(t) \\ s_2(t) \end{pmatrix} \tag{893}$$

However, a and b are complex numbers (may be actual numbers). j is an imaginary unit, and y(t) is an argument and a time function.

In this case, the following relation equation holds true.

[MATH. 894]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} a & 0 \\ 0 & b \end{pmatrix} \begin{pmatrix} \beta\times e^{j\mu}\times\sin\theta & \beta\times e^{j(\mu+\lambda)}\times\cos\theta \\ \beta\times e^{j\omega}\times\cos\theta & -\beta\times e^{j(\omega+\lambda)}\times\sin\theta \end{pmatrix} \begin{pmatrix} 1 & 0 \\ 0 & e^{j\gamma(t)} \end{pmatrix}\begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\beta\times e^{j\mu}\times\cos\delta\times\cos\theta - h_{22}(t)\times b\times\beta\times e^{j\omega}\times\sin\delta\times\sin\theta & h_{11}(t)\times a\times\beta\times e^{j(\mu+\lambda)}\times\cos\delta\times\sin\theta + h_{22}(t)\times b\times\beta\times e^{j(\omega+\lambda)}\times\sin\delta\times\cos\theta \\ h_{11}(t)\times a\times\beta\times e^{j\mu}\times\sin\delta\times\cos\theta + h_{22}(t)\times b\times\beta\times e^{j\omega}\times\cos\delta\times\sin\theta & h_{11}(t)\times a\times\beta\times e^{j(\mu+\lambda)}\times\sin\delta\times\sin\theta - h_{22}(t)\times b\times\beta\times e^{j(\omega+\lambda)}\times\cos\delta\times\cos\theta \end{pmatrix} \begin{pmatrix} s_1(t) \\ e^{j\gamma(t)}s_2(t) \end{pmatrix} + \begin{pmatrix} n_1(t) \\ n_2(t) \end{pmatrix} \end{aligned} \tag{894}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 895]

$$h_{11}(t)\times a\times\beta\times e^{j\mu}\times\cos\delta\times\cos\theta-h_{22}(t)\times b\times\beta\times e^{j\omega}\times\sin\delta\times\sin\theta=0 \tag{895-1}$$

$$h_{11}(t)\times a\times\beta\times e^{j(\mu+\lambda)}\times\sin\delta\times\sin\theta-h_{22}(t)\times b\times\beta\times e^{j(\omega+\lambda)}\times\cos\delta\times\cos\theta=0 \tag{895-2}$$

Accordingly, it is sufficient if the following holds true.

[MATH. 896]

$$b = \frac{h_{11}(t)}{h_{22}(t)} \times a \times e^{j(\mu-\omega)} \tag{896-1}$$

and $$\theta = -\delta + \frac{\pi}{2} + n\pi \text{ radians} \tag{896-2}$$

($n$ is an integer)

Accordingly, the communications station calculates θ, a, and b from the feedback information from the terminal so that the following is true.

[MATH. 897]

$$b = \frac{h_{11}(t)}{h_{22}(t)} \times a \times e^{j(\mu-\omega)} \tag{897-1}$$

and $$\theta = -\delta + \frac{\pi}{2} + n\pi \text{ radians} \tag{897-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 898]

$$|a|^2+|b|^2=|u|^2 \tag{898}$$

($|u|^2$ is a parameter based on average transmitted power)

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (26B-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 899]

$$\begin{pmatrix} q_{11} & q_{12} \\ q_{21} & q_{22} \end{pmatrix} \tag{899}$$

Accordingly, weighting synthesizer 306A calculates the following and outputs weighted signal 307A ($z_1(t)$).

[MATH. 900]

$$z_1(t)=q_{11}\times s_1(t)+q_{12}\times e^{j\gamma(t)}\times s_2(t) \tag{900}$$

Weighting synthesizer 306B calculates the following and outputs weighted signal 307B ($z_2(t)$).

[MATH. 901]

$$z_2(t)=q_{21}\times s_1(t)+q_{22}\times e^{j\gamma(t)}\times s_2(t) \tag{901}$$

Precoding method determiner 316 performs the calculations described in "(precoding method (26B)" based on feedback information from a terminal, and determines the precoding matrix.

[MATH. 902]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \beta\times e^{j\mu}\times\cos\theta & \beta\times e^{j(\mu+\lambda)}\times\sin\theta \\ \beta\times e^{j\omega}\times\sin\theta & -\beta\times e^{j(\omega+\lambda)}\times\cos\theta \end{pmatrix} = \begin{pmatrix} a\times\beta\times e^{j\mu}\times\cos\theta & a\times\beta\times e^{j(\mu+\lambda)}\times\sin\theta \\ b\times\beta\times e^{j\omega}\times\sin\theta & -b\times\beta\times e^{j(\omega+\lambda)}\times\cos\theta \end{pmatrix} \tag{902}$$

In other words, the precoding matrix of the above equation is calculated. Here, based on feedback information from a terminal, precoding method determiner 316 uses

[MATH. 903]

$$b = \frac{h_{11}(t)}{h_{22}(t)} \times a \times e^{j(\mu-\omega)} \tag{903-1}$$

and $$\theta = -\delta + \frac{\pi}{2} + n\pi \text{ radians} \tag{903-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (26B-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 904]

$$\begin{pmatrix} q_{11} & q_{12} \\ q_{21} & q_{22} \end{pmatrix} \tag{904}$$

Accordingly, weighting synthesizer 306A calculates the following and outputs weighted signal 307A ($y_1(t)$).

[MATH. 905]

$$y_1(t)=q_{11}\times s_1(t)+q_{12}\times e^{j\gamma(t)}\times s_2(t) \tag{905}$$

Weighting synthesizer 306B calculates the following and outputs weighted signal 307B ($y_2(t)$).

[MATH. 906]

$$y_2(t)=q_{21}\times s_1(t)+q_{22}\times e^{j\gamma(t)}\times s_2(t) \tag{906}$$

Precoding method determiner 316 performs the calculations described in "(precoding method (26B)" based on feedback information from a terminal, and determines the precoding matrix.

[MATH. 907]

$$\begin{pmatrix} q_{11} & q_{12} \\ q_{21} & q_{22} \end{pmatrix} = \begin{pmatrix} \beta\times e^{j\mu}\times\cos\theta & \beta\times e^{j(\mu+\lambda)}\times\sin\theta \\ \beta\times e^{j\omega}\times\sin\theta & -\beta\times e^{j(\omega+\lambda)}\times\cos\theta \end{pmatrix} \tag{907}$$

In other words, the precoding matrix of the above equation and values for a and b are calculated. Here, based on feedback information from a terminal, precoding method determiner 316 uses

[MATH. 908]

$$b = \frac{h_{11}(t)}{h_{22}(t)}\times a\times e^{j(\mu-\omega)} \tag{908-1}$$

and $$\theta = -\delta + \frac{\pi}{2} + n\pi \text{ radians} \tag{908-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (26B))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 909]

$$\begin{aligned}\begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right) \begin{pmatrix} z_1(t) \\ z_2(t) \end{pmatrix} + \begin{pmatrix} n_1(t) \\ n_2(t) \end{pmatrix}\end{aligned} \tag{909}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (26B)" is not satisfied.

(Precoding Method (27A))

In a state such as in FIG. 2, signals $r_1(t)$, $r_2(t)$ that are received by a reception device can be applied as follows (note that δ is greater than or equal to 0 radians and less than 2π radians).

[MATH. 910]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \tag{910}$$

Here, when $z_1(t)=s_1(t)$ and $z_2(t)=s_2(t)$ ($s_1(t)$ and $s_2(t)$ are mapped baseband signals), excluding when $\delta=0$, $\pi/2$, $\pi$, or $3\pi/2$ radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 893]

$$\begin{pmatrix} z_1(t) \\ z_2(t) \end{pmatrix} = \begin{pmatrix} a & 0 \\ 0 & b \end{pmatrix} \begin{pmatrix} e^{j\mu}\times\cos\theta & -e^{j(\mu+\lambda)}\times\sin\theta \\ e^{j\omega}\times\sin\theta & e^{j(\omega+\lambda)}\times\cos\theta \end{pmatrix} \begin{pmatrix} 1 & 0 \\ 0 & e^{j\gamma(t)} \end{pmatrix} \begin{pmatrix} s_1(t) \\ s_2(t) \end{pmatrix} \tag{893}$$

However, a and b are complex numbers (may be actual numbers). j is an imaginary unit, and y(t) is an argument and a time function.

In this case, the following equation holds true.

[MATH. 912]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \\ &\quad \begin{pmatrix} e^{j\mu}\times\cos\theta & -e^{j(\mu+\lambda)}\times\sin\theta \\ e^{j\omega}\times\sin\theta & e^{j(\omega+\lambda)}\times\cos\theta \end{pmatrix} \\ &\quad \begin{pmatrix} 1 & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} \begin{matrix} h_{11}(t)\times a\times e^{j\mu}\times \\ \cos\delta\times\cos\theta - \\ h_{22}(t)\times b\times e^{j\omega}\times \\ \sin\delta\times\sin\theta \end{matrix} & \begin{matrix} -h_{11}(t)\times a\times e^{j(\mu+\lambda)}\times \\ \cos\delta\times\sin\theta - \\ h_{22}(t)\times b\times e^{j(\omega+\lambda)}\times \\ \sin\delta\times\cos\theta \end{matrix} \\ \begin{matrix} h_{11}(t)\times a\times e^{j\mu}\times \\ \sin\delta\times\cos\theta + \\ h_{22}(t)\times b\times e^{j\omega}\times \\ \cos\delta\times\sin\theta \end{matrix} & \begin{matrix} -h_{11}(t)\times a\times e^{j(\mu+\lambda)}\times \\ \sin\delta\times\sin\theta + \\ h_{22}(t)\times b\times e^{j(\omega+\lambda)}\times \\ \cos\delta\times\cos\theta \end{matrix} \end{pmatrix} \\ &\quad \begin{pmatrix} s_1(t) \\ e^{j\gamma(t)}s_2(t) \end{pmatrix} + \begin{pmatrix} n_1(t) \\ n_2(t) \end{pmatrix} \end{aligned} \tag{912}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 913]

$$-h_{11}(t)\times a\times e^{j(\mu+\lambda)}\times\cos\delta\times\sin\theta-h_{22}(t)\times b\times e^{j(\omega+\lambda)}\times\sin\delta\times\cos\theta=0 \tag{913-1}$$

$$h_{11}(t)\times a\times e^{j\mu}\times\sin\delta\times\cos\theta-h_{22}(t)\times b\times e^{j\omega}\times\cos\delta\times\sin\theta=0 \tag{913-2}$$

Accordingly, it is sufficient if the following holds true.

[MATH. 914]

$$b=\frac{h_{11}(t)}{h_{22}(t)}\times a\times e^{j(\mu-\omega)} \tag{914-1}$$

and $$\theta=-\delta+n\pi \text{ radians} \tag{914-2}$$

($n$ is an integer)

Accordingly, the communications station calculates θ, a, and b from the feedback information from the terminal so that the following is true.

[MATH. 915]

$$b=\frac{h_{11}(t)}{h_{22}(t)}\times a\times e^{j(\mu-\omega)} \tag{915-1}$$

and $$\theta=-\delta+n\pi \text{ radians} \tag{915-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 916]

$$|a|^2+|b|^2=|u|^2 \tag{916}$$

($|u|^2$ is a parameter based on average transmitted power)

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (27A-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 917]

$$\begin{pmatrix} q_{11} & q_{12} \\ q_{21} & q_{22} \end{pmatrix} \tag{917}$$

Accordingly, weighting synthesizer 306A calculates the following and outputs weighted signal 307A ($z_1(t)$).

[MATH. 918]

$$z_1(t)=q_{11}\times s_1(t)+q_{12}\times e^{j\gamma(t)}\times s_2(t) \tag{918}$$

Weighting synthesizer 306B calculates the following and outputs weighted signal 307B ($z_2(t)$).

[MATH. 919]

$$z_2(t)=q_{21}\times s_1(t)+q_{22}\times e^{j\gamma(t)}\times s_2(t) \tag{919}$$

Precoding method determiner 316 performs the calculations described in "(precoding method (27A)" based on feedback information from a terminal, and determines the precoding matrix.

[MATH. 920]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} e^{j\mu}\times\cos\theta & -e^{j(\mu+\lambda)}\times\sin\theta \\ e^{j\omega}\times\sin\theta & e^{j(\omega+\lambda)}\times\cos\theta \end{pmatrix} = \begin{pmatrix} a\times e^{j\mu}\times\cos\theta & -a\times e^{j(\mu+\lambda)}\times\sin\theta \\ b\times e^{j\omega}\times\sin\theta & b\times e^{j(\omega+\lambda)}\times\cos\theta \end{pmatrix} \tag{920}$$

In other words, the precoding matrix of the above equation is calculated. Here, based on feedback information from a terminal, precoding method determiner 316 uses

[MATH. 921]

$$b=\frac{h_{11}(t)}{h_{22}(t)}\times a\times e^{j(\mu-\omega)} \tag{921-1}$$

and $$\theta=-\delta+n\pi \text{ radians} \tag{921-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (27A-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 922]

$$\begin{pmatrix} q_{11} & q_{12} \\ q_{21} & q_{22} \end{pmatrix} \tag{922}$$

Accordingly, weighting synthesizer 306A calculates the following and outputs weighted signal 307A ($y_1(t)$).

[MATH. 923]

$$y_1(t)=q_{11}\times s_1(t)+q_{12}\times e^{j\gamma(t)}\times s_2(t) \tag{923}$$

Weighting synthesizer 306B calculates the following and outputs weighted signal 307B ($y_2(t)$).

[MATH. 924]

$$y_2(t)=q_{21}\times s_1(t)+q_{22}\times e^{j\gamma(t)}\times s_2(t) \tag{924}$$

Precoding method determiner 316 performs the calculations described in "(precoding method (27A)" based on feedback information from a terminal, and determines the precoding matrix.

[MATH. 925]

$$\begin{pmatrix} q_{11} & q_{12} \\ q_{21} & q_{22} \end{pmatrix} = \begin{pmatrix} e^{j\mu}\times\cos\theta & -e^{j(\mu+\lambda)}\times\sin\theta \\ e^{j\omega}\times\sin\theta & e^{j(\omega+\lambda)}\times\cos\theta \end{pmatrix} \tag{925}$$

In other words, the precoding matrix of the above equation and values for a and b are calculated. Here, based on feedback information from a terminal, precoding method determiner 316 uses

[MATH. 926]

$$b=\frac{h_{11}(t)}{h_{22}(t)}\times a\times e^{j(\mu-\omega)} \tag{926-1}$$

and $$\theta=-\delta+n\pi \text{ radians} \tag{926-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (27A))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 927]

$$\begin{aligned}\begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right) \\ &\quad \begin{pmatrix} z_1(t) \\ z_2(t) \end{pmatrix} + \begin{pmatrix} n_1(t) \\ n_2(t) \end{pmatrix}\end{aligned} \tag{927}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (27A)" is not satisfied.

(Precoding Method (27B))

In a state such as in FIG. 2, signals $r_1(t)$, $r_2(t)$ that are received by a reception device can be applied as follows (note that δ is greater than or equal to 0 radians and less than 2π radians).

[MATH. 928]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{21}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix}\end{aligned} \tag{928}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 929]

$$\begin{pmatrix} z_1(t) \\ z_2(t) \end{pmatrix} = \begin{pmatrix} a & 0 \\ 0 & b \end{pmatrix}\begin{pmatrix} e^{j\mu}\times\cos\theta & -e^{j(\mu+\lambda)}\times\sin\theta \\ e^{j\omega}\times\sin\theta & e^{j(\omega+\lambda)}\times\cos\theta \end{pmatrix}\begin{pmatrix} 1 & 0 \\ 0 & e^{j\gamma(t)} \end{pmatrix}\begin{pmatrix} s_1(t) \\ s_2(t) \end{pmatrix} \tag{929}$$

However, a and b are complex numbers (may be actual numbers). j is an imaginary unit, and y(t) is an argument and a time function.

In this case, the following relation equation holds true.

[MATH. 930]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} a & 0 \\ 0 & b \end{pmatrix} \\ &\quad \begin{pmatrix} e^{j\mu}\times\cos\theta & -e^{j(\mu+\lambda)}\times\sin\theta \\ e^{j\omega}\times\sin\theta & e^{j(\omega+\lambda)}\times\cos\theta \end{pmatrix} \\ &\quad \begin{pmatrix} 1 & 0 \\ 0 & e^{j\gamma(t)} \end{pmatrix}\begin{pmatrix} s_1(t) \\ s_2(t) \end{pmatrix} + \begin{pmatrix} n_1(t) \\ n_2(t) \end{pmatrix} \\ &= \begin{pmatrix} \begin{matrix} h_{11}(t)\times a\times e^{j\mu}\times \\ \cos\delta\times\cos\theta - \\ h_{22}(t)\times b\times e^{j\omega}\times \\ \sin\delta\times\sin\theta \end{matrix} & \begin{matrix} -h_{11}(t)\times a\times e^{j(\mu+\lambda)}\times \\ \cos\delta\times\sin\theta - \\ h_{22}(t)\times b\times e^{j(\omega+\lambda)}\times \\ \sin\delta\times\cos\theta \end{matrix} \\ \begin{matrix} h_{11}(t)\times a\times e^{j\mu}\times \\ \sin\delta\times\cos\theta + \\ h_{22}(t)\times b\times e^{j\omega}\times \\ \cos\delta\times\sin\theta \end{matrix} & \begin{matrix} -h_{11}(t)\times a\times e^{j(\mu+\lambda)}\times \\ \sin\delta\times\sin\theta + \\ h_{22}(t)\times b\times e^{j(\omega+\lambda)}\times \\ \cos\delta\times\cos\theta \end{matrix} \end{pmatrix} \\ &\quad \begin{pmatrix} s_1(t) \\ e^{j\gamma}s_2(t) \end{pmatrix} + \begin{pmatrix} n_1(t) \\ n_2(t) \end{pmatrix}\end{aligned} \tag{930}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 931]

$$h_{11}(t)\times a\times e^{j\mu}\times\cos\delta\times\cos\theta-h_{22}(t)\times b\times e^{j\omega}\times\sin\delta\times\sin\theta=0 \tag{931-1}$$

$$-h_{11}(t)\times a\times e^{j(\mu+\lambda)}\times\sin\delta\times\sin\theta+h_{22}(t)\times b\times e^{j(\omega+\lambda)}\times\cos\delta\times\cos\theta=0 \tag{931-2}$$

Accordingly, it is sufficient if the following holds true.

[MATH. 932]

$$b=\frac{h_{11}(t)}{h_{22}(t)}\times a\times e^{j(\mu-\omega)} \tag{932-1}$$

and $$\theta=-\delta+\frac{\pi}{2}+n\pi\text{ radians} \tag{932-2}$$

($n$ is an integer)

Accordingly, the communications station calculates θ, a, and b from the feedback information from the terminal so that the following is true.

[MATH. 933]

$$b=\frac{h_{11}(t)}{h_{22}(t)}\times a\times e^{j(\mu-\omega)} \tag{933-1}$$

and $$\theta=-\delta+\frac{\pi}{2}+n\pi\text{ radians} \tag{933-2}$$

($n$ is an integer)

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 934]

$$|a|^2+|b|^2=|u|^2 \tag{934}$$

($|u|^2$ is a parameter based on average transmitted power)

Note that, regarding mapped baseband signal $s_2(t)$, a phase-change is implemented, but the configuration “mapped baseband signal $s_1(t)$ is not affected (interference) by mapped baseband signal $s_2(t)$ and mapped baseband signal $s_2(t)$ is not affected (interference) by mapped baseband signal $s_1(t)$” is maintained.

(Precoding Method (27B-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 935]

$$\begin{pmatrix} q_{11} & q_{12} \\ q_{21} & q_{22} \end{pmatrix} \tag{935}$$

Accordingly, weighting synthesizer 306A calculates the following and outputs weighted signal 307A ($z_1(t)$).

[MATH. 936]

$$z_1(t)=q_{11}\times s_1(t)+q_{12}\times e^{j\gamma(t)}\times s_2(t) \tag{936}$$

Weighting synthesizer 306B calculates the following and outputs weighted signal 307B ($z_2(t)$).

[MATH. 937]

$$z_2(t)=q_{21}\times s_1(t)+q_{22}\times e^{j\gamma(t)}\times s_2(t) \tag{937}$$

Precoding method determiner 316 performs the calculations described in “(precoding method (27B)” based on feedback information from a terminal, and determines the precoding matrix.

[MATH. 938]

$$\begin{pmatrix} q_{11} & q_{12} \\ q_{21} & q_{22} \end{pmatrix}=\begin{pmatrix} a & 0 \\ 0 & b \end{pmatrix}\begin{pmatrix} e^{j\mu}\times\cos\theta & -e^{j(\mu+\lambda)}\times\sin\theta \\ e^{j\omega}\times\sin\theta & e^{j(\omega+\lambda)}\times\cos\theta \end{pmatrix}=\begin{pmatrix} a\times e^{j\mu}\times\cos\theta & -a\times e^{j(\mu+\lambda)}\times\sin\theta \\ b\times e^{j\omega}\times\sin\theta & b\times e^{j(\omega+\lambda)}\times\cos\theta \end{pmatrix} \tag{938}$$

In other words, the precoding matrix of the above equation is calculated. Here, based on feedback information from a terminal, precoding method determiner 316 uses

[MATH. 939]

$$b=\frac{h_{11}(t)}{h_{22}(t)}\times a\times e^{j(\mu-\omega)} \tag{939-1}$$

and $$\theta=-\delta+\frac{\pi}{2}+n\pi\text{ radians} \tag{939-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (27B-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 940]

$$\begin{pmatrix} q_{11} & q_{12} \\ q_{21} & q_{22} \end{pmatrix} \quad (940)$$

Accordingly, weighting synthesizer 306A calculates the following and outputs weighted signal 307A ($y_1(t)$).

[MATH. 941]

$$y_1(t)=q_{11}\times s_1(t)+q_{12}\times e^{j\gamma(t)}\times s_2(t) \quad (941)$$

Weighting synthesizer 306B calculates the following and outputs weighted signal 307B ($y_2(t)$).

[MATH. 942]

$$y_2(t)=q_{21}\times s_1(t)+q_{22}\times e^{j\gamma(t)}\times s_2(t) \quad (942)$$

Precoding method determiner 316 performs the calculations described in "(precoding method (27B)" based on feedback information from a terminal, and determines the precoding matrix.

[MATH. 943]

$$\begin{pmatrix} q_{11} & q_{12} \\ q_{21} & q_{22} \end{pmatrix} = \begin{pmatrix} e^{j\mu}\times\cos\theta & -e^{j(\mu+\lambda)}\times\sin\theta \\ e^{j\omega}\times\sin\theta & e^{j(\omega+\lambda)}\times\cos\theta \end{pmatrix} \quad (943)$$

In other words, the precoding matrix of the above equation and values for a and b are calculated. Here, based on feedback information from a terminal, precoding method determiner 316 uses

[MATH. 944]

$$b = \frac{h_{11}(t)}{h_{22}(t)}\times a\times e^{j(\mu-\omega)} \quad (944\text{-}1)$$

and $$\theta = -\delta + \frac{\pi}{2} + n\pi \text{ radians} \quad (944\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (27B))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 945]

$$\begin{aligned} \begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right)\begin{pmatrix} z_1(t) \\ z_2(t) \end{pmatrix} + \begin{pmatrix} n_1(t) \\ n_2(t) \end{pmatrix} \end{aligned} \quad (945)$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (27B)" is not satisfied.

(Precoding Method (28A))

In a state such as in FIG. 2, signals $r_1(t)$, $r_2(t)$ that are received by a reception device can be applied as follows (note that δ is greater than or equal to 0 radians and less than 2π radians).

[MATH. 946]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \tag{946}$$

Here, when $z_1(t)=s_1(t)$ and $z_2(t)=s_2(t)$ ($s_1(t)$ and $s_2(t)$ are mapped baseband signals), excluding when $\delta=0$, $\pi/2$, $\pi$, or $3\pi/2$ radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 947]

$$\begin{pmatrix} z_1(t) \\ z_2(t) \end{pmatrix} = \begin{pmatrix} a & 0 \\ 0 & b \end{pmatrix} \begin{pmatrix} \beta\times e^{j\mu}\times\cos\theta & -\beta\times e^{j(\mu+\lambda)}\times\sin\theta \\ \beta\times e^{j\omega}\times\sin\theta & \beta\times e^{j(\omega+\lambda)}\times\cos\theta \end{pmatrix} \begin{pmatrix} 1 & 0 \\ 0 & e^{j\gamma(t)} \end{pmatrix} \begin{pmatrix} s_1(t) \\ s_2(t) \end{pmatrix} \tag{947}$$

However, a and b are complex numbers (may be actual numbers). j is an imaginary unit, and y(t) is an argument and a time function.

In this case, the following equation holds true.

[MATH. 948]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \\ &\quad \begin{pmatrix} \beta\times e^{j\mu}\times\cos\theta & -\beta\times e^{j(\mu+\lambda)}\times\sin\theta \\ \beta\times e^{j\omega}\times\sin\theta & \beta\times e^{j(\omega+\lambda)}\times\cos\theta \end{pmatrix} \\ &\quad \begin{pmatrix} 1 & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} \begin{matrix} h_{11}(t)\times a\times\beta\times e^{j\mu}\times \\ \cos\delta\times\cos\theta - h_{22}(t)\times b\times \\ \beta\times e^{j\omega}\times\sin\delta\times\sin\theta \end{matrix} & \begin{matrix} -h_{11}(t)\times a\times\beta\times e^{j(\mu+\lambda)}\times \\ \cos\delta\times\sin\theta - h_{22}(t)\times b\times\beta\times \\ e^{j(\omega+\lambda)}\times\sin\delta\times\cos\theta \end{matrix} \\ \begin{matrix} h_{11}(t)\times a\times\beta\times e^{j\mu}\times \\ \sin\delta\times\cos\theta + h_{22}(t)\times b\times \\ \beta\times e^{j\omega}\times\cos\delta\times\sin\theta \end{matrix} & \begin{matrix} -h_{11}(t)\times a\times\beta\times e^{j(\mu+\lambda)}\times \\ \sin\delta\times\sin\theta + h_{22}(t)\times b\times\beta\times \\ e^{j(\omega+\lambda)}\times\cos\delta\times\cos\theta \end{matrix} \end{pmatrix} \\ &\quad \begin{pmatrix} s_1(t) \\ e^{j\gamma(t)} \quad s_2(t) \end{pmatrix} + \begin{pmatrix} n_1(t) \\ n_2(t) \end{pmatrix} \end{aligned} \tag{948}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 949]

$$-h_{11}(t)\times a\times\beta\times e^{j(\mu+\lambda)}\times\cos\delta\times\sin\theta - h_{22}(t)\times b\times\beta\times e^{j(\omega+\lambda)}\times\sin\delta\times\cos\theta=0 \tag{949-1}$$

$$h_{11}(t)\times a\times\beta\times e^{j\mu}\times\sin\delta\times\cos\theta - h_{22}(t)\times b\times\beta\times e^{j\omega}\times\cos\delta\times\sin\theta=0 \tag{949-2}$$

Accordingly, it is sufficient if the following holds true.

[MATH. 950]

$$b = \frac{h_{11}(t)}{h_{22}(t)}\times a\times e^{j(\mu-\omega)} \tag{950-1}$$

and $$\theta = -\delta + n\pi \text{ radians} \tag{950-2}$$

($n$ is an integer)

Accordingly, the communications station calculates θ, a, and b from the feedback information from the terminal so that the following is true.

[MATH. 951]

$$b = \frac{h_{11}(t)}{h_{22}(t)}\times a\times e^{j(\mu-\omega)} \tag{951-1}$$

and $$\theta = -\delta + n\pi \text{ radians} \tag{951-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 952]

$$|a|^2+|b|^2=|u|^2 \tag{952}$$

($|u|^2$ is a parameter based on average transmitted power)

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (28A-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$.

Mapped signal 305B output by mapper 304B is $s_2(t)$.

Weighted signal 307A output by weighting synthesizer 306A is $z_1(t)$.

Weighted signal 307B output by weighting synthesizer 306B is $z_2(t)$.

The precoding matrix is expressed as follows.

[MATH. 953]

$$\begin{pmatrix} q_{11} & q_{12} \\ q_{21} & q_{22} \end{pmatrix} \tag{953}$$

Accordingly, weighting synthesizer 306A calculates the following and outputs weighted signal 307A ($z_1(t)$).

[MATH. 954]

$$z_1(t)=q_{11}\times s_1(t)+q_{12}\times e^{j\gamma(t)}\times s_2(t) \tag{954}$$

Weighting synthesizer 306B calculates the following and outputs weighted signal 307B ($z_2(t)$).

[MATH. 955]

$$z_2(t)=q_{21}\times s_1(t)+q_{22}\times e^{j\gamma(t)}\times s_2(t) \tag{955}$$

Precoding method determiner 316 performs the calculations described in "(precoding method (28A)" based on feedback information from a terminal, and determines the precoding matrix.

[MATH. 956]

$$\begin{aligned}\begin{pmatrix} q_{11} & q_{12} \\ q_{21} & q_{22} \end{pmatrix} &= \begin{pmatrix} a & 0 \\ 0 & b \end{pmatrix}\begin{pmatrix} \beta\times e^{j\mu}\times\cos\theta & -\beta\times e^{j(\mu+\lambda)}\times\sin\theta \\ \beta\times e^{j\omega}\times\sin\theta & \beta\times e^{j(\omega+\lambda)}\times\cos\theta \end{pmatrix} \\ &= \begin{pmatrix} a\times\beta\times e^{j\mu}\times\cos\theta & -a\times\beta\times e^{j(\mu+\lambda)}\times\sin\theta \\ b\times\beta\times e^{j\omega}\times\sin\theta & b\times\beta\times e^{j(\omega+\lambda)}\times\cos\theta \end{pmatrix}\end{aligned} \tag{956}$$

In other words, the precoding matrix of the above equation is calculated. Here, based on feedback information from a terminal, precoding method determiner 316 uses

[MATH. 957]

$$b = \frac{h_{11}(t)}{h_{22}(t)}\times a\times e^{j(\mu-\omega)} \tag{957-1}$$

and $$\theta = -\delta + n\pi \text{ radians} \tag{957-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (28A-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 958]

$$\begin{pmatrix} q_{11} & q_{12} \\ q_{21} & q_{22} \end{pmatrix} \tag{958}$$

Accordingly, weighting synthesizer 306A calculates the following and outputs weighted signal 307A ($y_1(t)$).

[MATH. 959]

$$y_1(t)=q_{11}\times s_1(t)+q_{12}\times e^{j\gamma(t)}\times s_2(t) \tag{959}$$

Weighting synthesizer 306B calculates the following and outputs weighted signal 307B ($y_2(t)$).

[MATH. 960]

$$y_2(t)=q_{21}\times s_1(t)+q_{22}\times e^{j\gamma(t)}\times s_2(t) \tag{960}$$

Precoding method determiner 316 performs the calculations described in "(precoding method (28A)" based on feedback information from a terminal, and determines the precoding matrix.

[MATH. 961]

$$\begin{pmatrix} q_{11} & q_{12} \\ q_{21} & q_{22} \end{pmatrix} = \begin{pmatrix} \beta\times e^{j\mu}\times\cos\theta & -\beta\times e^{j(\mu+\lambda)}\times\sin\theta \\ \beta\times e^{j\omega}\times\sin\theta & \beta\times e^{j(\omega+\lambda)}\times\cos\theta \end{pmatrix} \tag{961}$$

In other words, the precoding matrix of the above equation and values for a and b are calculated. Here, based on feedback information from a terminal, precoding method determiner 316 uses

[MATH. 962]

$$b = \frac{h_{11}(t)}{h_{22}(t)}\times a\times e^{j(\mu-\omega)} \tag{962-1}$$

and

-continued $$\theta = -\delta + n\pi \text{ radians} \quad (n \text{ is an integer}) \tag{962-2}$$

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (28A))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 963]

$$\begin{aligned}\begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right)\begin{pmatrix} z_1(t) \\ z_2(t) \end{pmatrix} + \begin{pmatrix} n_1(t) \\ n_2(t) \end{pmatrix}\end{aligned} \tag{963}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (28A)" is not satisfied.

(Precoding Method (28B))

In a state such as in FIG. 2, signals $r_1(t)$, $r_2(t)$ that are received by a reception device can be applied as follows (note that δ is greater than or equal to 0 radians and less than 2π radians).

[MATH. 964]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix}\end{aligned} \tag{964}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 965]

$$\begin{pmatrix} z_1(t) \\ z_2(t) \end{pmatrix} = \begin{pmatrix} a & 0 \\ 0 & b \end{pmatrix}\begin{pmatrix} \beta\times e^{j\mu}\times\cos\theta & -\beta\times e^{j(\mu+\lambda)}\times\sin\theta \\ \beta\times e^{j\omega}\times\sin\theta & \beta\times e^{j(\omega+\lambda)}\times\cos\theta \end{pmatrix}\begin{pmatrix} 1 & 0 \\ 0 & e^{j\gamma(t)} \end{pmatrix}\begin{pmatrix} s_1(t) \\ s_2(t) \end{pmatrix} \tag{965}$$

However, a and b are complex numbers (may be actual numbers). j is an imaginary unit, and y(t) is an argument and a time function.

In this case, the following relation equation holds true.

[MATH. 966]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \tag{966}$$

$$= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix}$$

$$= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \beta\times e^{j\mu}\times\cos\theta & -\beta\times e^{j(\mu+\lambda)}\times\sin\theta \\ \beta\times e^{j\omega}\times\sin\theta & \beta\times e^{j(\omega+\lambda)}\times\cos\theta \end{pmatrix} \begin{pmatrix} 1 & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix}$$

$$= \begin{pmatrix} h_{11}(t)\times a\times\beta\times e^{j\mu}\times \cos\delta\times\cos\theta - h_{22}(t)\times b\times\beta\times e^{j\omega}\times \sin\delta\times\sin\theta & -h_{11}(t)\times a\times\beta\times e^{j(\mu+\lambda)}\times \cos\delta\times\sin\theta - h_{22}(t)\times b\times\beta\times e^{j(\omega+\lambda)}\times \sin\delta\times\cos\theta \\ h_{11}(t)\times a\times\beta\times e^{j\mu}\times \sin\delta\times\cos\theta + h_{22}(t)\times b\times\beta\times e^{j\omega}\times \cos\delta\times\sin\theta & -h_{11}(t)\times a\times\beta\times e^{j(\mu+\lambda)}\times \sin\delta\times\sin\theta + h_{22}(t)\times b\times\beta\times e^{j(\omega+\lambda)}\times \cos\delta\times\cos\theta \end{pmatrix} \begin{pmatrix} s_1(t) \\ e^{j\gamma(t)}s_2(t) \end{pmatrix} + \begin{pmatrix} n_1(t) \\ n_2(t) \end{pmatrix}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 967]

$$h_{11}(t)\times a\times\beta\times e^{j\mu}\times\cos\delta\times\cos\theta - h_{22}(t)\times b\times\beta\times e^{j\omega}\times\sin\delta\times\sin\theta=0 \tag{967-1}$$

$$-h_{11}(t)\times a\times\beta\times e^{j(\mu+\lambda)}\times\sin\delta\times\sin\theta + h_{22}(t)\times b\times\beta\times e^{j(\omega+\lambda)}\times\cos\delta\times\cos\theta=0 \tag{967-2}$$

Accordingly, it is sufficient if the following holds true.

[MATH. 968]

$$b = \frac{h_{11}(t)}{h_{22}(t)}\times a\times e^{j(\mu-\omega)} \tag{968-1}$$

and $$\theta = -\delta + \frac{\pi}{2} + n\pi \text{ radians} \tag{968-2}$$

($n$ is an integer)

Accordingly, the communications station calculates θ, a, and b from the feedback information from the terminal so that the following is true.

[MATH. 969]

$$b = \frac{h_{11}(t)}{h_{22}(t)}\times a\times e^{j(\mu-\omega)} \tag{969-1}$$

and

-continued $$\theta = -\delta + \frac{\pi}{2} + n\pi \text{ radians} \tag{969-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 970]

$$|a|^2+|b|^2=|u|^2 \tag{970}$$

($|u|^2$ is a parameter based on average transmitted power)

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (28B-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 971]

$$\begin{pmatrix} q_{11} & q_{12} \\ q_{21} & q_{22} \end{pmatrix} \tag{971}$$

Accordingly, weighting synthesizer 306A calculates the following and outputs weighted signal 307A ($z_1(t)$).

[MATH. 972]

$$z_1(t)=q_{11}\times s_1(t)+q_{12}\times e^{j\gamma(t)}\times s_2(t) \tag{972}$$

Weighting synthesizer 306B calculates the following and outputs weighted signal 307B ($z_2(t)$).

[MATH. 973]

$$z_2(t)=q_{21}\times s_1(t)+q_{22}\times e^{j\gamma(t)}\times s_2(t) \tag{973}$$

Precoding method determiner 316 performs the calculations described in "(precoding method (28B)" based on feedback information from a terminal, and determines the precoding matrix.

[MATH. 974]

$$\begin{pmatrix} q_{11} & q_{12} \\ q_{21} & q_{22} \end{pmatrix} = \begin{pmatrix} a & 0 \\ 0 & b \end{pmatrix} \begin{pmatrix} \beta \times e^{j\mu} \times \cos\theta & -\beta \times e^{j(\mu+\lambda)} \times \sin\theta \\ \beta \times e^{j\omega} \times \sin\theta & \beta \times e^{j(\omega+\lambda)} \times \cos\theta \end{pmatrix} = \begin{pmatrix} a \times \beta \times e^{j\mu} \times \cos\theta & -a \times \beta \times e^{j(\mu+\lambda)} \times \sin\theta \\ b \times \beta \times e^{j\omega} \times \sin\theta & b \times \beta \times e^{j(\omega+\lambda)} \times \cos\theta \end{pmatrix} \quad (974)$$

In other words, the precoding matrix of the above equation is calculated. Here, based on feedback information from a terminal, precoding method determiner 316 uses

[MATH. 975]

$$b = \frac{h_{11}(t)}{h_{22}(t)} \times a \times e^{j(\mu-\omega)} \quad (975\text{-}1)$$

and $$\theta = -\delta + \frac{\pi}{2} + n\pi \text{ radians} \quad (975\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (28B-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 976]

$$\begin{pmatrix} q_{11} & q_{12} \\ q_{21} & q_{22} \end{pmatrix} \quad (976)$$

Accordingly, weighting synthesizer 306A calculates the following and outputs weighted signal 307A ($y_1(t)$).

[MATH. 977]

$$y_1(t)=q_{11}\times s_1(t)+q_{12}\times e^{j\gamma(t)}\times s_2(t) \quad (977)$$

Weighting synthesizer 306B calculates the following and outputs weighted signal 307B ($y_2(t)$).

[MATH. 978]

$$y_2(t)=q_{21}\times s_1(t)+q_{22}\times e^{j\gamma(t)}\times s_2(t) \quad (978)$$

Precoding method determiner 316 performs the calculations described in "(precoding method (28B)" based on feedback information from a terminal, and determines the precoding matrix.

[MATH. 979]

$$\begin{pmatrix} q_{11} & q_{12} \\ q_{21} & q_{22} \end{pmatrix} = \begin{pmatrix} \beta \times e^{j\mu} \times \cos\theta & -\beta \times e^{j(\mu+\lambda)} \times \sin\theta \\ \beta \times e^{j\omega} \times \sin\theta & \beta \times e^{j(\omega+\lambda)} \times \cos\theta \end{pmatrix} \quad (979)$$

In other words, the precoding matrix of the above equation and values for a and b are calculated. Here, based on feedback information from a terminal, precoding method determiner 316 uses

[MATH. 980]

$$b = \frac{h_{11}(t)}{h_{22}(t)} \times a \times e^{j(\mu-\omega)} \quad (980\text{-}1)$$

and $$\theta = -\delta + \frac{\pi}{2} + n\pi \text{ radians} \quad (980\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (28B))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 981]

$$\begin{pmatrix} r_1(t) \\ r_2(t) \end{pmatrix} = \begin{pmatrix} h_{11}(t) & h_{12}(t) \\ h_{21}(t) & h_{22}(t) \end{pmatrix} \begin{pmatrix} z_1(t) \\ z_2(t) \end{pmatrix} + \begin{pmatrix} n_1(t) \\ n_2(t) \end{pmatrix} = \left( \sqrt{\frac{K}{K+1}} \begin{pmatrix} h_{11,d}(t) & h_{12,d}(t) \\ h_{21,d}(t) & h_{22,d}(t) \end{pmatrix} + \sqrt{\frac{1}{K+1}} \begin{pmatrix} h_{11,s}(t) & h_{12,s}(t) \\ h_{21,s}(t) & h_{22,s}(t) \end{pmatrix} \right) \begin{pmatrix} z_1(t) \\ z_2(t) \end{pmatrix} + \begin{pmatrix} n_1(t) \\ n_2(t) \end{pmatrix} \tag{981}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (28B)" is not satisfied.

(Precoding Method (29A))

In a state such as in FIG. 2, signals $r_1(t)$, $r_2(t)$ that are received by a reception device can be applied as follows (note that δ is greater than or equal to 0 radians and less than 2π radians).

[MATH. 982]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \tag{982}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 983]

$$\begin{pmatrix} z_1(t) \\ z_2(t) \end{pmatrix} = \begin{pmatrix} a & 0 \\ 0 & b \end{pmatrix} \begin{pmatrix} e^{j\mu}\times\sin\theta & -e^{j(\mu+\lambda)}\times\cos\theta \\ e^{j\omega}\times\cos\theta & e^{j(\omega+\lambda)}\times\sin\theta \end{pmatrix} \begin{pmatrix} 1 & 0 \\ 0 & e^{j\gamma(t)} \end{pmatrix} \begin{pmatrix} s_1(t) \\ s_2(t) \end{pmatrix} \tag{983}$$

However, a and b are complex numbers (may be actual numbers). j is an imaginary unit, and y(t) is an argument and a time function.

In this case, the following equation holds true.

[MATH. 984]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} e^{j\mu}\times\sin\theta & -e^{j(\mu+\lambda)}\times\cos\theta \\ e^{j\omega}\times\cos\theta & e^{j(\omega+\lambda)}\times\sin\theta \end{pmatrix} \begin{pmatrix} 1 & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times e^{j\mu}\times\cos\delta\times\sin\theta - h_{22}(t)\times b\times e^{j\omega}\times\sin\delta\times\cos\theta & -h_{11}(t)\times a\times e^{j(\mu+\lambda)}\times\cos\delta\times\cos\theta - h_{22}(t)\times b\times e^{j(\omega+\lambda)}\times\sin\delta\times\sin\theta \\ h_{11}(t)\times a\times e^{j\mu}\times\sin\delta\times\sin\theta + h_{22}(t)\times b\times e^{j\omega}\times\cos\delta\times\cos\theta & -h_{11}(t)\times a\times e^{j(\mu+\lambda)}\times\sin\delta\times\cos\theta + h_{22}(t)\times b\times e^{j(\omega+\lambda)}\times\cos\delta\times\sin\theta \end{pmatrix} \begin{pmatrix} s_1(t) \\ e^{j\gamma}(t)s_2(t) \end{pmatrix} + \begin{pmatrix} n_1(t) \\ n_2(t) \end{pmatrix} \end{aligned} \tag{984}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 985]

$$-h_{11}(t)\times a\times e^{j(\mu+\lambda)}\times\cos\delta\times\cos\theta - h_{22}(t)\times b\times e^{j(\omega+\lambda)}\times\sin\delta\times\sin\theta = 0 \tag{985-1}$$

$$h_{11}(t)\times a\times e^{j\mu}\times\sin\delta\times\sin\theta + h_{22}(t)\times b\times e^{j\omega}\times\cos\delta\times\cos\theta = 0 \tag{985-2}$$

Accordingly, it is sufficient if the following holds true.

[MATH. 986]

$$b = \frac{h_{11}(t)}{h_{22}(t)}\times a\times e^{j(\mu-\omega)} \tag{986-1}$$

and $$\theta = \delta + \frac{\pi}{2} + n\pi \text{ radians} \tag{986-2}$$

($n$ is an integer)

Accordingly, the communications station calculates θ, a, and b from the feedback information from the terminal so that the following is true.

[MATH. 987]

$$b = \frac{h_{11}(t)}{h_{22}(t)} \times a \times e^{j(\mu-\omega)} \quad (987\text{-}1)$$

and $$\theta = \delta + \frac{\pi}{2} + n\pi \text{ radians} \quad (987\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 988]

$$|a|^2+|b|^2=|u|^2 \quad (988)$$

($|u|^2$ is a parameter based on average transmitted power)

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (29A-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 989]

$$\begin{pmatrix} q_{11} & q_{12} \\ q_{21} & q_{22} \end{pmatrix} \quad (989)$$

Accordingly, weighting synthesizer 306A calculates the following and outputs weighted signal 307A ($z_1(t)$).

[MATH. 990]

$$z_1(t)=q_{11}\times s_1(t)+q_{12}\times e^{j\gamma(t)}\times s_2(t) \quad (990)$$

Weighting synthesizer 306B calculates the following and outputs weighted signal 307B ($z_2(t)$).

[MATH. 991]

$$z_2(t)=q_{21}\times s_1(t)+q_{22}\times e^{j\gamma(t)}\times s_2(t) \quad (991)$$

Precoding method determiner 316 performs the calculations described in "(precoding method (29A)" based on feedback information from a terminal, and determines the precoding matrix.

[MATH. 992]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} e^{j\mu}\times\sin\theta & -e^{j(\mu+\lambda)}\times\cos\theta \\ e^{j\omega}\times\cos\theta & e^{j(\omega+\lambda)}\times\sin\theta \end{pmatrix} = \begin{pmatrix} a\times e^{j\mu}\times\sin\theta & -a\times e^{j(\mu+\lambda)}\times\cos\theta \\ b\times e^{j\omega}\times\cos\theta & b\times e^{j(\omega+\lambda)}\times\sin\theta \end{pmatrix} \quad (992)$$

In other words, the precoding matrix of the above equation is calculated. Here, based on feedback information from a terminal, precoding method determiner 316 uses

[MATH. 993]

$$b = \frac{h_{11}(t)}{h_{22}(t)} \times a \times e^{j(\mu-\omega)} \quad (993\text{-}1)$$

and $$\theta = \delta + \frac{\pi}{2} + n\pi \text{ radians} \quad (993\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (29A-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 994]

$$\begin{pmatrix} q_{11} & q_{12} \\ q_{21} & q_{22} \end{pmatrix} \quad (994)$$

Accordingly, weighting synthesizer 306A calculates the following and outputs weighted signal 307A ($y_1(t)$).

[MATH. 995]

$$y_1(t)=q_{11}\times s_1(t)+q_{12}\times e^{j\gamma(t)}\times s_2(t) \tag{995}$$

Weighting synthesizer 306B calculates the following and outputs weighted signal 307B ($y_2(t)$).

[MATH. 996]

$$y_2(t)=q_{21}\times s_1(t)+q_{22}\times e^{j\gamma(t)}\times s_2(t) \tag{996}$$

Precoding method determiner 316 performs the calculations described in "(precoding method (29A)" based on feedback information from a terminal, and determines the precoding matrix.

[MATH. 997]

$$\begin{pmatrix} q_{11} & q_{12} \\ q_{21} & q_{22} \end{pmatrix} = \begin{pmatrix} e^{j\mu}\times\sin\theta & -e^{j(\mu+\lambda)}\times\cos\theta \\ e^{j\omega}\times\cos\theta & e^{j(\omega+\lambda)}\times\sin\theta \end{pmatrix} \tag{997}$$

In other words, the precoding matrix of the above equation and values for a and b are calculated. Here, based on feedback information from a terminal, precoding method determiner 316 uses

[MATH. 998]

$$b=\frac{h_{11}(t)}{h_{22}(t)}\times a\times e^{j(\mu-\omega)} \tag{998-1}$$

and $$\theta=\delta+\frac{\pi}{2}+n\pi \text{ radians} \tag{998-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (29A))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 999]

$$\begin{aligned}\begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix}+\begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix}+\sqrt{\frac{1}{K+1}}\begin{pmatrix} h_{11,s}(t) & h_{12,s}(t) \\ h_{21,s}(t) & h_{22,s}(t) \end{pmatrix}\right)\begin{pmatrix} z_1(t) \\ z_2(t) \end{pmatrix}+\begin{pmatrix} n_1(t) \\ n_2(t) \end{pmatrix}\end{aligned} \tag{999}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (29A)" is not satisfied.

(Precoding Method (29B))

In a state such as in FIG. 2, signals $r_1(t)$, $r_2(t)$ that are received by a reception device can be applied as follows (note that δ is greater than or equal to 0 radians and less than 2π radians).

[MATH. 1000]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix}+\begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix}+\begin{pmatrix} n_1(t) \\ n_2(t) \end{pmatrix}\end{aligned} \tag{1000}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1001]

$$\begin{pmatrix} z_1(t) \\ z_2(t) \end{pmatrix} = \begin{pmatrix} a & 0 \\ 0 & b \end{pmatrix} \begin{pmatrix} e^{j\mu} \times \sin\theta & -e^{j(\mu+\lambda)} \times \cos\theta \\ e^{j\omega} \times \cos\theta & e^{j(\omega+\lambda)} \times \sin\theta \end{pmatrix} \begin{pmatrix} 1 & 0 \\ 0 & e^{j\gamma(t)} \end{pmatrix} \begin{pmatrix} s_1(t) \\ s_2(t) \end{pmatrix} \tag{1001}$$

However, a and b are complex numbers (may be actual numbers). j is an imaginary unit, and y(t) is an argument and a time function.

In this case, the following relation equation holds true.

[MATH. 1002]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t) \times \cos\delta & -h_{22}(t) \times \sin\delta \\ h_{11}(t) \times \sin\delta & h_{22}(t) \times \cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t) \times \cos\delta & -h_{22}(t) \times \sin\delta \\ h_{11}(t) \times \sin\delta & h_{22}(t) \times \cos\delta \end{pmatrix} \begin{pmatrix} a & 0 \\ 0 & b \end{pmatrix} \\ &\quad \begin{pmatrix} e^{j\mu} \times \sin\theta & -e^{j(\mu+\lambda)} \times \cos\theta \\ e^{j\omega} \times \cos\theta & e^{j(\omega+\lambda)} \times \sin\theta \end{pmatrix} \\ &\quad \begin{pmatrix} 1 & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} \begin{matrix} h_{11}(t) \times a \times e^{j\mu} \times \\ \cos\delta \times \sin\theta - \\ h_{22}(t) \times b \times e^{j\omega} \times \\ \sin\delta \times \cos\theta \end{matrix} & \begin{matrix} -h_{11}(t) \times a \times e^{j(\mu+\lambda)} \times \\ \cos\delta \times \cos\theta - \\ h_{22}(t) \times b \times e^{j(\omega+\lambda)} \times \\ \sin\delta \times \sin\theta \end{matrix} \\ \begin{matrix} h_{11}(t) \times a \times e^{j\mu} \times \\ \sin\delta \times \sin\theta + \\ h_{22}(t) \times b \times e^{j\omega} \times \\ \cos\delta \times \cos\theta \end{matrix} & \begin{matrix} -h_{11}(t) \times a \times e^{j(\mu+\lambda)} \times \\ \sin\delta \times \cos\theta + \\ h_{22}(t) \times b \times e^{j(\omega+\lambda)} \times \\ \cos\delta \times \sin\theta \end{matrix} \end{pmatrix} \\ &\quad \begin{pmatrix} s_1(t) \\ e^{j\gamma}(t) s_2(t) \end{pmatrix} + \begin{pmatrix} n_1(t) \\ n_2(t) \end{pmatrix} \end{aligned} \tag{1002}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1003]

$$h_{11}(t) \times a \times e^{j\mu} \times \cos\delta \times \sin\theta - h_{22}(t) \times b \times e^{j\omega} \times \sin\delta \times \cos\theta = 0 \tag{1003-1}$$

$$-h_{11}(t) \times a \times e^{j(\mu+\lambda)} \times \sin\delta \times \cos\theta + h_{22}(t) \times b \times e^{j(\omega+\lambda)} \times \cos\delta \times \sin\theta = 0 \tag{1003-2}$$

Accordingly, it is sufficient if the following holds true.

[MATH. 1004]

$$b = \frac{h_{11}(t)}{h_{22}(t)} \times a \times e^{j(\mu-\omega)} \tag{1004-1}$$

-continued and $$\theta = \delta + n\pi \text{ radians} \tag{1004-2}$$

($n$ is an interger)

Accordingly, the communications station calculates θ, a, and b from the feedback information from the terminal so that the following is true.

[MATH. 1005]

$$b = \frac{h_{11}(t)}{h_{22}(t)} \times a \times e^{j(\mu-\omega)} \tag{1005-1}$$

and $$\theta = \delta + n\pi \text{ radians} \tag{1005-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1006]

$$|a|^2 + |b|^2 = |u|^2 \tag{1006}$$

($|u|^2$ is a parameter based on average transmitted power)

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (29B-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 1007]

$$\begin{pmatrix} q_{11} & q_{12} \\ q_{21} & q_{22} \end{pmatrix} \tag{1007}$$

Accordingly, weighting synthesizer 306A calculates the following and outputs weighted signal 307A ($z_1(t)$).

[MATH. 1008]

$$z_1(t) = q_{11} \times s_1(t) + q_{12} \times e^{j\gamma(t)} \times s_2(t) \tag{1008}$$

Weighting synthesizer 306B calculates the following and outputs weighted signal 307B ($z_2(t)$).

[MATH. 1009]

$$z_2(t)=q_{21}\times s_1(t)+q_{22}\times e^{j\gamma(t)}\times s_2(t) \tag{1009}$$

Precoding method determiner 316 performs the calculations described in "(precoding method (29B)" based on feedback information from a terminal, and determines the precoding matrix.

[MATH. 1010]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} e^{j\mu}\times\sin\theta & -e^{j(\mu+\lambda)}\times\cos\theta \\ e^{j\omega}\times\cos\theta & e^{j(\omega+\lambda)}\times\sin\theta \end{pmatrix} = \begin{pmatrix} a\times e^{j\mu}\times\sin\theta & -a\times e^{j(\mu+\lambda)}\times\cos\theta \\ b\times e^{j\omega}\times\cos\theta & b\times e^{j(\omega+\lambda)}\times\sin\theta \end{pmatrix} \tag{1010}$$

In other words, the precoding matrix of the above equation is calculated. Here, based on feedback information from a terminal, precoding method determiner 316 uses

[MATH. 1011]

$$b = \frac{h_{11}(t)}{h_{22}(t)}\times a\times e^{j(\mu-\omega)} \tag{1011-1}$$

and $$\theta = \delta + n\pi \text{ radians} \tag{1011-2}$$

($n$ is an interger)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (29B-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1012]

$$\begin{pmatrix} q_{11} & q_{12} \\ q_{21} & q_{22} \end{pmatrix} \tag{1012}$$

Accordingly, weighting synthesizer 306A calculates the following and outputs weighted signal 307A ($y_1(t)$).

[MATH. 1013]

$$y_1(t)=q_{11}\times s_1(t)+q_{12}\times e^{j\gamma(t)}\times s_2(t) \tag{1013}$$

Weighting synthesizer 306B calculates the following and outputs weighted signal 307B ($y_2(t)$).

[MATH. 1014]

$$y_2(t)=q_{21}\times s_1(t)+q_{22}\times e^{j\gamma(t)}\times s_2(t) \tag{1014}$$

Precoding method determiner 316 performs the calculations described in "(precoding method (29B)" based on feedback information from a terminal, and determines the precoding matrix.

[MATH. 1015]

$$\begin{pmatrix} q_{11} & q_{12} \\ q_{21} & q_{22} \end{pmatrix} = \begin{pmatrix} e^{j\mu}\times\sin\theta & -e^{j(\mu+\lambda)}\times\cos\theta \\ e^{j\omega}\times\cos\theta & e^{j(\omega+\lambda)}\times\sin\theta \end{pmatrix} \tag{1015}$$

In other words, the precoding matrix of the above equation and values for a and b are calculated. Here, based on feedback information from a terminal, precoding method determiner 316 uses

[MATH. 1016]

$$b = \frac{h_{11}(t)}{h_{22}(t)}\times a\times e^{j(\mu-\omega)} \tag{1016-1}$$

and $$\theta = \delta + n\pi \text{ radians} \tag{1016-2}$$

($n$ is an interger)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (29B))

Phase changer 1001B illustrated in FIG. 10 and FIG. 11 receives an input of mapped signal $s_2(t)$ output from mapper 304B, applies a phase-change, and outputs phase-changed signal 1002B ($e^{jY(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1017]

$$\begin{aligned}\begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right) \\ &\quad \begin{pmatrix} z_1(t) \\ z_2(t) \end{pmatrix} + \begin{pmatrix} n_1(t) \\ n_2(t) \end{pmatrix}\end{aligned} \tag{1017}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (29B)" is not satisfied.

(Precoding Method (30A))

In a state such as in FIG. 2, signals $r_1(t)$, $r_2(t)$ that are received by a reception device can be applied as follows (note that δ is greater than or equal to 0 radians and less than 2π radians).

[MATH. 1018]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix} \\ &\quad \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix}\end{aligned} \tag{1018}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1019]

$$\begin{pmatrix} z_1(t) \\ z_2(t) \end{pmatrix} = \begin{pmatrix} a & 0 \\ 0 & b \end{pmatrix}\begin{pmatrix} \beta\times e^{j\mu}\times\sin\theta & -\beta\times e^{j(\mu+\lambda)}\times\cos\theta \\ \beta\times e^{j\omega}\times\cos\theta & \beta\times e^{j(\omega+\lambda)}\times\sin\theta \end{pmatrix}\begin{pmatrix} 1 & 0 \\ 0 & e^{jY(t)} \end{pmatrix}\begin{pmatrix} s_1(t) \\ s_2(t) \end{pmatrix} \tag{1019}$$

However, a and b are complex numbers (may be actual numbers). j is an imaginary unit, and y(t) is an argument and a time function.

In this case, the following equation holds true.

[MATH. 1020]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix}$$
$$= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix}$$
$$= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix}$$
$$\begin{pmatrix} \beta\times e^{j\mu}\times\sin\theta & -\beta\times e^{j(\mu+\lambda)}\times\cos\theta \\ \beta\times e^{j\omega}\times\cos\theta & \beta\times e^{j(\omega+\lambda)}\times\sin\theta \end{pmatrix} \begin{pmatrix} 1 & 0 \\ 0 & e^{j\gamma(t)} \end{pmatrix}$$
$$\begin{pmatrix} s_1(t) \\ s_2(t) \end{pmatrix} + \begin{pmatrix} n_1(t) \\ n_2(t) \end{pmatrix}$$
$$= \begin{pmatrix} h_{11}(t)\times a\times\beta\times e^{j\mu}\cos\delta\times\sin\theta - & -h_{11}(t)\times a\times\beta\times e^{j(\mu+\lambda)}\times\cos\delta\times\cos\theta - \\ h_{22}(t)\times b\times\beta\times e^{j\omega}\times\sin\delta\times\cos\theta & h_{22}(t)\times b\times\beta\times e^{j(\omega\times\lambda)}\times\sin\delta\times\sin\theta \\ h_{11}(t)\times a\times\beta\times e^{j\mu}\sin\delta\times\sin\theta + & -h_{11}(t)\times a\times\beta\times e^{j(\mu+\lambda)}\times\sin\delta\times\cos\theta + \\ h_{22}(t)\times b\times\beta\times e^{j\omega}\times\cos\delta\times\cos\theta & h_{22}(t)\times b\times\beta\times e^{j(\omega\times\lambda)}\times\cos\delta\times\sin\theta \end{pmatrix}$$
$$\begin{pmatrix} s_1(t) \\ e^{j\gamma(t)}s_2(t) \end{pmatrix} + \begin{pmatrix} n_1(t) \\ n_2(t) \end{pmatrix} \tag{1020}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1021]

$$-h_{11}(t)\times a\times\beta\times e^{j(\mu+\lambda)}\times\cos\delta\times\cos\theta - h_{22}(t)\times b\times\beta\times e^{j(\omega+\lambda)}\times\sin\delta\times\sin\theta = 0 \tag{1021-1}$$

$$h_{11}(t)\times a\times\beta\times e^{j\mu}\times\sin\delta\times\sin\theta - h_{22}(t)\times b\times\beta\times e^{j\omega}\times\cos\delta\times\cos\theta = 0 \tag{1021-2}$$

Accordingly, it is sufficient if the following holds true.

[MATH. 1022]

$$b = \frac{h_{11}(t)}{h_{22}(t)}\times a\times e^{j(\mu-\omega)} \tag{1022-1}$$

and $$\theta = \delta + \frac{\pi}{2} + n\pi \text{ radians} \tag{1022-2}$$

($n$ is an interger)

Accordingly, the communications station calculates θ, a, and b from the feedback information from the terminal so that the following is true.

[MATH. 1023]

$$b = \frac{h_{11}(t)}{h_{22}(t)}\times a\times e^{j(\mu-\omega)} \tag{1023-1}$$

and $$\theta = \delta + \frac{\pi}{2} + n\pi \text{ radians} \tag{1023-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1024]

$$|a|^2+|b|^2=|u|^2 \tag{1024}$$

($|u|^2$ is a parameter based on average transmitted power)

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (30A-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$.

Mapped signal 305B output by mapper 304B is $s_2(t)$.

Weighted signal 307A output by weighting synthesizer 306A is $z_1(t)$.

Weighted signal 307B output by weighting synthesizer 306B is $z_2(t)$.

The precoding matrix is expressed as follows.

[MATH. 1025]

$$\begin{pmatrix} q_{11} & q_{12} \\ q_{21} & q_{22} \end{pmatrix} \tag{1025}$$

Accordingly, weighting synthesizer 306A calculates the following and outputs weighted signal 307A ($z_1(t)$).

[MATH. 1026]

$$z_1(t)=q_{11}\times s_1(t)+q_{12}\times e^{j\gamma(t)}\times s_2(t) \quad (1026)$$

Weighting synthesizer 306B calculates the following and outputs weighted signal 307B ($z_2(t)$).

[MATH. 1027]

$$z_2(t)=q_{21}\times s_1(t)+q_{22}\times e^{j\gamma(t)}\times s_2(t) \quad (1027)$$

Precoding method determiner 316 performs the calculations described in "(precoding method (30A)" based on feedback information from a terminal, and determines the precoding matrix.

[MATH. 1028]

$$\begin{pmatrix} q_{11} & q_{12} \\ q_{21} & q_{22} \end{pmatrix} = \begin{pmatrix} a & 0 \\ 0 & b \end{pmatrix} \begin{pmatrix} \beta\times e^{j\mu}\times\sin\theta & -\beta\times e^{j(\mu+\lambda)}\times\cos\theta \\ \beta\times e^{j\omega}\times\cos\theta & \beta\times e^{j(\omega+\lambda)}\times\sin\theta \end{pmatrix} = \begin{pmatrix} a\times\beta\times e^{j\mu}\times\sin\theta & -a\times\beta\times e^{j(\mu+\lambda)}\times\cos\theta \\ a\times\beta\times e^{j\omega}\times\cos\theta & b\times\beta\times e^{j(\omega+\lambda)}\times\sin\theta \end{pmatrix} \quad (1028)$$

In other words, the precoding matrix of the above equation is calculated. Here, based on feedback information from a terminal, precoding method determiner 316 uses

[MATH. 1029]

$$b=\frac{h_{11}(t)}{h_{22}(t)}\times a\times e^{j(\mu-\omega)} \quad (1029\text{-}1)$$

and $$\theta=\delta+\frac{\pi}{2}+n\pi \text{ radians} \quad (1029\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (30A-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1030]

$$\begin{pmatrix} q_{11} & q_{12} \\ q_{21} & q_{22} \end{pmatrix} \quad (1030)$$

Accordingly, weighting synthesizer 306A calculates the following and outputs weighted signal 307A ($y_1(t)$).

[MATH. 1031]

$$y_1(t)=q_{11}\times s_1(t)+q_{12}\times e^{j\gamma(t)}\times s_2(t) \quad (1031)$$

Weighting synthesizer 306B calculates the following and outputs weighted signal 307B ($y_2(t)$).

[MATH. 1032]

$$y_2(t)=q_{21}\times s_1(t)+q_{22}\times e^{j\gamma(t)}\times s_2(t) \quad (1032)$$

Precoding method determiner 316 performs the calculations described in "(precoding method (30A)" based on feedback information from a terminal, and determines the precoding matrix.

[MATH. 1033]

$$\begin{pmatrix} q_{11} & q_{12} \\ q_{21} & q_{22} \end{pmatrix} = \begin{pmatrix} \beta\times e^{j\mu}\times\sin\theta & -\beta\times e^{j(\mu+\lambda)}\times\cos\theta \\ \beta\times e^{j\omega}\times\cos\theta & \beta\times e^{j(\omega+\lambda)}\times\sin\theta \end{pmatrix} \quad (1033)$$

In other words, the precoding matrix of the above equation and values for a and b are calculated. Here, based on feedback information from a terminal, precoding method determiner 316 uses

[MATH. 1034]

$$b=\frac{h_{11}(t)}{h_{22}(t)}\times a\times e^{j(\mu-\omega)} \quad (1034\text{-}1)$$

and $$\theta=\delta+\frac{\pi}{2}+n\pi \text{ radians} \quad (1034\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (30A))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1035]

$$\begin{pmatrix} r_1(t) \\ r_2(t) \end{pmatrix} = \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} = \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right)\begin{pmatrix} z_1(t) \\ z_2(t) \end{pmatrix} + \begin{pmatrix} n_1(t) \\ n_2(t) \end{pmatrix} \tag{1035}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (30A)" is not satisfied.

(Precoding Method (30B))

In a state such as in FIG. 2, signals $r_1(t)$, $r_2(t)$ that are received by a reception device can be applied as follows (note that δ is greater than or equal to 0 radians and less than 2π radians).

[MATH. 1036]

$$\begin{pmatrix} r_1(t) \\ r_2(t) \end{pmatrix} = \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix} \tag{1036}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1037]

$$\begin{pmatrix} z_1(t) \\ z_2(t) \end{pmatrix} = \begin{pmatrix} a & 0 \\ 0 & b \end{pmatrix}\begin{pmatrix} \beta\times e^{j\mu}\times\sin\theta & -\beta\times e^{j(\mu+\lambda)}\times\cos\theta \\ \beta\times e^{j\omega}\times\cos\theta & \beta\times e^{j(\omega+\lambda)}\times\sin\theta \end{pmatrix}\begin{pmatrix} 1 & 0 \\ 0 & e^{j\gamma(t)} \end{pmatrix}\begin{pmatrix} s_1(t) \\ s_2(t) \end{pmatrix} \tag{1037}$$

However, a and b are complex numbers (may be actual numbers). j is an imaginary unit, and y(t) is an argument and a time function.

In this case, the following relation equation holds true.

[MATH. 1038]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} a & 0 \\ 0 & b \end{pmatrix}\begin{pmatrix} \beta\times e^{j\mu}\times\sin\theta & -\beta\times e^{j(\mu+\lambda)}\times\cos\theta \\ \beta\times e^{j\omega}\times\cos\theta & \beta\times e^{j(\omega+\lambda)}\times\sin\theta \end{pmatrix} \\ &\quad \begin{pmatrix} 1 & 0 \\ 0 & e^{j\gamma(t)} \end{pmatrix}\begin{pmatrix} s_1(t) \\ s_2(t) \end{pmatrix}\begin{pmatrix} n_1(t) \\ n_2(t) \end{pmatrix} \\ &= \begin{pmatrix} h_{11}(t)\times a\times\beta\times e^{j\mu}\times\cos\delta\times\sin\theta - & -h_{11}(t)\times a\times\beta\times e^{j(\mu+\lambda)}\times\cos\delta\times\cos\theta - \\ h_{22}(t)\times b\times\beta\times e^{j\omega}\times\sin\delta\times\cos\theta & h_{22}(t)\times b\times\beta\times e^{j(\omega+\lambda)}\times\sin\delta\times\sin\theta \\ h_{11}(t)\times a\times\beta\times e^{j\mu}\times\sin\delta\times\sin\theta + & -h_{11}(t)\times a\times\beta\times e^{j(\mu+\lambda)}\times\sin\delta\times\cos\theta + \\ h_{22}(t)\times b\times\beta\times e^{j\omega}\times\cos\delta\times\cos\theta & h_{22}(t)\times b\times\beta\times e^{j(\omega+\lambda)}\times\cos\delta\times\sin\theta \end{pmatrix} \\ &\quad \begin{pmatrix} s_1(t) \\ e^{j\gamma(t)}s_2(t) \end{pmatrix} + \begin{pmatrix} n_1(t) \\ n_2(t) \end{pmatrix} \end{aligned} \tag{1038}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1039]

$$h_{11}(t)\times a\times\beta\times e^{j\mu}\times\cos\delta\times\sin\theta-h_{22}(t)\times b\times\beta\times e^{j\omega}\times\sin\delta\times\cos\theta=0 \tag{1039-1}$$

$$-h_{11}(t)\times a\times\beta\times e^{j(\mu+\lambda)}\times\sin\delta\times\cos\theta+h_{22}(t)\times b\times\beta\times e^{j(\omega+\lambda)}\times\cos\delta\times\sin\theta=0 \tag{1039-2}$$

Accordingly, it is sufficient if the following holds true.

[MATH. 1040]

$$b=\frac{h_{11}(t)}{h_{22}(t)}\times a\times e^{j(\mu-\omega)} \tag{1040-1}$$

and $$\theta=\delta+n\pi \text{ radians} \tag{1040-2}$$

($n$ is an integer)

Accordingly, the communications station calculates θ, a, and b from the feedback information from the terminal so that the following is true.

[MATH. 1041]

$$b=\frac{h_{11}(t)}{h_{22}(t)}\times a\times e^{j(\mu-\omega)} \tag{1041-1}$$

and $$\theta=\delta+n\pi \text{ radians} \tag{1041-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1042]

$$|a|^2+|b|^2=|u|^2 \tag{1042}$$

($|u|^2$ is a parameter based on average transmitted power)

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (30B-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 1043]

$$\begin{pmatrix} q_{11} & q_{12} \\ q_{21} & q_{22} \end{pmatrix} \tag{1043}$$

Accordingly, weighting synthesizer 306A calculates the following and outputs weighted signal 307A ($z_1(t)$).

[MATH. 1044]

$$z_1(t)=q_{11}\times s_1(t)+q_{12}\times e^{j\gamma(t)}\times s_2(t) \tag{1044}$$

Weighting synthesizer 306B calculates the following and outputs weighted signal 307B ($z_2(t)$).

[MATH. 1045]

$$z_2(t)=q_{21}\times s_1(t)+q_{22}\times e^{j\gamma(t)}\times s_2(t) \tag{1045}$$

Precoding method determiner 316 performs the calculations described in "(precoding method (30B)" based on feedback information from a terminal, and determines the precoding matrix.

[MATH. 1046]

$$\begin{pmatrix} q_{11} & q_{12} \\ q_{21} & q_{22} \end{pmatrix}=\begin{pmatrix} a & 0 \\ 0 & b \end{pmatrix}\begin{pmatrix} \beta\times e^{j\mu}\times\sin\theta & -\beta\times e^{j(\mu+\lambda)}\times\cos\theta \\ \beta\times e^{j\omega}\times\cos\theta & \beta\times e^{j(\omega+\lambda)}\times\sin\theta \end{pmatrix}=\begin{pmatrix} a\times\beta\times e^{j\mu}\times\sin\theta & -a\times\beta\times e^{j(\mu+\lambda)}\times\cos\theta \\ a\times\beta\times e^{j\omega}\times\cos\theta & b\times\beta\times e^{j(\omega+\lambda)}\times\sin\theta \end{pmatrix} \tag{1046}$$

In other words, the precoding matrix of the above equation is calculated. Here, based on feedback information from a terminal, precoding method determiner 316 uses

[MATH. 1047]

$$b=\frac{h_{11}(t)}{h_{22}(t)}\times a\times e^{j(\mu-\omega)} \tag{1047-1}$$

and $$\theta=\delta+n\pi \text{ radians} \tag{1047-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (30B-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$.

Mapped signal 305B output by mapper 304B is $s_2(t)$.

Weighted signal 307A output by weighting synthesizer 306A is $y_1(t)$.

Weighted signal 307B output by weighting synthesizer 306B is $y_2(t)$.

Coefficient multiplied signal 402A output by coefficient multiplier 401A is $z_1(t)$.

Coefficient multiplied signal 402B output by coefficient multiplier 401B is $z_2(t)$.

The precoding matrix is expressed as follows.

[MATH. 1048]

$$\begin{pmatrix} q_{11} & q_{12} \\ q_{21} & q_{22} \end{pmatrix} \quad (1048)$$

Accordingly, weighting synthesizer 306A calculates the following and outputs weighted signal 307A ($y_1(t)$).

[MATH. 1049]

$$y_1(t)=q_{11}\times s_1(t)+q_{12}\times e^{j\gamma(t)}\times s_2(t) \quad (1049)$$

Weighting synthesizer 306B calculates the following and outputs weighted signal 307B ($y_2(t)$).

[MATH. 1050]

$$y_2(t)=q_{21}\times s_1(t)+q_{22}\times e^{j\gamma(t)}\times s_2(t) \quad (1050)$$

Precoding method determiner 316 performs the calculations described in "(precoding method (30B)" based on feedback information from a terminal, and determines the precoding matrix.

[MATH. 1051]

$$\begin{pmatrix} q_{11} & q_{12} \\ q_{21} & q_{22} \end{pmatrix} = \begin{pmatrix} \beta\times e^{j\mu}\times\sin\theta & -\beta\times e^{j(\mu+\lambda)}\times\cos\theta \\ \beta\times e^{j\omega}\times\cos\theta & \beta\times e^{j(\omega+\lambda)}\times\sin\theta \end{pmatrix} \quad (1051)$$

In other words, the precoding matrix of the above equation and values for a and b are calculated. Here, based on feedback information from a terminal, precoding method determiner 316 uses

[MATH. 1052]

$$b=\frac{h_{11}(t)}{h_{22}(t)}\times a\times e^{j(\mu-\omega)} \quad (1052\text{-}1)$$

and $$\theta=\delta+n\pi \text{ radians} \quad (1052\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (30B))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1053]

$$\begin{aligned}\begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right) \\ &\quad \begin{pmatrix} z_1(t) \\ z_2(t) \end{pmatrix} + \begin{pmatrix} n_1(t) \\ n_2(t) \end{pmatrix}\end{aligned} \quad (1053)$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (30B)" is not satisfied.

(Precoding Method (31A))

In a state such as in FIG. 2, signals $r_1(t)$, $r_2(t)$ that are received by a reception device can be applied as follows (note that δ is greater than or equal to 0 radians and less than 2π radians).

[MATH. 1054]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \tag{1054}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1055]

$$\begin{pmatrix} z_1(t) \\ z_2(t) \end{pmatrix} = \begin{pmatrix} a & 0 \\ 0 & b \end{pmatrix} \begin{pmatrix} e^{j\mu}\times\sin\theta & e^{j(\mu+\lambda)}\times\cos\theta \\ e^{j\omega}\times\cos\theta & -e^{j(\omega+\lambda)}\times\sin\theta \end{pmatrix} \begin{pmatrix} 1 & 0 \\ 0 & e^{j\gamma(t)} \end{pmatrix} \begin{pmatrix} s_1(t) \\ s_2(t) \end{pmatrix} \tag{1055}$$

However, a and b are complex numbers (may be actual numbers). j is an imaginary unit, and y(t) is an argument and a time function.

In this case, the following equation holds true.

[MATH. 1056]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \\ &\quad \begin{pmatrix} e^{j\mu}\times\sin\theta & e^{j(\mu+\lambda)}\times\cos\theta \\ e^{j\omega}\times\cos\theta & -e^{j(\omega+\lambda)}\times\sin\theta \end{pmatrix} \\ &\quad \begin{pmatrix} 1 & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times e^{j\mu}\times\cos\delta\times\sin\theta - h_{22}(t)\times b\times e^{j\omega}\times\sin\delta\times\cos\theta & h_{11}(t)\times a\times e^{j(\mu+\lambda)}\times\cos\delta\times\cos\theta + h_{22}(t)\times b\times e^{j(\omega+\lambda)}\times\sin\delta\times\sin\theta \\ h_{11}(t)\times a\times e^{j\mu}\times\sin\delta\times\sin\theta + h_{22}(t)\times b\times e^{j\omega}\times\cos\delta\times\cos\theta & h_{11}(t)\times a\times e^{j(\mu+\lambda)}\times\sin\delta\times\cos\theta - h_{22}(t)\times b\times e^{j(\omega+\lambda)}\times\cos\delta\times\sin\theta \end{pmatrix} \\ &\quad \begin{pmatrix} s_1(t) \\ e^{j\gamma(t)}s_2(t) \end{pmatrix} + \begin{pmatrix} n_1(t) \\ n_2(t) \end{pmatrix} \end{aligned} \tag{1056}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1057]

$$h_{11}(t)\times a\times e^{j(\mu+\lambda)}\times\cos\delta\times\cos\theta + h_{22}(t)\times b\times e^{j(\omega+\lambda)}\times\sin\delta\times\sin\theta = 0 \tag{1057-1}$$

$$h_{11}(t)\times a\times e^{j\mu}\times\sin\delta\times\sin\theta + h_{22}(t)\times b\times e^{j\omega}\times\cos\delta\times\cos\theta = 0 \tag{1057-2}$$

Accordingly, it is sufficient if the following holds true.

[MATH. 1058]

$$b = \frac{h_{11}(t)}{h_{22}(t)}\times a\times e^{j(\mu-\omega)} \tag{1058-1}$$

and $$\theta = \delta + \frac{\pi}{2} + n\pi \text{ radians} \tag{1058-2}$$

(n is an integer)

Accordingly, the communications station calculates θ, a, and b from the feedback information from the terminal so that the following is true.

[MATH. 1059]

$$b = \frac{h_{11}(t)}{h_{22}(t)}\times a\times e^{j(\mu-\omega)} \tag{1059-1}$$

and $$\theta = \delta + \frac{\pi}{2} + n\pi \text{ radians} \tag{1059-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1060]

$$|a|^2+|b|^2=|u|^2 \tag{1060}$$

($|u|^2$ is a parameter based on average transmitted power)

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (31A-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$. Mapped signal 305B output by mapper 304B is $s_2(t)$.

Weighted signal 307A output by weighting synthesizer 306A is $z_1(t)$. Weighted signal 307B output by weighting synthesizer 306B is $z_2(t)$.

The precoding matrix is expressed as follows.

[MATH. 1061]

$$\begin{pmatrix} q_{11} & q_{12} \\ q_{21} & q_{22} \end{pmatrix} \quad (1061)$$

Accordingly, weighting synthesizer 306A calculates the following and outputs weighted signal 307A ($z_1(t)$).

[MATH. 1062]

$$z_1(t)=q_{11}\times s_1(t)+q_{12}\times e^{j\gamma(t)}\times s_2(t) \quad (1062)$$

Weighting synthesizer 306B calculates the following and outputs weighted signal 307B ($z_2(t)$).

[MATH. 1063]

$$z_2(t)=q_{21}\times s_1(t)+q_{22}\times e^{j\gamma(t)}\times s_2(t) \quad (1063)$$

Precoding method determiner 316 performs the calculations described in "(precoding method (31A)" based on feedback information from a terminal, and determines the precoding matrix.

[MATH. 1064]

$$\begin{pmatrix} q_{11} & q_{12} \\ q_{21} & q_{22} \end{pmatrix} = \begin{pmatrix} a & 0 \\ 0 & b \end{pmatrix} \begin{pmatrix} e^{j\mu}\times\sin\theta & e^{j(\mu+\lambda)}\times\cos\theta \\ e^{j\omega}\times\cos\theta & -e^{j(\omega+\lambda)}\times\sin\theta \end{pmatrix} = \begin{pmatrix} a\times e^{j\mu}\times\sin\theta & a\times e^{j(\mu+\lambda)}\times\cos\theta \\ b\times e^{j\omega}\times\cos\theta & -b\times e^{j(\omega+\lambda)}\times\sin\theta \end{pmatrix} \quad (1064)$$

In other words, the precoding matrix of the above equation is calculated. Here, based on feedback information from a terminal, precoding method determiner 316 uses

[MATH. 1065]

$$b = \frac{h_{11}(t)}{h_{22}(t)} \times a \times e^{j(\mu-\omega)} \quad (1065\text{-}1)$$

and $$\theta = \delta + \frac{\pi}{2} + n\pi \text{ radians} \quad (1065\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (31A-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1066]

$$\begin{pmatrix} q_{11} & q_{12} \\ q_{21} & q_{22} \end{pmatrix} \quad (1066)$$

Accordingly, weighting synthesizer 306A calculates the following and outputs weighted signal 307A ($y_1(t)$).

[MATH. 1067]

$$y_1(t)=q_{11}\times s_1(t)+q_{12}\times e^{j\gamma(t)}\times s_2(t) \quad (1067)$$

Weighting synthesizer 306B calculates the following and outputs weighted signal 307B ($y_2(t)$).

[MATH. 1068]

$$y_2(t)=q_{21}\times s_1(t)+q_{22}\times e^{j\gamma(t)}\times s_2(t) \quad (1068)$$

Precoding method determiner 316 performs the calculations described in "(precoding method (31A)" based on feedback information from a terminal, and determines the precoding matrix.

[MATH. 1069]

$$\begin{pmatrix} q_{11} & q_{12} \\ q_{21} & q_{22} \end{pmatrix} = \begin{pmatrix} e^{j\mu}\times\sin\theta & e^{j(\mu+\lambda)}\times\cos\theta \\ e^{j\omega}\times\cos\theta & e^{j(\omega+\lambda)}\times\sin\theta \end{pmatrix} \quad (1069)$$

In other words, the precoding matrix of the above equation and values for a and b are calculated. Here, based on feedback information from a terminal, precoding method determiner 316 uses

[MATH. 1070]

$$b = \frac{h_{11}(t)}{h_{22}(t)} \times a \times e^{j(\mu-\omega)} \quad (1070\text{-}1)$$

and $$\theta = \delta + \frac{\pi}{2} + n\pi \text{ radians} \quad (1070\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (31A))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1071]

$$\begin{pmatrix} r_1(t) \\ r_2(t) \end{pmatrix} = \begin{pmatrix} h_{11}(t) & h_{12}(t) \\ h_{21}(t) & h_{22}(t) \end{pmatrix} \begin{pmatrix} z_1(t) \\ z_2(t) \end{pmatrix} + \begin{pmatrix} n_1(t) \\ n_2(t) \end{pmatrix} = \left( \sqrt{\frac{K}{K+1}} \begin{pmatrix} h_{11,d}(t) & h_{12,d}(t) \\ h_{21,d}(t) & h_{22,d}(t) \end{pmatrix} + \sqrt{\frac{1}{K+1}} \begin{pmatrix} h_{11,s}(t) & h_{12,s}(t) \\ h_{21,s}(t) & h_{22,s}(t) \end{pmatrix} \right) \begin{pmatrix} z_1(t) \\ z_2(t) \end{pmatrix} + \begin{pmatrix} n_1(t) \\ n_2(t) \end{pmatrix} \tag{1071}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (31A)" is not satisfied.

(Precoding Method (31B))

In a state such as in FIG. 2, signals $r_1(t)$, $r_2(t)$ that are received by a reception device can be applied as follows (note that δ is greater than or equal to 0 radians and less than 2π radians).

[MATH. 1072]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \tag{1072}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1073]

$$\begin{pmatrix} z_1(t) \\ z_2(t) \end{pmatrix} = \begin{pmatrix} a & 0 \\ 0 & b \end{pmatrix} \begin{pmatrix} e^{j\mu}\times\sin\theta & e^{j(\mu+\lambda)}\times\cos\theta \\ e^{j\omega}\times\cos\theta & -e^{j(\omega+\lambda)}\times\sin\theta \end{pmatrix} \begin{pmatrix} 1 & 0 \\ 0 & e^{j\gamma(t)} \end{pmatrix} \begin{pmatrix} s_1(t) \\ s_2(t) \end{pmatrix} \tag{1073}$$

However, a and b are complex numbers (may be actual numbers). j is an imaginary unit, and y(t) is an argument and a time function.

In this case, the following relation equation holds true.

[MATH. 1074]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \tag{1074}$$
$$= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix}$$
$$= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} e^{j\mu}\times\sin\theta & e^{j(\mu+\lambda)}\times\cos\theta \\ e^{j\omega}\times\cos\theta & -e^{j(\omega+\lambda)}\times\sin\theta \end{pmatrix}$$
$$\begin{pmatrix} 1 & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix}$$
$$= \begin{pmatrix} h_{11}(t)\times a\times e^{j\mu}\times\cos\delta\times\sin\theta - & h_{11}(t)\times a\times e^{j(\mu+\lambda)}\times\cos\delta\times\cos\theta + \\ h_{22}(t)\times b\times e^{j\omega}\times\sin\delta\times\cos\theta & h_{22}(t)\times b\times e^{j(\omega\times\lambda)}\times\sin\delta\times\sin\theta \\ h_{11}(t)\times a\times e^{j\mu}\times\sin\delta\times\sin\theta + & h_{11}(t)\times a\times e^{j(\mu\times\lambda)}\times\sin\delta\times\cos\theta - \\ h_{22}(t)\times b\times e^{j\omega}\times\cos\delta\times\cos\theta & h_{22}(t)\times b\times e^{j(\omega\times\lambda)}\times\cos\delta\times\sin\theta \end{pmatrix}$$
$$\begin{pmatrix} s_1(t) \\ e^{j\gamma(t)}s_2(t) \end{pmatrix} + \begin{pmatrix} n_1(t) \\ n_2(t) \end{pmatrix}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1075]

$$h_{11}(t)\times a\times e^{j\mu}\times\cos\delta\times\sin\theta - h_{22}(t)\times b\times e^{j\omega}\times\sin\delta\times\cos\theta = 0 \tag{1075-1}$$

$$h_{11}(t)\times a\times e^{j(\mu+\lambda)}\times\sin\delta\times\cos\theta - h_{22}(t)\times b\times e^{j(\omega+\lambda)}\times\cos\delta\times\sin\theta = 0 \tag{1075-2}$$

Accordingly, it is sufficient if the following holds true.

[MATH. 1076]

$$b = \frac{h_{11}(t)}{h_{22}(t)}\times a\times e^{j(\mu-\omega)} \tag{1076-1}$$

and $$\theta = \delta + n\pi \text{ radians} \tag{1076-2}$$

($n$ is an integer)

Accordingly, the communications station calculates θ, a, and b from the feedback information from the terminal so that the following is true.

[MATH. 1077]

$$b = \frac{h_{11}(t)}{h_{22}(t)}\times a\times e^{j(\mu-\omega)} \tag{1077-1}$$

and $$\theta = \delta + n\pi \text{ radians} \tag{1077-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1078]

$$|a|^2+|b|^2=|u|^2 \tag{1078}$$

($|u|^2$ is a parameter based on average transmitted power)

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (31B-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 1079]

$$\begin{pmatrix} q_{11} & q_{12} \\ q_{21} & q_{22} \end{pmatrix} \tag{1079}$$

Accordingly, weighting synthesizer 306A calculates the following and outputs weighted signal 307A ($z_1(t)$).

[MATH. 1080]

$$z_1(t)=q_{11}\times s_1(t)+q_{12}\times e^{j\gamma(t)}\times s_2(t) \tag{1080}$$

Weighting synthesizer 306B calculates the following and outputs weighted signal 307B ($z_2(t)$).

[MATH. 1081]

$$z_2(t)=q_{21}\times s_1(t)+q_{22}\times e^{j\gamma(t)}\times s_2(t) \tag{1081}$$

Precoding method determiner 316 performs the calculations described in "(precoding method (31B)" based on feedback information from a terminal, and determines the precoding matrix.

[MATH. 1082]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} e^{j\mu}\times\sin\theta & e^{j(\mu+\lambda)}\times\cos\theta \\ e^{j\omega}\times\cos\theta & -e^{j(\omega+\lambda)}\times\sin\theta \end{pmatrix} = \begin{pmatrix} a\times e^{j\mu}\times\sin\theta & a\times e^{j(\mu+\lambda)}\times\cos\theta \\ b\times e^{j\omega}\times\cos\theta & -b\times e^{j(\omega+\lambda)}\times\sin\theta \end{pmatrix} \tag{1082}$$

In other words, the precoding matrix of the above equation is calculated. Here, based on feedback information from a terminal, precoding method determiner 316 uses

[MATH. 1083]

$$b = \frac{h_{11}(t)}{h_{22}(t)}\times a\times e^{j(\mu-\omega)} \tag{1083-1}$$

and $$\theta = \delta + n\pi \text{ radians} \tag{1083-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (31B-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1084]

$$\begin{pmatrix} q_{11} & q_{12} \\ q_{21} & q_{22} \end{pmatrix} \tag{1084}$$

Accordingly, weighting synthesizer 306A calculates the following and outputs weighted signal 307A ($y_1(t)$).

[MATH. 1085]

$$y_1(t)=q_{11}\times s_1(t)+q_{12}\times e^{j\gamma(t)}\times s_2(t) \tag{1085}$$

Weighting synthesizer 306B calculates the following and outputs weighted signal 307B ($y_2(t)$).

[MATH. 1086]

$$y_2(t)=q_{21}\times s_1(t)+q_{22}\times e^{j\gamma(t)}\times s_2(t) \tag{1086}$$

Precoding method determiner 316 performs the calculations described in "(precoding method (31B)" based on feedback information from a terminal, and determines the precoding matrix.

[MATH. 1087]

$$\begin{pmatrix} q_{11} & q_{12} \\ q_{21} & q_{22} \end{pmatrix} = \begin{pmatrix} e^{j\mu}\times\sin\theta & e^{j(\mu+\lambda)}\times\cos\theta \\ e^{j\omega}\times\cos\theta & -e^{j(\omega+\lambda)}\times\sin\theta \end{pmatrix} \tag{1087}$$

In other words, the precoding matrix of the above equation and values for a and b are calculated. Here, based on feedback information from a terminal, precoding method determiner 316 uses

[MATH. 1088]

$$b = \frac{h_{11}(t)}{h_{22}(t)}\times a\times e^{j(\mu-\omega)} \tag{1088-1}$$

and $$\theta = \delta + n\pi \text{ radians} \tag{1088-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal

307B ($y_2(t)$), calculates $z_2(t)=b\times y_2(t)$, and outputs coefficient multiplied signal 402B ($z_2(t)$).

(Phase Changing in Precoding Method (31B))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1089]

$$\begin{pmatrix} r_1(t) \\ r_2(t) \end{pmatrix} = \begin{pmatrix} h_{11}(t) & h_{12}(t) \\ h_{21}(t) & h_{22}(t) \end{pmatrix} \begin{pmatrix} z_1(t) \\ z_2(t) \end{pmatrix} + \begin{pmatrix} n_1(t) \\ n_2(t) \end{pmatrix} = \left( \sqrt{\frac{K}{K+1}} \begin{pmatrix} h_{11,d}(t) & h_{12,d}(t) \\ h_{21,d}(t) & h_{22,d}(t) \end{pmatrix} + \sqrt{\frac{1}{K+1}} \begin{pmatrix} h_{11,s}(t) & h_{12,s}(t) \\ h_{21,s}(t) & h_{22,s}(t) \end{pmatrix} \right) \begin{pmatrix} z_1(t) \\ z_2(t) \end{pmatrix} + \begin{pmatrix} n_1(t) \\ n_2(t) \end{pmatrix} \tag{1089}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (31B)" is not satisfied.

(Precoding Method (32A))

In a state such as in FIG. 2, signals $r_1(t)$, $r_2(t)$ that are received by a reception device can be applied as follows (note that δ is greater than or equal to 0 radians and less than 2π radians).

[MATH. 1090]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \tag{1090}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1091]

$$\begin{pmatrix} z_1(t) \\ z_2(t) \end{pmatrix} = \begin{pmatrix} a & 0 \\ 0 & b \end{pmatrix} \begin{pmatrix} \beta\times e^{j\mu}\times\sin\theta & \beta\times e^{j(\mu+\lambda)}\times\cos\theta \\ \beta\times e^{j\omega}\times\cos\theta & -\beta\times e^{j(\omega+\lambda)}\times\sin\theta \end{pmatrix} \begin{pmatrix} 1 & 0 \\ 0 & e^{j\gamma(t)} \end{pmatrix} \begin{pmatrix} s_1(t) \\ s_2(t) \end{pmatrix} \tag{1091}$$

However, a and b are complex numbers (may be actual numbers). j is an imaginary unit, and y(t) is an argument and a time function.

In this case, the following equation holds true.

[MATH. 1092]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \beta\times e^{j\mu}\times\sin\theta & \beta\times e^{j(\mu+\lambda)}\times\cos\theta \\ \beta\times e^{j\omega}\times\cos\theta & -\beta\times e^{j(\omega+\lambda)}\times\sin\theta \end{pmatrix} \\ &\quad \begin{pmatrix} 1 & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\beta\times e^{j\mu}\times\cos\delta\times\sin\theta - & h_{11}(t)\times a\times\beta\times e^{j(\mu+\lambda)}\times\cos\delta\times\cos\theta + \\ h_{22}(t)\times b\times\beta\times e^{j\omega}\times\sin\delta\times\cos\theta & h_{22}(t)\times b\times\beta\times e^{j(\omega\times\lambda)}\times\sin\delta\times\sin\theta \\ h_{11}(t)\times a\times\beta\times e^{j\mu}\times\sin\delta\times\sin\theta + & h_{11}(t)\times a\times\beta\times e^{j(\mu\times\lambda)}\times\sin\delta\times\cos\theta - \\ h_{22}(t)\times b\times\beta\times e^{j\omega}\times\cos\delta\times\cos\theta & h_{22}(t)\times b\times\beta\times e^{j(\omega\times\lambda)}\times\cos\delta\times\sin\theta \end{pmatrix} \\ &\quad \begin{pmatrix} s_1(t) \\ e^{j\gamma(t)}s_2(t) \end{pmatrix} + \begin{pmatrix} n_1(t) \\ n_2(t) \end{pmatrix} \end{aligned} \tag{1092}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1093]

$$h_{11}(t)\times a\times\beta\times e^{j(\mu+\lambda)}\times\cos\delta\times\cos\theta+h_{22}(t)\times b\times\beta\times e^{j(\omega+\lambda)}\times\sin\delta\times\sin\theta=0 \quad (1093\text{-}1)$$

$$h_{11}(t)\times a\times\beta\times e^{j\mu}\times\sin\delta\times\sin\theta+h_{22}(t)\times b\times\beta\times e^{j\omega}\times\cos\delta\times\cos\theta=0 \quad (1093\text{-}2)$$

Accordingly, it is sufficient if the following holds true.

[MATH. 1094]

$$b=\frac{h_{11}(t)}{h_{22}(t)}\times a\times e^{j(\mu-\omega)} \quad (1094\text{-}1)$$

and $$\theta=\delta+\frac{\pi}{2}+n\pi \text{ radians} \quad (1094\text{-}2)$$

($n$ is an integer)

Accordingly, the communications station calculates θ, a, and b from the feedback information from the terminal so that the following is true.

[MATH. 1095]

$$b=\frac{h_{11}(t)}{h_{22}(t)}\times a\times e^{j(\mu-\omega)} \quad (1095\text{-}1)$$

and $$\theta=\delta+\frac{\pi}{2}+n\pi \text{ radians} \quad (1095\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1096]

$$|a|^2+|b|^2=|u|^2 \quad (1096)$$

($|u|^2$ is a parameter based on average transmitted power)

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (32A-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 1097]

$$\begin{pmatrix} q_{11} & q_{12} \\ q_{21} & q_{22} \end{pmatrix} \quad (1097)$$

Accordingly, weighting synthesizer 306A calculates the following and outputs weighted signal 307A ($z_1(t)$).

[MATH. 1098]

$$z_1(t)=q_{11}\times s_1(t)+q_{12}\times e^{j\gamma(t)}\times s_2(t) \quad (1098)$$

Weighting synthesizer 306B calculates the following and outputs weighted signal 307B ($z_2(t)$).

[MATH. 1099]

$$z_2(t)=q_{21}\times s_1(t)+q_{22}\times e^{j\gamma(t)}\times s_2(t) \quad (1099)$$

Precoding method determiner 316 performs the calculations described in "(precoding method (32A)" based on feedback information from a terminal, and determines the precoding matrix.

[MATH. 1100]

$$\begin{pmatrix} q_{11} & q_{12} \\ q_{21} & q_{22} \end{pmatrix}=\begin{pmatrix} a & 0 \\ 0 & b \end{pmatrix}\begin{pmatrix} \beta\times e^{j\mu}\times\sin\theta & \beta\times e^{j(\mu+\lambda)}\times\cos\theta \\ \beta\times e^{j\omega}\times\cos\theta & -\beta\times e^{j(\omega+\lambda)}\times\sin\theta \end{pmatrix}=\begin{pmatrix} a\times\beta\times e^{j\mu}\times\sin\theta & a\times\beta\times e^{j(\mu+\lambda)}\times\cos\theta \\ b\times\beta\times e^{j\omega}\times\cos\theta & -b\times\beta\times e^{j(\omega+\lambda)}\times\sin\theta \end{pmatrix} \quad (1100)$$

In other words, the precoding matrix of the above equation is calculated. Here, based on feedback information from a terminal, precoding method determiner 316 uses

[MATH. 1101]

$$b=\frac{h_{11}(t)}{h_{22}(t)}\times a\times e^{j(\mu-\omega)} \quad (1101\text{-}1)$$

and $$\theta=\delta+\frac{\pi}{2}+n\pi \text{ radians} \quad (1101\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (32A-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1102]

$$\begin{pmatrix} q_{11} & q_{12} \\ q_{21} & q_{22} \end{pmatrix} \tag{1102}$$

Accordingly, weighting synthesizer 306A calculates the following and outputs weighted signal 307A ($y_1(t)$).

[MATH. 1103]

$$y_1(t)=q_{11}\times s_1(t)+q_{12}\times e^{j\gamma(t)}\times s_2(t) \tag{1103}$$

Weighting synthesizer 306B calculates the following and outputs weighted signal 307B ($y_2(t)$).

[MATH. 1104]

$$y_2(t)=q_{21}\times s_1(t)+q_{22}\times e^{j\gamma(t)}\times s_2(t) \tag{1104}$$

Precoding method determiner 316 performs the calculations described in "(precoding method (32A)" based on feedback information from a terminal, and determines the precoding matrix.

[MATH. 1105]

$$\begin{pmatrix} q_{11} & q_{12} \\ q_{21} & q_{22} \end{pmatrix} = \begin{pmatrix} \beta\times e^{j\mu}\times\sin\theta & \beta\times e^{j(\mu+\lambda)}\times\cos\theta \\ \beta\times e^{j\omega}\times\cos\theta & -\beta\times e^{j(\omega+\lambda)}\times\sin\theta \end{pmatrix} \tag{1105}$$

In other words, the precoding matrix of the above equation and values for a and b are calculated. Here, based on feedback information from a terminal, precoding method determiner 316 uses

[MATH. 1106]

$$b=\frac{h_{11}(t)}{h_{22}(t)}\times a\times e^{j(\mu-\omega)} \tag{1106-1}$$

and $$\theta=\delta+\frac{\pi}{2}+n\pi \text{ radians} \tag{1106-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (32A))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1107]

$$\begin{aligned}\begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix}+\begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix}+\sqrt{\frac{1}{K+1}}\begin{pmatrix} h_{11,s}(t) & h_{12,s}(t) \\ h_{21,s}(t) & h_{22,s}(t) \end{pmatrix}\right)\begin{pmatrix} z_1(t) \\ z_2(t) \end{pmatrix}+\begin{pmatrix} n_1(t) \\ n_2(t) \end{pmatrix}\end{aligned} \tag{1107}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (32A)" is not satisfied.

(Precoding Method (32B))

In a state such as in FIG. 2, signals $r_1(t)$, $r_2(t)$ that are received by a reception device can be applied as follows (note that δ is greater than or equal to 0 radians and less than 2π radians).

[MATH. 1108]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \quad (1108)$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1109]

$$\begin{pmatrix} z_1(t) \\ z_2(t) \end{pmatrix} = \begin{pmatrix} a & 0 \\ 0 & b \end{pmatrix} \begin{pmatrix} \beta\times e^{j\mu}\times\sin\theta & \beta\times e^{j(\mu+\lambda)}\times\cos\theta \\ \beta\times e^{j\omega}\times\cos\theta & -\beta\times e^{j(\omega+\lambda)}\times\sin\theta \end{pmatrix} \begin{pmatrix} 1 & 0 \\ 0 & e^{j\gamma(t)} \end{pmatrix} \begin{pmatrix} s_1(t) \\ s_2(t) \end{pmatrix} \quad (1109)$$

However, a and b are complex numbers (may be actual numbers). j is an imaginary unit, and y(t) is an argument and a time function.

In this case, the following relation equation holds true.

[MATH. 1110]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \\ &\quad \begin{pmatrix} \beta\times e^{j\mu}\times\sin\theta & \beta\times e^{j(\mu+\lambda)}\times\cos\theta \\ \beta\times e^{j\omega}\times\cos\theta & -\beta\times e^{j(\omega+\lambda)}\times\sin\theta \end{pmatrix} \begin{pmatrix} 1 & 0 \\ 0 & e^{j\gamma(t)} \end{pmatrix} \begin{pmatrix} s_1(t) \\ s_2(t) \end{pmatrix} + \\ &\quad \begin{pmatrix} n_1(t) \\ n_2(t) \end{pmatrix} \\ &= \begin{pmatrix} h_{11}(t)\times a\times\beta\times e^{j\mu}\times\cos\delta\times\sin\theta - h_{22}(t)\times b\times\beta\times e^{j\omega}\times\sin\delta\times\cos\theta & h_{11}(t)\times a\times\beta\times e^{j(\mu+\lambda)}\times\cos\delta\times\cos\theta + h_{22}(t)\times b\times\beta\times e^{j(\omega+\lambda)}\times\sin\delta\times\sin\theta \\ h_{11}(t)\times a\times\beta\times e^{j\mu}\times\sin\delta\times\sin\theta + h_{22}(t)\times b\times\beta\times e^{j\omega}\times\cos\delta\times\cos\theta & h_{11}(t)\times a\times\beta\times e^{j(\mu+\lambda)}\times\sin\delta\times\cos\theta - h_{22}(t)\times b\times\beta\times e^{j(\omega+\lambda)}\times\cos\delta\times\sin\theta \end{pmatrix} \\ &\quad \begin{pmatrix} s_1(t) \\ e^{j\gamma(t)}s_2(t) \end{pmatrix} + \begin{pmatrix} n_1(t) \\ n_2(t) \end{pmatrix} \end{aligned} \quad (1110)$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1111]

$$h_{11}(t)\times a\times\beta\times e^{j\mu}\times\cos\delta\times\sin\theta - h_{22}(t)\times b\times\beta\times e^{j\omega}\times\sin\delta\times\cos\theta=0 \quad (1111\text{-}1)$$

$$h_{11}(t)\times a\times\beta\times e^{j(\mu+\lambda)}\times\sin\delta\times\cos\theta - h_{22}(t)\times b\times\beta\times e^{j(\omega+\lambda)}\times\cos\delta\times\sin\theta=0 \quad (1111\text{-}2)$$

Accordingly, it is sufficient if the following holds true.

[MATH. 1112]

$$b = \frac{h_{11}(t)}{h_{22}(t)}\times a\times e^{j(\mu-\omega)} \quad (1112\text{-}1)$$

and $$\theta = \delta + n\pi \text{ radians} \quad (1112\text{-}2)$$

($n$ is an integer)

Accordingly, the communications station calculates θ, a, and b from the feedback information from the terminal so that the following is true.

[MATH. 1113]

$$b = \frac{h_{11}(t)}{h_{22}(t)}\times a\times e^{j(\mu-\omega)} \quad (1113\text{-}1)$$

and $$\theta = \delta + n\pi \text{ radians} \quad (1113\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1114]

$$|a|^2+|b|^2=|u|^2 \tag{1114}$$

($|u|^2$ is a parameter based on average transmitted power)

Note that, regarding mapped baseband signal $s_2(t)$, a phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (32B-1))

FIG. 10 illustrates a configuration of a communications station. One example of processes performed by weighting synthesizers 306A, 306B and precoding method determiner 316 illustrated in FIG. 10 will be described.

Mapped signal 305A output by mapper 304A is $s_1(t)$.

Mapped signal 305B output by mapper 304B is $s_2(t)$.

Weighted signal 307A output by weighting synthesizer 306A is $z_1(t)$.

Weighted signal 307B output by weighting synthesizer 306B is $z_2(t)$.

The precoding matrix is expressed as follows.

[MATH. 1115]

$$\begin{pmatrix} q_{11} & q_{12} \\ q_{21} & q_{22} \end{pmatrix} \tag{1115}$$

Accordingly, weighting synthesizer 306A calculates the following and outputs weighted signal 307A ($z_1(t)$).

[MATH. 1116]

$$z_1(t)=q_{11}\times s_1(t)+q_{12}\times e^{j\gamma(t)}\times s_2(t) \tag{1116}$$

Weighting synthesizer 306B calculates the following and outputs weighted signal 307B ($z_2(t)$).

[MATH. 1117]

$$z_2(t)=q_{21}\times s_1(t)+q_{22}\times e^{j\gamma(t)}\times s_2(t) \tag{1117}$$

Precoding method determiner 316 performs the calculations described in "(precoding method (32B)" based on feedback information from a terminal, and determines the precoding matrix.

[MATH. 1118]

$$\begin{aligned}\begin{pmatrix} q_{11} & q_{12} \\ q_{21} & q_{22} \end{pmatrix} &= \begin{pmatrix} a & 0 \\ 0 & b \end{pmatrix}\begin{pmatrix} \beta\times e^{j\mu}\times\sin\theta & \beta\times e^{j(\mu+\lambda)}\times\cos\theta \\ \beta\times e^{j\omega}\times\cos\theta & -\beta\times e^{j(\omega+\lambda)}\times\sin\theta \end{pmatrix} \\ &= \begin{pmatrix} a\times\beta\times e^{j\mu}\times\sin\theta & a\times\beta\times e^{j(\mu+\lambda)}\times\cos\theta \\ b\times\beta\times e^{j\omega}\times\cos\theta & -b\times\beta\times e^{j(\omega+\lambda)}\times\sin\theta \end{pmatrix}\end{aligned} \tag{1118}$$

In other words, the precoding matrix of the above equation is calculated. Here, based on feedback information from a terminal, precoding method determiner 316 uses

[MATH. 1119]

$$b=\frac{h_{11}(t)}{h_{22}(t)}\times a\times e^{j(\mu-\omega)} \tag{1119-1}$$

and $$\theta=\delta+n\pi \text{ radians} \tag{1119-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (32B-2))

FIG. 11 illustrates a configuration of a communications station different from FIG. 10. One example of processes performed by weighting synthesizers 306A, 306B, coefficient multipliers 401A, 401B, and precoding method determiner 316 illustrated in FIG. 11 will be described.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1120]

$$\begin{pmatrix} q_{11} & q_{12} \\ q_{21} & q_{22} \end{pmatrix} \tag{1120}$$

Accordingly, weighting synthesizer 306A calculates the following and outputs weighted signal 307A ($y_1(t)$).

[MATH. 1121]

$$y_1(t)=q_{11}\times s_1(t)+q_{12}\times e^{j\gamma(t)}\times s_2(t) \tag{1121}$$

Weighting synthesizer 306B calculates the following and outputs weighted signal 307B ($y_2(t)$).

[MATH. 1122]

$$y_2(t)=q_{21}\times s_1(t)+q_{22}\times e^{j\gamma(t)}\times s_2(t) \tag{1122}$$

Precoding method determiner 316 performs the calculations described in "(precoding method (32B)" based on feedback information from a terminal, and determines the precoding matrix.

[MATH. 1123]

$$\begin{pmatrix} q_{11} & q_{12} \\ q_{21} & q_{22} \end{pmatrix} = \begin{pmatrix} \beta\times e^{j\mu}\times\sin\theta & \beta\times e^{j(\mu+\lambda)}\times\cos\theta \\ \beta\times e^{j\omega}\times\cos\theta & -\beta\times e^{j(\omega+\lambda)}\times\sin\theta \end{pmatrix} \quad (1123)$$

In other words, the precoding matrix of the above equation and values for a and b are calculated. Here, based on feedback information from a terminal, precoding method determiner 316 uses

[MATH. 1124]

$$b = \frac{h_{11}(t)}{h_{22}(t)}\times a\times e^{j(\mu-\omega)} \quad (1124\text{-}1)$$

and $$\theta = \delta + n\pi \text{ radians} \quad (1124\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 11 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 11 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (32B))

Phase changer 1001B illustrated in FIG. 10 and FIG. 11 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1125]

$$\begin{pmatrix} r_1(t) \\ r_2(t) \end{pmatrix} = \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} = \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right)\begin{pmatrix} z_1(t) \\ z_2(t) \end{pmatrix} + \begin{pmatrix} n_1(t) \\ n_2(t) \end{pmatrix} \quad (1125)$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001B is not provided in FIG. 10 and FIG. 11—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 10 and FIG. 11, when phase changer 1001B is present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 10 and FIG. 11, when the phase changer is arranged after the weighting synthesizer, "precoding method (32B)" is not satisfied.

(Communications Station Configuration (4))

Figure 12:
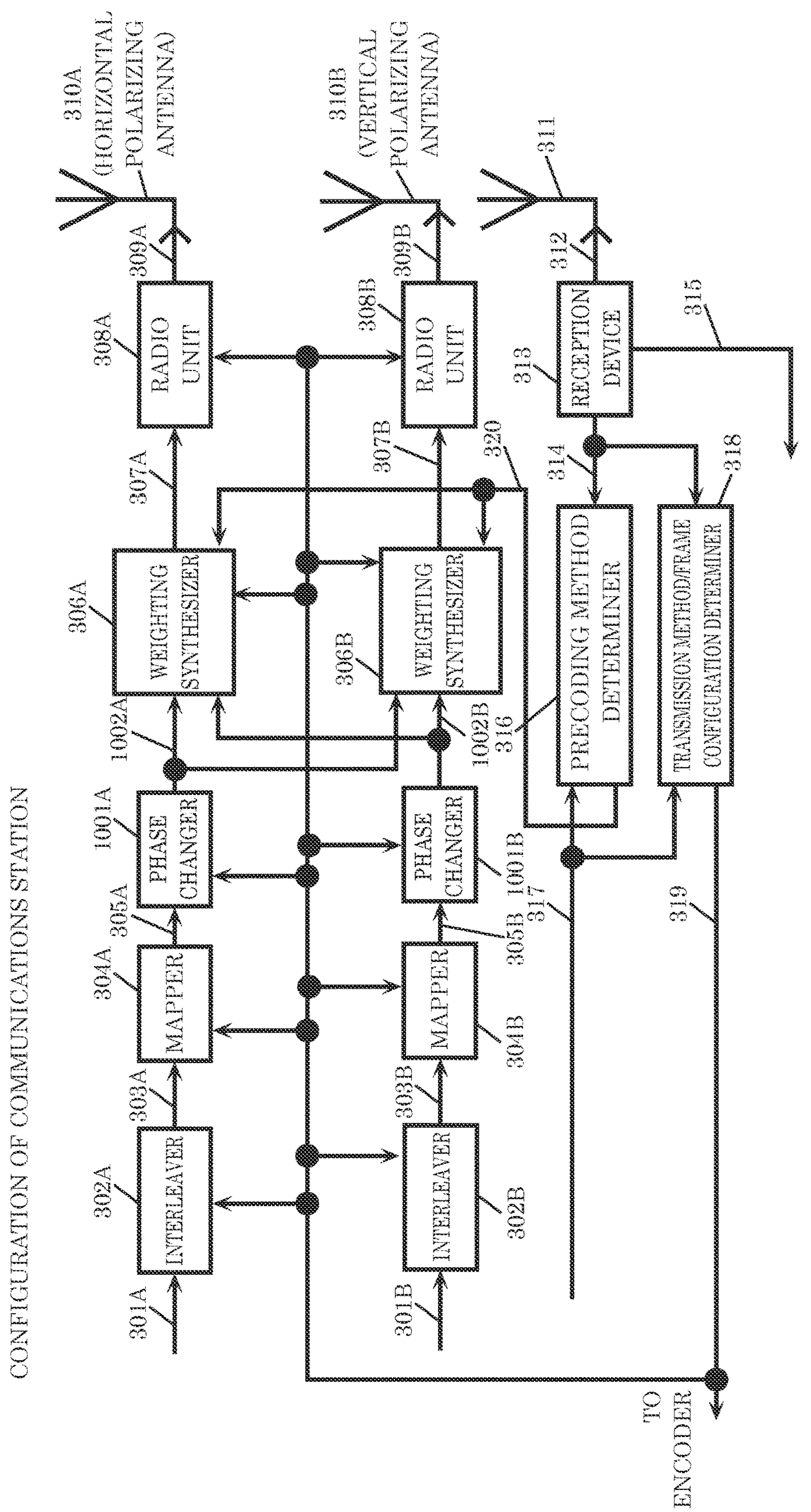
FIG. 12 illustrates an example of a configuration of a communications station.
Figure 13:
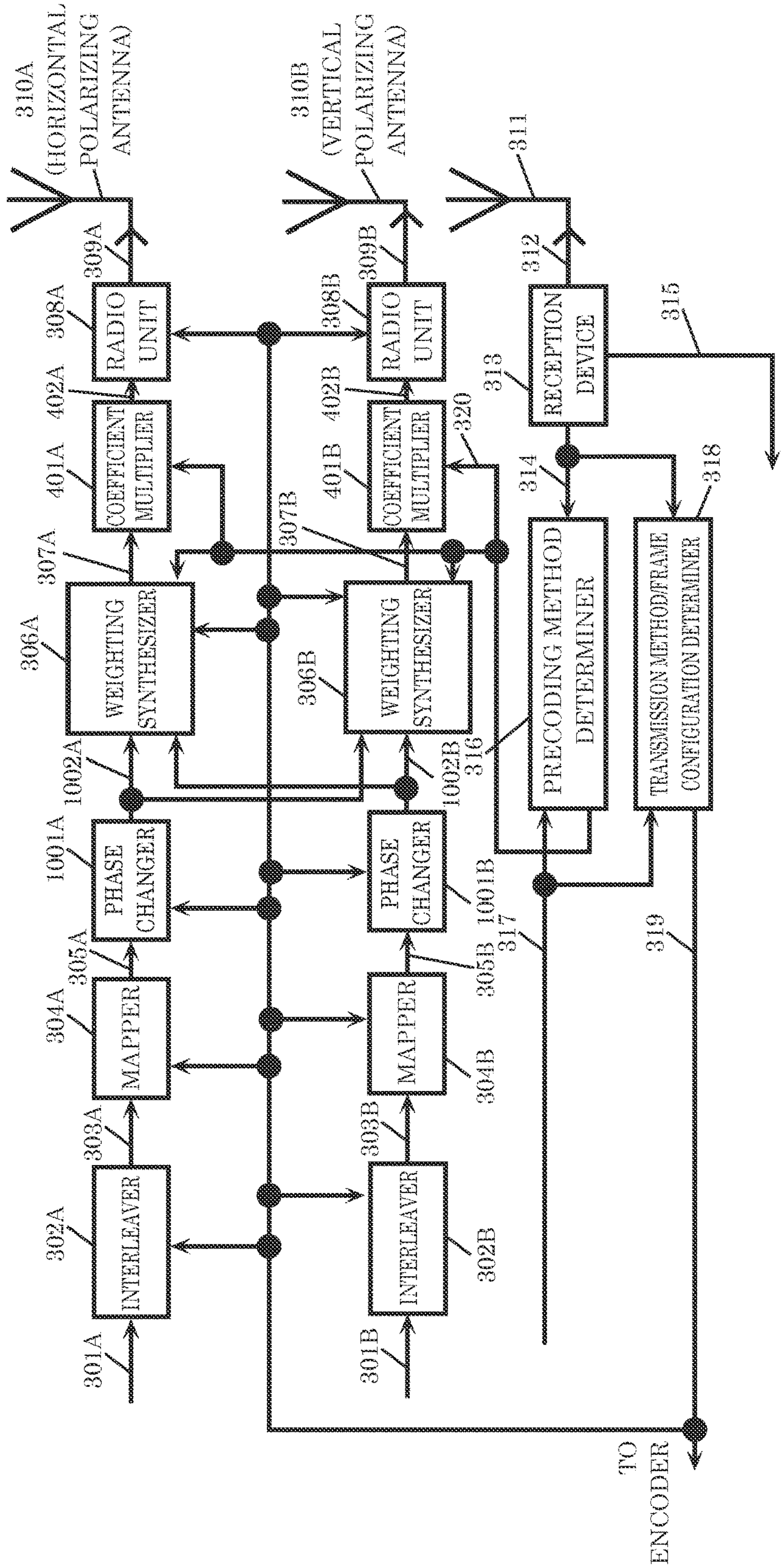
FIG. 13 illustrates an example of a configuration of a communications station.

Communications station configurations different from the configurations illustrated in FIG. 10 and FIG. 11 are illustrated in FIG. 12 and FIG. 13. Operations that are the same as in FIG. 10 and FIG. 11 share like reference marks. The configurations illustrated in FIG. 12 and FIG. 13 differ from the configurations illustrated in FIG. 10 and FIG. 11 in that phase changer 1001A is added.

Phase changer 1001A receives inputs of mapped signal 305B and transmission method/frame configuration signal 319, changes the phase of mapped signal 305B based on transmission method/frame configuration signal 319, and outputs phase-changed signal 1002B.

Note that in FIG. 12 and FIG. 13, weighting synthesizer 306A performs processing on phase-changed signal 1002A as an input instead of mapped signal 305A.

(Precoding Method (33A))

In a state such as in FIG. 2, signals $r_1(t)$, $r_2(t)$ that are received by a reception device can be applied as follows (note that δ is greater than or equal to 0 radians and less than 2π radians).

[MATH. 1126]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \tag{1126}$$

Here, when $z_1(t)=s_1(t)$ and $z_2(t)=s_2(t)$ ($s_1(t)$ and $s_2(t)$ are mapped baseband signals), excluding when $\delta=0$, $\pi/2$, $\pi$, or $3\pi/2$ radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1127]

$$\begin{pmatrix} z_1(t) \\ z_2(t) \end{pmatrix} = \begin{pmatrix} a & 0 \\ 0 & b \end{pmatrix} \begin{pmatrix} \cos\theta & \sin\theta \\ \sin\theta & -\cos\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} \tag{1127}$$

However, a and b are complex numbers (may be actual numbers). j is an imaginary unit, and y(t) is an argument and a time function.

In this case, the following equation holds true.

[MATH. 1128]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \cos\theta & \sin\theta \\ \sin\theta & -\cos\theta \end{pmatrix} \\ &\quad \begin{pmatrix} e^{j\varepsilon}(t) & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\cos\delta\times\cos\theta - h_{22}(t)\times b\times\sin\delta\times\sin\theta & h_{11}(t)\times a\times\cos\delta\times\sin\theta + h_{22}(t)\times b\times\sin\delta\times\cos\theta \\ h_{11}(t)\times a\times\sin\delta\times\cos\theta + h_{22}(t)\times b\times\cos\delta\times\sin\theta & h_{11}(t)\times a\times\sin\delta\times\sin\theta - h_{22}(t)\times b\times\cos\delta\times\cos\theta \end{pmatrix} \\ &\quad \begin{pmatrix} e^{j\varepsilon}(t)s_1(t) \\ e^{j\gamma}(t)s_2(t) \end{pmatrix} + \begin{pmatrix} n_1(t) \\ n_2(t) \end{pmatrix} \end{aligned} \tag{1128}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1129]

$$h_{11}(t)\times a\times\cos\delta\times\sin\theta+h_{22}(t)\times b\times\sin\delta\times\cos\theta=0 \tag{1129-1}$$

$$h_{11}(t)\times a\times\sin\delta\times\cos\theta+h_{22}(t)\times b\times\cos\delta\times\sin\theta=0 \tag{1129-2}$$

Accordingly, it is sufficient if the following holds true.

[MATH. 1130]

$$b = \frac{h_{11}(t)}{h_{22}(t)}\times a \tag{1130-1}$$

and $$\theta = -\delta + n\pi \text{ radians} \tag{1130-2}$$

($n$ is an integer)

Accordingly, the communications station calculates θ, a, and b from the feedback information from the terminal so that the following is true.

[MATH. 1131]

$$b = \frac{h_{11}(t)}{h_{22}(t)}\times a \tag{1131-1}$$

and $$\theta = -\delta + n\pi \text{ radians} \tag{1131-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1132]

$$|a|^2+|b|^2=|u|^2 \tag{1132}$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (33A-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$.

Mapped signal 305B output by mapper 304B is $s_2(t)$.

Weighted signal 307A output by weighting synthesizer 306A is $z_1(t)$.

Weighted signal 307B output by weighting synthesizer 306B is $z_2(t)$.

The precoding matrix is expressed as follows.

[MATH. 1133]

$$\begin{pmatrix} q_{11} & q_{12} \\ q_{21} & q_{22} \end{pmatrix} \tag{1133}$$

Accordingly, weighting synthesizer 306A calculates the following and outputs weighted signal 307A ($z_1(t)$).

[MATH. 1134]

$$z_1(t)=q_{11}\times e^{j\varepsilon(t)}\times s_1(t)+q_{12}\times e^{j\gamma(t)}\times s_2(t) \quad (1134)$$

Weighting synthesizer 306B calculates the following and outputs weighted signal 307B ($z_2(t)$).

[MATH. 1135]

$$z_2(t)=q_{21}\times e^{j\varepsilon(t)}\times s_1(t)+q_{22}\times e^{j\gamma(t)}\times s_2(t) \quad (1135)$$

Precoding method determiner 316 performs the calculations described in "(precoding method (33A)" based on feedback information from a terminal, and determines the precoding matrix.

[MATH. 1136]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \cos\theta & \sin\theta \\ \sin\theta & -\cos\theta \end{pmatrix} = \begin{pmatrix} a\times\cos\theta & a\times\sin\theta \\ b\times\sin\theta & -b\times\cos\theta \end{pmatrix} \quad (1136)$$

In other words, the precoding matrix of the above equation is calculated. Here, based on feedback information from a terminal, precoding method determiner 316 uses

[MATH. 1137]

$$b=\frac{h_{11}(t)}{h_{22}(t)}\times a \quad (1137\text{-}1)$$

and $$\theta=-\delta+n\pi \text{ radians} \quad (1137\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (33A-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1138]

$$\begin{pmatrix} q_{11} & q_{12} \\ q_{21} & q_{22} \end{pmatrix} \quad (1138)$$

Accordingly, weighting synthesizer 306A calculates the following and outputs weighted signal 307A ($y_1(t)$).

[MATH. 1139]

$$y_1(t)=q_{11}\times e^{j\varepsilon(t)}\times s_1(t)+q_{12}\times e^{j\gamma(t)}\times s_2(t) \quad (1139)$$

Weighting synthesizer 306B calculates the following and outputs weighted signal 307B ($y_2(t)$).

[MATH. 1140]

$$y_2(t)=q_{21}\times e^{j\varepsilon(t)}\times s_1(t)+q_{22}\times e^{j\gamma(t)}\times s_2(t) \quad (1140)$$

Precoding method determiner 316 performs the calculations described in "(precoding method (33A)" based on feedback information from a terminal, and determines the precoding matrix.

[MATH. 1141]

$$\begin{pmatrix} q_{11} & q_{12} \\ q_{21} & q_{22} \end{pmatrix} = \begin{pmatrix} \cos\theta & \sin\theta \\ \sin\theta & -\cos\theta \end{pmatrix} \quad (1141)$$

In other words, the precoding matrix of the above equation and values for a and b are calculated. Here, based on feedback information from a terminal, precoding method determiner 316 uses

[MATH. 1142]

$$b=\frac{h_{11}(t)}{h_{22}(t)}\times a \quad (1142\text{-}1)$$

and $$\theta=-\delta+n\pi \text{ radians} \quad (1142\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (33A))

Phase changer 1001A illustrated in FIG. 12 and FIG. 13 receives an input of mapped signal $s_1(t)$ output from mapper 304A, applies a phase-change, and outputs phase-changed signal 1002A ($e^{j\varepsilon(t)}\times_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1143]

$$\begin{pmatrix} r_1(t) \\ r_2(t) \end{pmatrix} = \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} = \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right)\begin{pmatrix} z_1(t) \\ z_2(t) \end{pmatrix} + \begin{pmatrix} n_1(t) \\ n_2(t) \end{pmatrix} \tag{1143}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (33A)" is not satisfied.

(Precoding Method (33B))

In a state such as in FIG. 2, signals $r_1(t)$, $r_2(t)$ that are received by a reception device can be applied as follows (note that δ is greater than or equal to 0 radians and less than 2π radians).

[MATH. 1144]

$$\begin{pmatrix} r_1(t) \\ r_2(t) \end{pmatrix} = \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix} \tag{1144}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1145]

$$\begin{pmatrix} z_1(t) \\ z_2(t) \end{pmatrix} = \begin{pmatrix} a & 0 \\ 0 & b \end{pmatrix}\begin{pmatrix} \cos\theta & \sin\theta \\ \sin\theta & -\cos\theta \end{pmatrix}\begin{pmatrix} e^{j\varepsilon(t)} & 0 \\ 0 & e^{j\gamma(t)} \end{pmatrix}\begin{pmatrix} s_1(t) \\ s_2(t) \end{pmatrix} \tag{1145}$$

However, a and b are complex numbers (may be actual numbers). j is an imaginary unit, and y(t) is an argument and a time function.

In this case, the following relation equation holds true.

[MATH. 1146]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} a & 0 \\ 0 & b \end{pmatrix}\begin{pmatrix} \cos\theta & \sin\theta \\ \sin\theta & -\cos\theta \end{pmatrix} \begin{pmatrix} e^{j\mu(t)} & 0 \\ 0 & e^{j\gamma(t)} \end{pmatrix}\begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\cos\delta\times\cos\theta - h_{22}(t)\times b\times\sin\delta\times\sin\theta & h_{11}(t)\times a\times\cos\delta\times\sin\theta + h_{22}(t)\times b\times\sin\delta\times\cos\theta \\ h_{11}(t)\times a\times\sin\delta\times\cos\theta + h_{22}(t)\times b\times\cos\delta\times\sin\theta & h_{11}(t)\times a\times\sin\delta\times\sin\theta - h_{22}(t)\times b\times\cos\delta\times\cos\theta \end{pmatrix} \begin{pmatrix} e^{j\mu(t)}s_1(t) \\ e^{j\gamma(t)}s_2(t) \end{pmatrix} + \begin{pmatrix} n_1(t) \\ n_2(t) \end{pmatrix} \end{aligned} \tag{1146}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1147]

$$h_{11}(t)\times a\times\cos\delta\times\cos\theta - h_{22}(t)\times b\times\sin\delta\times\cos\theta = 0 \tag{1147-1}$$

$$h_{11}(t)\times a\times\sin\delta\times\sin\theta - h_{22}(t)\times b\times\cos\delta\times\cos\theta = 0 \tag{1147-2}$$

Accordingly, it is sufficient if the following holds true.

[MATH. 1148]

$$b = \frac{h_{11}(t)}{h_{22}(t)} \times a \tag{1148-1}$$

and $$\theta = -\delta + \frac{\pi}{2} + n\pi \text{ radians} \tag{1148-2}$$

($n$ is an integer)

Accordingly, the communications station calculates θ, a, and b from the feedback information from the terminal so that the following is true.

[MATH. 1149]

$$b = \frac{h_{11}(t)}{h_{22}(t)} \times a \tag{1149-1}$$

and $$\theta = -\delta + \frac{\pi}{2} + n\pi \text{ radians} \tag{1149-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1150]

$$|a|^2+|b|^2=|u|^2 \tag{1150}$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (33B-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 1151]

$$\begin{pmatrix} q_{11} & q_{12} \\ q_{21} & q_{22} \end{pmatrix} \tag{1151}$$

Accordingly, weighting synthesizer 306A calculates the following and outputs weighted signal 307A ($z_1(t)$).

[MATH. 1152]

$$z_1(t)=q_{11}e^{j\varepsilon(t)}\times s_1(t)+q_{12}\times e^{j\gamma(t)}\times s_2(t) \tag{1152}$$

Weighting synthesizer 306B calculates the following and outputs weighted signal 307B ($z_2(t)$).

[MATH. 1153]

$$z_2(t)=q_{21}\times e^{j\varepsilon(t)}\times s_1(t)+q_{22}\times e^{j\gamma(t)}\times s_2(t) \tag{1153}$$

Precoding method determiner 316 performs the calculations described in "(precoding method (33B)" based on feedback information from a terminal, and determines the precoding matrix.

[MATH. 1154]

$$\begin{aligned}\begin{pmatrix} q_{11} & q_{12} \\ q_{21} & q_{22} \end{pmatrix} &= \begin{pmatrix} a & 0 \\ 0 & b \end{pmatrix}\begin{pmatrix} \cos\theta & \sin\theta \\ \sin\theta & -\cos\theta \end{pmatrix} \\ &= \begin{pmatrix} a\times\cos\theta & a\times\sin\theta \\ b\times\sin\theta & -b\times\cos\theta \end{pmatrix}\end{aligned} \tag{1154}$$

In other words, the precoding matrix of the above equation is calculated. Here, based on feedback information from a terminal, precoding method determiner 316 uses

[MATH. 1155]

$$b = \frac{h_{11}(t)}{h_{22}(t)} \times a \tag{1155-1}$$

and $$\theta = -\delta + \frac{\pi}{2} + n\pi \text{ radians} \tag{1155-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (33B-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1156]

$$\begin{pmatrix} q_{11} & q_{12} \\ q_{21} & q_{22} \end{pmatrix} \quad (1156)$$

Accordingly, weighting synthesizer 306A calculates the following and outputs weighted signal 307A ($y_1(t)$).

[MATH. 1157]

$$y_1(t)=q_{11}\times e^{j\varepsilon(t)}\times s_1(t)+q_{12}\times e^{j\gamma(t)}\times s_2(t) \quad (1157)$$

Weighting synthesizer 306B calculates the following and outputs weighted signal 307B ($y_2(t)$).

[MATH. 1158]

$$y_2(t)=q_{21}\times e^{j\varepsilon(t)}\times s_1(t)+q_{22}\times e^{j\gamma(t)}\times s_2(t) \quad (1158)$$

Precoding method determiner 316 performs the calculations described in "(precoding method (33B)" based on feedback information from a terminal, and determines the precoding matrix.

[MATH. 1159]

$$\begin{pmatrix} q_{11} & q_{12} \\ q_{21} & q_{22} \end{pmatrix} = \begin{pmatrix} \cos\theta & \sin\theta \\ \sin\theta & -\cos\theta \end{pmatrix} \quad (1159)$$

In other words, the precoding matrix of the above equation and values for a and b are calculated. Here, based on feedback information from a terminal, precoding method determiner 316 uses

[MATH. 1160]

$$b = \frac{h_{11}(t)}{h_{22}(t)} \times a \quad (1160\text{-}1)$$

and $$\theta = -\delta + \frac{\pi}{2} + n\pi \text{ radians} \quad (1160\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (33B))

Phase changer 1001A illustrated in FIG. 12 and FIG. 13 receives an input of mapped signal $s_1(t)$ output from mapper 304A, applies a phase-change, and outputs phase-changed signal 1002A ($e^{j\varepsilon(t)}\times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1161]

$$\begin{aligned} \begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \left( \sqrt{\frac{K}{K+1}} \begin{pmatrix} h_{11,d}(t) & h_{12,d}(t) \\ h_{21,d}(t) & h_{22,d}(t) \end{pmatrix} + \sqrt{\frac{1}{K+1}} \begin{pmatrix} h_{11,s}(t) & h_{12,s}(t) \\ h_{21,s}(t) & h_{22,s}(t) \end{pmatrix} \right) \begin{pmatrix} z_1(t) \\ z_2(t) \end{pmatrix} + \begin{pmatrix} n_1(t) \\ n_2(t) \end{pmatrix} \end{aligned} \quad (1161)$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (33B)" is not satisfied.

(Precoding Method (34A))

In a state such as in FIG. 2, signals $r_1(t)$, $r_2(t)$ that are received by a reception device can be applied as follows (note that δ is greater than or equal to 0 radians and less than 2π radians).

[MATH. 1162]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \quad (1162)$$

Here, when $z_1(t)=s_1(t)$ and $z_2(t)=s_2(t)$ ($s_1(t)$ and $s_2(t)$ are mapped baseband signals), excluding when $\delta=0$, $\pi/2$, $\pi$, or $3\pi/2$ radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1163]

$$\begin{pmatrix} z_1(t) \\ z_2(t) \end{pmatrix} = \begin{pmatrix} a & 0 \\ 0 & b \end{pmatrix} \begin{pmatrix} \beta\times\cos\theta & \beta\times\sin\theta \\ \beta\times\sin\theta & -\beta\times\cos\theta \end{pmatrix} \begin{pmatrix} e^{j\varepsilon(t)} & 0 \\ 0 & e^{j\gamma(t)} \end{pmatrix} + \begin{pmatrix} s_1(t) \\ s_2(t) \end{pmatrix} \quad (1163)$$

However, a and b are complex numbers (may be actual numbers). j is an imaginary unit, and y(t) is an argument and a time function.

In this case, the following equation holds true.

[MATH. 1164]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \\ &\quad \begin{pmatrix} a & 0 \\ 0 & b \end{pmatrix} \begin{pmatrix} \beta\times\cos\theta & \beta\times\sin\theta \\ \beta\times\sin\theta & -\beta\times\cos\theta \end{pmatrix} \begin{pmatrix} e^{j\varepsilon(t)} & 0 \\ 0 & e^{j\gamma(t)} \end{pmatrix} \\ &\quad \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\beta\times\cos\delta\times\cos\theta - h_{22}(t)\times b\times\beta\times\sin\delta\times\sin\theta & h_{11}(t)\times a\times\beta\times\cos\delta\times\sin\theta + h_{22}(t)\times b\times\beta\times\sin\delta\times\cos\theta \\ h_{11}(t)\times a\times\beta\times\sin\delta\times\cos\theta + h_{22}(t)\times b\times\beta\times\cos\delta\times\sin\theta & h_{11}(t)\times a\times\beta\times\sin\delta\times\sin\theta - h_{22}(t)\times b\times\beta\times\cos\delta\times\cos\theta \end{pmatrix} \\ &\quad \begin{pmatrix} e^{j\varepsilon(t)}s_1(t) \\ e^{j\gamma(t)}s_2(t) \end{pmatrix} + \begin{pmatrix} n_1(t) \\ n_2(t) \end{pmatrix} \end{aligned} \quad (1164)$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1165]

$$h_{11}(t)\times a\times\beta\times\cos\delta\times\sin\theta - h_{22}(t)\times b\times\beta\times\sin\delta\times\cos\theta = 0 \quad (1165\text{-}1)$$

$$h_{11}(t)\times a\times\beta\times\sin\delta\times\cos\theta - h_{22}(t)\times b\times\beta\times\cos\delta\times\sin\theta = 0 \quad (1165\text{-}2)$$

Accordingly, it is sufficient if the following holds true.

[MATH. 1166]

$$b = \frac{h_{11}(t)}{h_{22}(t)}\times a \quad (1166\text{-}1)$$

and $$\theta = -\delta + n\pi \text{ radians} \quad (1166\text{-}2)$$

($n$ is an integer)

Accordingly, the communications station calculates θ, a, and b from the feedback information from the terminal so that the following is true.

[MATH. 1167]

$$b = \frac{h_{11}(t)}{h_{22}(t)}\times a \quad (1167\text{-}1)$$

and $$\theta = -\delta + n\pi \text{ radians} \quad (1167\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1168]

$$|a|^2+|b|^2=|u|^2 \quad (1168)$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (34A-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$.

Mapped signal 305B output by mapper 304B is $s_2(t)$.

Weighted signal 307A output by weighting synthesizer 306A is $z_1(t)$.

Weighted signal 307B output by weighting synthesizer 306B is $z_2(t)$.

The precoding matrix is expressed as follows.

[MATH. 1169]

$$\begin{pmatrix} q_{11} & q_{12} \\ q_{21} & q_{22} \end{pmatrix} \tag{1169}$$

Accordingly, weighting synthesizer 306A calculates the following and outputs weighted signal 307A ($z_1(t)$).

[MATH. 1170]

$$z_1(t)=q_{11}e^{j\varepsilon(t)}\times s_1(t)+q_{12}\times e^{j\gamma(t)}\times s_2(t) \tag{1170}$$

Weighting synthesizer 306B calculates the following and outputs weighted signal 307B ($z_2(t)$).

[MATH. 1171]

$$z_2(t)=q_{21}\times e^{j\varepsilon(t)}s_1(t)+q_{22}\times e^{j\gamma(t)}\times s_2(t) \tag{1171}$$

Precoding method determiner 316 performs the calculations described in "(precoding method (34A)" based on feedback information from a terminal, and determines the precoding matrix.

[MATH. 1172]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \beta\times\cos\theta & \beta\times\sin\theta \\ \beta\times\sin\theta & -\beta\times\cos\theta \end{pmatrix} = \begin{pmatrix} a\times\beta\times\cos\theta & a\times\beta\times\sin\theta \\ b\times\beta\times\sin\theta & -b\times\beta\times\cos\theta \end{pmatrix} \tag{1172}$$

In other words, the precoding matrix of the above equation is calculated. Here, based on feedback information from a terminal, precoding method determiner 316 uses

[MATH. 1173]

$$b=\frac{h_{11}(t)}{h_{22}(t)}\times a \tag{1173-1}$$

and $$\theta=-\delta+n\pi \text{ radians} \tag{1173-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (34A-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1174]

$$\begin{pmatrix} q_{11} & q_{12} \\ q_{21} & q_{22} \end{pmatrix} \tag{1174}$$

Accordingly, weighting synthesizer 306A calculates the following and outputs weighted signal 307A ($y_1(t)$).

[MATH. 1175]

$$y_1(t)=q_{11}\times e^{j\varepsilon(t)}\times s_1(t)+q_{12}\times e^{j\gamma(t)}\times s_2(t) \tag{1175}$$

Weighting synthesizer 306B calculates the following and outputs weighted signal 307B ($y_2(t)$).

[MATH. 1176]

$$y_2(t)=q_{21}\times e^{j\varepsilon(t)}\times s_1(t)+q_{22}\times e^{j\gamma(t)}\times s_2(t) \tag{1176}$$

Precoding method determiner 316 performs the calculations described in "(precoding method (34A)" based on feedback information from a terminal, and determines the precoding matrix.

[MATH. 1177]

$$\begin{pmatrix} q_{11} & q_{12} \\ q_{21} & q_{22} \end{pmatrix} = \begin{pmatrix} \beta\times\cos\theta & \beta\times\sin\theta \\ \beta\times\sin\theta & -\beta\times\cos\theta \end{pmatrix} \tag{1177}$$

In other words, the precoding matrix of the above equation and values for a and b are calculated. Here, based on feedback information from a terminal, precoding method determiner 316 uses

[MATH. 1178]

$$b=\frac{h_{11}(t)}{h_{22}(t)}\times a \tag{1178-1}$$

and $$\theta=-\delta+n\pi \text{ radians} \tag{1178-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (34A))

Phase changer 1001A illustrated in FIG. 12 and FIG. 13 receives an input of mapped signal $s_1(t)$ output from mapper 304A, applies a phase-change, and outputs phase-changed signal 1002A ($e^{j\varepsilon(t)}\times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1178]

$$\begin{aligned}\begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right) \begin{pmatrix} z_1(t) \\ z_2(t) \end{pmatrix} + \begin{pmatrix} n_1(t) \\ n_2(t) \end{pmatrix}\end{aligned} \tag{1179}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (34A)" is not satisfied.

(Precoding Method (34B))

In a state such as in FIG. 2, signals $r_1(t)$, $r_2(t)$ that are received by a reception device can be applied as follows (note that δ is greater than or equal to 0 radians and less than 2π radians).

[MATH. 1180]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix}\end{aligned} \tag{1180}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1181]

$$\begin{pmatrix} z_1(t) \\ z_2(t) \end{pmatrix} = \begin{pmatrix} a & 0 \\ 0 & b \end{pmatrix}\begin{pmatrix} \beta\times\cos\theta & \beta\times\sin\theta \\ \beta\times\sin\theta & -\beta\times\cos\theta \end{pmatrix}\begin{pmatrix} e^{j\varepsilon(t)} & 0 \\ 0 & e^{j\gamma(t)} \end{pmatrix}\begin{pmatrix} s_1(t) \\ s_2(t) \end{pmatrix} \tag{1181}$$

However, a and b are complex numbers (may be actual numbers). j is an imaginary unit, and y(t) is an argument and a time function.

In this case, the following relation equation holds true.

[MATH. 1182]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix}\begin{pmatrix} \beta\times\cos\theta & \beta\times\sin\theta \\ \beta\times\sin\theta & -\beta\times\cos\theta \end{pmatrix}\begin{pmatrix} e^{j\varepsilon(t)} & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\beta\times\cos\delta\times\cos\theta - h_{22}(t)\times b\times\beta\times\sin\delta\times\sin\theta & h_{11}(t)\times a\times\beta\times\cos\delta\times\sin\theta + h_{22}(t)\times b\times\beta\times\sin\delta\times\cos\theta \\ h_{11}(t)\times a\times\beta\times\sin\delta\times\cos\theta + h_{22}(t)\times b\times\beta\times\cos\delta\times\sin\theta & h_{11}(t)\times a\times\beta\times\sin\delta\times\sin\theta - h_{22}(t)\times b\times\beta\times\cos\delta\times\cos\theta \end{pmatrix} \begin{pmatrix} e^{j\varepsilon(t)}s_1(t) \\ e^{j\gamma(t)}s_2(t) \end{pmatrix} + \begin{pmatrix} n_1(t) \\ n_2(t) \end{pmatrix}\end{aligned} \tag{1182}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1183]

$$h_{11}(t)\times a\times\beta\times\cos\delta\times\cos\theta-h_{22}(t)\times b\times\beta\times\sin\delta\times\sin\theta=0 \quad (1183\text{-}1)$$

$$h_{11}(t)\times a\times\beta\times\sin\delta\times\sin\theta-h_{22}(t)\times b\times\beta\times\cos\delta\times\cos\theta=0 \quad (1183\text{-}2)$$

Accordingly, it is sufficient if the following holds true.

[MATH. 1184]

$$b=\frac{h_{11}(t)}{h_{22}(t)}\times a \text{ and} \quad (1184\text{-}1)$$

$$\theta=-\delta+\frac{\pi}{2}+n\pi \text{ radians} \quad (1184\text{-}2)$$

($n$ is an integer)

Accordingly, the communications station calculates θ, a, and b from the feedback information from the terminal so that the following is true.

[MATH. 1185]

$$b=\frac{h_{11}(t)}{h_{22}(t)}\times a \text{ and} \quad (1185\text{-}1)$$

$$\theta=-\delta+\frac{\pi}{2}+n\pi \text{ radians} \quad (1185\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1186]

$$|a|^2+|b|^2=|u|^2 \quad (1186)$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (34B-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 1187]

$$\begin{pmatrix} q_{11} & q_{12} \\ q_{21} & q_{22} \end{pmatrix} \quad (1187)$$

Accordingly, weighting synthesizer 306A calculates the following and outputs weighted signal 307A ($z_1(t)$).

[MATH. 1188]

$$z_1(t)=q_{11}\times e^{j\varepsilon(t)}\times s_1(t)+q_{12}\times e^{j\gamma(t)}\times s_2(t) \quad (1188)$$

Weighting synthesizer 306B calculates the following and outputs weighted signal 307B ($z_2(t)$).

[MATH. 1189]

$$z_2(t)=q_{21}\times e^{j\varepsilon(t)}\times s_1(t)+q_{22}\times e^{j\gamma(t)}\times s_2(t) \quad (1189)$$

Precoding method determiner 316 performs the calculations described in "(precoding method (34B)" based on feedback information from a terminal, and determines the precoding matrix.

[MATH. 1190]

$$\begin{pmatrix} q_{11} & q_{12} \\ q_{21} & q_{22} \end{pmatrix}=\begin{pmatrix} a & 0 \\ 0 & b \end{pmatrix}\begin{pmatrix} \beta\times\cos\theta & \beta\times\sin\theta \\ \beta\times\sin\theta & -\beta\times\cos\theta \end{pmatrix}=\begin{pmatrix} a\times\beta\times\cos\theta & a\times\beta\times\sin\theta \\ b\times\beta\times\sin\theta & -b\times\beta\times\cos\theta \end{pmatrix} \quad (1190)$$

In other words, the precoding matrix of the above equation is calculated. Here, based on feedback information from a terminal, precoding method determiner 316 uses

[MATH. 1191]

$$b=\frac{h_{11}(t)}{h_{22}(t)}\times a \text{ and} \quad (1191\text{-}1)$$

$$\theta=-\delta+\frac{\pi}{2}+n\pi \text{ radians} \quad (1191\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (34B-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$. Mapped signal 305B output by mapper 304B is $s_2(t)$.

Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1192]

$$\begin{pmatrix} q_{11} & q_{12} \\ q_{21} & q_{22} \end{pmatrix} \tag{1192}$$

Accordingly, weighting synthesizer 306A calculates the following and outputs weighted signal 307A ($y_1(t)$).

[MATH. 1193]

$$y_1(t)=q_{11}\times e^{j\varepsilon(t)}\times s_1(t)+q_{22}\times e^{j\gamma(t)}\times s_2(t) \tag{1193}$$

Weighting synthesizer 306B calculates the following and outputs weighted signal 307B ($y_2(t)$).

[MATH. 1194]

$$y_2(t)=q_{21}\times e^{j\varepsilon(t)}\times s_1(t)+q_{22}\times e^{j\gamma(t)}\times s_2(t) \tag{1194}$$

Precoding method determiner 316 performs the calculations described in "(precoding method (34B)" based on feedback information from a terminal, and determines the precoding matrix.

[MATH. 1195]

$$\begin{pmatrix} q_{11} & q_{12} \\ q_{21} & q_{22} \end{pmatrix} = \begin{pmatrix} \beta\times\cos\theta & \beta\times\sin\theta \\ \beta\times\sin\theta & -\beta\times\cos\theta \end{pmatrix} \tag{1195}$$

In other words, the precoding matrix of the above equation and values for a and b are calculated. Here, based on feedback information from a terminal, precoding method determiner 316 uses

[MATH. 1196]

$$b=\frac{h_{11}(t)}{h_{22}(t)}\times a \text{ and} \tag{1196-1}$$

$$\theta=-\delta+\frac{\pi}{2}+n\pi \text{ radians} \tag{1196-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (34B))

Phase changer 1001A illustrated in FIG. 12 and FIG. 13 receives an input of mapped signal $s_1(t)$ output from mapper 304A, applies a phase-change, and outputs phase-changed signal 1002A ($e^{j\varepsilon(t)}\times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1197]

$$\begin{aligned}\begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix}+\begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix}+\sqrt{\frac{1}{K+1}}\begin{pmatrix} h_{11,s}(t) & h_{12,s}(t) \\ h_{21,s}(t) & h_{22,s}(t) \end{pmatrix}\right)\begin{pmatrix} z_1(t) \\ z_2(t) \end{pmatrix}+\begin{pmatrix} n_1(t) \\ n_2(t) \end{pmatrix}\end{aligned} \tag{1197}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (34B)" is not satisfied.

(Precoding Method (35A))

In a state such as in FIG. 2, signals $r_1(t)$, $r_2(t)$ that are received by a reception device can be applied as follows (note that δ is greater than or equal to 0 radians and less than 2π radians).

[MATH. 1198]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \quad (1198)$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1199]

$$\begin{pmatrix} z_1(t) \\ z_2(t) \end{pmatrix} = \begin{pmatrix} a & 0 \\ 0 & b \end{pmatrix} \begin{pmatrix} \cos\theta & -\sin\theta \\ \sin\theta & \cos\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} \quad (1199)$$

However, a and b are complex numbers (may be actual numbers). j is an imaginary unit, and y(t) is an argument and a time function.

In this case, the following equation holds true.

[MATH. 1200]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \\ &\quad \begin{pmatrix} \cos\theta & -\sin\theta \\ \sin\theta & \cos\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\cos\delta\times\cos\theta - h_{22}(t)\times b\times\sin\delta\times\sin\theta & -h_{11}(t)\times a\times\cos\delta\times\sin\theta - h_{22}(t)\times b\times\sin\delta\times\cos\theta \\ h_{11}(t)\times a\times\sin\delta\times\cos\theta + h_{22}(t)\times b\times\cos\delta\times\sin\theta & -h_{11}(t)\times a\times\sin\delta\times\sin\theta + h_{22}(t)\times b\times\cos\delta\times\cos\theta \end{pmatrix} \\ &\quad \begin{pmatrix} e^{j\varepsilon(t)} & s_1(t) \\ e^{j\gamma(t)} & s_2(t) \end{pmatrix} + \begin{pmatrix} n_1(t) \\ n_2(t) \end{pmatrix} \end{aligned} \quad (1200)$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1201]

$$-h_{11}(t)\times a\times\cos\delta\times\sin\theta - h_{22}(t)\times b\times\sin\delta\times\cos\theta = 0 \quad (1201\text{-}1)$$

$$h_{11}(t)\times a\times\sin\delta\times\cos\theta + h_{22}(t)\times b\times\cos\delta\times\sin\theta = 0 \quad (1201\text{-}2)$$

Accordingly, it is sufficient if the following holds true.

[MATH. 1202]

$$b = \frac{h_{11}(t)}{h_{22}(t)} \times a \text{ and} \quad (1202\text{-}1)$$

$$\theta = -\delta + n\pi \text{ radians} \quad (1202\text{-}2)$$

($n$ is an integer)

Accordingly, the communications station calculates θ, a, and b from the feedback information from the terminal so that the following is true.

[MATH. 1203]

$$b = \frac{h_{11}(t)}{h_{22}(t)} \times a \text{ and} \quad (1203\text{-}1)$$

$$\theta = -\delta + n\pi \text{ radians} \quad (1203\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1204]

$$|a|^2+|b|^2=|u|^2 \quad (1204)$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (35A-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 1205]

$$\begin{pmatrix} q_{11} & q_{12} \\ q_{21} & q_{22} \end{pmatrix} \quad (1205)$$

Accordingly, weighting synthesizer 306A calculates the following and outputs weighted signal 307A ($z_1(t)$).

[MATH. 1206]

$$z_1(t)=q_{11}\times e^{j\varepsilon(t)}\times s_1(t)+q_{12}\times e^{j\gamma(t)}\times s_2(t) \quad (1206)$$

Weighting synthesizer 306B calculates the following and outputs weighted signal 307B ($z_2(t)$).

[MATH. 1207]

$$z_2(t)=q_{21}\times e^{j\varepsilon(t)}\times s_1(t)+q_{22}\times e^{j\gamma(t)}\times s_2(t) \quad (1207)$$

Precoding method determiner 316 performs the calculations described in "(precoding method (35A)" based on feedback information from a terminal, and determines the precoding matrix.

[MATH. 1208]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \cos\theta & -\sin\theta \\ \sin\theta & \cos\theta \end{pmatrix} = \begin{pmatrix} a\times\cos\theta & -a\times\sin\theta \\ b\times\sin\theta & b\times\cos\theta \end{pmatrix} \quad (1208)$$

In other words, the precoding matrix of the above equation is calculated. Here, based on feedback information from a terminal, precoding method determiner 316 uses

[MATH. 1209]

$$b=\frac{h_{11}(t)}{h_{22}(t)}\times a \quad (1209\text{-}1)$$

and $$\theta=-\delta+n\pi \text{ radians} \quad (1209\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (35A-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1210]

$$\begin{pmatrix} q_{11} & q_{12} \\ q_{21} & q_{22} \end{pmatrix} \quad (1210)$$

Accordingly, weighting synthesizer 306A calculates the following and outputs weighted signal 307A ($y_1(t)$).

[MATH. 1211]

$$y_1(t)=q_{11}\times e^{j\varepsilon(t)}\times s_1(t)+q_{12}\times e^{j\gamma(t)}\times s_2(t) \quad (1211)$$

Weighting synthesizer 306B calculates the following and outputs weighted signal 307B ($y_2(t)$).

[MATH. 1212]

$$y_2(t)=q_{21}\times e^{j\varepsilon(t)}\times s_1(t)+q_{22}\times e^{j\gamma(t)}\times s_2(t) \quad (1212)$$

Precoding method determiner 316 performs the calculations described in "(precoding method (35A)" based on feedback information from a terminal, and determines the precoding matrix.

[MATH. 1213]

$$\begin{pmatrix} q_{11} & q_{12} \\ q_{21} & q_{22} \end{pmatrix} = \begin{pmatrix} \cos\theta & -\sin\theta \\ \sin\theta & \cos\theta \end{pmatrix} \quad (1213)$$

In other words, the precoding matrix of the above equation and values for a and b are calculated. Here, based on feedback information from a terminal, precoding method determiner 316 uses

[MATH. 1214]

$$b=\frac{h_{11}(t)}{h_{22}(t)}\times a \quad (1214\text{-}1)$$

and $$\theta=-\delta+n\pi \text{ radians} \quad (1214\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (35A))

Phase changer 1001A illustrated in FIG. 12 and FIG. 13 receives an input of mapped signal $s_1(t)$ output from mapper 304A, applies a phase-change, and outputs phase-changed signal 1002A ($e^{j\varepsilon(t)}\times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1215]

$$\begin{pmatrix} r_1(t) \\ r_2(t) \end{pmatrix} = \begin{pmatrix} h_{11}(t) & h_{12}(t) \\ h_{21}(t) & h_{22}(t) \end{pmatrix} \begin{pmatrix} z_1(t) \\ z_2(t) \end{pmatrix} + \begin{pmatrix} n_1(t) \\ n_2(t) \end{pmatrix} = \left( \sqrt{\frac{K}{K+1}} \begin{pmatrix} h_{11,d}(t) & h_{12,d}(t) \\ h_{21,d}(t) & h_{22,d}(t) \end{pmatrix} + \sqrt{\frac{1}{K+1}} \begin{pmatrix} h_{11,s}(t) & h_{12,s}(t) \\ h_{21,s}(t) & h_{22,s}(t) \end{pmatrix} \right) \begin{pmatrix} z_1(t) \\ z_2(t) \end{pmatrix} + \begin{pmatrix} n_1(t) \\ n_2(t) \end{pmatrix} \tag{1215}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (35A)" is not satisfied.

(Precoding Method (35B))

In a state such as in FIG. 2, signals $r_1(t)$, $r_2(t)$ that are received by a reception device can be applied as follows (note that δ is greater than or equal to 0 radians and less than 2π radians).

[MATH. 1216]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \tag{1216}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1217]

$$\begin{pmatrix} z_1(t) \\ z_2(t) \end{pmatrix} = \begin{pmatrix} a & 0 \\ 0 & b \end{pmatrix} \begin{pmatrix} \cos\theta & -\sin\theta \\ \sin\theta & \cos\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} \tag{1217}$$

However, a and b are complex numbers (may be actual numbers). j is an imaginary unit, and y(t) is an argument and a time function.

In this case, the following relation equation holds true.

[MATH. 1218]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \cos\theta & -\sin\theta \\ \sin\theta & \cos\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\cos\delta\times\cos\theta - h_{22}(t)\times b\times\sin\delta\times\sin\theta & -h_{11}(t)\times a\times\cos\delta\times\sin\theta - h_{22}(t)\times b\times\sin\delta\times\cos\theta \\ h_{11}(t)\times a\times\sin\delta\times\cos\theta + h_{22}(t)\times b\times\cos\delta\times\sin\theta & -h_{11}(t)\times a\times\sin\delta\times\sin\theta + h_{22}(t)\times b\times\cos\delta\times\cos\theta \end{pmatrix} \begin{pmatrix} e^{j\varepsilon(t)} & s_1(t) \\ e^{j\gamma(t)} & s_2(t) \end{pmatrix} + \begin{pmatrix} n_1(t) \\ n_2(t) \end{pmatrix} \end{aligned} \tag{1218}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1219]

$$h_{11}(t)\times a\times\cos\delta\times\cos\theta-h_{22}(t)\times b\times\sin\delta\times\sin\theta=0 \quad (1219\text{-}1)$$

$$-h_{11}(t)\times a\times\sin\delta\times\sin\theta+h_{22}(t)\times b\times\cos\delta\times\cos\theta=0 \quad (1219\text{-}2)$$

Accordingly, it is sufficient if the following holds true.

[MATH. 1220]

$$b=\frac{h_{11}(t)}{h_{22}(t)}\times a \text{ and} \quad (1220\text{-}1)$$

$$\theta=-\delta+\frac{\pi}{2}+n\pi \text{ radians} \quad (1220\text{-}2)$$

($n$ is an integer)

Accordingly, the communications station calculates θ, a, and b from the feedback information from the terminal so that the following is true.

[MATH. 1221]

$$b=\frac{h_{11}(t)}{h_{22}(t)}\times a \text{ and} \quad (1221\text{-}1)$$

$$\theta=-\delta+\frac{\pi}{2}+n\pi \text{ radians} \quad (1221\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1222]

$$|a|^2+|b|^2=|u|^2 \quad (1222)$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (35B-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 1223]

$$\begin{pmatrix} q_{11} & q_{12} \\ q_{21} & q_{22} \end{pmatrix} \quad (1223)$$

Accordingly, weighting synthesizer 306A calculates the following and outputs weighted signal 307A ($z_1(t)$).

[MATH. 1224]

$$z_1(t)=q_{11}\times e^{j\varepsilon(t)}\times s_1(t)+q_{12}\times e^{j\gamma(t)}\times s_2(t) \quad (1224)$$

Weighting synthesizer 306B calculates the following and outputs weighted signal 307B ($z_2(t)$).

[MATH. 1225]

$$z_2(t)=q_{21}\times e^{j\varepsilon(t)}\times s_1(t)+q_{22}\times e^{j\gamma(t)}\times s_2(t) \quad (1225)$$

Precoding method determiner 316 performs the calculations described in "(precoding method (35B)" based on feedback information from a terminal, and determines the precoding matrix.

[MATH. 1226]

$$\begin{pmatrix} q_{11} & q_{12} \\ q_{21} & q_{22} \end{pmatrix}=\begin{pmatrix} a & 0 \\ 0 & b \end{pmatrix}\begin{pmatrix} \cos\theta & -\sin\theta \\ \sin\theta & \cos\theta \end{pmatrix}=\begin{pmatrix} a\times\cos\theta & -a\times\sin\theta \\ b\times\sin\theta & b\times\cos\theta \end{pmatrix} \quad (1226)$$

In other words, the precoding matrix of the above equation is calculated. Here, based on feedback information from a terminal, precoding method determiner 316 uses

[MATH. 1227]

$$b=\frac{h_{11}(t)}{h_{22}(t)}\times a \quad (1227\text{-}1)$$

and $$\theta=-\delta+\frac{\pi}{2}+n\pi \text{ radians} \quad (1227\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (35B-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$. Mapped signal 305B output by mapper 304B is $s_2(t)$.

Weighted signal 307A output by weighting synthesizer 306A is $y_1(t)$. Weighted signal 307B output by weighting synthesizer 306B is $y_2(t)$.

Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1228]

$$\begin{pmatrix} q_{11} & q_{12} \\ q_{21} & q_{22} \end{pmatrix} \tag{1228}$$

Accordingly, weighting synthesizer 306A calculates the following and outputs weighted signal 307A ($y_1(t)$).

[MATH. 1229]

$$y_1(t)=q_{11}\times e^{j\varepsilon(t)}\times s_1(t)+q_{12}\times e^{j\gamma(t)}\times s_2(t) \tag{1229}$$

Weighting synthesizer 306B calculates the following and outputs weighted signal 307B ($y_2(t)$).

[MATH. 1230]

$$y_2(t)=q_{21}\times e^{j\varepsilon(t)}\times s_1(t)+q_{22}\times e^{j\gamma(t)}\times s_2(t) \tag{1230}$$

Precoding method determiner 316 performs the calculations described in "(precoding method (35B)" based on feedback information from a terminal, and determines the precoding matrix.

[MATH. 1231]

$$\begin{pmatrix} q_{11} & q_{12} \\ q_{21} & q_{22} \end{pmatrix} = \begin{pmatrix} \cos\theta & -\sin\theta \\ \sin\theta & \cos\theta \end{pmatrix} \tag{1231}$$

In other words, the precoding matrix of the above equation and values for a and b are calculated. Here, based on feedback information from a terminal, precoding method determiner 316 uses

[MATH. 1232]

$$b = \frac{h_{11}(t)}{h_{22}(t)} \times a \tag{1232-1}$$

and $$\theta = -\delta + \frac{\pi}{2} + n\pi \text{ radians} \tag{1232-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (35B))

Phase changer 1001A illustrated in FIG. 12 and FIG. 13 receives an input of mapped signal $s_1(t)$ output from mapper 304A, applies a phase-change, and outputs phase-changed signal 1002A $(e)^{j\varepsilon(t)}\times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1233]

$$\begin{aligned} \begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \left( \sqrt{\frac{K}{K+1}} \begin{pmatrix} h_{11,d}(t) & h_{12,d}(t) \\ h_{21,d}(t) & h_{22,d}(t) \end{pmatrix} + \sqrt{\frac{1}{K+1}} \begin{pmatrix} h_{11,s}(t) & h_{12,s}(t) \\ h_{21,s}(t) & h_{22,s}(t) \end{pmatrix} \right) \begin{pmatrix} z_1(t) \\ z_2(t) \end{pmatrix} + \begin{pmatrix} n_1(t) \\ n_2(t) \end{pmatrix} \end{aligned} \tag{1233}$$

Here, $h_{xy,d}(t)$ is a direct wave component of $h_{xy}(t)$, and $hx_{y,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (35B)" is not satisfied.

(Precoding Method (36A))

In a state such as in FIG. 2, signals $r_1(t)$, $r_2(t)$ that are received by a reception device can be applied as follows (note that δ is greater than or equal to 0 radians and less than 2π radians).

[MATH. 1234]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \quad (1234)$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1235]

$$\begin{pmatrix} z_1(t) \\ z_2(t) \end{pmatrix} = \begin{pmatrix} a & 0 \\ 0 & b \end{pmatrix} \begin{pmatrix} \beta\times\cos\theta & -\beta\times\sin\theta \\ \beta\times\sin\theta & \beta\times\cos\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} \quad (1235)$$

However, a and b are complex numbers (may be actual numbers). j is an imaginary unit, and y(t) is an argument and a time function.

In this case, the following equation holds true.

[MATH. 1236]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \beta\times\cos\theta & -\beta\times\sin\theta \\ \beta\times\sin\theta & \beta\times\cos\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\beta\times\cos\delta\times\cos\theta - h_{22}(t)\times b\times\beta\times\sin\delta\times\sin\theta & -h_{11}(t)\times a\times\beta\times\cos\delta\times\sin\theta - h_{22}(t)\times b\times\beta\times\sin\delta\times\cos\theta \\ h_{11}(t)\times a\times\beta\times\sin\delta\times\cos\theta + h_{22}(t)\times b\times\beta\times\cos\delta\times\sin\theta & -h_{11}(t)\times a\times\beta\times\sin\delta\times\sin\theta + h_{22}(t)\times b\times\beta\times\cos\delta\times\cos\theta \end{pmatrix} \begin{pmatrix} e^{j\varepsilon(t)} & s_1(t) \\ e^{j\gamma(t)} & s_2(t) \end{pmatrix} + \begin{pmatrix} n_1(t) \\ n_2(t) \end{pmatrix} \end{aligned} \quad (1236)$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1237]

$$-h_{11}(t)\times a\times\beta\times\cos\delta\times\sin\theta - h_{22}(t)\times b\times\beta\times\sin\delta\times\cos\theta = 0 \quad (1237\text{-}1)$$

$$h_{11}(t)\times a\times\beta\times\sin\delta\times\cos\theta + h_{22}(t)\times b\times\beta\times\cos\delta\times\sin\theta = 0 \quad (1237\text{-}2)$$

Accordingly, it is sufficient if the following holds true.

[MATH. 1238]

$$b = \frac{h_{11}(t)}{h_{22}(t)}\times a \quad (1238\text{-}1)$$

and $$\theta = -\delta + n\pi \text{ radians} \quad (1238\text{-}2)$$

($n$ is an integer)

Accordingly, the communications station calculates θ, a, and b from the feedback information from the terminal so that the following is true.

[MATH. 1239]

$$b = \frac{h_{11}(t)}{h_{22}(t)}\times a \quad (1239\text{-}1)$$

and $$\theta = -\delta + n\pi \text{ radians} \quad (1239\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1240]

$$|a|^2+|b|^2=|u|^2 \quad (1240)$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (36A-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 1241]

$$\begin{pmatrix} q_{11} & q_{12} \\ q_{21} & q_{22} \end{pmatrix} \quad (1241)$$

Accordingly, weighting synthesizer 306A calculates the following and outputs weighted signal 307A ($z_1(t)$).

[MATH. 1242]

$$z_1(t)=q_{11}\times\times e^{j\varepsilon(t)}\times s_1(t)+q_{12}\times e^{j\gamma(t)}\times s_2(t) \quad (1242)$$

Weighting synthesizer 306B calculates the following and outputs weighted signal 307B ($z_2(t)$).

[MATH. 1243]

$$z_2(t)=q_{21}\times e^{j\varepsilon(t)}\times s_1(t)+q_{22}\times e^{j\gamma(t)}\times s_2(t) \quad (1243)$$

Precoding method determiner 316 performs the calculations described in "(precoding method (36A)" based on feedback information from a terminal, and determines the precoding matrix.

[MATH. 1244]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \beta\times\cos\theta & -\beta\times\sin\theta \\ \beta\times\sin\theta & \beta\times\cos\theta \end{pmatrix} = \begin{pmatrix} a\times\beta\times\cos\theta & -a\times\beta\times\sin\theta \\ b\times\beta\times\sin\theta & b\times\beta\times\cos\theta \end{pmatrix} \quad (1244)$$

In other words, the precoding matrix of the above equation is calculated. Here, based on feedback information from a terminal, precoding method determiner 316 uses

[MATH. 1245]

$$b=\frac{h_{11}(t)}{h_{22}(t)}\times a \quad (1245\text{-}1)$$

and

-continued $$\theta=-\delta+n\pi \text{ radians} \quad (1245\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (36A-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1246]

$$\begin{pmatrix} q_{11} & q_{12} \\ q_{21} & q_{22} \end{pmatrix} \quad (1246)$$

Accordingly, weighting synthesizer 306A calculates the following and outputs weighted signal 307A ($y_1(t)$).

[MATH. 1247]

$$y_1(t)=q_{11}\times e^{j\varepsilon(t)}\times s_1(t)+q_{12}\times e^{j\gamma(t)}\times s_2(t) \quad (1247)$$

Weighting synthesizer 306B calculates the following and outputs weighted signal 307B ($y_2(t)$).

[MATH. 1248]

$$y_2(t)=q_{21}\times e^{j\varepsilon(t)}\times s_1(t)+q_{22}\times e^{j\gamma(t)}\times s_2(t) \quad (1248)$$

Precoding method determiner 316 performs the calculations described in "(precoding method (36A)" based on feedback information from a terminal, and determines the precoding matrix.

[MATH. 1249]

$$\begin{pmatrix} q_{11} & q_{12} \\ q_{21} & q_{22} \end{pmatrix} = \begin{pmatrix} \beta\times\cos\theta & -\beta\times\sin\theta \\ \beta\times\sin\theta & \beta\times\cos\theta \end{pmatrix} \quad (1249)$$

In other words, the precoding matrix of the above equation and values for a and b are calculated. Here, based on feedback information from a terminal, precoding method determiner 316 uses

[MATH. 1250]

$$b = \frac{h_{11}(t)}{h_{22}(t)} \times a \tag{1250-1}$$

and $$\theta = -\delta + n\pi \text{ radians} \tag{1250-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (36A))

Phase changer 1001A illustrated in FIG. 12 and FIG. 13 receives an input of mapped signal $s_1(t)$ output from mapper 304A, applies a phase-change, and outputs phase-changed signal 1002A ($(e)^{j\varepsilon(t)}\times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1251]

$$\begin{aligned}\begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right) \begin{pmatrix} z_1(t) \\ z_2(t) \end{pmatrix} + \begin{pmatrix} n_1(t) \\ n_2(t) \end{pmatrix}\end{aligned} \tag{1251}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (36A)" is not satisfied.

(Precoding Method (36B))

In a state such as in FIG. 2, signals $r_1(t)$, $r_2(t)$ that are received by a reception device can be applied as follows (note that δ is greater than or equal to 0 radians and less than 2π radians).

[MATH. 1252]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix}\end{aligned} \tag{1252}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1253]

$$\begin{pmatrix} z_1(t) \\ z_2(t) \end{pmatrix} = \begin{pmatrix} a & 0 \\ 0 & b \end{pmatrix}\begin{pmatrix} \beta\times\cos\theta & -\beta\times\sin\theta \\ \beta\times\sin\theta & \beta\times\cos\theta \end{pmatrix}\begin{pmatrix} e^{j\varepsilon(t)} & 0 \\ 0 & e^{j\gamma(t)} \end{pmatrix}\begin{pmatrix} s_1(t) \\ s_2(t) \end{pmatrix} \tag{1253}$$

However, a and b are complex numbers (may be actual numbers). j is an imaginary unit, and γ(t) is an argument and a time function.

In this case, the following relation equation holds true.

[MATH. 1254]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \tag{1254}$$

$$= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix}$$

$$= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \beta\times\cos\theta & -\beta\times\sin\theta \\ \beta\times\sin\theta & \beta\times\cos\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix}$$

$$= \begin{pmatrix} h_{11}(t)\times a\times\beta\times\cos\delta\times\cos\theta - h_{22}(t)\times b\times\beta\times\sin\delta\times\sin\theta & -h_{11}(t)\times a\times\beta\times\cos\delta\times\sin\theta - h_{22}(t)\times b\times\beta\times\sin\delta\times\cos\theta \\ h_{11}(t)\times a\times\beta\times\sin\delta\times\cos\theta + h_{22}(t)\times b\times\beta\times\cos\delta\times\sin\theta & -h_{11}(t)\times a\times\beta\times\sin\delta\times\sin\theta + h_{22}(t)\times b\times\beta\times\cos\delta\times\cos\theta \end{pmatrix} \begin{pmatrix} e^{j\varepsilon(t)}s_1(t) \\ e^{j\gamma(t)}s_2(t) \end{pmatrix} + \begin{pmatrix} n_1(t) \\ n_2(t) \end{pmatrix}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1255]

$$h_{11}(t)\times a\times\beta\times\cos\delta\times\cos\theta - h_{22}(t)\times b\times\beta\times\sin\delta\times\sin\theta=0 \tag{1255-1}$$

$$-h_{11}(t)\times a\times\beta\times\sin\delta\times\sin\theta + h_{22}(t)\times b\times\beta\times\cos\delta\times\cos\theta=0 \tag{1255-2}$$

Accordingly, it is sufficient if the following holds true.

[MATH. 1256]

$$b = \frac{h_{11}(t)}{h_{22}(t)}\times a \tag{1256-1}$$

and $$\theta = -\delta + \frac{\pi}{2} + n\pi \text{ radians} \tag{1256-2}$$

($n$ is an integer)

Accordingly, the communications station calculates θ, a, and b from the feedback information from the terminal so that the following is true.

[MATH. 1257]

$$b = \frac{h_{11}(t)}{h_{22}(t)}\times a \tag{1257-1}$$

and $$\theta = -\delta + \frac{\pi}{2} + n\pi \text{ radians} \tag{1257-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1258]

$$|a|^2+|b|^2=|u|^2 \tag{1258}$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (36B-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 1259]

$$\begin{pmatrix} q_{11} & q_{12} \\ q_{21} & q_{22} \end{pmatrix} \tag{1259}$$

Accordingly, weighting synthesizer 306A calculates the following and outputs weighted signal 307A ($z_1(t)$).

[MATH. 1260]

$$z_1(t)=q_{11}\times e^{j\varepsilon(t)}\times s_1(t)+q_{12}\times e^{j\gamma(t)}\times s_2(t) \tag{1260}$$

Weighting synthesizer 306B calculates the following and outputs weighted signal 307B ($z_2(t)$).

[MATH. 1261]

$$z_2(t)=q_{21}\times e^{j\varepsilon(t)}\times s_1(t)+q_{22}\times e^{j\gamma(t)}\times s_2(t) \tag{1261}$$

Precoding method determiner 316 performs the calculations described in "(precoding method (36B)" based on feedback information from a terminal, and determines the precoding matrix.

[MATH. 1262]

$$\begin{pmatrix} q_{11} & q_{12} \\ q_{21} & q_{22} \end{pmatrix} = \begin{pmatrix} a & 0 \\ 0 & b \end{pmatrix} \begin{pmatrix} \beta\times\cos\theta & -\beta\times\sin\theta \\ \beta\times\sin\theta & \beta\times\cos\theta \end{pmatrix} = \begin{pmatrix} a\times\beta\times\cos\theta & -a\times\beta\times\sin\theta \\ b\times\beta\times\sin\theta & b\times\beta\times\cos\theta \end{pmatrix} \tag{1262}$$

In other words, the precoding matrix of the above equation is calculated. Here, based on feedback information from a terminal, precoding method determiner 316 uses

[MATH. 1263]

$$b = \frac{h_{11}(t)}{h_{22}(t)} \times a \tag{1263-1}$$

and $$\theta = -\delta + \frac{\pi}{2} + n\pi \text{ radians} \tag{1263-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (36B-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1264]

$$\begin{pmatrix} q_{11} & q_{12} \\ q_{21} & q_{22} \end{pmatrix} \tag{1264}$$

Accordingly, weighting synthesizer 306A calculates the following and outputs weighted signal 307A ($y_1(t)$).

[MATH. 1265]

$$y_1(t)=q_{11}\times e^{j\varepsilon(t)}\times s_1(t)+q_{12}\times e^{j\gamma(t)}\times s_2(t) \tag{1265}$$

Weighting synthesizer 306B calculates the following and outputs weighted signal 307B ($y_2(t)$).

[MATH. 1266]

$$y_2(t)=q_{21}\times e^{j\varepsilon(t)}\times s_1(t)+q_{22}\times e^{j\gamma(t)}\times s_2(t) \tag{1266}$$

Precoding method determiner 316 performs the calculations described in "(precoding method (36B)" based on feedback information from a terminal, and determines the precoding matrix.

[MATH. 1267]

$$\begin{pmatrix} q_{11} & q_{12} \\ q_{21} & q_{22} \end{pmatrix} = \begin{pmatrix} \beta\times\cos\theta & -\beta\times\sin\theta \\ \beta\times\sin\theta & \beta\times\cos\theta \end{pmatrix} \tag{1267}$$

In other words, the precoding matrix of the above equation and values for a and b are calculated. Here, based on feedback information from a terminal, precoding method determiner 316 uses

[MATH. 1268]

$$b = \frac{h_{11}(t)}{h_{22}(t)} \times a \tag{1268-1}$$

and $$\theta = -\delta + \frac{\pi}{2} + n\pi \text{ radians} \tag{1268-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$).

Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (36B))

Phase changer 1001A illustrated in FIG. 12 and FIG. 13 receives an input of mapped signal $s_1(t)$ output from mapper 304A, applies a phase-change, and outputs phase-changed signal 1002A $((e)^{j\varepsilon(t)}\times s_1(t))$. Phase changer 1001B illustrated in FIG. 12 and FIG. 13 receives an input of mapped signal $s_2(t)$ output from mapper 304B, applies a phase-change, and outputs phase-changed signal 1002B $(e^{j\gamma(t)}\times s_2(t))$.

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1269]

$$\begin{pmatrix} r_1(t) \\ r_2(t) \end{pmatrix} = \begin{pmatrix} h_{11}(t) & h_{12}(t) \\ h_{21}(t) & h_{22}(t) \end{pmatrix} \begin{pmatrix} z_1(t) \\ z_2(t) \end{pmatrix} + \begin{pmatrix} n_1(t) \\ n_2(t) \end{pmatrix} = \left( \sqrt{\frac{K}{K+1}} \begin{pmatrix} h_{11,d}(t) & h_{12,d}(t) \\ h_{21,d}(t) & h_{22,d}(t) \end{pmatrix} + \sqrt{\frac{1}{K+1}} \begin{pmatrix} h_{11,s}(t) & h_{12,s}(t) \\ h_{21,s}(t) & h_{22,s}(t) \end{pmatrix} \right) \begin{pmatrix} z_1(t) \\ z_2(t) \end{pmatrix} + \begin{pmatrix} n_1(t) \\ n_2(t) \end{pmatrix} \quad (1269)$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (36B)" is not satisfied.

(Precoding Method (37A))

In a state such as in FIG. 2, signals $r_1(t)$, $r_2(t)$ that are received by a reception device can be applied as follows (note that δ is greater than or equal to 0 radians and less than 2π radians).

[MATH. 1270]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \quad (1270)$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1271]

$$\begin{pmatrix} z_1(t) \\ z_2(t) \end{pmatrix} = \begin{pmatrix} a & 0 \\ 0 & b \end{pmatrix} \begin{pmatrix} \sin\theta & -\cos\theta \\ \cos\theta & \sin\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} \quad (1271)$$

However, a and b are complex numbers (may be actual numbers). j is an imaginary unit, and y(t) is an argument and a time function.

In this case, the following equation holds true.

[MATH. 1272]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \sin\theta & -\cos\theta \\ \cos\theta & \sin\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\cos\delta\times\sin\theta - h_{22}(t)\times b\times\sin\delta\times\cos\theta & -h_{11}(t)\times a\times\cos\delta\times\cos\theta - h_{22}(t)\times b\times\sin\delta\times\sin\theta \\ h_{11}(t)\times a\times\sin\delta\times\sin\theta + h_{22}(t)\times b\times\cos\delta\times\cos\theta & -h_{11}(t)\times a\times\sin\delta\times\cos\theta + h_{22}(t)\times b\times\cos\delta\times\sin\theta \end{pmatrix} \begin{pmatrix} e^{j\varepsilon(t)}s_1(t) \\ e^{j\gamma(t)}s_2(t) \end{pmatrix} + \begin{pmatrix} n_1(t) \\ n_2(t) \end{pmatrix} \end{aligned} \quad (1272)$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1273]

$$-h_{11}(t)\times a\times\cos\delta\times\cos\theta - h_{22}(t)\times b\times\sin\delta\times\sin\theta = 0 \quad (1273\text{-}1)$$

$$h_{11}(t)\times a\times\sin\delta\times\sin\theta + h_{22}(t)\times b\times\cos\delta\times\cos\theta = 0 \quad (1273\text{-}2)$$

Accordingly, it is sufficient if the following holds true.

[MATH. 1274]

$$b = \frac{h_{11}(t)}{h_{22}(t)} \times a \quad (1274\text{-}1)$$

and $$\theta = \delta + \frac{\pi}{2} + n\pi \text{ radians} \quad (1274\text{-}2)$$

($n$ is an integer)

Accordingly, the communications station calculates θ, a, and b from the feedback information from the terminal so that the following is true.

[MATH. 1275]

$$b = \frac{h_{11}(t)}{h_{22}(t)} \times a \quad (1275\text{-}1)$$

and $$\theta = \delta + \frac{\pi}{2} + n\pi \text{ radians} \quad (1275\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1276]

$$|a|^2+|b|^2=|u|^2 \quad (1276)$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (37A-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$.

Mapped signal 305B output by mapper 304B is $s_2(t)$.

Weighted signal 307A output by weighting synthesizer 306A is $z_1(t)$.

Weighted signal 307B output by weighting synthesizer 306B is $z_2(t)$.

The precoding matrix is expressed as follows.

[MATH. 1277]

$$\begin{pmatrix} q_{11} & q_{12} \\ q_{21} & q_{22} \end{pmatrix} \quad (1277)$$

Accordingly, weighting synthesizer 306A calculates the following and outputs weighted signal 307A ($z_1(t)$).

[MATH. 1278]

$$z_1(t)=q_{11}\times e^{j\varepsilon(t)}\times s_1(t)+q_{12}\times e^{j\gamma(t)}\times s_2(t) \quad (1278)$$

Weighting synthesizer 306B calculates the following and outputs weighted signal 307B ($z_2(t)$).

[MATH. 1279]

$$z_2(t)=q_{21}\times e^{j\varepsilon(t)}\times s_1(t)+q_{22}\times e^{j\gamma(t)}\times s_2(t) \quad (1279)$$

Precoding method determiner 316 performs the calculations described in "(precoding method (37A)" based on feedback information from a terminal, and determines the precoding matrix.

[MATH. 1280)

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \sin\theta & -\cos\theta \\ \cos\theta & \sin\theta \end{pmatrix} = \begin{pmatrix} a\times\sin\theta & -a\times\cos\theta \\ b\times\cos\theta & b\times\sin\theta \end{pmatrix} \quad (1280)$$

In other words, the precoding matrix of the above equation is calculated. Here, based on feedback information from a terminal, precoding method determiner 316 uses

[MATH. 1281]

$$b = \frac{h_{11}(t)}{h_{22}(t)} \times a \quad (1281\text{-}1)$$

and $$\theta = \delta + \frac{\pi}{2} + n\pi \text{ radians} \quad (1281\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (37A-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1282]

$$\begin{pmatrix} q_{11} & q_{12} \\ q_{21} & q_{22} \end{pmatrix} \quad (1282)$$

Accordingly, weighting synthesizer 306A calculates the following and outputs weighted signal 307A ($y_1(t)$).

[MATH. 1283]

$$y_1(t)=q_{11}\times e^{j\varepsilon(t)}\times s_1(t)+q_{12}\times e^{j\gamma(t)}\times s_2(t) \quad (1283)$$

Weighting synthesizer 306B calculates the following and outputs weighted signal 307B ($y_2(t)$).

[MATH. 1284]

$$y_2(t)=q_{21}\times e^{j\varepsilon(t)}\times s_1(t)+q_{22}\times e^{j\gamma(t)}\times s_2(t) \quad (1284)$$

Precoding method determiner 316 performs the calculations described in "(precoding method (37A)" based on feedback information from a terminal, and determines the precoding matrix.

[MATH. 1285]

$$\begin{pmatrix} q_{11} & q_{12} \\ q_{21} & q_{22} \end{pmatrix} = \begin{pmatrix} \sin\theta & -\cos\theta \\ \cos\theta & \sin\theta \end{pmatrix} \quad (1285)$$

In other words, the precoding matrix of the above equation and values for a and b are calculated. Here, based on feedback information from a terminal, precoding method determiner 316 uses

[MATH. 1286]

$$b = \frac{h_{11}(t)}{h_{22}(t)} \times a \quad (1286\text{-}1)$$

and $$\theta = \delta + \frac{\pi}{2} + n\pi \text{ radians} \quad (1286\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (37A))

Phase changer 1001A illustrated in FIG. 12 and FIG. 13 receives an input of mapped signal $s_1(t)$ output from mapper 304A, applies a phase-change, and outputs phase-changed signal 1002A ($(e)^{j\varepsilon(t)}\times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1287]

$$\begin{aligned} \begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \left( \sqrt{\frac{K}{K+1}} \begin{pmatrix} h_{11,d}(t) & h_{12,d}(t) \\ h_{21,d}(t) & h_{22,d}(t) \end{pmatrix} + \sqrt{\frac{1}{K+1}} \begin{pmatrix} h_{11,s}(t) & h_{12,s}(t) \\ h_{21,s}(t) & h_{22,s}(t) \end{pmatrix} \right) \\ &\quad \begin{pmatrix} z_1(t) \\ z_2(t) \end{pmatrix} + \begin{pmatrix} n_1(t) \\ n_2(t) \end{pmatrix} \end{aligned} \quad (1287)$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (37A)" is not satisfied.

(Precoding Method (37B))

In a state such as in FIG. 2, signals $r_1(t)$, $r_2(t)$ that are received by a reception device can be applied as follows (note that δ is greater than or equal to 0 radians and less than 2π radians).

[MATH. 1288]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \end{aligned} \quad (1288)$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1289]

$$\begin{pmatrix} z_1(t) \\ z_2(t) \end{pmatrix} = \begin{pmatrix} a & 0 \\ 0 & b \end{pmatrix} \begin{pmatrix} \sin\theta & -\cos\theta \\ \cos\theta & \sin\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} \tag{1289}$$

However, a and b are complex numbers (may be actual numbers). j is an imaginary unit, and $\gamma(t)$ is an argument and a time function.

In this case, the following relation equation holds true.

[MATH. 1290]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \sin\theta & -\cos\theta \\ \cos\theta & \sin\theta \end{pmatrix} \\ &\quad \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\cos\delta\times\sin\theta - & -h_{11}(t)\times a\times\cos\delta\times\cos\theta - \\ h_{22}(t)\times b\times\sin\delta\times\cos\theta & h_{22}(t)\times b\times\sin\delta\times\sin\theta \\ h_{11}(t)\times a\times\sin\delta\times\sin\theta + & -h_{11}(t)\times a\times\sin\delta\times\cos\theta + \\ h_{22}(t)\times b\times\cos\delta\times\cos\theta & h_{22}(t)\times b\times\cos\delta\times\sin\theta \end{pmatrix} \\ &\quad \begin{pmatrix} e^{j\varepsilon(t)}s_1(t) \\ e^{j\gamma(t)}s_2(t) \end{pmatrix} + \begin{pmatrix} n_1(t) \\ n_2(t) \end{pmatrix} \end{aligned} \tag{1290}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1291]

$$h_{11}(t)\times a\times\cos\delta\times\sin\theta - h_{22}(t)\times b\times\sin\delta\times\cos\theta = 0 \tag{1291-1}$$

$$-h_{11}(t)\times a\times\sin\delta\times\cos\theta + h_{22}(t)\times b\times\cos\delta\times\sin\theta = 0 \tag{1291-2}$$

Accordingly, it is sufficient if the following holds true.

[MATH. 1292]

$$b = \frac{h_{11}(t)}{h_{22}(t)}\times a \tag{1292-1}$$

and $$\theta = \delta + n\pi \text{ radians} \tag{1292-2}$$

($n$ is an integer)

Accordingly, the communications station calculates θ, a, and b from the feedback information from the terminal so that the following is true.

[MATH. 1293]

$$b = \frac{h_{11}(t)}{h_{22}(t)}\times a \tag{1293-1}$$

and $$\theta = \delta + n\pi \text{ radians} \tag{1293-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1294]

$$|a|^2+|b|^2=|u|^2 \tag{1294}$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precolling Method (37B-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 1295]

$$\begin{pmatrix} q_{11} & q_{12} \\ q_{21} & q_{22} \end{pmatrix} \tag{1295}$$

Accordingly, weighting synthesizer 306A calculates the following and outputs weighted signal 307A ($z_1(t)$).

[MATH. 1296]

$$z_1(t)=q_{11}\times e^{j\varepsilon(t)}\times s_1(t)+q_{12}\times e^{j\gamma(t)}\times s_2(t) \tag{1296}$$

Weighting synthesizer 306B calculates the following and outputs weighted signal 307B ($z_2(t)$).

[MATH. 1297]

$$z_2(t)=q_{21}\times e^{j\varepsilon(t)}\times s_1(t)+q_{22}\times e^{j\gamma(t)}\times s_2(t) \tag{1297}$$

Precoding method determiner 316 performs the calculations described in "(precoding method (37B)" based on feedback information from a terminal, and determines the precoding matrix.

[MATH. 1298]

$$\begin{pmatrix} q_{11} & q_{12} \\ q_{21} & q_{22} \end{pmatrix} = \begin{pmatrix} a & 0 \\ 0 & b \end{pmatrix} \begin{pmatrix} \sin\theta & -\cos\theta \\ \cos\theta & \sin\theta \end{pmatrix} = \begin{pmatrix} a\times\sin\theta & -a\times\cos\theta \\ b\times\cos\theta & b\times\sin\theta \end{pmatrix} \quad (1298)$$

In other words, the precoding matrix of the above equation is calculated. Here, based on feedback information from a terminal, precoding method determiner 316 uses

[MATH. 1299]

$$b = \frac{h_{11}(t)}{h_{22}(t)} \times a \quad (1299\text{-}1)$$

and $$\theta = \delta + n\pi \text{ radians} \quad (1299\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (37B-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1300]

$$\begin{pmatrix} q_{11} & q_{12} \\ q_{21} & q_{22} \end{pmatrix} \quad (1300)$$

Accordingly, weighting synthesizer 306A calculates the following and outputs weighted signal 307A ($y_1(t)$).

[MATH. 1301]

$$y_1(t)=q_{11}\times e^{j\varepsilon(t)}\times s_1(t)+q_{12}e^{j\gamma(t)}\times s_2(t) \quad (1301)$$

Weighting synthesizer 306B calculates the following and outputs weighted signal 307B ($y_2(t)$).

[MATH. 1302]

$$y_2(t)=q_{21}\times e^{j\varepsilon(t)}\times s_1(t)+q_{222}\times e^{j\gamma(t)}\times s_2(t) \quad (1302)$$

Precoding method determiner 316 performs the calculations described in "(precoding method (37B)" based on feedback information from a terminal, and determines the precoding matrix.

[MATH. 1303]

$$\begin{pmatrix} q_{11} & q_{12} \\ q_{21} & q_{22} \end{pmatrix} = \begin{pmatrix} \sin\theta & -\cos\theta \\ \cos\theta & \sin\theta \end{pmatrix} \quad (1303)$$

In other words, the precoding matrix of the above equation and values for a and b are calculated. Here, based on feedback information from a terminal, precoding method determiner 316 uses

[MATH. 1304]

$$b = \frac{h_{11}(t)}{h_{22}(t)} \times a \quad (1304\text{-}1)$$

and $$\theta = \delta + n\pi \text{ radians} \quad (1304\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (37B))

Phase changer 1001A illustrated in FIG. 12 and FIG. 13 receives an input of mapped signal $s_1(t)$ output from mapper 304A, applies a phase-change, and outputs phase-changed signal 1002A $((e)^{j\varepsilon(t)}\times s_1(t))$. Phase changer 1001B illustrated in FIG. 12 and FIG. 13 receives an input of mapped signal $s_2(t)$ output from mapper 304B, applies a phase-change, and outputs phase-changed signal 1002B $(e^{j\gamma(t)}\times s_2(t))$.

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1305]

$$\begin{pmatrix} r_1(t) \\ r_2(t) \end{pmatrix} = \begin{pmatrix} h_{11}(t) & h_{12}(t) \\ h_{21}(t) & h_{22}(t) \end{pmatrix} \begin{pmatrix} z_1(t) \\ z_2(t) \end{pmatrix} + \begin{pmatrix} n_1(t) \\ n_2(t) \end{pmatrix} = \left( \sqrt{\frac{K}{K+1}} \begin{pmatrix} h_{11,d}(t) & h_{12,d}(t) \\ h_{21,d}(t) & h_{22,d}(t) \end{pmatrix} + \sqrt{\frac{1}{K+1}} \begin{pmatrix} h_{11,s}(t) & h_{12,s}(t) \\ h_{21,s}(t) & h_{22,s}(t) \end{pmatrix} \right) \begin{pmatrix} z_1(t) \\ z_2(t) \end{pmatrix} + \begin{pmatrix} n_1(t) \\ n_2(t) \end{pmatrix} \quad (1305)$$

Here, $h_{xy,d}(t)$ is a direct wave component of $h_{xy}(t)$, and $h_{xy,s}(t)$ is a scattered wave component of $h_{xy}(t)$. ($x=1, 2$; $y=1, 2$) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (37B)" is not satisfied.

(Precoding Method (38A))

In a state such as in FIG. 2, signals $r_1(t)$, $r_2(t)$ that are received by a reception device can be applied as follows (note that δ is greater than or equal to 0 radians and less than 2π radians).

[MATH. 1306]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \quad (1306)$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1307]

$$\begin{pmatrix} z_1(t) \\ z_2(t) \end{pmatrix} = \begin{pmatrix} a & 0 \\ 0 & b \end{pmatrix} \begin{pmatrix} \beta\times\sin\theta & -\beta\times\cos\theta \\ \beta\times\cos\theta & \beta\times\sin\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} \quad (1307$$

However, a and b are complex numbers (may be actual numbers). j is an imaginary unit, and γ(t) is an argument and a time function.

In this case, the following equation holds true.

[MATH. 1308]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \beta\times\sin\theta & -\beta\times\cos\theta \\ \beta\times\cos\theta & \beta\times\sin\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\beta\times\cos\delta\times\sin\theta - h_{22}(t)\times b\times\beta\times\sin\delta\times\cos\theta & -h_{11}(t)\times a\times\beta\times\cos\delta\times\cos\theta - h_{22}(t)\times b\times\beta\times\sin\delta\times\sin\theta \\ h_{11}(t)\times a\times\beta\times\sin\delta\times\sin\theta + h_{22}(t)\times b\times\beta\times\cos\delta\times\cos\theta & -h_{11}(t)\times a\times\beta\times\sin\delta\times\cos\theta + h_{22}(t)\times b\times\beta\times\cos\delta\times\sin\theta \end{pmatrix} \begin{pmatrix} e^{j\varepsilon(t)}s_1(t) \\ e^{j\gamma(t)}s_2(t) \end{pmatrix} + \begin{pmatrix} n_1(t) \\ n_2(t) \end{pmatrix} \end{aligned} \quad (1308)$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1309]

$$-h_{11}(t)\times a\times\beta\times\cos\delta\times\cos\theta - h_{22}(t)\times b\times\beta\times\sin\delta\times\sin\theta = 0 \quad (1309\text{-}1)$$

$$h_{11}(t)\times a\times\beta\times\sin\delta\times\sin\theta + h_{22}(t)\times b\times\beta\times\cos\delta\times\cos\theta = 0 \quad (1309\text{-}2)$$

Accordingly, it is sufficient if the following holds true.

[MATH. 1310]

$$b = \frac{h_{11}(t)}{h_{22}(t)} \times a \quad (1310\text{-}1)$$

and $$\theta = \delta + \frac{\pi}{2} + n\pi \text{ radians} \quad (1310\text{-}2)$$

($n$ is an integer)

Accordingly, the communications station calculates θ, a, and b from the feedback information from the terminal so that the following is true.

[MATH. 1311]

$$b=\frac{h_{11}(t)}{h_{22}(t)}\times a \quad (1311\text{-}1)$$

and $$\theta=\delta+\frac{\pi}{2}+n\pi \text{ radians} \quad (1311\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1312]

$$|a|^2+|b|^2=|u|^2 \quad (1312)$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (38A-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 1313]

$$\begin{pmatrix} q_{11} & q_{12} \\ q_{21} & q_{22} \end{pmatrix} \quad (1313)$$

Accordingly, weighting synthesizer 306A calculates the following and outputs weighted signal 307A ($z_1(t)$).

[MATH. 1314]

$$z_1(t)=q_{11}\times e^{j\varepsilon(t)}\times s_1(t)+q_{12}\times e^{j\gamma(t)}\times s_2(t) \quad (1314)$$

Weighting synthesizer 306B calculates the following and outputs weighted signal 307B ($z_2(t)$).

[MATH. 1315]

$$z_2(t)=q_{21}\times e^{j\varepsilon(t)}\times s_1(t)+q_{22}\times e^{j\gamma(t)}\times s_2(t) \quad (1315)$$

Precoding method determiner 316 performs the calculations described in "(precoding method (38A)" based on feedback information from a terminal, and determines the precoding matrix.

[MATH. 1316]

$$\begin{pmatrix} q_{11} & q_{12} \\ q_{21} & q_{22} \end{pmatrix}=\begin{pmatrix} a & 0 \\ 0 & b \end{pmatrix}\begin{pmatrix} \beta\times\sin\theta & -\beta\times\cos\theta \\ \beta\times\cos\theta & \beta\times\sin\theta \end{pmatrix}=\begin{pmatrix} a\times\beta\times\sin\theta & -a\times\beta\times\cos\theta \\ b\times\beta\times\cos\theta & b\times\beta\times\sin\theta \end{pmatrix} \quad (1316)$$

In other words, the precoding matrix of the above equation is calculated. Here, based on feedback information from a terminal, precoding method determiner 316 uses

[MATH. 1317]

$$b=\frac{h_{11}(t)}{h_{22}(t)}\times a \quad (1317\text{-}1)$$

and $$\theta=\delta+\frac{\pi}{2}+n\pi \text{ radians} \quad (1317\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (38A-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$.

Mapped signal 305B output by mapper 304B is $s_2(t)$.

Weighted signal 307A output by weighting synthesizer 306A is $y_1(t)$.

Weighted signal 307B output by weighting synthesizer 306B is $y_2(t)$.

Coefficient multiplied signal 402A output by coefficient multiplier 401A is $z_1(t)$.

Coefficient multiplied signal 402B output by coefficient multiplier 401B is $z_2(t)$.

The precoding matrix is expressed as follows.

[MATH. 1318]

$$\begin{pmatrix} q_{11} & q_{12} \\ q_{21} & q_{22} \end{pmatrix} \quad (1318)$$

Accordingly, weighting synthesizer 306A calculates the following and outputs weighted signal 307A ($y_1(t)$).

[MATH. 1319]

$$y_1(t)=q_{11}\times e^{j\varepsilon(t)}\times s_1(t)+q_{12}\times e^{j\gamma(t)}\times s_2(t) \tag{1319}$$

Weighting synthesizer 306B calculates the following and outputs weighted signal 307B ($y_2(t)$).

[MATH. 1320]

$$y_2(t)=q_{21}\times e^{j\varepsilon(t)}\times s_1(t)+q_{22}\times e^{j\gamma(t)}\times s_2(t) \tag{1320}$$

Precoding method determiner 316 performs the calculations described in "(precoding method (38A)" based on feedback information from a terminal, and determines the precoding matrix.

[MATH. 1321]

$$\begin{pmatrix} q_{11} & q_{12} \\ q_{21} & q_{22} \end{pmatrix} = \begin{pmatrix} \beta\times\sin\theta & -\beta\times\cos\theta \\ \beta\times\cos\theta & \beta\times\sin\theta \end{pmatrix} \tag{1321}$$

In other words, the precoding matrix of the above equation and values for a and b are calculated. Here, based on feedback information from a terminal, precoding method determiner 316 uses

[MATH. 1322]

$$b = \frac{h_{11}(t)}{h_{22}(t)}\times a \tag{1322-1}$$

and $$\theta = \delta + \frac{\pi}{2} + n\pi \text{ radians} \tag{1322-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (38A))

Phase changer 1001A illustrated in FIG. 12 and FIG. 13 receives an input of mapped signal $s_1(t)$ output from mapper 304A, applies a phase-change, and outputs phase-changed signal 1002A ($e^{j\varepsilon(t)}\times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1323]

$$\begin{aligned}\begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right) \begin{pmatrix} z_1(t) \\ z_2(t) \end{pmatrix} + \begin{pmatrix} n_1(t) \\ n_2(t) \end{pmatrix}\end{aligned} \tag{1323}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (38A)" is not satisfied.

(Precoding Method (38B))

In a state such as in FIG. 2, signals $r_1(t)$, $r_2(t)$ that are received by a reception device can be applied as follows (note that δ is greater than or equal to 0 radians and less than 2π radians).

[MATH. 1324]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix}\end{aligned} \tag{1324}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1325]

$$\begin{pmatrix} z_1(t) \\ z_2(t) \end{pmatrix} = \begin{pmatrix} a & 0 \\ 0 & b \end{pmatrix} \begin{pmatrix} \beta\times\sin\theta & -\beta\times\cos\theta \\ \beta\times\cos\theta & \beta\times\sin\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} \tag{1325}$$

However, a and b are complex numbers (may be actual numbers). j is an imaginary unit, and γ(t) is an argument and a time function.

In this case, the following relation equation holds true.

[MATH. 1326]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \\ &\quad \begin{pmatrix} \beta\times\sin\theta & -\beta\times\cos\theta \\ \beta\times\cos\theta & \beta\times\sin\theta \end{pmatrix} \begin{pmatrix} e^{j\varepsilon(t)} & 0 \\ 0 & e^{j\gamma(t)} \end{pmatrix} \\ &\quad \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\beta\times\cos\delta\times\sin\theta - & -h_{11}(t)\times a\times\beta\times\cos\delta\times\cos\theta - \\ h_{22}(t)\times b\times\beta\times\sin\delta\times\cos\theta & h_{22}(t)\times b\times\beta\times\sin\delta\times\sin\theta \\ h_{11}(t)\times a\times\beta\times\sin\delta\times\sin\theta + & -h_{11}(t)\times a\times\beta\times\sin\delta\times\cos\theta + \\ h_{22}(t)\times b\times\beta\times\cos\delta\times\cos\theta & h_{22}(t)\times b\times\beta\times\cos\delta\times\sin\theta \end{pmatrix} \\ &\quad \begin{pmatrix} e^{j\varepsilon(t)} & s_1(t) \\ e^{j\gamma(t)} & s_2(t) \end{pmatrix} + \begin{pmatrix} n_1(t) \\ n_2(t) \end{pmatrix} \end{aligned} \tag{1326}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1327]

$$h_{11}(t)\times a\times\beta\times\cos\delta\times\sin\theta-h_{22}(t)\times b\times\beta\times\sin\delta\times\cos\theta=0 \tag{1327-1}$$

$$-h_{11}(t)\times a\times\beta\times\sin\delta\times\cos\theta+h_{22}(t)\times b\times\beta\times\cos\delta\times\sin\theta=0 \tag{1327-2}$$

Accordingly, it is sufficient if the following holds true.

[MATH. 1328]

$$b = \frac{h_{11}(t)}{h_{22}(t)}\times a \tag{1328-1}$$

and $$\theta = \delta + n\pi \text{ radians} \tag{1328-2}$$

($n$ is an integer)

Accordingly, the communications station calculates θ, a, and b from the feedback information from the terminal so that the following is true.

[MATH. 1329]

$$b = \frac{h_{11}(t)}{h_{22}(t)}\times a \tag{1329-1}$$

and $$\theta = \delta + n\pi \text{ radians} \tag{1329-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1330]

$$|a|^2+|b|^2=|u|^2 \tag{1330}$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (38B-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 1331]

$$\begin{pmatrix} q_{11} & q_{12} \\ q_{21} & q_{22} \end{pmatrix} \tag{1331}$$

Accordingly, weighting synthesizer 306A calculates the following and outputs weighted signal 307A ($z_1(t)$).

[MATH. 1332]

$$z_1(t)=q_{11}\times e^{j\varepsilon(t)}\times s_1(t)+q_{12}\times e^{j\gamma(t)}\times s_2(t) \tag{1332}$$

Weighting synthesizer 306B calculates the following and outputs weighted signal 307B ($z_2(t)$).

[MATH. 1333]

$$z_2(t)=q_{21}\times e^{j\varepsilon(t)}\times s_2(t)+q_{22}\times e^{j\gamma(t)}\times s_2(t) \tag{1333}$$

Precoding method determiner 316 performs the calculations described in "(precoding method (38B)" based on feedback information from a terminal, and determines the precoding matrix.

[MATH. 1334]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \beta\times\sin\theta & -\beta\times\cos\theta \\ \beta\times\cos\theta & \beta\times\sin\theta \end{pmatrix} = \begin{pmatrix} a\times\beta\times\sin\theta & -a\times\beta\times\cos\theta \\ b\times\beta\times\cos\theta & b\times\beta\times\sin\theta \end{pmatrix} \tag{1334}$$

In other words, the precoding matrix of the above equation is calculated. Here, based on feedback information from a terminal, precoding method determiner 316 uses

[MATH. 1335]

$$b=\frac{h_{11}(t)}{h_{22}(t)}\times a \text{ and} \tag{1335-1}$$

$$\theta=\delta+n\pi \text{ radians} \tag{1335-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (38B-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1336]

$$\begin{pmatrix} q_{11} & q_{12} \\ q_{21} & q_{22} \end{pmatrix} \tag{1336}$$

Accordingly, weighting synthesizer 306A calculates the following and outputs weighted signal 307A ($y_1(t)$).

[MATH. 1337]

$$y_1(t)=q_{11}\times e^{j\varepsilon(t)}\times s_1(t)+q_{12}\times e^{j\gamma(t)}\times s_2(t) \tag{1337}$$

Weighting synthesizer 306B calculates the following and outputs weighted signal 307B ($y_2(t)$).

[MATH. 1338]

$$y_2(t)=q_{21}\times e^{j\varepsilon(t)}\times s_1(t)+q_{22}\times e^{j\gamma(t)}\times s_2(t) \tag{1338}$$

Precoding method determiner 316 performs the calculations described in "(precoding method (38B)" based on feedback information from a terminal, and determines the precoding matrix.

[MATH. 1339]

$$\begin{pmatrix} q_{11} & q_{12} \\ q_{21} & q_{22} \end{pmatrix} = \begin{pmatrix} \beta\times\sin\theta & -\beta\times\cos\theta \\ \beta\times\cos\theta & \beta\times\sin\theta \end{pmatrix} \tag{1339}$$

In other words, the precoding matrix of the above equation and values for a and b are calculated. Here, based on feedback information from a terminal, precoding method determiner 316 uses

[MATH. 1340]

$$b=\frac{h_{11}(t)}{h_{22}(t)}\times a \text{ and} \tag{1340-1}$$

$$\theta=\delta+n\pi \text{ radians} \tag{1340-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$).

Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (38B))

Phase changer 1001A illustrated in FIG. 12 and FIG. 13 receives an input of mapped signal $s_1(t)$ output from mapper 304A, applies a phase-change, and outputs phase-changed signal 1002A ($e^{j\varepsilon(t)}\times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1341]

$$\begin{pmatrix} r_1(t) \\ r_2(t) \end{pmatrix} = \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} = \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right)\begin{pmatrix} z_1(t) \\ z_2(t) \end{pmatrix} + \begin{pmatrix} n_1(t) \\ n_2(t) \end{pmatrix} \tag{1341}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (38B)" is not satisfied.

(Precoding Method (39A)) In a state such as in FIG. 2, signals $r_1(t)$, $r_2(t)$ that are received by a reception device can be applied as follows (note that δ is greater than or equal to 0 radians and less than 2π radians).

[MATH. 1342]

$$\begin{pmatrix} r_1(t) \\ r_2(t) \end{pmatrix} = \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix} \tag{1342}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1343]

$$\begin{pmatrix} z_1(t) \\ z_2(t) \end{pmatrix} = \begin{pmatrix} a & 0 \\ 0 & b \end{pmatrix}\begin{pmatrix} \sin\theta & \cos\theta \\ \cos\theta & -\sin\theta \end{pmatrix}\begin{pmatrix} e^{j\varepsilon(t)} & 0 \\ 0 & e^{j\gamma(t)} \end{pmatrix}\begin{pmatrix} s_1(t) \\ s_2(t) \end{pmatrix} \tag{1343}$$

However, a and b are complex numbers (may be actual numbers). j is an imaginary unit, and γ(t) is an argument and a time function.

In this case, the following equation holds true.

[MATH. 1344]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} a & 0 \\ 0 & b \end{pmatrix}\begin{pmatrix} \sin\theta & \cos\theta \\ \cos\theta & -\sin\theta \end{pmatrix}\begin{pmatrix} e^{j\varepsilon(t)} & 0 \\ 0 & e^{j\gamma(t)} \end{pmatrix}\begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\cos\delta\times\sin\theta - h_{22}(t)\times b\times\sin\delta\times\cos\theta & h_{11}(t)\times a\times\cos\delta\times\cos\theta + h_{22}(t)\times b\times\sin\delta\times\sin\theta \\ h_{11}(t)\times a\times\sin\delta\times\sin\theta + h_{22}(t)\times b\times\cos\delta\times\cos\theta & h_{11}(t)\times a\times\sin\delta\times\cos\theta - h_{22}(t)\times b\times\cos\delta\times\sin\theta \end{pmatrix}\begin{pmatrix} e^{j\varepsilon(t)}s_1(t) \\ e^{j\gamma(t)}s_2(t) \end{pmatrix} + \begin{pmatrix} n_1(t) \\ n_2(t) \end{pmatrix} \end{aligned} \tag{1344}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1345]

$$h_{11}(t)\times a\times\cos\delta\times\cos\theta + h_{22}(t)\times b\times\sin\delta\times\sin\theta = 0 \tag{1345-1}$$

$$h_{12}(t)\times a\times\sin\delta\times\sin\theta + h_{22}(t)\times b\times\cos\delta\times\cos\theta = 0 \tag{1345-2}$$

Accordingly, it is sufficient if the following holds true.

[MATH. 1346]

$$b = \frac{h_{11}(t)}{h_{22}(t)}\times a \tag{1346-1}$$

and

-continued $$\theta = \delta + \frac{\pi}{2} + n\pi \text{ radians} \tag{1346-2}$$

($n$ is an integer)

Accordingly, the communications station calculates θ, a, and b from the feedback information from the terminal so that the following is true.

[MATH. 1347]

$$b = \frac{h_{11}(t)}{h_{22}(t)} \times a \tag{1347-1}$$

and $$\theta = \delta + \frac{\pi}{2} + n\pi \text{ radians} \tag{1347-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1348]

$$|a|^2+|b|^2=|u|^2 \tag{1348}$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (39A-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 1349]

$$\begin{pmatrix} q_{11} & q_{12} \\ q_{21} & q_{22} \end{pmatrix} \tag{1349}$$

Accordingly, weighting synthesizer 306A calculates the following and outputs weighted signal 307A ($z_1(t)$).

[MATH. 1350]

$$z_1(t)=q_{11}\times e^{j\varepsilon(t)}\times s_1(t)+q_{12}\times e^{j\gamma(t)}\times s_2(t) \tag{1350}$$

Weighting synthesizer 306B calculates the following and outputs weighted signal 307B ($z_2(t)$).

[MATH. 1351]

$$z_2(t)=q_{21}\times e^{j\varepsilon(t)}\times s_1(t)+q_{22}\times e^{j\gamma(t)}\times s_2(t) \tag{1351}$$

Precoding method determiner 316 performs the calculations described in "(precoding method (39A)" based on feedback information from a terminal, and determines the precoding matrix.

[MATH. 1352]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \sin\theta & \cos\theta \\ \cos\theta & -\sin\theta \end{pmatrix} = \begin{pmatrix} a\times\sin\theta & a\times\cos\theta \\ b\times\cos\theta & -b\times\sin\theta \end{pmatrix} \tag{1352}$$

In other words, the precoding matrix of the above equation is calculated. Here, based on feedback information from a terminal, precoding method determiner 316 uses

[MATH. 1353]

$$b = \frac{h_{11}(t)}{h_{22}(t)} \times a \tag{1353-1}$$

and $$\theta = \delta + \frac{\pi}{2} + n\pi \text{ radians} \tag{1353-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (39A-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$.

Mapped signal 305B output by mapper 304B is $s_2(t)$.

Weighted signal 307A output by weighting synthesizer 306A is $y_1(t)$.

Weighted signal 307B output by weighting synthesizer 306B is $y_2(t)$.

Coefficient multiplied signal 402A output by coefficient multiplier 401A is $z_1(t)$.

Coefficient multiplied signal 402B output by coefficient multiplier 401B is $z_2(t)$.

The precoding matrix is expressed as follows.

[MATH. 1354]

$$\begin{pmatrix} q_{11} & q_{12} \\ q_{21} & q_{22} \end{pmatrix} \tag{1354}$$

Accordingly, weighting synthesizer 306A calculates the following and outputs weighted signal 307A ($y_1(t)$).

[MATH. 1355]

$$y_1(t)=q_{11}\times e^{j\varepsilon(t)}\times s_1(t)+q_{12}\times e^{j\gamma(t)}\times s_2(t) \tag{1355}$$

Weighting synthesizer 306B calculates the following and outputs weighted signal 307B ($y_2(t)$).

[MATH. 1356]

$$y_2(t)=q_{21}\times e^{j\varepsilon(t)}\times s_1(t)+q_{22}\times e^{j\gamma(t)}s_2(t) \tag{1356}$$

Precoding method determiner 316 performs the calculations described in "(precoding method (39A)" based on feedback information from a terminal, and determines the precoding matrix.

[MATH. 1357]

$$\begin{pmatrix} q_{11} & q_{12} \\ q_{21} & q_{22} \end{pmatrix} = \begin{pmatrix} \sin\theta & \cos\theta \\ \cos\theta & -\sin\theta \end{pmatrix} \tag{1357}$$

In other words, the precoding matrix of the above equation and values for a and b are calculated. Here, based on feedback information from a terminal, precoding method determiner 316 uses

[MATH. 1358]

$$b = \frac{h_{11}(t)}{h_{22}(t)} \times a \tag{1358-1}$$

and $$\theta = \delta + \frac{\pi}{2} + n\pi \text{ radians} \tag{1358-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (39A))

Phase changer 1001A illustrated in FIG. 12 and FIG. 13 receives an input of mapped signal $s_1(t)$ output from mapper 304A, applies a phase-change, and outputs phase-changed signal 1002A ($e^{j\varepsilon(t)}\times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1359]

$$\begin{aligned} \begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \right. \\ &\left. \sqrt{\frac{1}{K+1}}\begin{pmatrix} h_{11,s}(t) & h_{12,s}(t) \\ h_{21,s}(t) & h_{22,s}(t) \end{pmatrix}\right) \\ &\begin{pmatrix} z_1(t) \\ z_2(t) \end{pmatrix} + \begin{pmatrix} n_1(t) \\ n_2(t) \end{pmatrix} \end{aligned} \tag{1359}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (39A)" is not satisfied.

(Precoding Method (39B))

In a state such as in FIG. 2, signals $r_1(t)$, $r_2(t)$ that are received by a reception device can be applied as follows (note that δ is greater than or equal to 0 radians and less than 2π radians).

[MATH. 1360]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \quad (1360)$$

Here, when $z_1(t)=s_1(t)$ and $z_2(t)=s_2(t)$ ($s_1(t)$ and $s_2(t)$ are mapped baseband signals), excluding when $\delta=0$, $\pi/2$, $\pi$, or $3\pi/2$ radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1361]

$$\begin{pmatrix} z_1(t) \\ z_2(t) \end{pmatrix} = \begin{pmatrix} a & 0 \\ 0 & b \end{pmatrix} \begin{pmatrix} \sin\theta & \cos\theta \\ \cos\theta & -\sin\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} \quad (1361)$$

However, a and b are complex numbers (may be actual numbers). j is an imaginary unit, and $\gamma(t)$ is an argument and a time function.

In this case, the following relation equation holds true.

[MATH. 1362]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \sin\theta & \cos\theta \\ \cos\theta & -\sin\theta \end{pmatrix} \\ &\quad \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\cos\delta\times\sin\theta - h_{22}(t)\times b\times\sin\delta\times\cos\theta & h_{11}(t)\times a\times\cos\delta\times\cos\theta + h_{22}(t)\times b\times\sin\delta\times\sin\theta \\ h_{11}(t)\times a\times\sin\delta\times\sin\theta + h_{22}(t)\times b\times\cos\delta\times\cos\theta & h_{11}(t)\times a\times\sin\delta\times\cos\theta - h_{22}(t)\times b\times\cos\delta\times\sin\theta \end{pmatrix} \\ &\quad \begin{pmatrix} e^{j\varepsilon(t)}s_1(t) \\ e^{j\gamma(t)}s_2(t) \end{pmatrix} + \begin{pmatrix} n_1(t) \\ n_2(t) \end{pmatrix} \end{aligned} \quad (1362)$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1363]

$$h_{11}(t)\times a\times\cos\delta\times\sin\theta - h_{22}(t)\times b\times\sin\delta\times\cos\theta = 0 \quad (1363\text{-}1)$$

$$h_{11}(t)\times a\times\sin\delta\times\cos\theta - h_{22}(t)\times b\times\cos\delta\times\sin\theta = 0 \quad (1363\text{-}2)$$

Accordingly, it is sufficient if the following holds true.

[MATH. 1364]

$$b = \frac{h_{11}(t)}{h_{22}(t)} \times a \quad (1364\text{-}1)$$

and $$\theta = \delta + n\pi \text{ radians} \quad (1364\text{-}2)$$

($n$ is an integer)

Accordingly, the communications station calculates θ, a, and b from the feedback information from the terminal so that the following is true.

[MATH. 1365]

$$b = \frac{h_{11}(t)}{h_{22}(t)} \times a \quad (1365\text{-}1)$$

and $$\theta = \delta + n\pi \text{ radians} \quad (1365\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1366]

$$|a|^2+|b|^2=|u|^2 \quad (1366)$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (39B-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$.

Mapped signal 305B output by mapper 304B is $s_2(t)$.

Weighted signal 307A output by weighting synthesizer 306A is $z_1(t)$.

Weighted signal 307B output by weighting synthesizer 306B is $z_2(t)$.

The precoding matrix is expressed as follows.

[MATH. 1367]

$$\begin{pmatrix} q_{11} & q_{12} \\ q_{21} & q_{22} \end{pmatrix} \quad (1367)$$

Accordingly, weighting synthesizer 306A calculates the following and outputs weighted signal 307A ($z_1(t)$).

[MATH. 1368]

$$z_1(t)=q_{11}\times e^{j\varepsilon(t)}\times s_1(t)+q_{12}\times e^{j\gamma(t)}\times s_2(t) \tag{1368}$$

Weighting synthesizer 306B calculates the following and outputs weighted signal 307B ($z_2(t)$).

[MATH. 1369]

$$z_2(t)=q_{21}\times e^{j\varepsilon(t)}\times s_1(t)+q_{22}\times e^{j\gamma(t)}\times s_2(t) \tag{1369}$$

Precoding method determiner 316 performs the calculations described in "(precoding method (39B)" based on feedback information from a terminal, and determines the precoding matrix.

[MATH. 1370]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \sin\theta & \cos\theta \\ \cos\theta & -\sin\theta \end{pmatrix} = \begin{pmatrix} a\times\sin\theta & a\times\cos\theta \\ b\times\cos\theta & -b\times\sin\theta \end{pmatrix} \tag{1370}$$

In other words, the precoding matrix of the above equation is calculated.

Here, based on feedback information from a terminal, precoding method determiner 316 uses

[MATH. 1371]

$$b = \frac{h_{11}(t)}{h_{22}(t)}\times a \tag{1371-1}$$

and $$\theta = \delta + n\pi \text{ radians} \tag{1371-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (39B-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$.

Mapped signal 305B output by mapper 304B is $s_2(t)$.

Weighted signal 307A output by weighting synthesizer 306A is $y_1(t)$.

Weighted signal 307B output by weighting synthesizer 306B is $y_2(t)$.

Coefficient multiplied signal 402A output by coefficient multiplier 401A is $z_1(t)$.

Coefficient multiplied signal 402B output by coefficient multiplier 401B is $z_2(t)$.

The precoding matrix is expressed as follows.

[MATH. 1372]

$$\begin{pmatrix} q_{11} & q_{12} \\ q_{21} & q_{22} \end{pmatrix} \tag{1372}$$

Accordingly, weighting synthesizer 306A calculates the following and outputs weighted signal 307A ($y_1(t)$).

[MATH. 1373]

$$y_1(t)=q_{11}\times e^{j\varepsilon(t)}\times s_1(t)+q_{12}\times e^{j\gamma(t)}\times s_2(t) \tag{1373}$$

Weighting synthesizer 306B calculates the following and outputs weighted signal 307B ($y_2(t)$).

[MATH. 1374]

$$y_2(t)=q_{21}\times e^{j\varepsilon(t)}\times s_1(t)+q_{22}\times e^{j\gamma(t)}\times s_2(t) \tag{1374}$$

Precoding method determiner 316 performs the calculations described in "(precoding method (39B)" based on feedback information from a terminal, and determines the precoding matrix.

[MATH. 1375]

$$\begin{pmatrix} q_{11} & q_{12} \\ q_{21} & q_{22} \end{pmatrix} = \begin{pmatrix} \sin\theta & \cos\theta \\ \cos\theta & -\sin\theta \end{pmatrix} \tag{1375}$$

In other words, the precoding matrix of the above equation and values for a and b are calculated. Here, based on feedback information from a terminal, precoding method determiner 316 uses

[MATH. 1376]

$$b = \frac{h_{11}(t)}{h_{22}(t)}\times a \tag{1376-1}$$

and $$\theta = \delta + n\pi \text{ radians} \tag{1376-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (39B))

Phase changer 1001A illustrated in FIG. 12 and FIG. 13 receives an input of mapped signal $s_1(t)$ output from mapper 304A, applies a phase-change, and outputs phase-changed signal 1002A ($e^{j\varepsilon(t)}\times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1377]

$$\begin{pmatrix} r_1(t) \\ r_2(t) \end{pmatrix} = \begin{pmatrix} h_{11}(t) & h_{12}(t) \\ h_{21}(t) & h_{22}(t) \end{pmatrix} \begin{pmatrix} z_1(t) \\ z_2(t) \end{pmatrix} + \begin{pmatrix} n_1(t) \\ n_2(t) \end{pmatrix} = \left( \sqrt{\frac{K}{K+1}} \begin{pmatrix} h_{11,d}(t) & h_{12,d}(t) \\ h_{21,d}(t) & h_{22,d}(t) \end{pmatrix} + \sqrt{\frac{1}{K+1}} \begin{pmatrix} h_{11,s}(t) & h_{12,s}(t) \\ h_{21,s}(t) & h_{22,s}(t) \end{pmatrix} \right) \begin{pmatrix} z_1(t) \\ z_2(t) \end{pmatrix} + \begin{pmatrix} n_1(t) \\ n_2(t) \end{pmatrix} \tag{1377}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (39B)" is not satisfied.

(Precoding Method (40A))

In a state such as in FIG. 2, signals $r_1(t)$, $r_2(t)$ that are received by a reception device can be applied as follows (note that δ is greater than or equal to 0 radians and less than 2π radians).

[MATH. 1378]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \tag{1378}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1379]

$$\begin{pmatrix} z_1(t) \\ z_2(t) \end{pmatrix} = \begin{pmatrix} a & 0 \\ 0 & b \end{pmatrix} \begin{pmatrix} \beta\times\sin\theta & \beta\times\cos\theta \\ \beta\times\cos\theta & -\beta\times\sin\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} \tag{1379}$$

However, a and b are complex numbers (may be actual numbers). j is an imaginary unit, and γ(t) is an argument and a time function.

In this case, the following equation holds true.

[MATH. 1380]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \beta\times\sin\theta & \beta\times\cos\theta \\ \beta\times\cos\theta & -\beta\times\sin\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\beta\times\cos\delta\times\sin\theta - h_{22}(t)\times b\times\beta\times\sin\delta\times\cos\theta & h_{11}(t)\times a\times\beta\times\cos\delta\times\cos\theta + h_{22}(t)\times b\times\beta\times\sin\delta\times\sin\theta \\ h_{11}(t)\times a\times\beta\times\sin\delta\times\sin\theta + h_{22}(t)\times b\times\beta\times\cos\delta\times\cos\theta & h_{11}(t)\times a\times\beta\times\sin\delta\times\cos\theta - h_{22}(t)\times b\times\beta\times\cos\delta\times\sin\theta \end{pmatrix} \begin{pmatrix} e^{j\varepsilon(t)} & s_1(t) \\ e^{j\gamma(t)} & s_2(t) \end{pmatrix} + \begin{pmatrix} n_1(t) \\ n_2(t) \end{pmatrix} \end{aligned} \tag{1380}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1381]

$$h_{11}(t)\times a\times\beta\times\cos\delta\times\cos\theta+h_{22}(t)\times b\times\beta\times\sin\delta\times\sin\theta=0 \quad (1381\text{-}1)$$

$$h_{11}(t)\times a\times\beta\times\sin\delta\times\sin\theta+h_{22}(t)\times b\times\beta\times\cos\delta\times\cos\theta=0 \quad (1381\text{-}2)$$

Accordingly, it is sufficient if the following holds true.

[MATH. 1382]

$$b=\frac{h_{11}(t)}{h_{22}(t)}\times a \quad (1382\text{-}1)$$

and $$\theta=\delta+\frac{\pi}{2}+n\pi \text{ radians} \quad (1382\text{-}2)$$

($n$ is an integer)

Accordingly, the communications station calculates θ, a, and b from the feedback information from the terminal so that the following is true.

[MATH. 1383]

$$b=\frac{h_{11}(t)}{h_{22}(t)}\times a \quad (1383\text{-}1)$$

and $$\theta=\delta+\frac{\pi}{2}+n\pi \text{ radians} \quad (1383\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1384]

$$|a|^2+|b|^2=|u|^2 \quad (1078)$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precolling Method (40A-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 1385]

$$\begin{pmatrix} q_{11} & q_{12} \\ q_{21} & q_{22} \end{pmatrix} \quad (1385)$$

Accordingly, weighting synthesizer 306A calculates the following and outputs weighted signal 307A ($z_1(t)$).

[MATH. 1386]

$$z_1(t)=q_{11}\times e^{j\varepsilon(t)}\times s_1(t)+q_{12}\times e^{j\gamma(t)}\times s_2(t) \quad (1386)$$

Weighting synthesizer 306B calculates the following and outputs weighted signal 307B ($z_2(t)$).

[MATH. 1387]

$$z_2(t)=q_{21}\times e^{j\varepsilon(t)}\times s_1(t)+q_{22}\times e^{j\gamma(t)}\times s_2(t) \quad (1387)$$

Precoding method determiner 316 performs the calculations described in "(precoding method (40A)" based on feedback information from a terminal, and determines the precoding matrix.

[MATH. 1388]

$$\begin{pmatrix} q_{11} & q_{12} \\ q_{21} & q_{22} \end{pmatrix}=\begin{pmatrix} a & 0 \\ 0 & b \end{pmatrix}\begin{pmatrix} \beta\times\sin\theta & \beta\times\cos\theta \\ \beta\times\cos\theta & -\beta\times\sin\theta \end{pmatrix}=\begin{pmatrix} a\times\beta\times\sin\theta & a\times\beta\times\cos\theta \\ b\times\beta\times\cos\theta & b\times\beta\times\sin\theta \end{pmatrix} \quad (1388)$$

In other words, the precoding matrix of the above equation is calculated. Here, based on feedback information from a terminal, precoding method determiner 316 uses

[MATH. 1389]

$$b=\frac{h_{11}(t)}{h_{22}(t)}\times a \quad (1389\text{-}1)$$

and $$\theta=\delta+\frac{\pi}{2}+n\pi \text{ radians} \quad (1389\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (40A-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1390]

$$\begin{pmatrix} q_{11} & q_{12} \\ q_{21} & q_{22} \end{pmatrix} \tag{1390}$$

Accordingly, weighting synthesizer 306A calculates the following and outputs weighted signal 307A ($y_1(t)$).

[MATH. 1391]

$$y_1(t)=q_{11}\times e^{j\varepsilon(t)}\times s_1(t)+q_{12}\times e^{j\gamma(t)}\times s_2(t) \tag{1391}$$

Weighting synthesizer 306B calculates the following and outputs weighted signal 307B ($y_2(t)$).

[MATH. 1392]

$$y_2(t)=q_{21}\times e^{j\varepsilon(t)}\times s_1(t)+q_{22}\times e^{j\gamma(t)}\times s_1(t) \tag{1392}$$

Precoding method determiner 316 performs the calculations described in "(precoding method (40A)" based on feedback information from a terminal, and determines the precoding matrix.

[MATH. 1393]

$$\begin{pmatrix} q_{11} & q_{12} \\ q_{21} & q_{22} \end{pmatrix} = \begin{pmatrix} \beta\times\sin\theta & \beta\times\cos\theta \\ \beta\times\cos\theta & -\beta\times\sin\theta \end{pmatrix} \tag{1393}$$

In other words, the precoding matrix of the above equation and values for a and b are calculated. Here, based on feedback information from a terminal, precoding method determiner 316 uses

[MATH. 1394]

$$b=\frac{h_{11}(t)}{h_{22}(t)}\times a \tag{1394-1}$$

and $$\theta=\delta+\frac{\pi}{2}+n\pi \text{ radians} \tag{1394-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (40A))

Phase changer 1001A illustrated in FIG. 12 and FIG. 13 receives an input of mapped signal $s_1(t)$ output from mapper 304A, applies a phase-change, and outputs phase-changed signal 1002A ($e^{j\varepsilon(t)}\times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1395]

$$\begin{aligned}\begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix}+\begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix}+\sqrt{\frac{1}{K+1}}\begin{pmatrix} h_{11,s}(t) & h_{12,s}(t) \\ h_{21,s}(t) & h_{22,s}(t) \end{pmatrix}\right) \\ &\quad \begin{pmatrix} z_1(t) \\ z_2(t) \end{pmatrix}+\begin{pmatrix} n_1(t) \\ n_2(t) \end{pmatrix}\end{aligned} \tag{1395}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (40A)" is not satisfied.

(Precoding Method (40B))

In a state such as in FIG. 2, signals $r_1(t)$, $r_2(t)$ that are received by a reception device can be applied as follows (note that δ is greater than or equal to 0 radians and less than 2π radians).

[MATH. 1396]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \quad (1396)$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1397]

$$\begin{pmatrix} z_1(t) \\ z_2(t) \end{pmatrix} = \begin{pmatrix} a & 0 \\ 0 & b \end{pmatrix} \begin{pmatrix} \beta\times\sin\theta & \beta\times\cos\theta \\ \beta\times\cos\theta & -\beta\times\sin\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} \quad (1397)$$

However, a and b are complex numbers (may be actual numbers). j is an imaginary unit, and γ(t) is an argument and a time function.

In this case, the following relation equation holds true.

[MATH. 1398]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \\ &\quad \begin{pmatrix} \beta\times\sin\theta & \beta\times\cos\theta \\ \beta\times\cos\theta & -\beta\times\sin\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} \begin{pmatrix} n_1(t) \\ n_2(t) \end{pmatrix} \\ &= \begin{pmatrix} h_{11}(t)\times a\times\beta\times\cos\delta\times\sin\theta - h_{22}(t)\times b\times\beta\times\sin\delta\times\cos\theta & h_{11}(t)\times a\times\beta\times\cos\delta\times\cos\theta + h_{22}(t)\times b\times\beta\times\sin\delta\times\sin\theta \\ h_{11}(t)\times a\times\beta\times\sin\delta\times\sin\theta + h_{22}(t)\times b\times\beta\times\cos\delta\times\cos\theta & h_{11}(t)\times a\times\beta\times\sin\delta\times\cos\theta - h_{22}(t)\times b\times\beta\times\cos\delta\times\sin\theta \end{pmatrix} \\ &\quad \begin{pmatrix} e^{j\varepsilon(t)}s_1(t) \\ e^{j\gamma(t)}s_2(t) \end{pmatrix} + \begin{pmatrix} n_1(t) \\ n_2(t) \end{pmatrix} \end{aligned} \quad (1398)$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1399]

$$h_{11}(t)\times a\times\beta\times\cos\,\delta\times\sin\,\theta - h_{22}(t)\times b\times\beta\times\sin\,\delta\times\cos\,\theta = 0 \quad (1399\text{-}1)$$

$$h_{11}(t)\times a\times\beta\times\sin\,\delta\times\cos\,\theta - h_{22}(t)\times b\times\beta\times\cos\,\delta\times\sin\,\theta = 0 \quad (1399\text{-}2)$$

Accordingly, it is sufficient if the following holds true.

[MATH. 1400]

$$b = \frac{h_{11}(t)}{h_{22}(t)}\times a \quad (1400\text{-}1)$$

and $$\theta = \delta + n\pi \text{ radians} \quad (1400\text{-}2)$$

(*n* is an integer)

Accordingly, the communications station calculates θ, a, and b from the feedback information from the terminal so that the following is true.

[MATH. 1401]

$$b = \frac{h_{11}(t)}{h_{22}(t)}\times a \quad (1401\text{-}1)$$

and $$\theta = \delta + n\pi \text{ radians} \quad (1401\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1402]

$$|a|^2+|b|^2=|u|^2 \quad (1402)$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (40B-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$. Mapped signal 305B output by mapper 304B is $s_2(t)$.

Weighted signal 307A output by weighting synthesizer 306A is $z_1(t)$. Weighted signal 307B output by weighting synthesizer 306B is $z_2(t)$.

The precoding matrix is expressed as follows.

[MATH. 1403]

$$\begin{pmatrix} q_{11} & q_{12} \\ q_{21} & q_{22} \end{pmatrix} \tag{1403}$$

Accordingly, weighting synthesizer 306A calculates the following and outputs weighted signal 307A ($z_1(t)$).

[MATH. 1404]

$$z_1(t)=q_{11}\times e^{j\varepsilon(t)}\times s_1(t)+q_{12}\times e^{j\gamma(t)}\times s_2(t) \tag{1404}$$

Weighting synthesizer 306B calculates the following and outputs weighted signal 307B ($z_2(t)$).

[MATH. 1405]

$$z_2(t)=q_{21}\times e^{j\varepsilon(t)}\times s_1(t)+q_{22}\times e^{j\gamma(t)}\times s_2(t) \tag{1405}$$

Precoding method determiner 316 performs the calculations described in "(precoding method (40B)" based on feedback information from a terminal, and determines the precoding matrix.

[MATH. 1405]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \beta\times\sin\theta & \beta\times\cos\theta \\ \beta\times\cos\theta & -\beta\times\sin\theta \end{pmatrix} = \begin{pmatrix} a\times\beta\times\sin\theta & a\times\beta\times\cos\theta \\ b\times\beta\times\cos\theta & -b\times\beta\times\sin\theta \end{pmatrix} \tag{1406}$$

In other words, the precoding matrix of the above equation is calculated. Here, based on feedback information from a terminal, precoding method determiner 316 uses

[MATH. 1407]

$$b = \frac{h_{11}(t)}{h_{22}(t)} \times a \tag{1407-1}$$

and $$\theta = \delta + n\pi \text{ radians} \tag{1407-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (40B-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1408]

$$\begin{pmatrix} q_{11} & q_{12} \\ q_{21} & q_{22} \end{pmatrix} \tag{1408}$$

Accordingly, weighting synthesizer 306A calculates the following and outputs weighted signal 307A ($y_1(t)$).

[MATH. 1409]

$$y_1(t)=q_{11}\times e^{j\varepsilon(t)}\times s_1(t)+q_{12}\times e^{j\gamma(t)}\times s_2(t) \tag{1409}$$

Weighting synthesizer 306B calculates the following and outputs weighted signal 307B ($y_2(t)$).

[MATH. 1410]

$$y_2(t)=q_{21}\times e^{j\varepsilon(t)}\times s_1(t)+q_{22}\times e^{j\gamma(t)}\times s_2(t) \tag{1410}$$

Precoding method determiner 316 performs the calculations described in "(precoding method (40B)" based on feedback information from a terminal, and determines the precoding matrix.

[MATH. 1411]

$$\begin{pmatrix} q_{11} & q_{12} \\ q_{21} & q_{22} \end{pmatrix} = \begin{pmatrix} \beta\times\sin\theta & \beta\times\cos\theta \\ \beta\times\cos\theta & -\beta\times\sin\theta \end{pmatrix} \tag{1411}$$

In other words, the precoding matrix of the above equation and values for a and b are calculated. Here, based on feedback information from a terminal, precoding method determiner 316 uses

[MATH. 1412]

$$b = \frac{h_{11}(t)}{h_{22}(t)} \times a \tag{1412-1}$$

and $$\theta = \delta + n\pi \text{ radians} \tag{1412-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback.

The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (40B))

Phase changer 1001A illustrated in FIG. 12 and FIG. 13 receives an input of mapped signal $s_1(t)$ output from mapper 304A, applies a phase-change, and outputs phase-changed signal 1002A ($e^{j\varepsilon(t)}\times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1413]

$$\begin{pmatrix} r_1(t) \\ r_2(t) \end{pmatrix} = \begin{pmatrix} h_{11}(t) & h_{12}(t) \\ h_{21}(t) & h_{22}(t) \end{pmatrix} \begin{pmatrix} z_1(t) \\ z_2(t) \end{pmatrix} + \begin{pmatrix} n_1(t) \\ n_2(t) \end{pmatrix} = \left( \sqrt{\frac{K}{K+1}} \begin{pmatrix} h_{11,d}(t) & h_{12,d}(t) \\ h_{21,d}(t) & h_{22,d}(t) \end{pmatrix} + \sqrt{\frac{1}{K+1}} \begin{pmatrix} h_{11,s}(t) & h_{12,s}(t) \\ h_{21,s}(t) & h_{22,s}(t) \end{pmatrix} \right) \begin{pmatrix} z_1(t) \\ z_2(t) \end{pmatrix} + \begin{pmatrix} n_1(t) \\ n_2(t) \end{pmatrix} \tag{1413}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (40B)" is not satisfied.

(Precoding Method (41A))

In a state such as in FIG. 2, signals $r_1(t)$, $r_2(t)$ that are received by a reception device can be applied as follows (note that δ is greater than or equal to 0 radians and less than 2π radians).

[MATH. 1414]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \tag{1414}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1415]

$$\begin{pmatrix} z_1(t) \\ z_2(t) \end{pmatrix} = \begin{pmatrix} a & 0 \\ 0 & b \end{pmatrix} \begin{pmatrix} e^{j\mu}\times\cos\theta & e^{j(\mu+\lambda)}\times\sin\theta \\ e^{j\omega}\times\sin\theta & -e^{j(\omega+\lambda)}\times\cos\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} \tag{1415}$$

However, a and b are complex numbers (may be actual numbers). j is an imaginary unit, and γ(t) is an argument and a time function.

In this case, the following equation holds true.

[MATH. 1416]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \tag{1416}$$

-continued $$= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} z_1(t) \\ z_2(t) \end{pmatrix} + \begin{pmatrix} n_1(t) \\ n_2(t) \end{pmatrix}$$

$$= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} a & 0 \\ 0 & b \end{pmatrix}$$

$$\begin{pmatrix} e^{j\mu}\times\cos\theta & e^{j(\mu+\lambda)}\times\sin\theta \\ e^{j\omega}\times\sin\theta & -e^{j(\omega+\lambda)}\times\cos\theta \end{pmatrix}\begin{pmatrix} e^{j\varepsilon(t)} & 0 \\ 0 & e^{j\gamma(t)} \end{pmatrix}\begin{pmatrix} s_1(t) \\ s_2(t) \end{pmatrix} + \begin{pmatrix} n_1(t) \\ n_2(t) \end{pmatrix}$$

$$= \begin{pmatrix} h_{11}(t)\times a\times e^{j\mu}\times\cos\delta\times\cos\theta - & h_{11}(t)\times a\times e^{j(\mu+\lambda)}\times\cos\delta\times\sin\theta + \\ h_{22}(t)\times b\times e^{j\omega}\times\sin\delta\times\sin\theta & h_{22}(t)\times b\times e^{j(\omega+\lambda)}\times\sin\delta\times\cos\theta \\ h_{11}(t)\times a\times e^{j\mu}\times\sin\delta\times\cos\theta + & h_{11}(t)\times a\times e^{j(\mu+\lambda)}\times\sin\delta\times\sin\theta - \\ h_{22}(t)\times b\times e^{j\omega}\times\cos\delta\times\sin\theta & h_{22}(t)\times b\times e^{j(\omega+\lambda)}\times\cos\delta\times\cos\theta \end{pmatrix}$$

$$\begin{pmatrix} e^{j\varepsilon(t)} & s_1(t) \\ e^{j\gamma(t)} & s_2(t) \end{pmatrix} + \begin{pmatrix} n_1(t) \\ n_2(t) \end{pmatrix}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1417]

$$h_{11}(t)\times a\times e^{j(\mu+\lambda)}\times\cos\delta\times\sin\theta + h_{22}(t)\times b\times e^{j(\omega+\lambda)}\times\sin\delta\times\cos\theta = 0 \quad (1417\text{-}1)$$

$$h_{11}(t)\times a\times e^{j(\mu)}\times\sin\delta\times\cos\theta + h_{22}(t)\times b\times e^{j\omega}\times\cos\delta\times\sin\theta = 0 \quad (1417\text{-}2)$$

Accordingly, it is sufficient if the following holds true.

[MATH. 1418]

$$b = \frac{h_{11}(t)}{h_{22}(t)}\times a\times e^{j(\mu-\omega)} \quad (1418\text{-}1)$$

and $$\theta = -\delta + n\pi \text{ radians} \quad (1418\text{-}2)$$

($n$ is an integer)

Accordingly, the communications station calculates θ, a, and b from the feedback information from the terminal so that the following is true.

[MATH. 1419]

$$b = \frac{h_{11}(t)}{h_{22}(t)}\times a\times e^{j(\mu-\omega)} \quad (1419\text{-}1)$$

and $$\theta = -\delta + n\pi \text{ radians} \quad (1419\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1420]

$$|a|^2+|b|^2=|u|^2 \quad (1420)$$

($|u|^2$ is a parameter based on average transmitted power)

Note that, regarding mapped baseband signal $s_1(t)$ and mapped baseband signal $s_2(t)$, phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (41A-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 1421]

$$\begin{pmatrix} q_{11} & q_{12} \\ q_{21} & q_{22} \end{pmatrix} \quad (1421)$$

Accordingly, weighting synthesizer 306A calculates the following and outputs weighted signal 307A ($z_1(t)$).

[MATH. 1422]

$$z_1(t)=q_{11}\times e^{j\varepsilon(t)}\times s_1(t)+q_{12}\times e^{j\gamma(t)}\times s_2(t) \quad (1422)$$

Weighting synthesizer 306B calculates the following and outputs weighted signal 307B ($z_2(t)$).

[MATH. 1423]

$$z_2(t)=q_{21}\times e^{j\varepsilon(t)}\times s_1(t)+q_{22}\times e^{j\gamma(t)}\times s_2(t) \quad (1423)$$

Precoding method determiner 316 performs the calculations described in "(precoding method (41A)" based on feedback information from a terminal, and determines the precoding matrix.

[MATH. 1424]

$$\begin{pmatrix} q_{11} & q_{12} \\ q_{21} & q_{22} \end{pmatrix} = \begin{pmatrix} a & 0 \\ 0 & b \end{pmatrix} \begin{pmatrix} e^{j\mu} \times \cos\theta & e^{j(\mu+\lambda)} \times \sin\theta \\ e^{j\omega} \times \sin\theta & -e^{j(\omega+\lambda)} \times \cos\theta \end{pmatrix} = \begin{pmatrix} a \times e^{j\mu} \times \cos\theta & a \times e^{j(\mu+\lambda)} \times \sin\theta \\ b \times e^{j\omega} \times \sin\theta & -b \times e^{j(\omega+\lambda)} \times \cos\theta \end{pmatrix} \quad (1424)$$

In other words, the precoding matrix of the above equation is calculated. Here, based on feedback information from a terminal, precoding method determiner 316 uses

[MATH. 1425]

$$b = \frac{h_{11}(t)}{h_{22}(t)} \times a \times e^{j(\mu-\omega)} \quad (1425\text{-}1)$$

and $$\theta = -\delta + n\pi \text{ radians} \quad (1425\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (41A-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1426]

$$\begin{pmatrix} q_{11} & q_{12} \\ q_{21} & q_{22} \end{pmatrix} \quad (1426)$$

Accordingly, weighting synthesizer 306A calculates the following and outputs weighted signal 307A ($y_1(t)$).

[MATH. 1427]

$$y_1(t) = q_{11} \times e^{j\varepsilon(t)} \times s_1(t) + q_{12} \times e^{j\gamma(t)} \times s_2(t) \quad (1427)$$

Weighting synthesizer 306B calculates the following and outputs weighted signal 307B ($y_2(t)$).

[MATH. 1428]

$$y_2(t) = q_{21} \times e^{j\varepsilon(t)} \times s_1(t) + q_{22} \times e^{j\gamma(t)} \times s_2(t) \quad (1428)$$

Precoding method determiner 316 performs the calculations described in "(precoding method (41A)" based on feedback information from a terminal, and determines the precoding matrix.

[MATH. 1429]

$$\begin{pmatrix} q_{11} & q_{12} \\ q_{21} & q_{22} \end{pmatrix} = \begin{pmatrix} e^{j\mu} \times \cos\theta & e^{j(\mu+\lambda)} \times \sin\theta \\ e^{j\omega} \times \sin\theta & -e^{j(\omega+\lambda)} \times \cos\theta \end{pmatrix} \quad (1429)$$

In other words, the precoding matrix of the above equation and values for a and b are calculated. Here, based on feedback information from a terminal, precoding method determiner 316 uses

[MATH. 1430]

$$b = \frac{h_{11}(t)}{h_{22}(t)} \times a \times e^{j(\mu-\omega)} \quad (1430\text{-}1)$$

and $$\theta = -\delta + n\pi \text{ radians} \quad (1430\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$).

Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a \times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b \times y_2(t)$, and outputs coefficient multiplied signal 402B ($z_2(t)$).

(Phase Changing in Precoding Method (41A))

Phase changer 1001A illustrated in FIG. 12 and FIG. 13 receives an input of mapped signal $s_1(t)$ output from mapper 304A, applies a phase-change, and outputs phase-changed signal 1002A ($e^{j\varepsilon(t)} \times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)} \times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1431]

$$\begin{pmatrix} r_1(t) \\ r_2(t) \end{pmatrix} = \begin{pmatrix} h_{11}(t) & h_{12}(t) \\ h_{21}(t) & h_{22}(t) \end{pmatrix} \begin{pmatrix} z_1(t) \\ z_2(t) \end{pmatrix} + \begin{pmatrix} n_1(t) \\ n_2(t) \end{pmatrix} = \left( \sqrt{\frac{K}{K+1}} \begin{pmatrix} h_{11,d}(t) & h_{12,d}(t) \\ h_{21,d}(t) & h_{22,d}(t) \end{pmatrix} + \sqrt{\frac{1}{K+1}} \begin{pmatrix} h_{11,s}(t) & h_{12,s}(t) \\ h_{21,s}(t) & h_{22,s}(t) \end{pmatrix} \right) \begin{pmatrix} z_1(t) \\ z_2(t) \end{pmatrix} + \begin{pmatrix} n_1(t) \\ n_2(t) \end{pmatrix} \tag{1431}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (41A)" is not satisfied.

(Precoding Method (41B))

In a state such as in FIG. 2, signals $r_1(t)$, $r_2(t)$ that are received by a reception device can be applied as follows (note that δ is greater than or equal to 0 radians and less than 2π radians).

[MATH. 1432]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \tag{1432}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1433]

$$\begin{pmatrix} z_1(t) \\ z_2(t) \end{pmatrix} = \begin{pmatrix} a & 0 \\ 0 & b \end{pmatrix} \begin{pmatrix} e^{j\mu}\times\cos\theta & e^{j(\mu+\lambda)}\times\sin\theta \\ e^{j\omega}\times\sin\theta & -e^{j(\omega+\lambda)}\times\cos\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} \tag{1433}$$

However, a and b are complex numbers (may be actual numbers). j is an imaginary unit, and γ(t) is an argument and a time function.

In this case, the following relation equation holds true.

[MATH. 1434]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} e^{j\mu}\times\cos\theta & e^{j(\mu+\lambda)}\times\sin\theta \\ e^{j\omega}\times\sin\theta & -e^{j(\omega+\lambda)}\times\cos\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times e^{j\mu}\times\cos\delta\times\cos\theta - h_{22}(t)\times b\times e^{j\omega}\times\sin\delta\times\sin\theta & h_{11}(t)\times a\times e^{j(\mu+\lambda)}\times\cos\delta\times\sin\theta + h_{22}(t)\times b\times e^{j(\omega+\lambda)}\times\sin\delta\times\cos\theta \\ h_{11}(t)\times a\times e^{j\mu}\times\sin\delta\times\cos\theta + h_{22}(t)\times b\times e^{j\omega}\times\cos\delta\times\sin\theta & h_{11}(t)\times a\times e^{j(\mu+\lambda)}\times\sin\delta\times\sin\theta - h_{22}(t)\times b\times e^{j(\omega+\lambda)}\times\cos\delta\times\cos\theta \end{pmatrix} \begin{pmatrix} e^{j\varepsilon(t)}s_1(t) \\ e^{j\gamma(t)}s_2(t) \end{pmatrix} + \begin{pmatrix} n_1(t) \\ n_2(t) \end{pmatrix} \end{aligned} \tag{1434}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1435]

$$h_{11}(t)\times a\times e^{j\mu}\times\cos\delta\times\sin\theta - h_{22}(t)\times b\times e^{j\omega}\times\sin\delta\times\cos\theta = 0 \tag{1435-1}$$

$$h_{11}(t)\times a\times e^{j(\mu+\lambda)}\times\sin\delta\times\cos\theta - h_{22}(t)\times b\times e^{j(\omega+\lambda)}\times\cos\delta\times\sin\theta = 0 \tag{1435-2}$$

Accordingly, it is sufficient if the following holds true.

[MATH. 1436]

$$b=\frac{h_{11}(t)}{h_{22}(t)}\times a\times e^{j(\mu-\omega)} \tag{1436-1}$$

and $$\theta=-\delta+\frac{\pi}{2}+n\pi \text{ radians} \tag{1436-2}$$

($n$ is an interger)

Accordingly, the communications station calculates θ, a, and b from the feedback information from the terminal so that the following is true.

[MATH. 1437]

$$b=\frac{h_{11}(t)}{h_{22}(t)}\times a\times e^{j(\mu-\omega)} \tag{1437-1}$$

and $$\theta=-\delta+\frac{\pi}{2}+n\pi \text{ radians} \tag{1437-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1438]

$$|a|^2+|b|^2=|u|^2 \tag{1438}$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (41B-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$.

Mapped signal 305B output by mapper 304B is $s_2(t)$.

Weighted signal 307A output by weighting synthesizer 306A is $z_1(t)$.

Weighted signal 307B output by weighting synthesizer 306B is $z_2(t)$.

The precoding matrix is expressed as follows.

[MATH. 1439]

$$\begin{pmatrix} q_{11} & q_{12} \\ q_{21} & q_{22} \end{pmatrix} \tag{1439}$$

Accordingly, weighting synthesizer 306A calculates the following and outputs weighted signal 307A ($z_1(t)$).

[MATH. 1440]

$$z_1(t)=q_{11}\times e^{j\varepsilon(t)}\times s_1(t)+q_{12}\times e^{j\gamma(t)}\times s_2(t) \tag{1440}$$

Weighting synthesizer 306B calculates the following and outputs weighted signal 307B ($z_2(t)$).

[MATH. 1441]

$$z_2(t)=q_{21}\times e^{j\varepsilon(t)}\times s_1(t)+q_{22}\times e^{j\gamma(t)}\times s_2(t) \tag{1441}$$

Precoding method determiner 316 performs the calculations described in "(precoding method (41B)" based on feedback information from a terminal, and determines the precoding matrix.

[MATH. 1442]

$$\begin{aligned}\begin{pmatrix} q_{11} & q_{12} \\ q_{21} & q_{22} \end{pmatrix} &= \begin{pmatrix} a & 0 \\ 0 & b \end{pmatrix}\begin{pmatrix} e^{j\mu}\times\cos\theta & e^{j(\mu+\lambda)}\times\sin\theta \\ e^{j\omega}\times\sin\theta & -e^{j(\omega+\lambda)}\times\cos\theta \end{pmatrix} \\ &= \begin{pmatrix} a\times e^{j\mu}\times\cos\theta & a\times e^{j(\mu+\lambda)}\times\sin\theta \\ b\times e^{j\omega}\times\sin\theta & -b\times e^{j(\omega+\lambda)}\times\cos\theta \end{pmatrix}\end{aligned} \tag{1442}$$

In other words, the precoding matrix of the above equation is calculated. Here, based on feedback information from a terminal, precoding method determiner 316 uses

[MATH. 1443]

$$b=\frac{h_{11}(t)}{h_{22}(t)}\times a\times e^{j(\mu-\omega)} \tag{1443-1}$$

and $$\theta=-\delta+\frac{\pi}{2}+n\pi \text{ radians} \tag{1443-2}$$

($n$ is an interger)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (41B-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1444]

$$\begin{pmatrix} q_{11} & q_{12} \\ q_{21} & q_{22} \end{pmatrix} \tag{1444}$$

Accordingly, weighting synthesizer 306A calculates the following and outputs weighted signal 307A ($y_1(t)$).

[MATH. 1445]

$$y_1(t)=q_{11}\times e^{j\varepsilon(t)}\times s_1(t)+q_{12}\times e^{j\gamma(t)}\times s_2(t) \tag{1445}$$

Weighting synthesizer 306B calculates the following and outputs weighted signal 307B ($y_2(t)$).

[MATH. 1446]

$$y_2(t)=q_{21}\times e^{j\varepsilon(t)}\times s_1(t)+q_{22}\times e^{j\gamma(t)}\times s_2(t) \tag{1446}$$

Precoding method determiner 316 performs the calculations described in "(precoding method (41B)" based on feedback information from a terminal, and determines the precoding matrix.

[MATH. 1447]

$$\begin{pmatrix} q_{11} & q_{12} \\ q_{21} & q_{22} \end{pmatrix} = \begin{pmatrix} e^{j\mu}\times\cos\theta & e^{j(\mu+\lambda)}\times\sin\theta \\ e^{j\omega}\times\sin\theta & -e^{j(\omega+\lambda)}\times\cos\theta \end{pmatrix} \tag{1447}$$

In other words, the precoding matrix of the above equation and values for a and b are calculated. Here, based on feedback information from a terminal, precoding method determiner 316 uses

[MATH. 1448]

$$b=\frac{h_{11}(t)}{h_{22}(t)}\times a\times e^{j(\mu-\omega)} \tag{1448-1}$$

and $$\theta=-\delta+\frac{\pi}{2}+n\pi \text{ radians} \tag{1448-2}$$

($n$ is an interger)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (41B))

Phase changer 1001A illustrated in FIG. 12 and FIG. 13 receives an input of mapped signal $s_1(t)$ output from mapper 304A, applies a phase-change, and outputs phase-changed signal 1002A ($e^{j\varepsilon(t)}\times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1449]

$$\begin{aligned}\begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix}+\begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix}+\sqrt{\frac{1}{K+1}}\begin{pmatrix} h_{11,s}(t) & h_{12,s}(t) \\ h_{21,s}(t) & h_{22,s}(t) \end{pmatrix}\right) \\ &\quad \begin{pmatrix} z_1(t) \\ z_2(t) \end{pmatrix}+\begin{pmatrix} n_1(t) \\ n_2(t) \end{pmatrix}\end{aligned} \tag{1449}$$

Here, $h_{xy,d}(t)$ is a direct wave component of $h_{xy}(t)$, and $hx_{y,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (41B)" is not satisfied.

(Precoding Method (42A))

In a state such as in FIG. 2, signals $r_1(t)$, $r_2(t)$ that are received by a reception device can be applied as follows (note that δ is greater than or equal to 0 radians and less than 2π radians).

[MATH. 1450]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \tag{1450}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1451]

$$\begin{pmatrix} z_1(t) \\ z_2(t) \end{pmatrix} = \begin{pmatrix} a & 0 \\ 0 & b \end{pmatrix} \begin{pmatrix} \beta\times e^{j\mu}\times\cos\theta & \beta\times e^{j(\mu+\lambda)}\times\sin\theta \\ \beta\times e^{j\omega}\times\sin\theta & -\beta\times e^{j(\omega+\lambda)}\times\cos\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} \tag{1451}$$

However, a and b are complex numbers (may be actual numbers). j is an imaginary unit, and γ(t) is an argument and a time function.

In this case, the following equation holds true.

[MATH. 1452]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \beta\times e^{j\mu}\times\cos\theta & \beta\times e^{j(\mu+\lambda)}\times\sin\theta \\ \beta\times e^{j\omega}\times\sin\theta & -\beta\times e^{j(\omega+\lambda)}\times\cos\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\beta\times e^{j\mu}\times\cos\delta\times\cos\theta - h_{22}(t)\times b\times\beta\times e^{j\omega}\times\sin\delta\times\sin\theta & h_{11}(t)\times a\times\beta\times e^{j(\mu+\lambda)}\times\cos\delta\times\sin\theta + h_{22}(t)\times b\times\beta\times e^{j(\omega+\lambda)}\times\sin\delta\times\cos\theta \\ h_{11}(t)\times a\times\beta\times e^{j\mu}\times\sin\delta\times\cos\theta + h_{22}(t)\times b\times\beta\times e^{j\omega}\times\cos\delta\times\sin\theta & h_{11}(t)\times a\times\beta\times e^{j(\mu+\lambda)}\times\sin\delta\times\sin\theta - h_{22}(t)\times b\times\beta\times e^{j(\omega+\lambda)}\times\cos\delta\times\cos\theta \end{pmatrix} \begin{pmatrix} e^{j\varepsilon(t)}s_1(t) \\ e^{j\gamma(t)}s_2(t) \end{pmatrix} + \begin{pmatrix} n_1(t) \\ n_2(t) \end{pmatrix} \end{aligned} \tag{1452}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1453]

$$h_{11}(t)\times a\times\times\beta\times e^{j(\mu+\lambda)}\times\cos\delta\times\sin\theta - h_{22}(t)\times b\times\beta\times e^{j(\omega+\lambda)}\times\sin\delta\times\cos\theta = 0 \tag{1453-1}$$

$$h_{11}(t)\times a\times\beta\times e^{j\mu}\times\sin\delta\times\cos\theta + h_{22}(t)\times b\times\beta\times e^{j\omega}\times\cos\delta\times\sin\theta = 0 \tag{1453-2}$$

Accordingly, it is sufficient if the following holds true.

[MATH. 1454]

$$b = \frac{h_{11}(t)}{h_{22}(t)}\times a\times e^{j(\mu-\omega)} \tag{1454-1}$$

and $$\theta = -\delta + n\pi \text{ radians} \tag{1454-2}$$

($n$ is an integer)

Accordingly, the communications station calculates θ, a, and b from the feedback information from the terminal so that the following is true.

[MATH. 1455]

$$b = \frac{h_{11}(t)}{h_{22}(t)}\times a\times e^{j(\mu-\omega)} \tag{1455-1}$$

and $$\theta = -\delta + n\pi \text{ radians} \tag{1455-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1456]

$$|a|^2+|b|^2=|u|^2 \tag{1456}$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (42A-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$.

Mapped signal 305B output by mapper 304B is $s_2(t)$.

Weighted signal 307A output by weighting synthesizer 306A is $z_1(t)$.

Weighted signal 307B output by weighting synthesizer 306B is $z_2(t)$.

The precoding matrix is expressed as follows.

[MATH. 1457]

$$\begin{pmatrix} q_{11} & q_{12} \\ q_{21} & q_{22} \end{pmatrix} \quad (1457)$$

Accordingly, weighting synthesizer 306A calculates the following and outputs weighted signal 307A ($z_1(t)$).

[MATH. 1458]

$$z_1(t)=q_{11}\times e^{j\varepsilon(t)}\times s_1(t)+q_{12}\times e^{j\gamma(t)}\times s_2(t) \quad (1458)$$

Weighting synthesizer 306B calculates the following and outputs weighted signal 307B ($z_2(t)$).

[MATH. 1459]

$$z_2(t)=q_{21}\times e^{j\varepsilon(t)}\times s_1(t)+q_{22}\times e^{j\gamma(t)}\times s_2(t) \quad (1459)$$

Precoding method determiner 316 performs the calculations described in "(precoding method (42A)" based on feedback information from a terminal, and determines the precoding matrix.

[MATH. 1460]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \beta\times e^{j\mu}\times\cos\theta & \beta\times e^{j(\mu+\lambda)}\times\sin\theta \\ \beta\times e^{j\omega}\times\sin\theta & -\beta\times e^{j(\omega+\lambda)}\times\cos\theta \end{pmatrix} = \begin{pmatrix} a\times\beta\times e^{j\mu}\times\cos\theta & a\times\beta\times e^{j(\mu+\lambda)}\times\sin\theta \\ b\times\beta\times e^{j\omega}\times\sin\theta & -b\times\beta\times e^{j(\omega+\lambda)}\times\cos\theta \end{pmatrix} \quad (1460)$$

In other words, the precoding matrix of the above equation is calculated. Here, based on feedback information from a terminal, precoding method determiner 316 uses

[MATH. 1461]

$$b=\frac{h_{11}(t)}{h_{22}(t)}\times a\times e^{j(\mu-\omega)} \quad (1461\text{-}1)$$

and $$\theta=-\delta+n\pi \text{ radians} \quad (1461\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (42A-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1462]

$$\begin{pmatrix} q_{11} & q_{12} \\ q_{21} & q_{22} \end{pmatrix} \quad (1462)$$

Accordingly, weighting synthesizer 306A calculates the following and outputs weighted signal 307A ($y_1(t)$).

[MATH. 1463]

$$y_1(t)=q_{11}\times e^{j\varepsilon(t)}\times s_1(t)+q_{12}\times e^{j\gamma(t)}\times s_2(t) \quad (1463)$$

Weighting synthesizer 306B calculates the following and outputs weighted signal 307B ($y_2(t)$).

[MATH. 1464]

$$y_2(t)=q_{21}\times e^{j\varepsilon(t)}\times s_1(t)+q_{22}\times e^{j\gamma(t)}\times s_3(t) \quad (1464)$$

Precoding method determiner 316 performs the calculations described in "(precoding method (42A)" based on feedback information from a terminal, and determines the precoding matrix.

[MATH. 1465]

$$\begin{pmatrix} q_{11} & q_{12} \\ q_{21} & q_{22} \end{pmatrix} = \begin{pmatrix} \beta\times e^{j\mu}\times\cos\theta & \beta\times e^{j(\mu+\lambda)}\times\sin\theta \\ \beta\times e^{j\omega}\times\sin\theta & -\beta\times e^{j(\omega+\lambda)}\times\cos\theta \end{pmatrix} \quad (1465)$$

In other words, the precoding matrix of the above equation and values for a and b are calculated. Here, based on feedback information from a terminal, precoding method determiner 316 uses

[MATH. 1466]

$$b=\frac{h_{11}(t)}{h_{22}(t)}\times a\times e^{j(\mu-\omega)} \quad (1466\text{-}1)$$

and $$\theta=-\delta+n\pi \text{ radians} \quad (1466\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback.

The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (42A))

Phase changer 1001A illustrated in FIG. 12 and FIG. 13 receives an input of mapped signal $s_1(t)$ output from mapper 304A, applies a phase-change, and outputs phase-changed signal 1002A ($e^{j\varepsilon(t)}\times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1467]

$$\begin{pmatrix} r_1(t) \\ r_2(t) \end{pmatrix} = \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} = \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right)\begin{pmatrix} z_1(t) \\ z_2(t) \end{pmatrix} + \begin{pmatrix} n_1(t) \\ n_2(t) \end{pmatrix} \tag{1467}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (42A)" is not satisfied.

(Precoding Method (42B))

In a state such as in FIG. 2, signals $r_1(t)$, $r_2(t)$ that are received by a reception device can be applied as follows (note that δ is greater than or equal to 0 radians and less than 2π radians).

[MATH. 1468]

$$\begin{pmatrix} r_1(t) \\ r_2(t) \end{pmatrix} = \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix} \tag{1468}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1469]

$$\begin{pmatrix} z_1(t) \\ z_2(t) \end{pmatrix} = \begin{pmatrix} a & 0 \\ 0 & b \end{pmatrix}\begin{pmatrix} \beta\times e^{j\mu}\times\cos\theta & \beta\times e^{j(\mu+\lambda)}\times\sin\theta \\ \beta\times e^{j\omega}\times\sin\theta & -\beta\times e^{j(\omega+\lambda)}\times\cos\theta \end{pmatrix}\begin{pmatrix} e^{j\varepsilon(t)} & 0 \\ 0 & e^{j\gamma(t)} \end{pmatrix}\begin{pmatrix} s_1(t) \\ s_2(t) \end{pmatrix} \tag{1469}$$

However, a and b are complex numbers (may be actual numbers). j is an imaginary unit, and γ(t) is an argument and a time function.

In this case, the following relation equation holds true.

[MATH. 1470]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \\ &\quad \begin{pmatrix} \beta\times e^{j\mu}\times\cos\theta & \beta\times e^{j(\mu+\lambda)}\times\sin\theta \\ \beta\times e^{j\omega}\times\sin\theta & \beta\times e^{j(\omega+\lambda)}\times\cos\theta \end{pmatrix} \\ &\quad \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} \begin{matrix} h_{11}(t)\times a\times\beta\times e^{j\mu}\times \\ \cos\delta\times\cos\theta - \\ h_{22}(t)\times b\times\beta\times e^{j\omega}\times \\ \sin\delta\times\sin\theta \end{matrix} & \begin{matrix} h_{11}(t)\times a\times\beta\times \\ e^{j(\mu+\lambda)}\times\cos\delta\times\sin\theta + \\ h_{22}(t)\times b\times\beta\times \\ e^{j(\omega+\lambda)}\times\sin\delta\times\cos\theta \end{matrix} \\ \begin{matrix} h_{11}(t)\times a\times\beta\times \\ e^{j\mu}\times\sin\delta\times\cos\theta + \\ h_{22}(t)\times b\times\beta\times \\ e^{j\omega}\times\cos\delta\times\sin\theta \end{matrix} & \begin{matrix} h_{11}(t)\times a\times\beta\times \\ e^{j(\mu+\lambda)}\times\sin\delta\times\sin\theta - \\ h_{22}(t)\times b\times\beta\times e^{j(\omega+\lambda)}\times \\ \cos\delta\times\cos\theta \end{matrix} \end{pmatrix} \\ &\quad \begin{pmatrix} e^{j\varepsilon(t)}s_1(t) \\ e^{j\gamma(t)}s_2(t) \end{pmatrix} + \begin{pmatrix} n_1(t) \\ n_2(t) \end{pmatrix}\end{aligned} \tag{1470}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1471]

$$h_{11}(t)\times a\times\beta\times e^{j\mu}\times\cos\delta\times\sin\theta - h_{22}(t)\times b\times\beta\times e^{j\omega}\times\sin\delta\times\sin\theta = 0 \tag{1471-1}$$

$$h_{11}(t)\times a\times\beta\times e^{j(\mu+\lambda)}\times\sin\delta\times\cos\theta - h_{22}(t)\times b\times\beta\times e^{j(\omega+\lambda)}\times\cos\delta\times\cos\theta = 0 \tag{1471-2}$$

Accordingly, it is sufficient if the following holds true.

[MATH. 1472]

$$b = \frac{h_{11}(t)}{h_{22}(t)}\times a\times e^{j(\mu-\omega)} \tag{1472-1}$$

and $$\theta = -\delta + \frac{\pi}{2} + n\pi \text{ radians} \tag{1472-2}$$

($n$ is an integer)

Accordingly, the communications station calculates θ, a, and b from the feedback information from the terminal so that the following is true.

[MATH. 1473]

$$b = \frac{h_{11}(t)}{h_{22}(t)}\times a\times e^{j(\mu-\omega)} \tag{1473-1}$$

and

-continued $$\theta = -\delta + \frac{\pi}{2} + n\pi \text{ radians} \tag{1473-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1474]

$$|a|^2+|b|^2=|u|^2 \tag{1474}$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (42B-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 1475]

$$\begin{pmatrix} q_{11} & q_{12} \\ q_{21} & q_{22} \end{pmatrix} \tag{1475}$$

Accordingly, weighting synthesizer 306A calculates the following and outputs weighted signal 307A ($z_1(t)$).

[MATH. 1476]

$$z_1(t)=q_{11}\times e^{j\varepsilon(t)}\times s_1(t)+q_{12}\times e^{j\gamma(t)}\times s_2(t) \tag{1062}$$

Weighting synthesizer 306B calculates the following and outputs weighted signal 307B ($z_2(t)$).

[MATH. 1477]

$$z_2(t)=q_{21}\times e^{j\varepsilon(t)}\times s_1(t)+q_{22}\times e^{j\gamma(t)}\times s_2(t) \tag{1477}$$

Precoding method determiner 316 performs the calculations described in "(precoding method (42B)" based on feedback information from a terminal, and determines the precoding matrix.

[MATH. 1478]

$$\begin{pmatrix} q_{11} & q_{12} \\ q_{21} & q_{22} \end{pmatrix} = \begin{pmatrix} a & 0 \\ 0 & b \end{pmatrix} \begin{pmatrix} \beta \times e^{j\mu} \times \cos\theta & \beta \times e^{j(\mu+\lambda)} \times \sin\theta \\ \beta \times e^{j\omega} \times \sin\theta & -\beta \times e^{j(\omega+\lambda)} \times \cos\theta \end{pmatrix} = \begin{pmatrix} a \times \beta \times e^{j\mu} \times \cos\theta & a \times \beta \times e^{j(\mu+\lambda)} \times \sin\theta \\ b \times \beta \times e^{j\omega} \times \sin\theta & -b \times \beta \times e^{j(\omega+\lambda)} \times \cos\theta \end{pmatrix} \quad (1478)$$

In other words, the precoding matrix of the above equation is calculated. Here, based on feedback information from a terminal, precoding method determiner 316 uses

[MATH. 1479]

$$b = \frac{h_{11}(t)}{h_{22}(t)} \times a \times e^{j(\mu-\omega)} \quad (1479\text{-}1)$$

and $$\theta = -\delta + \frac{\pi}{2} + n\pi \text{ radians} \quad (1479\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (42B-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$.

Mapped signal 305B output by mapper 304B is $s_2(t)$.

Weighted signal 307A output by weighting synthesizer 306A is $y_1(t)$.

Weighted signal 307B output by weighting synthesizer 306B is $y_2(t)$.

Coefficient multiplied signal 402A output by coefficient multiplier 401A is $z_1(t)$.

Coefficient multiplied signal 402B output by coefficient multiplier 401B is $z_2(t)$.

The precoding matrix is expressed as follows.

[MATH. 1480]

$$\begin{pmatrix} q_{11} & q_{12} \\ q_{21} & q_{22} \end{pmatrix} \quad (1480)$$

Accordingly, weighting synthesizer 306A calculates the following and outputs weighted signal 307A ($y_1(t)$).

[MATH. 1481]

$$y_1(t) = q_{11} \times e^{j\varepsilon(t)} \times s_1(t) + q_{12} \times e^{j\gamma(t)} \times s_2(t) \quad (1481)$$

Weighting synthesizer 306B calculates the following and outputs weighted signal 307B ($y_2(t)$).

[MATH. 1482]

$$y_2(t) = q_{21} \times e^{j\varepsilon(t)} \times s_1(t) + q_{22} \times e^{j\gamma(t)} \times s_2(t) \quad (1482)$$

Precoding method determiner 316 performs the calculations described in "(precoding method (42B)" based on feedback information from a terminal, and determines the precoding matrix.

[MATH. 1483]

$$\begin{pmatrix} q_{11} & q_{12} \\ q_{21} & q_{22} \end{pmatrix} = \begin{pmatrix} \beta \times e^{j\mu} \times \cos\theta & \beta \times e^{j(\mu+\lambda)} \times \sin\theta \\ \beta \times e^{j\omega} \times \sin\theta & -\beta \times e^{j(\omega+\lambda)} \times \cos\theta \end{pmatrix} \quad (1483)$$

In other words, the precoding matrix of the above equation and values for a and b are calculated. Here, based on feedback information from a terminal, precoding method determiner 316 uses

[MATH. 1484]

$$b = \frac{h_{11}(t)}{h_{22}(t)} \times a \times e^{j(\mu-\omega)} \quad (1484\text{-}1)$$

and $$\theta = -\delta + \frac{\pi}{2} + n\pi \text{ radians} \quad (1484\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a \times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b \times y_2(t)$, and outputs coefficient multiplied signal 402B ($z_2(t)$).

(Phase Changing in Precoding Method (42B))

Phase changer 1001A illustrated in FIG. 12 and FIG. 13 receives an input of mapped signal $s_1(t)$ output from mapper 304A, applies a phase-change, and outputs phase-changed signal 1002A ($e^{j\varepsilon(t)} \times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)} \times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1485]

$$\begin{pmatrix} r_1(t) \\ r_2(t) \end{pmatrix} = \begin{pmatrix} h_{11}(t) & h_{12}(t) \\ h_{21}(t) & h_{22}(t) \end{pmatrix} \begin{pmatrix} z_1(t) \\ z_2(t) \end{pmatrix} + \begin{pmatrix} n_1(t) \\ n_2(t) \end{pmatrix} = \left( \sqrt{\frac{K}{K+1}} \begin{pmatrix} h_{11,d}(t) & h_{12,d}(t) \\ h_{21,d}(t) & h_{22,d}(t) \end{pmatrix} + \sqrt{\frac{1}{K+1}} \begin{pmatrix} h_{11,s}(t) & h_{12,s}(t) \\ h_{21,s}(t) & h_{22,s}(t) \end{pmatrix} \right) \begin{pmatrix} z_1(t) \\ z_2(t) \end{pmatrix} + \begin{pmatrix} n_1(t) \\ n_2(t) \end{pmatrix} \quad (1485)$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (42B)" is not satisfied.

(Precoding Method (43A))

In a state such as in FIG. 2, signals $r_1(t)$, $r_2(t)$ that are received by a reception device can be applied as follows (note that δ is greater than or equal to 0 radians and less than 2π radians).

[MATH. 1486]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \quad (1486)$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1487]

$$\begin{pmatrix} z_1(t) \\ z_2(t) \end{pmatrix} = \begin{pmatrix} a & 0 \\ 0 & b \end{pmatrix} \begin{pmatrix} e^{j\mu}\times\cos\theta & -e^{j(\mu+\lambda)}\times\sin\theta \\ e^{j\omega}\times\sin\theta & e^{j(\omega+\lambda)}\times\cos\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} \quad (1487)$$

However, a and b are complex numbers (may be actual numbers). j is an imaginary unit, and γ(t) is an argument and a time function.

In this case, the following equation holds true.

[MATH. 1488]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} e^{j\mu}\times\cos\theta & -e^{j(\mu+\lambda)}\times\sin\theta \\ e^{j\omega}\times\sin\theta & e^{j(\omega+\lambda)}\times\cos\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} \begin{pmatrix} n_1(t) \\ n_2(t) \end{pmatrix} \\ &= \begin{pmatrix} h_{11}(t)\times a\times e^{j\mu}\times\cos\delta\times\cos\theta - h_{22}(t)\times b\times e^{j\omega}\times\sin\delta\times\sin\theta & -h_{11}(t)\times a\times e^{j(\mu+\lambda)}\times\cos\delta\times\sin\theta - h_{22}(t)\times b\times e^{j(\omega+\lambda)}\times\sin\delta\times\cos\theta \\ h_{11}(t)\times a\times e^{j\mu}\times\sin\delta\times\cos\theta + h_{22}(t)\times b\times e^{j\omega}\times\cos\delta\times\sin\theta & -h_{11}(t)\times a\times e^{j(\mu+\lambda)}\times\sin\delta\times\sin\theta + h_{22}(t)\times b\times e^{j(\omega+\lambda)}\times\cos\delta\times\cos\theta \end{pmatrix} \begin{pmatrix} e^{j\varepsilon(t)}s_1(t) \\ e^{j\gamma(t)}s_2(t) \end{pmatrix} + \begin{pmatrix} n_1(t) \\ n_2(t) \end{pmatrix} \end{aligned} \quad (1488)$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1489]

$$-h_{11}(t)\times a\times e^{j(\mu+\lambda)}\times\cos\delta\times\sin\theta - h_{22}(t)\times b\times e^{j(\omega+\lambda)}\times\sin\delta\times\cos\theta = 0 \quad (1489\text{-}1)$$

$$h_{11}(t)\times a\times e^{j\mu}\times\sin\delta\times\cos\theta + h_{22}(t)\times b\times e^{j\omega}\times\cos\delta\times\sin\theta = 0 \quad (1489\text{-}2)$$

Accordingly, it is sufficient if the following holds true.

[MATH. 1490]

$$b = \frac{h_{11}(t)}{h_{22}(t)} \times a \times e^{j(\mu-\omega)} \tag{1490-1}$$

and $$\theta = -\delta + n\pi \text{ radians} \tag{1490-2}$$

($n$ is an integer)

Accordingly, the communications station calculates θ, a, and b from the feedback information from the terminal so that the following is true.

[MATH. 1491]

$$b = \frac{h_{11}(t)}{h_{22}(t)} \times a \times e^{j(\mu-\omega)} \tag{1491-1}$$

and $$\theta = -\delta + n\pi \text{ radians} \tag{1491-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1492]

$$|a|^2+|b|^2=|u|^2 \tag{1078}$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (43A-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 1493]

$$\begin{pmatrix} q_{11} & q_{12} \\ q_{21} & q_{22} \end{pmatrix} \tag{1493}$$

Accordingly, weighting synthesizer 306A calculates the following and outputs weighted signal 307A ($z_1(t)$).

[MATH. 1494]

$$z_1(t)=q_{11}\times e^{j\varepsilon(t)}\times s_1(t)+q_{12}\times e^{j\gamma(t)}\times s_2(t) \tag{1062}$$

Weighting synthesizer 306B calculates the following and outputs weighted signal 307B ($z_2(t)$).

[MATH. 1495]

$$z_2(t)=q_{21}\times e^{j\varepsilon(t)}\times s_1(t)+q_{22}\times e^{j\gamma(t)}\times s_2(t) \tag{1495}$$

Precoding method determiner 316 performs the calculations described in "(precoding method (43A)" based on feedback information from a terminal, and determines the precoding matrix.

[MATH. 1496]

$$\begin{aligned} \begin{pmatrix} q_{11} & q_{12} \\ q_{21} & q_{22} \end{pmatrix} &= \begin{pmatrix} a & 0 \\ 0 & b \end{pmatrix} \begin{pmatrix} e^{j\mu} \times \cos\theta & -e^{j(\mu+\lambda)} \times \sin\theta \\ e^{j\omega} \times \sin\theta & e^{j(\omega+\lambda)} \times \cos\theta \end{pmatrix} \\ &= \begin{pmatrix} a \times e^{j\mu} \times \cos\theta & -a \times e^{j(\mu+\lambda)} \times \sin\theta \\ b \times e^{j\omega} \times \sin\theta & b \times e^{j(\omega+\lambda)} \times \cos\theta \end{pmatrix} \end{aligned} \tag{1496}$$

In other words, the precoding matrix of the above equation is calculated. Here, based on feedback information from a terminal, precoding method determiner 316 uses

[MATH. 1497]

$$b = \frac{h_{11}(t)}{h_{22}(t)} \times a \times e^{j(\mu-\omega)} \tag{1497-1}$$

and $$\theta = -\delta + n\pi \text{ radians} \tag{1497-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (43A-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1498]

$$\begin{pmatrix} q_{11} & q_{12} \\ q_{21} & q_{22} \end{pmatrix} \tag{1498}$$

Accordingly, weighting synthesizer 306A calculates the following and outputs weighted signal 307A ($y_1(t)$).

[MATH. 1499]

$$y_1(t)=q_{11}\times e^{j\varepsilon(t)}\times s_1(t)+q_{12}\times e^{j\gamma(t)}\times s_2(t) \tag{1499}$$

Weighting synthesizer 306B calculates the following and outputs weighted signal 307B ($y_2(t)$).

[MATH. 1500]

$$y_2(t)=q_{21}\times e^{j\varepsilon(t)}\times s_1(t)+q_{22}\times e^{j\gamma(t)}\times s_2(t) \tag{1500}$$

Precoding method determiner 316 performs the calculations described in "(precoding method (43A)" based on feedback information from a terminal, and determines the precoding matrix.

[MATH. 1501]

$$\begin{pmatrix} q_{11} & q_{12} \\ q_{21} & q_{22} \end{pmatrix} = \begin{pmatrix} e^{j\mu}\times\cos\theta & -e^{j(\mu+\lambda)}\times\sin\theta \\ e^{j\omega}\times\sin\theta & e^{j(\omega+\lambda)}\times\cos\theta \end{pmatrix} \tag{1501}$$

In other words, the precoding matrix of the above equation and values for a and b are calculated. Here, based on feedback information from a terminal, precoding method determiner 316 uses

[MATH. 1502]

$$b = \frac{h_{11}(t)}{h_{22}(t)}\times a\times e^{j(\mu-\omega)} \tag{1502-1}$$

and $$\theta = -\delta + n\pi \text{ radians} \tag{1502-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (43A))

Phase changer 1001A illustrated in FIG. 12 and FIG. 13 receives an input of mapped signal $s_1(t)$ output from mapper 304A, applies a phase-change, and outputs phase-changed signal 1002A ($e^{j\varepsilon(t)}\times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1503]

$$\begin{aligned} \begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right) \\ &\quad \begin{pmatrix} z_1(t) \\ z_2(t) \end{pmatrix} + \begin{pmatrix} n_1(t) \\ n_2(t) \end{pmatrix} \end{aligned} \tag{1503}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (43A)" is not satisfied.

(Precoding Method (43B))

In a state such as in FIG. 2, signals $r_1(t)$, $r_2(t)$ that are received by a reception device can be applied as follows (note that δ is greater than or equal to 0 radians and less than 2π radians).

[MATH. 1504]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \quad (1504)$$

Here, when $z_1(t)=s_1(t)$ and $z_2(t)=s_2(t)$ ($s_1(t)$ and $s_2(t)$ are mapped baseband signals), excluding when $\delta=0$, $\pi/2$, $\pi$, or $3\pi/2$ radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1505]

$$\begin{pmatrix} z_1(t) \\ z_2(t) \end{pmatrix} = \begin{pmatrix} a & 0 \\ 0 & b \end{pmatrix} \begin{pmatrix} e^{j\mu}\times\cos\theta & -e^{j(\mu+\lambda)}\times\sin\theta \\ e^{j\omega}\times\sin\theta & e^{j(\omega+\lambda)}\times\cos\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} \quad (1505)$$

However, a and b are complex numbers (may be actual numbers). j is an imaginary unit, and $\gamma(t)$ is an argument and a time function.

In this case, the following relation equation holds true.

[MATH. 1506]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{12}(t)\times\sin\delta \\ h_{21}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{12}(t)\times\sin\delta \\ h_{21}(t)\times\sin\delta & h_{22}(t)\times\cos\delta \end{pmatrix} \begin{pmatrix} a & 0 \\ 0 & b \end{pmatrix} \\ &\quad \begin{pmatrix} e^{j\mu}\times\cos\theta & -e^{j(\mu+\lambda)}\times\sin\theta \\ e^{j\omega}\times\sin\theta & e^{j(\omega+\lambda)}\times\cos\theta \end{pmatrix} \begin{pmatrix} e^{j\varepsilon(t)} & 0 \\ 0 & e^{j\gamma(t)} \end{pmatrix} \\ &\quad \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times e^{j\mu}\times\cos\delta\times\cos\theta - h_{22}(t)\times b\times e^{j\omega}\times\sin\delta\times\sin\theta & -h_{11}(t)\times a\times e^{j(\mu+\lambda)}\times\cos\delta\times\sin\theta - h_{22}(t)\times b\times e^{j(\omega+\lambda)}\times\sin\delta\times\cos\theta \\ h_{11}(t)\times a\times e^{j\mu}\times\sin\delta\times\cos\theta + h_{22}(t)\times b\times e^{j\omega}\times\cos\delta\times\sin\theta & -h_{11}(t)\times a\times e^{j(\mu+\lambda)}\times\sin\delta\times\sin\theta + h_{22}(t)\times b\times e^{j(\omega+\lambda)}\times\cos\delta\times\cos\theta \end{pmatrix} \\ &\quad \begin{pmatrix} e^{j\varepsilon(t)}s_1(t) \\ e^{j\gamma(t)}s_2(t) \end{pmatrix} + \begin{pmatrix} n_1(t) \\ n_2(t) \end{pmatrix} \end{aligned} \quad (1506)$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1507]

$$h_{11}(t)\times a\times e^{j\mu}\times\cos\delta\times\cos\theta - h_{22}(t)\times b\times e^{j\omega}\times\sin\delta\times\sin\theta=0 \quad (1507\text{-}1)$$

$$-h_{11}(t)\times a\times e^{j(\mu+\lambda)}\times\sin\delta\times\sin\theta + h_{22}(t)\times b\times e^{j(\omega+\lambda)}\times\cos\delta\times\cos\theta=0 \quad (1507\text{-}2)$$

Accordingly, it is sufficient if the following holds true.

[MATH. 1508]

$$b = \frac{h_{11}(t)}{h_{22}(t)}\times a\times e^{j(\mu-\omega)} \quad (1508\text{-}1)$$

and $$\theta = -\delta + \frac{\pi}{2} + n\pi \text{ radians} \quad (1508\text{-}2)$$

($n$ is an integer)

Accordingly, the communications station calculates $\theta$, a, and b from the feedback information from the terminal so that the following is true.

[MATH. 1509]

$$b = \frac{h_{11}(t)}{h_{22}(t)}\times a\times e^{j(\mu-\omega)} \quad (1509\text{-}1)$$

and $$\theta = -\delta + \frac{\pi}{2} + n\pi \text{ radians} \quad (1509\text{-}1)$$

($n$ is an integer)

The communications station performs the precoding using these values.

For example, the communications station transmits a training symbol, and the terminal performs channel estimation from the training symbol and provides the channel estimation value to the communications station as feedback. The communications station then calculates the values for $\theta$, a, and b by using the information provided as feedback.

Note that because of the average transmitted power, the following relation equation holds true.

[MATH. 1510]

$$|a|^2+|b|^2=|u|^2 \quad (1510)$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (43B-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$.

Mapped signal 305B output by mapper 304B is $s_2(t)$.

Weighted signal 307A output by weighting synthesizer 306A is $z_1(t)$.

Weighted signal 307B output by weighting synthesizer 306B is $z_2(t)$.

The precoding matrix is expressed as follows.

[MATH. 1511]

$$\begin{pmatrix} q_{11} & q_{12} \\ q_{21} & q_{22} \end{pmatrix} \quad (1511)$$

Accordingly, weighting synthesizer 306A calculates the following and outputs weighted signal 307A ($z_1(t)$).

[MATH. 1512]

$$z_1(t)=q_{11}\times e^{j\varepsilon(t)}\times s_1(t)+q_{12}\times e^{j\gamma(t)}\times s_2(t) \quad (1512)$$

Weighting synthesizer 306B calculates the following and outputs weighted signal 307B ($z_2(t)$).

[MATH. 1513]

$$z_2(t)=q_{21}\times e^{j\varepsilon(t)}\times s_1(t)+q_{22}\times e^{j\gamma(t)}\times s_2(t) \quad (1513)$$

Precoding method determiner 316 performs the calculations described in "(precoding method (43B)" based on feedback information from a terminal, and determines the precoding matrix.

[MATH. 1514]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} e^{j\mu}\times\cos\theta & -e^{j(\mu+\lambda)}\times\sin\theta \\ e^{j\omega}\times\sin\theta & e^{j(\omega+\lambda)}\times\cos\theta \end{pmatrix} = \begin{pmatrix} a\times e^{j\mu}\times\cos\theta & -a\times e^{j(\mu+\lambda)}\times\sin\theta \\ b\times e^{j\omega}\times\sin\theta & b\times e^{j(\omega+\lambda)}\times\cos\theta \end{pmatrix} \quad (1514)$$

In other words, the precoding matrix of the above equation is calculated. Here, based on feedback information from a terminal, precoding method determiner 316 uses

[MATH. 1515]

$$b = \frac{h_{11}(t)}{h_{22}(t)}\times a\times e^{j(\mu-\omega)} \quad (1515\text{-}1)$$

and $$\theta = -\delta + \frac{\pi}{2} + n\pi \text{ radians} \quad (1515\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (43B-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1516]

$$\begin{pmatrix} q_{11} & q_{12} \\ q_{21} & q_{22} \end{pmatrix} \quad (1516)$$

Accordingly, weighting synthesizer 306A calculates the following and outputs weighted signal 307A ($y_1(t)$).

[MATH. 1517]

$$y_1(t)=q_{11}\times e^{j\varepsilon(t)}\times s_1(t)+q_{12}\times e^{j\gamma(t)}\times s_2(t) \quad (1517)$$

Weighting synthesizer 306B calculates the following and outputs weighted signal 307B ($y_2(t)$).

[MATH. 1518]

$$y_2(t)=q_{21}\times s_1(t)+q_{22}\times e^{j\gamma(t)}\times s_2(t) \quad (1518)$$

Precoding method determiner 316 performs the calculations described in "(precoding method (43B)" based on feedback information from a terminal, and determines the precoding matrix.

[MATH. 1519]

$$\begin{pmatrix} q_{11} & q_{12} \\ q_{21} & q_{22} \end{pmatrix} = \begin{pmatrix} e^{j\mu}\times\cos\theta & -e^{j(\mu+\lambda)}\times\sin\theta \\ e^{j\omega}\times\sin\theta & e^{j(\omega+\lambda)}\times\cos\theta \end{pmatrix} \quad (1519)$$

In other words, the precoding matrix of the above equation and values for a and b are calculated. Here, based on feedback information from a terminal, precoding method determiner 316 uses

[MATH. 1520]

$$b = \frac{h_{11}(t)}{h_{22}(t)}\times a\times e^{j(\mu-\omega)} \quad (1520\text{-}1)$$

and $$\theta = -\delta + \frac{\pi}{2} + n\pi \text{ radians} \quad (1520\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback.

The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (43B))

Phase changer 1001A illustrated in FIG. 12 and FIG. 13 receives an input of mapped signal $s_1(t)$ output from mapper 304A, applies a phase-change, and outputs phase-changed signal 1002A ($e^{j\varepsilon(t)}\times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1521]

$$\begin{aligned}\begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right) \\ &\quad \begin{pmatrix} z_1(t) \\ z_2(t) \end{pmatrix} + \begin{pmatrix} n_1(t) \\ n_2(t) \end{pmatrix}\end{aligned} \tag{1521}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (43B)" is not satisfied.

(Precoding Method (44A))

In a state such as in FIG. 2, signals $r_1(t)$, $r_2(t)$ that are received by a reception device can be applied as follows (note that δ is greater than or equal to 0 radians and less than 2π radians).

[MATH. 1522]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix}\end{aligned} \tag{1522}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1523]

$$\begin{aligned}\begin{pmatrix} z_1(t) \\ z_2(t) \end{pmatrix} &= \begin{pmatrix} a & 0 \\ 0 & b \end{pmatrix} \\ &\quad \begin{pmatrix} \beta\times e^{j\mu}\times\cos\theta & -\beta\times e^{j(\mu+\lambda)}\times\sin\theta \\ \beta\times e^{j\omega}\times\sin\theta & \beta\times e^{j(\omega+\lambda)}\times\cos\theta \end{pmatrix}\begin{pmatrix} e^{j\varepsilon(t)} & 0 \\ 0 & e^{j\gamma(t)} \end{pmatrix}\begin{pmatrix} s_1(t) \\ s_2(t) \end{pmatrix}\end{aligned} \tag{1523}$$

However, a and b are complex numbers (may be actual numbers). j is an imaginary unit, and γ(t) is an argument and a time function.

In this case, the following equation holds true.

[MATH. 1524]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix}$$
$$= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix}$$
$$= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \beta\times e^{j\mu}\times\cos\theta & -\beta\times e^{j(\mu+\lambda)}\times\sin\theta \\ \beta\times e^{j\omega}\times\sin\theta & \beta\times e^{j(\omega+\lambda)}\times\cos\theta \end{pmatrix}$$
$$\begin{pmatrix} e^{j\varepsilon(t)} & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix}$$
$$= \begin{pmatrix} h_{11}(t)\times a\times\beta\times e^{j\mu}\times\cos\delta\times\cos\theta - & -h_{11}(t)\times a\times\beta\times e^{j(\mu+\lambda)}\times\cos\delta\times\sin\theta - \\ h_{22}(t)\times b\times\beta\times e^{j\omega}\times\sin\delta\times\sin\theta & h_{22}(t)\times b\times\beta\times e^{j(\omega+\lambda)}\times\sin\delta\times\cos\theta \\ h_{11}(t)\times a\times\beta\times e^{j\mu}\times\sin\delta\times\cos\theta + & -h_{11}(t)\times a\times\beta\times e^{j(\mu+\lambda)}\times\sin\delta\times\sin\theta + \\ h_{22}(t)\times b\times\beta\times e^{j\omega}\times\cos\delta\times\sin\theta & h_{22}(t)\times b\times\beta\times e^{j(\omega+\lambda)}\times\cos\delta\times\cos\theta \end{pmatrix}$$
$$\begin{pmatrix} e^{j\varepsilon(t)}s_1(t) \\ e^{j\gamma(t)}s_2(t) \end{pmatrix} + \begin{pmatrix} n_1(t) \\ n_2(t) \end{pmatrix} \quad (1524)$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1525]

$$-h_{11}(t)\times a\times\beta\times e^{j(\mu+\lambda)}\times\cos\delta\times\sin\theta - h_{22}(t)\times b\times\beta\times e^{j(\omega+\lambda)}\times\sin\delta\times\cos\theta = 0 \quad (1525\text{-}1)$$

$$h_{11}(t)\times a\times\beta\times e^{j\mu}\times\sin\delta\times\cos\theta - h_{22}(t)\times b\times\beta\times e^{j\omega}\times\cos\delta\times\sin\theta = 0 \quad (1525\text{-}2)$$

Accordingly, it is sufficient if the following holds true.

[MATH. 1526]

$$b = \frac{h_{11}(t)}{h_{22}(t)}\times a\times e^{j(\mu-\omega)} \quad (1526\text{-}1)$$

and $$\theta = -\delta + n\pi \text{ radians} \quad (1526\text{-}2)$$

($n$ is an integer)

Accordingly, the communications station calculates θ, a, and b from the feedback information from the terminal so that the following is true.

[MATH. 1527]

$$b = \frac{h_{11}(t)}{h_{22}(t)}\times a\times e^{j(\mu-\omega)} \quad (1527\text{-}1)$$

and $$\theta = -\delta + n\pi \text{ radians} \quad (1527\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1528]

$$|a|^2+|b|^2=|u|^2 \quad (1528)$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (44A-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 1529]

$$\begin{pmatrix} q_{11} & q_{12} \\ q_{21} & q_{22} \end{pmatrix} \quad (1529)$$

Accordingly, weighting synthesizer 306A calculates the following and outputs weighted signal 307A ($z_1(t)$).

[MATH. 1530]

$$z_1(t)=q_{11}\times e^{j\varepsilon(t)}\times s_1(t)+q_{12}\times e^{j\gamma(t)}\times s_2(t) \quad (1530)$$

Weighting synthesizer 306B calculates the following and outputs weighted signal 307B ($z_2(t)$).

[MATH. 1531]

$$z_2(t)=q_{21}\times e^{j\varepsilon(t)}\times s_1(t)+q_{22}\times e^{j\gamma(t)}\times s_2(t) \tag{1531}$$

Precoding method determiner 316 performs the calculations described in "(precoding method (44A)" based on feedback information from a terminal, and determines the precoding matrix.

[MATH. 1532]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \beta\times e^{j\mu}\times\cos\theta & -\beta\times e^{j(\mu+\lambda)}\times\sin\theta \\ \beta\times e^{j\omega}\times\sin\theta & \beta\times e^{j(\omega+\lambda)}\times\cos\theta \end{pmatrix} = \begin{pmatrix} a\times\beta\times e^{j\mu}\times\cos\theta & -a\times\beta\times e^{j(\mu+\lambda)}\times\sin\theta \\ b\times\beta\times e^{j\omega}\times\sin\theta & b\times\beta\times e^{j(\omega+\lambda)}\times\cos\theta \end{pmatrix} \tag{1532}$$

In other words, the precoding matrix of the above equation is calculated. Here, based on feedback information from a terminal, precoding method determiner 316 uses

[MATH. 1533]

$$b = \frac{h_{11}(t)}{h_{22}(t)}\times a\times e^{j(\mu-\omega)} \tag{1533-1}$$

and $$\theta = -\delta + n\pi \text{ radians} \tag{1533-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (44A-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1534]

$$\begin{pmatrix} q_{11} & q_{12} \\ q_{21} & q_{22} \end{pmatrix} \tag{1534}$$

Accordingly, weighting synthesizer 306A calculates the following and outputs weighted signal 307A ($y_1(t)$).

[MATH. 1535]

$$y_1(t)=q_{11}\times e^{j\varepsilon(t)}\times s_1(t)+q_{12}\times e^{j\gamma(t)}\times s_2(t) \tag{1535}$$

Weighting synthesizer 306B calculates the following and outputs weighted signal 307B ($y_2(t)$).

[MATH. 1536]

$$y_2(t)=q_{21}\times e^{j\varepsilon(t)}\times s_1(t)+q_{22}\times e^{j\gamma(t)}\times s_2(t) \tag{1536}$$

Precoding method determiner 316 performs the calculations described in "(precoding method (44A)" based on feedback information from a terminal, and determines the precoding matrix.

[MATH. 1537]

$$\begin{pmatrix} q_{11} & q_{12} \\ q_{21} & q_{22} \end{pmatrix} = \begin{pmatrix} \beta\times e^{j\mu}\times\cos\theta & -\beta\times e^{j(\mu+\lambda)}\times\sin\theta \\ \beta\times e^{j\omega}\times\sin\theta & \beta\times e^{j(\omega+\lambda)}\times\cos\theta \end{pmatrix} \tag{1537}$$

In other words, the precoding matrix of the above equation and values for a and b are calculated. Here, based on feedback information from a terminal, precoding method determiner 316 uses

[MATH. 1538]

$$b = \frac{h_{11}(t)}{h_{22}(t)}\times a\times e^{j(\mu-\omega)} \tag{1538-1}$$

and $$\theta = -\delta + n\pi \text{ radians} \tag{1538-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (44A))

Phase changer 1001A illustrated in FIG. 12 and FIG. 13 receives an input of mapped signal $s_1(t)$ output from mapper 304A, applies a phase-change, and outputs phase-changed signal 1002A ($e^{j\varepsilon(t)}\times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1539]

$$\begin{aligned}\begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right) \\ &\quad \begin{pmatrix} z_1(t) \\ z_2(t) \end{pmatrix} + \begin{pmatrix} n_1(t) \\ n_2(t) \end{pmatrix}\end{aligned} \tag{1539}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (44A)" is not satisfied.

(Precoding Method (44B))

In a state such as in FIG. 2, signals $r_1(t)$, $r_2(t)$ that are received by a reception device can be applied as follows (note that δ is greater than or equal to 0 radians and less than 2π radians).

[MATH. 1540]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix}\end{aligned} \tag{1540}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1541]

$$\begin{pmatrix} z_1(t) \\ z_2(t) \end{pmatrix} = \begin{pmatrix} a & 0 \\ 0 & b \end{pmatrix}\begin{pmatrix} \beta\times e^{j\mu}\times\cos\theta & -\beta\times e^{j(\mu+\lambda)}\times\sin\theta \\ \beta\times e^{j\omega}\times\sin\theta & \beta\times e^{j(\omega+\lambda)}\times\cos\theta \end{pmatrix}\begin{pmatrix} e^{j\varepsilon(t)} & 0 \\ 0 & e^{j\gamma(t)} \end{pmatrix}\begin{pmatrix} s_1(t) \\ s_2(t) \end{pmatrix} \tag{1541}$$

However, a and b are complex numbers (may be actual numbers). j is an imaginary unit, and γ(t) is an argument and a time function.

In this case, the following relation equation holds true.

[MATH. 1542]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} a & 0 \\ 0 & b \end{pmatrix}\begin{pmatrix} \beta\times e^{j\mu}\times\cos\theta & -\beta\times e^{j(\mu+\lambda)}\times\sin\theta \\ \beta\times e^{j\omega}\times\sin\theta & \beta\times e^{j(\omega+\lambda)}\times\cos\theta \end{pmatrix} \\ &\quad \begin{pmatrix} e^{j\varepsilon(t)} & 0 \\ 0 & e^{j\gamma(t)} \end{pmatrix}\begin{pmatrix} s_1(t) \\ s_2(t) \end{pmatrix} + \begin{pmatrix} n_1(t) \\ n_2(t) \end{pmatrix} \\ &= \begin{pmatrix} \begin{matrix} h_{11}(t)\times a\times\beta\times e^{j\mu}\times\cos\delta\times\cos\theta - \\ h_{22}(t)\times b\times\beta\times e^{j\omega}\times\sin\delta\times\sin\theta \end{matrix} & \begin{matrix} -h_{11}(t)\times a\times\beta\times e^{j(\mu+\lambda)}\times\cos\delta\times\sin\theta - \\ h_{22}(t)\times b\times\beta\times e^{j(\omega+\lambda)}\times\sin\delta\times\cos\theta \end{matrix} \\ \begin{matrix} h_{11}(t)\times a\times\beta\times e^{j\mu}\times\sin\delta\times\cos\theta + \\ h_{22}(t)\times b\times\beta\times e^{j\omega}\times\cos\delta\times\sin\theta \end{matrix} & \begin{matrix} -h_{11}(t)\times a\times\beta\times e^{j(\mu+\lambda)}\times\sin\delta\times\sin\theta + \\ h_{22}(t)\times b\times\beta\times e^{j(\omega+\lambda)}\times\cos\delta\times\cos\theta \end{matrix} \end{pmatrix} \\ &\quad \begin{pmatrix} e^{j\varepsilon(t)}s_1(t) \\ e^{j\gamma(t)}s_2(t) \end{pmatrix} + \begin{pmatrix} n_1(t) \\ n_2(t) \end{pmatrix}\end{aligned} \tag{1542}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1543]

$$h_{11}(t)\times a\times\beta\times e^{j\mu}\times\cos\delta\times\cos\theta-h_{22}(t)\times b\times\beta\therefore e^{j\omega}\times\sin\delta\times\sin\theta=0 \tag{1543-1}$$

$$-h_{11}(t)\times a\times\beta\times e^{j(\mu+\lambda)}\times\sin\delta\times\sin\theta-h_{22}(t)\times b\times e^{j(\omega+\lambda)}\times\cos\delta\times\cos\theta=0 \tag{1543-2}$$

Accordingly, it is sufficient if the following holds true.

[MATH. 1544]

$$b=\frac{h_{11}(t)}{h_{22}(t)}\times a\times e^{j(\mu-\omega)} \text{ and} \tag{1544-1}$$

$$\theta=-\delta+\frac{\pi}{2}+n\pi \text{ radians } (n \text{ is an integer}) \tag{1544-2}$$

Accordingly, the communications station calculates θ, a, and b from the feedback information from the terminal so that the following is true.

[MATH. 1545]

$$b=\frac{h_{11}(t)}{h_{22}(t)}\times a\times e^{j(\mu-\omega)} \text{ and} \tag{1545-1}$$

$$\theta=-\delta+\frac{\pi}{2}+n\pi \text{ radians} \tag{1545-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1546]

$$|a|^2+|b|^2=|u|^2 \tag{1546}$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (44B-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$.

Mapped signal 305B output by mapper 304B is $s_2(t)$.

Weighted signal 307A output by weighting synthesizer 306A is $z_1(t)$.

Weighted signal 307B output by weighting synthesizer 306B is $z_2(t)$.

The precoding matrix is expressed as follows.

[MATH. 1547]

$$\begin{pmatrix} q_{11} & q_{12} \\ q_{21} & q_{22} \end{pmatrix} \tag{1547}$$

Accordingly, weighting synthesizer 306A calculates the following and outputs weighted signal 307A ($z_1(t)$).

[MATH. 1548]

$$z_1(t)=q_{11}\times e^{j\varepsilon(t)}\times s_1(t)+q_{12}\times e^{j\gamma(t)}\times s_2(t) \tag{1548}$$

Weighting synthesizer 306B calculates the following and outputs weighted signal 307B ($z_2(t)$).

[MATH. 1549]

$$z_2(t)=q_{21}\times e^{j\varepsilon(t)}\times s_1(t)+q_{22}\times e^{j\gamma(t)}\times s_2(t) \tag{1549}$$

Precoding method determiner 316 performs the calculations described in "(precoding method (44B)" based on feedback information from a terminal, and determines the precoding matrix.

[MATH. 1550]

$$\begin{aligned}\begin{pmatrix} q_{11} & q_{12} \\ q_{21} & q_{22} \end{pmatrix} &= \begin{pmatrix} a & 0 \\ 0 & b \end{pmatrix}\begin{pmatrix} \beta\times e^{j\mu}\times\cos\theta & -\beta\times e^{j(\mu+\lambda)}\times\sin\theta \\ \beta\times e^{j\omega}\times\sin\theta & \beta\times e^{j(\omega+\lambda)}\times\cos\theta \end{pmatrix} \\ &= \begin{pmatrix} a\times\beta\times e^{j\mu}\times\cos\theta & -a\times\beta\times e^{j(\mu+\lambda)}\times\sin\theta \\ b\times\beta\times e^{j\omega}\times\sin\theta & b\times\beta\times e^{j(\omega+\lambda)}\times\cos\theta \end{pmatrix}\end{aligned} \tag{1550}$$

In other words, the precoding matrix of the above equation is calculated. Here, based on feedback information from a terminal, precoding method determiner 316 uses

[MATH. 1551]

$$b=\frac{h_{11}(t)}{h_{22}(t)}\times a\times e^{j(\mu-\omega)} \text{ and} \tag{1551-1}$$

$$\theta=-\delta+\frac{\pi}{2}+n\pi \text{ radians } (n \text{ is an integer}) \tag{1551-2}$$

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (44B-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1552]

$$\begin{pmatrix} q_{11} & q_{12} \\ q_{21} & q_{22} \end{pmatrix} \tag{1552}$$

Accordingly, weighting synthesizer 306A calculates the following and outputs weighted signal 307A ($y_1(t)$).

[MATH. 1553]

$$y_1(t)=q_{11}\times e^{j\varepsilon(t)}\times s_1(t)+q_{12}\times e^{j\gamma(t)}\times s_2(t) \tag{1553}$$

Weighting synthesizer 306B calculates the following and outputs weighted signal 307B ($y_2(t)$).

[MATH. 1554]

$$y_2(t)=q_{21}\times e^{j\varepsilon(t)}\times s_1(t)+q_{22}\times e^{j\gamma(t)}\times s_2(t) \tag{1554}$$

Precoding method determiner 316 performs the calculations described in "(precoding method (44B)" based on feedback information from a terminal, and determines the precoding matrix.

[MATH. 1555]

$$\begin{pmatrix} q_{11} & q_{12} \\ q_{21} & q_{22} \end{pmatrix} = \begin{pmatrix} \beta\times e^{j\mu}\times\cos\theta & -\beta\times e^{j(\mu+\lambda)}\times\sin\theta \\ \beta\times e^{j\omega}\times\sin\theta & \beta\times e^{j(\omega+\lambda)}\times\cos\theta \end{pmatrix} \tag{1555}$$

In other words, the precoding matrix of the above equation and values for a and b are calculated. Here, based on feedback information from a terminal, precoding method determiner 316 uses

[MATH. 1556]

$$b = \frac{h_{11}(t)}{h_{22}(t)}\times a\times e^{j(\mu-\omega)} \text{ and} \tag{1556-1}$$

$$\theta = -\delta + \frac{\pi}{2} + n\pi \text{ radians } (n \text{ is an integer}) \tag{1556-2}$$

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (44B))

Phase changer 1001A illustrated in FIG. 12 and FIG. 13 receives an input of mapped signal $s_1(t)$ output from mapper 304A, applies a phase-change, and outputs phase-changed signal 1002A ($e^{j\varepsilon(t)}\times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1557]

$$\begin{aligned} \begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \right. \\ &\left. \sqrt{\frac{1}{K+1}}\begin{pmatrix} h_{11,s}(t) & h_{12,s}(t) \\ h_{21,s}(t) & h_{22,s}(t) \end{pmatrix}\right)\begin{pmatrix} z_1(t) \\ z_2(t) \end{pmatrix} + \\ &\begin{pmatrix} n_1(t) \\ n_2(t) \end{pmatrix} \end{aligned} \tag{1557}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (44B)" is not satisfied.

(Precoding Method (45A))

In a state such as in FIG. 2, signals $r_1(t)$, $r_2(t)$ that are received by a reception device can be applied as follows (note that δ is greater than or equal to 0 radians and less than 2π radians).

[MATH. 1558]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \tag{1558}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1559]

$$\begin{pmatrix} z_1(t) \\ z_2(t) \end{pmatrix} = \begin{pmatrix} a & 0 \\ 0 & b \end{pmatrix} \begin{pmatrix} e^{j\mu}\times\sin\theta & -e^{j(\mu+\lambda)}\times\cos\theta \\ e^{j\omega}\times\cos\theta & e^{j(\omega+\lambda)}\times\sin\theta \end{pmatrix} \begin{pmatrix} e^{j\varepsilon(t)} & 0 \\ 0 & e^{j\gamma(t)} \end{pmatrix} \begin{pmatrix} S_1(t) \\ S_2(t) \end{pmatrix} \tag{1559}$$

However, a and b are complex numbers (may be actual numbers). j is an imaginary unit, and γ(t) is an argument and a time function.

In this case, the following equation holds true.

[MATH. 1560]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \\ &= \begin{pmatrix} n_1(t) \\ n_2(t) \end{pmatrix} \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \\ &= \begin{pmatrix} n_1(t) \\ n_2(t) \end{pmatrix} \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \\ &\quad \begin{pmatrix} e^{j\mu}\times\sin\theta & -e^{j(\mu+\lambda)}\times\cos\theta \\ e^{j\omega}\times\cos\theta & e^{j(\omega+\lambda)}\times\sin\theta \end{pmatrix} \begin{pmatrix} e^{j\omega(t)} & 0 \\ 0 & e^{j\gamma(t)} \end{pmatrix} \\ &\quad \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times e^{j\mu}\cos\delta\times\sin\theta - h_{22}(t)\times b\times e^{j\omega}\times\sin\delta\times\cos\theta & -h_{11}(t)\times a\times e^{j(\mu+\lambda)}\times\cos\delta\times\cos\theta - h_{22}(t)\times b\times e^{j(\omega+\lambda)}\times\sin\delta\times\sin\theta \\ h_{11}(t)\times a\times e^{j\omega}\sin\delta\times\sin\theta + h_{22}(t)\times b\times e^{j\omega}\times\cos\delta\times\cos\theta & -h_{11}(t)\times a\times e^{j(\mu+\lambda)}\times\sin\delta\times\cos\theta + h_{22}(t)\times b\times e^{j(\omega+\lambda)}\times\cos\delta\times\sin\theta \end{pmatrix} \\ &\quad \begin{pmatrix} e^{j\gamma(t)}s_1(t) \\ e^{j\omega(t)}s_2(t) \end{pmatrix} + \begin{pmatrix} n_1(t) \\ n_2(t) \end{pmatrix} \end{aligned} \tag{1560}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1561]

$$-h_{11}(t)\times a\times e^{j(\mu+\lambda)}\times\cos\delta\times\cos\theta - h_{22}(t)\times b\times e^{j(\omega+\lambda)}\times\sin\delta\times\sin\theta=0 \tag{1561-1}$$

$$h_{11}(t)\times a\times e^{j\mu}\times\sin\delta\times\sin\theta - h_{22}(t)\times b\times e^{j\omega}\times\cos\delta\times\cos\theta=0 \tag{1561-2}$$

Accordingly, it is sufficient if the following holds true.

[MATH. 1562]

$$b = \frac{h_{11}(t)}{h_{22}(t)}\times a\times e^{j(\mu-\omega)} \text{ and} \tag{1562-1}$$

$$\theta = \delta + \frac{\pi}{2} + n\pi \text{ radians } (n \text{ is an integer}) \tag{1562-2}$$

Accordingly, the communications station calculates θ, a, and b from the feedback information from the terminal so that the following is true.

[MATH. 1563]

$$b = \frac{h_{11}(t)}{h_{22}(t)}\times a\times e^{j(\mu-\omega)} \text{ and} \tag{1563-1}$$

$$\theta = -\delta + \frac{\pi}{2} + n\pi \text{ radians } (n \text{ is an integer}) \tag{1563-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1564]

$$|a|^2+|b|^2=|u|^2 \tag{1564}$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (45A-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$.

Mapped signal 305B output by mapper 304B is $s_2(t)$.

Weighted signal 307A output by weighting synthesizer 306A is $z_1(t)$.

Weighted signal 307B output by weighting synthesizer 306B is $z_2(t)$.

The precoding matrix is expressed as follows.

[MATH. 1565]

$$\begin{pmatrix} q_{11} & q_{12} \\ q_{21} & q_{22} \end{pmatrix} \tag{1565}$$

Accordingly, weighting synthesizer 306A calculates the following and outputs weighted signal 307A ($z_1(t)$).

[MATH. 1566]

$$z_1(t)=q_{11}\times e^{j\varepsilon(t)}\times s_1(t)+q_{12}\times e^{j\gamma(t)}\times s_2(t) \tag{1566}$$

Weighting synthesizer 306B calculates the following and outputs weighted signal 307B ($z_2(t)$).

[MATH. 1567]

$$z_2(t)=q_{21}\times e^{j\varepsilon(t)}\times s_1(t)+q_{22}\times e^{j\gamma(t)}\times s_2(t) \tag{1567}$$

Precoding method determiner 316 performs the calculations described in "(precoding method (45A)" based on feedback information from a terminal, and determines the precoding matrix.

[MATH. 1568]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} e^{j\mu}\times\sin\theta & -e^{j(\mu+\lambda)}\times\cos\theta \\ e^{j\omega}\times\cos\theta & e^{j(\omega+\lambda)}\times\sin\theta \end{pmatrix} = \begin{pmatrix} a\times e^{j\mu}\times\sin\theta & -a\times e^{j(\mu+\lambda)}\times\cos\theta \\ b\times e^{j\omega}\times\cos\theta & b\times e^{j(\omega+\lambda)}\times\sin\theta \end{pmatrix} \tag{1568}$$

In other words, the precoding matrix of the above equation is calculated. Here, based on feedback information from a terminal, precoding method determiner 316 uses

[MATH. 1569]

$$b = \frac{h_{11}(t)}{h_{22}(t)}\times a\times e^{j(\mu-\omega)} \tag{1569-1}$$

and $$\theta = \delta + \frac{\pi}{2} + n\pi \text{ radians} \tag{1569-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (45A-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1570]

$$\begin{pmatrix} q_{11} & q_{12} \\ q_{21} & q_{22} \end{pmatrix} \tag{1570}$$

Accordingly, weighting synthesizer 306A calculates the following and outputs weighted signal 307A ($y_1(t)$).

[MATH. 1571]

$$y_1(t)=q_{11}\times e^{j\varepsilon(t)}\times s_1(t)+q_{12}\times e^{j\gamma(t)}\times s_2(t) \tag{1571}$$

Weighting synthesizer 306B calculates the following and outputs weighted signal 307B ($y_2(t)$).

[MATH. 1572]

$$y_2(t)=q_{21}\times e^{j\varepsilon(t)}\times s_1(t)+q_{22}\times e^{j\gamma(t)}\times s_2(t) \tag{1572}$$

Precoding method determiner 316 performs the calculations described in "(precoding method (45A)" based on feedback information from a terminal, and determines the precoding matrix.

[MATH. 1573]

$$\begin{pmatrix} q_{11} & q_{12} \\ q_{21} & q_{22} \end{pmatrix} = \begin{pmatrix} e^{j\mu}\times\sin\theta & -e^{j(\mu+\lambda)}\times\cos\theta \\ e^{j\omega}\times\cos\theta & e^{j(\omega+\lambda)}\times\sin\theta \end{pmatrix} \tag{1573}$$

In other words, the precoding matrix of the above equation and values for a and b are calculated. Here, based on feedback information from a terminal, precoding method determiner 316 uses

[MATH. 1574]

$$b = \frac{h_{11}(t)}{h_{22}(t)}\times a\times e^{j(\mu-\omega)} \tag{1574-1}$$

and $$\theta = \delta + \frac{\pi}{2} + n\pi \text{ radians} \tag{1574-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (45A))

Phase changer 1001A illustrated in FIG. 12 and FIG. 13 receives an input of mapped signal $s_1(t)$ output from mapper 304A, applies a phase-change, and outputs phase-changed signal 1002A ($e^{j\varepsilon(t)}\times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1575]

$$\begin{pmatrix} r_1(t) \\ r_2(t) \end{pmatrix} = \begin{pmatrix} h_{11}(t) & h_{12}(t) \\ h_{21}(t) & h_{22}(t) \end{pmatrix} \begin{pmatrix} z_1(t) \\ z_2(t) \end{pmatrix} + \begin{pmatrix} n_1(t) \\ n_2(t) \end{pmatrix} = \left( \sqrt{\frac{K}{K+1}} \begin{pmatrix} h_{11,d}(t) & h_{12,d}(t) \\ h_{21,d}(t) & h_{22,d}(t) \end{pmatrix} + \sqrt{\frac{1}{K+1}} \begin{pmatrix} h_{11,s}(t) & h_{12,s}(t) \\ h_{21,s}(t) & h_{22,s}(t) \end{pmatrix} \right) \begin{pmatrix} z_1(t) \\ z_2(t) \end{pmatrix} + \begin{pmatrix} n_1(t) \\ n_2(t) \end{pmatrix} \tag{1575}$$

Here, $h_{xy,d}(t)$ is a direct wave component of $h_{xy}(t)$, and $hx_{y,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (45A)" is not satisfied.

(Precoding Method (45B))

In a state such as in FIG. 2, signals $r_1(t)$, $r_2(t)$ that are received by a reception device can be applied as follows (note that δ is greater than or equal to 0 radians and less than 2π radians).

[MATH. 1576]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \tag{1576}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1577]

$$\begin{pmatrix} z_1(t) \\ z_2(t) \end{pmatrix} = \begin{pmatrix} a & 0 \\ 0 & b \end{pmatrix} \begin{pmatrix} e^{j\mu}\times\sin\theta & -e^{j(\mu+\lambda)}\times\cos\theta \\ e^{j\omega}\times\cos\theta & e^{j(\omega+\lambda)}\times\sin\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} \tag{1577}$$

However, a and b are complex numbers (may be actual numbers). j is an imaginary unit, and γ(t) is an argument and a time function.

In this case, the following relation equation holds true.

[MATH. 1578]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} e^{j\mu}\times\sin\theta & -e^{j(\mu+\lambda)}\times\cos\theta \\ e^{j\omega}\times\cos\theta & e^{j(\omega+\lambda)}\times\sin\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} \begin{pmatrix} n_1(t) \\ n_2(t) \end{pmatrix} \\ &= \begin{pmatrix} h_{11}(t)\times a\times e^{j\mu}\times\cos\delta\times\sin\theta - h_{22}(t)\times b\times e^{j\omega}\times\sin\delta\times\cos\theta & -h_{11}(t)\times a\times e^{j(\mu+\lambda)}\times\cos\delta\times\cos\theta - h_{22}(t)\times b\times e^{j(\omega+\lambda)}\times\sin\delta\times\sin\theta \\ h_{11}(t)\times a\times e^{j\mu}\times\sin\delta\times\sin\theta + h_{22}(t)\times b\times e^{j\omega}\times\cos\delta\times\cos\theta & -h_{11}(t)\times a\times e^{j(\mu+\lambda)}\times\sin\delta\times\cos\theta + h_{22}(t)\times b\times e^{j(\omega+\lambda)}\times\cos\delta\times\sin\theta \end{pmatrix} \begin{pmatrix} e^{j\varepsilon(t)}s_1(t) \\ e^{j\gamma(t)}s_2(t) \end{pmatrix} + \begin{pmatrix} n_1(t) \\ n_2(t) \end{pmatrix} \end{aligned} \tag{1578}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1579]

$$h_{11}(t)\times a\times e^{j\mu}\times\cos\delta\times\sin\theta-h_{22}(t)\times b\times e^{j\omega}\times\sin\delta\times\cos\theta=0 \tag{1579-1}$$

$$-h_{11}(t)\times a\times e^{j(\mu+\lambda)}\times\sin\delta\times\cos\theta+h_{22}(t)\times b\times e^{j(\omega+\lambda)}\times\cos\delta\times\sin\theta=0 \tag{1579-2}$$

Accordingly, it is sufficient if the following holds true.

[MATH. 1580]

$$b=\frac{h_{11}(t)}{h_{22}(t)}\times a\times e^{j(\mu-\omega)} \tag{1580-1}$$

and $$\theta=\delta+n\pi \text{ radians} \tag{1580-2}$$

($n$ is an integer)

Accordingly, the communications station calculates θ, a, and b from the feedback information from the terminal so that the following is true.

[MATH. 1581]

$$b=\frac{h_{11}(t)}{h_{22}(t)}\times a\times e^{j(\mu-\omega)} \tag{1581-1}$$

and $$\theta=\delta+n\pi \text{ radians} \tag{1581-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1582]

$$|a|^2+|b|^2=|u|^2 \tag{1582}$$

($|u|^2$ is a parameter based on average transmitted power)

Note that, regarding mapped baseband signal $s_1(t)$ and mapped baseband signal $s_2(t)$, phase-change is implemented, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (45B-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 1583]

$$\begin{pmatrix} q_{11} & q_{12} \\ q_{21} & q_{22} \end{pmatrix} \tag{1583}$$

Accordingly, weighting synthesizer 306A calculates the following and outputs weighted signal 307A ($z_1(t)$).

[MATH. 1584]

$$z_1(t)=q_{11}\times e^{j\varepsilon(t)}\times s_1(t)+q_{12}\times e^{j\gamma(t)}\times s_2(t) \tag{1584}$$

Weighting synthesizer 306B calculates the following and outputs weighted signal 307B ($z_2(t)$).

[MATH. 1585]

$$z_2(t)=q_{21}\times e^{j\varepsilon(t)}\times s_1(t)+q_{22}\times e^{j\gamma(t)}\times s_2(t) \tag{1585}$$

Precoding method determiner 316 performs the calculations described in "(precoding method (45B)" based on feedback information from a terminal, and determines the precoding matrix.

[MATH. 1586]

$$\begin{pmatrix} q_{11} & q_{12} \\ q_{21} & q_{22} \end{pmatrix}=\begin{pmatrix} a & 0 \\ 0 & b \end{pmatrix}\begin{pmatrix} e^{j\mu}\times\sin\theta & -e^{j(\mu+\lambda)}\times\cos\theta \\ e^{j\omega}\times\cos\theta & e^{j(\omega+\lambda)}\times\sin\theta \end{pmatrix}=\begin{pmatrix} a\times e^{j\mu}\times\sin\theta & -a\times e^{j(\mu+\lambda)}\times\cos\theta \\ b\times e^{j\omega}\times\cos\theta & b\times e^{j(\omega+\lambda)}\times\sin\theta \end{pmatrix} \tag{1586}$$

In other words, the precoding matrix of the above equation is calculated. Here, based on feedback information from a terminal, precoding method determiner 316 uses

[MATH. 1587]

$$b=\frac{h_{11}(t)}{h_{22}(t)}\times a\times e^{j(\mu-\omega)} \tag{1587-1}$$

and $$\theta=\delta+n\pi \text{ radians} \tag{1587-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (45B-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1588]

$$\begin{pmatrix} q_{11} & q_{12} \\ q_{21} & q_{22} \end{pmatrix} \tag{1588}$$

Accordingly, weighting synthesizer 306A calculates the following and outputs weighted signal 307A ($y_1(t)$).

[MATH. 1589]

$$y_1(t)=q_{11}\times e^{j\varepsilon(t)}\times s_1(t)+q_{12}\times e^{j\gamma(t)}\times s_2(t) \tag{1589}$$

Weighting synthesizer 306B calculates the following and outputs weighted signal 307B ($y_2(t)$).

[MATH. 1590]

$$y_2(t)=q_{21}\times e^{j\varepsilon(t)}\times s_1(t)+q_{22}\times e^{j\gamma(t)}\times s_2(t) \tag{1590}$$

Precoding method determiner 316 performs the calculations described in "(precoding method (45B)" based on feedback information from a terminal, and determines the precoding matrix.

[MATH. 1591]

$$\begin{pmatrix} q_{11} & q_{12} \\ q_{21} & q_{22} \end{pmatrix} = \begin{pmatrix} e^{j\mu}\times\sin\theta & -e^{j(\mu+\lambda)}\times\cos\theta \\ e^{j\omega}\times\cos\theta & e^{j(\omega+\lambda)}\times\sin\theta \end{pmatrix} \tag{1591}$$

In other words, the precoding matrix of the above equation and values for a and b are calculated. Here, based on feedback information from a terminal, precoding method determiner 316 uses

[MATH. 1592]

$$b = \frac{h_{11}(t)}{h_{22}(t)}\times a\times e^{j(\mu-\omega)} \tag{1592-1}$$

and $$\theta = \delta + n\pi \text{ radians} \quad (n \text{ is an integer}) \tag{1592-2}$$

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (45B))

Phase changer 1001A illustrated in FIG. 12 and FIG. 13 receives an input of mapped signal $s_1(t)$ output from mapper 304A, applies a phase-change, and outputs phase-changed signal 1002A ($e^{j\varepsilon(t)}\times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1593]

$$\begin{aligned} \begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right) \\ &\quad \begin{pmatrix} z_1(t) \\ z_2(t) \end{pmatrix} + \begin{pmatrix} n_1(t) \\ n_2(t) \end{pmatrix} \end{aligned} \tag{1593}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (45B)" is not satisfied.

(Precoding Method (46A))

In a state such as in FIG. 2, signals $r_1(t)$, $r_2(t)$ that are received by a reception device can be applied as follows (note that δ is greater than or equal to 0 radians and less than 2π radians).

[MATH. 1594]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \tag{1594}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1595]

$$\begin{pmatrix} z_1(t) \\ z_2(t) \end{pmatrix} = \begin{pmatrix} a & 0 \\ 0 & b \end{pmatrix} \begin{pmatrix} \beta\times e^{j\mu}\times\sin\theta & -\beta\times e^{j(\mu+\lambda)}\times\cos\theta \\ \beta\times e^{j\omega}\times\cos\theta & \beta\times e^{j(\omega+\lambda)}\times\sin\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} \tag{1595}$$

However, a and b are complex numbers (may be actual numbers). j is an imaginary unit, and γ(t) is an argument and a time function.

In this case, the following equation holds true.

[MATH. 1596]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\sin\delta \\ h_{11}(t)\times\sin\delta & h_{22}(t)\times\cos\delta \end{pmatrix} \begin{pmatrix} a & 0 \\ 0 & b \end{pmatrix} \\ &\quad \begin{pmatrix} \beta\times e^{j\mu}\times\sin\theta & -\beta\times e^{j(\mu+\lambda)}\times\cos\theta \\ \beta\times e^{j\omega}\times\cos\theta & \beta\times e^{j(\omega+\lambda)}\times\sin\theta \end{pmatrix} \begin{pmatrix} e^{j\varepsilon(t)} & 0 \\ 0 & e^{j\gamma(t)} \end{pmatrix} \\ &\quad \begin{pmatrix} s_1(t) \\ s_2(t) \end{pmatrix} \begin{pmatrix} n_1(t) \\ n_2(t) \end{pmatrix} \\ &= \begin{pmatrix} \begin{matrix} h_{11}(t)\times a\times\beta\times e^{j\mu}\cos\delta\times\sin\theta - \\ h_{22}(t)\times b\times\beta\times e^{j\omega}\times\sin\delta\times\cos\theta \end{matrix} & \begin{matrix} -h_{11}(t)\times a\times\beta\times e^{j(\mu+\lambda)}\times\cos\delta\times\cos\theta - \\ h_{22}(t)\times b\times\beta\times e^{j(\omega+\lambda)}\times\sin\delta\times\sin\theta \end{matrix} \\ \begin{matrix} h_{11}(t)\times a\times\beta\times e^{j\mu}\sin\delta\times\sin\theta + \\ h_{22}(t)\times b\times\beta\times e^{j\omega}\times\cos\delta\times\cos\theta \end{matrix} & \begin{matrix} -h_{11}(t)\times a\times\beta\times e^{j(\mu+\lambda)}\times\sin\delta\times\cos\theta + \\ h_{22}(t)\times b\times\beta\times e^{j(\omega+\lambda)}\times\cos\delta\times\sin\theta \end{matrix} \end{pmatrix} \\ &\quad \begin{pmatrix} e^{j\varepsilon(t)}s_1(t) \\ e^{j\gamma(t)}s_2(t) \end{pmatrix} + \begin{pmatrix} n_1(t) \\ n_2(t) \end{pmatrix} \end{aligned} \tag{1596}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1597]

$$-h_{11}(t)\times a\times\beta\times e^{j(\mu+\lambda)}\times\cos\delta\times\cos\theta - h_{22}(t)\times b\times\beta\times e^{j(\omega+\lambda)}\times\sin\delta\times\sin\theta = 0 \tag{1597-1}$$

$$h_{11}(t)\times a\times\beta\times e^{j\mu}\times\sin\delta\times\sin\theta - h_{22}(t)\times b\times\beta\times e^{j\omega}\times\cos\delta\times\cos\theta = 0 \tag{1597-2}$$

Accordingly, it is sufficient if the following holds true.

[MATH. 1598]

$$b = \frac{h_{11}(t)}{h_{22}(t)}\times a\times e^{j(\mu-\omega)} \tag{1598-1}$$

and $$\theta = \delta + \frac{\pi}{2} + n\pi \text{ radians} \tag{1598-2}$$

($n$ is an integer)

Accordingly, the communications station calculates θ, a, and b from the feedback information from the terminal so that the following is true.

[MATH. 1599]

$$b = \frac{h_{11}(t)}{h_{22}(t)} \times a \times e^{j(\mu-\omega)} \quad (1599\text{-}1)$$

and $$\theta = \delta + \frac{\pi}{2} + n\pi \text{ radians} \quad (1599\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1600]

$$|a|^2+|b|^2=|u|^2 \quad (1600)$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (46A-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$.

Mapped signal 305B output by mapper 304B is $s_2(t)$.

Weighted signal 307A output by weighting synthesizer 306A is $z_1(t)$.

Weighted signal 307B output by weighting synthesizer 306B is $z_2(t)$.

The precoding matrix is expressed as follows.

[MATH. 1601]

$$\begin{pmatrix} q_{11} & q_{12} \\ q_{21} & q_{22} \end{pmatrix} \quad (1601)$$

Accordingly, weighting synthesizer 306A calculates the following and outputs weighted signal 307A ($z_1(t)$).

[MATH. 1602]

$$z_1(t)=q_{11}\times e^{j\varepsilon(t)}\times s_1(t)+q_{12}\times e^{j\gamma(t)}\times s_2(t) \quad (1602)$$

Weighting synthesizer 306B calculates the following and outputs weighted signal 307B ($z_2(t)$).

[MATH. 1603]

$$z_2(t)=q_{21}\times e^{j\varepsilon(t)}\times s_1(t)+q_{22}\times e^{j\gamma(t)}\times s_2(t) \quad (1603)$$

Precoding method determiner 316 performs the calculations described in "(precoding method (46A)" based on feedback information from a terminal, and determines the precoding matrix.

[MATH. 1604]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \beta\times e^{j\mu}\times\sin\theta & -\beta\times e^{j(\mu+\lambda)}\times\cos\theta \\ \beta\times e^{j\omega}\times\cos\theta & \beta\times e^{j(\omega+\lambda)}\times\sin\theta \end{pmatrix} = \begin{pmatrix} a\times\beta\times e^{j\mu}\times\sin\theta & -a\times\beta\times e^{j(\mu+\lambda)}+\cos\theta \\ b\times\beta\times e^{j\omega}\times\cos\theta & b\times\beta\times e^{j(\omega+\lambda)}\times\sin\theta \end{pmatrix} \quad (1604)$$

In other words, the precoding matrix of the above equation is calculated. Here, based on feedback information from a terminal, precoding method determiner 316 uses

[MATH. 1605]

$$b = \frac{h_{11}(t)}{h_{22}(t)} \times a \times e^{j(\mu-\omega)} \quad (1605\text{-}1)$$

and $$\theta = \delta + \frac{\pi}{2} + n\pi \text{ radians} \quad (1605\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (46A-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$.

Mapped signal 305B output by mapper 304B is $s_2(t)$.

Weighted signal 307A output by weighting synthesizer 306A is $y_1(t)$.

Weighted signal 307B output by weighting synthesizer 306B is $y_2(t)$.

Coefficient multiplied signal 402A output by coefficient multiplier 401A is $z_1(t)$.

Coefficient multiplied signal 402B output by coefficient multiplier 401B is $z_2(t)$.

The precoding matrix is expressed as follows.

[MATH. 1606]

$$\begin{pmatrix} q_{11} & q_{12} \\ q_{21} & q_{22} \end{pmatrix} \quad (1606)$$

Accordingly, weighting synthesizer 306A calculates the following and outputs weighted signal 307A ($y_1(t)$).

[MATH. 1607]

$$y_1(t)=q_{11}\times e^{j\varepsilon(t)}\times s_1(t)+q_{12}\times e^{j\gamma(t)}\times s_2(t) \quad (1607)$$

Weighting synthesizer 306B calculates the following and outputs weighted signal 307B ($y_2(t)$).

[MATH. 1608]

$$y_2(t)=q_{21}\times e^{j\varepsilon(t)}\times s_1(t)+q_{22}\times e^{j\gamma(t)}\times s_2(t) \quad (1608)$$

Precoding method determiner 316 performs the calculations described in "(precoding method (46A)" based on feedback information from a terminal, and determines the precoding matrix.

[MATH. 1609]

$$\begin{pmatrix} q_{11} & q_{12} \\ q_{21} & q_{22} \end{pmatrix} = \begin{pmatrix} \beta\times e^{j\mu}\times\sin\theta & -\beta\times e^{j(\mu+\lambda)}\times\cos\theta \\ \beta\times e^{j\omega}\times\cos\theta & \beta\times e^{j(\omega+\lambda)}\times\sin\theta \end{pmatrix} \quad (1609)$$

In other words, the precoding matrix of the above equation and values for a and b are calculated. Here, based on feedback information from a terminal, precoding method determiner 316 uses

[MATH. 1610]

$$b = \frac{h_{11}(t)}{h_{22}(t)}\times a\times e^{j(\mu-\omega)} \quad (1610\text{-}1)$$

and $$\theta = \delta + \frac{\pi}{2} + n\pi \text{ radians} \quad (1610\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (46A))

Phase changer 1001A illustrated in FIG. 12 and FIG. 13 receives an input of mapped signal $s_1(t)$ output from mapper 304A, applies a phase-change, and outputs phase-changed signal 1002A ($e^{j\varepsilon(t)}\times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1611]

$$\begin{aligned} \begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right) \\ &\quad \begin{pmatrix} z_1(t) \\ z_2(t) \end{pmatrix} + \begin{pmatrix} n_1(t) \\ n_2(t) \end{pmatrix} \end{aligned} \quad (1611)$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (46A)" is not satisfied.

(Precoding Method (46B))

In a state such as in FIG. 2, signals $r_1(t)$, $r_2(t)$ that are received by a reception device can be applied as follows (note that δ is greater than or equal to 0 radians and less than 2π radians).

[MATH. 1612]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \tag{1612}$$

Here, when $z_1(t)=s_1(t)$ and $z_2(t)=s_2(t)$ ($s_1(t)$ and $s_2(t)$ are mapped baseband signals), excluding when $\delta=0$, $\pi/2$, $\pi$, or $3\pi/2$ radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1613]

$$\begin{pmatrix} z_1(t) \\ z_2(t) \end{pmatrix} = \begin{pmatrix} a & 0 \\ 0 & b \end{pmatrix} \begin{pmatrix} \beta\times e^{j\mu}\times\sin\theta & -\beta\times e^{j(\mu+\lambda)}\times\cos\theta \\ \beta\times e^{j\omega}\times\cos\theta & \beta\times e^{j(\omega+\lambda)}\times\sin\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} \tag{1613}$$

However, a and b are complex numbers (may be actual numbers). j is an imaginary unit, and $\gamma(t)$ is an argument and a time function.

In this case, the following relation equation holds true.

[MATH. 1614]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \\ &\quad \begin{pmatrix} \beta\times e^{j\mu}\times\sin\theta & -\beta\times e^{j(\mu+\lambda)}\times\cos\theta \\ \beta\times e^{j\omega}\times\cos\theta & \beta\times e^{j(\omega+\lambda)}\times\sin\theta \end{pmatrix} \\ &\quad \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} \begin{matrix} h_{11}(t)\times a\times\beta\times \\ e^{j\mu}\times\cos\delta\times\sin\theta - \\ h_{22}(t)\times b\times\beta\times \\ e^{j\omega}\times\sin\delta\times\cos\theta \end{matrix} & \begin{matrix} -h_{11}(t)\times a\times\beta\times \\ e^{j(\mu+\lambda)}\times\cos\delta\times\cos\theta - \\ h_{22}(t)\times b\times\beta\times \\ e^{j(\omega+\lambda)}\times\sin\delta\times\sin\theta \end{matrix} \\ \begin{matrix} h_{11}(t)\times a\times\beta\times \\ e^{j\mu}\times\sin\delta\times\sin\theta + \\ h_{22}(t)\times b\times\beta\times \\ e^{j\omega}\times\cos\delta\times\cos\theta \end{matrix} & \begin{matrix} -h_{11}(t)\times a\times\beta\times \\ e^{j(\mu+\lambda)}\times\sin\delta\times\cos\theta + \\ h_{22}(t)\times b\times\beta\times \\ e^{j(\omega+\lambda)}\times\cos\delta\times\sin\theta \end{matrix} \end{pmatrix} \\ &\quad \begin{pmatrix} e^{j\varepsilon(t)}s_1(t) \\ e^{j\gamma(t)}s_2(t) \end{pmatrix} + \begin{pmatrix} n_1(t) \\ n_2(t) \end{pmatrix} \end{aligned} \tag{1614}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1615]

$$h_{11}(t)\times a\times\beta\times e^{j\mu}\times\cos\delta\times\sin\theta - h_{22}(t)\times b\times\beta\times e^{j\omega}\times\sin\delta\times\cos\theta=0 \tag{1615-1}$$

$$-h_{11}(t)\times a\times\beta\times e^{j(\mu+\lambda)}\times\sin\delta\times\cos\theta - h_{22}(t)\times b\times\beta\times e^{j(\omega+\lambda)}\times\cos\delta\times\sin\theta=0 \tag{1615-2}$$

Accordingly, it is sufficient if the following holds true.

[MATH. 1616]

$$b = \frac{h_{11}(t)}{h_{22}(t)}\times a\times e^{j(\mu-\omega)} \tag{1616-1}$$

and $$\theta = \delta + n\pi \text{ radians} \tag{1616-2}$$

($n$ is an integer)

Accordingly, the communications station calculates θ, a, and b from the feedback information from the terminal so that the following is true.

[MATH. 1617]

$$b = \frac{h_{11}(t)}{h_{22}(t)}\times a\times e^{j(\mu-\omega)} \tag{1617-1}$$

and $$\theta = \delta + n\pi \text{ radians} \tag{1617-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1618]

$$|a|^2+|b|^2=|u|^2 \tag{1618}$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (46B-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$.

Mapped signal 305B output by mapper 304B is $s_2(t)$.

Weighted signal 307A output by weighting synthesizer 306A is $z_1(t)$.

Weighted signal 307B output by weighting synthesizer 306B is $z_2(t)$.

The precoding matrix is expressed as follows.

[MATH. 1619]

$$\begin{pmatrix} q_{11} & q_{12} \\ q_{21} & q_{22} \end{pmatrix} \quad (1619)$$

Accordingly, weighting synthesizer 306A calculates the following and outputs weighted signal 307A ($z_1(t)$).

[MATH. 1620]

$$z_1(t)=q_{11}\times e^{j\varepsilon(t)}\times s_1(t)+q_{12}\times e^{j\gamma(t)}\times s_2(t) \quad (1620)$$

Weighting synthesizer 306B calculates the following and outputs weighted signal 307B ($z_2(t)$).

[MATH. 1621]

$$z_2(t)=q_{21}\times e^{j\varepsilon(t)}\times s_1(t)+q_{22}\times e^{j\gamma(t)}\times s_2(t) \quad (1621)$$

Precoding method determiner 316 performs the calculations described in "(precoding method (46B)" based on feedback information from a terminal, and determines the precoding matrix.

[MATH. 1622]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} \beta\times e^{j\mu}\times\sin\theta & -\beta\times e^{j(\mu+\lambda)}\times\cos\theta \\ \beta\times e^{j\omega}\times\cos\theta & \beta\times e^{j(\omega+\lambda)}\times\sin\theta \end{pmatrix} = \begin{pmatrix} a\times\beta\times e^{j\mu}\times\sin\theta & -a\times\beta\times e^{j(\mu+\lambda)}\times\cos\theta \\ b\times\beta\times e^{j\omega}\times\cos\theta & b\times\beta\times e^{j(\omega+\lambda)}\times\sin\theta \end{pmatrix} \quad (1622)$$

In other words, the precoding matrix of the above equation is calculated. Here, based on feedback information from a terminal, precoding method determiner 316 uses

[MATH. 1623]

$$b=\frac{h_{11}(t)}{h_{22}(t)}\times a\times e^{j(\mu-\omega)} \quad (1623\text{-}1)$$

and $$\theta=\delta+n\pi \text{ radians} \quad (1623\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$).

Similarly, based on the values of $q_{21}$ and $q_{22}$, weighting synthesizer 306B performs weighting synthesis calculations, and outputs weighted signal 307B ($z_2(t)$).

(Precoding Method (46B-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$.

Mapped signal 305B output by mapper 304B is $s_2(t)$.

Weighted signal 307A output by weighting synthesizer 306A is $y_1(t)$.

Weighted signal 307B output by weighting synthesizer 306B is $y_2(t)$.

Coefficient multiplied signal 402A output by coefficient multiplier 401A is $z_1(t)$.

Coefficient multiplied signal 402B output by coefficient multiplier 401B is $z_2(t)$.

The precoding matrix is expressed as follows.

[MATH. 1624]

$$\begin{pmatrix} q_{11} & q_{12} \\ q_{21} & q_{22} \end{pmatrix} \quad (1624)$$

Accordingly, weighting synthesizer 306A calculates the following and outputs weighted signal 307A ($y_1(t)$).

[MATH. 1625]

$$y_1(t)=q_{11}\times e^{j\varepsilon(t)}\times s_1(t)+q_{12}\times e^{j\gamma(t)}\times s_2(t) \quad (1625)$$

Weighting synthesizer 306B calculates the following and outputs weighted signal 307B ($y_2(t)$).

[MATH. 1626]

$$y_2(t)=q_{21}\times e^{j\varepsilon(t)}\times s_1(t)+q_{22}\times e^{j\gamma(t)}\times s_2(t) \quad (1626)$$

Precoding method determiner 316 performs the calculations described in "(precoding method (46B)" based on feedback information from a terminal, and determines the precoding matrix.

[MATH. 1627]

$$\begin{pmatrix} q_{11} & q_{12} \\ q_{21} & q_{22} \end{pmatrix} = \begin{pmatrix} \beta\times e^{j\mu}\times\sin\theta & -\beta\times e^{j(\mu+\lambda)}\times\cos\theta \\ \beta\times e^{j\omega}\times\cos\theta & \beta\times e^{j(\omega+\lambda)}\times\sin\theta \end{pmatrix} \quad (1627)$$

In other words, the precoding matrix of the above equation and values for a and b are calculated. Here, based on feedback information from a terminal, precoding method determiner 316 uses

[MATH. 1628]

$$b=\frac{h_{11}(t)}{h_{22}(t)}\times a\times e^{j(\mu-\omega)} \quad (1628\text{-}1)$$

and $$\theta=\delta+n\pi \text{ radians} \quad (1628\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (46B))

Phase changer 1001A illustrated in FIG. 12 and FIG. 13 receives an input of mapped signal $s_1(t)$ output from mapper 304A, applies a phase-change, and outputs phase-changed signal 1002A ($e^{j\varepsilon(t)}\times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1629]

$$\begin{aligned}\begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right) \\ &\quad \begin{pmatrix} z_1(t) \\ z_2(t) \end{pmatrix} + \begin{pmatrix} n_1(t) \\ n_2(t) \end{pmatrix}\end{aligned} \tag{1629}$$

Here, $h_{xy,d}(t)$ is a direct wave component of $h_{xy}(t)$, and $h_{xy,s}(t)$ is a scattered wave component of $h_{xy}(t)$. ($x=1, 2$; $y=1, 2$) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (46B)" is not satisfied.

(Precoding Method (47A))

In a state such as in FIG. 2, signals $r_1(t)$, $r_2(t)$ that are received by a reception device can be applied as follows (note that δ is greater than or equal to 0 radians and less than 2π radians).

[MATH. 1630]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\cos\delta & -h_{22}(t)\sin\delta \\ h_{11}(t)\sin\delta & h_{22}(t)\cos\delta \end{pmatrix}\begin{pmatrix} z_1(t) \\ z_2(t) \end{pmatrix} + \begin{pmatrix} n_1(t) \\ n_2(t) \end{pmatrix}\end{aligned} \tag{1630}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1631]

$$\begin{pmatrix} z_1(t) \\ z_2(t) \end{pmatrix} = \begin{pmatrix} a & 0 \\ 0 & b \end{pmatrix}\begin{pmatrix} e^{j\mu}\times\sin\theta & e^{j(\mu+\lambda)}\times\cos\theta \\ e^{j\omega}\times\cos\theta & -e^{j(\omega+\lambda)}\times\sin\theta \end{pmatrix}\begin{pmatrix} e^{j\varepsilon(t)} & 0 \\ 0 & e^{j\gamma(t)} \end{pmatrix}\begin{pmatrix} s_1(t) \\ s_2(t) \end{pmatrix} \tag{1631}$$

However, a and b are complex numbers (may be actual numbers). j is an imaginary unit, and γ(t) is an argument and a time function.

In this case, the following equation holds true.

[MATH. 1632]

$$\begin{aligned}\begin{pmatrix} r_1(t) \\ r_2(t) \end{pmatrix} &= \begin{pmatrix} \cos\delta & -\sin\delta \\ \sin\delta & \cos\delta \end{pmatrix}\begin{pmatrix} h_{11}(t) & 0 \\ 0 & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix}\begin{pmatrix} a & 0 \\ 0 & b \end{pmatrix} \\ &\quad \begin{pmatrix} e^{j\mu}\times\sin\theta & e^{j(\mu+\lambda)}\times\cos\theta \\ e^{j\omega}\times\cos\theta & -e^{j(\omega+\lambda)}\times\sin\theta \end{pmatrix} \\ &\quad \begin{pmatrix} e^{j\varepsilon(t)} & 0 \\ 0 & e^{j\gamma(t)} \end{pmatrix}\begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times e^{j\mu}\times\cos\delta\times\sin\theta - h_{22}(t)\times b\times e^{j\omega}\times\sin\delta\times\cos\theta & h_{11}(t)\times a\times e^{j(\mu+\lambda)}\times\cos\delta\times\cos\theta + h_{22}(t)\times b\times e^{j(\omega+\lambda)}\times\sin\delta\times\sin\theta \\ h_{11}(t)\times a\times e^{j\mu}\times\sin\delta\times\sin\theta + h_{22}(t)\times b\times e^{j\omega}\times\cos\delta\times\cos\theta & h_{11}(t)\times a\times e^{j(\mu+\lambda)}\times\sin\delta\times\cos\theta - h_{22}(t)\times b\times e^{j(\omega+\lambda)}\times\cos\delta\times\sin\theta \end{pmatrix} \\ &\quad \begin{pmatrix} e^{j\varepsilon(t)}s_1(t) \\ e^{j\gamma(t)}s_2(t) \end{pmatrix} + \begin{pmatrix} n_1(t) \\ n_2(t) \end{pmatrix}\end{aligned} \tag{1632}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1633]

$$h_{11}(t)\times a\times e^{j(\mu+\lambda)}\times\cos\delta\times\cos\theta+h_{22}(t)\times b\times e^{j(\omega+\lambda)}\times\sin\delta\times\sin\theta=0 \quad (1633\text{-}1)$$

$$h_{11}(t)\times a\times e^{j\mu}\times\sin\delta\times\sin\theta-h_{22}(t)\times b\times e^{j\omega}\times\cos\delta\times\sin\theta=0 \quad (1633\text{-}2)$$

Accordingly, it is sufficient if the following holds true.

[MATH. 1634]

$$b=\frac{h_{11}(t)}{h_{22}(t)}\times a\times e^{j(\mu-\omega)} \quad (1634\text{-}1)$$

and $$\theta=\delta+\frac{\pi}{2}+n\pi \text{ radians} \quad (1634\text{-}2)$$

($n$ is an integer)

Accordingly, the communications station calculates θ, a, and b from the feedback information from the terminal so that the following is true.

[MATH. 1635]

$$b=\frac{h_{11}(t)}{h_{22}(t)}\times a\times e^{j(\mu-\omega)} \quad (1635\text{-}1)$$

and $$\theta=\delta+\frac{\pi}{2}+n\pi \text{ radians} \quad (1635\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1636]

$$|a|^2+|b|^2=|u|^2 \quad (1636)$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (47A-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 1637]

$$\begin{pmatrix} q_{11} & q_{12} \\ q_{21} & q_{22} \end{pmatrix} \quad (1637)$$

Accordingly, weighting synthesizer 306A calculates the following and outputs weighted signal 307A ($z_1(t)$).

[MATH. 1638]

$$z_1(t)=q_{11}\times e^{j\varepsilon(t)}\times s_1(t)+q_{12}\times e^{j\gamma(t)}\times s_2(t) \quad (1638)$$

Weighting synthesizer 306B calculates the following and outputs weighted signal 307B ($z_2(t)$).

[MATH. 1639]

$$z_2(t)=q_{21}\times e^{j\varepsilon(t)}\times s_1(t)+q_{22}\times e^{j\gamma(t)}\times s_2(t) \quad (1639)$$

Precoding method determiner 316 performs the calculations described in "(precoding method (47A)" based on feedback information from a terminal, and determines the precoding matrix.

[MATH. 1640]

$$\begin{pmatrix} q_{11} & q_{12} \\ q_{21} & q_{22} \end{pmatrix}=\begin{pmatrix} a & 0 \\ 0 & b \end{pmatrix}\begin{pmatrix} e^{j\mu}\times\sin\theta & e^{j(\mu+\lambda)}\times\cos\theta \\ e^{j\omega}\times\cos\theta & -e^{j(\omega+\lambda)}\times\sin\theta \end{pmatrix}=\begin{pmatrix} a\times e^{j\mu}\times\sin\theta & a\times e^{j(\mu+\lambda)}\times\cos\theta \\ b\times e^{j\omega}\times\cos\theta & -b\times e^{j(\omega+\lambda)}\times\sin\theta \end{pmatrix} \quad (1640)$$

In other words, the precoding matrix of the above equation is calculated. Here, based on feedback information from a terminal, precoding method determiner 316 uses

[MATH. 1641]

$$b=\frac{h_{11}(t)}{h_{22}(t)}\times a\times e^{j(\mu-\omega)} \quad (1641\text{-}1)$$

and $$\theta=\delta+\frac{\pi}{2}+n\pi \text{ radians} \quad (1641\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (47A-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1642]

$$\begin{pmatrix} q_{11} & q_{12} \\ q_{21} & q_{22} \end{pmatrix} \quad (1642)$$

Accordingly, weighting synthesizer 306A calculates the following and outputs weighted signal 307A ($y_1(t)$).

[MATH. 1643]

$$y_1(t)=q_{11}\times e^{j\varepsilon(t)}\times s_1(t)+q_{12}\times e^{j\gamma(t)}\times s_2(t) \quad (1643)$$

Weighting synthesizer 306B calculates the following and outputs weighted signal 307B ($y_2(t)$).

[MATH. 1644]

$$y_2(t)=q_{21}\times e^{j\varepsilon(t)}\times s_1(t)+q_{22}\times e^{j\gamma(t)}\times s_2(t) \quad (1644)$$

Precoding method determiner 316 performs the calculations described in "(precoding method (47A)" based on feedback information from a terminal, and determines the precoding matrix.

[MATH. 1645)

$$\begin{pmatrix} q_{11} & q_{12} \\ q_{21} & q_{22} \end{pmatrix} = \begin{pmatrix} e^{j\mu}\times\sin\theta & e^{j(\mu+\lambda)}\times\cos\theta \\ e^{j\omega}\times\cos\theta & -e^{j(\omega+\lambda)}\times\sin\theta \end{pmatrix} \quad (1645)$$

In other words, the precoding matrix of the above equation and values for a and b are calculated. Here, based on feedback information from a terminal, precoding method determiner 316 uses

[MATH. 1646]

$$b = \frac{h_{11}(t)}{h_{22}(t)}\times a\times e^{j(\mu-\omega)} \quad (1646\text{-}1)$$

and $$\theta = \delta + \frac{\pi}{2} + n\pi \text{ radians} \quad (1646\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (47A))

Phase changer 1001A illustrated in FIG. 12 and FIG. 13 receives an input of mapped signal $s_1(t)$ output from mapper 304A, applies a phase-change, and outputs phase-changed signal 1002A ($e^{j\varepsilon(t)}\times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1647]

$$\begin{aligned} \begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right) \\ &\quad \begin{pmatrix} z_1(t) \\ z_2(t) \end{pmatrix} + \begin{pmatrix} n_1(t) \\ n_2(t) \end{pmatrix} \end{aligned} \quad (1647)$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (47A)" is not satisfied.

(Precoding Method (47B))

In a state such as in FIG. 2, signals $r_1(t)$, $r_2(t)$ that are received by a reception device can be applied as follows (note that δ is greater than or equal to 0 radians and less than 2π radians).

[MATH. 1648]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \tag{1648}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1649]

$$\begin{pmatrix} z_1(t) \\ z_2(t) \end{pmatrix} = \begin{pmatrix} a & 0 \\ 0 & b \end{pmatrix} \begin{pmatrix} e^{j\mu}\times\sin\theta & e^{j(\mu+\lambda)}\times\cos\theta \\ e^{j\omega}\times\cos\theta & -e^{j(\omega+\lambda)}\times\sin\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} \tag{1649}$$

However, a and b are complex numbers (may be actual numbers). j is an imaginary unit, and γ(t) is an argument and a time function.

In this case, the following relation equation holds true.

[MATH. 1650]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \\ &\quad \begin{pmatrix} e^{j\mu}\times\sin\theta & e^{j(\mu+\lambda)}\times\cos\theta \\ e^{j\omega}\times\cos\theta & -e^{j(\omega+\lambda)}\times\sin\theta \end{pmatrix} \\ &\quad \begin{pmatrix} e^{j\delta}(t) & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times e^{j\mu}\times \cos\delta\times\sin\theta - h_{22}(t)\times b\times e^{j\omega}\times \sin\delta\times\cos\theta & h_{11}(t)\times a\times e^{j(\mu+\lambda)}\times \cos\delta\times\cos\theta + h_{22}(t)\times b\times e^{j(\omega+\lambda)}\times \sin\delta\times\sin\theta \\ h_{11}(t)\times a\times e^{j\mu}\times \sin\delta\times\sin\theta + h_{22}(t)\times b\times e^{j\omega}\times \cos\delta\times\cos\theta & h_{11}(t)\times a\times e^{j(\mu+\lambda)}\times \sin\delta\times\cos\theta - h_{22}(t)\times b\times e^{j(\omega+\lambda)}\times \cos\delta\times\sin\theta \end{pmatrix} \\ &\quad \begin{pmatrix} e^{j\delta}(t)s_1(t) \\ e^{j\gamma}(t)s_2(t) \end{pmatrix} + \begin{pmatrix} n_1(t) \\ n_2(t) \end{pmatrix} \end{aligned} \tag{1650}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1651]

$$h_{11}(t)\times a\times e^{j\mu}\times\cos\delta\times\sin\theta - h_{22}(t)\times b\times e^{j\omega}\times\sin\delta\times\cos\theta=0 \tag{1651-1}$$

$$h_{11}(t)\times a\times e^{j(\mu+\lambda)}\times\sin\delta\times\cos\theta - h_{22}(t)\times b\times e^{j(\omega+\lambda)}\times\cos\delta\times\sin\theta=0 \tag{1075-2}$$

Accordingly, it is sufficient if the following holds true.

[MATH. 1652]

$$b = \frac{h_{11}(t)}{h_{22}(t)}\times a\times e^{j(\mu-\omega)} \tag{1652-1}$$

and $$\theta = \delta + n\pi \text{ radians} \tag{1652-2}$$

($n$ is an integer)

Accordingly, the communications station calculates θ, a, and b from the feedback information from the terminal so that the following is true.

[MATH. 1653]

$$b = \frac{h_{11}(t)}{h_{22}(t)}\times a\times e^{j(\mu-\omega)} \tag{1653-1}$$

and $$\theta = \delta + n\pi \text{ radians} \tag{1653-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1654]

$$|a|^2+|b|^2=|u|^2 \tag{1654}$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (47B-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$. Mapped signal 305B output by mapper 304B is $s_2(t)$.

Weighted signal 307A output by weighting synthesizer 306A is $z_1(t)$. Weighted signal 307B output by weighting synthesizer 306B is $z_2(t)$.

The precoding matrix is expressed as follows.

[MATH. 1655]

$$\begin{pmatrix} q_{11} & q_{12} \\ q_{21} & q_{22} \end{pmatrix} \quad (1655)$$

Accordingly, weighting synthesizer 306A calculates the following and outputs weighted signal 307A ($z_1(t)$).

[MATH. 1656]

$$z_1(t)=q_{11}\times e^{j\varepsilon(t)}\times s_1(t)+q_{12}\times e^{j\gamma(t)}\times s_2(t) \quad (1656)$$

Weighting synthesizer 306B calculates the following and outputs weighted signal 307B ($z_2(t)$).

[MATH. 1657]

$$z_2(t)=q_{21}\times e^{j\varepsilon(t)}\times s_1(t)+q_{22}+e^{j\gamma(t)}\times s_2(t) \quad (1657)$$

Precoding method determiner 316 performs the calculations described in "(precoding method (47B)" based on feedback information from a terminal, and determines the precoding matrix.

[MATH. 1658]

$$\begin{pmatrix} q_{11} & q_{12} \\ q_{21} & q_{22} \end{pmatrix} = \begin{pmatrix} a & 0 \\ 0 & b \end{pmatrix}\begin{pmatrix} e^{j\mu}\times\sin\theta & e^{j(\mu+\lambda)}\times\cos\theta \\ e^{j\omega}\times\cos\theta & -e^{j(\omega+\lambda)}\times\sin\theta \end{pmatrix} = \begin{pmatrix} a\times e^{j\mu}\times\sin\theta & a\times e^{j(\mu+\lambda)}\times\cos\theta \\ b\times e^{j\omega}\times\cos\theta & -b\times e^{j(\omega+\lambda)}\times\sin\theta \end{pmatrix} \quad (1658)$$

In other words, the precoding matrix of the above equation is calculated. Here, based on feedback information from a terminal, precoding method determiner 316 uses

[MATH. 1659]

$$b=\frac{h_{11}(t)}{h_{22}(t)}\times a\times e^{j(\mu-\omega)} \quad (1659\text{-}1)$$

and $$\theta=\delta+n\pi \text{ radians} \quad (1659\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$).

Similarly, based on the values of $q_{21}$ and $q_{22}$, weighting synthesizer 306B performs weighting synthesis calculations, and outputs weighted signal 307B ($z_2(t)$).

(Precoding Method (47B-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1660]

$$\begin{pmatrix} q_{11} & q_{12} \\ q_{21} & q_{22} \end{pmatrix} \quad (1660)$$

Accordingly, weighting synthesizer 306A calculates the following and outputs weighted signal 307A ($y_1(t)$).

[MATH. 1661]

$$y_1(t)=q_{11}\times e^{j\varepsilon(t)}\times s_1(t)+q_{12}\times e^{j\gamma(t)}\times s_2(t) \quad (1661)$$

Weighting synthesizer 306B calculates the following and outputs weighted signal 307B ($y_2(t)$).

[MATH. 1662]

$$y_2(t)=q_{21}\times e^{j\varepsilon(t)}\times s_1(t)+q_{22}\times e^{j\gamma(t)}\times s_2(t) \quad (1662)$$

Precoding method determiner 316 performs the calculations described in "(precoding method (47B)" based on feedback information from a terminal, and determines the precoding matrix.

[MATH. 1663]

$$\begin{pmatrix} q_{11} & q_{12} \\ q_{21} & q_{22} \end{pmatrix} = \begin{pmatrix} e^{j\mu}\times\sin\theta & e^{j(\mu+\lambda)}\times\cos\theta \\ e^{j\omega}\times\cos\theta & -e^{j(\omega+\lambda)}\times\sin\theta \end{pmatrix} \quad (1663)$$

In other words, the precoding matrix of the above equation and values for a and b are calculated. Here, based on feedback information from a terminal, precoding method determiner 316 uses

[MATH. 1664]

$$b=\frac{h_{11}(t)}{h_{22}(t)}\times a\times e^{j(\mu-\omega)} \quad (1664\text{-}1)$$

and $$\theta=\delta+n\pi \text{ radians} \quad (1664\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (47B))

Phase changer 1001A illustrated in FIG. 12 and FIG. 13 receives an input of mapped signal $s_1(t)$ output from mapper 304A, applies a phase-change, and outputs phase-changed signal 1002A ($e^{j\varepsilon(t)}\times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1665]

$$\begin{pmatrix} r_1(t)\\ r_2(t)\end{pmatrix} = \begin{pmatrix} h_{11}(t) & h_{12}(t)\\ h_{21}(t) & h_{22}(t)\end{pmatrix}\begin{pmatrix} z_1(t)\\ z_2(t)\end{pmatrix} + \begin{pmatrix} n_1(t)\\ n_2(t)\end{pmatrix} = \left(\sqrt{\frac{K}{K+1}}\begin{pmatrix} h_{11,d}(t) & h_{12,d}(t)\\ h_{21,d}(t) & h_{22,d}(t)\end{pmatrix} + \sqrt{\frac{1}{K+1}}\begin{pmatrix} h_{11,s}(t) & h_{12,s}(t)\\ h_{21,s}(t) & h_{22,s}(t)\end{pmatrix}\right)\begin{pmatrix} z_1(t)\\ z_2(t)\end{pmatrix} + \begin{pmatrix} n_1(t)\\ n_2(t)\end{pmatrix} \tag{1665}$$

Here, $h_{xy,\,d}(t)$ is a direct wave component of $h_{xy}(t)$, and $hx_{y,\,s}(t)$ is a scattered wave component of $h_{xy}(t)$. ($x=1, 2$; $y=1, 2$) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (47B)" is not satisfied.

(Precoding Method (48A))

In a state such as in FIG. 2, signals $r_1(t)$, $r_2(t)$ that are received by a reception device can be applied as follows (note that δ is greater than or equal to 0 radians and less than 2π radians).

[MATH. 1666]

$$\begin{pmatrix} r_1(t)\\ r_2(t)\end{pmatrix} = \begin{pmatrix} \cos\delta & -\sin\delta\\ \sin\delta & \cos\delta\end{pmatrix}\begin{pmatrix} h_{11}(t) & 0\\ 0 & h_{22}(t)\end{pmatrix}\begin{pmatrix} z_1(t)\\ z_2(t)\end{pmatrix} + \begin{pmatrix} n_1(t)\\ n_2(t)\end{pmatrix} = \begin{pmatrix} h_{11}(t)\cos\delta & -h_{22}(t)\sin\delta\\ h_{11}(t)\sin\delta & h_{22}(t)\cos\delta\end{pmatrix}\begin{pmatrix} z_1(t)\\ z_2(t)\end{pmatrix} + \begin{pmatrix} n_1(t)\\ n_2(t)\end{pmatrix} \tag{1666}$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1667]

$$\begin{pmatrix} z_1(t)\\ z_2(t)\end{pmatrix} = \begin{pmatrix} a & 0\\ 0 & b\end{pmatrix}\begin{pmatrix} \beta\times e^{j\mu}\times\sin\theta & \beta\times e^{j(\mu+\lambda)}\times\cos\theta\\ \beta\times e^{j\omega}\times\cos\theta & -\beta\times e^{j(\omega+\lambda)}\times\sin\theta\end{pmatrix}\begin{pmatrix} e^{j\varepsilon(t)} & 0\\ 0 & e^{j\gamma(t)}\end{pmatrix}\begin{pmatrix} s_1(t)\\ s_2(t)\end{pmatrix} \tag{1667}$$

However, a and b are complex numbers (may be actual numbers). j is an imaginary unit, and γ(t) is an argument and a time function.

In this case, the following equation holds true.

[MATH. 1668]

$$\begin{aligned}\begin{pmatrix} r_1(t)\\ r_2(t)\end{pmatrix} &= \begin{pmatrix} \cos\delta & -\sin\delta\\ \sin\delta & \cos\delta\end{pmatrix}\begin{pmatrix} h_{11}(t) & 0\\ 0 & h_{22}(t)\end{pmatrix}\begin{pmatrix} z_1(t)\\ z_2(t)\end{pmatrix} + \begin{pmatrix} n_1(t)\\ n_2(t)\end{pmatrix}\\ &= \begin{pmatrix} h_{11}(t)\times\cos\delta & -h_{22}(t)\times\sin\delta\\ h_{11}(t)\times\sin\delta & h_{22}(t)\times\cos\delta\end{pmatrix}\begin{pmatrix} z_1(t)\\ z_2(t)\end{pmatrix} + \begin{pmatrix} n_1(t)\\ n_2(t)\end{pmatrix}\\ &= \begin{pmatrix} h_{11}(t)\times\cos\delta & -h_{22}(t)\times\sin\delta\\ h_{11}(t)\times\sin\delta & h_{22}(t)\times\cos\delta\end{pmatrix}\begin{pmatrix} a & 0\\ 0 & b\end{pmatrix}\begin{pmatrix} \beta\times e^{j\mu}\times\sin\theta & \beta\times e^{j(\mu+\lambda)}\times\cos\theta\\ \beta\times e^{j\omega}\times\cos\theta & -\beta\times e^{j(\omega+\lambda)}\times\sin\theta\end{pmatrix}\begin{pmatrix} e^{j\varepsilon(t)} & 0\\ 0 & e^{j\gamma(t)}\end{pmatrix}\begin{pmatrix} s_1(t)\\ s_2(t)\end{pmatrix} + \begin{pmatrix} n_1(t)\\ n_2(t)\end{pmatrix}\\ &= \begin{pmatrix} \begin{matrix} h_{11}(t)\times a\times\beta\times e^{j\mu}\times\\ \cos\delta\times\sin\theta -\\ h_{22}(t)\times b\times\beta\times e^{j\omega}\times\\ \sin\delta\times\cos\theta\end{matrix} & \begin{matrix} h_{11}(t)\times a\times\beta\times e^{j(\mu+\lambda)}\times\\ \cos\delta\times\cos\theta +\\ h_{22}(t)\times b\times\beta\times e^{j(\omega+\lambda)}\times\\ \sin\delta\times\sin\theta\end{matrix}\\ \begin{matrix} h_{11}(t)\times a\times\beta\times e^{j\mu}\times\\ \sin\delta\times\sin\theta +\\ h_{22}(t)\times b\times\beta\times e^{j\omega}\times\\ \cos\delta\times\cos\theta\end{matrix} & \begin{matrix} h_{11}(t)\times a\times\beta\times e^{j(\mu+\lambda)}\times\\ \sin\delta\times\cos\theta -\\ h_{22}(t)\times b\times\beta\times e^{j(\omega+\lambda)}\times\\ \cos\delta\times\sin\theta\end{matrix}\end{pmatrix}\begin{pmatrix} e^{j\varepsilon(t)} & s_1(t)\\ e^{j\gamma(t)} & s_2(t)\end{pmatrix} + \begin{pmatrix} n_1(t)\\ n_2(t)\end{pmatrix}\end{aligned} \tag{1668}$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1669]

$$h_{11}(t)\times a\times\beta\times e^{j(\mu+\lambda)}\times\cos\delta\times\cos\theta-h_{22}(t)\times b\times\beta\times e^{j(\omega+\lambda)}\times\sin\delta\times\sin\theta=0 \tag{1669-1}$$

$$h_{11}(t)\times a\times\beta\times e^{j\mu}\times\sin\delta\times\sin\theta+h_{22}(t)\times b\times\beta\times e^{j\omega}\times\cos\delta\times\cos\theta=0 \tag{1669-2}$$

Accordingly, it is sufficient if the following holds true.

[MATH. 1670]

$$b=\frac{h_{11}(t)}{h_{22}(t)}\times a\times e^{j(\mu-\omega)} \tag{1670-1}$$

and $$\theta=\delta+\frac{\pi}{2}+n\pi \text{ radians} \tag{1670-2}$$

($n$ is an integer)

Accordingly, the communications station calculates θ, a, and b from the feedback information from the terminal so that the following is true.

[MATH. 1671]

$$b=\frac{h_{11}(t)}{h_{22}(t)}\times a\times e^{j(\mu-\omega)} \tag{1671-1}$$

and $$\theta=\delta+\frac{\pi}{2}+n\pi \text{ radians} \tag{1671-2}$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1672]

$$|a|^2+|b|^2=|u|^2 \tag{1672}$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (48A-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 1673]

$$\begin{pmatrix} q_{11} & q_{12} \\ q_{21} & q_{22} \end{pmatrix} \tag{1673}$$

Accordingly, weighting synthesizer 306A calculates the following and outputs weighted signal 307A ($z_1(t)$).

[MATH. 1674]

$$z_1(t)=q_{11}\times e^{j\varepsilon(t)}\times s_1(t)+q_{12}\times e^{j\gamma(t)}\times s_2(t) \tag{1062}$$

Weighting synthesizer synthesizer 306B calculates the following and outputs weighted signal 307B ($z_2(t)$).

[MATH. 1675]

$$z_2(t)=q_{21}\times e^{j\varepsilon(t)}\times s_1(t)+q_{22}\times e^{j\gamma(t)}\times s_2(t) \tag{1675}$$

Precoding method determiner 316 performs the calculations described in "(precoding method (48A)" based on feedback information from a terminal, and determines the precoding matrix.

[MATH. 1676]

$$\begin{pmatrix} q_{11} & q_{12} \\ q_{21} & q_{22} \end{pmatrix}=\begin{pmatrix} a & 0 \\ 0 & b \end{pmatrix}\begin{pmatrix} \beta\times e^{j\mu}\times\sin\theta & \beta\times e^{j(\mu+\lambda)}\times\cos\theta \\ \beta\times e^{j\omega}\times\cos\theta & -\beta\times e^{j(\omega+\lambda)}\times\sin\theta \end{pmatrix}=\begin{pmatrix} a\times\beta\times e^{j\mu}\times\sin\theta & a\times\beta\times e^{j(\mu+\lambda)}\times\cos\theta \\ b\times\beta\times e^{j\omega}\times\cos\theta & -b\times\beta\times e^{j(\omega+\lambda)}\times\sin\theta \end{pmatrix} \tag{1676}$$

In other words, the precoding matrix of the above equation is calculated.

Here, based on feedback information from a terminal, precoding method determiner 316 uses

[MATH. 1677]

$$b=\frac{h_{11}(t)}{h_{22}(t)}\times a\times e^{j(\mu-\omega)} \tag{1677-1}$$

and $$\theta=\delta+\frac{\pi}{2}+n\pi \text{ radians} \tag{1677-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (48A-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1678]

$$\begin{pmatrix} q_{11} & q_{12} \\ q_{21} & q_{22} \end{pmatrix} \tag{1678}$$

Accordingly, weighting synthesizer 306A calculates the following and outputs weighted signal 307A ($y_1(t)$).

[MATH. 1679]

$$y_1(t)=q_{11}\times e^{j\varepsilon(t)}\times s_1(t)+q_{12}\times e^{j\gamma(t)}\times s_2(t) \tag{1679}$$

Weighting synthesizer 306B calculates the following and outputs weighted signal 307B ($y_2(t)$).

[MATH. 1680]

$$y_2(t)=q_{21}\times e^{j\varepsilon(t)}\times s_1(t)+q_{22}\times e^{j\gamma(t)}\times s_2(t) \tag{1680}$$

Precoding method determiner 316 performs the calculations described in "(precoding method (48A)" based on feedback information from a terminal, and determines the precoding matrix.

[MATH. 1681]

$$\begin{pmatrix} q_{11} & q_{12} \\ q_{21} & q_{22} \end{pmatrix} = \begin{pmatrix} \beta\times e^{j\mu}\times\sin\theta & \beta\times e^{j(\mu+\lambda)}\times\cos\theta \\ \beta\times e^{j\omega}\times\cos\theta & -\beta\times e^{j(\omega+\lambda)}\times\sin\theta \end{pmatrix} \tag{1681}$$

In other words, the precoding matrix of the above equation and values for a and b are calculated. Here, based on feedback information from a terminal, precoding method determiner 316 uses

[MATH. 1682]

$$b = \frac{h_{11}(t)}{h_{22}(t)}\times a\times e^{j(\mu-\omega)} \tag{1682-1}$$

and $$\theta = \delta + \frac{\pi}{2} + n\pi \text{ radians} \tag{1682-2}$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (48A))

Phase changer 1001A illustrated in FIG. 12 and FIG. 13 receives an input of mapped signal $s_1(t)$ output from mapper 304A, applies a phase-change, and outputs phase-changed signal 1002A ($e^{j\varepsilon(t)}\times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1683]

$$\begin{aligned} \begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \right. \\ &\left. \sqrt{\frac{1}{K+1}}\begin{pmatrix} h_{11,s}(t) & h_{12,s}(t) \\ h_{21,s}(t) & h_{22,s}(t) \end{pmatrix}\right)\begin{pmatrix} z_1(t) \\ z_2(t) \end{pmatrix} + \begin{pmatrix} n_1(t) \\ n_2(t) \end{pmatrix} \end{aligned} \tag{1683}$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (48A)" is not satisfied.

(Precoding Method (48B))

In a state such as in FIG. 2, signals $r_1(t)$, $r_2(t)$ that are received by a reception device can be applied as follows (note that δ is greater than or equal to 0 radians and less than 2π radians).

[MATH. 1684]

$$\begin{pmatrix} r_1(t) \\ r_2(t) \end{pmatrix} = \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} = \begin{pmatrix} h_{11}(t)\cos\delta & -h_{22}(t)\sin\delta \\ h_{11}(t)\sin\delta & h_{22}(t)\cos\delta \end{pmatrix} \begin{pmatrix} z_1(t) \\ z_2(t) \end{pmatrix} + \begin{pmatrix} n_1(t) \\ n_2(t) \end{pmatrix} \quad (1684)$$

Here, when $z_1(t)=s_1(t)$ and $z_2(t)=s_2(t)$ ($s_1(t)$ and $s_2(t)$ are mapped baseband signals), excluding when δ=0, π/2, π, or 3π/2 radians, since mapped baseband signal $s_1(t)$ is affected (interference) by mapped baseband signal $s_2(t)$ and mapped baseband signal $s_2(t)$ is affected (interference) by mapped baseband signal $s_1(t)$, there is a possibility that data reception quality may decrease.

In light of this, presented is a method of performing precoding based on feedback information obtained from a terminal by the communications station. Consider a case in which precoding that uses a unitary matrix is performed, such as the following.

[MATH. 1685]

$$\begin{pmatrix} z_1(t) \\ z_2(t) \end{pmatrix} = \begin{pmatrix} a & 0 \\ 0 & b \end{pmatrix} \begin{pmatrix} \beta\times e^{j\mu}\times\sin\theta & \beta\times e^{j(\mu+\lambda)}\times\cos\theta \\ \beta\times e^{j\omega}\times\cos\theta & -\beta\times e^{j(\omega+\lambda)}\times\sin\theta \end{pmatrix} \begin{pmatrix} e^{j\varepsilon(t)} & 0 \\ 0 & e^{j\gamma(t)} \end{pmatrix} \begin{pmatrix} s_1(t) \\ s_2(t) \end{pmatrix} \quad (1685)$$

However, a and b are complex numbers (may be actual numbers). j is an imaginary unit, and γ(t) is an argument and a time function.

In this case, the following relation equation holds true.

[MATH. 1686]

$$\begin{aligned} \begin{pmatrix} r_1(t) \\ r_2(t) \end{pmatrix} &= \begin{pmatrix} \cos\delta & -\sin\delta \\ \sin\delta & \cos\delta \end{pmatrix} \begin{pmatrix} h_{11}(t) & 0 \\ 0 & h_{22}(t) \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} z_1(t) \\ z_2(t) \end{pmatrix} + \begin{pmatrix} n_1(t) \\ n_2(t) \end{pmatrix} \\ &= \begin{pmatrix} h_{11}(t)\times\cos\delta & -h_{22}(t)\times\sin\delta \\ h_{11}(t)\times\sin\delta & h_{22}(t)\times\cos\delta \end{pmatrix} \begin{pmatrix} a & 0 \\ 0 & b \end{pmatrix} \begin{pmatrix} \beta\times e^{j\mu}\times\sin\theta & \beta\times e^{j(\mu+\lambda)}\times\cos\theta \\ \beta\times e^{j\omega}\times\cos\theta & -\beta\times e^{j(\omega+\lambda)}\times\sin\theta \end{pmatrix} \\ &\quad \begin{pmatrix} e^{j\delta}(t) & 0 \\ 0 & e^{j\gamma(t)} \end{pmatrix} \begin{pmatrix} s_1(t) \\ s_2(t) \end{pmatrix} + \begin{pmatrix} n_1(t) \\ n_2(t) \end{pmatrix} \\ &= \begin{pmatrix} h_{11}(t)\times a\times\beta\times e^{j\mu}\times\cos\delta\times\sin\theta - & h_{11}(t)\times a\times\beta\times e^{j(\mu+\lambda)}\times\cos\delta\times\cos\theta + \\ h_{22}(t)\times b\times\beta\times e^{j\omega}\times\sin\delta\times\cos\theta & h_{22}(t)\times b\times\beta\times e^{j(\omega+\lambda)}\times\sin\delta\times\sin\theta \\ h_{11}(t)\times a\times\beta\times e^{j\mu}\times\sin\delta\times\sin\theta + & h_{11}(t)\times a\times\beta\times e^{j(\mu+\lambda)}\times\sin\delta\times\cos\theta - \\ h_{22}(t)\times b\times\beta\times e^{j\omega}\times\cos\delta\times\cos\theta & h_{22}(t)\times b\times\beta\times e^{j(\omega+\lambda)}\times\cos\delta\times\sin\theta \end{pmatrix} \\ &\quad \begin{pmatrix} e^{j\delta}(t)s_1(t) \\ e^{j\gamma}(t)s_2(t) \end{pmatrix} + \begin{pmatrix} n_1(t) \\ n_2(t) \end{pmatrix} \end{aligned} \quad (1686)$$

In the above equation, as one method for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, there are the following conditional equations.

[MATH. 1687]

$$h_{11}(t)\times a\times\beta\times e^{j\mu}\times\cos\delta\times\sin\theta - h_{22}(t)\times b\times\beta\times e^{j\omega}\times\sin\delta\times\cos\theta = 0 \quad (1687\text{-}1)$$

$$h_{11}(t)\times a\times\beta\times e^{j(\mu+\lambda)}\times\sin\delta\times\cos\theta - h_{22}(t)\times b\times\beta\times e^{j(\omega+\lambda)}\times\cos\delta\times\sin\theta = 0 \quad (1687\text{-}2)$$

Accordingly, it is sufficient if the following holds true.

[MATH. 1688]

$$b = \frac{h_{11}(t)}{h_{22}(t)}\times a\times e^{j(\mu-\omega)} \quad (1688\text{-}1)$$

and $$\theta = \delta + n\pi \text{ radians} \quad (1688\text{-}2)$$

($n$ is an integer)

Accordingly, the communications station calculates θ, a, and b from the feedback information from the terminal so that the following is true.

[MATH. 1689]

$$b = \frac{h_{11}(t)}{h_{22}(t)}\times a\times e^{j(\mu-\omega)} \quad (1689\text{-}1)$$

and $$\theta = \delta + n\pi \text{ radians} \quad (1689\text{-}2)$$

The communications station performs the precoding using these values.

For example, the communications station transmits a training symbol, and the terminal performs channel estimation from the training symbol and provides the channel estimation value to the communications station as feedback. The communications station then calculates the values for θ, a, and b by using the information provided as feedback.

Note that because of the average transmitted power, the following relation equation holds true.

[MATH. 1690]

$$|a|^2+|b|^2=|u|^2 \quad (1690)$$

($|u|^2$ is a parameter based on average transmitted power)

Note that phase-change is applied to both mapped baseband signal $s_1(t)$ and mapped baseband signal $s_2(t)$, but the configuration "mapped baseband signal $s_1(t)$ is not affected (interference) by mapped baseband signal $s_2(t)$ and mapped baseband signal $s_2(t)$ is not affected (interference) by mapped baseband signal $s_1(t)$" is maintained.

(Precoding Method (48B-1))

FIG. 12 illustrates a configuration of a communications station. One example of processes performed by weighting synthesizers 306A, 306B, and precoding method determiner 316 illustrated in FIG. 12 will be described.

Mapped signal 305A output by mapper 304A is $s_1(t)$. Mapped signal 305B output by mapper 304B is $s_2(t)$. Weighted signal 307A output by weighting synthesizer 306A is $z_1(t)$. Weighted signal 307B output by weighting synthesizer 306B is $z_2(t)$.

The precoding matrix is expressed as follows.

[MATH. 1691]

$$\begin{pmatrix} q_{11} & q_{12} \\ q_{21} & q_{22} \end{pmatrix} \quad (1691)$$

Accordingly, weighting synthesizer 306A calculates the following and outputs weighted signal 307A ($z_1(t)$).

[MATH. 1692]

$$z_1(t)=q_{11}\times e^{j\varepsilon(t)}\times s_1(t)+q_{12}\times e^{j\gamma(t)}\times s_2(t) \quad (1062)$$

Weighting synthesizer 306B calculates the following and outputs weighted signal 307B ($z_2(t)$).

[MATH. 1693]

$$z_2(t)=q_{21}\times e^{j\varepsilon(t)}\times s_1(t)+q_{22}\times e^{j\gamma(t)}\times s_2(t) \quad (1693)$$

Precoding method determiner 316 performs the calculations described in "(precoding method (48B)" based on feedback information from a terminal, and determines the precoding matrix.

[MATH. 1694]

$$\begin{pmatrix} q_{11} & q_{12} \\ q_{21} & q_{22} \end{pmatrix} = \begin{pmatrix} a & 0 \\ 0 & b \end{pmatrix} \begin{pmatrix} \beta\times e^{j\mu}\times\sin\theta & \beta\times e^{j(\mu+\lambda)}\times\cos\theta \\ \beta\times e^{j\omega}\times\cos\theta & -\beta\times e^{j(\omega+\lambda)}\times\sin\theta \end{pmatrix} = \begin{pmatrix} a\times\beta\times e^{j\mu}\times\sin\theta & a\times\beta\times e^{j(\mu+\lambda)}\times\cos\theta \\ b\times\beta\times e^{j\omega}\times\cos\theta & -b\times\beta\times e^{j(\omega+\lambda)}\times\sin\theta \end{pmatrix} \quad (1694)$$

In other words, the precoding matrix of the above equation is calculated. Here, based on feedback information from a terminal, precoding method determiner 316 uses

[MATH. 1695]

$$b=\frac{h_{11}(t)}{h_{22}(t)}\times a\times e^{j(\mu-\omega)} \quad (1695\text{-}1)$$

and $$\theta=\delta+n\pi \text{ radians} \quad (1695\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($z_1(t)$). Similarly, based on the values of $q_{21}$ and $q_{22}$, weighting synthesizer 306B performs weighting synthesis calculations, and outputs weighted signal 307B ($z_2(t)$).

(Precoding Method (48B-2))

FIG. 13 illustrates a configuration of a communications station different from FIG. 12. One example of processes performed by weighting synthesizers 306A, 306B, coefficient multipliers 401A, 401B, and precoding method determiner 316 illustrated in FIG. 13 will be discussed.

Mapped signal 305A output by mapper 304A is $s_1(t)$. Mapped signal 305B output by mapper 304B is $s_2(t)$. Weighted signal 307A output by weighting synthesizer 306A is $y_1(t)$. Weighted signal 307B output by weighting synthesizer 306B is $y_2(t)$. Coefficient multiplied signal 402A output by coefficient multiplier 401A is $z_1(t)$. Coefficient multiplied signal 402B output by coefficient multiplier 401B is $z_2(t)$.

The precoding matrix is expressed as follows.

[MATH. 1696]

$$\begin{pmatrix} q_{11} & q_{12} \\ q_{21} & q_{22} \end{pmatrix} \quad (1696)$$

Accordingly, weighting synthesizer 306A calculates the following and outputs weighted signal 307A ($y_1(t)$).

[MATH. 1697]

$$y_1(t)=q_{11}\times e^{j\varepsilon(t)}\times s_1(t)+q_{12}\times e^{j\gamma(t)}\times s_2(t) \quad (1697)$$

Weighting synthesizer 306B calculates the following and outputs weighted signal 307B ($y_2(t)$).

[MATH. 1698]

$$y_2(t)=q_{21}\times e^{j\varepsilon(t)}\times s_1(t)+q_{22}\times e^{j\gamma(t)}\times s_2(t) \quad (1698)$$

Precoding method determiner 316 performs the calculations described in "(precoding method (48B)" based on feedback information from a terminal, and determines the precoding matrix.

[MATH. 1699]

$$\begin{pmatrix} q_{11} & q_{12} \\ q_{21} & q_{22} \end{pmatrix} = \begin{pmatrix} \beta\times e^{j\mu}\times\sin\theta & \beta\times e^{j(\mu+\lambda)}\times\cos\theta \\ \beta\times e^{j\omega}\times\cos\theta & -\beta\times e^{j(\omega+\lambda)}\times\sin\theta \end{pmatrix} \quad (1699)$$

In other words, the precoding matrix of the above equation and values for a and b are calculated. Here, based on feedback information from a terminal, precoding method determiner 316 uses

[MATH. 1700]

$$b = \frac{h_{11}(t)}{h_{22}(t)}\times a\times e^{j(\mu-\omega)} \quad (1700\text{-}1)$$

and $$\theta = \delta + n\pi \text{ radians} \quad (1700\text{-}2)$$

($n$ is an integer)

to determine a, b, and θ, to determine the precoding matrix.

For example, the communications station transmits a training symbol, and the terminal performs channel estimation from the training symbol and provides the channel estimation value to the communications station as feedback. The communications station then calculates the values for θ, a, and b by using the information provided as feedback.

Based on the values of $q_{11}$ and $q_{12}$, weighting synthesizer 306A performs weighting synthesis calculations, and outputs weighted signal 307A ($y_1(t)$). Similarly, based on the values of $q_{21}$ and $q_{22}$, weighting synthesizer 306B performs weighting synthesis calculations, and outputs weighted signal 307B ($y_2(t)$).

Then, coefficient multiplier 401A illustrated in FIG. 13 receives an input of weighted signal 307A ($y_1(t)$), calculates $z_1(t)=a\times y_1(t)$, and outputs coefficient multiplied signal 402A ($z_1(t)$). Similarly, coefficient multiplier 401B illustrated in FIG. 13 receives an input of weighting synthesized signal 307B ($y_2(t)$), calculates $z_2(t)=b\times y_2(t)$, and outputs coefficient multiplied signal 402B ($z_2(t)$).

(Phase Changing in Precoding Method (48B))

Phase changer 1001A illustrated in FIG. 12 and FIG. 13 receives an input of mapped signal $s_1(t)$ output from mapper 304A, applies a phase-change, and outputs phase-changed signal 1002A ($e^{j\varepsilon(t)}\times s_1(t)$). Phase changer 1001B illustrated in FIG. 12 and FIG. 13 receives an input of mapped signal $s_2(t)$ output from mapper 304B, applies a phase-change, and outputs phase-changed signal 1002B ($e^{j\gamma(t)}\times s_2(t)$).

In FIG. 2, when fluctuation in an antenna state is rapid, for example, when the antenna is vibrating due to, for example, wind or the terminal being used on the move, there is no guarantee that the value of δ in FIG. 2 can be kept substantially constant in the frame. Accordingly, it is likely that the following relation equation will hold true.

[MATH. 1701]

$$\begin{aligned}\begin{pmatrix} r_1(t) \\ r_2(t) \end{pmatrix} &= \begin{pmatrix} h_{11}(t) & h_{12}(t) \\ h_{21}(t) & h_{22}(t) \end{pmatrix}\begin{pmatrix} z_1(t) \\ z_2(t) \end{pmatrix} + \begin{pmatrix} n_1(t) \\ n_2(t) \end{pmatrix} \\ &= \left(\sqrt{\frac{K}{K+1}}\begin{pmatrix} h_{11,d}(t) & h_{12,d}(t) \\ h_{21,d}(t) & h_{22,d}(t) \end{pmatrix} + \sqrt{\frac{1}{K+1}}\begin{pmatrix} h_{11,s}(t) & h_{12,s}(t) \\ h_{21,s}(t) & h_{22,s}(t) \end{pmatrix}\right) \begin{pmatrix} z_1(t) \\ z_2(t) \end{pmatrix} + \begin{pmatrix} n_1(t) \\ n_2(t) \end{pmatrix}\end{aligned} \quad (1701)$$

Here, $h_{xy,d}(t)$ is a direct wave component of $h_{xy}(t)$, and $h_{xy,s}(t)$ is a scattered wave component of $h_{xy}(t)$. (x=1, 2; y=1, 2) K is a Rice factor.

A case in which Rice factor K is large will be discussed. Here, channel fluctuation tends to be small due to influence from direct waves. Accordingly, when phase-change is not implemented—that is to say, when phase changer 1001A and phase changer 1001B are not provided in FIG. 12 and FIG. 13—in the reception device, it is likely that $r_1(t)$ and $r_2(t)$ are in a continuous (small amount of fluctuation) reception state. Accordingly, regardless of the reception field intensity being high, there is a possibility of being continuously in a state in which signal demultiplexing is difficult.

On the other hand, in FIG. 12 and FIG. 13, when phase changer 1001A and phase changer 1001B are present, in the reception device, since $r_1(t)$ and $r_2(t)$ are implemented with a time (or frequency) phase-change by the transmission device, they can be kept from being in continuous reception state. Accordingly, it is likely that continuously being in a state in which signal demultiplexing is difficult can be avoided.

As described above, in either of the two different channel states, it is possible to achieve a superior advantageous effect, namely that a favorable state reception quality can be achieved. Note that in FIG. 12 and FIG. 13, when the phase changer is arranged after the weighting synthesizer, "precoding method (48B)" is not satisfied.

(Phase Change Method)

In the description hereinbefore, the value γ(t), ε(t) relating to phase change is, but not limited to, being applied as a function of t (t: time). For example, when the communications station illustrated in FIG. 10 and FIG. 11 transmits a multi-carrier, such as orthogonal frequency division multiplexing (OFDM), modulated signal, the value y(t), c(t) relating to phase change may be applied as a function of "frequency" or as a function of "time and frequency". Accordingly, when frequency is express as f, when the value relating to phase change is a function of "frequency", it is expressed as γ(f), ε(f), and when the value relating to phase change is a function of "time and frequency", it is expressed as γ(f, t), ε(f, t).

Hereinafter, examples of applications of phase change γ(t), ε(t); γ(f), ε(f); and γ(f, t), ε(f, t) will be given.

(Phase Change Method (1))

Figure 14:
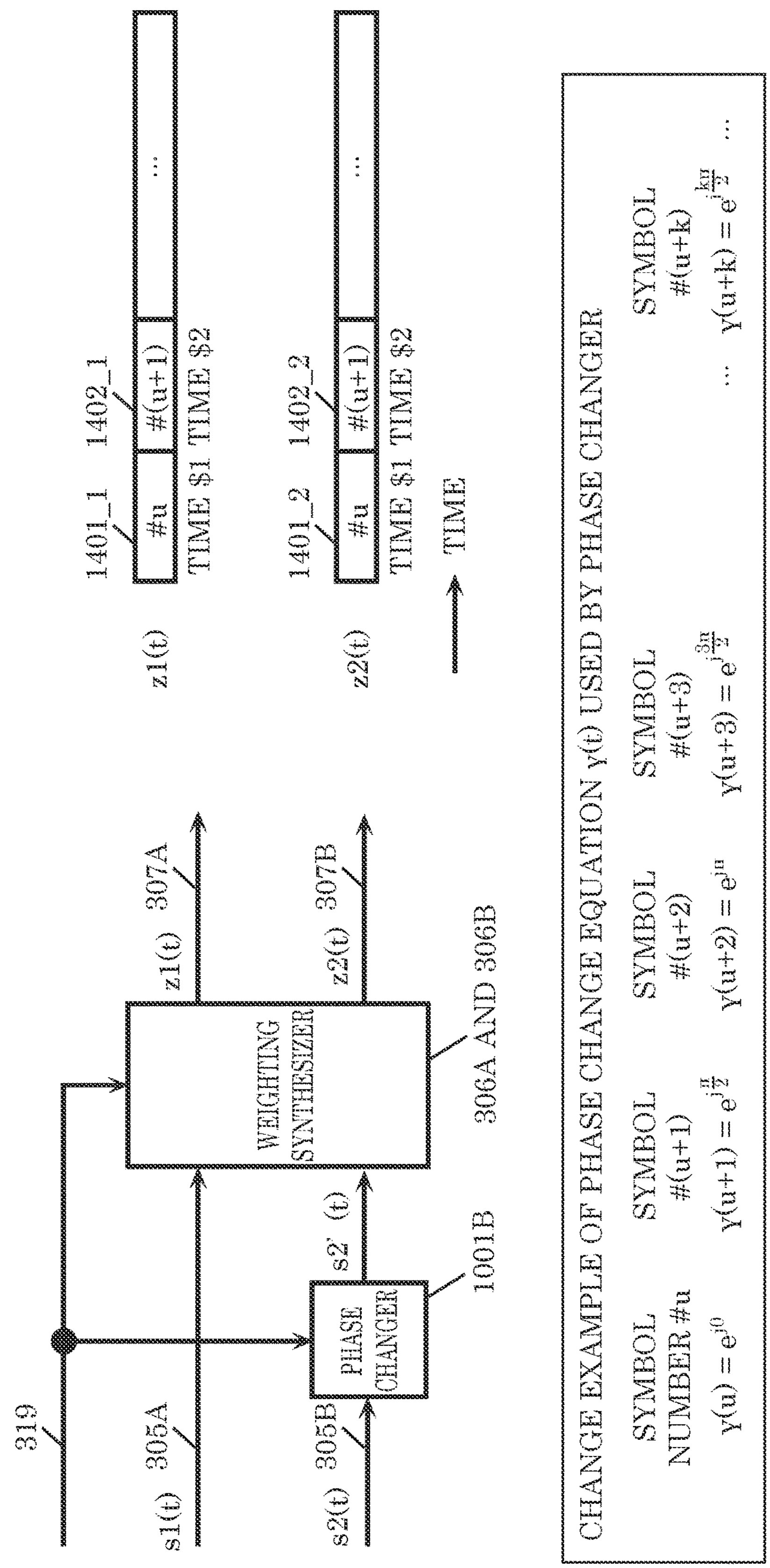
FIG. 14 illustrates an example of a phase changing method.

FIG. 14 illustrates one example of a phase change method, extracting relevant portions from phase changer 1001B and weighting synthesizers 306A, 306B illustrated in FIG. 10.

Phase change is performed in phase changer 1001B; a change example is illustrated in FIG. 14.

For example, with symbol number #u (since phase change value γ is treated as a function of a symbol number, it is written as γ(u)), phase change value $\gamma(u)=e^{j0}$ is applied.

Accordingly, weighting synthesizers 306A and 306B receive inputs of $s_1(u)$ and $\gamma(u)\times s_2(u)$.

With symbol number #(u+1), phase change value $\gamma(u+1)=e^{(j\times 1\times\pi)/2}$ is applied. Accordingly, weighting synthesizers 306A and 306B receive inputs of $s_1(u+1)$ and $\gamma(u+1)\times s_2(u+1)$.

With symbol number #(u+2), phase change value $\gamma(u+2)=e^{(j\times 2\times\pi)/2}$ is applied. Accordingly, weighting synthesizers 306A and 306B receive inputs of $s_1(u+2)$ and $\gamma(u+2)\times s_2(u+2)$.

With symbol number #(u+3), phase change value $\gamma(u+3)=e^{(j\times 3\times\pi)/2}$ is applied. Accordingly, weighting synthesizers 306A and 306B receive inputs of $s_1(u+3)$ and $\gamma(u+3)\times s_2(u+3)$.

With symbol number #(u+k), phase change value $\gamma(u+k)=e^{(j\times k\times\pi)/2}$ is applied. (For example, k is an integer.) Accordingly, weighting synthesizers 306A and 306B receive inputs of $s_1(u+k)$ and $\gamma(u+k)\times s_2(u+k)$.

(Note that the above description is applicable to any of: when the symbols are arranged in the time axis direction, when the symbols are arranged in the frequency axis direction, and when the symbols are arranged in the time/frequency axis direction.)

Then, at time $1 of modulated signal $z_1(t)$, $z_1(t)$ of symbol number #u is transmitted, and at time $1 of modulated signal $z_2(t)$, $z_2(t)$ of symbol number #u is transmitted.

At time $2 of modulated signal $z_1(t)$, $z_1(t)$ of symbol number #(u+1) is transmitted, and at time $2 of modulated signal $z_2(t)$, $z_2(t)$ of symbol number #(u+1) is transmitted.

Note that $z_1(t)$ and $z_2(t)$ are transmitted from different antennas using the same frequency.

(Phase Change Method (2))

Figure 15:
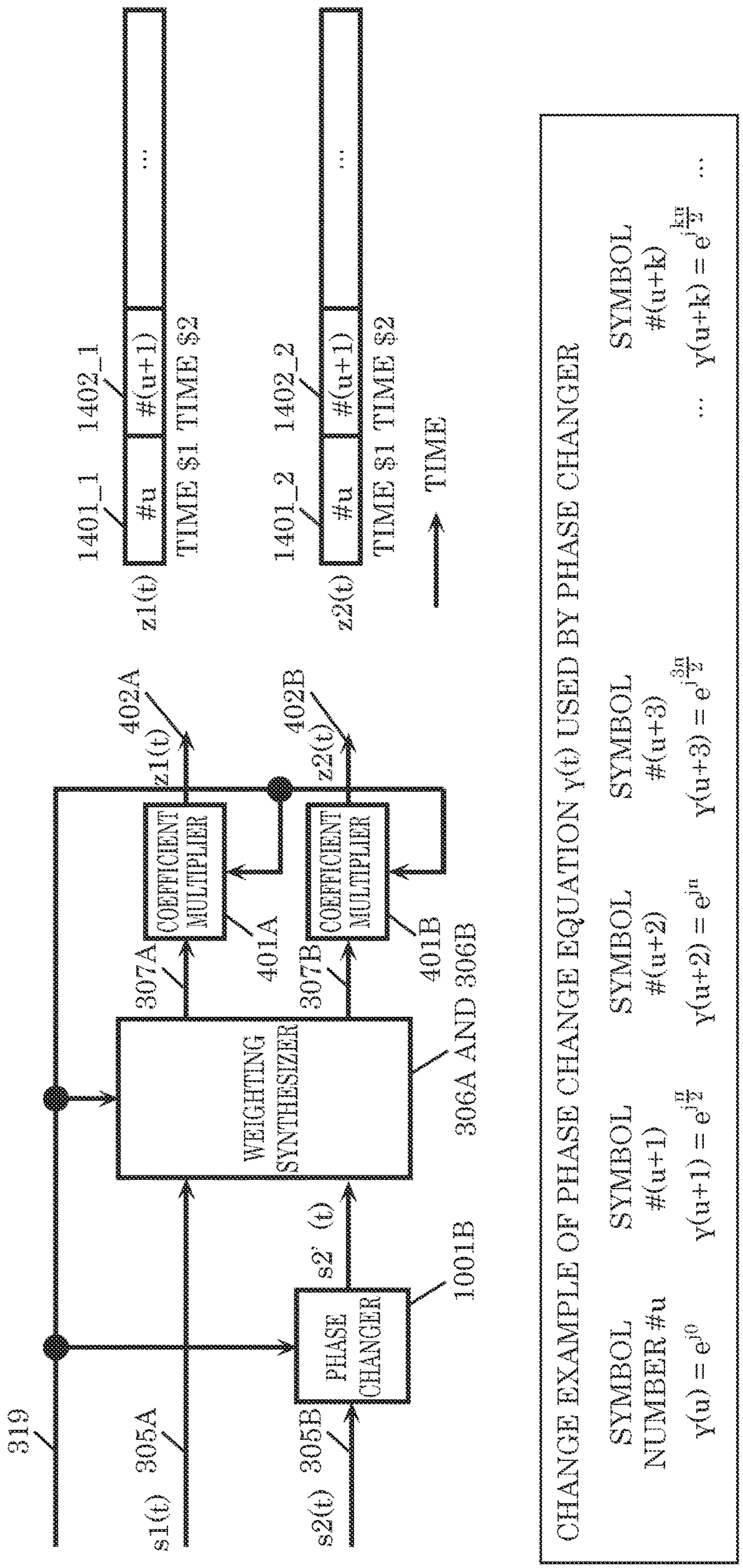
FIG. 15 illustrates an example of a phase changing method.

FIG. 15 illustrates one example of a phase change method, extracting relevant portions from phase changer 1001B, weighting synthesizers 306A, 306B, and coefficient multipliers 401A, 401B illustrated in FIG. 11.

Phase change is performed in phase changer 1001B; a change example is illustrated in FIG. 15.

For example, with symbol number #u (since phase change value γ is treated as a function of a symbol number, it is written as γ(u)), phase change value $\gamma(u)=e^{j0}$ is applied. Accordingly, weighting synthesizers 306A and 306B receive inputs of $s_1(u)$ and $\gamma(u)\times s_2(u)$.

With symbol number #(u+1), phase change value $\gamma(u+1)=e^{(j\times 1\times\pi)/2}$ is applied. Accordingly, weighting synthesizers 306A and 306B receive inputs of $s_1(u+1)$ and $\gamma(u+1)\times s_2(u+1)$.

With symbol number #(u+2), phase change value $\gamma(u+2)=e^{(j\times 2\times\pi)/2}$ is applied. Accordingly, weighting synthesizers 306A and 306B receive inputs of $s_1(u+2)$ and $\gamma(u+2)\times s_2(u+2)$.

With symbol number #(u+3), phase change value $\gamma(u+3)=e^{(j\times 3\times\pi)/2}$ is applied. Accordingly, weighting synthesizers 306A and 306B receive inputs of $s_1(u+3)$ and $\gamma(u+3)\times s_2(u+3)$.

With symbol number #(u+k), phase change value $\gamma(u+k)=e^{(j\times k\times\pi)/2}$ is applied. (For example, k is an integer.) Accordingly, weighting synthesizers 306A and 306B receive inputs of $s_1(u+k)$ and $\gamma(u+k)\times s_2(u+k)$.

Note that the above description is applicable to any of: when the symbols are arranged in the time axis direction, when the symbols are arranged in the frequency axis direction, and when the symbols are arranged in the time/frequency axis direction.

Then, at time $1 of modulated signal $z_1(t)$, $z_1(t)$ of symbol number #u is transmitted, and at time $1 of modulated signal $z_2(t)$, $z_2(t)$ of symbol number #u is transmitted.

At time $2 of modulated signal $z_1(t)$, $z_1(t)$ of symbol number #(u+1) is transmitted, and at time $2 of modulated signal $z_2(t)$, $z_2(t)$ of symbol number #(u+1) is transmitted.

Note that $z_1(t)$ and $z_2(t)$ are transmitted from different antennas using the same frequency.

(Frame Configuration (1))

Next, an example of a frame configuration when the phase change value is a function of frequency fthat is to say, when the phase change value is expressed as γ(f)—will be described.

Here, the phase change value of symbol number #0 is expressed as γ(0), the phase change value of symbol number #1 is expressed as γ(1), the phase change value of symbol number #2 is expressed as γ(2), and so on. (In other words, the phase change value of symbol number #k is expressed as γ(k) (k is an integer greater than or equal to 0). Accordingly, in symbol number #k, weighting synthesizers 306A and 306B receive inputs of $s_1(k)$ and $\gamma(k)\times s_2(k)$).

Figure 16:
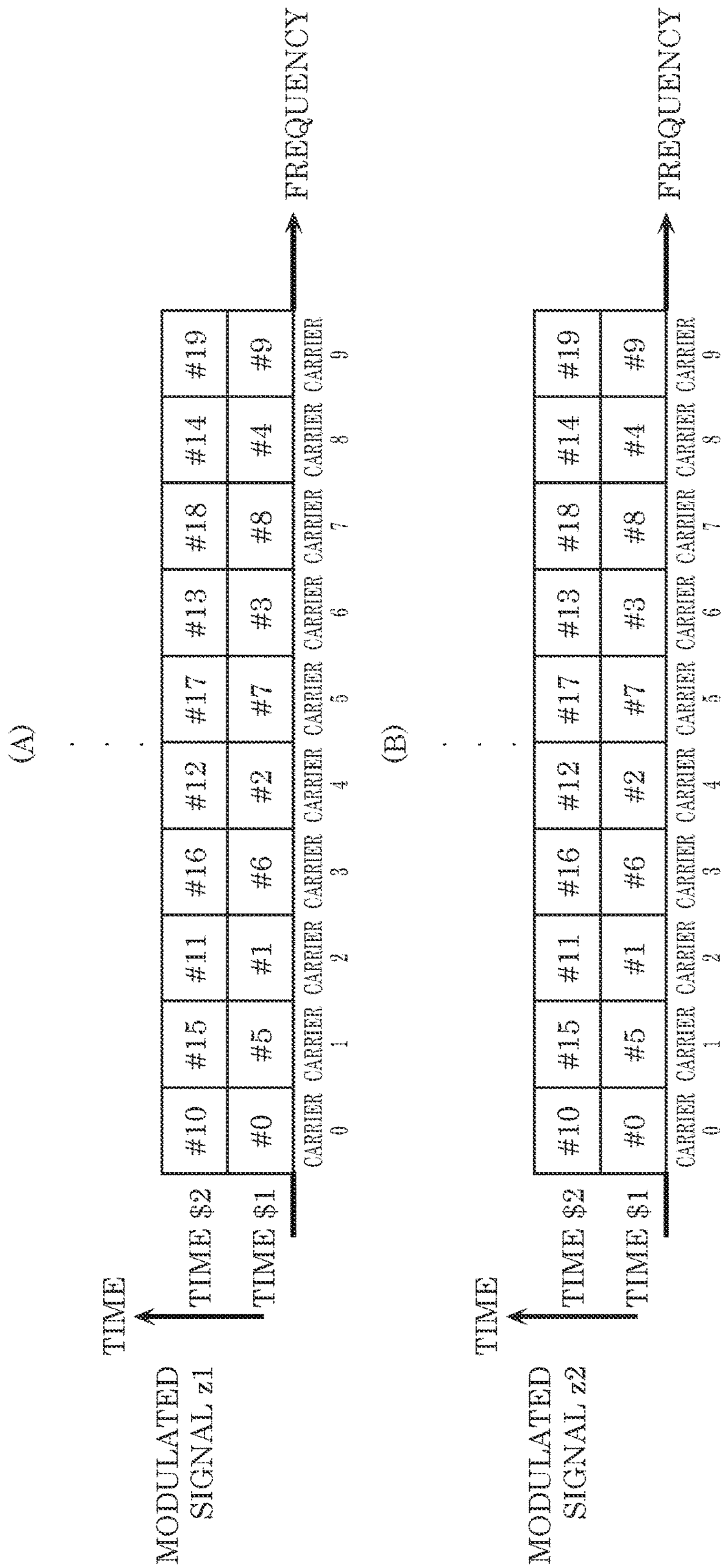
FIG. 16 illustrates an example of a frame configuration.

FIG. 16 is one example of a frame configuration when the symbols are arranged in the frequency direction.

In FIG. 16, (A) illustrates one example of a frame configuration of modulated signal $z_1$, where frequency is represented on the horizontal axis and time is represented on the vertical axis, and (B) illustrates one example of a frame configuration of modulated signal z2, where frequency is represented on the horizontal axis and time is represented on the vertical axis. In FIG. 16, carriers 0 through 9 and symbols for time $1 and time $2 are shown. Note that the symbols for $z_1$ and $z_2$ in the same carrier number at the same time are transmitted from different antennas at the same time and at the same frequency.

In FIG. 16, for example, "#0" means it is a symbol for symbol number #0, and "#1" means it is a symbol for symbol number #1 (in other words, "#p" means it is a symbol for symbol number #p (for example, p is an integer greater than or equal to 0)).

Accordingly, in (A) in FIG. 16, the symbol for symbol number #0 of $z_1$ is arranged at time $1, carrier 0; the symbol for symbol number #5 of $z_1$ is arranged at time $1, carrier 1; and the symbol for symbol number #1 of $z_1$ is arranged at time $1, carrier 2. Note that the other symbols are also arranged according to the same rules (for example, the symbol for symbol number #17 of $z_1$ is arranged at time $2, carrier 5).

Moreover, in (B) in FIG. 16, the symbol for symbol number #0 of $z_2$ is arranged at time $1, carrier 0; the symbol for symbol number #5 of $z_2$ is arranged at time $1, carrier 1; and the symbol for symbol number #1 of $z_2$ is arranged at time $1, carrier 2. Note that the other symbols are also arranged according to the same rules (for example, the symbol for symbol number #17 of $z_2$ is arranged at time $2, carrier 5).

(Frame Configuration (2))

Next, an example of a frame configuration when the phase change value is a function of time t, frequency f—that is to say, when the phase change value is expressed as γ(t, f)—will be described.

Here, the phase change value of symbol number #0 is expressed as γ(0), the phase change value of symbol number #1 is expressed as γ(1), the phase change value of symbol number #2 is expressed as γ(2), and so on (in other words, the phase change value of symbol number #k is expressed as γ(k) (k is an integer greater than or equal to 0). Accordingly, in symbol number #k, weighting synthesizers 306A and 306B receive inputs of $s_1(k)$ and $\gamma(k)\times s_2(k)$).

Figure 17:
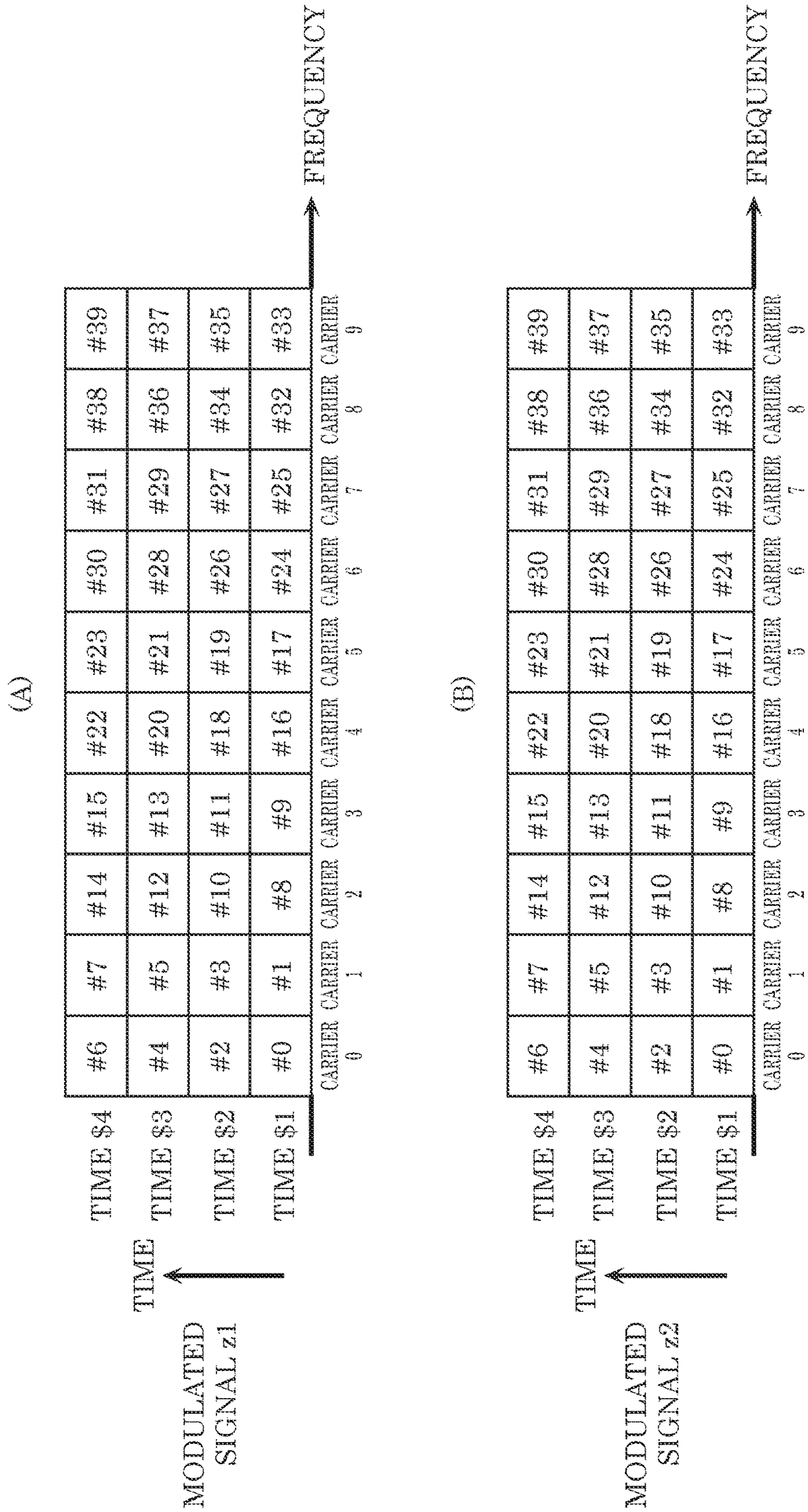
FIG. 17 illustrates an example of a frame configuration.

FIG. 17 is one example of a frame configuration when the symbols are arranged in the time/frequency direction.

In FIG. 17, (A) illustrates one example of a frame configuration of modulated signal $z_1$, where frequency is represented on the horizontal axis and time is represented on the vertical axis, and (B) illustrates one example of a frame configuration of modulated signal $z_2$, where frequency is represented on the horizontal axis and time is represented on the vertical axis. In FIG. 17, carriers 0 through 9 and symbols for time $1, time $2, time $3, and time $4 are shown (note that the symbols for $z_1$ and z2 in the same carrier number at the same time are transmitted from different antennas at the same time and at the same frequency).

In FIG. 17, for example, "#0" means it is a symbol for symbol number #0, and "#1" means it is a symbol for symbol number #1 (in other words, "-Ap" means it is a symbol for symbol number #p (for example, p is an integer greater than or equal to 0)).

Accordingly, in (A) in FIG. 17, the symbol for symbol number #0 of $z_1$ is arranged at time $1, carrier 0; the symbol for symbol number #1 of $z_1$ is arranged at time $1, carrier 1; and the symbol for symbol number #2 of $z_1$ is arranged at time $2, carrier 0. Note that the other symbols are also arranged according to the same rules (for example, the symbol for symbol number #19 of z1 is arranged at time $2, carrier 5).

Moreover, in (B) in FIG. 17, the symbol for symbol number #0 of z2 is arranged at time $1, carrier 0; the symbol for symbol number #1 of z2 is arranged at time $1, carrier 1; and the symbol for symbol number #2 of z2 is arranged at time $2, carrier 0. Note that the other symbols are also arranged according to the same rules (for example, the symbol for symbol number #19 of z2 is arranged at time $2, carrier 5).

(Frame Configuration (3))

Next, a different example of a frame configuration when the phase change value is a function of time t, frequency f—that is to say, when the phase change value is expressed as y(t, f)—will be described.

Here, the phase change value of symbol number #0 is expressed as $\gamma(\mathbf{0})$, the phase change value of symbol number #1 is expressed as $\gamma(\mathbf{1})$, the phase change value of symbol number #2 is expressed as $\gamma(\mathbf{2})$, and so on. (In other words, the phase change value of symbol number #k is expressed as $\gamma(k)$ (k is an integer greater than or equal to 0). Accordingly, in symbol number #k, weighting synthesizers 306A and 306B receive inputs of $s_1(k)$ and $\gamma(k)\times s_2(k)$).

Figure 18:
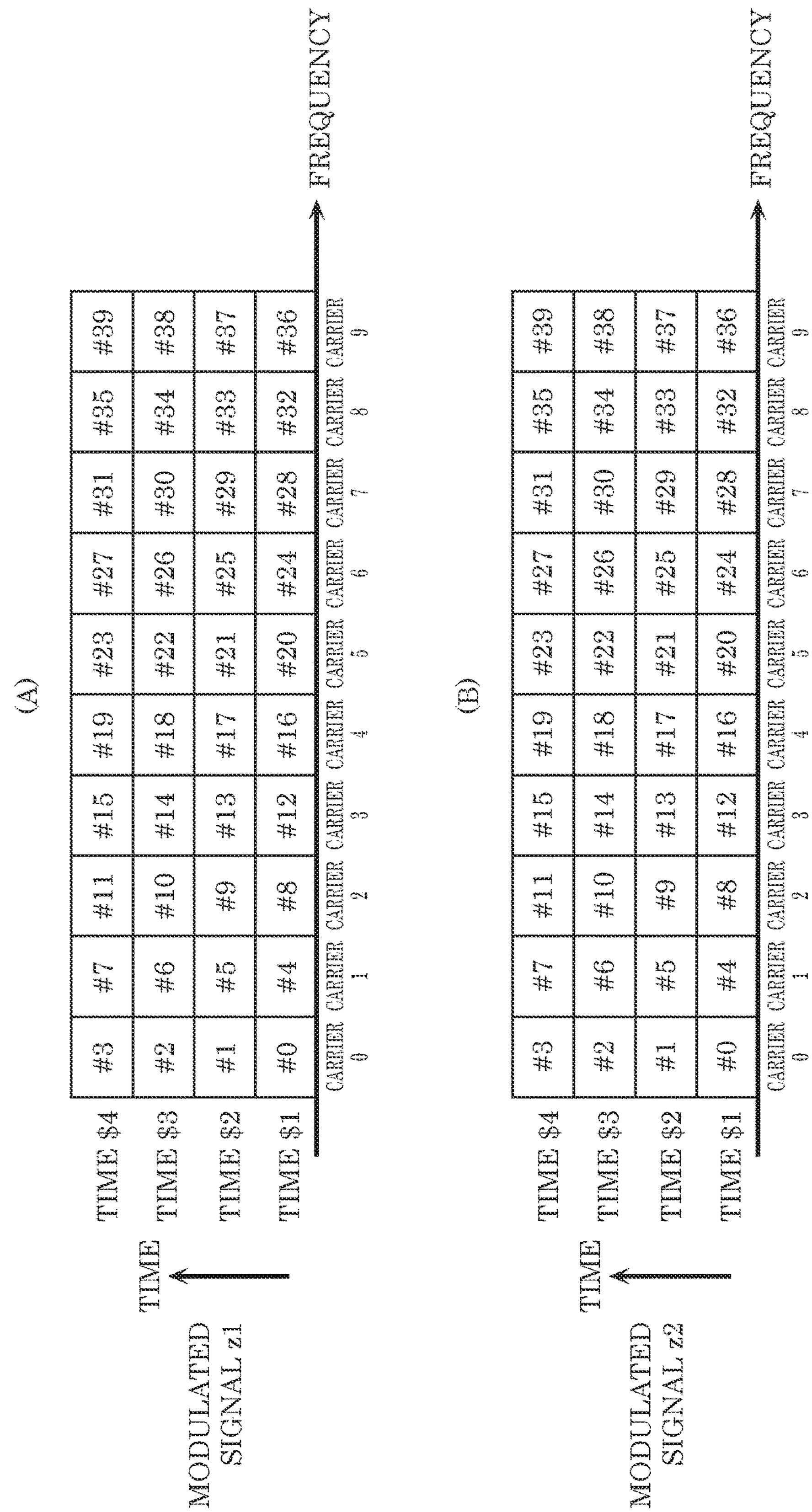
FIG. 18 illustrates an example of a frame configuration.

FIG. 18 is one example of a frame configuration when the symbols are arranged in the time/frequency direction.

In FIG. 18, (A) illustrates one example of a frame configuration of modulated signal z1, where frequency is represented on the horizontal axis and time is represented on the vertical axis, and (B) illustrates one example of a frame configuration of modulated signal $z_2$, where frequency is represented on the horizontal axis and time is represented on the vertical axis. In FIG. 18, carriers 0 through 9 and symbols for time $1, time $2, time $3, and time $4 are shown (note that the symbols for z1 and z2 in the same carrier number at the same time are transmitted from different antennas at the same time and at the same frequency).

In FIG. 18, for example, "#0" means it is a symbol for symbol number #0, and "#1" means it is a symbol for symbol number #1 (in other words, "#p" means it is a symbol for symbol number #p (for example, p is an integer greater than or equal to 0)).

Accordingly, in (A) in FIG. 18, the symbol for symbol number #0 of z1 is arranged at time $1, carrier 0; the symbol for symbol number #1 of z1 is arranged at time $2, carrier 0; and the symbol for symbol number #2 of z1 is arranged at time $3, carrier 0. Note that the other symbols are also arranged according to the same rules (for example, the symbol for symbol number #21 of z1 is arranged at time $2, carrier 5).

Moreover, in (B) in FIG. 18, the symbol for symbol number #0 of z2 is arranged at time $1, carrier 0; the symbol for symbol number #1 of z2 is arranged at time $2, carrier 0; and the symbol for symbol number #2 of z2 is arranged at time $3, carrier 0. Note that the other symbols are also arranged according to the same rules (for example, the symbol for symbol number #21 of z2 is arranged at time $2, carrier 5).

(Frame Configuration (4))

Next, an example of a frame configuration will be given in which the phase change value is expressed as a function of time t—that is to say, as $\gamma(t)$—and a symbol other than a data symbol, such as a control information symbol for transmitting control information or a pilot symbol for channel estimation, frequency synchronization, time synchronization, or signal detection (reference symbol, preamble) is present midway through.

Here, the phase change value of symbol number #0 is expressed as $\gamma(\mathbf{0})$, the phase change value of symbol number #1 is expressed as $\gamma(\mathbf{1})$, the phase change value of symbol number #2 is expressed as $\gamma(\mathbf{2})$, and so on. (In other words, the phase change value of symbol number #k is expressed as $\gamma(k)$ (k is an integer greater than or equal to 0). Accordingly, in symbol number #k, weighting synthesizers 306A and 306B receive inputs of $\mathbf{s1}(k)$ and $\gamma(k)\times\mathbf{s2}(k)$).

Figure 19:
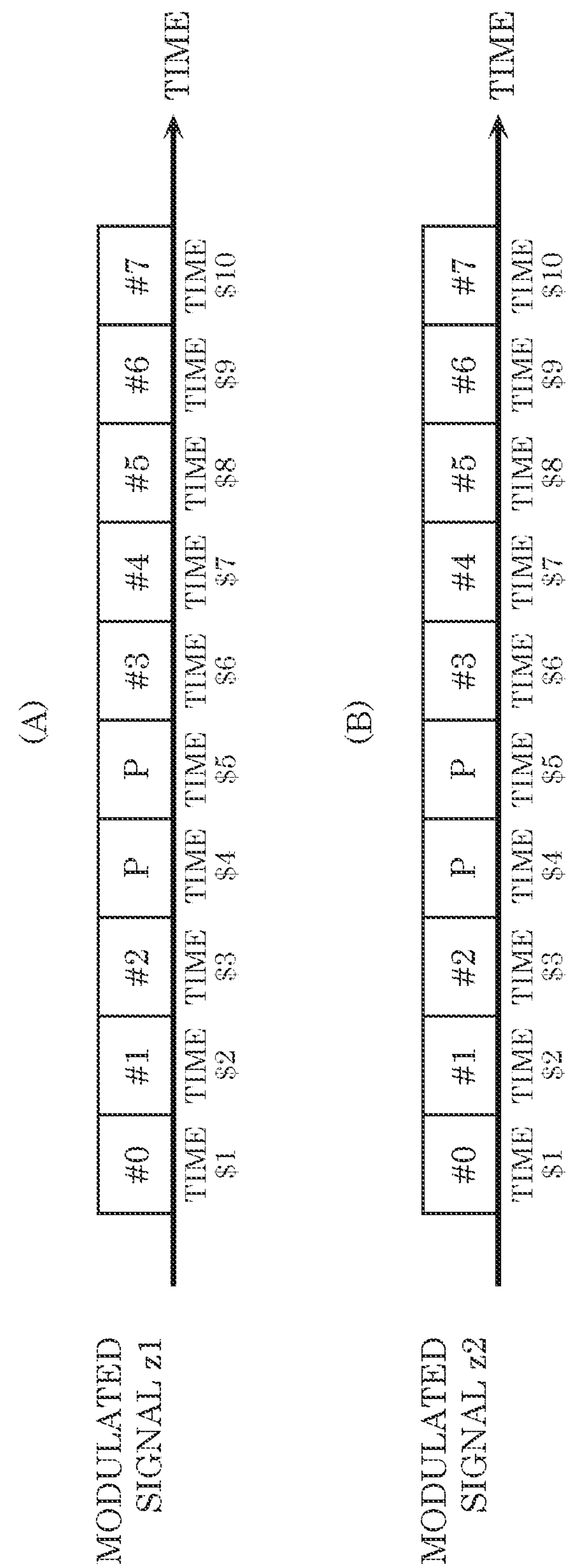
FIG. 19 illustrates an example of a frame configuration.

FIG. 19 is one example of a frame configuration when the symbols are arranged in the time direction.

In FIG. 19, (A) illustrates one example of a frame configuration of modulated signal z1, where time is represented on the horizontal axis, and (B) illustrates one example of a frame configuration of modulated signal z2, where time is represented on the horizontal axis (note that the symbols for z1 and z2 at the same time are transmitted from different antennas at the same frequency).

In FIG. 19, for example, "#0" means it is a symbol for symbol number #0, and "#1" means it is a symbol for symbol number #1. (In other words, "-Ap" means it is a symbol for symbol number #p (for example, p is an integer greater than or equal to 0)). Moreover, "P" indicates a pilot symbol (note that, here, "P" indicates a pilot symbol, but it may indicate a symbol other than a pilot symbol (excluding a data symbol)).

Accordingly, in (A) in FIG. 19, the symbol for symbol number #0 of z1 is arranged at time $1; the symbol for symbol number #1 of z1 is arranged at time $2; the symbol for symbol number #2 of z1 is arranged at time $3; and a pilot symbol is arranged at time $4. Note that the other symbols are also arranged according to the same rules.

Moreover, in (B) in FIG. 19, the symbol for symbol number #0 of z1 is arranged at time $1; the symbol for symbol number #1 of z1 is arranged at time $2; and the symbol for symbol number #2 of z1 is arranged at time $3. Note that the other symbols are also arranged according to the same rules.

Note that in the example illustrated in FIG. 19, with symbols other than data symbols, a phase-change is not applied.

(Frame Configuration (5))

Next, an example of a frame configuration will be given in which the phase change value is expressed as a function of frequency fthat is to say, as $\gamma(f)$—and a symbol other than a data symbol, such as a control information symbol for transmitting control information or a pilot symbol for channel estimation, frequency synchronization, time synchronization, or signal detection (reference symbol, preamble) is present midway through.

Here, the phase change value of symbol number #0 is expressed as γ(0), the phase change value of symbol number #1 is expressed as γ(1), the phase change value of symbol number #2 is expressed as γ(2), and so on (in other words, the phase change value of symbol number #k is expressed as γ(k) (k is an integer greater than or equal to 0). Accordingly, in symbol number #k, weighting synthesizers 306A and 306B receive inputs of $s_1(k)$ and $\gamma(k)\times s_2(k)$).

Figure 20:
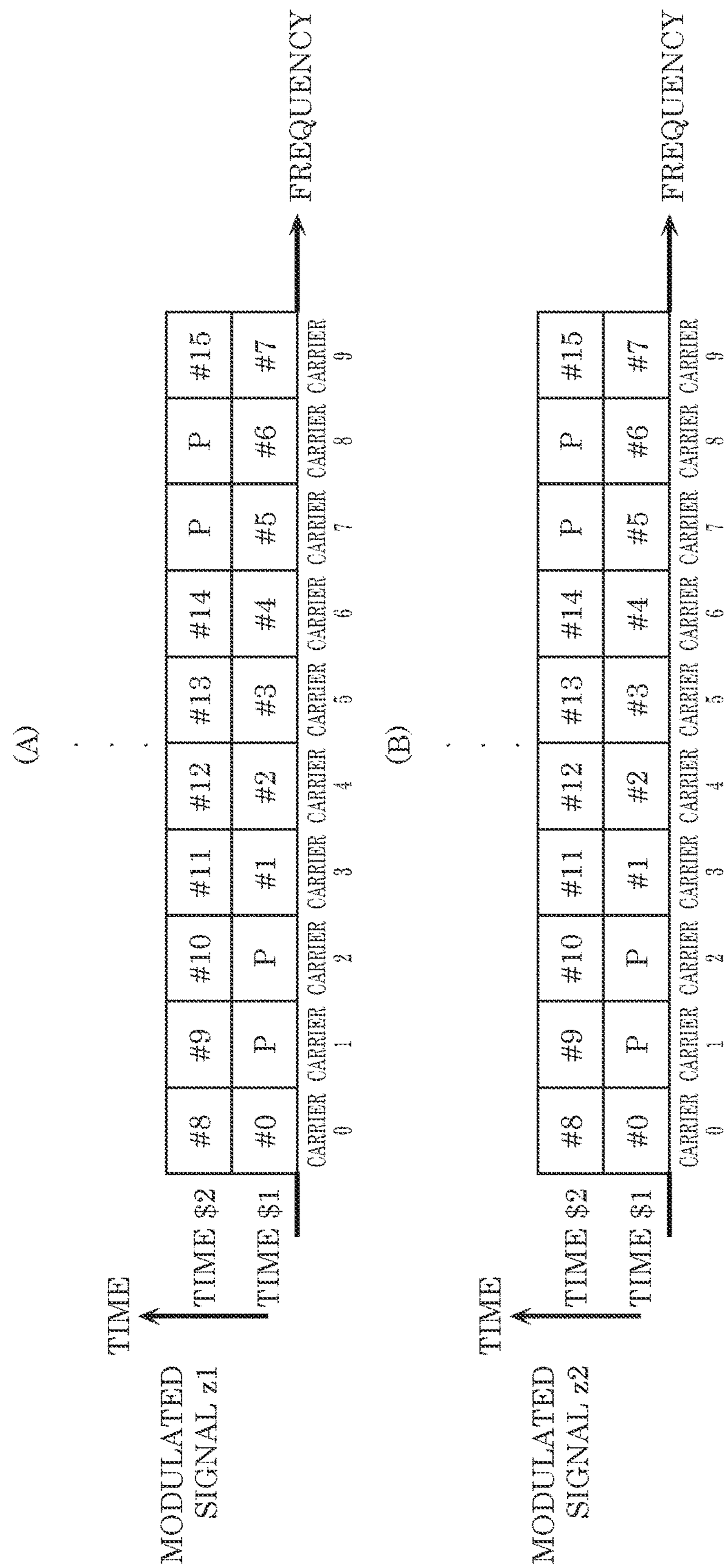
FIG. 20 illustrates an example of a frame configuration.

FIG. 20 is one example of a frame configuration when the symbols are arranged in the frequency direction.

In FIG. 20, (A) illustrates one example of a frame configuration of modulated signal z1, where frequency is represented on the horizontal axis and time is represented on the vertical axis, and (B) illustrates one example of a frame configuration of modulated signal z2, where frequency is represented on the horizontal axis and time is represented on the vertical axis. In FIG. 20, carriers 0 through 9 and symbols for time $1 and time $2 are shown (note that the symbols for z1 and z2 in the same carrier number at the same time are transmitted from different antennas at the same time and at the same frequency).

In FIG. 20, for example, "#0" means it is a symbol for symbol number #0, and "#1" means it is a symbol for symbol number #1 (in other words, "#p" means it is a symbol for symbol number #p (for example, p is an integer greater than or equal to 0)).

Accordingly, in (A) in FIG. 20, the symbol for symbol number #0 of z1 is arranged at time $1, carrier 0; a pilot symbol is arranged at time $1, carrier 1; a pilot symbol is arranged at time $1, carrier 2; and the symbol for symbol number #1 of z1 is arranged at time $1, carrier 3. Note that the other symbols are also arranged according to the same rules.

Moreover, in (B) in FIG. 20, the symbol for symbol number #0 of z2 is arranged at time $1, carrier 0; a pilot symbol is arranged at time $1, carrier 1; a pilot symbol is arranged at time $1, carrier 2; and the symbol for symbol number #1 of z2 is arranged at time $1, carrier 3. Note that the other symbols are also arranged according to the same rules.

Note that in the example illustrated in FIG. 20, with symbols other than data symbols, a phase-change is not applied.

(Frame Configuration (6))

Next, an example of a frame configuration will be given in which the phase change value is expressed as a function of time t, frequency f—that is to say, as γ(t, f)—and a symbol other than a data symbol, such as a control information symbol for transmitting control information or a pilot symbol for channel estimation, frequency synchronization, time synchronization, or signal detection (reference symbol, preamble) is present midway through.

Here, the phase change value of symbol number #0 is expressed as γ(0), the phase change value of symbol number #1 is expressed as γ(1), the phase change value of symbol number #2 is expressed as γ(2), and so on (in other words, the phase change value of symbol number #k is expressed as γ(k) (k is an integer greater than or equal to 0). Accordingly, in symbol number #k, weighting synthesizers 306A and 306B receive inputs of $s_1(k)$ and $\gamma(k)\times s_2(k)$).

Figure 21:
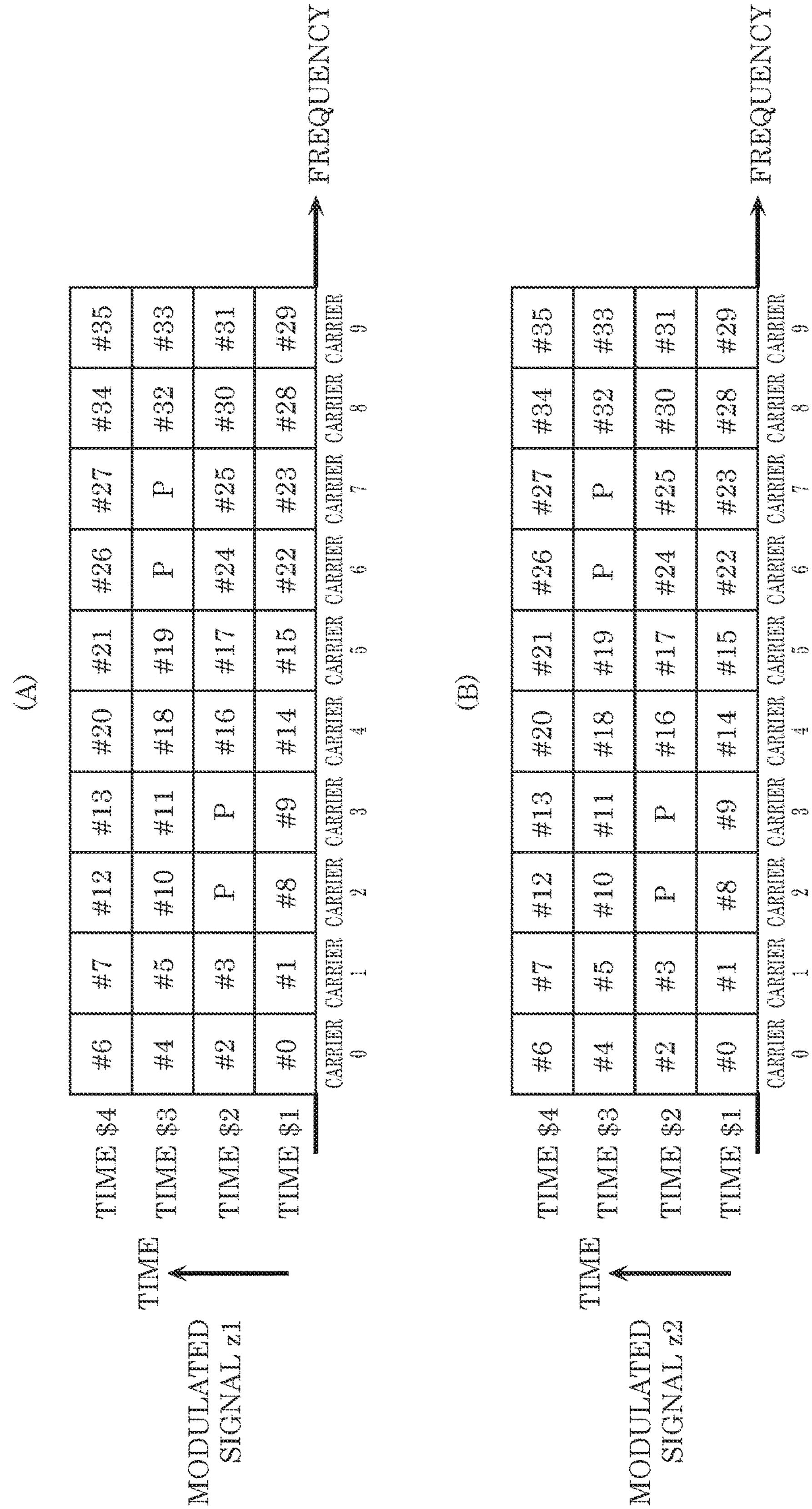
FIG. 21 illustrates an example of a frame configuration.

FIG. 21 is one example of a frame configuration when the symbols are arranged in the time/frequency direction.

In FIG. 21, (A) illustrates one example of a frame configuration of modulated signal $z_1$, where frequency is represented on the horizontal axis and time is represented on the vertical axis, and (B) illustrates one example of a frame configuration of modulated signal z2, where frequency is represented on the horizontal axis and time is represented on the vertical axis. In FIG. 21, carriers 0 through 9 and symbols for time $1, time $2, time $3, and time $4 are shown (note that the symbols for z1 and z2 in the same carrier number at the same time are transmitted from different antennas at the same time and at the same frequency).

In FIG. 21, for example, "#0" means it is a symbol for symbol number #0, and "#1" means it is a symbol for symbol number #1 (in other words, "#p" means it is a symbol for symbol number #p (for example, p is an integer greater than or equal to 0)).

Accordingly, in (A) in FIG. 21, the symbol for symbol number #0 of z1 is arranged at time $1, carrier 0; the symbol for symbol number #1 of z1 is arranged at time $1, carrier 1; the symbol for symbol number #2 of z1 is arranged at time $2, carrier 0; and a pilot symbol is arranged at time $2, carrier 2. Note that the other symbols are also arranged according to the same rules.

Moreover, in (B) in FIG. 21, the symbol for symbol number #0 of z2 is arranged at time $1, carrier 0; the symbol for symbol number #1 of z2 is arranged at time $1, carrier 1; the symbol for symbol number #2 of z2 is arranged at time $2, carrier 0; and a pilot symbol is arranged at time $2, carrier 2. Note that the other symbols are also arranged according to the same rules.

Note that in the example illustrated in FIG. 21, with symbols other than data symbols, a phase-change is not applied.

(Frame Configuration (7))

Next, an example of a frame configuration will be given in which the phase change value is expressed as a function of time t, frequency f—that is to say, as γ(t, f)—and a symbol other than a data symbol, such as a control information symbol for transmitting control information or a pilot symbol for channel estimation, frequency synchronization, time synchronization, or signal detection (reference symbol, preamble) is present midway through.

Here, the phase change value of symbol number #0 is expressed as γ(0), the phase change value of symbol number #1 is expressed as γ(1), the phase change value of symbol number #2 is expressed as γ(2), and so on (in other words, the phase change value of symbol number #k is expressed as γ(k) (k is an integer greater than or equal to 0). Accordingly, in symbol number #k, weighting synthesizers 306A and 306B receive inputs of $s_1(k)$ and $\gamma(k)\times s_2(k)$).

Figure 22:
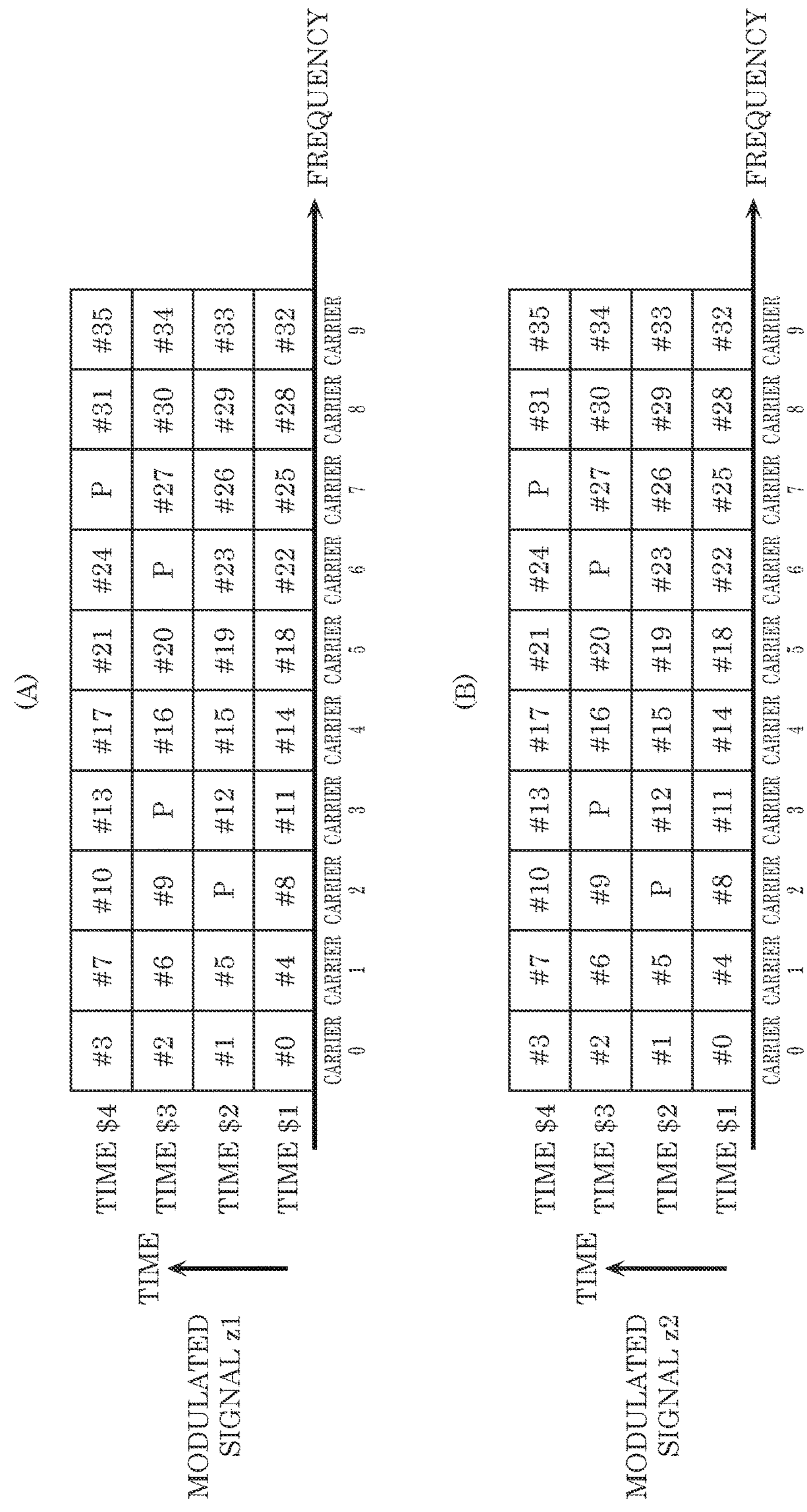
FIG. 22 illustrates an example of a frame configuration.

FIG. 22 is one example of a frame configuration when the symbols are arranged in the time/frequency direction.

In FIG. 22, (A) illustrates one example of a frame configuration of modulated signal z1, where frequency is represented on the horizontal axis and time is represented on the vertical axis, and (B) illustrates one example of a frame configuration of modulated signal z2, where frequency is represented on the horizontal axis and time is represented on the vertical axis. In FIG. 22, carriers 0 through 9 and symbols for time $1, time $2, time $3, and time $4 are shown (note that the symbols for z1 and z2 in the same carrier number at the same time are transmitted from different antennas at the same time and at the same frequency).

In FIG. 22, for example, "#0" means it is a symbol for symbol number #0, and "#1" means it is a symbol for symbol number #1 (in other words, "#p" means it is a symbol for symbol number #p (for example, p is an integer greater than or equal to 0)).

Accordingly, in (A) in FIG. 22, the symbol for symbol number #0 of z1 is arranged at time $1, carrier 0; the symbol for symbol number #1 of z1 is arranged at time $2, carrier 0; the symbol for symbol number #2 of z1 is arranged at time $3, carrier 0; and a pilot symbol is arranged at time $2, carrier 2. Note that the other symbols are also arranged according to the same rules.

Moreover, in (B) in FIG. 22, the symbol for symbol number #0 of z2 is arranged at time $1, carrier 0; the symbol for symbol number #1 of z2 is arranged at time $2, carrier 0; the symbol for symbol number #2 of z2 is arranged at time $3, carrier 0; and a pilot symbol is arranged at time $2, carrier 2. Note that the other symbols are also arranged according to the same rules.

Note that in the example illustrated in FIG. 22, with symbols other than data symbols, a phase-change is not applied.

(Phase Change Method (3))

Figure 23:
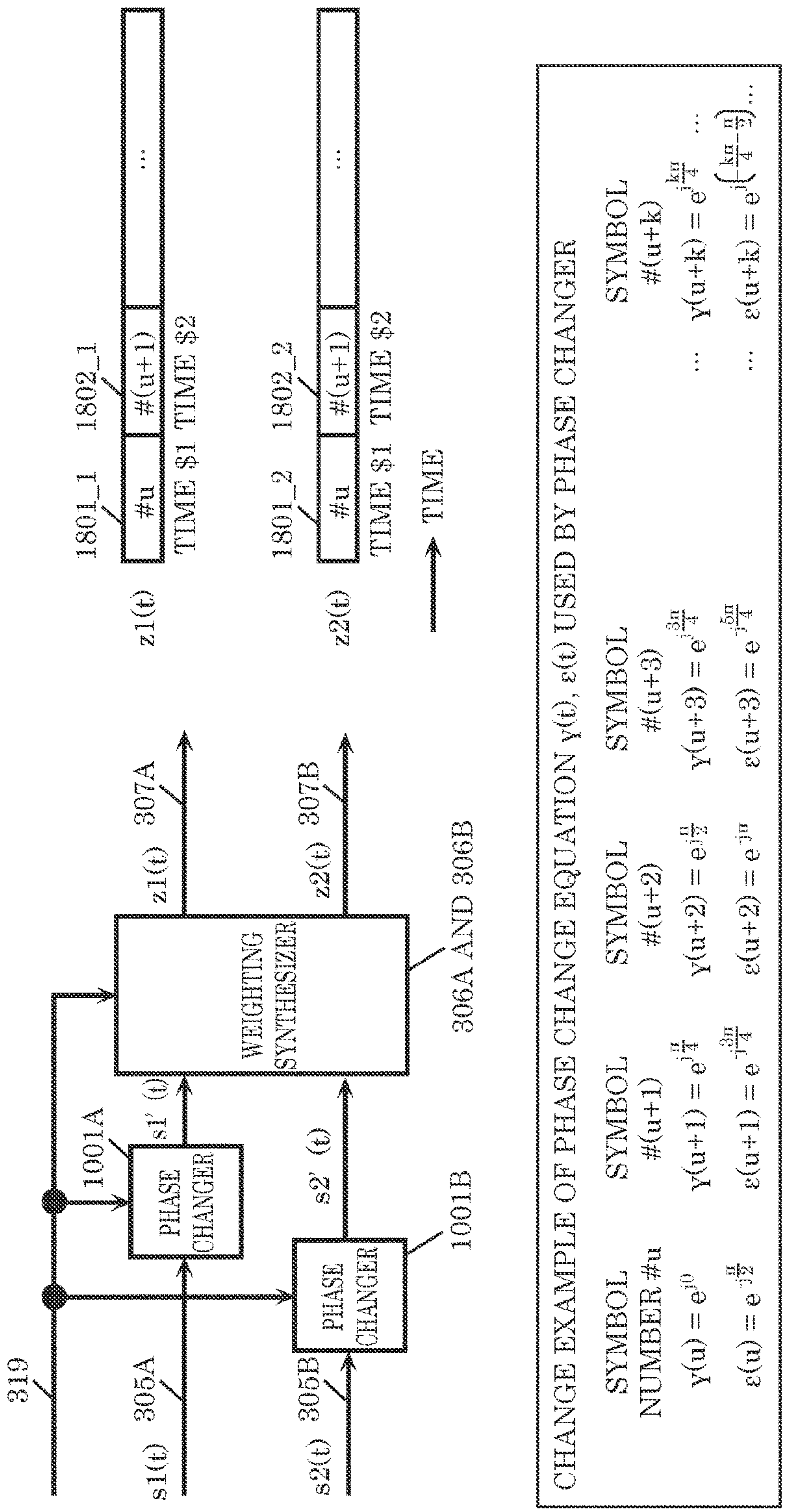
FIG. 23 illustrates an example of a phase changing method.

FIG. 23 illustrates one example of a phase change method, extracting relevant portions from phase changers 1001A, 1001B and weighting synthesizers 306A, 306B illustrated in FIG. 12.

Phase change is performed in phase changers 1001A, 1001B; a change example is illustrated in FIG. 23.

For example, with symbol number #u (since phase change value γ is treated as a function of a symbol number, it is written as γ(u); since phase change value ε is treated as a function of a symbol number, it is written as E(u)), phase change value $\gamma(u)=e^{j0}$ is applied, and phase change value $\varepsilon(u)=e^{j((-0\times\pi/4)-(\pi/2))}$ is applied. Accordingly, weighting synthesizers 306A and 306B receive inputs of $\varepsilon(u)\times s_1(u)$ and $\gamma(u)\times s_2(u)$.

With symbol number #(u+1), phase change value $\gamma(u+1)=e^{(j\times1\times\pi)/4}$ is applied, and $\varepsilon(u+1)=e^{j((-1\times\pi/4)-(\pi/2))}$ is applied. Accordingly, weighting synthesizers 306A and 306B receive inputs of $\varepsilon(u+1)\times s_1(u+1)$ and $\gamma(u+1)\times s_2(u+1)$.

With symbol number #(u+2), phase change value $\gamma(u+2)=e^{(j\times2\times\pi)/4}$ is applied, and $\varepsilon(u+2)=e^{j((-2\times\pi/4)-(\pi/2))}$ is applied. Accordingly, weighting synthesizers 306A and 306B receive inputs of $\varepsilon(u+2)\times s_1(u+2)$ and $\gamma(u+2)\times s_2(u+2)$.

With symbol number #(u+3), phase change value $\gamma(u+3)=e^{(j\times3\times\pi)/4}$ is applied, and $\varepsilon(u+3)=e^{j((-3\times\pi/4)-(\pi/2))}$ is applied. Accordingly, weighting synthesizers 306A and 306B receive inputs of $\varepsilon(u+3)\times s_1(u+3)$ and $\gamma(u+3)\times s_2(u+3)$.

With symbol number #(u+k), phase change value $\gamma(u+k)=e^{(j\times k\times\pi)/4}$ is applied, and $\varepsilon(u+k)=e^{j(-k\times\pi/4)-(\pi/2))}$ is applied. (For example, k is an integer.) Accordingly, weighting synthesizers 306A and 306B receive inputs of $\varepsilon(u+k)\times s_1(u+k)$ and $\gamma(u+k)\times s_2(u+k)$.

Note that the above description is applicable to any of: when the symbols are arranged in the time axis direction, when the symbols are arranged in the frequency axis direction, and when the symbols are arranged in the time/frequency axis direction.

Then, at time $1 of modulated signal $z_1(t)$, $z_1(t)$ of symbol number #u is transmitted, and at time $1 of modulated signal $z_2(t)$, $z_2(t)$ of symbol number #u is transmitted.

At time $2 of modulated signal $z_1(t)$, $z_1(t)$ of symbol number #(u+1) is transmitted, and at time $2 of modulated signal $z_2(t)$, $z_2(t)$ of symbol number #(u+1) is transmitted.

Note that $z_1(t)$ and $z_2(t)$ are transmitted from different antennas using the same frequency.

(Phase Change Method (4))

Figure 24:
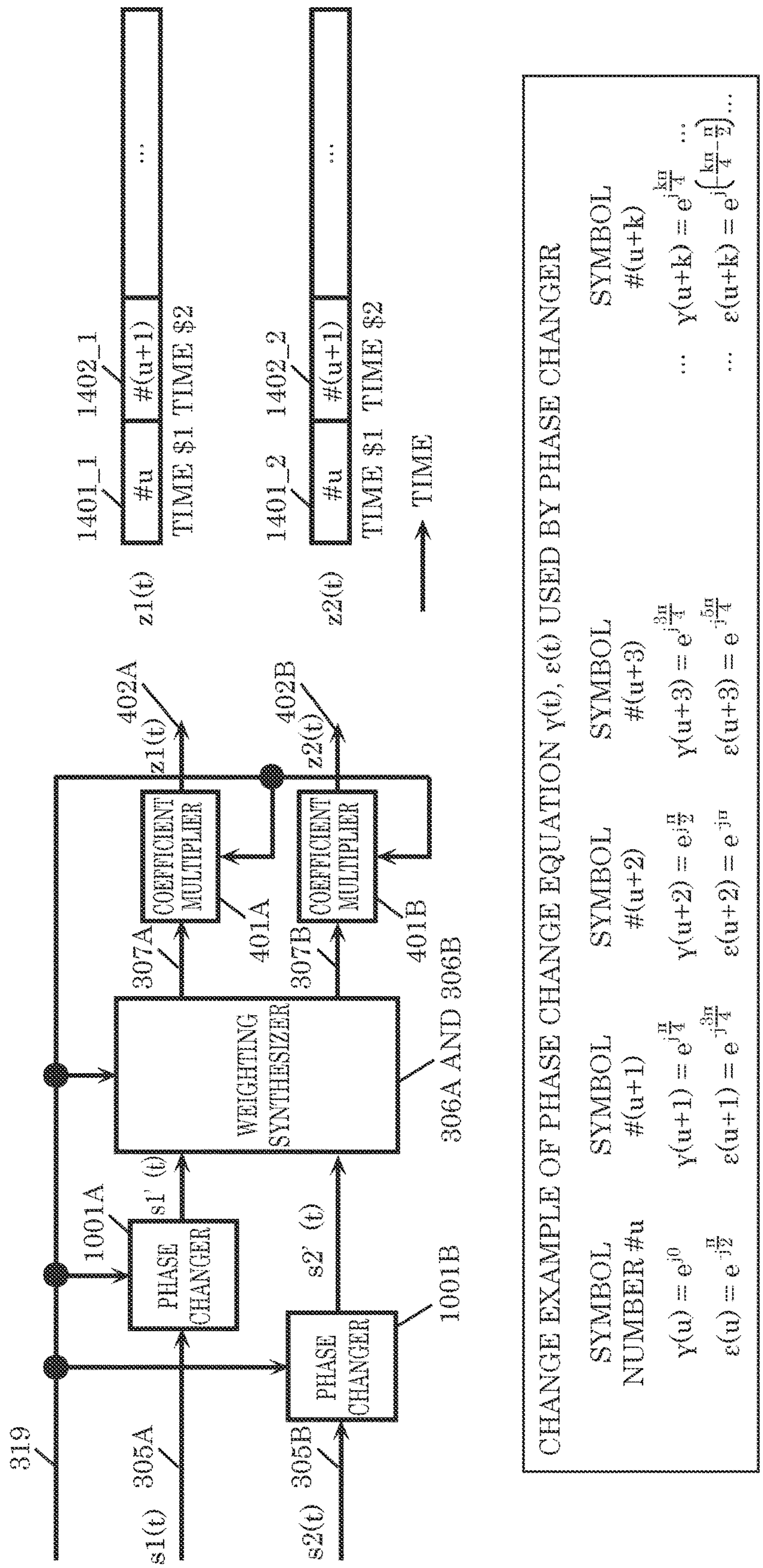
FIG. 24 illustrates an example of a phase changing method.

FIG. 24 illustrates one example of a phase change method, extracting relevant portions from 1001A, 1001B, weighting synthesizers 306A, 306B, and coefficient multipliers 401A, 401B illustrated in FIG. 13.

Phase change is performed in phase changers 1001A, 1001B; a change example is illustrated in FIG. 24.

For example, with symbol number #u (since phase change value γ is treated as a function of a symbol number, it is written as γ(u); since phase change value ε is treated as a function of a symbol number, it is written as ε(u)), phase change value $\gamma(u)=e^{j0}$ is applied, and phase change value $\varepsilon(u)=e^{j((-0\times\pi/4)-(\pi/2))}$ is applied. Accordingly, weighting synthesizers 306A and 306B receive inputs of $\varepsilon(u)\times s_1(u)$ and $\gamma(u)\times s_2(u)$.

With symbol number #(u+1), phase change value $\gamma(u+1)=e^{(j\times1\times\pi)/4}$ is applied, and $\varepsilon(u+1)=e^{j((-1\times\pi/4)-(\pi/2))}$ is applied. Accordingly, weighting synthesizers 306A and 306B receive inputs of $c(u+1)\times s_1(u+1)$ and $\gamma(u+1)\times s_2(u+1)$.

With symbol number #(u+2), phase change value $\gamma(u+2)=e^{(j\times2\times\pi)/4}$ is applied, and $\varepsilon(u+2)=e^{j((-2\times\pi/4)-(\pi/2))}$ is applied. Accordingly, weighting synthesizers 306A and 306B receive inputs of $\varepsilon(u+2)\times s_1(u+2)$ and $\gamma(u+2)\times s_2(u+2)$.

With symbol number #(u+3), phase change value $\gamma(u+3)=e^{(j\times3\times\pi)/4}$ is applied, and $\varepsilon(u+3)=e^{j((-3\times\pi/4)-(\pi/2))}$ is applied. Accordingly, weighting synthesizers 306A and 306B receive inputs of $\varepsilon(u+3)\times s_1(u+3)$ and $\gamma(u+3)\times s_2(u+3)$.

With symbol number #(u+k), phase change value $\gamma(u+k)=e^{(j\times k\times\pi)/4}$ is applied, and $\varepsilon(u+k)=e^{j((-k\times\pi/4)-(\pi/2))}$ is applied. (For example, k is an integer.) Accordingly, weighting synthesizers 306A and 306B receive inputs of $c(u+k)\times s_1(u+k)$ and $\gamma(u+k)\times s_2(u+k)$.

Note that the above description is applicable to any of: when the symbols are arranged in the time axis direction, when the symbols are arranged in the frequency axis direction, and when the symbols are arranged in the time/frequency axis direction.

Then, at time $1 of modulated signal z $z_1(t)$ of symbol number #u is transmitted, and at time $1 of modulated signal $z_2(t)$, $z_2(t)$ of symbol number #u is transmitted.

At time $2 of modulated signal $z_1(t)$, $z_1(t)$ of symbol number #(u+1) is transmitted, and at time $2 of modulated signal $z_2(t)$, $z_2(t)$ of symbol number #(u+1) is transmitted.

Note that $z_1(t)$ and $z_2(t)$ are transmitted from different antennas using the same frequency.

(Frame Configuration (8))

Next, an example of a frame configuration when the phase change value is a function of frequency f—that is to say, when the phase change value is expressed as γ(f), ε(f)—will be described.

Here, the phase change value of symbol number #0 is expressed as γ(0), ε(0), the phase change value of symbol number #1 is expressed as γ(1), ε(1), the phase change value of symbol number #2 is expressed as γ(2), ε(2), and so on (in other words, the phase change value of symbol number #k is expressed as γ(k), ε(k) (k is an integer greater than or equal to 0). Accordingly, in symbol number #k, weighting synthesizers 306A and 306B receive inputs of $\varepsilon(k)\times s_1(k)$ and $\gamma(k)\times s_2(k)$).

FIG. 16 is one example of a frame configuration when the symbols are arranged in the frequency direction.

In FIG. 16, (A) illustrates one example of a frame configuration of modulated signal z1, where frequency is represented on the horizontal axis and time is represented on the vertical axis, and (B) illustrates one example of a frame configuration of modulated signal z2, where frequency is represented on the horizontal axis and time is represented on the vertical axis. In FIG. 16, carriers 0 through 9 and symbols for time $1 and time $2 are shown. Note that the symbols for $z_1$ and $z_2$ in the same carrier number at the same time are transmitted from different antennas at the same time and at the same frequency.

In FIG. 16, for example, "#0" means it is a symbol for symbol number #0, and "#1" means it is a symbol for symbol number #1 (in other words, "#p" means it is a symbol for symbol number #p (for example, p is an integer greater than or equal to 0)).

Accordingly, in (A) in FIG. 16, the symbol for symbol number #0 of z1 is arranged at time $1, carrier 0; the symbol for symbol number #5 of z1 is arranged at time $1, carrier 1; and the symbol for symbol number #1 of z1 is arranged at time $1, carrier 2. Note that the other symbols are also arranged according to the same rules (for example, the symbol for symbol number #17 of z1 is arranged at time $2, carrier 5).

Moreover, in (B) in FIG. 16, the symbol for symbol number #0 of z2 is arranged at time $1, carrier 0; the symbol for symbol number #5 of z2 is arranged at time $1, carrier 1; and the symbol for symbol number #1 of z2 is arranged at time $1, carrier 2. Note that the other symbols are also arranged according to the same rules (for example, the symbol for symbol number #17 of z2 is arranged at time $2, carrier 5).

(Frame Configuration (9))

Next, an example of a frame configuration when the phase change value is a function of time t, frequency f—that is to say, when the phase change value is expressed as γ(t, f), ε(t, f)—will be described.

Here, the phase change value of symbol number #0 is expressed as γ(0), ε(0), the phase change value of symbol number #1 is expressed as γ(1), ε(1), the phase change value of symbol number #2 is expressed as γ(2), ε(2), and so on (in other words, the phase change value of symbol number #k is expressed as γ(k), ε(k) (k is an integer greater than or equal to 0). Accordingly, in symbol number #k, weighting synthesizers 306A and 306B receive inputs of $\varepsilon(k)\times s_1(k)$ and $\gamma(k)\times s_2(k)$).

FIG. 17 is one example of a frame configuration when the symbols are arranged in the time/frequency direction.

In FIG. 17, (A) illustrates one example of a frame configuration of modulated signal z1, where frequency is represented on the horizontal axis and time is represented on the vertical axis, and (B) illustrates one example of a frame configuration of modulated signal $z_2$, where frequency is represented on the horizontal axis and time is represented on the vertical axis. In FIG. 17, carriers 0 through 9 and symbols for time $1, time $2, time $3, and time $4 are shown (note that the symbols for z1 and z2 in the same carrier number at the same time are transmitted from different antennas at the same time and at the same frequency).

In FIG. 17, for example, "#0" means it is a symbol for symbol number #0, and "#1" means it is a symbol for symbol number #1 (in other words, "#p" means it is a symbol for symbol number #p (for example, p is an integer greater than or equal to 0)).

Accordingly, in (A) in FIG. 17, the symbol for symbol number #0 of z1 is arranged at time $1, carrier 0; the symbol for symbol number #1 of z1 is arranged at time $1, carrier 1; and the symbol for symbol number #2 of z1 is arranged at time $2, carrier 0. Note that the other symbols are also arranged according to the same rules (for example, the symbol for symbol number #19 of z1 is arranged at time $2, carrier 5).

Moreover, in (B) in FIG. 17, the symbol for symbol number #0 of z2 is arranged at time $1, carrier 0; the symbol for symbol number #1 of z2 is arranged at time $1, carrier 1; and the symbol for symbol number #2 of z2 is arranged at time $2, carrier 0. Note that the other symbols are also arranged according to the same rules (for example, the symbol for symbol number #19 of z2 is arranged at time $2, carrier 5).

(Frame Configuration (10))

Next, a different example of a frame configuration when the phase change value is a function of time t, frequency f—that is to say, when the phase change value is expressed as γ(t, f), ε(t, f)—will be described.

Here, the phase change value of symbol number #0 is expressed as γ(0), ε(0), the phase change value of symbol number #1 is expressed as γ(1), ε(1), the phase change value of symbol number #2 is expressed as γ(2), ε(2), and so on (in other words, the phase change value of symbol number #k is expressed as γ(k) (k is an integer greater than or equal to 0). Accordingly, in symbol number #k, weighting synthesizers 306A and 306B receive inputs of $\varepsilon(k)\times s_1(k)$ and $\gamma(k)\times s_2(k)$).

FIG. 18 is one example of a frame configuration when the symbols are arranged in the time/frequency direction.

In FIG. 18, (A) illustrates one example of a frame configuration of modulated signal z1, where frequency is represented on the horizontal axis and time is represented on the vertical axis, and (B) illustrates one example of a frame configuration of modulated signal $z_2$, where frequency is represented on the horizontal axis and time is represented on the vertical axis. In FIG. 18, carriers 0 through 9 and symbols for time $1, time $2, time $3, and time $4 are shown (note that the symbols for z1 and z2 in the same carrier number at the same time are transmitted from different antennas at the same time and at the same frequency).

In FIG. 18, for example, "#0" means it is a symbol for symbol number #0, and "#1" means it is a symbol for symbol number #1 (in other words, "#p" means it is a symbol for symbol number #p (for example, p is an integer greater than or equal to 0)).

Accordingly, in (A) in FIG. 18, the symbol for symbol number #0 of z1 is arranged at time $1, carrier 0; the symbol for symbol number #1 of z1 is arranged at time $2, carrier 0; and the symbol for symbol number #2 of z1 is arranged at time $3, carrier 0. Note that the other symbols are also arranged according to the same rules (for example, the symbol for symbol number #21 of z1 is arranged at time $2, carrier 5).

Moreover, in (B) in FIG. 18, the symbol for symbol number #0 of z2 is arranged at time $1, carrier 0; the symbol for symbol number #1 of z2 is arranged at time $2, carrier 0; and the symbol for symbol number #2 of z2 is arranged at time $3, carrier 0. Note that the other symbols are also arranged according to the same rules (for example, the symbol for symbol number #21 of z2 is arranged at time $2, carrier 5).

(Frame Configuration (11))

Next, an example of a frame configuration will be given in which the phase change value is expressed as a function of time t—that is to say, as γ(t), ε(t)—and a symbol other than a data symbol, such as a control information symbol for transmitting control information or a pilot symbol for channel estimation, frequency synchronization, time synchronization, or signal detection (reference symbol, preamble) is present midway through.

Here, the phase change value of symbol number #0 is expressed as γ(0), ε(0), the phase change value of symbol number #1 is expressed as γ(1), ε(1), the phase change value of symbol number #2 is expressed as γ(2), ε(2), and so on (in other words, the phase change value of symbol number #k is expressed as γ(k), ε(k) (k is an integer greater than or equal to 0). Accordingly, in symbol number #k, weighting synthesizers 306A and 306B receive inputs of $\varepsilon(k)\times s_1(k)$ and $\gamma(k)\times s_2(k)$).

FIG. 19 is one example of a frame configuration when the symbols are arranged in the time direction.

In FIG. 19, (A) illustrates one example of a frame configuration of modulated signal z1, where time is represented on the horizontal axis, and (B) illustrates one example of a frame configuration of modulated signal z2, where time is represented on the horizontal axis (note that the symbols for z1 and z2 at the same time are transmitted from different antennas at the same frequency).

In FIG. 19, for example, "#0" means it is a symbol for symbol number #0, and "#1" means it is a symbol for symbol number #1. (In other words, "#p" means it is a symbol for symbol number p (for example, p is an integer greater than or equal to 0)). Moreover, "P" indicates a pilot symbol (note that, here, "P" indicates a pilot symbol, but it may indicate a symbol other than a pilot symbol (excluding a data symbol)).

Accordingly, in (A) in FIG. 19, the symbol for symbol number #0 of z1 is arranged at time $1; the symbol for symbol number #1 of z1 is arranged at time $2; the symbol for symbol number #2 of z1 is arranged at time $3; and a pilot symbol is arranged at time $4. Note that the other symbols are also arranged according to the same rules.

Moreover, in (B) in FIG. 19, the symbol for symbol number #0 of z1 is arranged at time $1; the symbol for symbol number #1 of z1 is arranged at time $2; and the symbol for symbol number #2 of z1 is arranged at time $3. Note that the other symbols are also arranged according to the same rules.

Note that in the example illustrated in FIG. 19, with symbols other than data symbols, a phase-change is not applied.

(Frame Configuration (12))

Next, an example of a frame configuration will be given in which the phase change value is expressed as a function of frequency f—that is to say, as γ(f), ε(f)—and a symbol other than a data symbol, such as a control information symbol for transmitting control information or a pilot symbol for channel estimation, frequency synchronization, time synchronization, or signal detection (reference symbol, preamble) is present midway through.

Here, the phase change value of symbol number #0 is expressed as γ(0), ε(0), the phase change value of symbol number #1 is expressed as γ(1), ε(1), the phase change value of symbol number #2 is expressed as γ(2), ε(2), and so on (in other words, the phase change value of symbol number #k is expressed as γ(k), ε(k) (k is an integer greater than or equal to 0). Accordingly, in symbol number #k, weighting synthesizers 306A and 306B receive inputs of $\varepsilon(k)\times s_1(k)$ and $\gamma(k)\times s_2(k)$).

FIG. 20 is one example of a frame configuration when the symbols are arranged in the frequency direction.

In FIG. 20, (A) illustrates one example of a frame configuration of modulated signal $z_1$, where frequency is represented on the horizontal axis and time is represented on the vertical axis, and (B) illustrates one example of a frame configuration of modulated signal z2, where frequency is represented on the horizontal axis and time is represented on the vertical axis. In FIG. 20, carriers 0 through 9 and symbols for time $1 and time $2 are shown (note that the symbols for z1 and z2 in the same carrier number at the same time are transmitted from different antennas at the same time and at the same frequency).

In FIG. 20, for example, "#0" means it is a symbol for symbol number #0, and "#1" means it is a symbol for symbol number #1 (in other words, "#p" means it is a symbol for symbol number #p (for example, p is an integer greater than or equal to 0)).

Accordingly, in (A) in FIG. 20, the symbol for symbol number #0 of z1 is arranged at time $1, carrier 0; a pilot symbol is arranged at time $1, carrier 1; a pilot symbol is arranged at time $1, carrier 2; and the symbol for symbol number #1 of z1 is arranged at time $1, carrier 3. Note that the other symbols are also arranged according to the same rules.

Moreover, in (B) in FIG. 20, the symbol for symbol number #0 of z2 is arranged at time $1, carrier 0; a pilot symbol is arranged at time $1, carrier 1; a pilot symbol is arranged at time $1, carrier 2; and the symbol for symbol number #1 of z2 is arranged at time $1, carrier 3. Note that the other symbols are also arranged according to the same rules.

Note that in the example illustrated in FIG. 20, with symbols other than data symbols, a phase-change is not applied.

(Frame Configuration (13))

Next, an example of a frame configuration will be given in which the phase change value is expressed as a function of time t, frequency f—that is to say, as γ(t, f), ε(t, f)—and a symbol other than a data symbol, such as a control information symbol for transmitting control information or a pilot symbol for channel estimation, frequency synchronization, time synchronization, or signal detection (reference symbol, preamble) is present midway through.

Here, the phase change value of symbol number #0 is expressed as γ(0), ε(0), the phase change value of symbol number #1 is expressed as γ(1), ε(1), the phase change value of symbol number #2 is expressed as γ(2), ε(2), and so on (in other words, the phase change value of symbol number #k is expressed as γ(k), ε(k) (k is an integer greater than or equal to 0). Accordingly, in symbol number #k, weighting synthesizers 306A and 306B receive inputs of $\varepsilon(k)\times s_1(k)$ and $\gamma(k)\times s_2(k)$).

FIG. 21 is one example of a frame configuration when the symbols are arranged in the time/frequency direction.

In FIG. 21, (A) illustrates one example of a frame configuration of modulated signal z1, where frequency is represented on the horizontal axis and time is represented on the vertical axis, and (B) illustrates one example of a frame configuration of modulated signal z2, where frequency is represented on the horizontal axis and time is represented on the vertical axis. In FIG. 21, carriers 0 through 9 and symbols for time $1, time $2, time $3, and time $4 are shown (note that the symbols for z1 and z2 in the same carrier number at the same time are transmitted from different antennas at the same time and at the same frequency).

In FIG. 21, for example, "#0" means it is a symbol for symbol number #0, and "#1" means it is a symbol for symbol number #1 (in other words, "#p" means it is a symbol for symbol number #p (for example, p is an integer greater than or equal to 0)).

Accordingly, in (A) in FIG. 21, the symbol for symbol number #0 of z1 is arranged at time $1, carrier 0; the symbol for symbol number #1 of z1 is arranged at time $1, carrier 1; the symbol for symbol number #2 of z1 is arranged at time $2, carrier 0; and a pilot symbol is arranged at time $2, carrier 2. Note that the other symbols are also arranged according to the same rules.

Moreover, in (B) in FIG. 21, the symbol for symbol number #0 of z2 is arranged at time $1, carrier 0; the symbol for symbol number #1 of z2 is arranged at time $1, carrier 1; the symbol for symbol number #2 of z2 is arranged at time $2, carrier 0; and a pilot symbol is arranged at time $2, carrier 2. Note that the other symbols are also arranged according to the same rules.

Note that in the example illustrated in FIG. 21, with symbols other than data symbols, a phase-change is not applied.

(Frame Configuration (14))

Next, an example of a frame configuration will be given in which the phase change value is expressed as a function of time t, frequency f—that is to say, as γ(t, f), ε(t, f)—and a symbol other than a data symbol, such as a control information symbol for transmitting control information or a pilot symbol for channel estimation, frequency synchronization, time synchronization, or signal detection (reference symbol, preamble) is present midway through.

Here, the phase change value of symbol number #0 is expressed as γ(0), ε(0), the phase change value of symbol number #1 is expressed as γ(1), ε(1), the phase change value of symbol number #2 is expressed as γ(2), ε(2), and so on (in other words, the phase change value of symbol number #k is expressed as γ(k), ε(k) (k is an integer greater than or equal to 0). Accordingly, in symbol number #k, weighting synthesizers 306A and 306B receive inputs of $\varepsilon(k)\times s_1(k)$ and $\gamma(k)\times s_2(k)$).

FIG. 22 is one example of a frame configuration when the symbols are arranged in the time/frequency direction.

In FIG. 22, (A) illustrates one example of a frame configuration of modulated signal $z_1$, where frequency is represented on the horizontal axis and time is represented on the vertical axis, and (B) illustrates one example of a frame configuration of modulated signal z2, where frequency is represented on the horizontal axis and time is represented on the vertical axis. In FIG. 22, carriers 0 through 9 and symbols for time $1, time $2, time $3, and time $4 are shown (note that the symbols for z1 and z2 in the same carrier number at the same time are transmitted from different antennas at the same time and at the same frequency).

In FIG. 22, for example, "#0" means it is a symbol for symbol number #0, and "#1" means it is a symbol for symbol number #1 (in other words, "#p" means it is a symbol for symbol number #p (for example, p is an integer greater than or equal to 0)).

Accordingly, in (A) in FIG. 22, the symbol for symbol number #0 of z1 is arranged at time $1, carrier 0; the symbol for symbol number #1 of z1 is arranged at time $2, carrier 0; the symbol for symbol number #2 of z1 is arranged at time $3, carrier 0; and a pilot symbol is arranged at time $2, carrier 2. Note that the other symbols are also arranged according to the same rules.

Moreover, in (B) in FIG. 22, the symbol for symbol number #0 of z2 is arranged at time $1, carrier 0; the symbol for symbol number #1 of z2 is arranged at time $2, carrier 0; the symbol for symbol number #2 of z2 is arranged at time $3, carrier 0; and a pilot symbol is arranged at time $2, carrier 2. Note that the other symbols are also arranged according to the same rules.

Note that in the example illustrated in FIG. 22, with symbols other than data symbols, a phase-change is not applied.

(Phase Change Description)

Hereinbefore, the performing of phase-change has been described, but here, how the phase-change is applied will be described by way of examples.

Here, when phase change value γ is a function of symbol number i, this is expressed as γ(i), and when phase change value ε is a function of symbol number i, this is expressed as ε(i). Here, γ(i) and ε(i) are not constant values (the y fluctuate according to symbol number).

Accordingly, the following relation equations are satisfied.

γ(i)≠ g (g is a constant complex number (may be an actual number)).

ε(i)≠ h (h is a constant complex number (may be an actual number)).

Phase change value γ(i) and phase change value ε(i) are preferably set so as to be periodic relative to be a symbol number.

For example, five types of phases are prepared as phase change values.

The five types of phase change values are Phase [0], Phase [1], Phase [2], Phase [3], and Phase [4].

Then, when i mod 5=0: γ(i)=Phase [0];

when i mod 5=1: γ(i)=Phase [1]:

when i mod 5=2: γ(i)=Phase [2];

when i mod 5=3: γ(i)=Phase [3]; and when i mod 5=4: γ(i)=Phase [4].

"mod" is an abbreviation for "modulo" and "i mod 5" means "remainder when i is divided by 5".

With this, phase change value γ(i) is periodic relative to a symbol number (here, the number of periods is five, but the value for the number of periods may be another value (the number of periods is an integer greater than or equal to 2)).

Similarly, for example, three types of phases are prepared as phase change values. The three types of phase change values are Phase_x [0], Phase_x [1], and Phase_x [2].

Then, when i mod 3=0: ε(i)=Phase_x [0];

when i mod 3=1: ε(i)=Phase_x [1]; and when i mod 3=2: ε(i)=Phase_x [2].

"mod" is an abbreviation for "modulo" and "i mod 5" means "remainder when i is divided by 5".

With this, phase change value ε(i) is periodic relative to a symbol number (here, the number of periods is three, but the value for the number of periods may be another value (the number of periods is an integer greater than or equal to 2)).

Moreover, for example, when the number of periods of the phase change value is N, N types of phases are prepared. Then, that value is Phase [k] (k is an integer that is greater than or equal to 0 and less than or equal to N−1 (N is an integer that is greater than or equal to 2)).

Here, in order to satisfy u≠ v, the following may hold true for each u and each v.

Phase [u] ≠ Phase [v]

Moreover, a different method is conceivable in which u≠ v; u and v which satisfy Phase [u]=Phase [v] are present, but N periods are formed.

As a different method, phase-change may be performed without using periods under a condition that "γ(i) and ε(i) are not constant values" is satisfied.

(Mapper Description)

Figure 25:
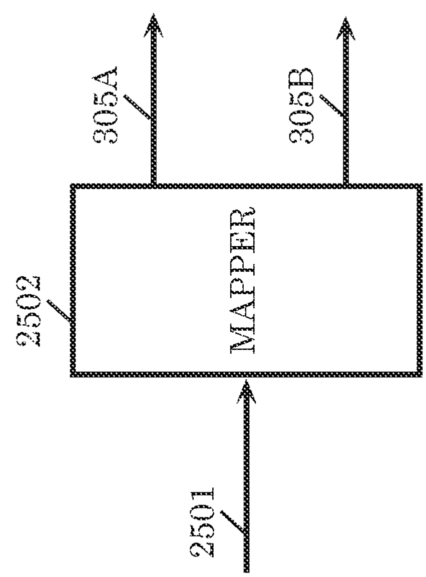
FIG. 25 illustrates an example of a mapper.

In FIG. 3, FIG. 4, FIG. 10, FIG. 11, FIG. 12, and FIG. 13, mappers 304A and 304B are illustrated as being separate from one another, but a mapper may be arranged as illustrated in FIG. 25.

In FIG. 25, mapper 2502 receives an input of bit sequence 2501, and outputs mapped signals 305A and 305B.

The advantages of this configuration will be described next. For example, the modulation method of modulated signal $s_1(i)$ is QPSK, and the modulation method of modulated signal $s_2(i)$ is QPSK. 4 bits are required for one-symbol generation of modulated signal $s_1(t)$ and one-symbol generation of modulated signal $s_2(t)$. Here, the 4 bits are $b_{1,0}$, $b_{1,1}$, $b_{1,2}$, and $b_{1,3}$.

The first QPSK symbol generates, using bit sequences $b_{1,0}$ and $b_{1,1}$, an in-phase component I[1, 1] of an orthogonal baseband signal and an orthogonal component Q[1, 1] of an orthogonal baseband signal. The second QPSK symbol generates, using bit sequences $b_{1,2}$ and $b_{1,3}$, an in-phase component I[1, 2] of an orthogonal baseband signal and an orthogonal component Q[1, 2] of an orthogonal baseband signal.

The in-phase component of modulated signal $s_1(i=1)$ is I[1, 1], and the orthogonal component of modulated signal $s_1(i=1)$ is Q[1, 2]. Moreover, the in-phase component of modulated signal $s_2(i=1)$ is I[1, 2], and the orthogonal component of modulated signal $s_2(i=1)$ is Q[1, 2].

In other words, the first QPSK symbol generates, using bit sequences $b_{k,0}$ and $b_{k,1}$, an in-phase component I[k, 1] of an orthogonal baseband signal and an orthogonal component Q[k, 1] of an orthogonal baseband signal. The second QPSK symbol generates, using bit sequences $b_{k,2}$ and $b_{k,3}$, an in-phase component I[k, 2] of an orthogonal baseband signal and an orthogonal component Q[k, 2] of an orthogonal baseband signal.

The in-phase component of modulated signal s1($i$=1) is I[k, 1], and the orthogonal component of modulated signal s1($i$=1) is Q[k, 2]. Moreover, the in-phase component of modulated signal $s_2(i=1)$ is I[k, 2], and the orthogonal component of modulated signal $s_2(i=1)$ is Q[k, 1].

With this, the bit sequences $b_{k,0}$, $b_{k,1}$, $b_{k,2}$, and $b_{k,3}$ are advantageous in that they can achieve a high diversity effect since they are transmitted from a plurality of antennas.

Note that in the above examples, the modulation method is exemplified as QPSK, but the modulation method may be Quadrature Amplitude Modulation (16 QAM), 64 QAM, 256 QAM, Amplitude Phase Shift Keying (16 APSK), 64 APSK, 256 APSK, Non-uniform QAM (NU-QAM), or NU mapping. The same processes are applied when any of these methods are used. Moreover, the same processes are performed regardless of whether the modulation method of modulated signal s1($i$) and the modulation method of modulated signal s2($i$) are the same or different.

In other words, "an in-phase component I[k, 1] of a first mapped orthogonal baseband signal and an orthogonal component Q[k, 1] of the orthogonal baseband signal are generated from a first bit sequence. An in-phase component I[k, 2] of a second mapped orthogonal baseband signal and an orthogonal component Q[k, 2] of the orthogonal baseband signal are generated from a second bit sequence. An in-phase component of modulated signal $s_1(i=1)$ is I[k, 1], and an orthogonal component is Q[k, 2]. Moreover, an in-phase component of modulated signal $s_2(i=1)$ is I[k, 2], and an orthogonal component is Q[k, 1]."

(Communications Station Configuration (5))

In FIG. 3, FIG. 10, and FIG. 12, a rearranger may be inserted between the weighting synthesizer and the radio unit.

Figure 26:
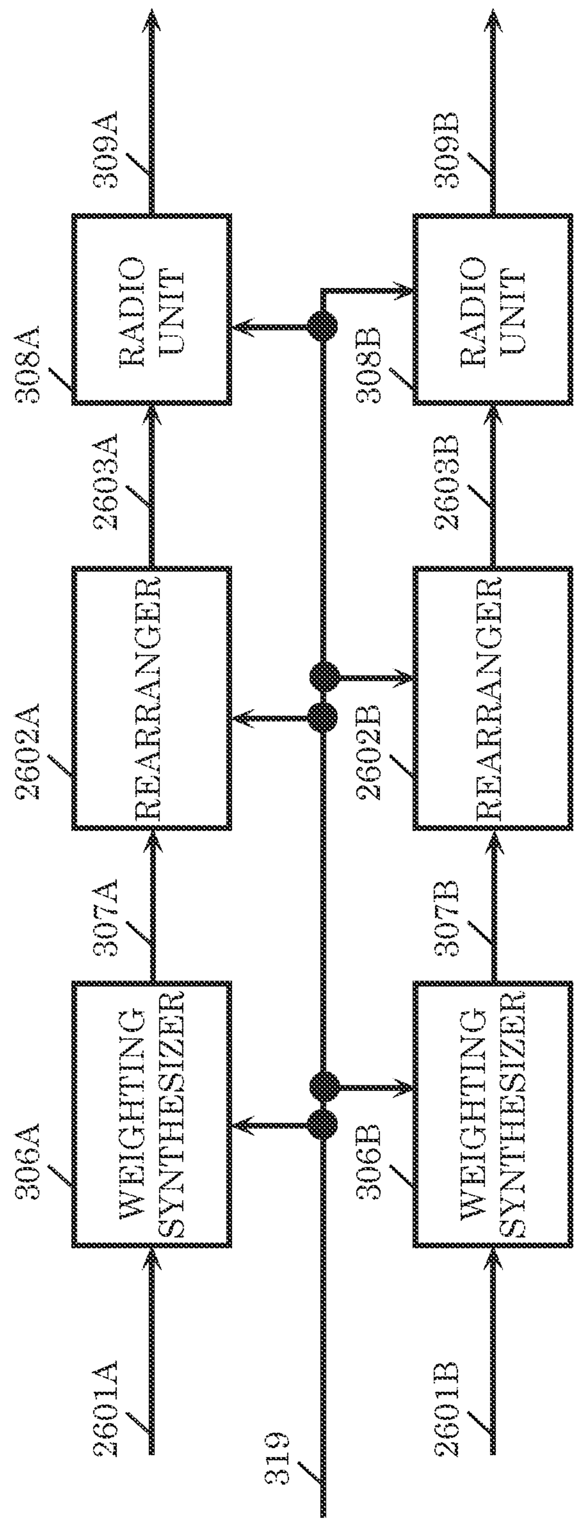
FIG. 26 illustrates an example of a configuration of a communications station.

FIG. 26 illustrates an example of such a configuration. Rearranger 2602A receives inputs of weighted signal 307A and transmission method/frame configuration signal 319, and rearranges weighted signal 307A based on transmission method/frame configuration signal 319 to output rearranged signal 2603A. For example, it is possible to realize a possible rearrangement of the symbols in FIG. 16 and FIG. 22.

Rearranger 2602B receives inputs of weighted signal 307B and transmission method/frame configuration signal 319, and rearranges weighted signal 307B based on transmission method/frame configuration signal 319 to output rearranged signal 2603B. For example, it is possible to realize a possible rearrangement of the symbols in FIG. 16 and FIG. 22.

In FIG. 4, FIG. 11, and FIG. 13, a rearranger may be inserted between the coefficient multiplier and the radio unit.

Figure 27:
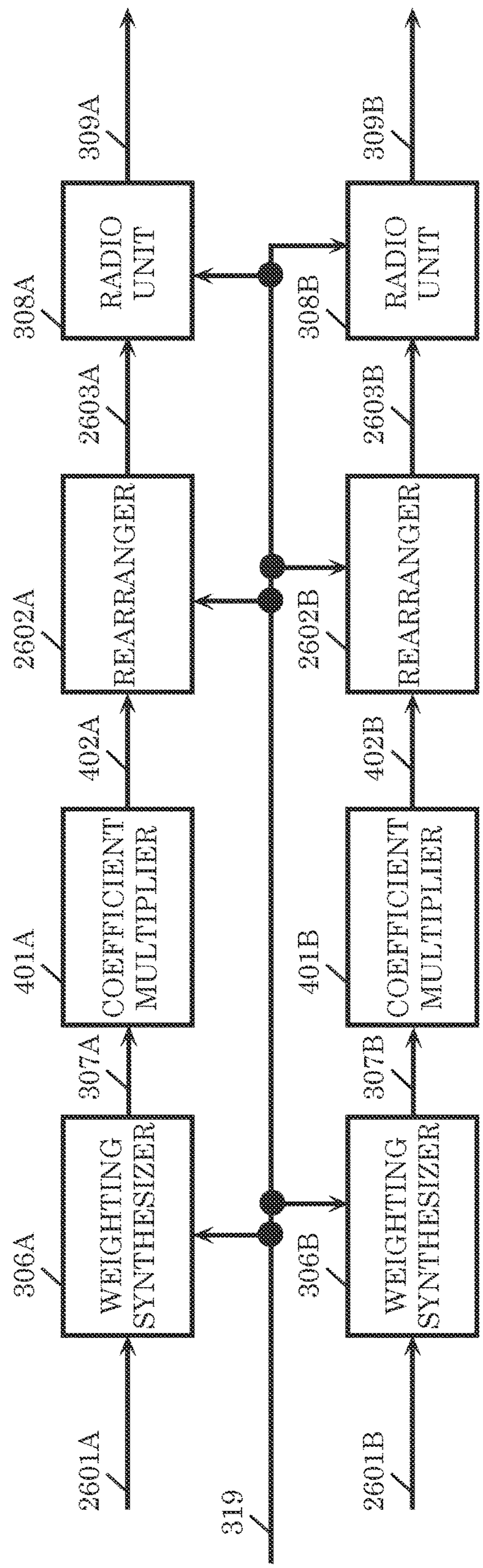
FIG. 27 illustrates an example of a configuration of a communications station.

FIG. 27 illustrates an example of such a configuration. Rearranger 2602A receives inputs of coefficient multiplied signal 402A and transmission method/frame configuration signal 319, and rearranges coefficient multiplied signal 402A based on transmission method/frame configuration signal 319 to output rearranged signal 2603A. For example, it is possible to realize a possible rearrangement of the symbols in FIG. 16 and FIG. 22. Note that it is possible to switch the order of rearranger 2602A and coefficient multiplier 401A.

Rearranger 2602B receives inputs of coefficient multiplied signal 402B and transmission method/frame configuration signal 319, and rearranges coefficient multiplied signal 402B based on transmission method/frame configuration signal 319 to output rearranged signal 2603B. For example, it is possible to realize a possible rearrangement of the symbols in FIG. 16 and FIG. 22. Note that it is possible to switch the order of rearranger 2602B and coefficient multiplier 401B.

(Supplemental Information)

In FIG. 1 and FIG. 2, a configuration in which communication is performed using horizontal polarizing antennas and vertical polarizing antennas on the transmitting side and receiving side is illustrated, but the transmission method according to this disclosure is not limited thereto. For example, the transmission method can be applied to when communication is performed using two different types of polarizing antennas with respect to the transmitting side and receiving side.

Moreover, taking into consideration the polarization states of the transmitting side and the receiving side, in order to satisfy conditions for preventing mapped baseband signal $s_1(t)$ from being affected (interference) by mapped baseband signal $s_2(t)$ and mapped baseband signal $s_2(t)$ from being affected (interference) by mapped baseband signal $s_1(t)$, the value of θ in the precoding is determined, but factors other than polarization may also be considered when determining the value of θ.

As a matter of course, the present disclosure may be carried out by combining two or more of the embodiments and other subject matter described herein.

Moreover, the embodiments are merely examples. For example, while a "modulation method, an error correction coding method (error correction code, code length, encode rate, etc., to be used), control information, etc." are exemplified, it is possible to carry out the present disclosure with the same configuration even when other types of a "modulation method, an error correction coding method (error correction code, code length, encode rate, etc., to be used), control information, etc." are applied.

Regarding the modulation method, even when a modulation method other than the modulation methods described herein is used, it is possible to carry out the embodiments and the other subject matter described herein. For example, Amplitude Phase Shift Keying (APSK) (such as 16 APSK, 64 APSK, 128 APSK, 256 APSK, 1024 APSK and 4096 APSK), Pulse Amplitude Modulation (PAM) (such as 4 PAM, 8 PAM, 16 PAM, 64 PAM, 128 PAM, 256 PAM, 1024 PAM and 4096 PAM), Phase Shift Keying (PSK) (such as BPSK, QPSK, 8 PSK, 16 PSK, 64 PSK, 128 PSK, 256 PSK, 1024 PSK and 4096 PSK), and Quadrature Amplitude Modulation (QAM) (such as 4 QAM, 8 QAM, 16 QAM, 64 QAM, 128 QAM, 256 QAM, 1024 QAM and 4096 QAM) may be applied, or in each modulation method, uniform mapping or non-uniform mapping may be performed. Moreover, a method for arranging 2, 4, 8, 16, 64, 128, 256, 1024, etc., signal points on an I-Q plane (a modulation method having 2, 4, 8, 16, 64, 128, 256, 1024, etc., signal points) is not limited to a signal point arrangement method of the modulation methods described herein.

Herein, it can be considered that communications and broadcast apparatuses such as a broadcast station, a base station, an access point, a terminal and a mobile phone includes the transmission device. In these cases, it can be considered that a communication apparatus such as a television, a radio, a terminal, a personal computer, a mobile phone, an access point and a base station includes the reception device. Moreover, it can also be considered that the transmission device and reception device according to the present disclosure are each a device having communication functions and is formed so as to be connectable via some interface to an apparatus for executing an application in, for example, a television, a radio, a personal computer or a mobile phone. Moreover, in this embodiment, symbols other than data symbols, such as pilot symbols (preamble, unique word, post-amble, reference symbol, etc.) or symbols for control information, may be arranged in any way in a frame. Here, the terms "pilot symbol" and "control information" are used, but the naming of such symbols is not important; the functions that they perform are.

A pilot symbol may be a known symbol that is modulated using PSK modulation in a transceiver (alternatively, a symbol transmitted by a transmitter can be known by a receiver by the receiver being periodic), and the receiver detects, for example, frequency synchronization, time synchronization, and a channel estimation (Channel State Information (CSI)) symbol (of each modulated signal) by using the symbol.

Moreover, the symbol for control information is a symbol for transmitting information required to be transmitted to a communication partner in order to establish communication pertaining to anything other than data (such as application data) (this information is, for example, the modulation method, error correction coding method, or encode rate of the error correction coding method used in the communication, or settings information in an upper layer).

Note that the present disclosure is not limited to each exemplary embodiment, and can be carried out with various modifications. For example, in each embodiment, the present disclosure is described as being performed as a communications device. However, the present disclosure is not limited to this case, and this communications method can also be used as software.

Note that a program for executing the above-described communications method may be stored in Read Only Memory (ROM) in advance to cause a Central Processing Unit (CPU) to operate this program.

Moreover, the program for executing the communications method may be stored in a computer-readable storage medium, the program stored in the recording medium may be recorded in Random Access Memory (RAM) in a computer, and the computer may be caused to operate according to this program.

Each configuration of each of the above-described embodiments, etc., may be realized as a Large Scale Integration (LSI) circuit, which is typically an integrated circuit. These integrated circuits may be formed as separate chips, or may be formed as one chip so as to include the entire configuration or part of the configuration of each embodiment.

LSI is described here, but the integrated circuit may also be referred to as an IC (Integrated Circuit), a system LSI circuit, a super LSI circuit or an ultra LSI circuit depending on the degree of integration. Moreover, the circuit integration technique is not limited to LSI, and may be realized by a dedicated circuit or a general purpose processor. After manufacturing of the LSI circuit, a programmable Field Programmable Gate Array (FPGA) or a reconfigurable processor which is reconfigurable in connection or settings of circuit cells inside the LSI circuit may be used. Further, when development of a semiconductor technology or another derived technology provides a circuit integration technology which replaces LSI, as a matter of course, functional blocks may be integrated by using this technology. Adaption of biotechnology, for example, is a possibility.

In the present specification, examples in which horizontal polarizing antennas and vertical polarizing antennas are used are given, but these examples are not limiting. For example, even if clockwise rotation circular polarizing antennas and counterclockwise rotation circular polarizing antennas are used, "changing the weighting synthesizing method and/or coefficient multiplication method based on feedback information from a communication partner (for example, weighting synthesizers 306A, 306B) in, for example, FIG. 3, and coefficient multipliers 401A, 401B in, for example, FIG. 4)" described in the present specification can be implemented (in other words, the configuration method of the antennas is not limited).

Moreover, in the present specification, specific methods for calculating, based on feedback information from a communication partner, the parameter θ in a precoding matrix in a weighted synthesizing method the parameters a and b in the precoding matrix, and the parameters a and b in a coefficient multiplier were described, but the calculation method is not limited to the above described methods. Accordingly, so long as a configuration in which a communications station sets, based on feedback information from a communication partner, the parameter θ in a precoding matrix in a weighted synthesizing method and/or parameters a and b in the precoding matrix, and/or parameters a and b in a coefficient multiplier (at least one of the parameter θ in a precoding matrix in a weight synthesizing method, parameters a and b in the precoding matrix, and parameters a and b in a coefficient multiplier), generates a modulated signal based on the settings, and transmits the modulated signal to the communication partner, the advantageous effects described in the present specification are obtainable. Note that the timing of the switching between the above-described parameters may be arbitrarily set, such as set to be performed on a per frame basis or per unit time basis. The setting of the above-described parameters may be performed by the communications station and may be instructed by the communication partner. Then, the values for θ, a, and b used by the communications station are notified to the communication partner by using, for example, control information symbols. With this, the communication partner demodulates the control information symbols to know the values for θ, a, and b used by the communications station, and with this, the demodulation/decoding of the data symbols is possible.

In the present specification, parameters a and b were described, but when there is a great difference in the absolute values of parameters a and b a device that displays a warning screen or an audio generator for generating a warning sound for notifying of "there is a great difference in the absolute values of parameters a and b" may be included in communications station. This is because when "there is a great difference in the absolute values of parameters a and b", resetting the antennas is likely to increase communication quality.

In the present specification, upon setting the values for parameters θ, a, and b, the communications station may perform a method that selects from a table stored in the communications station sets values for parameters θ, a, and b. Hereinafter an example will be given.

For example, a table is prepared including θ0, θ1, θ2, and θ3 as values for selectable parameter θ. Then the communications station selects an appropriate value from among θ0, θ1, θ2, and θ3, and sets the value for parameter θ.

Similarly, a table is prepared including a0, a1, a2, and a3 as values for selectable parameter a. Then the communications station selects an appropriate value from among a0, a1, a2, and a3, and sets the value for parameter a.

A table is prepared including b0, b1, b2, and b3 as values for selectable parameter b. Then the communications station selects an appropriate value from among b0, b1, b2, and b3, and sets the value for parameter b.

Here, four types of values are presented as selectable values, but this example is not limiting.

Moreover, when control information x=x0, this is associated with "set θ0 as value for θ"; when control information x=x1, this is associated with "set θ1 as value for θ"; when control information x=x2, this is associated with "set θ2 as value for θ"; and when control information x=x3, this is associated with "set θ3 as value for θ". Accordingly, by the communications station transmitting control information x as control information to a communication partner, the communication partner can know the value of θ used by the communications station.

Similarly, when control information y=y0, this is associated with "set a0 as value for a"; when control information y=y1, this is associated with "set a1 as value for a"; when control information y=y2, this is associated with "set a2 as value for a"; and when control information y=y3, this is associated with "set a3 as value for a". Accordingly, by the communications station transmitting control information y as control information to a communication partner, the communication partner can know the value of a used by the communications station.

When control information z=z0, this is associated with "set b0 as value for b"; when control information z=z1, this is associated with "set b1 as value for b"; when control information z=z2, this is associated with "set b2 as value for b"; and when control information z=z3, this is associated with "set b3 as value for b". Accordingly, by the communications station transmitting control information z as control information to a communication partner, the communication partner can know the value of b used by the communications station.

INDUSTRIAL APPLICABILITY

The present disclosure can be used in polarized MIMO systems.

The invention claimed is:

1. A transmission method, comprising:

generating a first transmission signal $z_1(t)$ and a second transmission signal $z_2(t)$ by calculating Equation (1):

[MATH. 1]

$$\begin{pmatrix} z_1(t) \\ z_2(t) \end{pmatrix} = \begin{pmatrix} a & 0 \\ 0 & b \end{pmatrix} \begin{pmatrix} \cos\theta & \sin\theta \\ \sin\theta & -\cos\theta \end{pmatrix} \begin{pmatrix} s_1(t) \\ s_2(t) \end{pmatrix} \quad (1)$$

from a first modulated signal $s_1(t)$ and a second modulated signal $S_2(t)$; and transmitting the first transmission signal $z_1(t)$ from a first transmission antenna, and transmitting the second transmission signal $z_2(t)$ from a second transmission antenna having a different polarization than the first transmission antenna, wherein θ, a, and b are derived based on feedback information, and θ, a, and b satisfy:

[MATH. 2]

$$b = \frac{h_{11}(t)}{h_{22}(t)} \times a \text{ and } \theta = -\delta + n\pi \text{ radians}$$

($n$ is an integer), wherein $h_{11}(t)$ represents channel characteristics between the first transmission antenna and a first reception antenna having the same polarization as the first transmission antenna at a receiver side, wherein $h_{22}(t)$ represents channel characteristics between the second transmission antenna and a second reception antenna having the same polarization as the second transmission antenna at the receiver side, and wherein δ is an angle between the first reception antenna and the second reception antenna in an ideal state and the first reception antenna and the second reception antenna when in a reception antenna state in which the first reception antenna and the second reception antenna are actually installed or when the reception antenna state is changed.

2. A transmission device, comprising:

a signal processor that generates a first transmission signal $z_1(t)$ and a second transmission signal $z_2(t)$ by calculating Equation (1):

[MATH. 3]

$$\begin{pmatrix} z_1(t) \\ z_2(t) \end{pmatrix} = \begin{pmatrix} a & 0 \\ 0 & b \end{pmatrix} \begin{pmatrix} \cos\theta & \sin\theta \\ \sin\theta & -\cos\theta \end{pmatrix} \begin{pmatrix} s_1(t) \\ s_2(t) \end{pmatrix} \quad (1)$$

from a first modulated signal $s_1(t)$ and a second modulated signal $s_2(t)$; and a transmitter that transmits the first transmission signal $z_1(t)$ from a first transmission antenna, and transmits the second transmission signal $z_2(t)$ from a second transmission antenna having a different polarization than the first transmission antenna, wherein θ, a, and b are derived based on feedback information, and θ, a, and b satisfy:

$$b = \frac{h_{11}(t)}{h_{22}(t)} \times a \text{ and } \theta = -\delta + n\pi \text{ radians}$$ [MATH. 4]

($n$ is an integer), wherein $h_{11}(t)$ represents channel characteristics between the first transmission antenna and a first reception antenna having the same polarization as the first transmission antenna at a receiver side, wherein $h_{22}(t)$ represents channel characteristics between the second transmission antenna and a second reception antenna having the same polarization as the second transmission antenna at the receiver side, and wherein δ is an angle between the first reception antenna and the second reception antenna in an ideal state and the first reception antenna and the second reception antenna when in a reception antenna state in which the first reception antenna and the second reception antenna are actually installed or when the reception antenna state is changed.

* * * * *